(12) United States Patent
Li et al.

(10) Patent No.: US 7,562,706 B2
(45) Date of Patent: Jul. 21, 2009

(54) SYSTEMS AND METHODS FOR PRODUCING HYDROCARBONS FROM TAR SANDS FORMATIONS

(75) Inventors: Ruijian Li, Katy, TX (US); John Michael Karanikas, Houston, TX (US)

(73) Assignee: Shell Oil Company, Houston, TX (US)

( * ) Notice: Subject to any disclaimer, the term of this patent is extended or adjusted under 35 U.S.C. 154(b) by 75 days.

(21) Appl. No.: 11/584,429

(22) Filed: Oct. 20, 2006

(65) Prior Publication Data

US 2007/0131427 A1    Jun. 14, 2007

Related U.S. Application Data

(60) Provisional application No. 60/794,298, filed on Apr. 21, 2006, provisional application No. 60/729,763, filed on Oct. 24, 2005.

(51) Int. Cl.
*E21B 36/00* (2006.01)
*E21B 43/24* (2006.01)
*E21B 43/30* (2006.01)

(52) U.S. Cl. .......................... 166/245; 166/50; 166/57; 166/272.3; 166/272.7; 166/302

(58) Field of Classification Search .............. 166/272.3, 166/306, 50, 52, 57, 245, 272.7, 302; 299/2
See application file for complete search history.

(56) References Cited

U.S. PATENT DOCUMENTS

| 0,048,994 | A | 7/1865 | Parry |
|---|---|---|---|
| 0,094,813 | A | 9/1869 | Dickey |
| 0,326,439 | A | 9/1885 | McEachen |
| 0,345,586 | A | 7/1886 | Hall |
| 0,760,304 | A | 5/1904 | Butler |
| 1,269,747 | A | 6/1918 | Rogers |
| 1,342,741 | A | 6/1920 | Day |
| 1,457,479 | A | 6/1923 | Wolcott |
| 1,510,655 | A | 6/1924 | Clark |
| 1,634,236 | A | 6/1927 | Ranney |
| 1,646,599 | A | 10/1927 | Schaefer |

(Continued)

FOREIGN PATENT DOCUMENTS

CA             899987        5/1972

(Continued)

OTHER PUBLICATIONS

Co-pending U.S. Appl. No. 11/975,676 entitled "Heating Tar Sands Formations to Visbreaking Temperatures" filed Oct. 20, 2007; available in PAIR.

(Continued)

*Primary Examiner*—George Suchfield

(57) ABSTRACT

A system for treating a tar sands formation is disclosed. A plurality of heaters are located in the formation. The heaters include at least partially horizontal heating sections at least partially in a hydrocarbon layer of the formation. The heating sections are at least partially arranged in a pattern in the hydrocarbon layer. The heaters are configured to provide heat to the hydrocarbon layer. The provided heat creates a plurality of drainage paths for mobilized fluids. At least two of the drainage paths converge. A production well is located to collect and produce mobilized fluids from at least one of the converged drainage paths in the hydrocarbon layer.

28 Claims, 123 Drawing Sheets

U.S. PATENT DOCUMENTS

| | | |
|---|---|---|
| 1,666,488 A | 4/1928 | Crawshaw |
| 1,681,523 A | 8/1928 | Downey et al. |
| 1,913,395 A | 6/1933 | Karrick |
| 2,244,255 A | 6/1941 | Looman |
| 2,244,256 A | 6/1941 | Looman |
| 2,319,702 A | 5/1943 | Moon |
| 2,365,591 A * | 12/1944 | Ranney ............... 166/269 |
| 2,381,256 A | 8/1945 | Callaway |
| 2,390,770 A | 12/1945 | Barton et al. |
| 2,423,674 A | 7/1947 | Agren |
| 2,444,755 A | 7/1948 | Steffen |
| 2,466,945 A | 4/1949 | Greene |
| 2,472,445 A | 6/1949 | Sprong |
| 2,481,051 A | 9/1949 | Uren |
| 2,484,063 A | 10/1949 | Ackley |
| 2,497,868 A | 2/1950 | Dalin |
| 2,548,360 A | 4/1951 | Germain |
| 2,593,477 A | 4/1952 | Newman et al. |
| 2,595,979 A | 5/1952 | Pevere et al. |
| 2,630,306 A | 3/1953 | Evans |
| 2,630,307 A | 3/1953 | Martin |
| 2,634,961 A | 4/1953 | Ljungstrom |
| 2,642,943 A | 6/1953 | Smith et al. |
| 2,670,802 A | 3/1954 | Ackley |
| 2,685,930 A | 8/1954 | Albaugh |
| 2,695,163 A | 11/1954 | Pearce et al. |
| 2,703,621 A | 3/1955 | Ford |
| 2,714,930 A | 8/1955 | Carpenter |
| 2,732,195 A | 1/1956 | Ljungstrom |
| 2,734,579 A | 2/1956 | Elkins |
| 2,743,906 A | 5/1956 | Coyle |
| 2,771,954 A | 11/1956 | Jenks et al. |
| 2,777,679 A | 1/1957 | Ljungstrom |
| 2,780,449 A | 2/1957 | Fisher et al. |
| 2,780,450 A | 2/1957 | Ljungstrom |
| 2,786,660 A | 3/1957 | Alleman |
| 2,789,805 A | 4/1957 | Ljungstrom |
| 2,793,696 A | 5/1957 | Morse |
| 2,794,504 A | 6/1957 | Carpenter |
| 2,801,089 A | 7/1957 | Scott, Jr. |
| 2,803,305 A | 8/1957 | Behning et al. |
| 2,804,149 A | 8/1957 | Kile |
| 2,819,761 A | 1/1958 | Popham et al. |
| 2,825,408 A | 3/1958 | Watson |
| 2,841,375 A | 7/1958 | Salomonsson |
| 2,857,002 A | 10/1958 | Pevere et al. |
| 2,862,558 A * | 12/1958 | Dixon ............... 166/272.3 |
| 2,889,882 A | 6/1959 | Schleicher |
| 2,890,754 A | 6/1959 | Hoffstrom et al. |
| 2,890,755 A | 6/1959 | Eurenius et al. |
| 2,902,270 A | 9/1959 | Salomonsson et al. |
| 2,906,337 A | 9/1959 | Henning |
| 2,906,340 A | 9/1959 | Herzog |
| 2,914,309 A | 11/1959 | Salomonsson |
| 2,923,535 A | 2/1960 | Ljungstrom |
| 2,932,352 A | 4/1960 | Stegemeier |
| 2,939,689 A | 6/1960 | Ljungstrom |
| 2,942,223 A | 6/1960 | Lennox et al. |
| 2,952,449 A | 9/1960 | Bays |
| 2,954,826 A | 10/1960 | Sievers |
| 2,958,519 A | 11/1960 | Hurley |
| 2,969,226 A | 1/1961 | Huntington |
| 2,970,826 A | 2/1961 | Woodruff |
| 2,974,937 A | 3/1961 | Kiel |
| 2,991,046 A | 7/1961 | Yahn |
| 2,994,376 A | 8/1961 | Crawford et al. |
| 2,997,105 A | 8/1961 | Campion et al. |
| 2,998,457 A | 8/1961 | Paulsen |
| 3,004,601 A | 10/1961 | Bodine |
| 3,004,603 A | 10/1961 | Rogers et al. |
| 3,007,521 A | 11/1961 | Trantham et al. |
| 3,010,513 A | 11/1961 | Gerner |
| 3,010,516 A | 11/1961 | Schleicher |
| 3,016,053 A | 1/1962 | Medovick |
| 3,017,168 A | 1/1962 | Carr |
| 3,026,940 A | 3/1962 | Spitz |
| 3,032,102 A | 5/1962 | Parker |
| 3,036,632 A | 5/1962 | Koch et al. |
| 3,044,545 A | 7/1962 | Tooke |
| 3,048,221 A | 8/1962 | Tek |
| 3,050,123 A | 8/1962 | Scott |
| 3,051,235 A | 8/1962 | Banks |
| 3,057,404 A | 10/1962 | Berstrom |
| 3,058,730 A | 10/1962 | Bays |
| 3,061,009 A | 10/1962 | Shirley |
| 3,062,282 A | 11/1962 | Schleicher |
| 3,095,031 A | 6/1963 | Eurenius et al. |
| 3,097,690 A | 7/1963 | Terwilliger et al. |
| 3,105,545 A | 10/1963 | Prats et al. |
| 3,106,244 A | 10/1963 | Parker |
| 3,110,345 A | 11/1963 | Reed et al. |
| 3,113,619 A | 12/1963 | Reichle |
| 3,113,620 A | 12/1963 | Hemminger |
| 3,113,623 A | 12/1963 | Krueger |
| 3,114,417 A | 12/1963 | McCarthy |
| 3,116,792 A | 1/1964 | Purre |
| 3,120,264 A | 2/1964 | Barron |
| 3,127,935 A | 4/1964 | Poettmann et al. |
| 3,127,936 A | 4/1964 | Eurenius |
| 3,131,763 A | 5/1964 | Kunetka et al. |
| 3,132,692 A | 5/1964 | Marx et al. |
| 3,137,347 A | 6/1964 | Parker |
| 3,138,203 A | 6/1964 | Weiss et al. |
| 3,139,928 A | 7/1964 | Broussard |
| 3,142,336 A | 7/1964 | Doscher |
| 3,149,670 A | 9/1964 | Grant |
| 3,149,672 A | 9/1964 | Orkiszewski et al. |
| 3,150,715 A | 9/1964 | Dietz |
| 3,163,745 A | 12/1964 | Boston |
| 3,164,207 A | 1/1965 | Thessen et al. |
| 3,165,154 A | 1/1965 | Santourian |
| 3,170,842 A | 2/1965 | Kehler |
| 3,181,613 A | 5/1965 | Krueger |
| 3,182,721 A | 5/1965 | Hardy |
| 3,183,675 A | 5/1965 | Schroeder |
| 3,191,679 A | 6/1965 | Miller |
| 3,205,942 A | 9/1965 | Sandberg |
| 3,205,944 A | 9/1965 | Walton |
| 3,205,946 A | 9/1965 | Prats et al. |
| 3,207,220 A | 9/1965 | Williams |
| 3,208,531 A | 9/1965 | Tamplen |
| 3,209,825 A | 10/1965 | Alexander et al. |
| 3,221,811 A | 12/1965 | Prats |
| 3,233,668 A | 2/1966 | Hamilton et al. |
| 3,237,689 A | 3/1966 | Justheim |
| 3,241,611 A | 3/1966 | Dougan |
| 3,246,695 A | 4/1966 | Robinson |
| 3,250,327 A | 5/1966 | Crider |
| 3,262,741 A | 7/1966 | Edmonds et al. |
| 3,267,680 A | 8/1966 | Schlumberger |
| 3,273,640 A | 9/1966 | Huntington |
| 3,275,076 A | 9/1966 | Sharp |
| 3,278,234 A | 10/1966 | Helvenston et al. |
| 3,284,281 A | 11/1966 | Thomas |
| 3,285,335 A | 11/1966 | Reistle, Jr. |
| 3,288,648 A | 11/1966 | Jones |
| 3,294,167 A | 12/1966 | Vogel |
| 3,302,707 A | 2/1967 | Slusser |
| 3,316,344 A | 4/1967 | Kidd et al. |
| 3,316,962 A | 5/1967 | Lange |
| 3,332,480 A | 7/1967 | Parrish |
| 3,338,306 A | 8/1967 | Cook |
| 3,342,258 A | 9/1967 | Prats |
| 3,342,267 A | 9/1967 | Cotter et al. |

| | | | | | |
|---|---|---|---|---|---|
| 3,349,845 A | 10/1967 | Holbert et al. | 3,950,029 A | 4/1976 | Timmins |
| 3,352,355 A | 11/1967 | Putman | 3,952,802 A | 4/1976 | Terry |
| 3,358,756 A | 12/1967 | Vogel | 3,954,140 A | 5/1976 | Hendrick |
| 3,362,751 A | 1/1968 | Tinlin | 3,973,628 A | 8/1976 | Colgate |
| 3,372,754 A | 3/1968 | McDonald | 3,986,349 A | 10/1976 | Egan |
| 3,379,248 A | 4/1968 | Strange | 3,986,556 A | 10/1976 | Haynes |
| 3,380,913 A | 4/1968 | Henderson | 3,986,557 A | 10/1976 | Striegler et al. |
| 3,386,508 A | 6/1968 | Bielstein et al. | 3,987,851 A | 10/1976 | Tham |
| 3,389,975 A | 6/1968 | Van Nostrand | 3,992,474 A | 11/1976 | Sobel |
| 3,399,623 A | 9/1968 | Creed | 3,993,132 A | 11/1976 | Garrett |
| 3,410,977 A | 11/1968 | Ando | 3,994,340 A | 11/1976 | Anderson et al. |
| 3,412,011 A | 11/1968 | Lindsay | 3,994,341 A | 11/1976 | Anderson et al. |
| 3,434,541 A | 3/1969 | Cook et al. | 3,999,607 A | 12/1976 | Pennington et al. |
| 3,455,383 A | 7/1969 | Prats et al. | 4,005,752 A | 2/1977 | Cha |
| 3,465,819 A | 9/1969 | Dixon | 4,006,778 A | 2/1977 | Redford et al. |
| 3,477,058 A | 11/1969 | Vedder et al. | 4,008,762 A | 2/1977 | Fisher et al. |
| 3,485,300 A | 12/1969 | Engle | 4,010,800 A | 3/1977 | Terry |
| 3,501,201 A | 3/1970 | Closmann et al. | 4,016,239 A | 4/1977 | Fenton |
| 3,502,372 A | 3/1970 | Prats | 4,016,245 A | 4/1977 | Plank et al. |
| 3,529,682 A | 3/1970 | Coyne et al. | 4,017,319 A | 4/1977 | Greskovich et al. |
| 3,513,913 A | 5/1970 | Bruist | 4,018,280 A | 4/1977 | Daviduk et al. |
| 3,515,837 A | 6/1970 | Ando | 4,019,575 A | 4/1977 | Pisio et al. |
| 3,528,501 A | 9/1970 | Parker | 4,026,357 A | 5/1977 | Redford |
| 3,537,528 A | 11/1970 | Herce et al. | 4,029,360 A | 6/1977 | French |
| 3,542,131 A | 11/1970 | Walton et al. | 4,031,956 A | 6/1977 | Terry |
| 3,547,192 A | 12/1970 | Claridge et al. | 4,037,655 A | 7/1977 | Carpenter |
| 3,547,193 A | 12/1970 | Gill | 4,037,658 A | 7/1977 | Anderson |
| 3,554,285 A | 1/1971 | Meldau | 4,042,026 A | 8/1977 | Pusch et al. |
| 3,562,401 A | 2/1971 | Long | 4,043,393 A | 8/1977 | Fisher et al. |
| 3,565,171 A | 2/1971 | Closmann | 4,048,637 A | 9/1977 | Jacomini |
| 3,572,838 A | 3/1971 | Templeton | 4,049,053 A | 9/1977 | Fisher et al. |
| 3,578,080 A | 5/1971 | Closmann | 4,057,293 A | 11/1977 | Garrett |
| 3,580,987 A | 5/1971 | Priaroggia | 4,059,308 A | 11/1977 | Pearson et al. |
| 3,593,789 A | 7/1971 | Prats | 4,067,390 A | 1/1978 | Camacho et al. |
| 3,595,082 A | 7/1971 | Miller et al. | 4,076,761 A | 2/1978 | Chang et al. |
| 3,599,714 A | 8/1971 | Messman et al. | 4,076,842 A | 2/1978 | Plank et al. |
| 3,605,890 A | 9/1971 | Holm | 4,083,604 A | 4/1978 | Bohn et al. |
| 3,614,986 A | 10/1971 | Gill | 4,084,637 A | 4/1978 | Todd |
| 3,618,663 A | 11/1971 | Needham | 4,085,803 A | 4/1978 | Butler |
| 3,629,551 A | 12/1971 | Ando | 4,087,130 A | 5/1978 | Garrett |
| 3,661,423 A | 5/1972 | Garrett | 4,089,372 A | 5/1978 | Terry |
| 3,675,715 A | 7/1972 | Speller, Jr. | 4,089,373 A | 5/1978 | Reynolds et al. |
| 3,679,812 A | 7/1972 | Owens | 4,089,374 A | 5/1978 | Terry |
| 3,680,633 A | 8/1972 | Bennett | 4,091,869 A | 5/1978 | Hoyer |
| 3,700,280 A | 10/1972 | Papadopoulos et al. | 4,093,025 A | 6/1978 | Terry |
| 3,702,886 A | 11/1972 | Argauer et al. | 4,093,026 A | 6/1978 | Ridley |
| 3,709,979 A | 1/1973 | Chu | 4,096,163 A | 6/1978 | Chang et al. |
| 3,757,860 A | 9/1973 | Pritchett | 4,099,567 A | 7/1978 | Terry |
| 3,759,328 A | 9/1973 | Ueber et al. | 4,114,688 A | 9/1978 | Terry |
| 3,759,574 A | 9/1973 | Beard | 4,119,349 A | 10/1978 | Albulescu et al. |
| 3,766,982 A | 10/1973 | Justheim | 4,125,159 A | 11/1978 | Vann |
| 3,770,398 A | 11/1973 | Abraham et al. | 4,130,575 A | 12/1978 | Jorn et al. |
| 3,770,614 A | 11/1973 | Graven | 4,133,825 A | 1/1979 | Stroud et al. |
| 3,779,602 A | 12/1973 | Beard et al. | 4,138,442 A | 2/1979 | Chang et al. |
| 3,794,113 A | 2/1974 | Strange et al. | 4,140,180 A | 2/1979 | Bridges et al. |
| 3,794,116 A | 2/1974 | Higgins | 4,140,181 A | 2/1979 | Ridley et al. |
| 3,804,169 A | 4/1974 | Closmann | 4,144,935 A | 3/1979 | Bridges et al. |
| 3,804,172 A | 4/1974 | Closmann et al. | 4,148,359 A | 4/1979 | Laumbach et al. |
| 3,809,159 A | 5/1974 | Young et al. | 4,158,467 A | 6/1979 | Larson et al. |
| 3,832,449 A | 8/1974 | Rosinski et al. | 4,183,405 A | 1/1980 | Magnie |
| 3,853,185 A | 12/1974 | Dahl et al. | 4,184,548 A | 1/1980 | Ginsburgh et al. |
| 3,881,551 A | 5/1975 | Terry et al. | 4,185,692 A | 1/1980 | Terry |
| 3,882,941 A | 5/1975 | Pelofsky | 4,186,801 A | 2/1980 | Madgavkar et al. |
| 3,893,918 A | 7/1975 | Favret, Jr. | 4,193,451 A | 3/1980 | Dauphine |
| 3,894,769 A | 7/1975 | Tham et al. | 4,197,911 A | 4/1980 | Anada |
| 3,907,045 A | 9/1975 | Dahl et al. | 4,199,024 A | 4/1980 | Rose et al. |
| 3,922,148 A | 11/1975 | Child | 4,199,025 A | 4/1980 | Carpenter |
| 3,924,680 A | 12/1975 | Terry | 4,228,853 A | 10/1980 | Harvey et al. |
| 3,941,421 A | 3/1976 | Burton, III et al. | 4,228,854 A | 10/1980 | Sacuta |
| 3,947,683 A | 3/1976 | Schultz et al. | 4,232,902 A | 11/1980 | Cuevas |
| 3,948,319 A | 4/1976 | Pritchett | 4,243,101 A | 1/1981 | Grupping |
| 3,948,755 A | 4/1976 | McCollum et al. | 4,248,306 A | 2/1981 | Van Huisen et al. |
| 3,948,758 A | 4/1976 | Bonacci et al. | 4,250,230 A | 2/1981 | Terry |

| | | | | | |
|---|---|---|---|---|---|
| 4,250,962 A | 2/1981 | Madgavkar et al. | 4,489,782 A | 12/1984 | Perkins |
| 4,252,191 A | 2/1981 | Pusch et al. | 4,491,179 A | 1/1985 | Pirson et al. |
| 4,254,297 A | 3/1981 | Frenken et al. | 4,498,531 A | 2/1985 | Vrolyk |
| 4,256,945 A | 3/1981 | Carter et al. | 4,498,535 A | 2/1985 | Bridges |
| 4,258,955 A | 3/1981 | Habib, Jr. | 4,499,209 A | 2/1985 | Hoek et al. |
| 4,265,307 A | 5/1981 | Elkins | 4,500,651 A | 2/1985 | Lok et al. |
| 4,273,188 A | 6/1981 | Vogel et al. | 4,501,326 A | 2/1985 | Edmunds |
| 4,274,487 A | 6/1981 | Hollingsworth et al. | 4,501,445 A | 2/1985 | Gregoli |
| 4,277,416 A | 7/1981 | Grant | 4,513,816 A | 4/1985 | Hubert |
| 4,282,587 A | 8/1981 | Silverman | 4,518,548 A | 5/1985 | Yarbrough |
| RE30,738 E | 9/1981 | Bridges et al. | 4,524,826 A | 6/1985 | Savage |
| 4,289,354 A | 9/1981 | Zakiewicz | 4,524,827 A | 6/1985 | Bridges et al. |
| 4,290,650 A | 9/1981 | Thompson | 4,530,401 A | 7/1985 | Hartman et al. |
| 4,299,086 A | 11/1981 | Madgavkar et al. | 4,537,252 A | 8/1985 | Puri |
| 4,299,285 A | 11/1981 | Tsai et al. | 4,540,882 A | 9/1985 | Vinegar et al. |
| 4,303,126 A | 12/1981 | Blevins | 4,542,648 A | 9/1985 | Vinegar et al. |
| 4,305,463 A | 12/1981 | Zakiewicz | 4,545,435 A | 10/1985 | Bridges et al. |
| 4,306,621 A | 12/1981 | Boyd et al. | 4,549,396 A | 10/1985 | Garwood et al. |
| 4,310,440 A | 1/1982 | Wilson et al. | 4,551,226 A | 11/1985 | Ferm |
| 4,311,340 A | 1/1982 | Lyons et al. | 4,552,214 A | 11/1985 | Forgac et al. |
| 4,324,292 A | 4/1982 | Jacobs et al. | 4,570,715 A | 2/1986 | Van Meurs et al. |
| 4,344,483 A | 8/1982 | Fisher et al. | 4,571,491 A | 2/1986 | Vinegar et al. |
| 4,353,418 A | 10/1982 | Hoekstra et al. | 4,572,299 A | 2/1986 | Van Egmond et al. |
| 4,359,687 A | 11/1982 | Vinegar et al. | 4,573,530 A | 3/1986 | Audeh et al. |
| 4,363,361 A | 12/1982 | Madgavkar et al. | 4,576,231 A | 3/1986 | Dowling et al. |
| 4,366,668 A | 1/1983 | Madgavkar et al. | 4,577,503 A | 3/1986 | Imaino et al. |
| 4,368,114 A | 1/1983 | Chester et al. | 4,577,690 A | 3/1986 | Medlin |
| 4,378,048 A | 3/1983 | Madgavkar et al. | 4,577,691 A * | 3/1986 | Huang et al. ............. 166/272.3 |
| 4,380,930 A | 4/1983 | Podhrasky et al. | 4,583,046 A | 4/1986 | Vinegar et al. |
| 4,381,641 A | 5/1983 | Madgavkar et al. | 4,583,242 A | 4/1986 | Vinegar et al. |
| 4,384,613 A * | 5/1983 | Owen et al. ................. 166/256 | 4,585,066 A | 4/1986 | Moore et al. |
| 4,384,614 A | 5/1983 | Justheim | 4,592,423 A | 6/1986 | Savage et al. |
| 4,385,661 A | 5/1983 | Fox | 4,597,441 A | 7/1986 | Ware et al. |
| 4,390,067 A | 6/1983 | Wilman | 4,597,444 A | 7/1986 | Hutchinson |
| 4,390,973 A | 6/1983 | Rietsch | 4,598,392 A | 7/1986 | Pann |
| 4,396,062 A | 8/1983 | Iskander | 4,598,770 A | 7/1986 | Shu et al. |
| 4,397,732 A | 8/1983 | Hoover et al. | 4,598,772 A | 7/1986 | Holmes |
| 4,398,151 A | 8/1983 | Vinegar et al. | 4,605,489 A | 8/1986 | Madgavkar |
| 4,399,866 A | 8/1983 | Dearth | 4,605,680 A | 8/1986 | Beuther et al. |
| 4,401,099 A | 8/1983 | Collier | 4,608,818 A | 9/1986 | Goebel et al. |
| 4,401,162 A | 8/1983 | Osborne | 4,609,041 A | 9/1986 | Magda |
| 4,401,163 A | 8/1983 | Elkins | 4,613,754 A | 9/1986 | Vinegar et al. |
| 4,407,973 A | 10/1983 | van Dijk et al. | 4,616,705 A | 10/1986 | Stegemeier et al. |
| 4,409,090 A | 10/1983 | Hanson et al. | 4,623,401 A | 11/1986 | Derbyshire et al. |
| 4,410,042 A | 10/1983 | Shu | 4,623,444 A | 11/1986 | Che et al. |
| 4,412,124 A | 10/1983 | Kobayashi | 4,626,665 A | 12/1986 | Fort, III |
| 4,412,585 A | 11/1983 | Bouck | 4,635,197 A | 1/1987 | Vinegar et al. |
| 4,417,782 A | 11/1983 | Clarke et al. | 4,637,464 A | 1/1987 | Forgac et al. |
| 4,418,752 A | 12/1983 | Boyer et al. | 4,640,352 A | 2/1987 | Van Meurs et al. |
| 4,423,311 A | 12/1983 | Varney, Sr. | 4,640,353 A | 2/1987 | Schuh |
| 4,425,967 A | 1/1984 | Hoekstra | 4,644,283 A | 2/1987 | Vinegar et al. |
| 4,428,700 A | 1/1984 | Lenneman | 4,645,906 A | 2/1987 | Yagnik et al. |
| 4,429,745 A | 2/1984 | Cook | 4,651,825 A | 3/1987 | Wilson |
| 4,437,519 A | 3/1984 | Cha et al. | 4,658,215 A | 4/1987 | Vinegar et al. |
| 4,440,224 A | 4/1984 | Kreinin et al. | 4,662,437 A | 5/1987 | Renfro et al. |
| 4,440,871 A | 4/1984 | Lok et al. | 4,662,438 A | 5/1987 | Taflove et al. |
| 4,442,896 A | 4/1984 | Reale et al. | 4,662,439 A | 5/1987 | Puri |
| 4,444,255 A | 4/1984 | Geoffrey et al. | 4,662,443 A | 5/1987 | Puri et al. |
| 4,444,258 A | 4/1984 | Kalmar | 4,663,711 A | 5/1987 | Vinegar et al. |
| 4,445,574 A | 5/1984 | Vann | 4,669,542 A | 6/1987 | Venkatesan |
| 4,446,917 A | 5/1984 | Todd | 4,671,102 A | 6/1987 | Vinegar et al. |
| 4,452,491 A | 6/1984 | Seglin et al. | 4,682,652 A | 7/1987 | Huang et al. |
| 4,455,215 A | 6/1984 | Jarrott et al. | 4,686,029 A | 8/1987 | Pellet et al. |
| 4,456,065 A | 6/1984 | Heim et al. | 4,691,771 A | 9/1987 | Ware et al. |
| 4,457,365 A | 7/1984 | Kasevich et al. | 4,694,907 A | 9/1987 | Stahl et al. |
| 4,457,374 A | 7/1984 | Hoekstra et al. | 4,695,713 A | 9/1987 | Krumme |
| 4,458,757 A | 7/1984 | Bock et al. | 4,698,149 A | 10/1987 | Mitchell |
| 4,458,767 A | 7/1984 | Hoehn, Jr. | 4,698,583 A | 10/1987 | Sandberg |
| 4,460,044 A | 7/1984 | Porter | 4,701,587 A | 10/1987 | Carter et al. |
| 4,474,238 A | 10/1984 | Gentry et al. | 4,704,514 A | 11/1987 | Van Egmond et al. |
| 4,479,541 A | 10/1984 | Wang | 4,706,751 A | 11/1987 | Gondouin |
| 4,485,868 A | 12/1984 | Sresty et al. | 4,716,960 A | 1/1988 | Eastlund et al. |
| 4,485,869 A | 12/1984 | Sresty et al. | 4,717,814 A | 1/1988 | Krumme |

| | | | | | |
|---|---|---|---|---|---|
| 4,719,423 A | 1/1988 | Vinegar et al. | 5,097,903 A | 3/1992 | Wilensky |
| 4,728,892 A | 3/1988 | Vinegar et al. | 5,099,918 A | 3/1992 | Bridges et al. |
| 4,730,162 A | 3/1988 | Vinegar et al. | 5,102,551 A | 4/1992 | Pasternak |
| 4,733,057 A | 3/1988 | Stanzel et al. | 5,103,920 A | 4/1992 | Patton |
| 4,734,115 A | 3/1988 | Howard et al. | 5,126,037 A | 6/1992 | Showalter |
| 4,743,854 A | 5/1988 | Vinegar et al. | 5,145,003 A | 9/1992 | Duerksen |
| 4,744,245 A | 5/1988 | White | 5,150,118 A | 9/1992 | Finkle et al. |
| 4,752,673 A | 6/1988 | Krumme | 5,168,927 A | 12/1992 | Stegemeier et al. |
| 4,756,367 A | 7/1988 | Puri et al. | 5,173,213 A | 12/1992 | Miller et al. |
| 4,762,425 A | 8/1988 | Shakkottai et al. | 5,182,427 A | 1/1993 | McGaffigan |
| 4,766,958 A | 8/1988 | Faecke | 5,182,792 A | 1/1993 | Goncalves |
| 4,769,602 A | 9/1988 | Vinegar et al. | 5,189,283 A | 2/1993 | Carl, Jr. et al. |
| 4,769,606 A | 9/1988 | Vinegar et al. | 5,190,405 A | 3/1993 | Vinegar et al. |
| 4,772,634 A | 9/1988 | Farooque | 5,201,219 A | 4/1993 | Bandurski et al. |
| 4,776,638 A | 10/1988 | Hahn | 5,207,273 A | 5/1993 | Cates et al. |
| 4,785,163 A | 11/1988 | Sandberg | 5,209,987 A | 5/1993 | Penneck et al. |
| 4,787,452 A | 11/1988 | Jennings, Jr. | 5,211,230 A | 5/1993 | Ostapovich et al. |
| 4,794,226 A | 12/1988 | Derbyshire | 5,217,076 A | 6/1993 | Masek |
| 4,808,925 A | 2/1989 | Baird | 5,226,961 A | 7/1993 | Nahm et al. |
| 4,814,587 A | 3/1989 | Carter | 5,229,583 A | 7/1993 | van Egmond et al. |
| 4,817,711 A | 4/1989 | Jeambey | 5,236,039 A | 8/1993 | Edelstein et al. |
| 4,818,370 A | 4/1989 | Gregoli et al. | 5,246,071 A | 9/1993 | Chu |
| 4,821,798 A | 4/1989 | Bridges et al. | 5,255,742 A | 10/1993 | Mikus |
| 4,823,890 A | 4/1989 | Lang | 5,261,490 A | 11/1993 | Ebinuma |
| 4,827,761 A | 5/1989 | Vinegar et al. | 5,275,726 A | 1/1994 | Feimer et al. |
| 4,828,031 A | 5/1989 | Davis | 5,282,957 A | 2/1994 | Wright et al. |
| 4,840,720 A | 6/1989 | Reid | 5,285,846 A | 2/1994 | Mohn |
| 4,848,460 A | 7/1989 | Johnson, Jr. et al. | 5,289,882 A | 3/1994 | Moore |
| 4,848,924 A | 7/1989 | Nuspl et al. | 5,295,763 A | 3/1994 | Stenborg et al. |
| 4,849,611 A | 7/1989 | Whitney et al. | 5,297,626 A | 3/1994 | Vinegar et al. |
| 4,852,648 A | 8/1989 | Akkerman et al. | 5,305,239 A | 4/1994 | Kinra |
| 4,856,341 A | 8/1989 | Vinegar et al. | 5,305,829 A | 4/1994 | Kumar |
| 4,856,587 A | 8/1989 | Nielson | 5,306,640 A | 4/1994 | Vinegar et al. |
| 4,860,544 A | 8/1989 | Krieg et al. | 5,316,664 A | 5/1994 | Gregoli et al. |
| 4,866,983 A | 9/1989 | Vinegar et al. | 5,318,116 A | 6/1994 | Vinegar et al. |
| 4,884,455 A | 12/1989 | Vinegar et al. | 5,332,036 A | 7/1994 | Shirley et al. |
| 4,885,080 A | 12/1989 | Brown et al. | 5,339,897 A * | 8/1994 | Leaute ...................... 166/245 |
| 4,886,118 A | 12/1989 | Van Meurs et al. | 5,339,904 A | 8/1994 | Jennings, Jr. |
| 4,893,504 A | 1/1990 | OMeara, Jr. et al. | 5,340,467 A | 8/1994 | Gregoli et al. |
| 4,895,206 A | 1/1990 | Price | 5,349,859 A | 9/1994 | Kleppe |
| 4,912,971 A | 4/1990 | Jeambey | 5,360,067 A | 11/1994 | Meo, III |
| 4,913,065 A | 4/1990 | Hemsath | 5,363,094 A | 11/1994 | Staron et al. |
| 4,926,941 A | 5/1990 | Glandt et al. | 5,366,012 A | 11/1994 | Lohbeck |
| 4,927,857 A | 5/1990 | McShea, III et al. | 5,377,756 A | 1/1995 | Northrop et al. |
| 4,928,765 A | 5/1990 | Nielson | 5,388,640 A | 2/1995 | Puri et al. |
| 4,974,425 A | 12/1990 | Krieg et al. | 5,388,641 A | 2/1995 | Yee et al. |
| 4,982,786 A | 1/1991 | Jennings, Jr. | 5,388,642 A | 2/1995 | Puri et al. |
| 4,983,319 A | 1/1991 | Gregoli et al. | 5,388,643 A | 2/1995 | Yee et al. |
| 4,984,594 A | 1/1991 | Vinegar et al. | 5,388,645 A | 2/1995 | Puri et al. |
| 4,985,313 A | 1/1991 | Penneck et al. | 5,391,291 A | 2/1995 | Winquist et al. |
| 4,987,368 A | 1/1991 | Vinegar | 5,392,854 A | 2/1995 | Vinegar et al. |
| 4,994,093 A | 2/1991 | Wetzel et al. | 5,404,952 A | 4/1995 | Vinegar et al. |
| 5,008,085 A | 4/1991 | Bain et al. | 5,409,071 A | 4/1995 | Wellington et al. |
| 5,011,329 A | 4/1991 | Nelson et al. | 5,411,086 A | 5/1995 | Burcham et al. |
| 5,020,596 A | 6/1991 | Hemsath | 5,411,089 A | 5/1995 | Vinegar et al. |
| 5,027,896 A | 7/1991 | Anderson | 5,411,104 A | 5/1995 | Stanley |
| 5,042,579 A | 8/1991 | Glandt et al. | 5,415,231 A | 5/1995 | Northrop et al. |
| 5,046,559 A | 9/1991 | Glandt | 5,431,224 A | 7/1995 | Laali |
| 5,050,386 A | 9/1991 | Krieg et al. | 5,433,271 A | 7/1995 | Vinegar et al. |
| 5,054,551 A | 10/1991 | Duerksen | 5,435,666 A | 7/1995 | Hassett et al. |
| 5,059,303 A | 10/1991 | Taylor et al. | 5,437,506 A | 8/1995 | Gray |
| 5,060,287 A | 10/1991 | Van Egmond | 5,439,054 A | 8/1995 | Chaback et al. |
| 5,060,726 A | 10/1991 | Glandt et al. | 5,454,666 A | 10/1995 | Chaback et al. |
| 5,064,006 A | 11/1991 | Waters et al. | 5,456,315 A * | 10/1995 | Kisman et al. ............... 166/245 |
| 5,065,501 A | 11/1991 | Henschen et al. | 5,458,774 A | 10/1995 | Mannapperuma |
| 5,065,818 A | 11/1991 | Van Egmond | 5,468,372 A | 11/1995 | Seamans et al. |
| 5,066,852 A | 11/1991 | Willbanks | 5,497,087 A | 3/1996 | Vinegar et al. |
| 5,070,533 A | 12/1991 | Bridges et al. | 5,498,960 A | 3/1996 | Vinegar et al. |
| 5,073,625 A | 12/1991 | Derbyshire | 5,512,732 A | 4/1996 | Yagnik et al. |
| 5,082,054 A | 1/1992 | Kiamanesh | 5,517,593 A | 5/1996 | Nenniger et al. |
| 5,082,055 A | 1/1992 | Hemsath | 5,525,322 A | 6/1996 | Willms |
| 5,085,276 A | 2/1992 | Rivas et al. | 5,541,517 A | 7/1996 | Hartmann et al. |
| 5,093,002 A | 3/1992 | Pasternak | 5,545,803 A | 8/1996 | Heath et al. |

| Patent | Kind | Date | Inventor |
|---|---|---|---|
| 5,553,189 | A | 9/1996 | Stegemeier et al. |
| 5,554,453 | A | 9/1996 | Steinfeld et al. |
| 5,566,755 | A | 10/1996 | Seidle et al. |
| 5,571,403 | A | 11/1996 | Scott et al. |
| 5,579,575 | A | 12/1996 | Lamome et al. |
| 5,621,844 | A | 4/1997 | Bridges |
| 5,621,845 | A | 4/1997 | Bridges et al. |
| 5,624,188 | A | 4/1997 | West |
| 5,632,336 | A | 5/1997 | Notz et al. |
| 5,648,305 | A | 7/1997 | Mansfield et al. |
| 5,652,389 | A | 7/1997 | Schaps et al. |
| 5,656,239 | A | 8/1997 | Stegemeier et al. |
| 5,688,736 | A | 11/1997 | Seamans et al. |
| 5,713,415 | A | 2/1998 | Bridges |
| 5,744,025 | A | 4/1998 | Boon et al. |
| 5,751,895 | A | 5/1998 | Bridges |
| 5,759,022 | A | 6/1998 | Koppang et al. |
| 5,760,307 | A | 6/1998 | Latimer et al. |
| 5,769,569 | A | 6/1998 | Hosseini |
| 5,777,229 | A | 7/1998 | Geier et al. |
| 5,782,301 | A | 7/1998 | Neuroth et al. |
| 5,823,256 | A | 10/1998 | Moore |
| 5,824,214 | A | 10/1998 | Paul et al. |
| 5,826,655 | A | 10/1998 | Snow et al. |
| 5,828,797 | A | 10/1998 | Minott et al. |
| 5,861,137 | A | 1/1999 | Edlund |
| 5,862,858 | A | 1/1999 | Wellington et al. |
| 5,868,202 | A | 2/1999 | Hsu |
| 5,899,269 | A | 5/1999 | Wellington et al. |
| 5,899,958 | A | 5/1999 | Dowell et al. |
| 5,911,898 | A | 6/1999 | Jacobs et al. |
| 5,926,437 | A | 7/1999 | Ortiz |
| 5,935,421 | A | 8/1999 | Brons et al. |
| 5,968,349 | A | 10/1999 | Duyvesteyn et al. |
| 5,984,010 | A | 11/1999 | Elias et al. |
| 5,984,582 | A | 11/1999 | Schwert |
| 5,985,138 | A | 11/1999 | Humphreys |
| 5,997,214 | A | 12/1999 | de Rouffignac et al. |
| 6,015,015 | A | 1/2000 | Luft et al. |
| 6,016,867 | A | 1/2000 | Gregoli et al. |
| 6,016,868 | A | 1/2000 | Gregoli et al. |
| 6,019,172 | A | 2/2000 | Wellington et al. |
| 6,023,554 | A | 2/2000 | Vinegar et al. |
| 6,026,914 | A | 2/2000 | Adams et al. |
| 6,035,701 | A | 3/2000 | Lowry et al. |
| 6,039,121 | A | 3/2000 | Kisman |
| 6,056,057 | A | 5/2000 | Vinegar et al. |
| 6,078,868 | A | 6/2000 | Dubinsky |
| 6,079,499 | A | 6/2000 | Mikus et al. |
| 6,084,826 | A | 7/2000 | Leggett, III |
| 6,085,512 | A | 7/2000 | Agee et al. |
| 6,088,294 | A | 7/2000 | Leggett, III et al. |
| 6,094,048 | A | 7/2000 | Vinegar et al. |
| 6,099,208 | A | 8/2000 | McAlister |
| 6,102,122 | A | 8/2000 | de Rouffignac |
| 6,102,137 | A | 8/2000 | Ward et al. |
| 6,102,622 | A | 8/2000 | Vinegar et al. |
| 6,110,358 | A | 8/2000 | Aldous et al. |
| 6,112,808 | A | 9/2000 | Isted |
| 6,152,987 | A | 11/2000 | Ma et al. |
| 6,155,117 | A | 12/2000 | Stevens et al. |
| 6,172,124 | B1 | 1/2001 | Wolflick et al. |
| 6,173,775 | B1 | 1/2001 | Elias et al. |
| 6,192,748 | B1 | 2/2001 | Miller |
| 6,193,010 | B1 | 2/2001 | Minto |
| 6,196,350 | B1 | 3/2001 | Minto |
| 6,218,333 | B1 | 4/2001 | Gabrielov et al. |
| 6,257,334 | B1 * | 7/2001 | Cyr et al. ............ 166/272.7 |
| 6,269,310 | B1 | 7/2001 | Washbourne |
| 6,288,372 | B1 | 9/2001 | Sandberg et al. |
| 6,290,841 | B1 | 9/2001 | Gabrielov et al. |
| 6,328,104 | B1 | 12/2001 | Graue |
| 6,353,706 | B1 | 3/2002 | Bridges |
| 6,354,373 | B1 | 3/2002 | Vercaemer et al. |
| 6,357,526 | B1 | 3/2002 | Abdel-Halim et al. |
| 6,388,947 | B1 | 5/2002 | Washbourne et al. |
| 6,412,559 | B1 | 7/2002 | Gunter et al. |
| 6,422,318 | B1 | 7/2002 | Rider |
| 6,427,124 | B1 | 7/2002 | Dubinsky et al. |
| 6,467,543 | B1 | 10/2002 | Talwani et al. |
| 6,485,232 | B1 | 11/2002 | Vinegar et al. |
| 6,499,536 | B1 | 12/2002 | Ellingsen |
| 6,540,018 | B1 | 4/2003 | Vinegar |
| 6,581,684 | B2 | 6/2003 | Wellington et al. |
| 6,584,406 | B1 | 6/2003 | Harmon et al. |
| 6,585,046 | B2 | 7/2003 | Neuroth et al. |
| 6,588,266 | B2 | 7/2003 | Tubel et al. |
| 6,588,503 | B2 | 7/2003 | Karanikas et al. |
| 6,588,504 | B2 | 7/2003 | Wellington et al. |
| 6,591,906 | B2 | 7/2003 | Wellington et al. |
| 6,591,907 | B2 | 7/2003 | Zhang et al. |
| 6,607,033 | B2 | 8/2003 | Wellington et al. |
| 6,609,570 | B2 | 8/2003 | Wellington et al. |
| 6,609,761 | B1 | 8/2003 | Ramey et al. |
| 6,679,332 | B2 | 1/2004 | Vinegar et al. |
| 6,684,948 | B1 | 2/2004 | Savage |
| 6,688,387 | B1 | 2/2004 | Wellington et al. |
| 6,698,515 | B2 | 3/2004 | Karanikas et al. |
| 6,702,016 | B2 | 3/2004 | de Rouffignac et al. |
| 6,708,758 | B2 | 3/2004 | de Rouffignac et al. |
| 6,712,135 | B2 | 3/2004 | Wellington et al. |
| 6,712,136 | B2 | 3/2004 | de Rouffignac et al. |
| 6,712,137 | B2 | 3/2004 | Vinegar et al. |
| 6,715,546 | B2 | 4/2004 | Vinegar et al. |
| 6,715,547 | B2 | 4/2004 | Vinegar et al. |
| 6,715,548 | B2 | 4/2004 | Wellington et al. |
| 6,715,549 | B2 | 4/2004 | Wellington et al. |
| 6,715,550 | B2 | 4/2004 | Vinegar et al. |
| 6,719,047 | B2 | 4/2004 | Fowler et al. |
| 6,722,429 | B2 | 4/2004 | de Rouffignac et al. |
| 6,722,430 | B2 | 4/2004 | Vinegar et al. |
| 6,722,431 | B2 | 4/2004 | Karanikas et al. |
| 6,725,920 | B2 | 4/2004 | Zhang et al. |
| 6,725,921 | B2 | 4/2004 | de Rouffignac et al. |
| 6,725,928 | B2 | 4/2004 | Vinegar et al. |
| 6,729,395 | B2 | 5/2004 | Shahin, Jr. et al. |
| 6,729,396 | B2 | 5/2004 | Vinegar et al. |
| 6,729,397 | B2 | 5/2004 | Zhang et al. |
| 6,729,401 | B2 | 5/2004 | Vinegar et al. |
| 6,732,794 | B2 | 5/2004 | Wellington et al. |
| 6,732,795 | B2 | 5/2004 | de Rouffignac et al. |
| 6,732,796 | B2 | 5/2004 | Vinegar et al. |
| 6,736,215 | B2 | 5/2004 | Maher et al. |
| 6,739,393 | B2 | 5/2004 | Vinegar et al. |
| 6,739,394 | B2 | 5/2004 | Vinegar et al. |
| 6,742,587 | B2 | 6/2004 | Vinegar et al. |
| 6,742,588 | B2 | 6/2004 | Wellington et al. |
| 6,742,589 | B2 | 6/2004 | Berchenko et al. |
| 6,742,593 | B2 | 6/2004 | Vinegar et al. |
| 6,745,831 | B2 | 6/2004 | de Rouffignac et al. |
| 6,745,832 | B2 | 6/2004 | Wellington et al. |
| 6,745,837 | B2 | 6/2004 | Wellington et al. |
| 6,749,021 | B2 | 6/2004 | Vinegar et al. |
| 6,752,210 | B2 | 6/2004 | de Rouffignac et al. |
| 6,758,268 | B2 | 7/2004 | Vinegar et al. |
| 6,759,364 | B2 | 7/2004 | Bhan et al. |
| 6,761,216 | B2 | 7/2004 | Vinegar et al. |
| 6,763,886 | B2 | 7/2004 | Schoeling et al. |
| 6,769,483 | B2 | 8/2004 | de Rouffignac et al. |
| 6,769,485 | B2 | 8/2004 | Vinegar et al. |
| 6,782,947 | B2 | 8/2004 | de Rouffignac et al. |
| 6,789,625 | B2 | 9/2004 | de Rouffignac et al. |
| 6,805,194 | B2 | 10/2004 | Davidson et al. |
| 6,805,195 | B2 | 10/2004 | Vinegar et al. |
| 6,820,688 | B2 | 11/2004 | Vinegar et al. |
| 6,821,501 | B2 | 11/2004 | Matzakos et al. |

| Patent Number | Date | Inventor |
|---|---|---|
| 6,854,534 B2 | 2/2005 | Livingstone |
| 6,854,929 B2 | 2/2005 | Vinegar et al. |
| 6,866,097 B2 | 3/2005 | Vinegar et al. |
| 6,871,707 B2 | 3/2005 | Karanikas et al. |
| 6,877,554 B2 | 4/2005 | Stegemeier et al. |
| 6,877,555 B2 | 4/2005 | Karanikas et al. |
| 6,880,633 B2 | 4/2005 | Wellington et al. |
| 6,880,635 B2 | 4/2005 | Vinegar et al. |
| 6,889,769 B2 | 5/2005 | Wellington et al. |
| 6,896,053 B2 | 5/2005 | Berchenko et al. |
| 6,902,003 B2 | 6/2005 | Maher et al. |
| 6,902,004 B2 | 6/2005 | de Rouffignac et al. |
| 6,910,536 B2 | 6/2005 | Wellington et al. |
| 6,913,078 B2 | 7/2005 | Shahin, Jr. et al. |
| 6,913,079 B2 | 7/2005 | Tubel |
| 6,915,850 B2 | 7/2005 | Vinegar et al. |
| 6,918,442 B2 | 7/2005 | Wellington et al. |
| 6,918,443 B2 | 7/2005 | Wellington et al. |
| 6,923,257 B2 | 8/2005 | Wellington et al. |
| 6,923,258 B2 | 8/2005 | Wellington et al. |
| 6,929,067 B2 | 8/2005 | Vinegar et al. |
| 6,942,032 B2 | 9/2005 | La Rovere et al. |
| 6,948,562 B2 | 9/2005 | Wellington et al. |
| 6,948,563 B2 | 9/2005 | Wellington et al. |
| 6,951,247 B2 | 10/2005 | de Rouffignac et al. |
| 6,953,087 B2 | 10/2005 | de Rouffignac et al. |
| 6,958,704 B2 | 10/2005 | Vinegar et al. |
| 6,959,761 B2 | 11/2005 | Berchenko et al. |
| 6,964,300 B2 | 11/2005 | Vinegar et al. |
| 6,966,372 B2 | 11/2005 | Wellington et al. |
| 6,966,374 B2 | 11/2005 | Vinegar et al. |
| 6,969,123 B2 | 11/2005 | Vinegar et al. |
| 6,973,967 B2 | 12/2005 | Stegemeier et al. |
| 6,981,548 B2 | 1/2006 | Wellington et al. |
| 6,981,553 B2 | 1/2006 | Stegemeier et al. |
| 6,991,032 B2 | 1/2006 | Berchenko et al. |
| 6,991,045 B2 | 1/2006 | Vinegar et al. |
| 6,994,160 B2 | 2/2006 | Wellington et al. |
| 6,994,168 B2 | 2/2006 | Wellington et al. |
| 6,994,169 B2 | 2/2006 | Zhang et al. |
| 6,997,255 B2 | 2/2006 | Wellington et al. |
| 6,997,518 B2 | 2/2006 | Vinegar et al. |
| 7,004,247 B2 | 2/2006 | Cole et al. |
| 7,004,251 B2 | 2/2006 | Ward et al. |
| 7,011,154 B2 | 3/2006 | Maher et al. |
| 7,032,660 B2 | 4/2006 | Vinegar et al. |
| 7,036,583 B2 | 5/2006 | de Rouffignac et al. |
| 7,040,397 B2 | 5/2006 | de Rouffignac et al. |
| 7,040,398 B2 | 5/2006 | Wellington et al. |
| 7,040,399 B2 | 5/2006 | Wellington et al. |
| 7,040,400 B2 | 5/2006 | de Rouffignac et al. |
| 7,055,600 B2 | 6/2006 | Messier et al. |
| 7,063,145 B2 | 6/2006 | Veenstra et al. |
| 7,066,254 B2 | 6/2006 | Vinegar et al. |
| 7,066,257 B2 | 6/2006 | Wellington et al. |
| 7,073,578 B2 | 7/2006 | Vinegar et al. |
| 7,077,198 B2 | 7/2006 | Vinegar et al. |
| 7,077,199 B2 | 7/2006 | Vinegar et al. |
| 7,086,465 B2 | 8/2006 | Wellington et al. |
| 7,086,468 B2 | 8/2006 | de Rouffignac et al. |
| 7,090,013 B2 | 8/2006 | Wellington et al. |
| 7,096,941 B2 | 8/2006 | de Rouffignac et al. |
| 7,096,942 B1 | 8/2006 | de Rouffignac et al. |
| 7,096,953 B2 | 8/2006 | de Rouffignac et al. |
| 7,100,994 B2 | 9/2006 | Vinegar et al. |
| 7,104,319 B2 | 9/2006 | Vinegar et al. |
| 7,114,566 B2 | 10/2006 | Vinegar et al. |
| 7,121,341 B2 | 10/2006 | Vinegar et al. |
| 7,121,342 B2 | 10/2006 | Vinegar et al. |
| 7,124,584 B1 | 10/2006 | Wetzel et al. |
| 7,128,153 B2 | 10/2006 | Vinegar et al. |
| 7,147,057 B2 | 12/2006 | Steele et al. |
| 7,147,059 B2 | 12/2006 | Hirsch et al. |
| 7,153,373 B2 | 12/2006 | Maziasz et al. |
| 7,156,176 B2 | 1/2007 | Vinegar et al. |
| 7,165,615 B2 | 1/2007 | Vinegar et al. |
| 7,170,424 B2 | 1/2007 | Vinegar et al. |
| 7,204,327 B2 | 4/2007 | Livingstone |
| 7,219,734 B2 | 5/2007 | Bai et al. |
| 7,225,866 B2 | 6/2007 | Berchenko et al. |
| 7,320,364 B2 | 1/2008 | Fairbanks |
| 7,357,180 B2 | 4/2008 | Vinegar et al. |
| 7,360,588 B2 | 4/2008 | Vinegar et al. |
| 7,383,877 B2 | 6/2008 | Vinegar et al. |
| 7,424,915 B2 | 9/2008 | Vinegar et al. |
| 7,431,076 B2 | 10/2008 | Sandberg et al. |
| 7,435,037 B2 | 10/2008 | McKinzie, II |
| 7,461,691 B2 | 12/2008 | Vinegar et al. |
| 2001/0049342 A1 | 12/2001 | Passey et al. |
| 2002/0027001 A1 | 3/2002 | Wellington et al. |
| 2002/0028070 A1 | 3/2002 | Holen |
| 2002/0033253 A1 | 3/2002 | de Rouffignac et al. |
| 2002/0035307 A1 | 3/2002 | Wellington et al. |
| 2002/0036089 A1 | 3/2002 | Vinegar et al. |
| 2002/0038069 A1 | 3/2002 | Wellington et al. |
| 2002/0040779 A1 | 4/2002 | Wellington et al. |
| 2002/0040780 A1 | 4/2002 | Wellington et al. |
| 2002/0040781 A1 | 4/2002 | Keedy et al. |
| 2002/0049360 A1 | 4/2002 | Wellington et al. |
| 2002/0053431 A1 | 5/2002 | Wellington et al. |
| 2002/0076212 A1 | 6/2002 | Zhang et al. |
| 2002/0112890 A1 | 8/2002 | Wentworth et al. |
| 2002/0112987 A1 | 8/2002 | Hou et al. |
| 2002/0153141 A1 | 10/2002 | Hartman et al. |
| 2003/0029617 A1 | 2/2003 | Brown et al. |
| 2003/0038734 A1 | 2/2003 | Hirsch et al. |
| 2003/0079877 A1 | 5/2003 | Wellington et al. |
| 2003/0085034 A1 | 5/2003 | Wellington et al. |
| 2003/0098149 A1* | 5/2003 | Wellington et al. ............ 166/52 |
| 2003/0131989 A1 | 7/2003 | Zakiewicz |
| 2003/0146002 A1 | 8/2003 | Vinegar et al. |
| 2003/0155111 A1* | 8/2003 | Vinegar et al. ................ 166/59 |
| 2003/0157380 A1 | 8/2003 | Assarabowski et al. |
| 2003/0196789 A1 | 10/2003 | Wellington et al. |
| 2003/0201098 A1 | 10/2003 | Karanikas et al. |
| 2004/0035582 A1 | 2/2004 | Zupanick |
| 2004/0140095 A1* | 7/2004 | Vinegar et al. ............... 166/302 |
| 2004/0140096 A1 | 7/2004 | Sandberg et al. |
| 2004/0144540 A1 | 7/2004 | Sandberg et al. |
| 2004/0144541 A1 | 7/2004 | Picha et al. |
| 2004/0146288 A1 | 7/2004 | Vinegar et al. |
| 2005/0006097 A1 | 1/2005 | Sandberg et al. |
| 2005/0072567 A1* | 4/2005 | Steele et al. .............. 166/272.3 |
| 2005/0133405 A1 | 6/2005 | Wellington et al. |
| 2005/0133414 A1 | 6/2005 | Bhan et al. |
| 2005/0231022 A1 | 10/2005 | Brown et al. |
| 2005/0269077 A1 | 12/2005 | Sandberg |
| 2005/0269088 A1 | 12/2005 | Vinegar et al. |
| 2005/0269089 A1 | 12/2005 | Sandberg et al. |
| 2005/0269090 A1 | 12/2005 | Vinegar et al. |
| 2005/0269091 A1 | 12/2005 | Pastor-Sanz et al. |
| 2005/0269092 A1 | 12/2005 | Vinegar |
| 2005/0269093 A1 | 12/2005 | Sandberg et al. |
| 2005/0269094 A1 | 12/2005 | Harris |
| 2005/0269095 A1 | 12/2005 | Fairbanks |
| 2005/0269313 A1 | 12/2005 | Vinegar et al. |
| 2006/0005968 A1 | 1/2006 | Vinegar et al. |
| 2006/0178546 A1 | 8/2006 | Mo et al. |
| 2006/0191820 A1 | 8/2006 | Mo et al. |
| 2006/0213657 A1 | 9/2006 | Berchenko et al. |
| 2006/0289536 A1 | 12/2006 | Vinegar et al. |
| 2007/0045265 A1* | 3/2007 | McKinzie ................... 219/207 |
| 2007/0045266 A1 | 3/2007 | Sandberg et al. |
| 2007/0045267 A1 | 3/2007 | Vinegar et al. |
| 2007/0045268 A1 | 3/2007 | Vinegar et al. |
| 2007/0095536 A1 | 5/2007 | Vinegar et al. |

| | | | |
|---|---|---|---|
| 2007/0095537 | A1 | 5/2007 | Vinegar et al. |
| 2007/0108200 | A1 | 5/2007 | McKinzie et al. |
| 2007/0108201 | A1 | 5/2007 | Vinegar et al. |
| 2007/0119098 | A1 | 5/2007 | Diaz et al. |
| 2007/0125533 | A1 | 6/2007 | Minderhoud et al. |
| 2007/0127897 | A1 | 6/2007 | John et al. |
| 2007/0131411 | A1 | 6/2007 | Vinegar et al. |
| 2007/0131415 | A1 | 6/2007 | Vinegar et al. |
| 2007/0131419 | A1 | 6/2007 | Roes et al. |
| 2007/0131420 | A1 | 6/2007 | Mo et al. |
| 2007/0131428 | A1 | 6/2007 | den Boestert et al. |
| 2007/0246994 | A1 | 10/2007 | Kaminsky et al. |
| 2008/0128134 | A1 | 6/2008 | Mudunuri et al. |
| 2008/0135244 | A1 | 6/2008 | Miller et al. |
| 2008/0135253 | A1 | 6/2008 | Vinegar et al. |
| 2008/0135254 | A1 | 6/2008 | Vinegar et al. |
| 2008/0142216 | A1 | 6/2008 | Vinegar et al. |
| 2008/0142217 | A1 | 6/2008 | Pietersen et al. |
| 2008/0173442 | A1 | 7/2008 | Vinegar et al. |
| 2008/0173444 | A1 | 7/2008 | Stone et al. |
| 2008/0173449 | A1 | 7/2008 | Fowler |
| 2008/0174115 | A1 | 7/2008 | Lambirth |
| 2008/0185147 | A1 | 8/2008 | Vinegar et al. |
| 2008/0216321 | A1 | 9/2008 | Vinegar et al. |
| 2008/0217003 | A1 | 9/2008 | Kuhlman et al. |
| 2008/0217004 | A1 | 9/2008 | de Rouffinac et al. |
| 2008/0217015 | A1 | 9/2008 | Vinegar et al. |
| 2008/0217016 | A1 | 9/2008 | Stegemeier et al. |
| 2008/0217321 | A1 | 9/2008 | Vinegar et al. |
| 2008/0236831 | A1 | 10/2008 | Hsu et al. |
| 2008/0277113 | A1 | 11/2008 | Stegemeier et al. |
| 2008/0283241 | A1 | 11/2008 | Kaminsky et al. |
| 2008/0283246 | A1 | 11/2008 | Karanikas et al. |
| 2009/0014180 | A1 | 1/2009 | Stegemeier et al. |
| 2009/0014181 | A1 | 1/2009 | Vinegar et al. |

FOREIGN PATENT DOCUMENTS

| | | |
|---|---|---|
| CA | 1165361 | 4/1984 |
| CA | 1168283 | 5/1984 |
| CA | 1196594 | 11/1985 |
| CA | 1253555 | 5/1989 |
| CA | 1288043 | 8/1991 |
| CA | 2015460 | 10/1991 |
| EP | 107927 | 5/1984 |
| EP | 130671 | 9/1985 |
| EP | 0940558 | 9/1999 |
| GB | 156396 | 1/1921 |
| GB | 674082 | 7/1950 |
| GB | 697189 | 9/1953 |
| GB | 1010023 | 11/1965 |
| GB | 1204405 | 9/1970 |
| GB | 1454324 | 11/1976 |
| SE | 121737 | 5/1948 |
| SE | 123136 | 11/1948 |
| SE | 123137 | 11/1948 |
| SE | 123138 | 11/1948 |
| SE | 126674 | 11/1949 |
| SU | 1836876 | 12/1990 |
| WO | 9506093 | 3/1995 |
| WO | 97/07321 | 2/1997 |
| WO | 97/23924 | 7/1997 |
| WO | 98/50179 | 11/1998 |
| WO | 9850179 | 11/1998 |
| WO | 9901640 | 1/1999 |
| WO | 00/19061 | 4/2000 |
| WO | 0181505 | 11/2001 |
| WO | 0181723 | 11/2001 |
| WO | 2007098370 | 8/2007 |
| WO | 2008048448 | 4/2008 |

OTHER PUBLICATIONS

Co-pending U.S. Appl. No. 11/975,713 entitled "Heating Tar Sands Formations While Controlling Pressure" filed Oct. 20, 2007; available in PAIR.

Co-pending U.S. Appl. No. 11/975,688 entitled "Heating Hydrocarbon Containing Formations in a Line Drive Staged" filed Oct. 20, 2007; available in PAIR.

Co-pending U.S. Appl. No. 11/975,691 entitled "Heating Hydrocarbon Containing Formations in a Checkerboard Pattern Staged Process" filed Oct. 20, 2007; available in PAIR.

Co-pending U.S. Appl. No. 11/975,701 entitled "Heating Hydrocarbon Containing Formations in a Spriral Startup Staged Sequence" filed Oct. 20, 2007; available in PAIR.

Co-pending U.S. Appl. No. 11/975,679 entitled "Moving Hydrocarbons Through Portions of Tar Sands Formations" filed Oct. 20, 2007; available in PAIR.

Co-pending U.S. Appl. No. 11/975,700 entitled "Treating Tar Sands Formations With Karsted Zones" filed Oct. 20, 2007; available in PAIR.

Co-pending U.S. Appl. No. 11/975,677 entitled "Treating Tar Sands Formations With Dolomite" to Vinegar et al., filed Oct. 20, 2007; available in PAIR.

Co-pending U.S. Appl. No. 11/975,689 entitled "Creating and Maintaining a Gas Cap in Tar Sands Formations" to Stegemeier et al., filed Oct. 20, 2007; available in PAIR.

Co-pending U.S. Appl. No. 11/975,738 entitled "Creating Fluid Injectivity in Tar Sands Formations" filed Oct. 20, 2007; available in PAIR.

Co-pending U.S. Appl. No. 11/975,712 entitled "Producing Drive Fluid in Situ in Tar Sands Formations" filed Oct. 20, 2007; available in PAIR.

Co-pending U.S. Appl. No. 11/975,690 entitled "In Situ Heat Treatment Process Utilizing a Closed Loop Heating System" filed Oct. 20, 2007; available in PAIR.

Co-pending U.S. Appl. No. 11/975,724 entitled "In Situ Heat Treatment Process Utilizing Oxidizers to Heat a Subsurface Formation" filed Oct. 20, 2007; available in PAIR.

U.S. Patent and Trademark Office, "Office Communication," for U.S. Appl. No. 11/409,556 mailed Mar. 18, 2008; available in PAIR.

"Refining Processes 2000", Hydrocarbon Processing, Gulf Publishing Co. pp. 87-142de Product filed Apr. 7, 2006.

A228. Some Effects of Pressure on Oil-Shale Retorting, Society of Petroleum Engineers Journal, J.H. Bae, Sep. 1969; pp. 287-292.

A229. New in situ shale-oil recovery process uses hot natural gas; The Oil & Gas Journal; May 16, 1966, p. 151.

A230. Evaluation of Downhole Electric Impedance Heating Systems for Paraffin Control in Oil Wells; Industry Applications Society 37th Annual Petroleum and Chemical Industry Conference; The Institute of Electrical and Electronics Engineers Inc., Bosch et al., Sep. 1990, pp. 223-227.

A231. New System Stops Paraffin Build-up; Petroleum Engineer, Eastlund et al., Jan. 1989, (3 pages).

A232. Oil Shale Retorting: Effects of Particle Size and Heating Rate on Oil Evolution and Intraparticle Oil Degradation; Campbell et al. In Situ 2(1), 1978, pp. 1-47.

A235. Molecular Mechanism of Oil Shale Pyrolysis in Nitrogen and Hydrogen Atmospheres, Hershkowitz et al.; Geochemistry and Chemistry of Oil Shales, American Chemical Society, May 1983 pp. 301-316.

A236. The Characteristics of a Low Temperature in Situ Shale Oil; George Richard Hill & Paul Dougan, Quarterly of the Colorado School of Mines, 1967; pp. 75-90.

A237. Direct Production Of A Low Pour Point High Gravity Shale Oil; Hill et al., I & EC Product Research and Development, 6(1), Mar. 1967; pp. 52-59.

A239. The Benefits of In Situ Upgrading Reactions to the Integrated Operations of the Orinoco Heavy-Oil Fields and Downstream Facilities, Myron Kuhlman, Society of Petroleum Engineers, Jun. 2000; pp. 1-14.

A240. Monitoring Oil Shael Retorts by Off-Gas Alkene/Alkane Ratios, John H. Raley. Fuel, vol. 59, Jun. 1980, pp. 419-424.
A241. The Shale Oil Question, Old and New Viewpoints, A Lecture in the Engineering Science Academy, Dr. Fredrik Ljungstrom, Feb. 23, 1950, published in Teknisk Trdskrift, Jan. 1951 p. 33-40.
A242. Underground Shale Oil Pyrolysis According to the Ljungstrom Method; Svenska Skifferolje Aktiebolaget (Sewdish Shale Oil Corp.), IVA, vol. 24, 1953, No. 3, pp. 118-123.
A243. Kinetics of Low-Temperature Pyrolysis of Oil Shale by the IITRI RF Process, Sresty et al.; 15th Oil Shale Symposium, Colorado School of Mines, Apr. 1982 pp. 1-13.
A245. Application of a Microretort to Problems in Shale Pyrolysis, A. W. Weitkamp & L.C. Gutberlet, Ind. Eng. Chem. Process Des. Develop. vol. 9, No. 3, 1970, pp. 386-395.
A246. Oil Shale, Yen et al., Developments in Petroleum Science 5, 1976, pp. 187-189, 197-198.
A247. The Composition of Green River Shale Oils, Glenn L. Cook, et al., United Nations Symposium on the Development and Utilization of Oil Shale Resources, 1968, pp. 1-23.
A248. High-Pressure Pyrolysis of Green River Oil Shale, Burnham et al., Geochemistry and Chemistry of Oil Shales, American Chemical Society, 1983, pp. 335-351.
A249. Geochemistry and Pyrolysis of Oil Shales, Tissot et al., Geochemistry and Chemistry of Oil Shales, American Chemical Society, 1983, pp. 1-11.
A250. A Possible Mechanism of Alkene/Alkane Production, Burnham et al., Oil Shale, Tar Sands, and Related Materials, American Chemical Society, 1981, pp. 79-92.
A251. The Ljungstroem In-Situ Method of Shale Oil Recovery, G. Salomonsson, Oil Shale and Cannel Coal, vol. 2, Proceedings of the Second Oil Shale and Cannel Coal Conference, Institute of Petroleum, 1951, London, pp. 260-280.
A252. Developments in Technology for Green River Oil Shale, G.U. Dinneen, United Nations Symposium on the Development and Utilization of Oil Shale Resources, Laramie Petroleum Research Center, Bureau of Mines, 1968, pp. 1-20.
A253. The Thermal and Structural Properties of a Hanna Basin Coal, R.E. Glass, Transactions of the ASME, vol. 106, Jun. 1984, pp. 266-271.
A256. On the Mechanism of Kerogen Pyrolysis, Alan K. Burnham & James A. Happe, Jan. 10, 1984 (17 pages).
A257 Comparison of Methods for Measuring Kerogen Pyrolysis Rates and Fitting Kinetic Parameters, Burnham et al., Mar. 23, 1987, (29 pages).
A258 Further Comparison of Methods for Measuring Kerogen Pyrolysis Rates and Fitting Kinetic Parameters, Burnham et al., Sep. 1987, (16 pages).
A293 Shale Oil Cracking Kinetics and Diagnostics, Bissell et al., Nov. 1983, (27 pages).
A294 Mathematical Modeling of Modified In Situ and Aboveground Oil Shale Retorting, Robert L. Braun, Jan. 1981 (45 pages).
A295 Progress Report on Computer Model for In Situ Oil Shale Retorting, R.L. Braun & R.C.Y. Chin, Jul. 14, 1977 (34 pages).
A297 Chemical Kinetics and Oil Shale Progress Design, Alan K. Burnham, Jul. 1993 (16 pages).
A298 Reaction Kinetics and Diagnostics For Oil Shale Retorting, Alan K. Burnham, Oct. 19, 1981 (32 pages).
A299 Reaction Kinetics Between Steam and Oil Shale Char, A.K. Burnham, Oct. 1978 (8 pages).
A300 General Kinetic Model of Oil Shale Pyrolysis, Alan K. Burnham & Robert L. Braun, Dec. 1984 (25 pages).
A303 Reaction Kinetics Between CO2 and Oil Shale Char, A.K. Burnham, Mar. 22, 1978 (18 pages).
A304 Reaction Kinetics Between CO2 and Oil Shale Residual Carbon. I. Effect of Heating Rate on Reactivity, Alan K. Burnham, Jul. 11, 1978 (22 pages).
A305 High-Pressure Pyrolysis of Colorado Oil Shale, Alan K. Burnham & Mary F. Singleton, Oct. 1982 (23 pages).
A306 A Possible Mechanism Of Alkene/Alkane Production in Oil Shale Retorting, A.K. Burnham, R.L. Ward, Nov. 26, 1980 (20 pages).
A307 Enthalpy Relations For Eastern Oil Shale, David W. Camp, Nov. 1987 (13 pages).

A308 Oil Shale Retorting: Part 3 A Correlation of Shale Oil 1-Alkene/n-Alkane Ratios With Yield, Coburn et al., Aug. 1, 1977 (18 pages).
A309 The Composition of Green River Shale Oil, Glen L. Cook, et al., 1968 (12 pages).
A311 Thermal Degradation of Green River Kerogen at 150o to 350o C Rate of Production Formation, J.J. Cummins & W.E. Robinson, 1972 (18 pages).
A312 Retorting of Green River Oil Shale Under High-Pressure Hydrogen Atmospheres, LaRue et al., Jun. 1977 (38 pages).
A313 Retorting and Combustion Processes in Surface Oil-Shale Retorts, A.E. Lewis & R.L. Braun, May 2, 1980 (12 pages).
A314 Oil Shale Retorting Processes: A Technical Overview, Lewis et al., Mar. 1984 (18 pages).
A315 Study of Gas Evolution During Oil Shale Pyrolysis by TQMS, Oh et al., Feb. 1988 (10 pages).
A316 The Permittivity and Electrical Conductivity of Oil Shale, A.J. Piwinskii & A. Duba, Apr. 28, 1975 (12 pages).
A317 Oil Degradation During Oil Shale Retorting, J.H. Raley & R.L. Braun, May 24, 1976 (14 pages).
A318 Kinetic Analysis of California Oil Shale By Programmed Temperature Microphyrolysis, John. G. Reynolds & Alan K. Burnham, Dec. 9, 1991 (14 pages).
A319 Analysis of Oil Shale and Petroleum Source Rock Pyrolysis by Triple Quadrupole Mass Spectrometry: Comparisons of Gas Evolution at the Heating Rate of 10o C/Min., Reynolds et al. Oct. 5, 1990 (57 pages).
A321 Fluidized-Bed Pyrolysis of Oil Shale, J.H. Richardson & E.B. Huss, Oct. 1981 (27 pages).
A322 Retorting Kinetics for Oil Shale From Fluidized-Bed Pyrolysis, Richardson et al., Dec. 1981 (30 pages).
A323 Recent Experimental Developments in Retorting Oil Shale at the Lawrence Livermore Laboratory, Albert J. Rothman, Aug. 1978 (32 pages).
A324 The Lawrence Livermore Laboratory Oil Shale Retorts, Sandholtz et al. Sep. 18, 1978 (30 pages).
A325 Operating Laboratory Oil Shale Retorts In An In-Situ Mode, W. A. Sandholtz et al., Aug. 18, 1977 (16 pages).
A326 Some Relationships of Thermal Effects to Rubble-Bed Structure and Gas-Flow Patterns in Oil Shale Retorts, W. A. Sandholtz, Mar. 1980 (19 pages).
A327 Assay Products from Green River Oil Shale, Singleton et al., Feb. 18, 1986 (213 pages).
A328 Biomarkers in Oil Shale: Occurrence and Applications, Singleton et al., Oct. 1982 (28 pages).
A329 Occurrence of Biomarkers in Green River Shale Oil, Singleton et al., Mar. 1983 (29 pages).
A330 An Instrumentation Proposal for Retorts in the Demonstration Phase of Oil Shale Development, Clyde J. Sisemore, Apr. 19, 1977, (34 pages).
A302 Pyrolysis Kinetics for Green River Oil Shale From the Saline Zone, Burnham et al., Feb. 1982 (33 pages).
A332 SO2 Emissions from the Oxidation of Retorted Oil Shale, Taylor et al., Nov. 1981 (9 pages).
A333 Nitric Oxide (NO) Reduction by Retorted Oil Shale, R.W. Taylor & C.J. Morris, Oct. 1983 (16 pages).
A334 Coproduction of Oil and Electric Power from Colorado Oil Shale, P. Henrik Wallman, Sep. 24, 1991 (20 pages).
A335 13C NMR Studies of Shale Oil, Raymond L. Ward & Alan K. Burnham, Aug. 1982 (22 pages).
A336 Identification by 13C NMR of Carbon Types in Shale Oil and their Relationship to Pyrolysis Conditions, Raymond L. Ward & Alan K. Burnham, Sep. 1983 (27 pages).
A337 A Laboratory Study of Green River Oil Shale Retorting Under Pressure In a Nitrogen Atmosphere, Wise et al., Sep. 1976 (24 pages).
A338 Quantitative Analysis and Evolution of Sulfur-Containing Gases from Oil Shale Pyrolysis by Triple Quadrupole Mass Spectrometry, Wong et al., Nov. 1983 (34 pages).
A339 Quantitative Analysis & Kinetics of Trace Sulfur Gas Species from Oil Shale Pyrolysis by Triple Quadrupole Mass Spectrometry (TQMS), Wong et al., Jul. 5-7, 1983 (34 pages).

A340 Application of Self-Adaptive Detector System on a Triple Quadrupole MS/MS to High Expolsives and Sulfur-Containing Pyrolysis Gases from Oil Shale, Carla M. Wong & Richard W. Crawford, Oct. 1983 (17 pages).

A341 An Evaluation of Triple Quadrupole MS/MS for On-Line Gas Analyses of Trace Sulfur Compounds from Oil Shale Processing, Wong et al., Jan. 1985 (30 pages).

A301 General Model of Oil Shale Pyrolysis, Alan K. Burnham & Robert L. Braun, Nov. 1983 (22 pages).

C106 In Situ Measurement of Some Thermoporoelastic Parameters of a Granite, Berchenko et al., Poromechanics, A Tribute to Maurice Biot, 1998, p. 545-550.

D10 Tar and Pitch, G. Collin and H. Hoeke. Ullmann's Encyclopedia of Industrial Chemistry, vol. A 26, 1995, p. 91-127.

E12 Cortez et al., UK Patent Application GB 2,068,014 A, Date of Publication: Aug. 5, 1981.

E13 Wellington et al., U.S. Appl. No. 60/273,354, filed Mar. 5, 2001.

G9 Geology for Petroleum Exploration, Drilling, and Production. Hyne, Norman J. McGraw-Hill Book Company, 1984, p. 264.

T02 Burnham, Alan, K. "Oil Shale Retorting Dependence of timing and composition on temperature and heating rate", Jan. 27, 1995, (23 pages).

T04 Campbell, et al., "Kinetics of oil generation from Colorado Oil Shale" IPC Business Press, Fuel, 1978, (3 pages).

PCT "International Search Report and Written Opinion" for International Application No. PCT/US2006/041183, mailed Mar. 9, 2007; 7 pages.

AA19 Bosch et al. "Evaluation of Downhole Electric Impedance Heating Systems for Paraffin Control in Oil Wells," IEEE Transactions on Industrial Applications, 1991, vol. 28; pp. 190-194.

AA20 McGee et al. "Electrical Heating with Horizontal Wells, The heat Transfer Problem," "International Conference on Horizontal Well Technology, Calgary, Alberta Canada, 1996; 14 pages".

T07 Hill et al., "The Characteristics of a Low Temperature in situ Shale Oil" American Institute of Mining, Metallurgical & Petroleum Engineers, 1967 (pp. 75-90).

T13 SSAB report, "A Brief Description of the Ljungstrom Method for Shale Oil Production," 1950, (12 pages).

T14 Salomonsson G., SSAB report, The Lungstrom in Situ-Method for Shale Oil Recovery, 1950 (28 pages).

T15 "Swedish shale oil-Production method in Sweden," Organisation for European Economic Co-operation, 1952, (70 pages).

T16 SSAB report, "Kvarn Torp" 1958, (36 pages).

T17 SSAB report, "Kvarn Torp" 1951 (35 pages).

T19 Vogel et al. "An Analog Computer for Studying Heat Transfrer during a Thermal Recovery Process," AIME Petroleum Transactions, 1955 (pp. 205-212).

T20 "Skiferolja Genom Uppvarmning Av Skifferberget," Faxin Department och Namder, 1941, (3 pages).

T22 Ronnby, E. "KVARNTORP-Sveriges Storsta skifferoljeindustri," 1943, (9 pages).

T23 SAAB report, "The Swedish Shale Oil Industry," 1948 (8 pages).

T24 Gejrot et al., "The Shale Oil Industry in Sweden," Carlo Colombo Publishers-Rome, Proceedings of the Fourth World Petroleum Congress, 1955 (8 pages).

T25 Hedback, T. J., the Swedish Shale as Raw Material for Production of Power, Oil and Gas, XIth Sectional Meeting World Power Conference, 1957 (9 pages).

T26 SAAB, "Santa Cruz, California, Field Test of the Lins Method for the Recovery of Oil from Sand", 1955 vol. 1, (141 pages) English.

T27 SAAB, "Santa Cruz, California, Field Test of the Lins Method for the Recovery of Oil from Sand-Figures", 1955 vol. 2, (146 pages) English.

T28 "Santa Cruz, California, Field Test of the Lins Method for the Recovery of Oil from Sand-Memorandum re: tests", 1955 vol. 3, (256 pages) English.

T29 Helander, R.E., "Santa Cruz, California, Field Test of Carbon Steel Burner Casings for the Lins Method of Oil Recovery", 1959 (38 pages) English.

T30 Helander et al., Santa Cruz, California, Field Test of Fluidized Bed Burners for the Lins Method of Oil Recovery 1959, (86 pages) English.

T31 SSAB report, "Bradford Residual Oil, Athabasa Ft. McMurray" 1951, (207 pages), partial translation.

T32 "Lins Burner Test Results-English" 1959-1960.

T37 SSAB report, "Assessment of Future Mining Alternatives of Shale and Dolomite," 1962, (59 pages) Swedish.

T40 SAAB report, "Swedish Geological Survey Report, Plan to Delineate Oil shale Resource in Narkes Area (near Kvarntorp)," 1941 (13 pages). Swedish.

T41 SAAB report, "Recovery Efficiency," 1941, (61 pages). Swedish.

T42 SAAB report, "Geologic Work Conducted to Assess Possibility of Expanding Shale Mining Area in Kvarntorp; Drilling Results, Seismic Results," 1942 (79 pages). Swedish.

T43 SSAB report, "Ojematinigar vid Norrtorp," 1945 (141 pages).

T44 SSAB report, "Inhopplingschema, Norrtorp II 20/3-17/8", 1945 (50 pages). Swedish.

T45 SSAB report, "Secondary Recovery after LINS," 1945 (78 pages).

T46 SSAB report, "Maps and Diagrams, Geology," 1947 (137 pages). Swedish.

T47 SSAB report, "Styrehseprotoholl," 1943 (10 pages). Swedish.

T48 SSAB report, "Early Shale Retorting Trials" 1951-1952, (134 pages). Swedish.

T49 SSAB report, " Analysis of Lujunstrom Oil and its Use as Liquid Fuel," Thesis by E. Pals, 1949 (83 pages). Swedish.

T50 SSAB report, "Environmental Sulphur and Effect on Vegetation," 1951 (50 pages). Swedish.

T51 SSAB report, "Tar Sands", vol. 135 1953 (20 pages, pp. 12-15 translated). Swedish.

T52 SSAB report, "Assessment of Skanes Area (Southern Sweden) Shales as Fuel Source," 1954 (54 pages). Swedish.

T53 SSAB report, "From as Utre Dn Text Geology Reserves," 1960 (93 pages). Swedish.

T54 SSAB report, "Kvarntorps-Environmental Area Asessment," 1981 (50 pages). Swedish.

AA21 "IEEE Recommended Practice for Electrical Impedance, Induction, and Skin Effect Heating on Pipelines and Vessels," IEEE Std. 844-200, 2000; 6 pages.

T33 SSAB "Annual Reports, SSAB Laboratory, Address Annually Issues-Shale and Ash, Oil, Gas, Waste Water, Analytical," 1953-1954, 166 pages. (Swedish).

T36 SSAB report, "Cost Comparison of Mining and Processing of Shale and Dolomite Using Various Production Alternatives", 1960; 64 pages. (Swedish).

U.S. Patent and Trademark Office, "Office Communication," for U.S. Appl. No. 11/975,701 mailed Jan. 27, 2009; available in PAIR.

U.S. Patent and Trademark Office, "Office Communication," for U.S. Appl. No. 11/788,859 mailed Dec. 16, 2008; available in PAIR.

U.S. Patent and Trademark Office, "Office Communication," for U.S. Appl. No. 11/975,713 mailed Jan. 15, 2009; available in PAIR.

U.S. Patent and Trademark Office, Office Communication for U.S. Appl. No. 11/975,691; available in PAIR.

PCT "International Search Report and Written Opinion" for International Application No. PCT/US07/81901, mailed , Jun. 3, 2008; 9 pages.

PCT "International Search Report and Written Opinion" for International Application No. PCT/US07/81904, mailed , Jun. 3, 2008; 9 pages.

PCT "International Search Report and Written Opinion" for International Application No. PCT/US06/40971, mailed , Jul. 23, 2008; 9 pages.

PCT "International Search Report and Written Opinion" for International Application No. PCT/US06/15142, mailed , Jul. 21, 2008; 10 pages.

PCT "International Search Report and Written Opinion" for International Application No. PCT/US07/81910, mailed , Aug. 7, 2008; 8 pages.

PCT "International Search Report and Written Opinion" for International Application No. PCT/US08/60750, mailed , Aug. 18, 2008; 7 pages.

PCT "International Search Report and Written Opinion" for International Application No. PCT/US07/09741, mailed , Aug. 28, 2008; 12 pages.

PCT "International Search Report and Written Opinion" for International Application No. PCT/US07/81890, mailed , Sep. 2, 2008; 11 pages.

PCT "International Search Report and Written Opinion" for International Application No. PCT/US07/81905, mailed, Aug. 27, 2008; 9 pages.

PCT "International Search Report and Written Opinion" for International Application No. PCT/US07/22376, mailed, Aug. 22, 2008; 10 pages.

PCT "International Search Report and Written Opinion" for International Application No. PCT/US08/60757, mailed, Aug. 22, 2008; 7 pages.

PCT "International Search Report and Written Opinion" for International Application No. PCT/US08/60754, mailed, Aug. 21, 2008; 7 pages.

PCT "International Search Report and Written Opinion" for International Application No. PCT/US08/60748, mailed, Aug. 22, 2008; 7 pages.

PCT "International Search Report and Written Opinion" for International Application No. PCT/US08/60746, mailed, Jul. 18, 2008; 7 pages.

Moreno, James B., et al., Sandia National Laboratories, "Methods and Energy Sources for Heating Subsurface Geological Formations, Task 1: Heat Delivery Systems," Nov. 20, 2002, pp. 1-166.

* cited by examiner

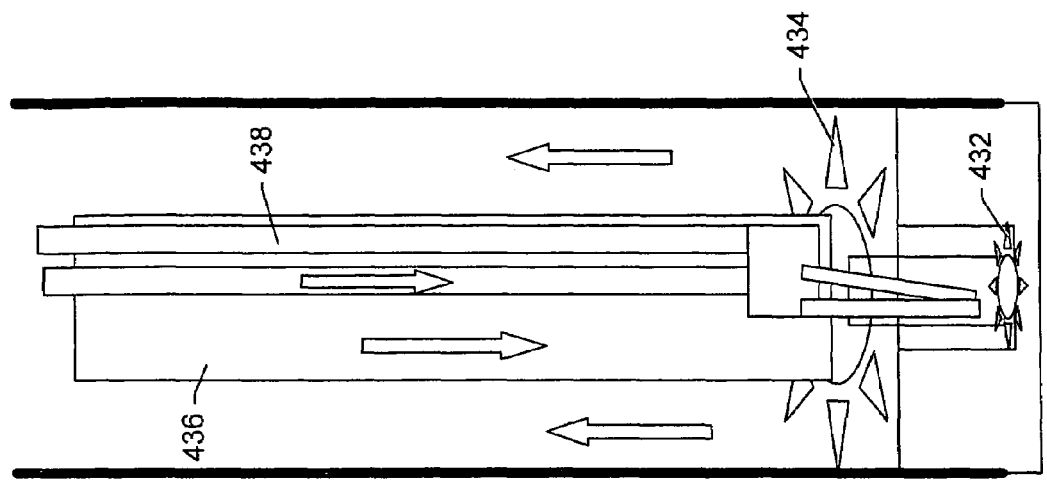
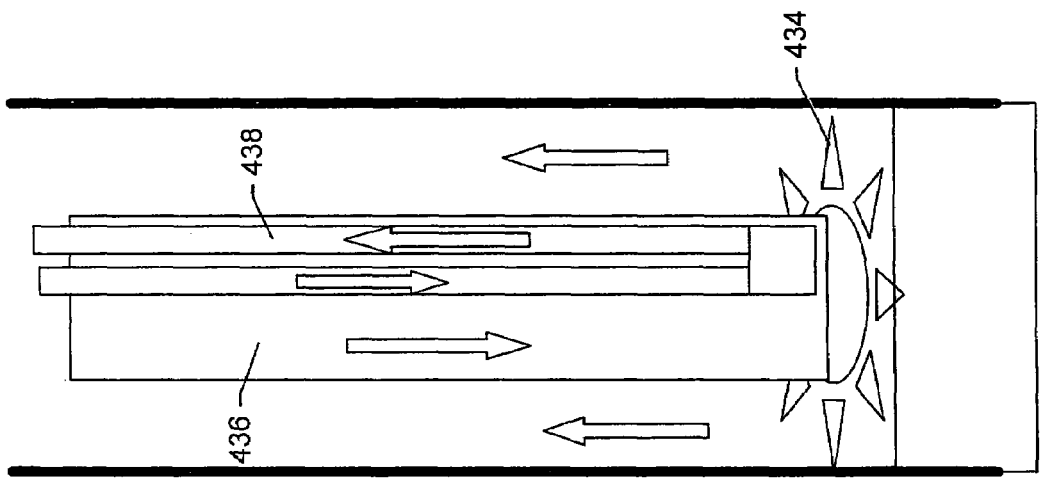
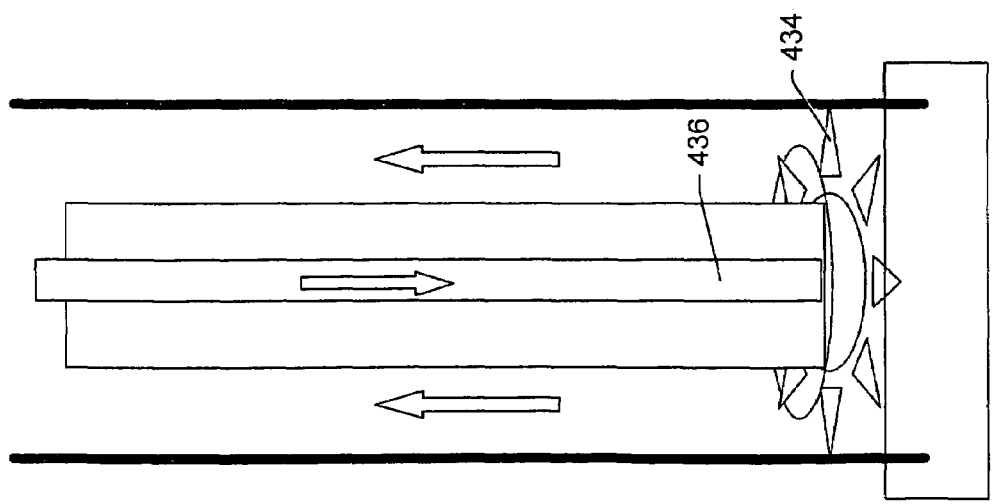

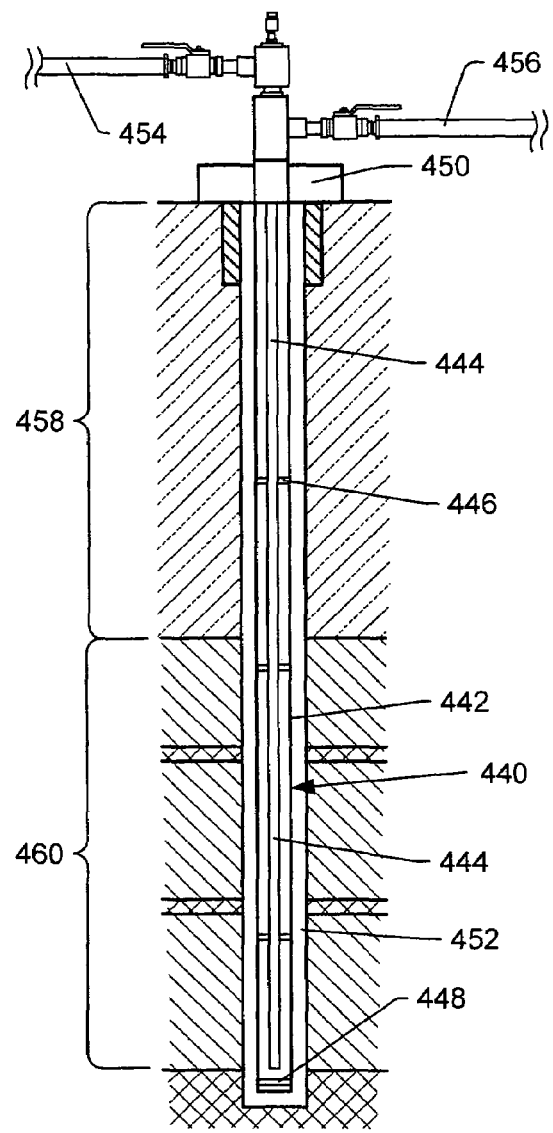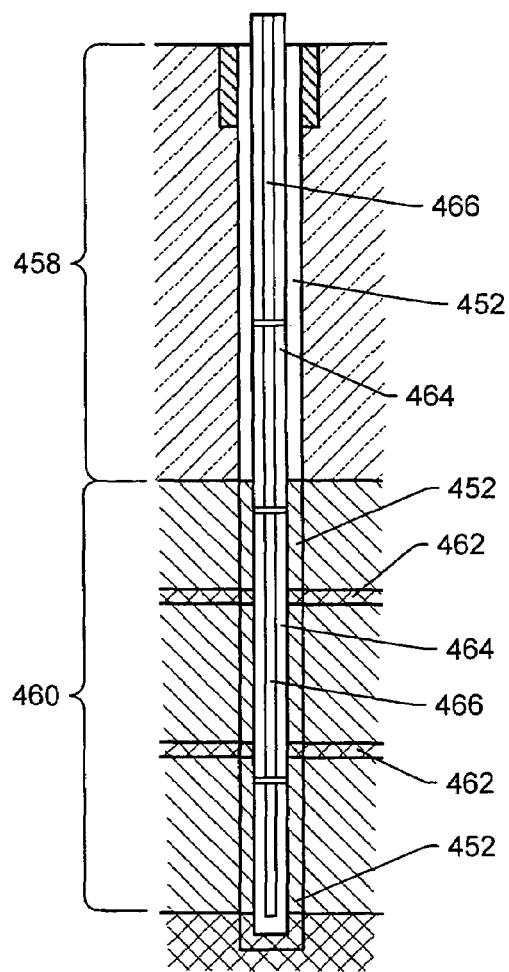
FIG. 17
FIG. 18A

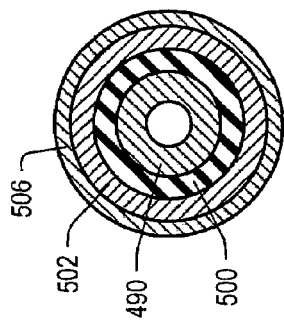
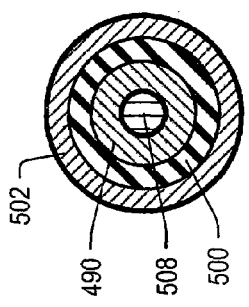
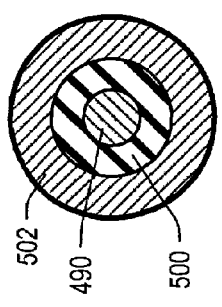
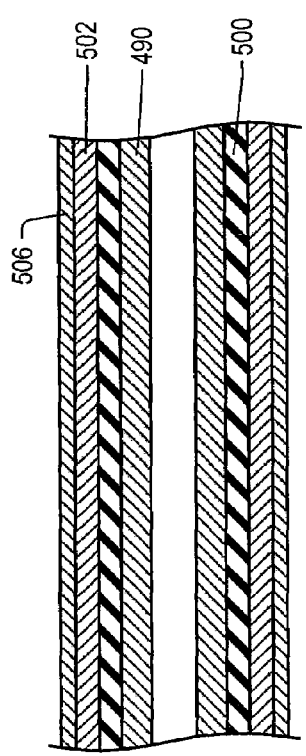
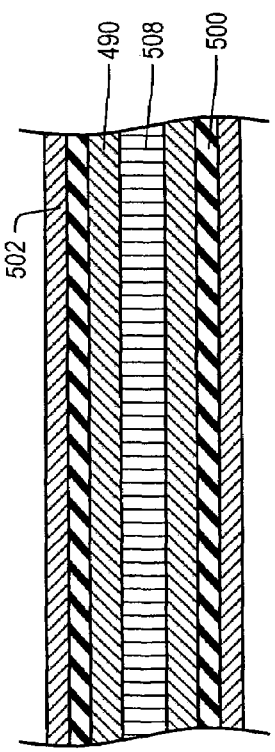
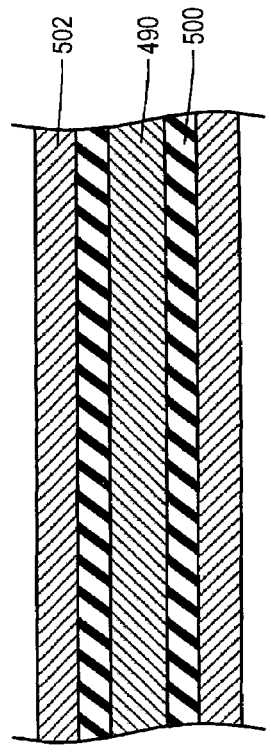

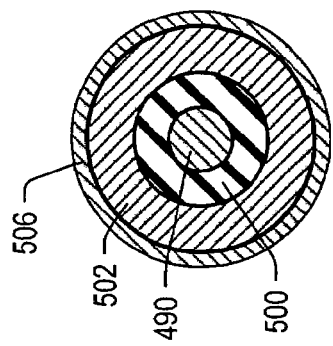
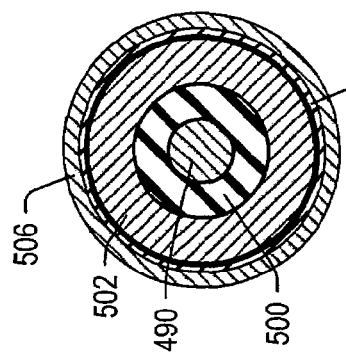
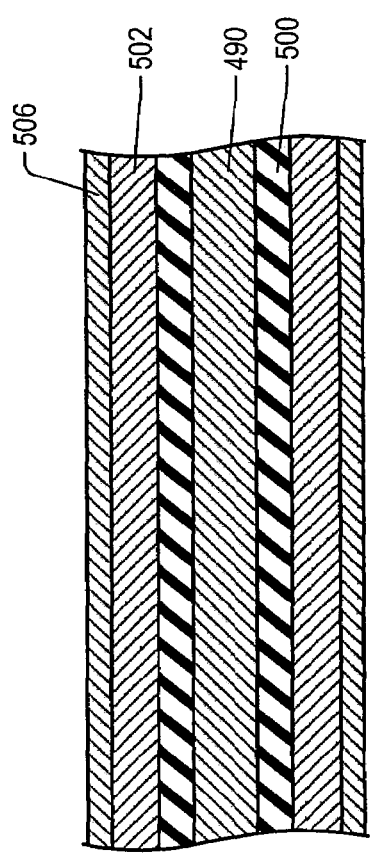
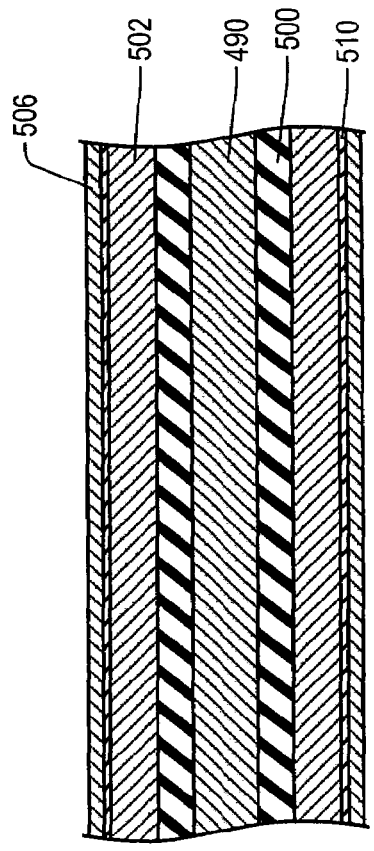

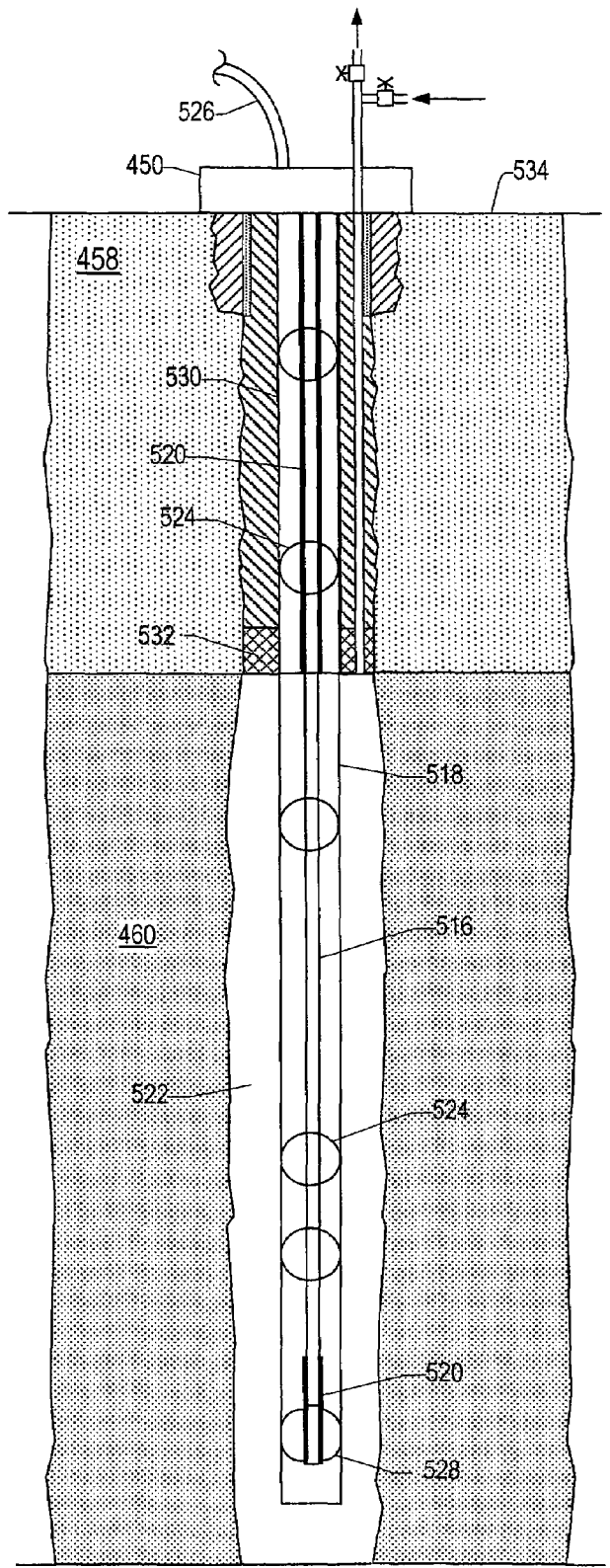
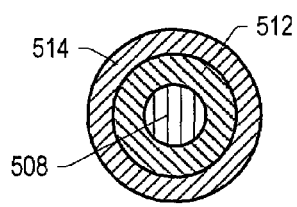
FIG. 33
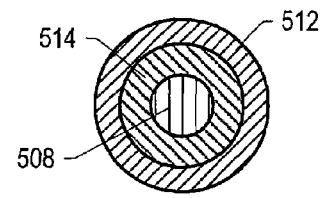
FIG. 34
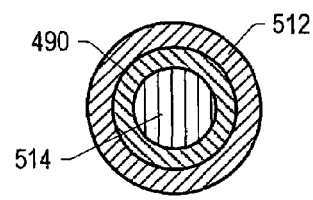
FIG. 35
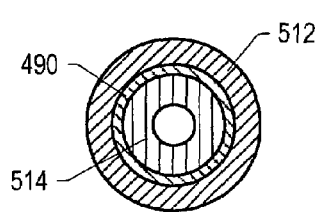
FIG. 36
FIG. 37

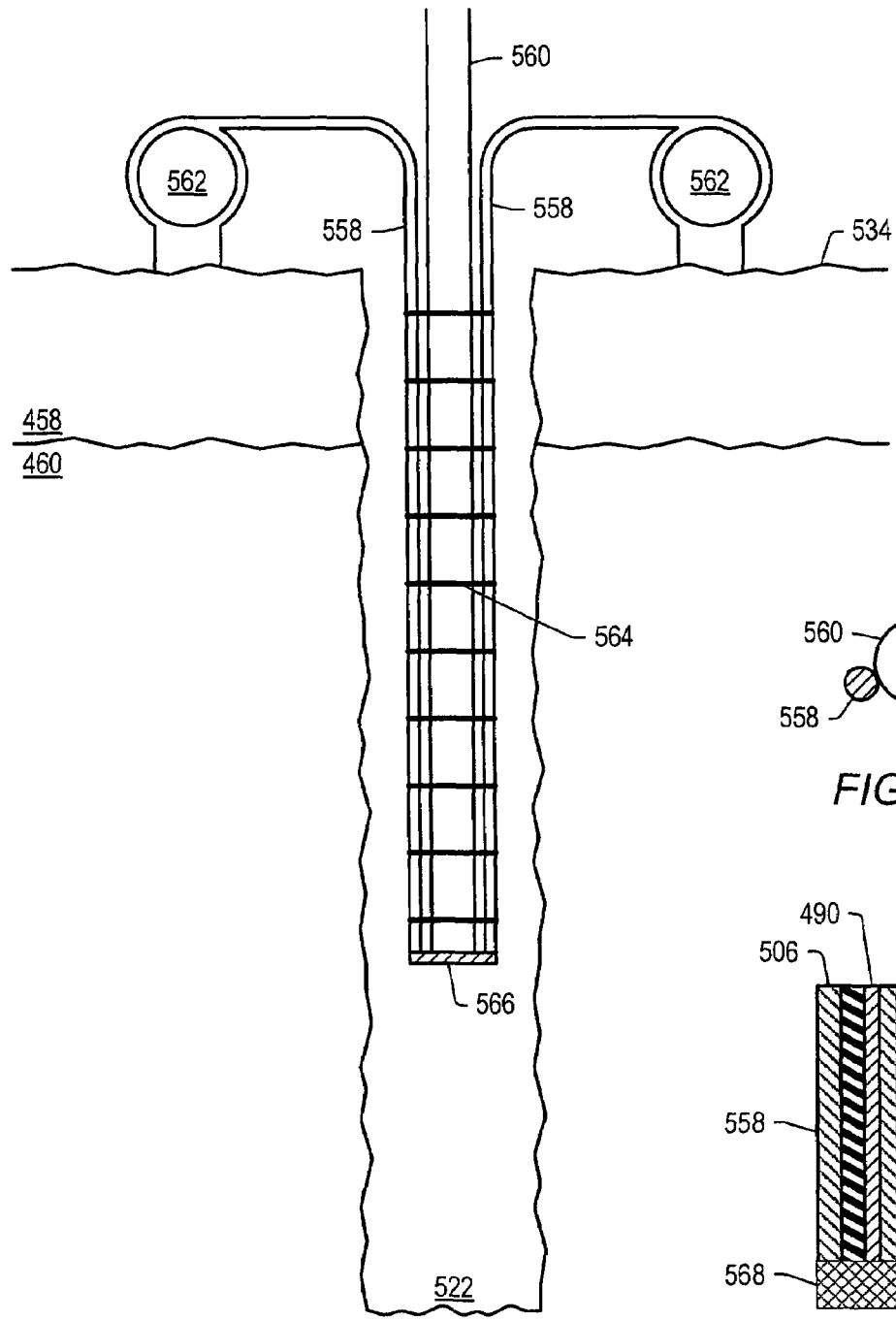
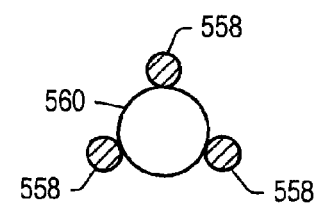
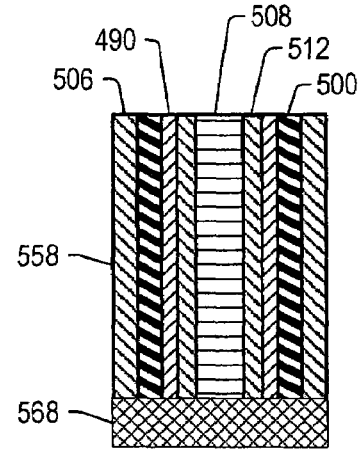
FIG. 52A
FIG. 52B
FIG. 52C

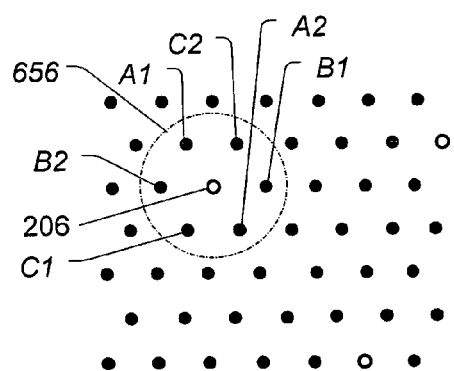
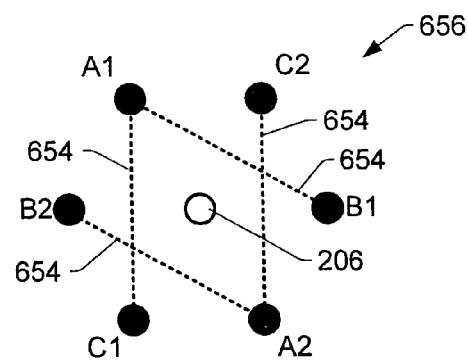
FIG. 69      FIG. 70
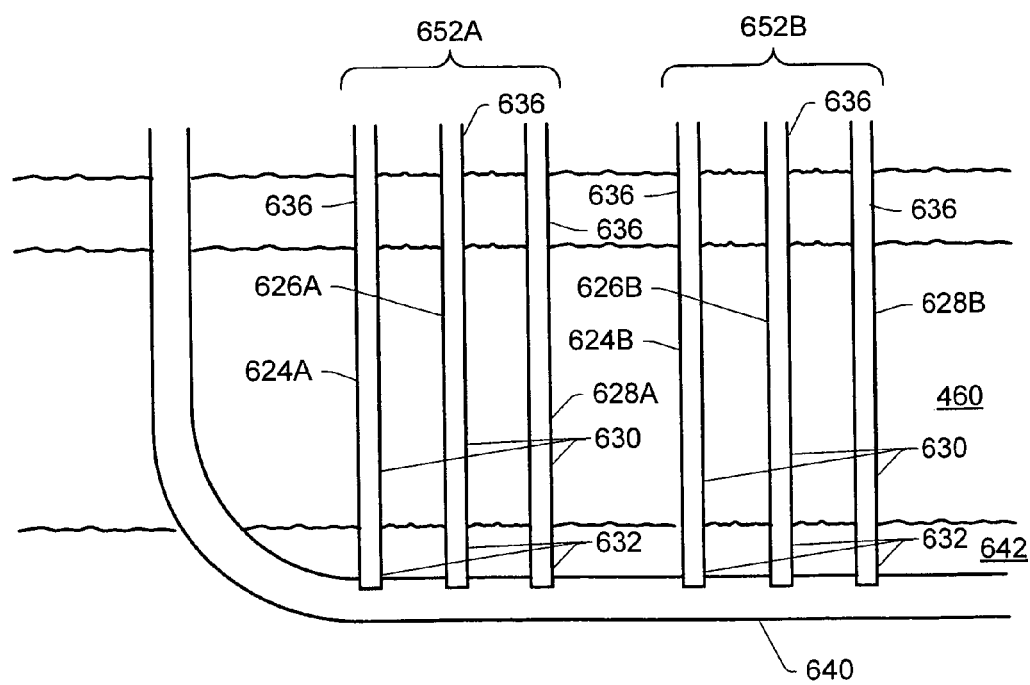
FIG. 71

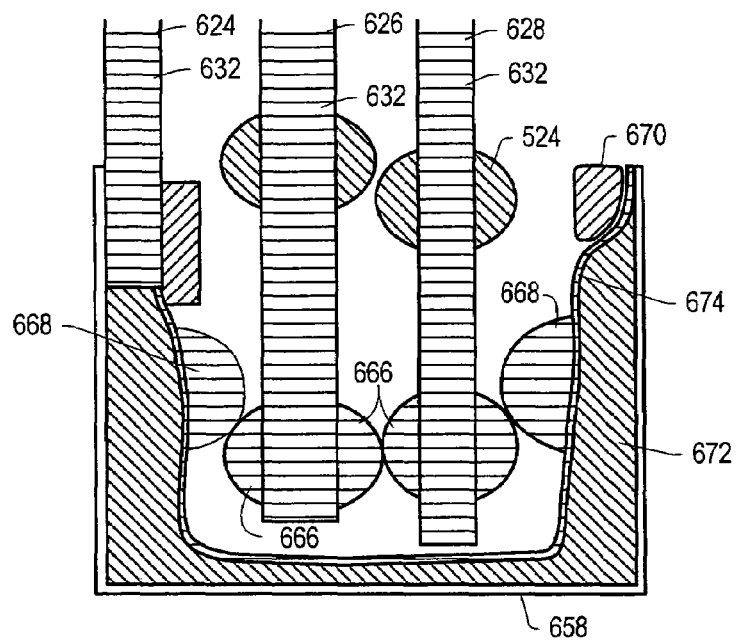
FIG. 75
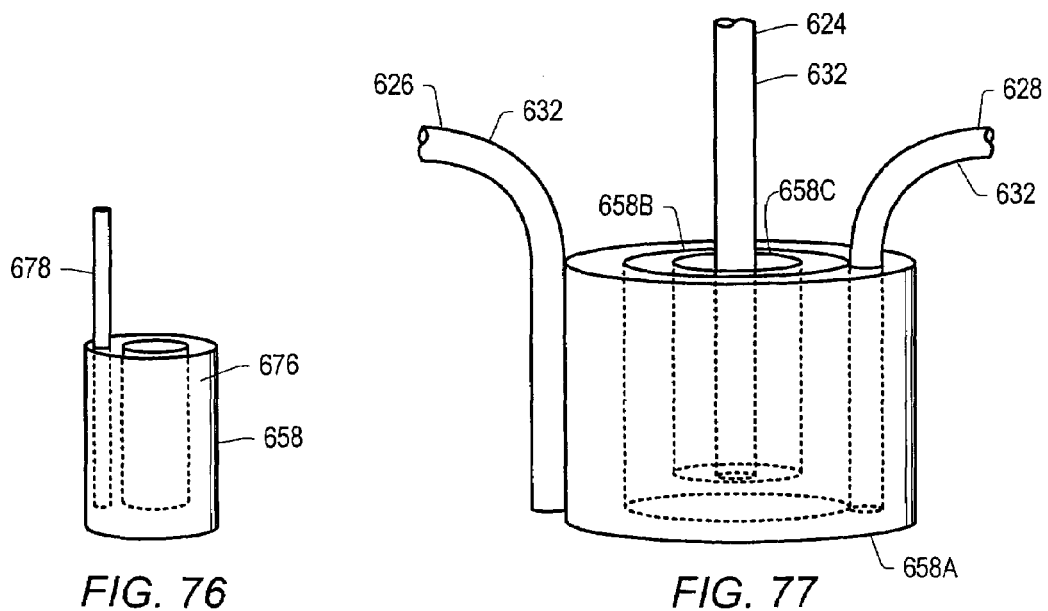
FIG. 76
FIG. 77

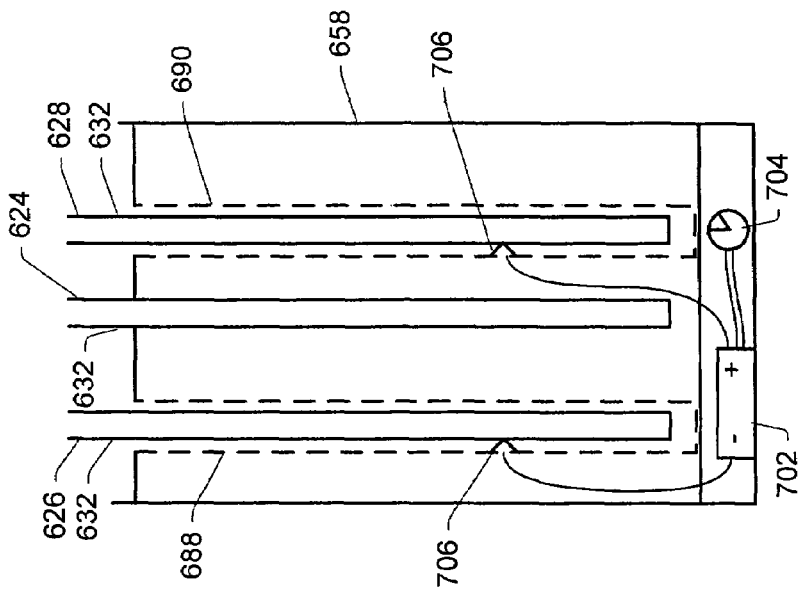
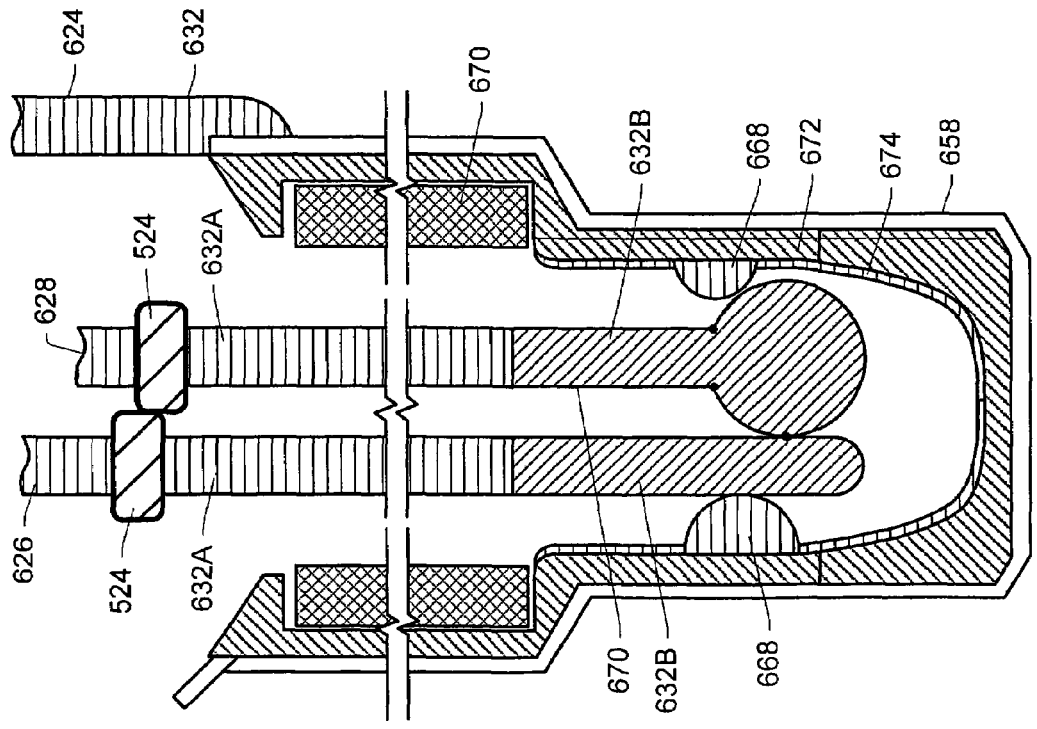

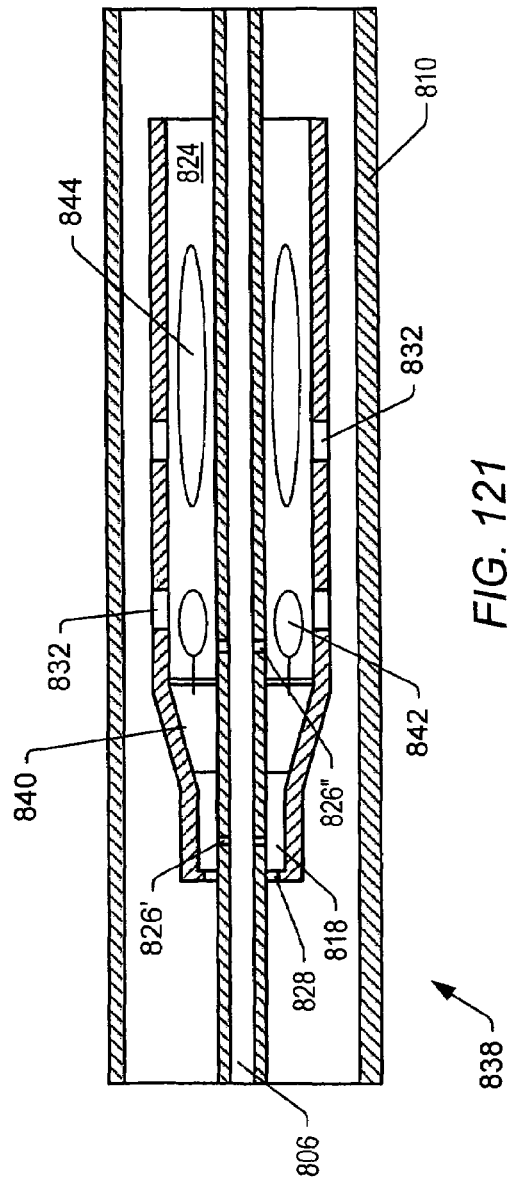
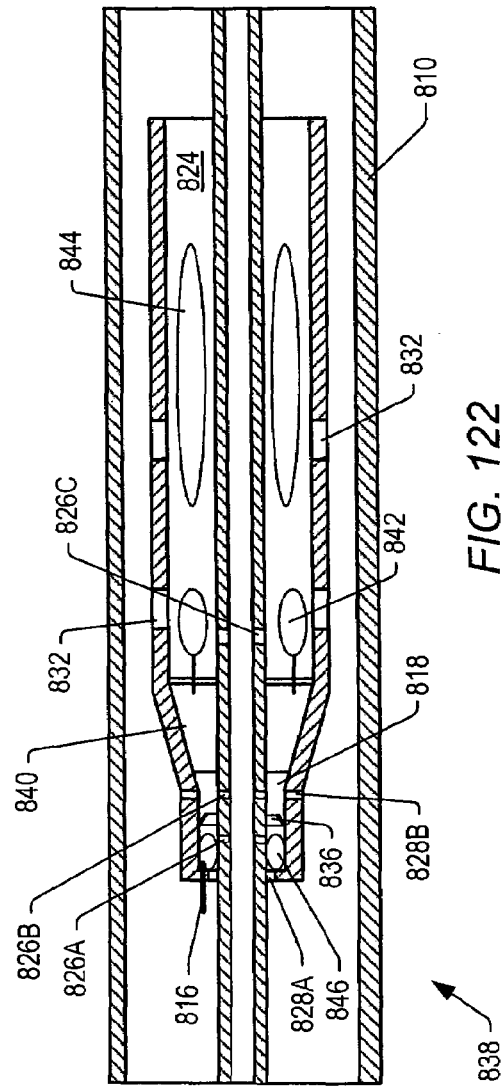

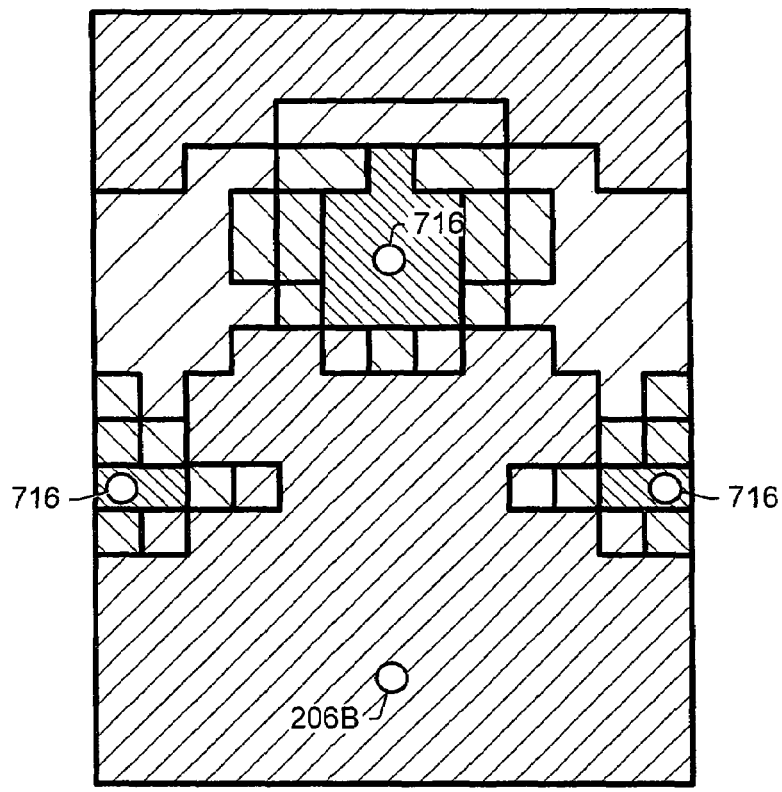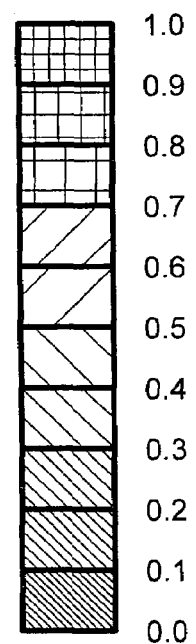
FIG. 216
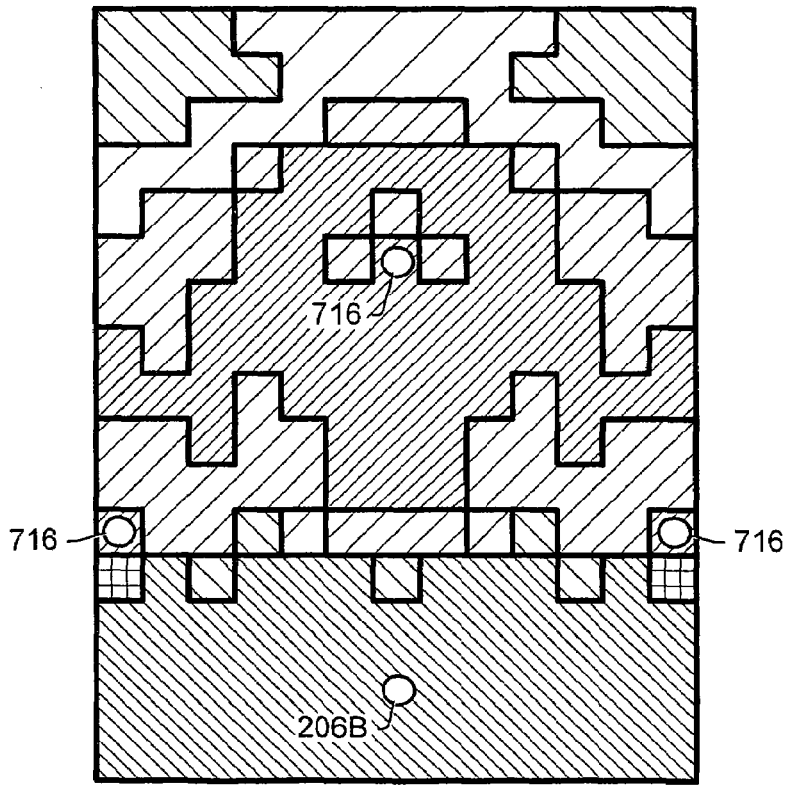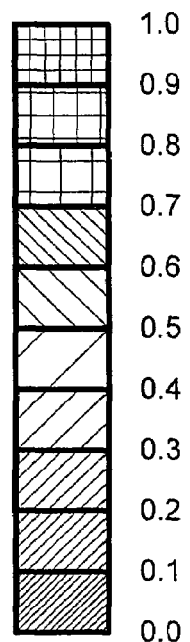
FIG. 217

SYSTEMS AND METHODS FOR PRODUCING HYDROCARBONS FROM TAR SANDS FORMATIONS

PRIORITY CLAIM

This patent application claims priority to U.S. Provisional Patent No. 60/729,763 entitled "SYSTEMS AND PROCESSES FOR USE IN TREATING SUBSURFACE FORMATIONS" to Vinegar et al. filed on Oct. 24, 2005; and to U.S. Provisional Patent No. 60/794,298 entitled "SYSTEMS AND PROCESSES FOR USE IN TREATING SUBSURFACE FORMATIONS" to Vinegar et al. filed on Apr. 21, 2006.

RELATED PATENTS

This patent application incorporates by reference in its entirety each of U.S. Pat. No. 6,688,387 to Wellington et al.; U.S. Pat. No. 6,991,036 to Sumnu-Dindoruk et al.; U.S. Pat. No. 6,698,515 to Karanikas et al.; U.S. Pat. No. 6,880,633 to Wellington et al.; U.S. Pat. No. 6,782,947 to de Rouffignac et al; U.S. Pat. No. 6,991,045 to Vinegar et al.; U.S. Pat. No. 7,073,578 to Vinegar et al.; and U.S. Pat. No. 7,121,342 to Vinegar et al. This patent application incorporates by reference in its entirety U.S. Patent Application Publication 2005-0269313 to Vinegar et al. This patent application incorporates by reference in its entirety U.S. patent application Ser. No. 11/409,558 to Vinegar et al.

GOVERNMENT INTEREST

The Government has certain rights in this invention pursuant to Agreement No. ERD-05-2516 between UT-Battelle, LLC, operating under prime contract No. DE-ACO5-00OR22725 for the US Department of Energy and Shell Exploration and Production Company.

BACKGROUND

1. Field of the Invention

The present invention relates generally to methods and systems for production of hydrocarbons, hydrogen, and/or other products from various subsurface formations such as hydrocarbon containing formations. Certain embodiments relate to producing hydrocarbons from tar sands formations.

2. Description of Related Art

Hydrocarbons obtained from subterranean formations are often used as energy resources, as feedstocks, and as consumer products. Concerns over depletion of available hydrocarbon resources and concerns over declining overall quality of produced hydrocarbons have led to development of processes for more efficient recovery, processing and/or use of available hydrocarbon resources. In situ processes may be used to remove hydrocarbon materials from subterranean formations. Chemical and/or physical properties of hydrocarbon material in a subterranean formation may need to be changed to allow hydrocarbon material to be more easily removed from the subterranean formation. The chemical and physical changes may include in situ reactions that produce removable fluids, composition changes, solubility changes, density changes, phase changes, and/or viscosity changes of the hydrocarbon material in the formation. A fluid may be, but is not limited to, a gas, a liquid, an emulsion, a slurry, and/or a stream of solid particles that has flow characteristics similar to liquid flow.

A wellbore may be formed in a formation. In some embodiments wellbores may be formed using reverse circulation drilling methods. Reverse circulation methods are suggested, for example, in published U.S. Patent Application Publication No. 2004-0079553 to Livingstone, and U.S. Pat. No. 6,854,534 to Livingstone; U.S. Pat. No. 6,892,829 to Livingstone, U.S. Pat. No. 7,090,018 to Livingstone; and U.S. Pat. No. 4,823,890 to Lang, the disclosures of which are incorporated herein by reference. Reverse circulation methods generally involve circulating a drilling fluid to a drilling bit through an annulus between concentric tubulars to the borehole in the vicinity of the drill bit, and then through openings in the drill bit and to the surface through the center of the concentric tubulars, with cuttings from the drilling being carried to the surface with the drilling fluid rising through the center tubular. A wiper or shroud may be provided above the drill bit and above a point where the drilling fluid exits the annulus to prevent the drilling fluid from mixing with formation fluids. The drilling fluids may be, but is not limited to, air, water, brines and/or conventional drilling fluids.

In some embodiments, a casing or other pipe system may be placed or formed in a wellbore. U.S. Pat. No. 4,572,299 issued to Van Egmond et al., which is incorporated by reference as if fully set forth herein, describes spooling an electric heater into a well. In some embodiments, components of a piping system may be welded together. Quality of formed wells may be monitored by various techniques. In some embodiments, quality of welds may be inspected by a hybrid electromagnetic acoustic transmission technique known as EMAT. EMAT is described in U.S. Pat. No. 5,652,389 to Schaps et al.; U.S. Pat. No. 5,760,307 to Latimer et al.; U.S. Pat. No. 5,777,229 to Geier et al.; and U.S. Pat. No. 6,155,117 to Stevens et al., each of which is incorporated by reference as if fully set forth herein.

In some embodiments, an expandable tubular may be used in a wellbore. Expandable tubulars are described in U.S. Pat. No. 5,366,012 to Lohbeck, and U.S. Pat. No. 6,354,373 to Vercaemer et al., each of which is incorporated by reference as if fully set forth herein.

Heaters may be placed in wellbores to heat a formation during an in situ process. Examples of in situ processes utilizing downhole heaters are illustrated in U.S. Pat. No. 2,634,961 to Ljungstrom; U.S. Pat. No. 2,732,195 to Ljungstrom; U.S. Pat. No. 2,780,450 to Ljungstrom; U.S. Pat. No. 2,789,805 to Ljungstrom; U.S. Pat. No. 2,923,535 to Ljungstrom; and U.S. Pat. No. 4,886,118 to Van Meurs et al.; each of which is incorporated by reference as if fully set forth herein.

Application of heat to oil shale formations is described in U.S. Pat. No. 2,923,535 to Ljungstrom and U.S. Pat. No. 4,886,118 to Van Meurs et al. Heat may be applied to the oil shale formation to pyrolyze kerogen in the oil shale formation. The heat may also fracture the formation to increase permeability of the formation. The increased permeability may allow formation fluid to travel to a production well where the fluid is removed from the oil shale formation. In some processes disclosed by Ljungstrom, for example, an oxygen containing gaseous medium is introduced to a permeable stratum, preferably while still hot from a preheating step, to initiate combustion.

A heat source may be used to heat a subterranean formation. Electric heaters may be used to heat the subterranean formation by radiation and/or conduction. An electric heater may resistively heat an element. U.S. Pat. No. 2,548,360 to Germain, which is incorporated by reference as if fully set forth herein, describes an electric heating element placed in a viscous oil in a wellbore. The heater element heats and thins the oil to allow the oil to be pumped from the wellbore. U.S.

Pat. No. 4,716,960 to Eastlund et al., which is incorporated by reference as if fully set forth herein, describes electrically heating tubing of a petroleum well by passing a relatively low voltage current through the tubing to prevent formation of solids. U.S. Pat. No. 5,065,818 to Van Egmond, which is incorporated by reference as if fully set forth herein, describes an electric heating element that is cemented into a well borehole without a casing surrounding the heating element.

U.S. Pat. No. 6,023,554 to Vinegar et al., which is incorporated by reference as if fully set forth herein, describes an electric heating element that is positioned in a casing. The heating element generates radiant energy that heats the casing. A granular solid fill material may be placed between the casing and the formation. The casing may conductively heat the fill material, which in turn conductively heats the formation.

U.S. Pat. No. 4,570,715 to Van Meurs et al., which is incorporated by reference as if fully set forth herein, describes an electric heating element. The heating element has an electrically conductive core, a surrounding layer of insulating material, and a surrounding metallic sheath. The conductive core may have a relatively low resistance at high temperatures. The insulating material may have electrical resistance, compressive strength, and heat conductivity properties that are relatively high at high temperatures. The insulating layer may inhibit arcing from the core to the metallic sheath. The metallic sheath may have tensile strength and creep resistance properties that are relatively high at high temperatures.

U.S. Pat. No. 5,060,287 to Van Egmond, which is incorporated by reference as if fully set forth herein, describes an electrical heating element having a copper-nickel alloy core.

Obtaining permeability in an oil shale formation between injection and production wells tends to be difficult because oil shale is often substantially impermeable. Many methods have attempted to link injection and production wells. These methods include: hydraulic fracturing such as methods investigated by Dow Chemical and Laramie Energy Research Center; electrical fracturing by methods investigated by Laramie Energy Research Center; acid leaching of limestone cavities by methods investigated by Dow Chemical; steam injection into permeable nahcolite zones to dissolve the nahcolite by methods investigated by Shell Oil and Equity Oil; fracturing with chemical explosives by methods investigated by Talley Energy Systems; fracturing with nuclear explosives by methods investigated by Project Bronco; and combinations of these methods. Many of these methods, however, have relatively high operating costs and lack sufficient injection capacity.

Large deposits of heavy hydrocarbons (heavy oil and/or tar) contained in relatively permeable formations (for example in tar sands) are found in North America, South America, Africa, and Asia. Tar can be surface-mined and upgraded to lighter hydrocarbons such as crude oil, naphtha, kerosene, and/or gas oil. Surface milling processes may further separate the bitumen from sand. The separated bitumen may be converted to light hydrocarbons using conventional refinery methods. Mining and upgrading tar sand is usually substantially more expensive than producing lighter hydrocarbons from conventional oil reservoirs.

In situ production of hydrocarbons from tar sand may be accomplished by heating and/or injecting a gas into the formation. U.S. Pat. No. 5,211,230 to Ostapovich et al. and U.S. Pat. No. 5,339,897 to Leaute, which are incorporated by reference as if fully set forth herein, describe a horizontal production well located in an oil-bearing reservoir. A vertical conduit may be used to inject an oxidant gas into the reservoir for in situ combustion.

U.S. Pat. No. 2,780,450 to Ljungstrom describes heating bituminous geological formations in situ to convert or crack a liquid tar-like substance into oils and gases.

U.S. Pat. No. 4,597,441 to Ware et al., which is incorporated by reference as if fully set forth herein, describes contacting oil, heat, and hydrogen simultaneously in a reservoir. Hydrogenation may enhance recovery of oil from the reservoir.

U.S. Pat. No. 5,046,559 to Glandt and U.S. Pat. No. 5,060,726 to Glandt et al., which are incorporated by reference as if fully set forth herein, describe preheating a portion of a tar sand formation between an injector well and a producer well. Steam may be injected from the injector well into the formation to produce hydrocarbons at the producer well.

As outlined above, there has been a significant amount of effort to develop methods and systems to economically produce hydrocarbons, hydrogen, and/or other products from hydrocarbon containing formations. At present, however, there are still many hydrocarbon containing formations from which hydrocarbons, hydrogen, and/or other products cannot be economically produced. Thus, there is still a need for improved methods and systems for production of hydrocarbons, hydrogen, and/or other products from various hydrocarbon containing formations.

SUMMARY

Embodiments described herein generally relate to systems, methods, and heaters for treating a subsurface formation. Embodiments described herein also generally relate to heaters that have novel components therein. Such heaters can be obtained by using the systems and methods described herein.

In certain embodiments, the invention provides one or more systems, methods, and/or heaters. In some embodiments, the systems, methods, and/or heaters are used for treating a subsurface formation.

In certain embodiments, the invention provides a system for treating a tar sands formation, comprising: a plurality of heaters located in the formation, wherein the heaters include at least partially horizontal heating sections at least partially in a hydrocarbon layer of the formation, the heating sections being at least partially arranged in a pattern in the hydrocarbon layer, and the heaters being configured to provide heat to the hydrocarbon layer, the provided heat creating a plurality of drainage paths for mobilized fluids, at least two of the drainage paths converging; and a production well located to collect and produce mobilized fluids from at least one of the converged drainage paths in the hydrocarbon layer.

In certain embodiments, the invention provides a method for treating a tar sands formation, comprising: providing heat to at least part of a hydrocarbon layer in the formation from a plurality of heaters located in the formation, wherein the heaters include at least partially horizontal heating sections at least partially in a hydrocarbon layer of the formation, the heating sections being at least partially arranged in a pattern in the hydrocarbon layer, and the heaters being configured to provide heat to the hydrocarbon layer; wherein the provided heat creates a plurality of drainage paths for mobilized fluids, at least two of the drainage paths converging; allowing at least some of the mobilized fluids from the formation to flow to the production well along at least one of the converged drainage paths; and producing at least some of the mobilized fluids through the production well.

In further embodiments, features from specific embodiments may be combined with features from other embodiments. For example, features from one embodiment may be combined with features from any of the other embodiments.

In further embodiments, treating a subsurface formation is performed using any of the methods, systems, or heaters described herein.

In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which:

FIG. 14 depicts a schematic drawing of an embodiment of a drilling system for drilling into a hot formation.

FIG. 15 depicts a schematic drawing of an embodiment of a drilling system for drilling into a hot formation.

FIG. 16 depicts a schematic drawing of an embodiment of a drilling system for drilling into a hot formation.

FIG. 17 depicts an embodiment of a freeze well for a circulated liquid refrigeration system, wherein a cutaway view of the freeze well is represented below ground surface.

FIG. 18A depicts an embodiment of a wellbore for introducing wax into a formation to form a wax grout barrier.

FIGS. 28A and 28B depict cross-sectional representations of an embodiment of a temperature limited heater.

FIGS. 29A and 29B depict cross-sectional representations of an embodiment of a temperature limited heater.

FIGS. 30A and 30B depict cross-sectional representations of an embodiment of a temperature limited heater.

FIGS. 31A and 31B depict cross-sectional representations of an embodiment of a temperature limited heater.

FIGS. 32A and 32B depict cross-sectional representations of an embodiment of a temperature limited heater.

FIG. 33 depicts a cross-sectional representation of an embodiment of a composite conductor with a support member.

FIG. 34 depicts a cross-sectional representation of an embodiment of a composite conductor with a support member separating the conductors.

FIG. 35 depicts a cross-sectional representation of an embodiment of a composite conductor surrounding a support member.

FIG. 36 depicts a cross-sectional representation of an embodiment of a composite conductor surrounding a conduit support member.

FIG. 37 depicts a cross-sectional representation of an embodiment of a conductor-in-conduit heat source.

FIGS. 52A and 52B depict an embodiment of a system for installing heaters in a wellbore.

FIG. 52C depicts an embodiment of an insulated conductor with the sheath shorted to the conductors.

FIG. 69 depicts a top view representation of an embodiment of a plurality of triads of three-phase heaters in a hexagonal pattern.

FIG. 70 depicts a top view representation of an embodiment of a hexagon from FIG. 69.

FIG. 71 depicts an embodiment of triads of heaters coupled to a horizontal bus bar.

FIG. 75 depicts an embodiment of a container for coupling contacting elements with bulbs on the contacting elements.

FIG. 76 depicts an alternative embodiment of a container.

FIG. 77 depicts an alternative embodiment for coupling contacting elements of three legs of a heater.

FIG. 80 depicts a cross-sectional representation of another alternative embodiment for coupling contacting elements using temperature limited heating elements.

FIG. 81 depicts a side view representation of an alternative embodiment for coupling contacting elements of three legs of a heater.

FIG. 121 depicts a cross-sectional representation of an embodiment of a catalytic burner.

FIG. 122 depicts a cross-sectional representation of an embodiment of a catalytic burner with an igniter.

FIG. 127 depicts an elevational view of an in situ heat treatment system using pebble bed reactors.

FIG. 128 depicts a side view representation of an embodiment of a system for heating the formation that can use a closed loop circulation system and/or electrical heating.

FIG. 129 depicts a side view representation of an embodiment for an in situ staged heating and producing process for treating a tar sands formation.

FIG. 130 depicts a top view of a rectangular checkerboard pattern embodiment for the in situ staged heating and production process.

FIG. 131 depicts a top view of a ring pattern embodiment for the in situ staged heating and production process.

FIG. 132 depicts a top view of a checkerboard ring pattern embodiment for the in situ staged heating and production process.

FIG. 133 depicts a top view an embodiment of a plurality of rectangular checkerboard patterns in a treatment area for the in situ staged heating and production process.

FIG. 134 depicts a schematic representation of a system for inhibiting migration of formation fluid from a treatment area.

FIG. 135 depicts an embodiment of a windmill for generating electricity for subsurface heaters.

FIG. 136 depicts an embodiment of a solution mining well.

FIG. 137 depicts a representation of a portion of a solution mining well.

FIG. 138 depicts a representation of a portion of a solution mining well.

Figure 139:
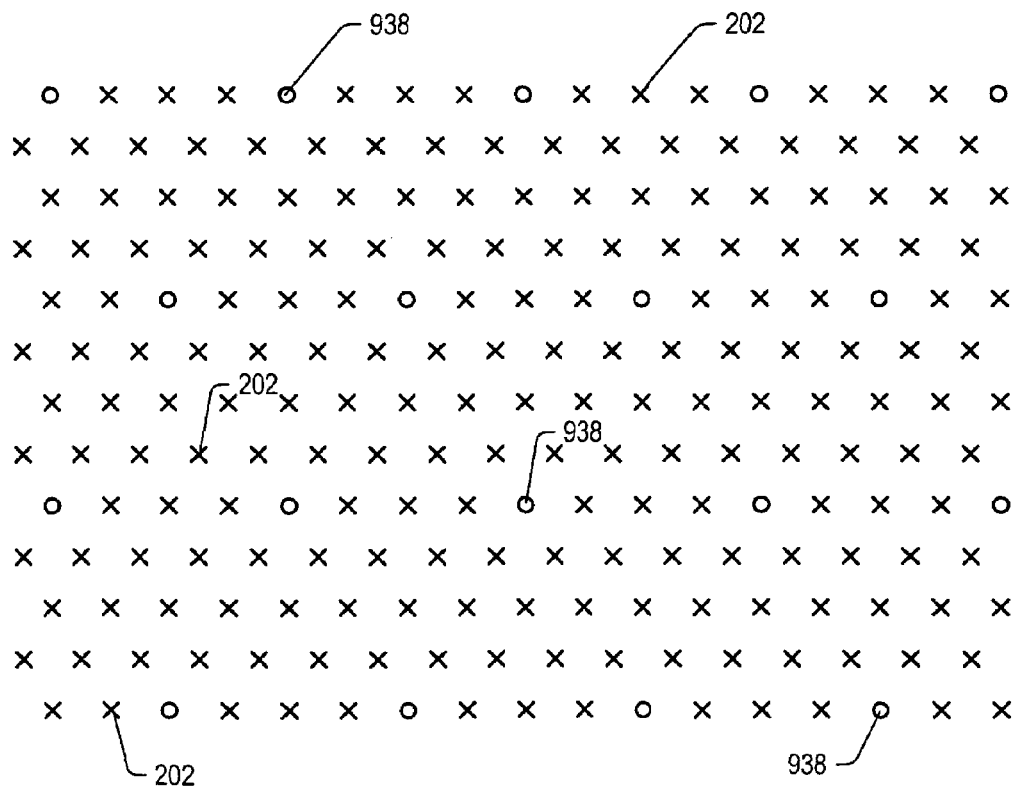

FIG. 139 depicts an elevational view of a well pattern for solution mining and/or an in situ heat treatment process.

Figure 140:
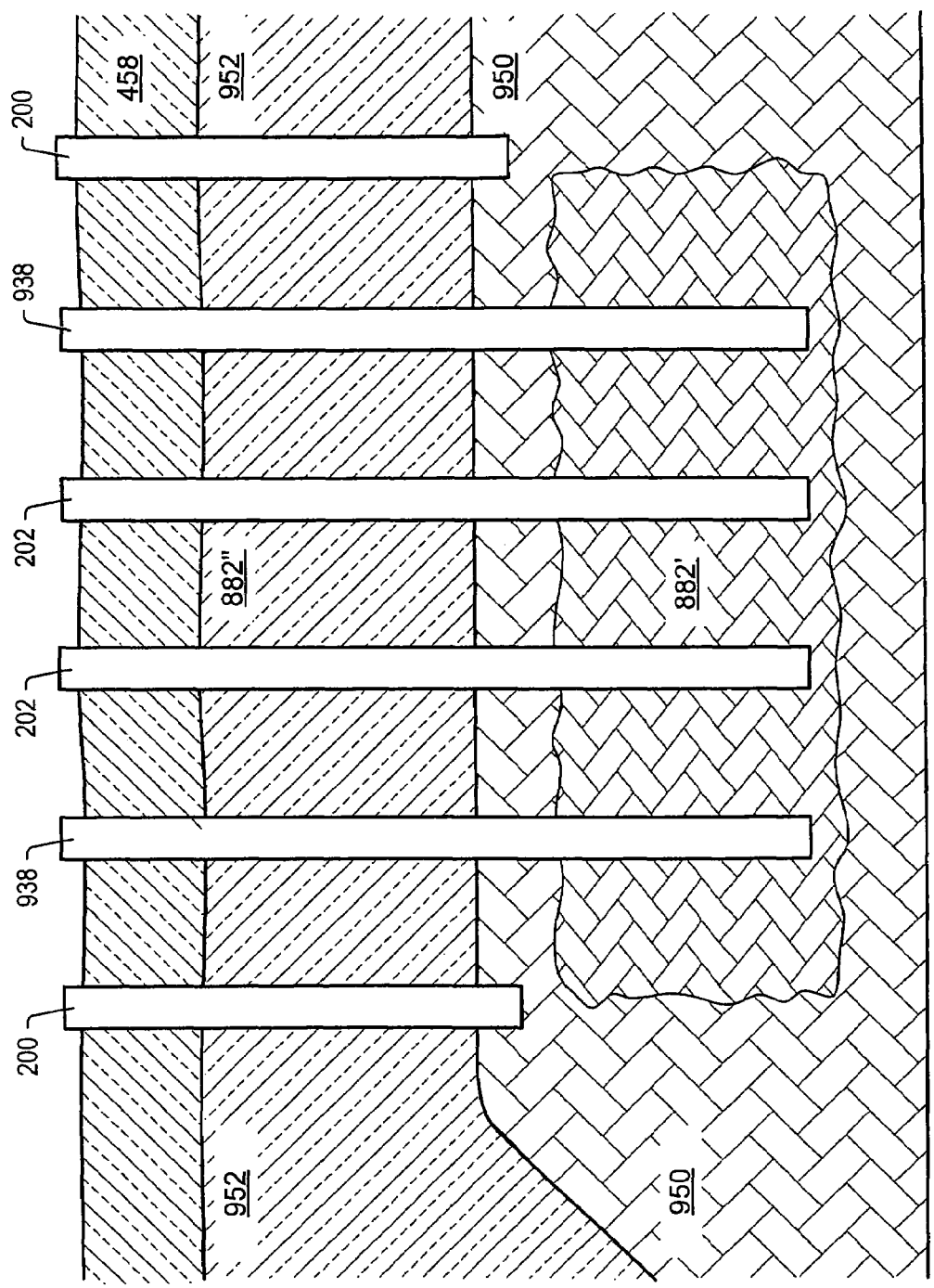

FIG. 140 depicts a representation of wells of an in situ heating treatment process for solution mining and producing hydrocarbons from a formation.

Figure 141:
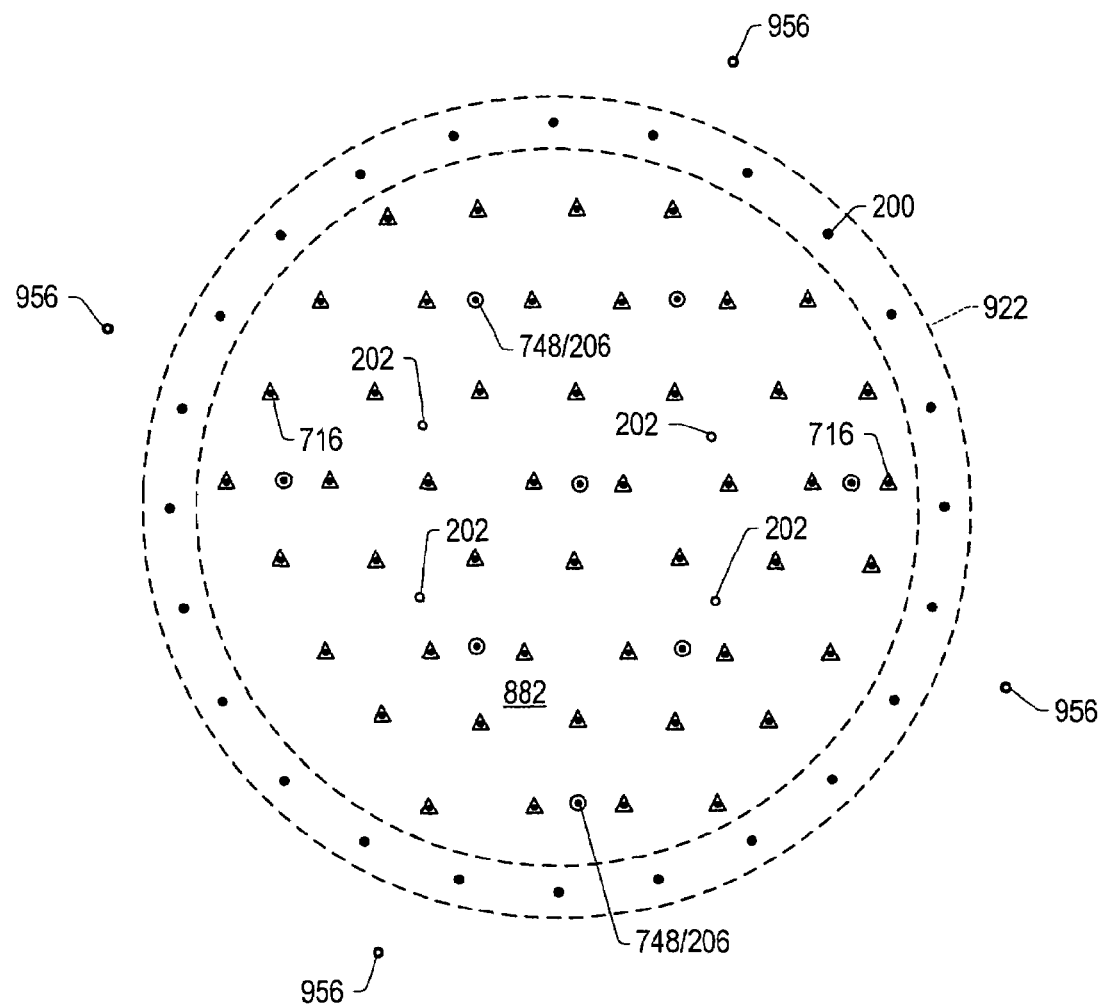

FIG. 141 depicts an embodiment for solution mining a formation.

Figure 142:
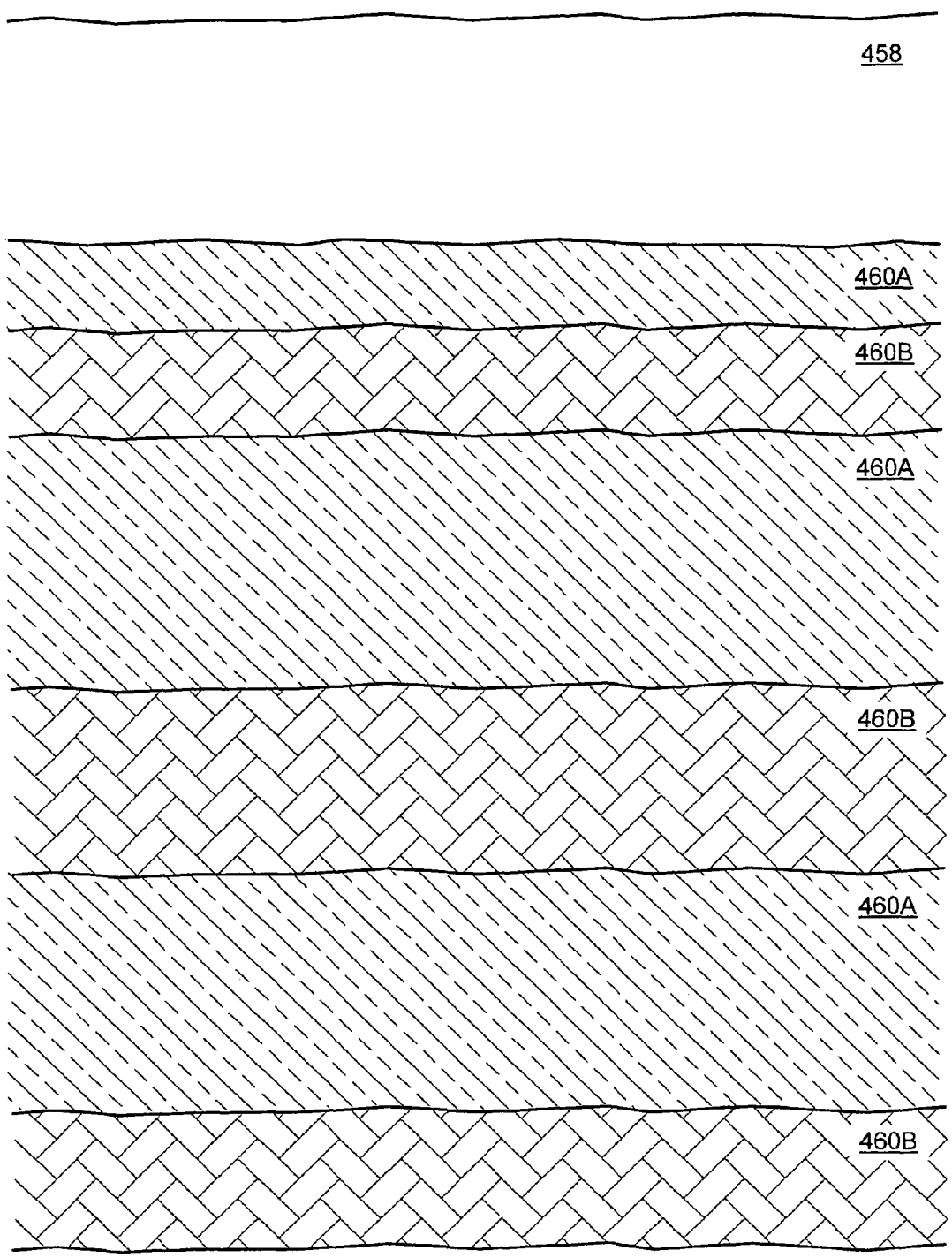

FIG. 142 depicts an embodiment of a formation with nahcolite layers in the formation before solution mining nahcolite from the formation.

Figure 143:
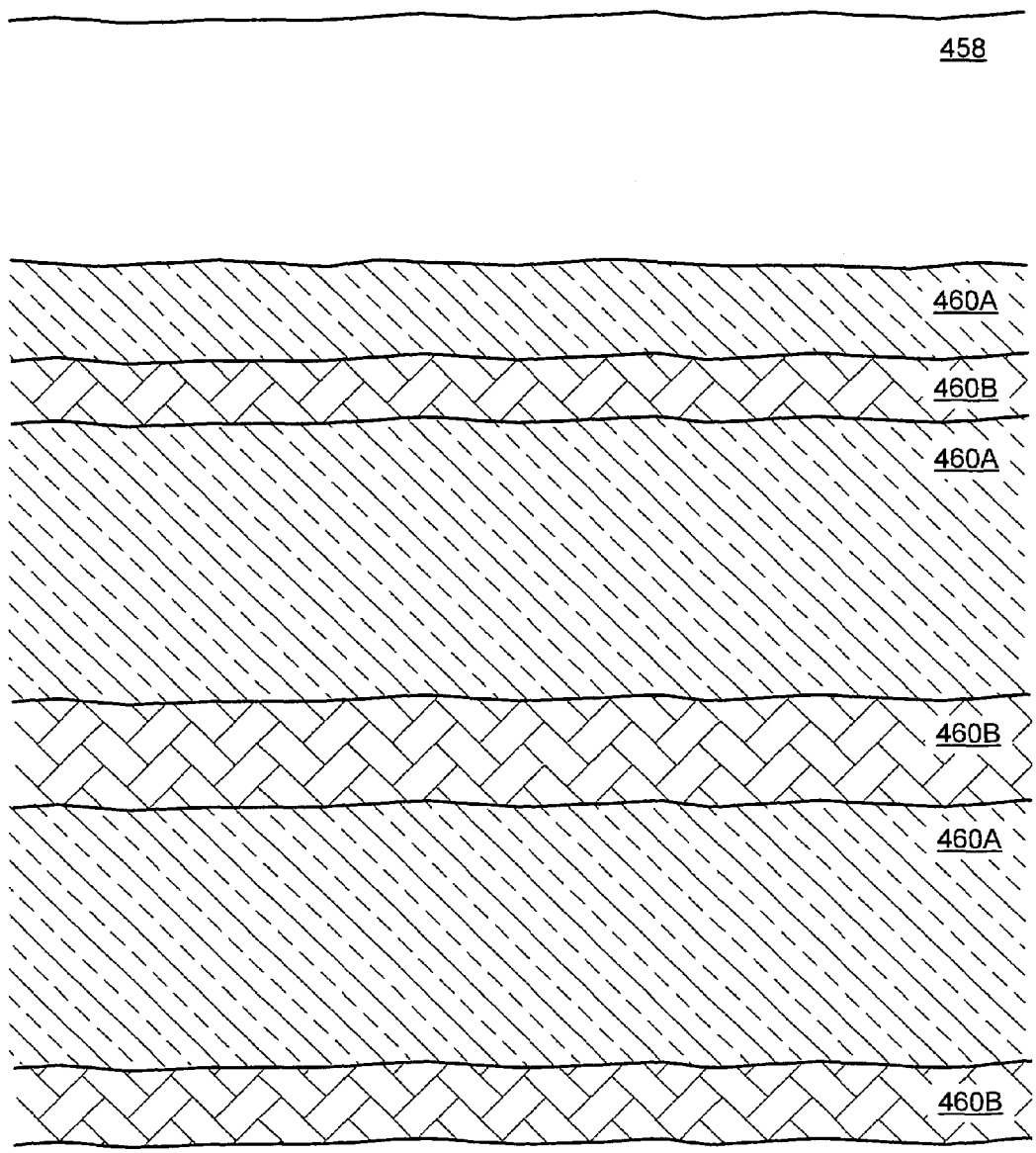

FIG. 143 depicts the formation of FIG. 142 after the nahcolite has been solution mined.

Figure 144:
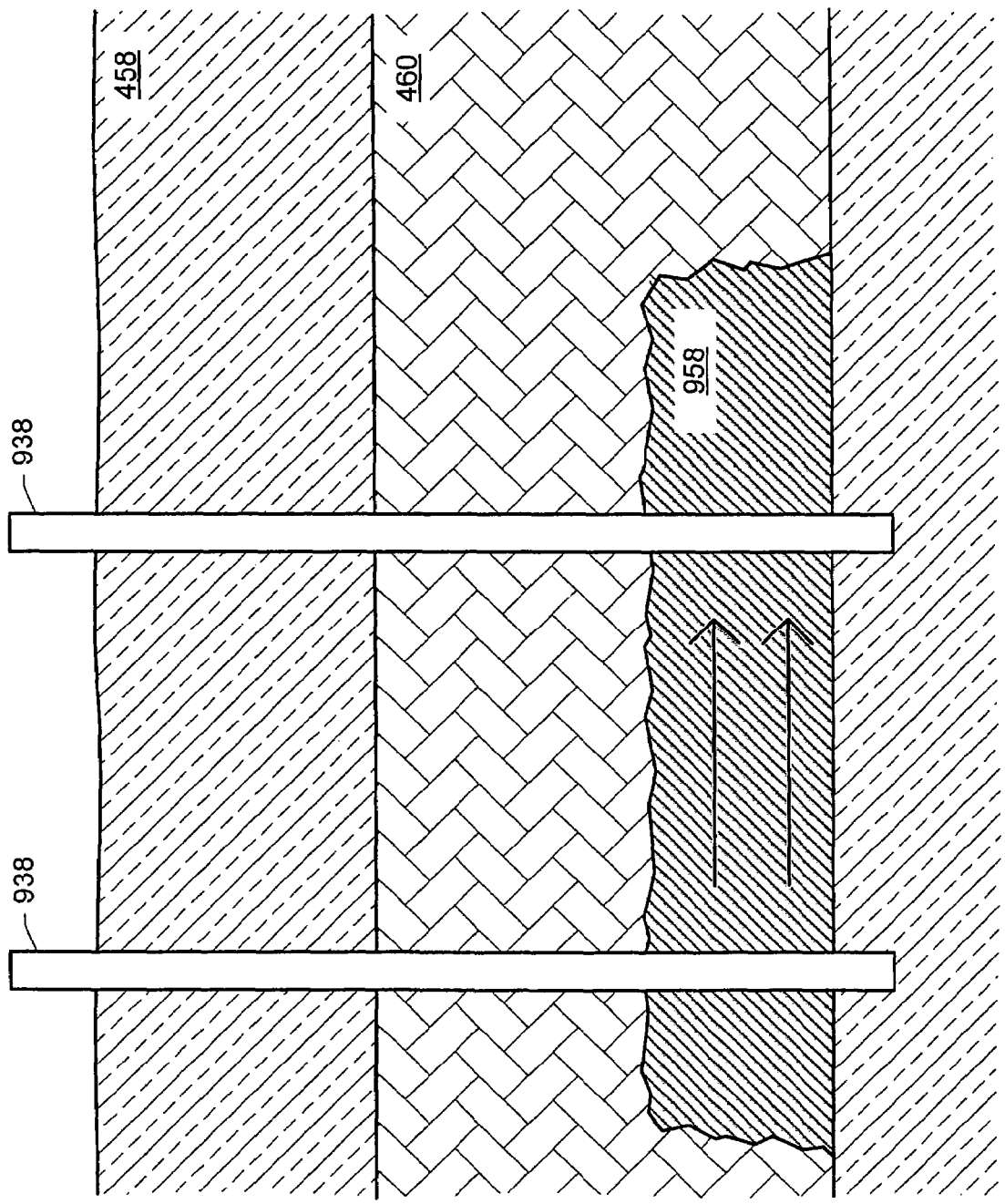

FIG. 144 depicts an embodiment of two injection wells interconnected by a zone that has been solution mined to remove nahcolite from the zone.

Figure 145:
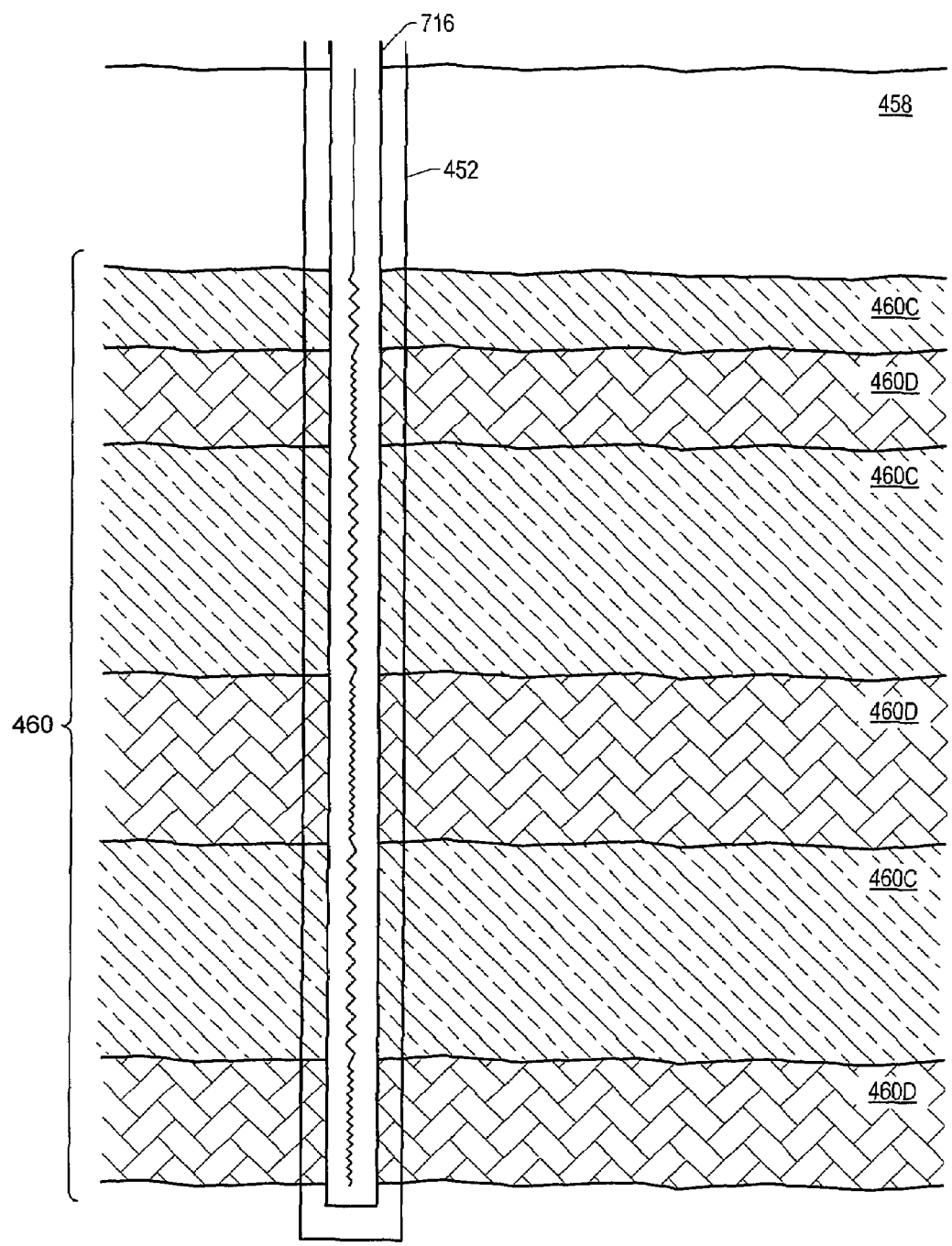

FIG. 145 depicts an embodiment for heating a formation with dawsonite in the formation.

Figure 146:
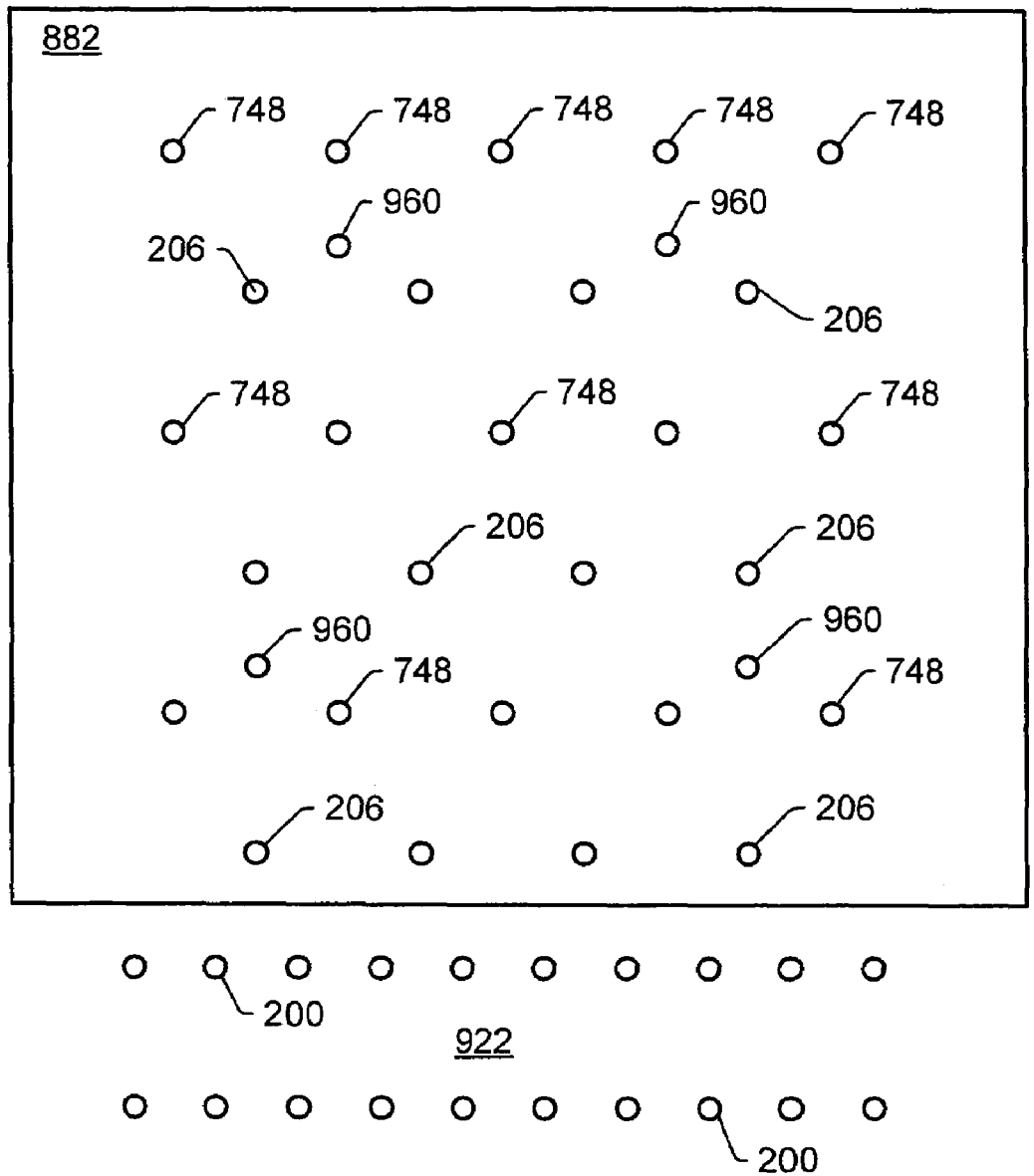

FIG. 146 depicts an embodiment of treating a hydrocarbon containing formation with a combustion front.

Figure 147:
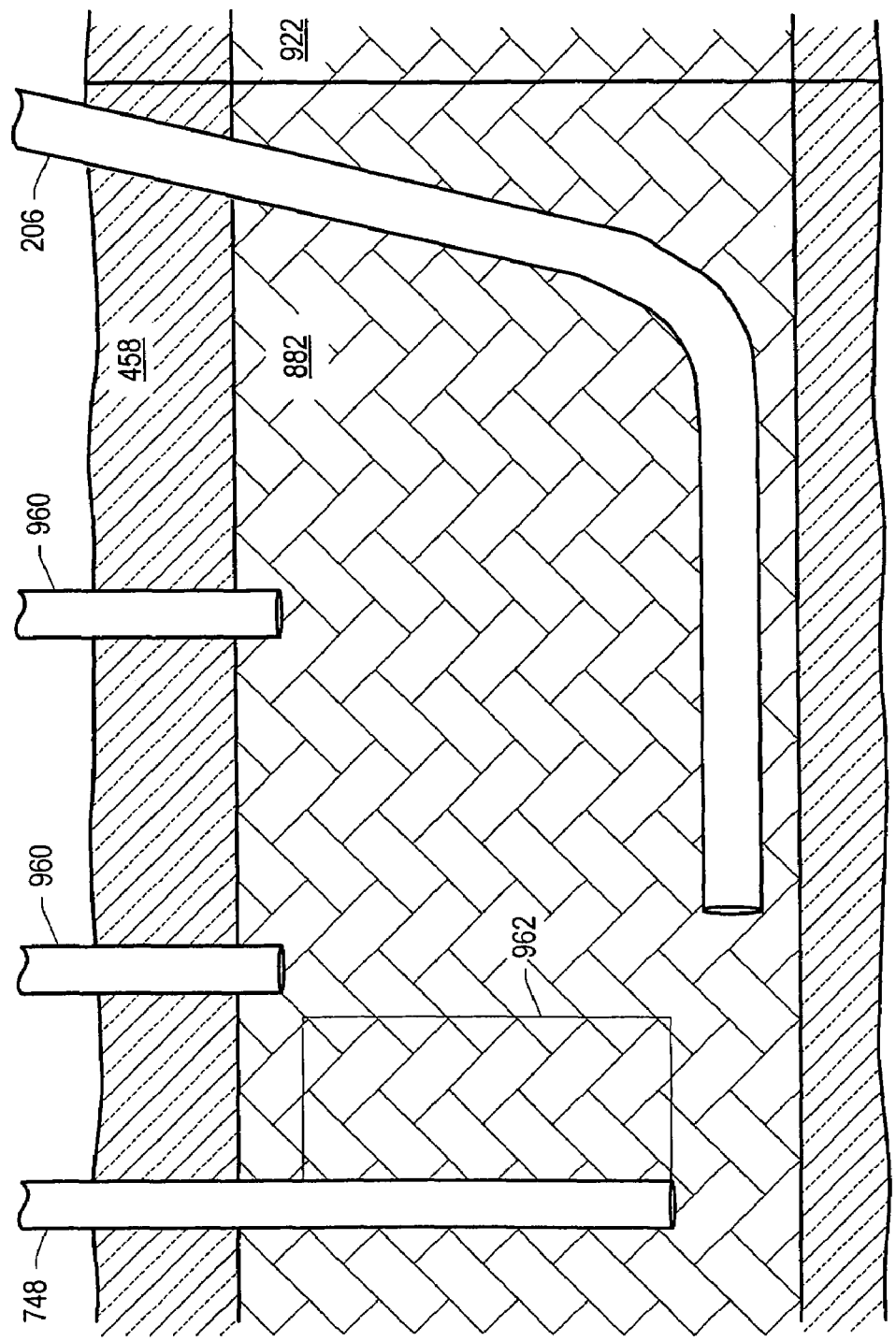

FIG. 147 depicts a cross-sectional view of an embodiment of treating a hydrocarbon containing formation with a combustion front.

Figure 148:
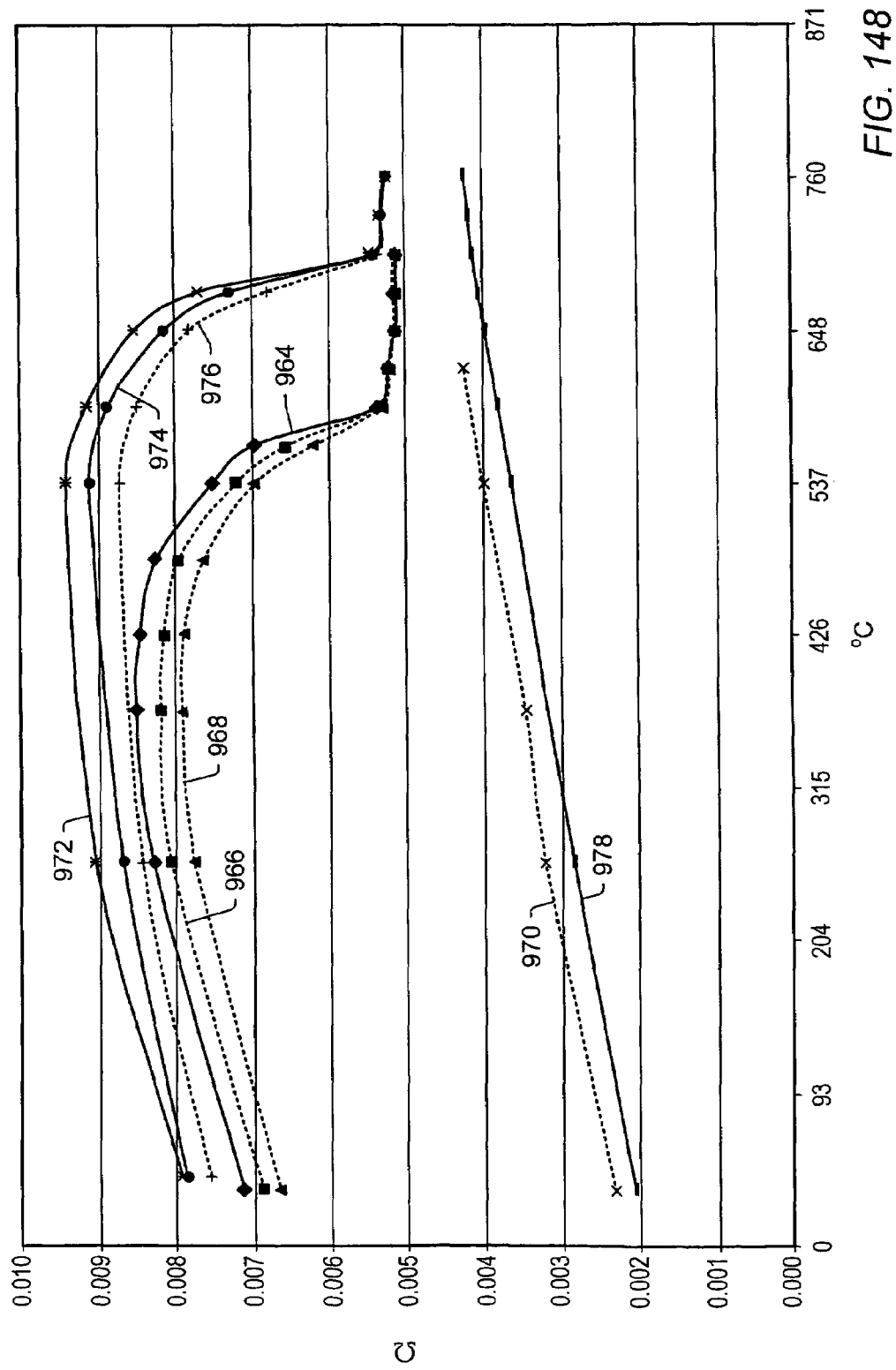

FIG. 148 depicts electrical resistance versus temperature at various applied electrical currents for a 446 stainless steel rod.

Figure 149:
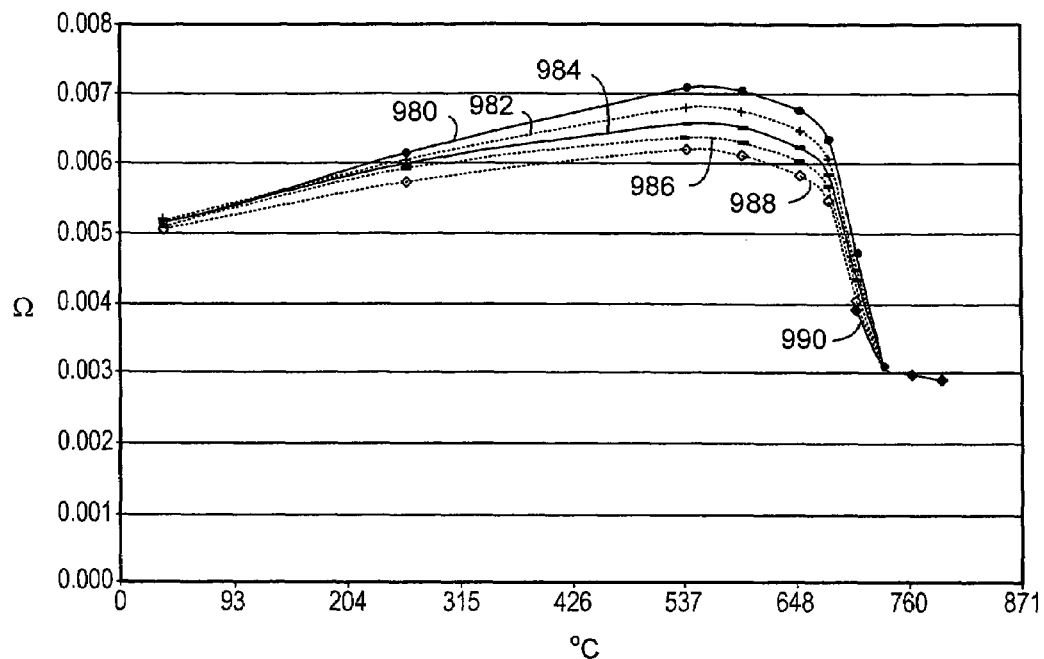

FIG. 149 shows resistance profiles as a function of temperature at various applied electrical currents for a copper rod contained in a conduit of Sumitomo HCM12A.

Figure 150:
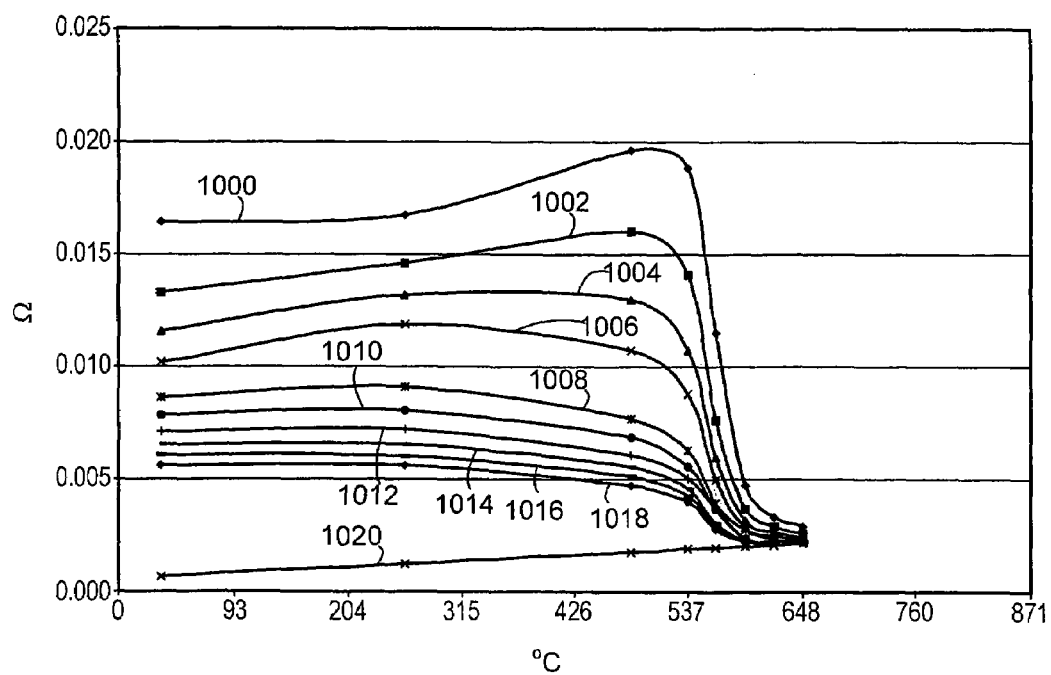

FIG. 150 depicts electrical resistance versus temperature at various applied electrical currents for a temperature limited heater.

Figure 151:
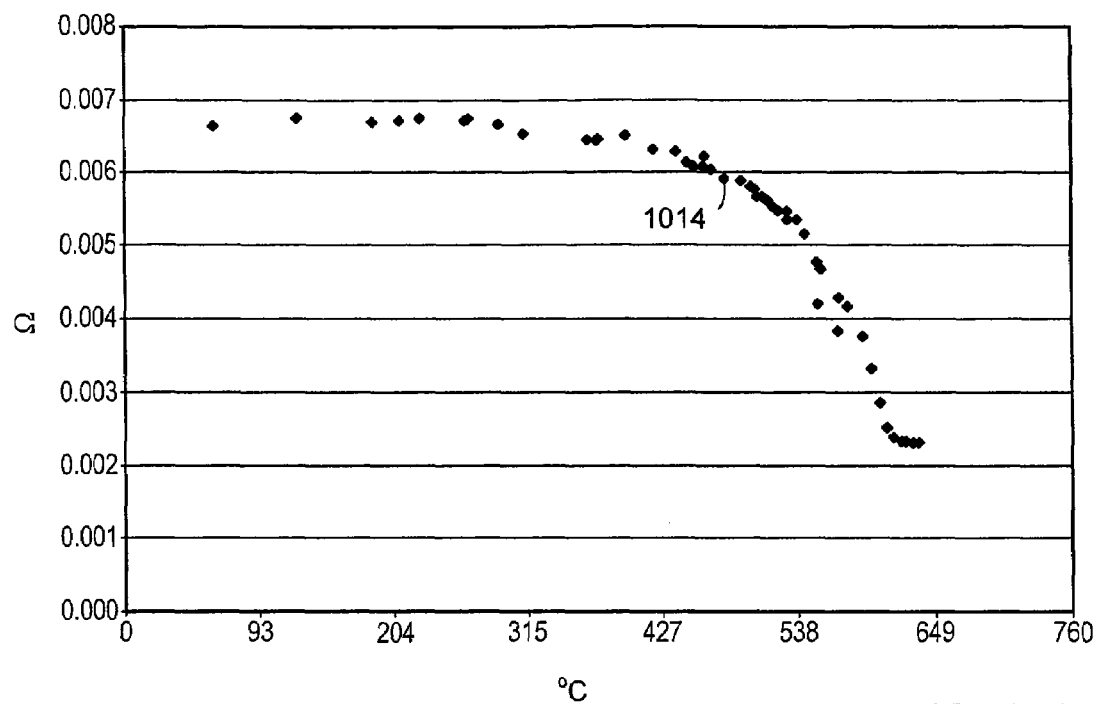

FIG. 151 depicts raw data for a temperature limited heater.

Figure 152:
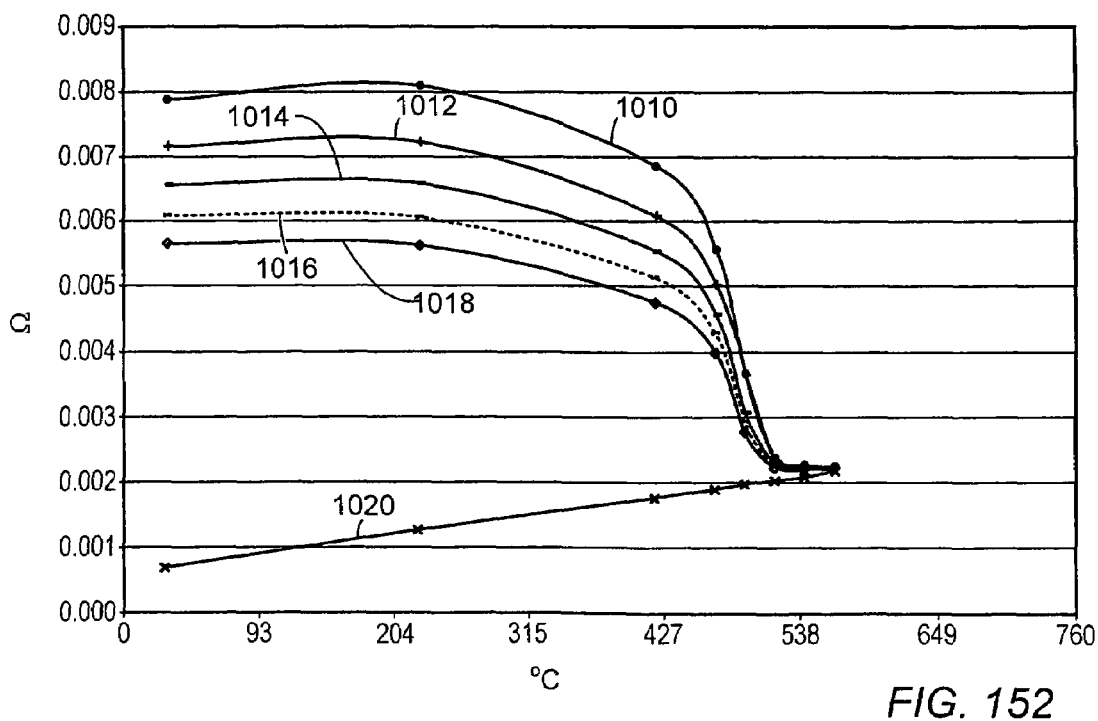

FIG. 152 depicts electrical resistance versus temperature at various applied electrical currents for a temperature limited heater.

Figure 153:
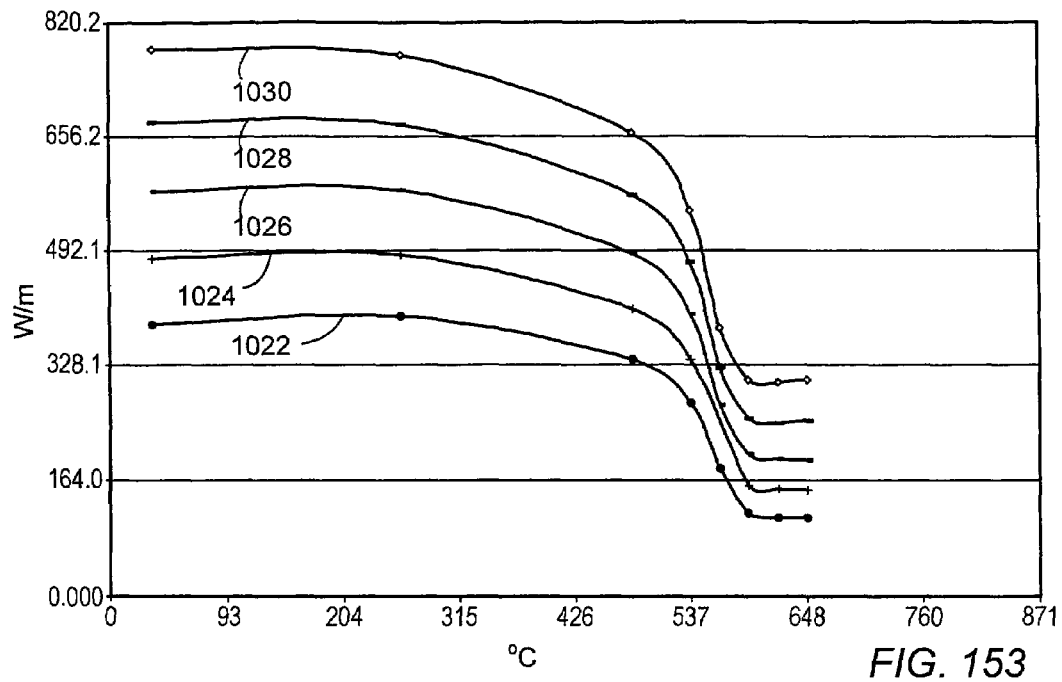

FIG. 153 depicts power versus temperature at various applied electrical currents for a temperature limited heater.

Figure 154:
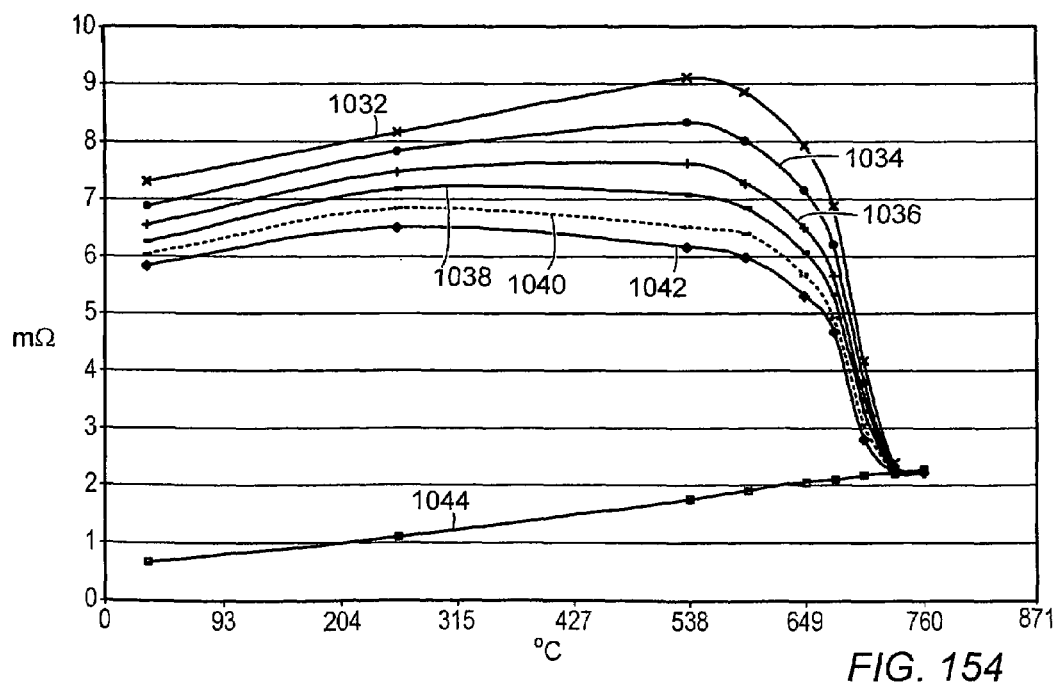

FIG. 154 depicts electrical resistance versus temperature at various applied electrical currents for a temperature limited heater.

Figure 155:
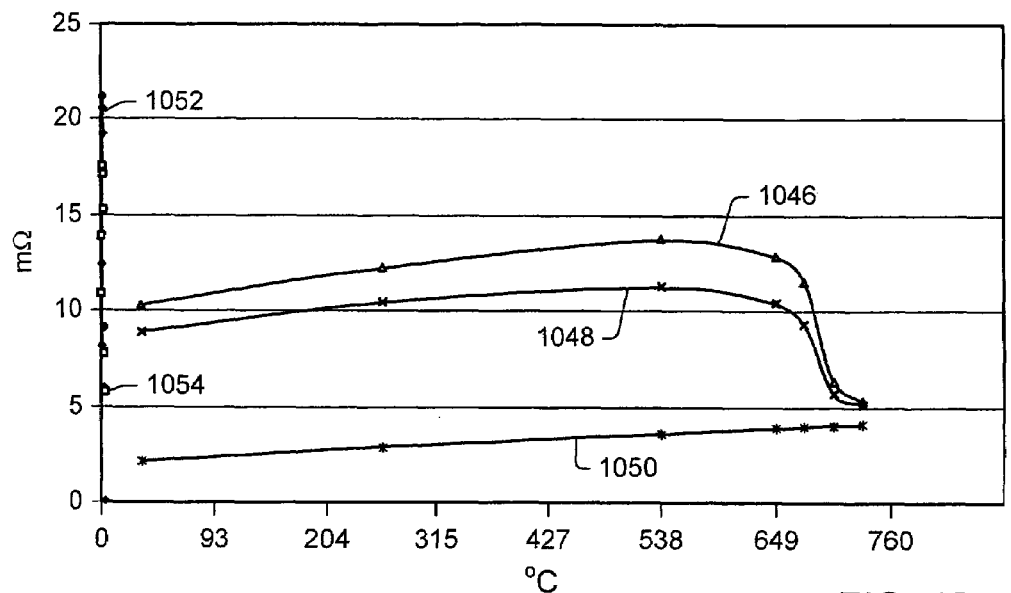

FIG. 155 depicts data of electrical resistance versus temperature for a solid 2.54 cm diameter, 1.8 m long 410 stainless steel rod at various applied electrical currents.

Figure 156:
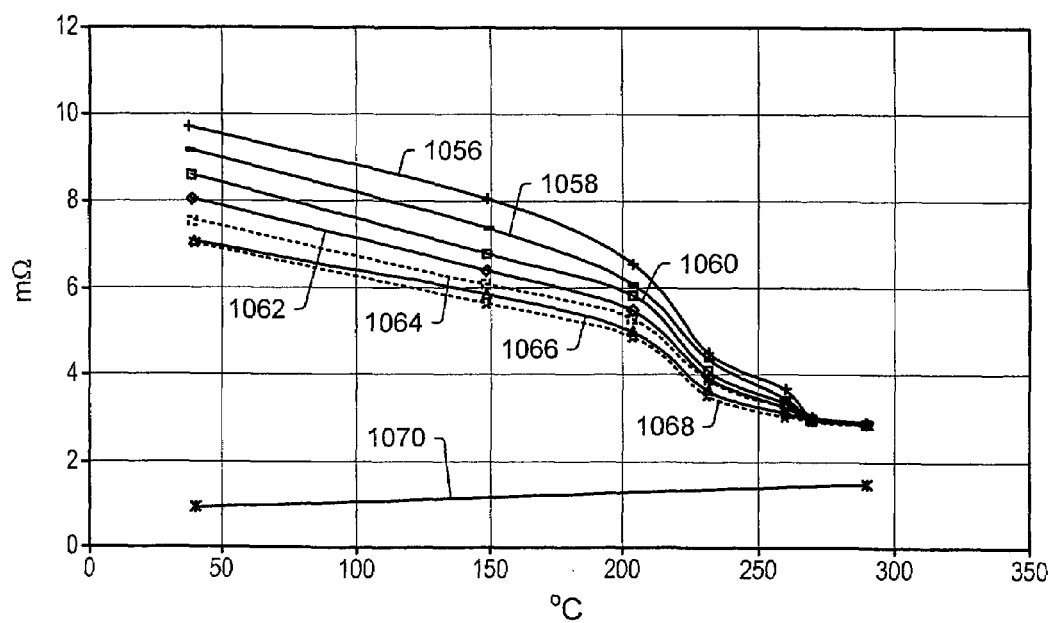

FIG. 156 depicts data of electrical resistance versus temperature for a composite 1.9 cm, 1.8 m long alloy 42-6 rod with a copper core (the rod has an outside diameter to copper diameter ratio of 2:1) at various applied electrical currents.

Figure 157:
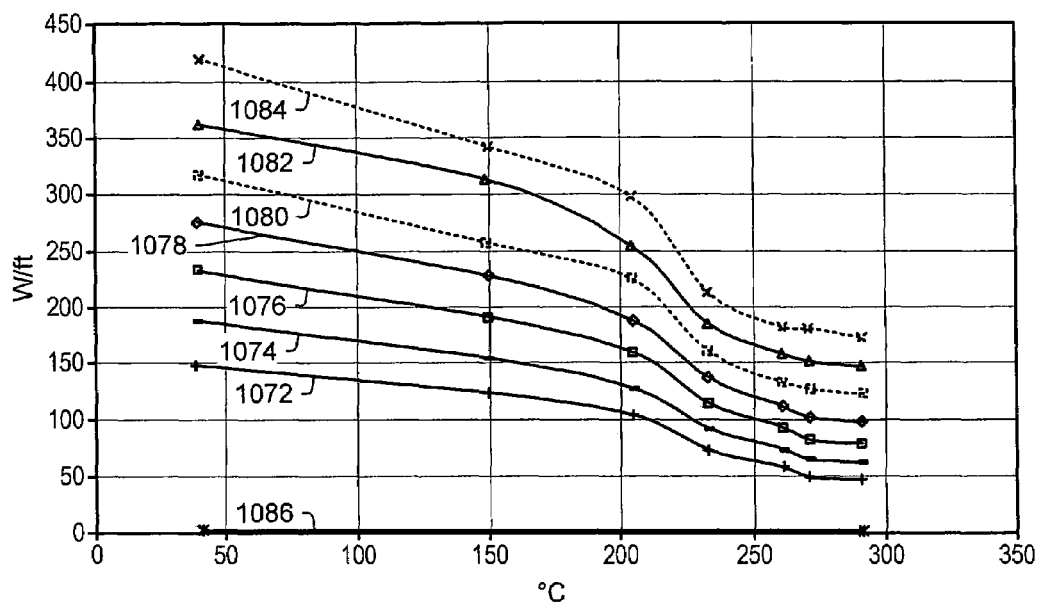

FIG. 157 depicts data of power output versus temperature for a composite 1.9 cm, 1.8 m long alloy 42-6 rod with a copper core (the rod has an outside diameter to copper diameter ratio of 2:1) at various applied electrical currents.

Figure 158:
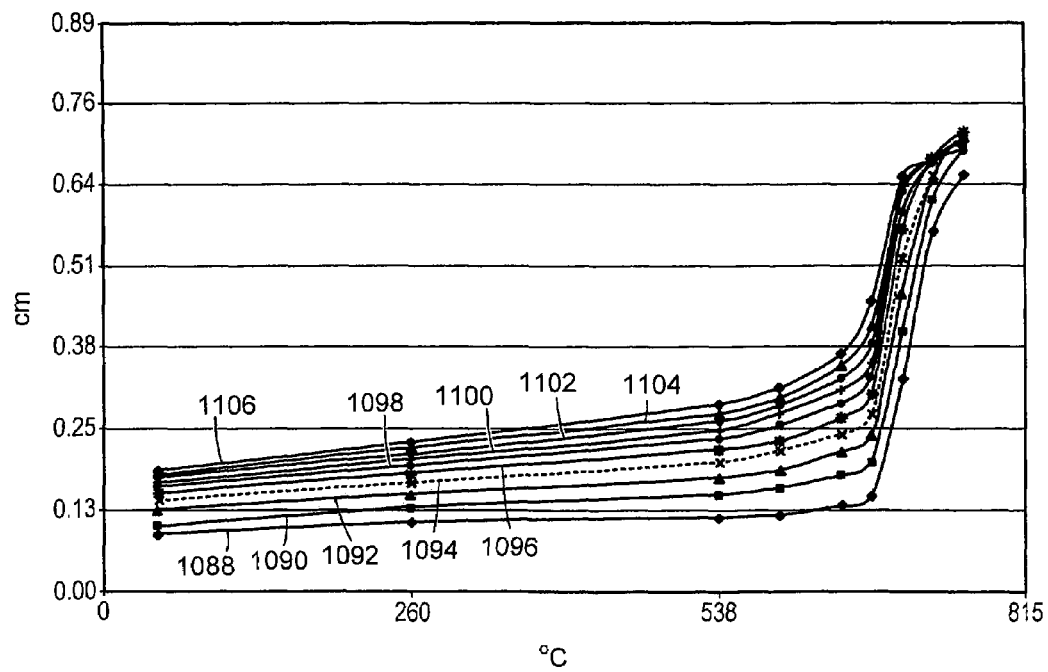

FIG. 158 depicts data for values of skin depth versus temperature for a solid 2.54 cm diameter, 1.8 m long 410 stainless steel rod at various applied AC electrical currents.

Figure 159:
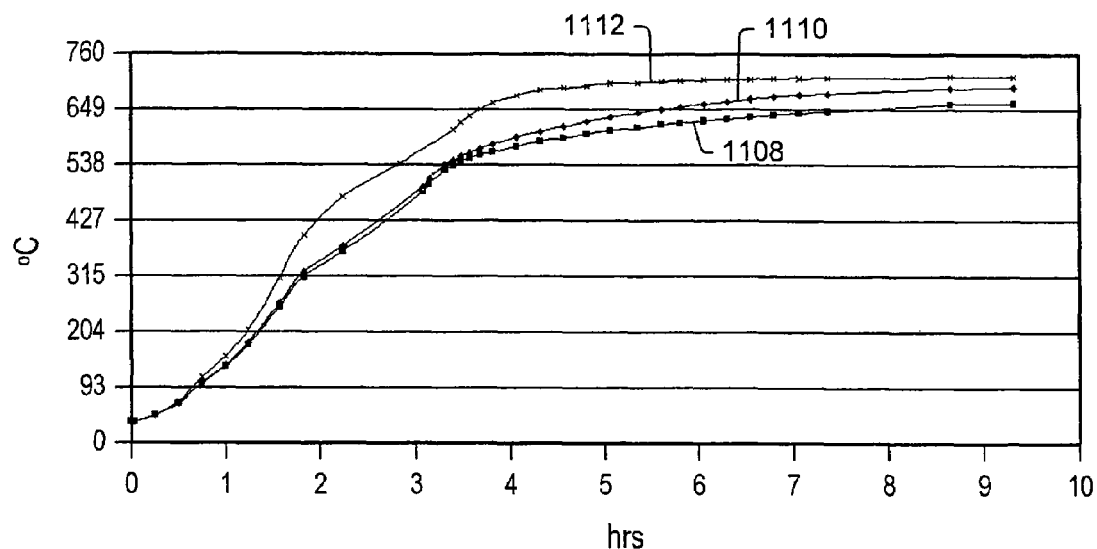

FIG. 159 depicts temperature versus time for a temperature limited heater.

Figure 160:
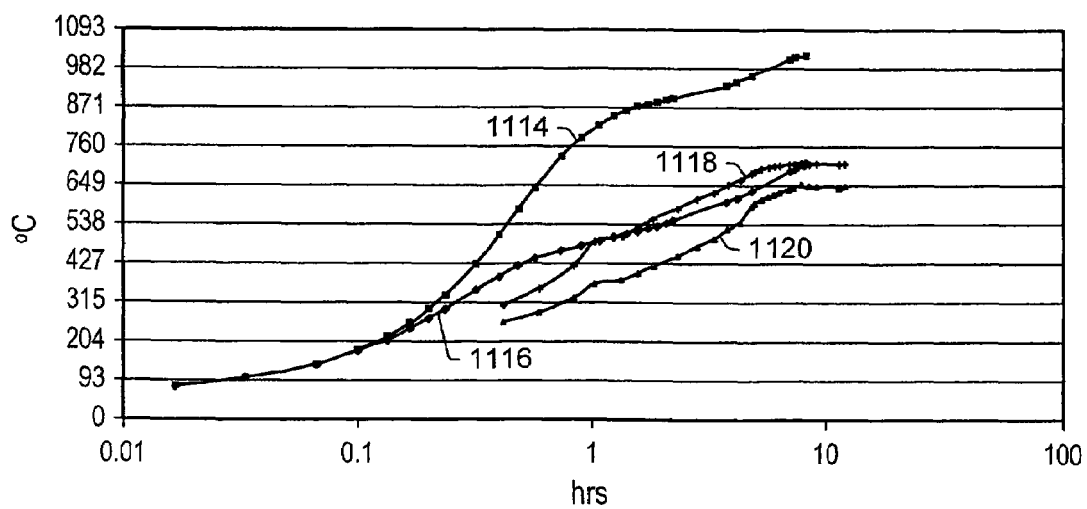

FIG. 160 depicts temperature versus log time data for a 2.5 cm solid 410 stainless steel rod and a 2.5 cm solid 304 stainless steel rod.

Figure 161:
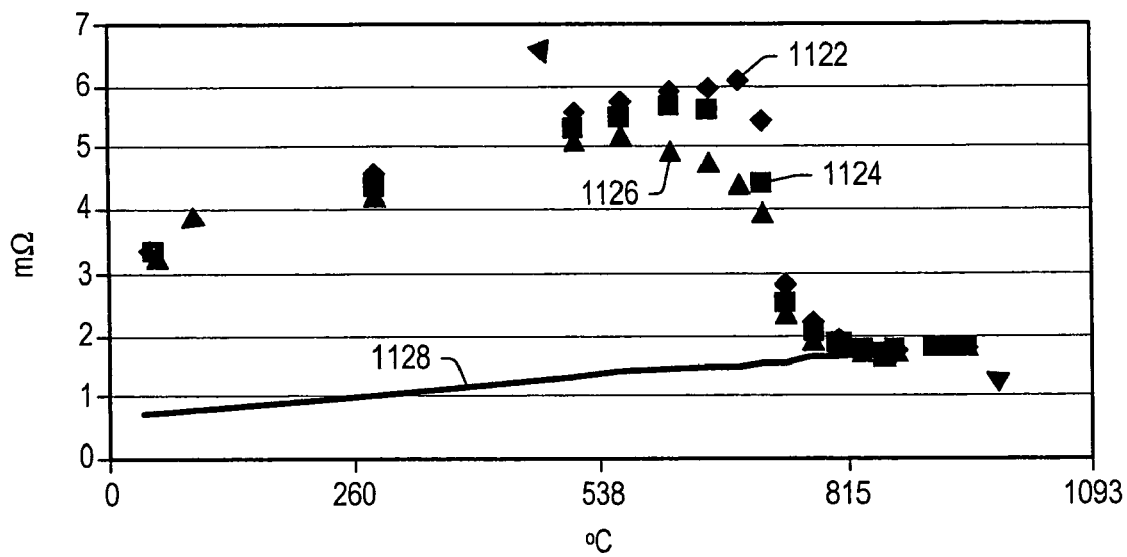

FIG. 161 depicts experimentally measured resistance versus temperature at several currents for a temperature limited heater with a copper core, a carbon steel ferromagnetic conductor, and a 347H stainless steel support member.

Figure 162:
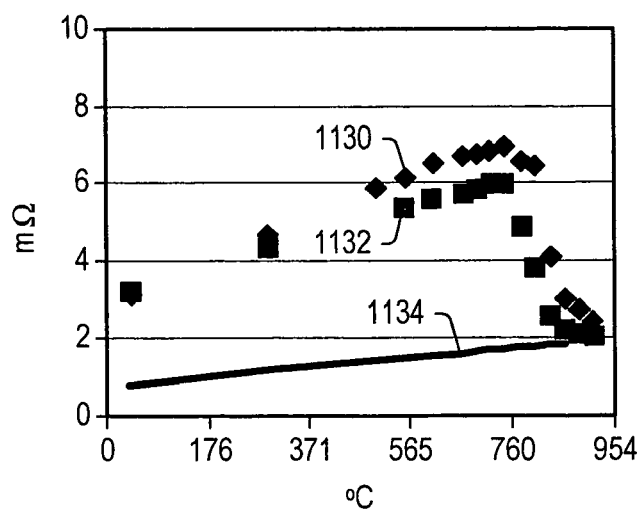

FIG. 162 depicts experimentally measured resistance versus temperature at several currents for a temperature limited heater with a copper core, an iron-cobalt ferromagnetic conductor, and a 347H stainless steel support member.

Figure 163:
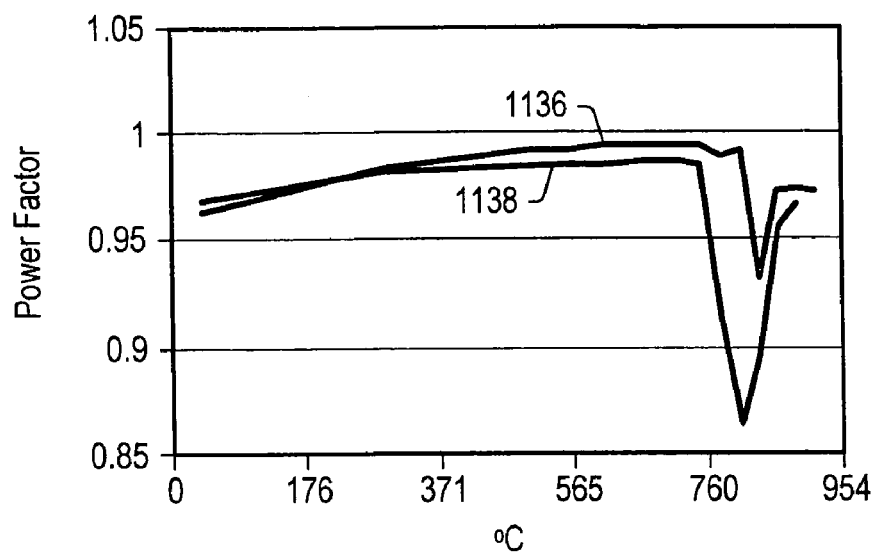

FIG. 163 depicts experimentally measured power factor versus temperature at two AC currents for a temperature limited heater with a copper core, a carbon steel ferromagnetic conductor, and a 347H stainless steel support member.

Figure 164:
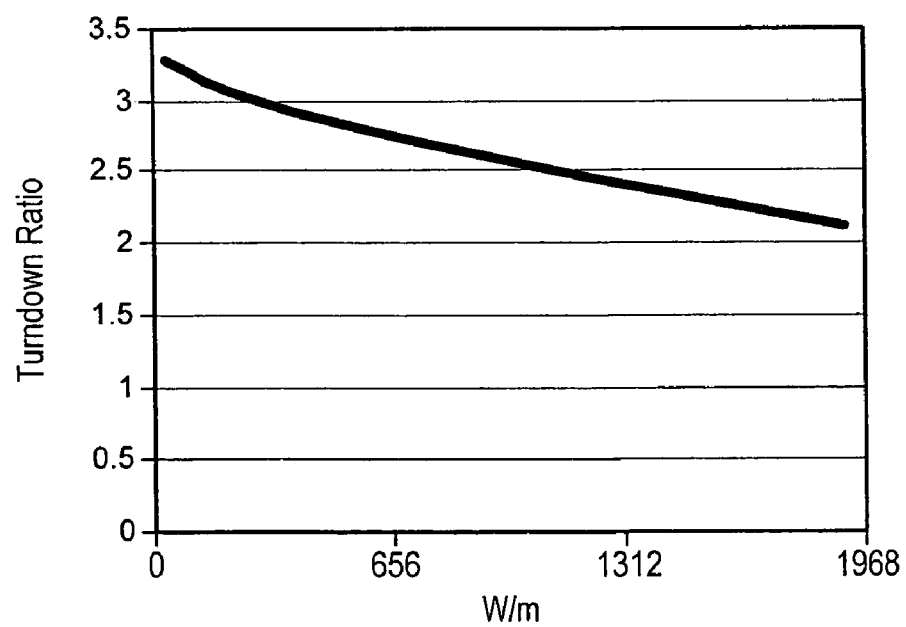

FIG. 164 depicts experimentally measured turndown ratio versus maximum power delivered for a temperature limited heater with a copper core, a carbon steel ferromagnetic conductor, and a 347H stainless steel support member.

Figure 165:
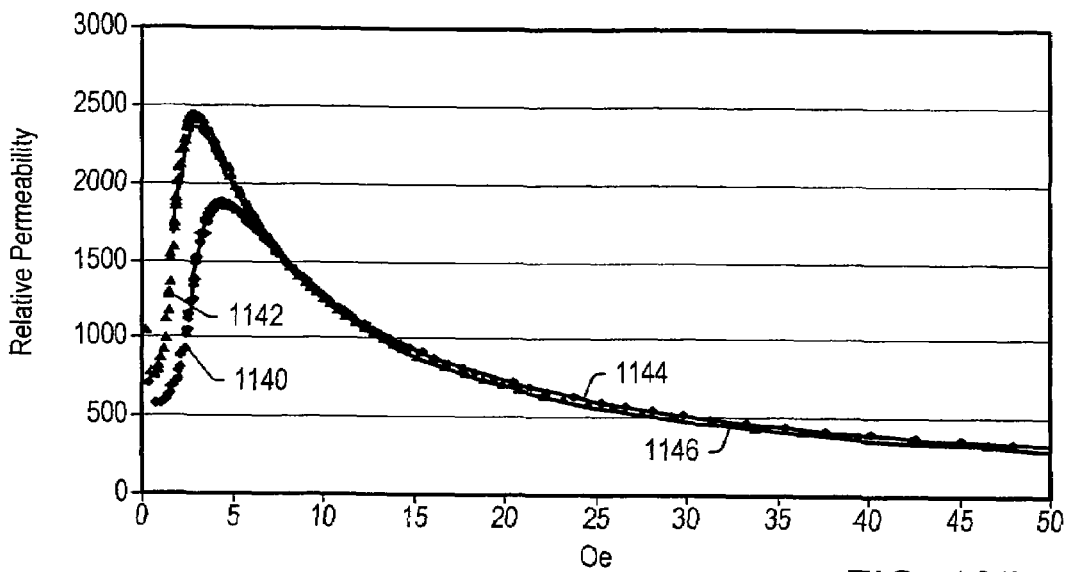

FIG. 165 depicts examples of relative magnetic permeability versus magnetic field for both the found correlations and raw data for carbon steel.

Figure 166:
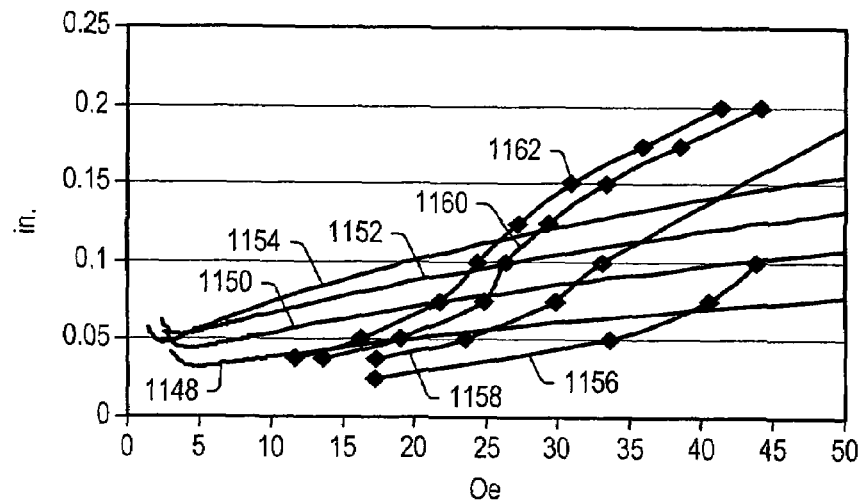

FIG. 166 shows the resulting plots of skin depth versus magnetic field for four temperatures and 400 A current.

Figure 167:
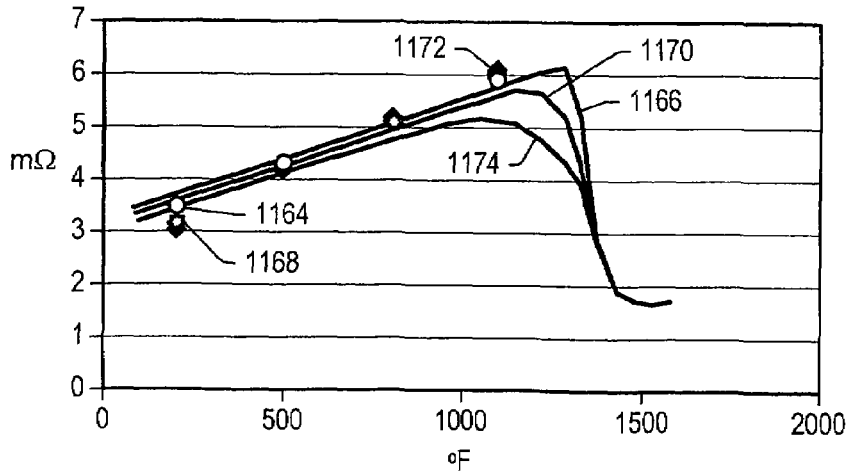

FIG. 167 shows a comparison between the experimental and numerical (calculated) results for currents of 300 A, 400 A, and 500 A.

Figure 168:
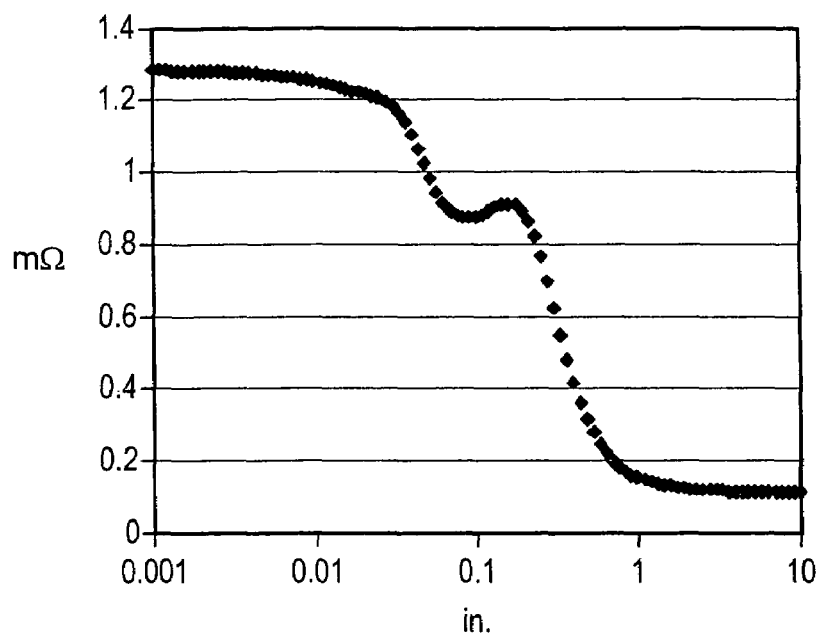

FIG. 168 shows the AC resistance per foot of the heater element as a function of skin depth at 1100° F. calculated from the theoretical model.

Figure 169:
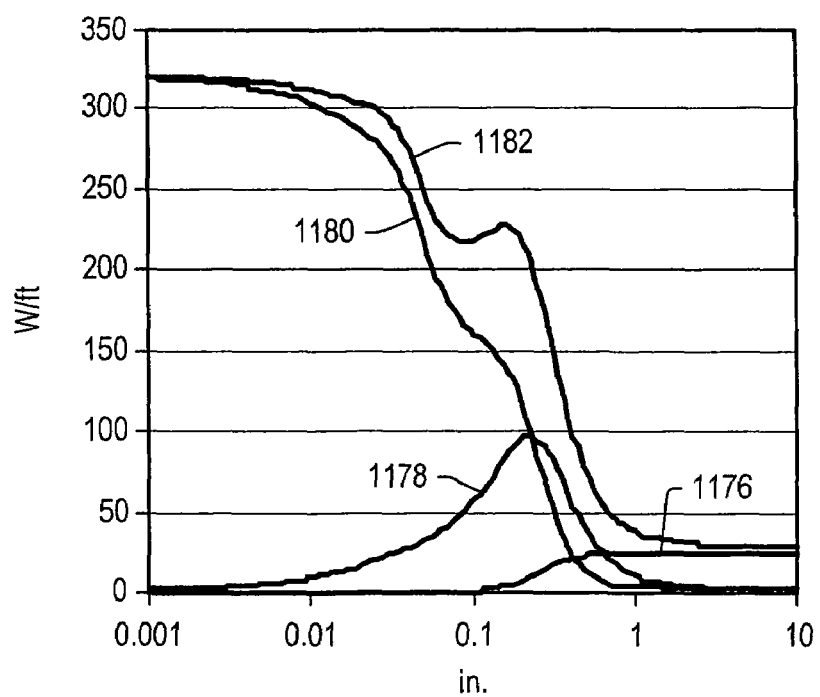

FIG. 169 depicts the power generated per unit length in each heater component versus skin depth for a temperature limited heater.

FIGS. 170 A-C compare the results of theoretical calculations with experimental data for resistance versus temperature in a temperature limited heater.

Figure 171:
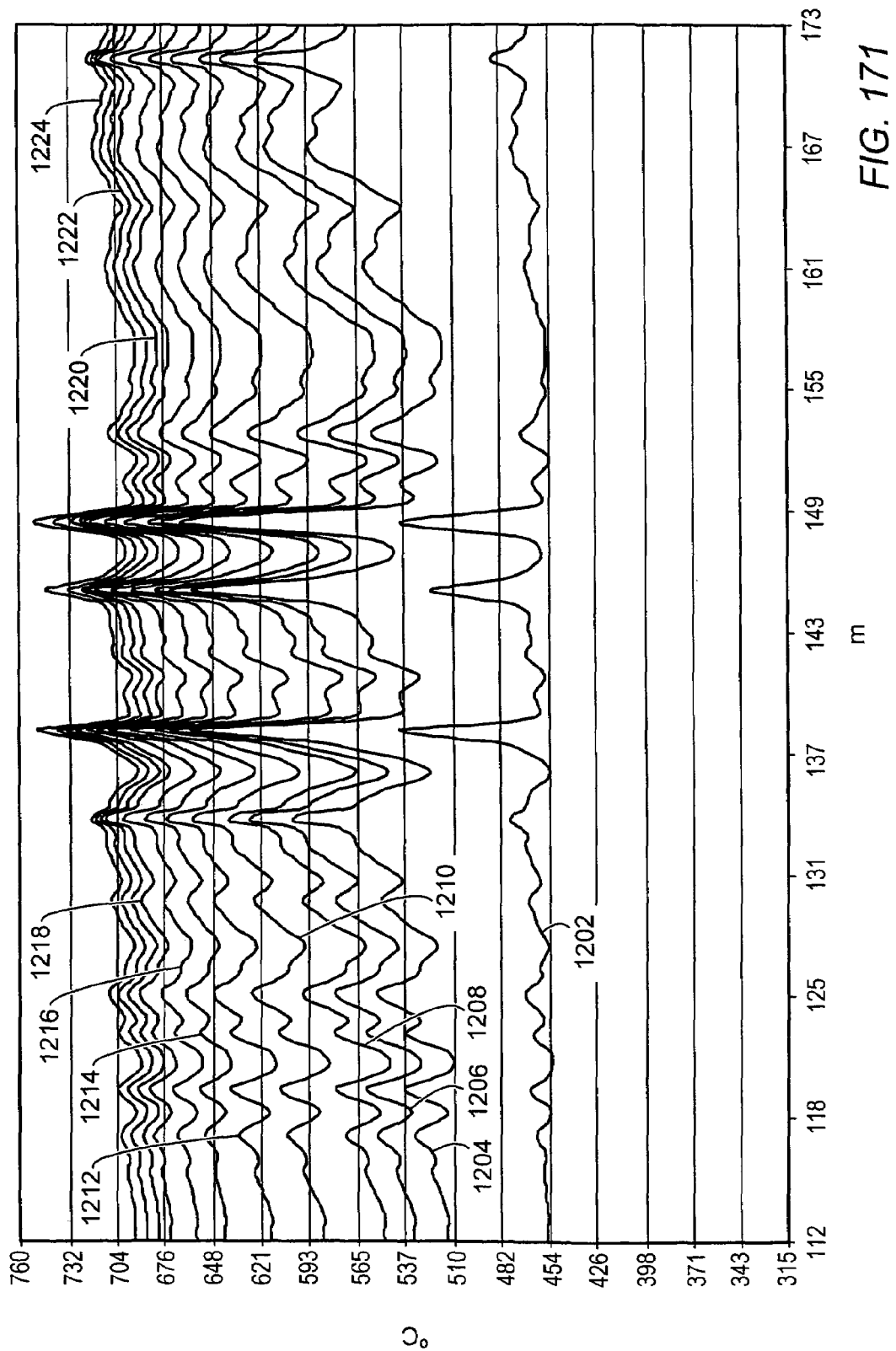

FIG. 171 displays temperature of the center conductor of a conductor-in-conduit heater as a function of formation depth for a Curie temperature heater with a turndown ratio of 2:1.

Figure 172:
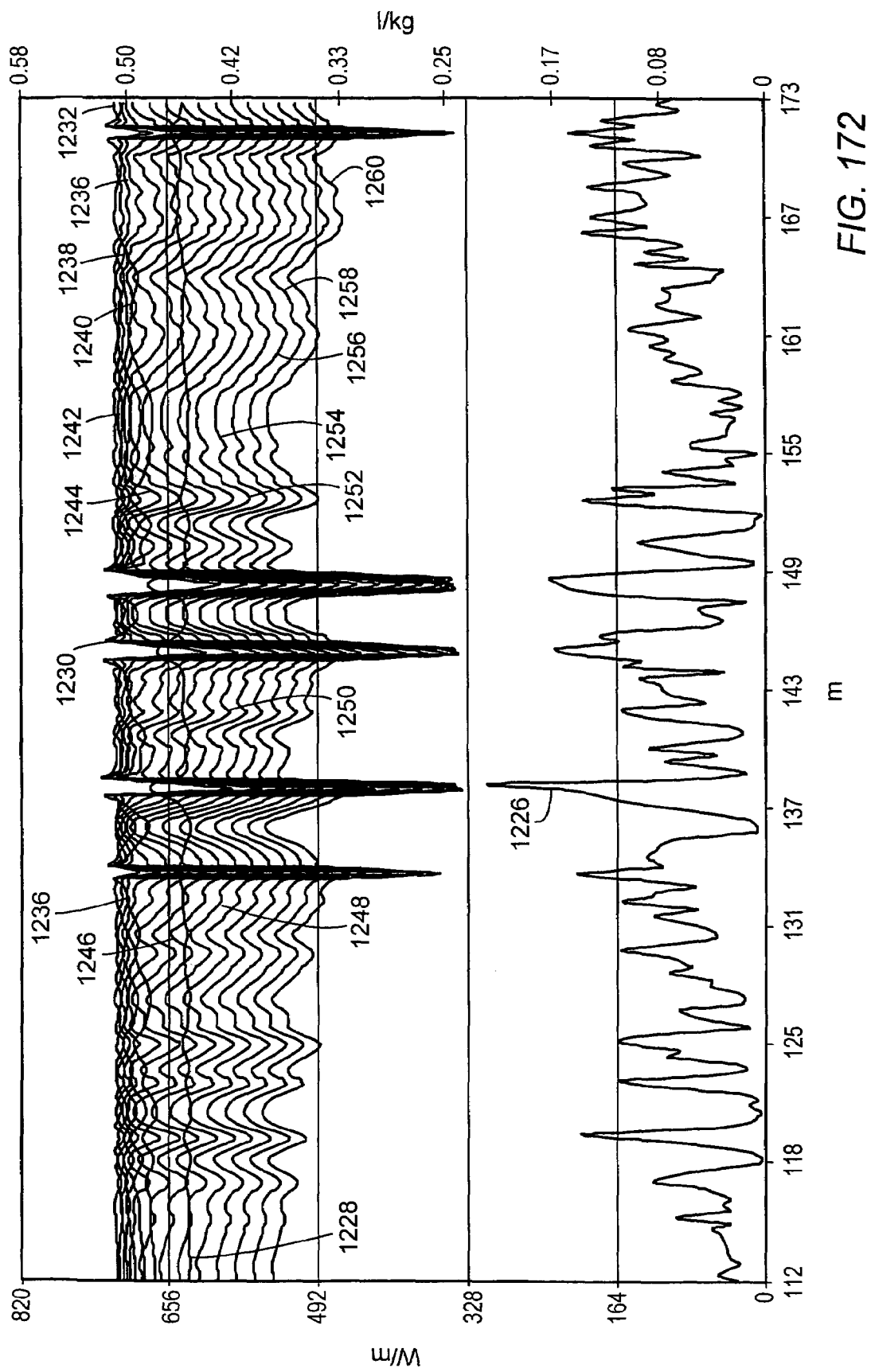

FIG. 172 displays heater heat flux through a formation for a turndown ratio of 2:1 along with the oil shale richness profile.

Figure 173:
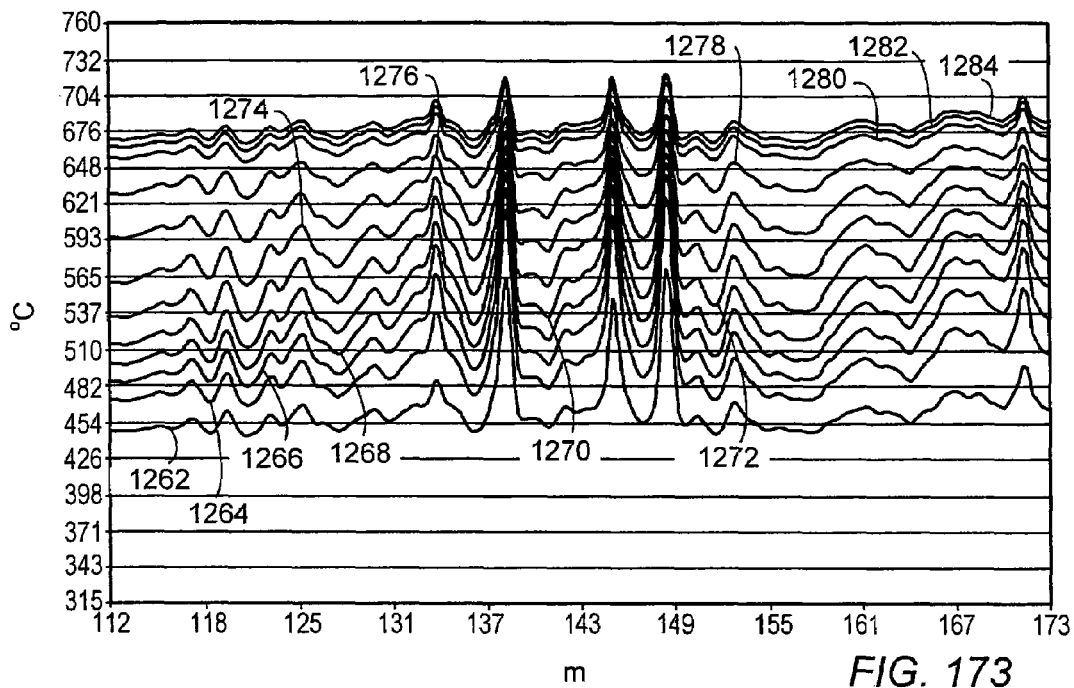

FIG. 173 displays heater temperature as a function of formation depth for a turndown ratio of 3:1.

Figure 174:
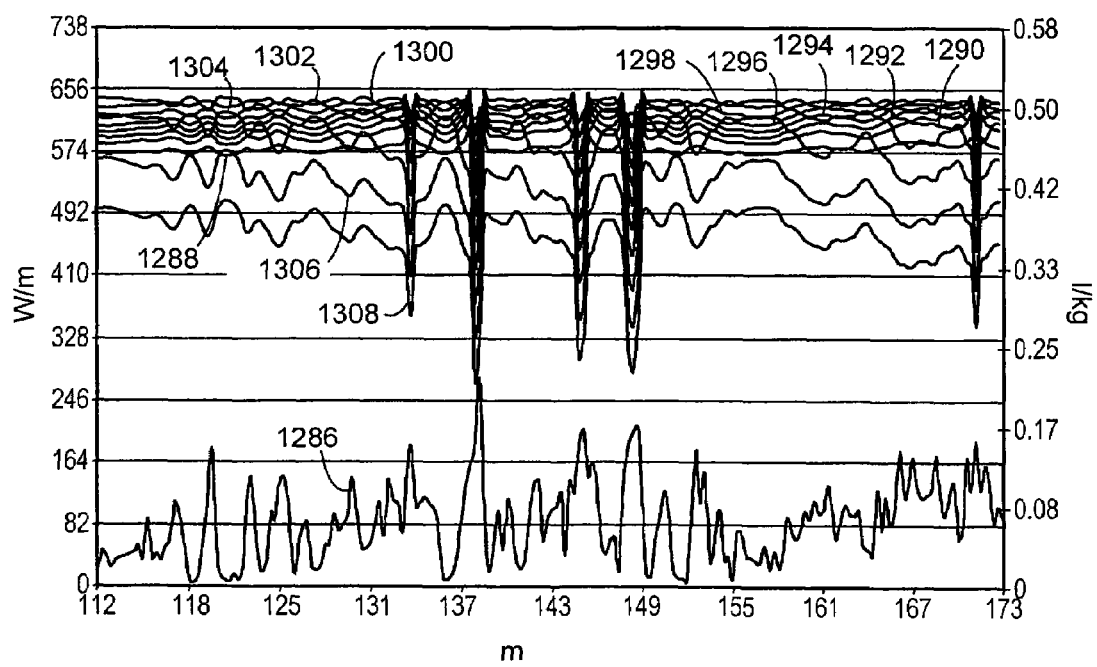

FIG. 174 displays heater heat flux through a formation for a turndown ratio of 3:1 along with the oil shale richness profile.

Figure 175:
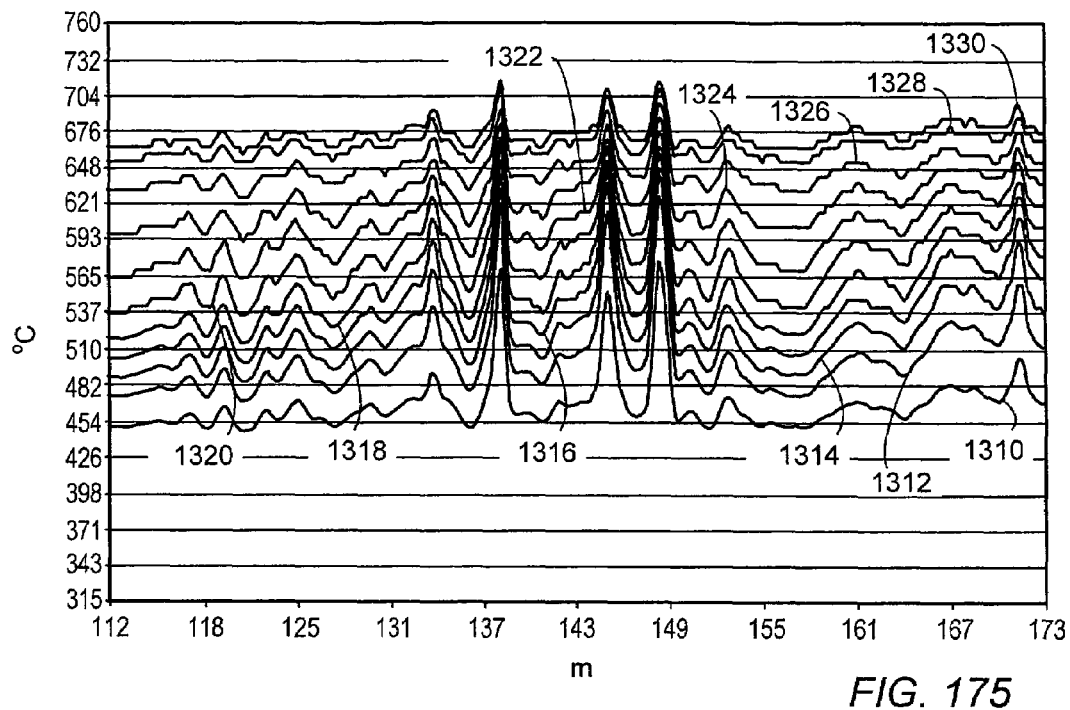

FIG. 175 displays heater temperature as a function of formation depth for a turndown ratio of 4:1.

Figure 176:
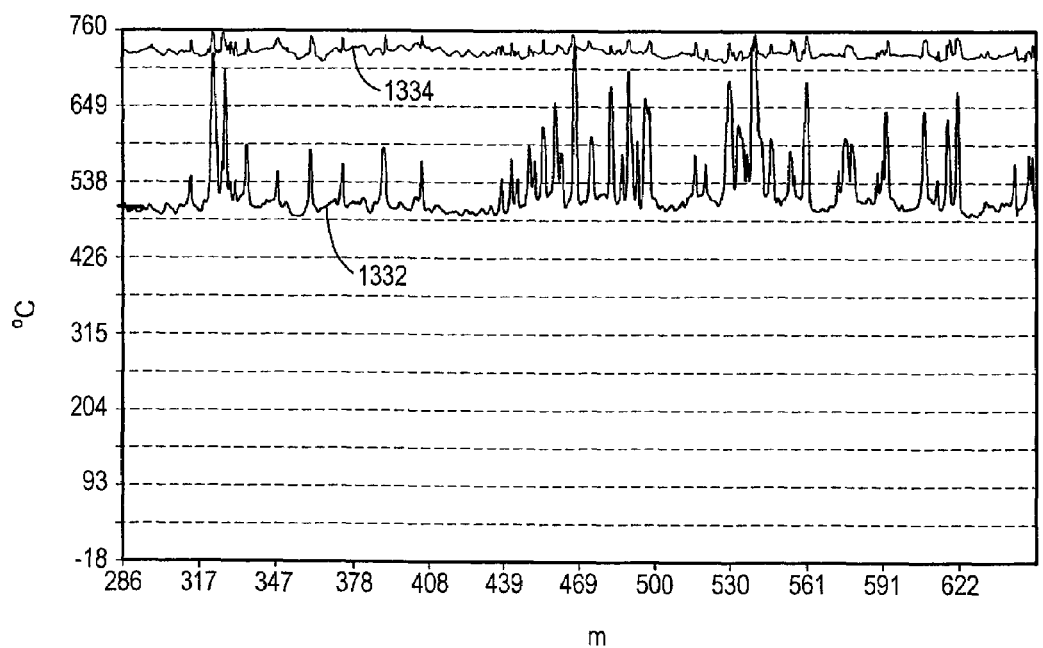

FIG. 176 depicts heater temperature versus depth for heaters used in a simulation for heating oil shale.

Figure 177:
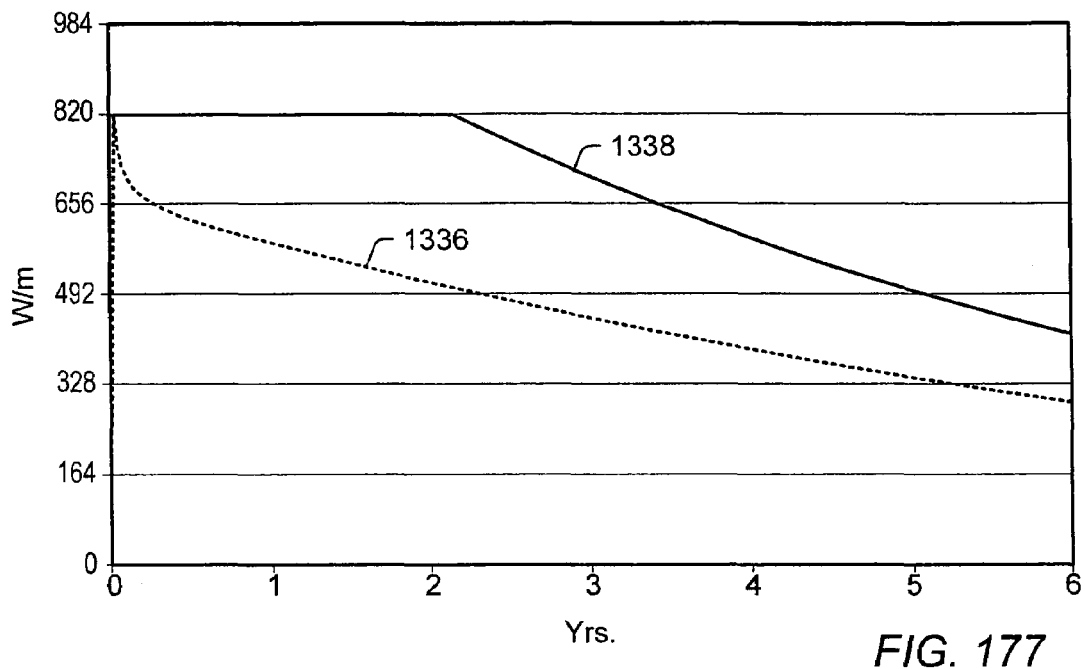

FIG. 177 depicts heater heat flux versus time for heaters used in a simulation for heating oil shale.

Figure 178:
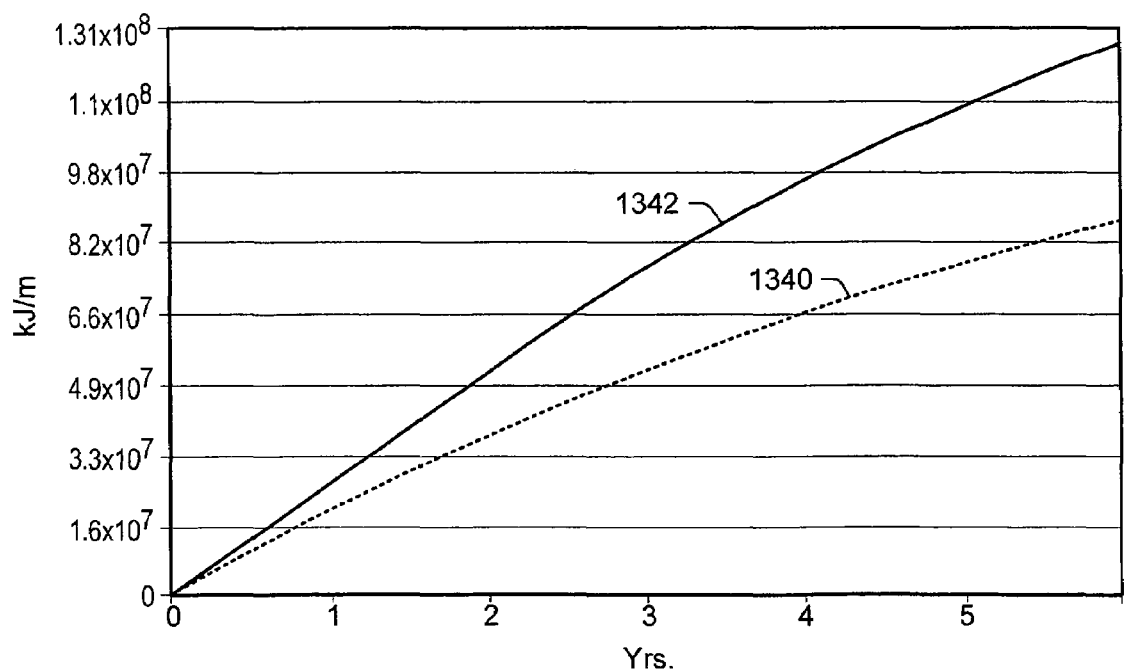

FIG. 178 depicts accumulated heat input versus time in a simulation for heating oil shale.

Figure 65:
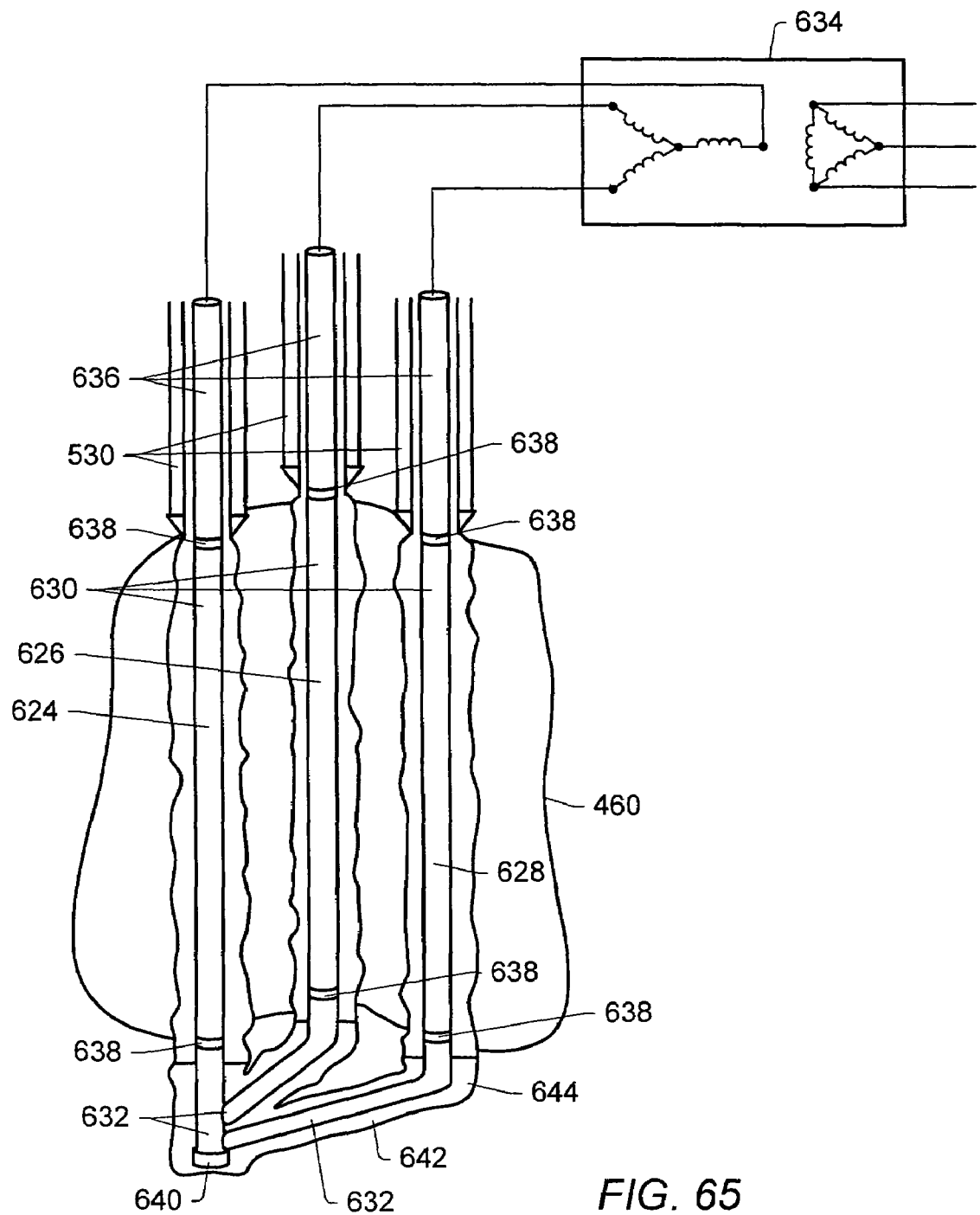
FIG. 65 depicts an embodiment of three heaters coupled in a three-phase configuration.
Figure 67:
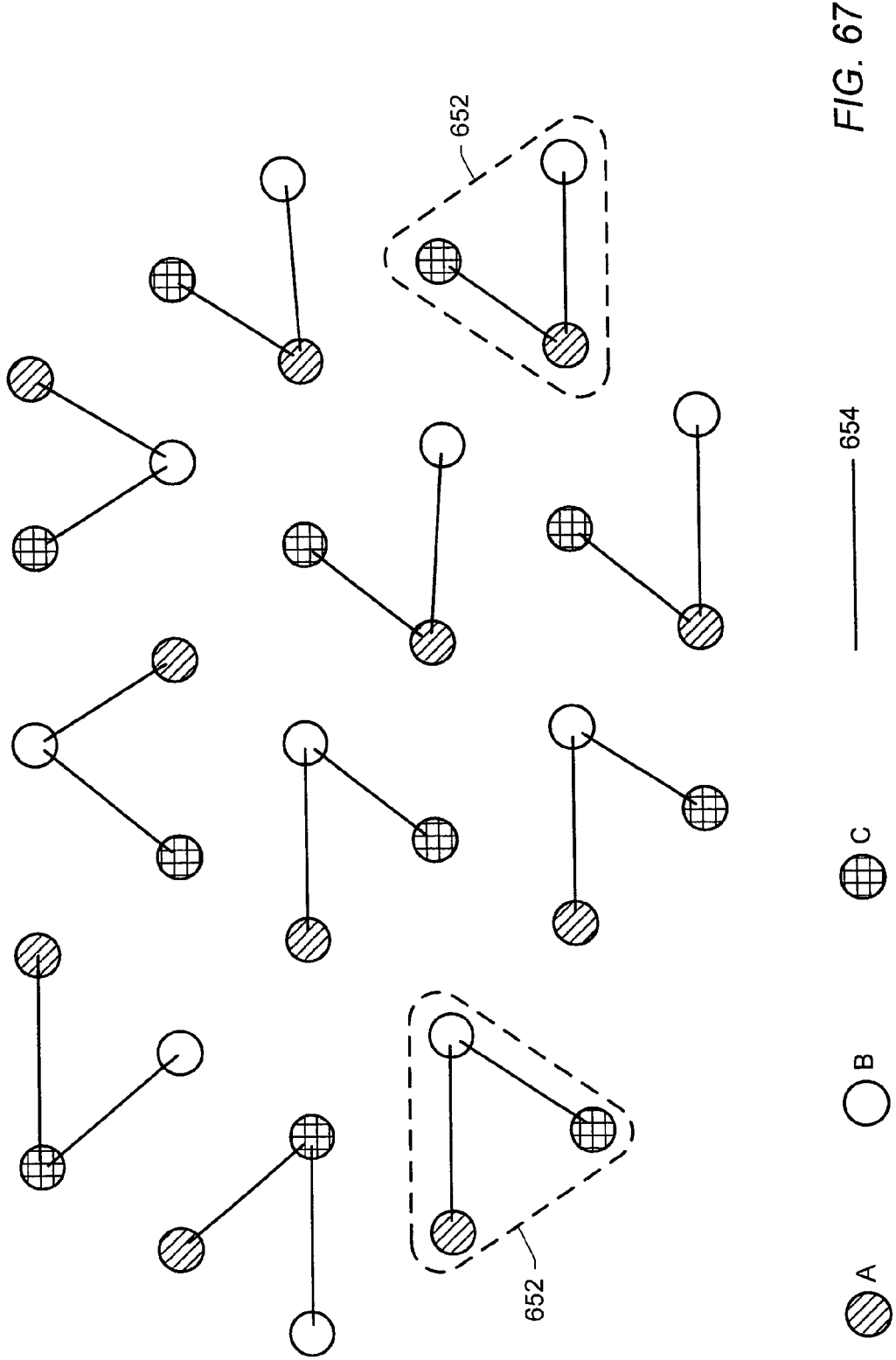
FIG. 67 depicts a top view representation of an embodiment of a plurality of triads of three-phase heaters in a formation.
Figure 179:
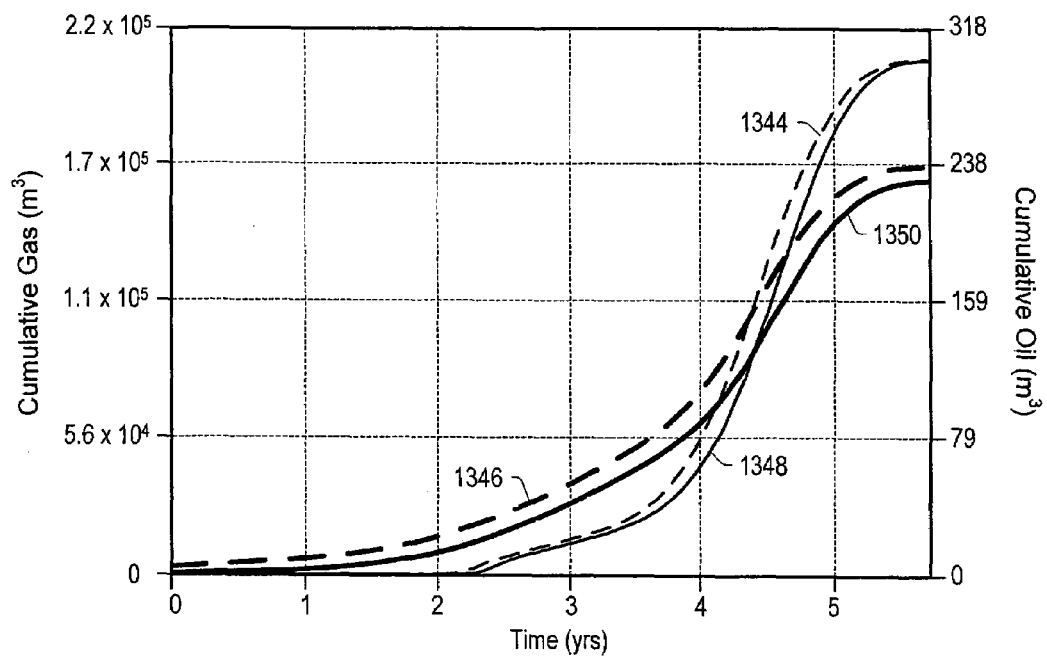

FIG. 179 depicts cumulative gas production and cumulative oil production versus time found from a STARS simulation using the heaters and heater pattern depicted in FIGS. 65 and 67.

Figure 180:
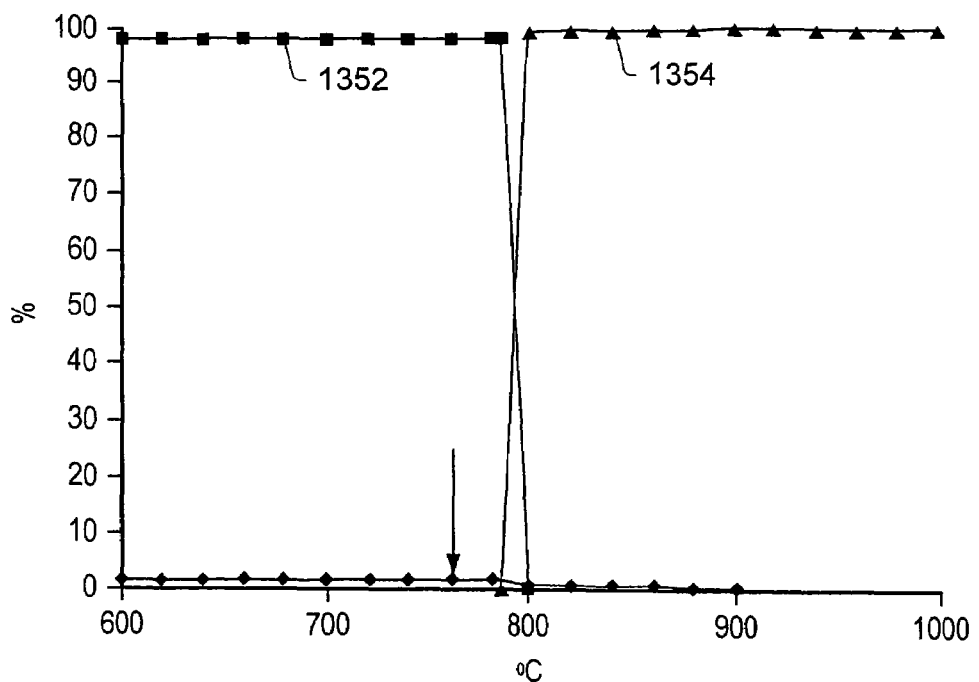

FIG. 180 depicts experimental calculations of weight percentages of ferrite and austenite phases versus temperature for iron alloy TC3.

Figure 181:
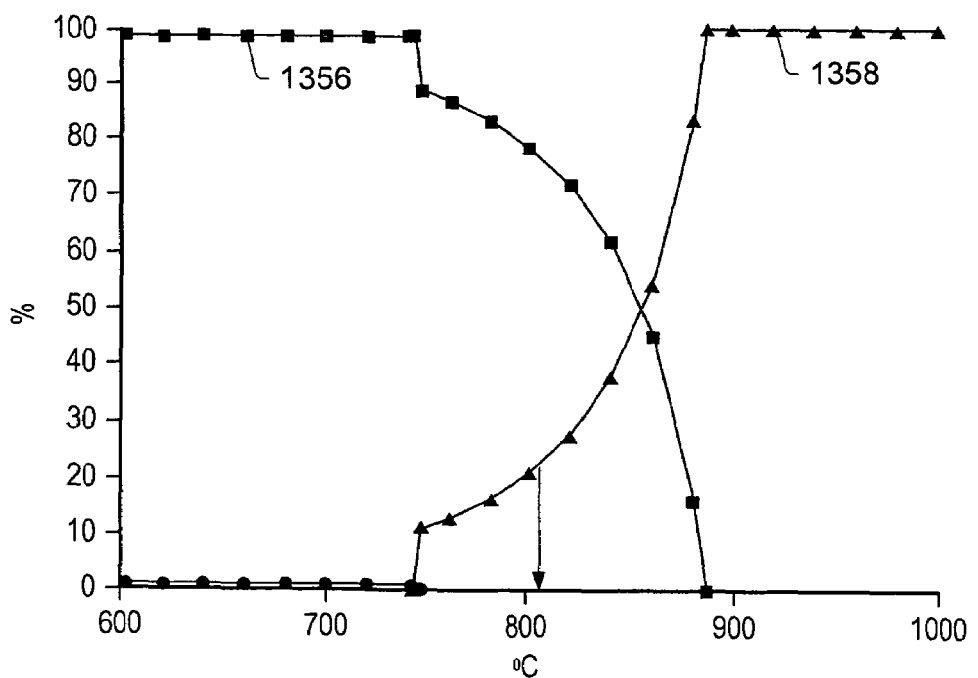

FIG. 181 depicts experimental calculations of weight percentages of ferrite and austenite phases versus temperature for iron alloy FM-4.

Figure 182:
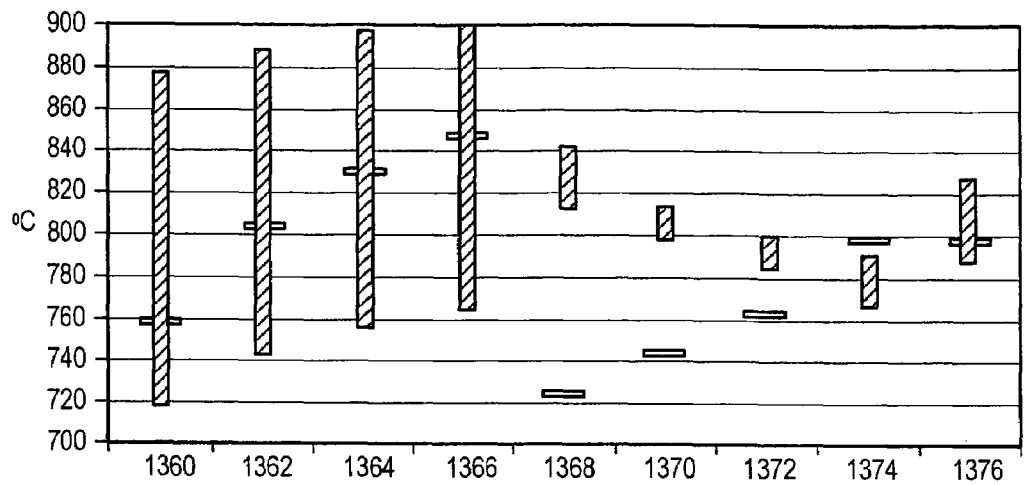

FIG. 182 depicts the Curie temperature and phase transformation temperature range for several iron alloys.

Figure 183:
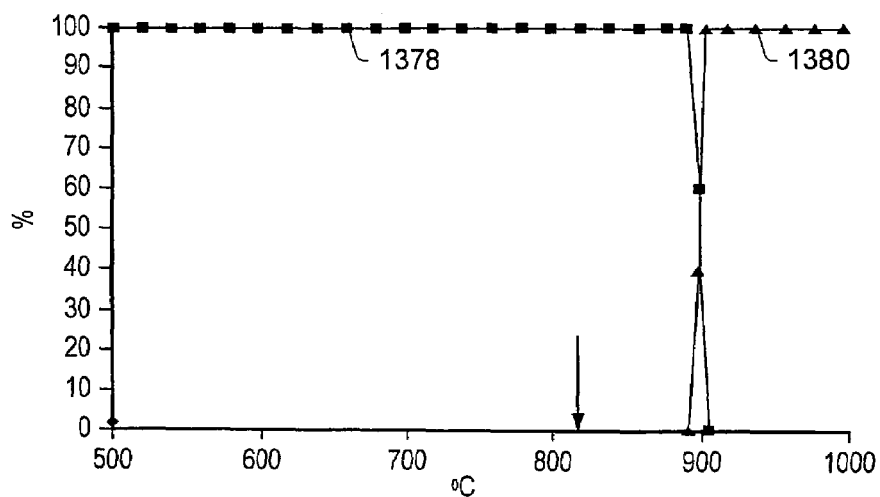

FIG. 183 depicts experimental calculations of weight percentages of ferrite and austenite phases versus temperature for an iron-cobalt alloy with 5.63% by weight cobalt and 0.4% by weight manganese.

Figure 184:
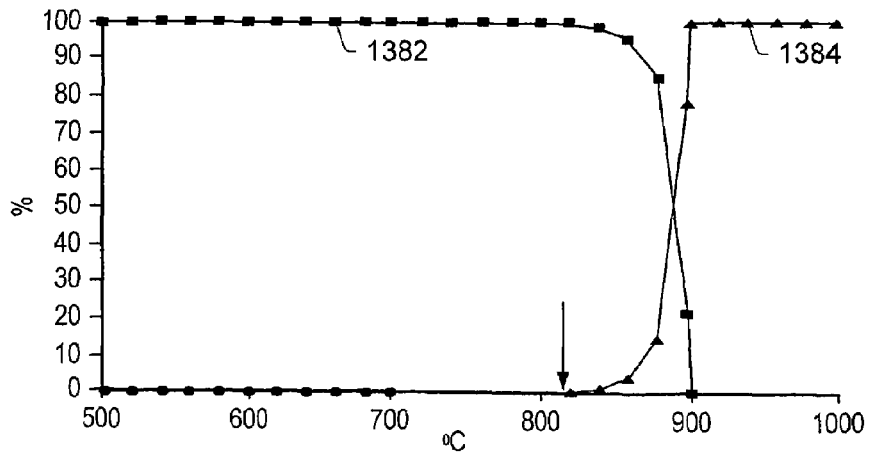

FIG. 184 depicts experimental calculations of weight percentages of ferrite and austenite phases versus temperature for an iron-cobalt alloy with 5.63% by weight cobalt, 0.4% by weight manganese, and 0.01% by weight carbon.

Figure 185:
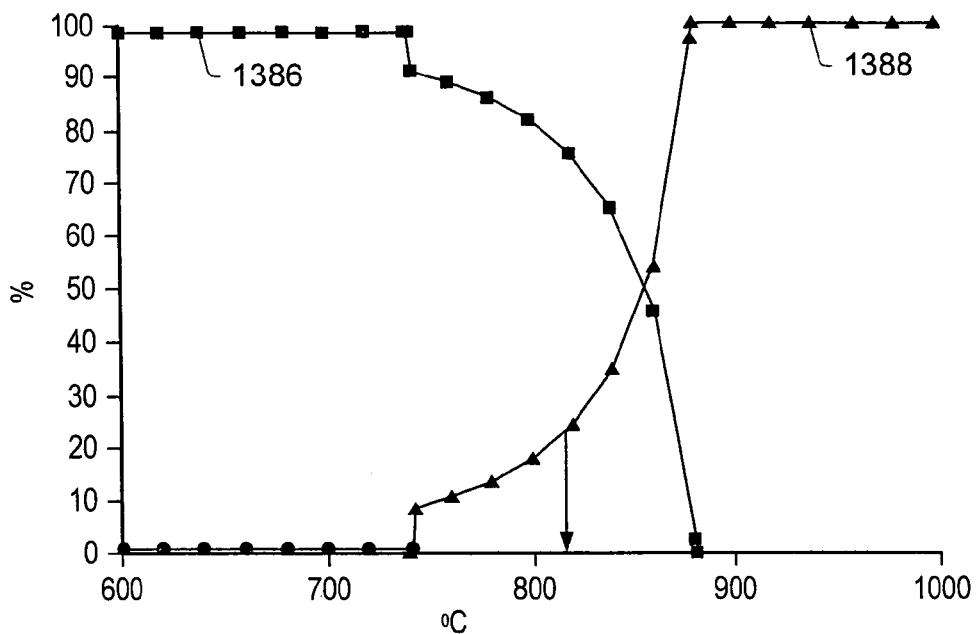

FIG. 185 depicts experimental calculations of weight percentages of ferrite and austenite phases versus temperature for an iron-cobalt alloy with 5.63% by weight cobalt, 0.4% by weight manganese, and 0.085% by weight carbon.

Figure 186:
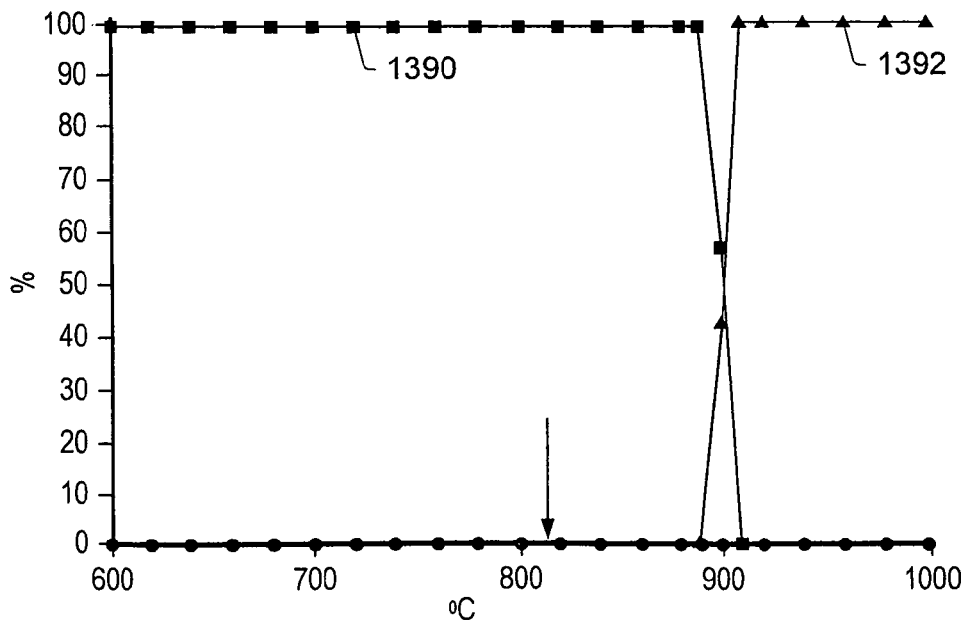

FIG. 186 depicts experimental calculations of weight percentages of ferrite and austenite phases versus temperature for an iron-cobalt alloy with 5.63% by weight cobalt, 0.4% by weight manganese, 0.085% by weight carbon, and 0.4% by weight titanium.

Figure 187:
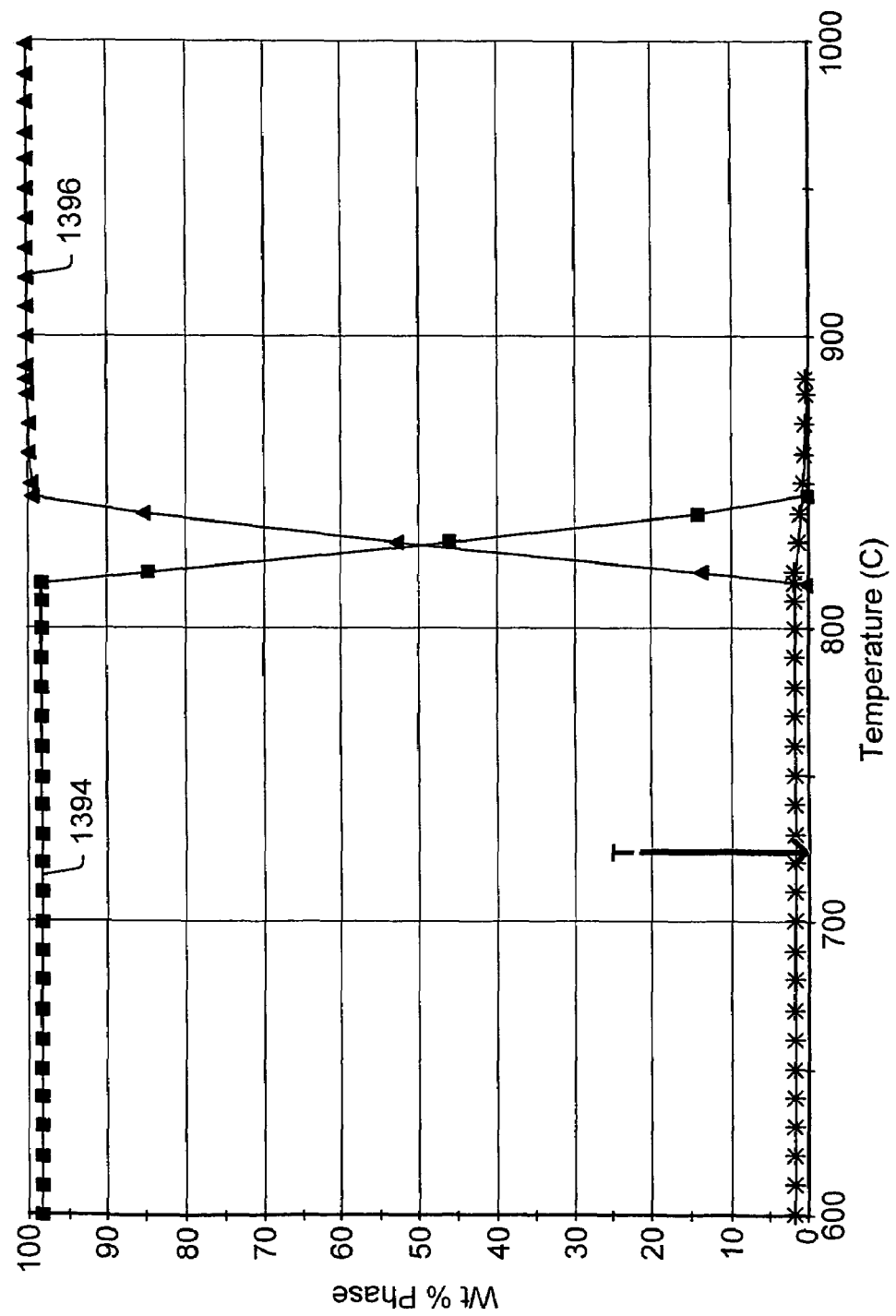

FIG. 187 depicts experimental calculations of weight percentages of ferrite and austenite phases versus temperature for an iron-chromium alloys having 12.25% by weight chromium, 0.1% by weight carbon, 0.5% by weight manganese, and 0.5% by weight silicon.

Figure 188:
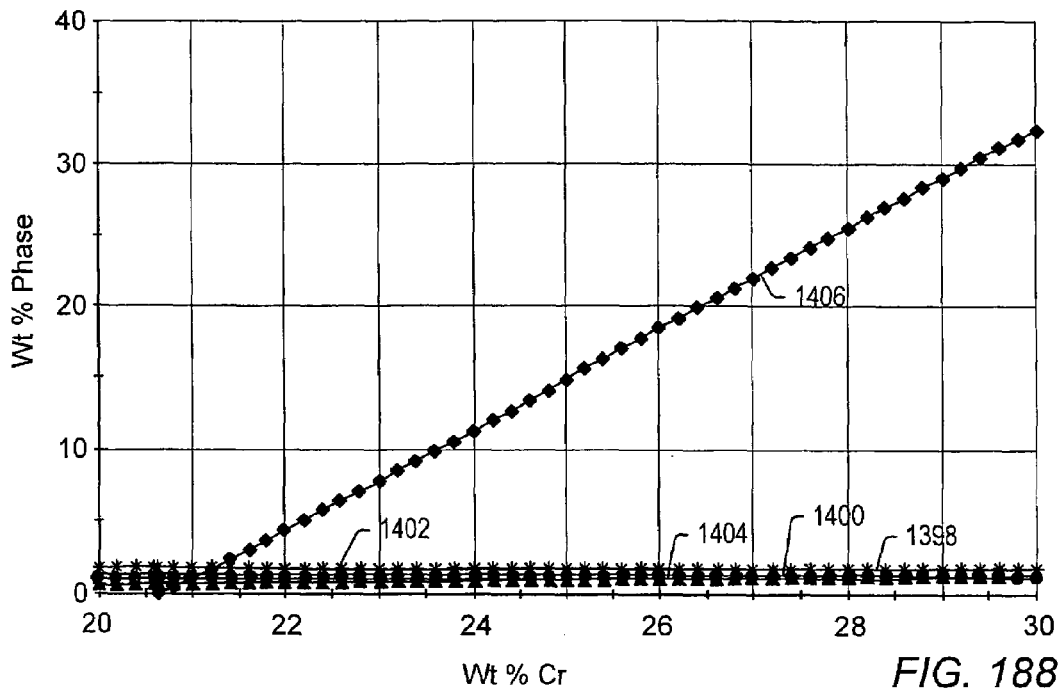

FIG. 188 depicts experimental calculation of weight percentages of phases versus weight percentages of chromium in an alloy.

Figure 189:
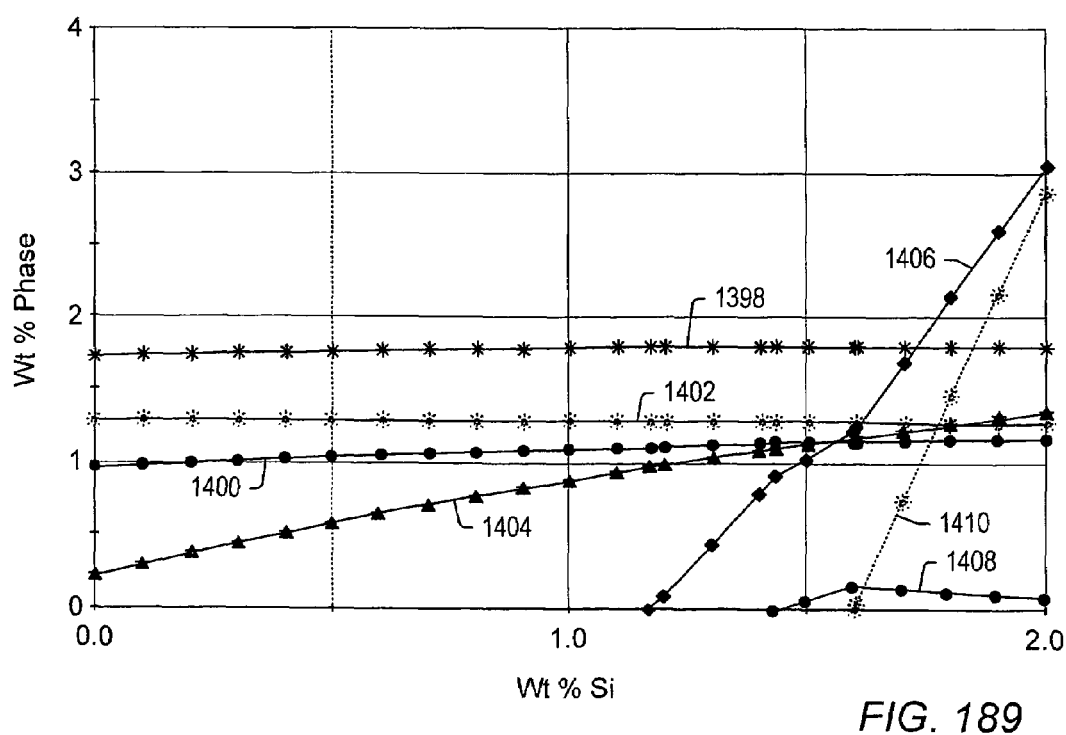

FIG. 189 depicts experimental calculation of weight percentages of phases versus weight percentages of silicon in an alloy.

Figure 190:
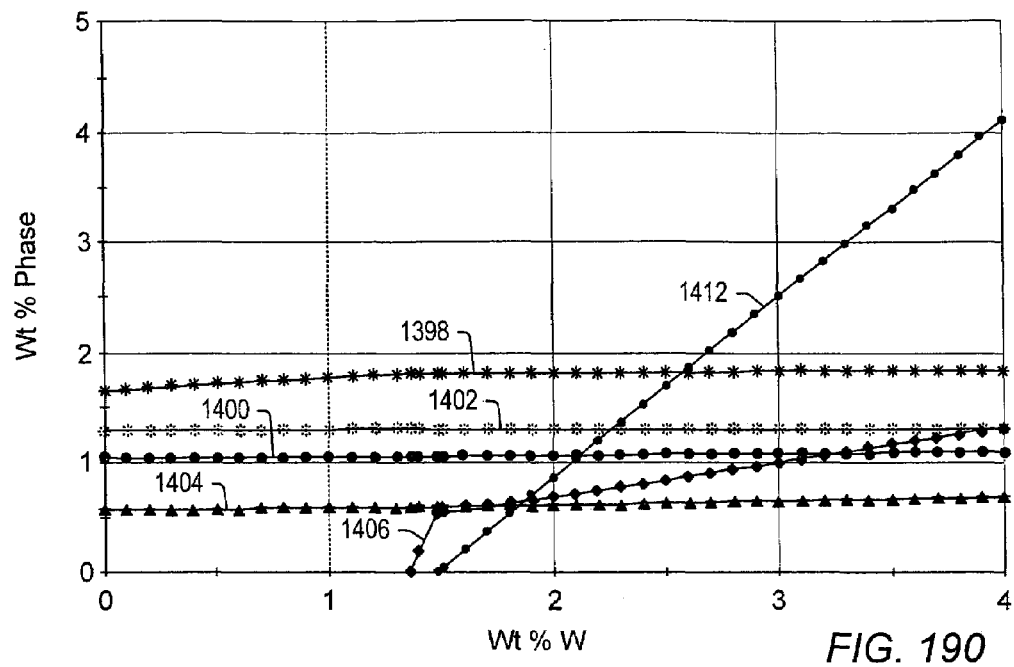

FIG. 190 depicts experimental calculation of weight percentages of phases versus weight percentages of tungsten in an alloy.

Figure 191:
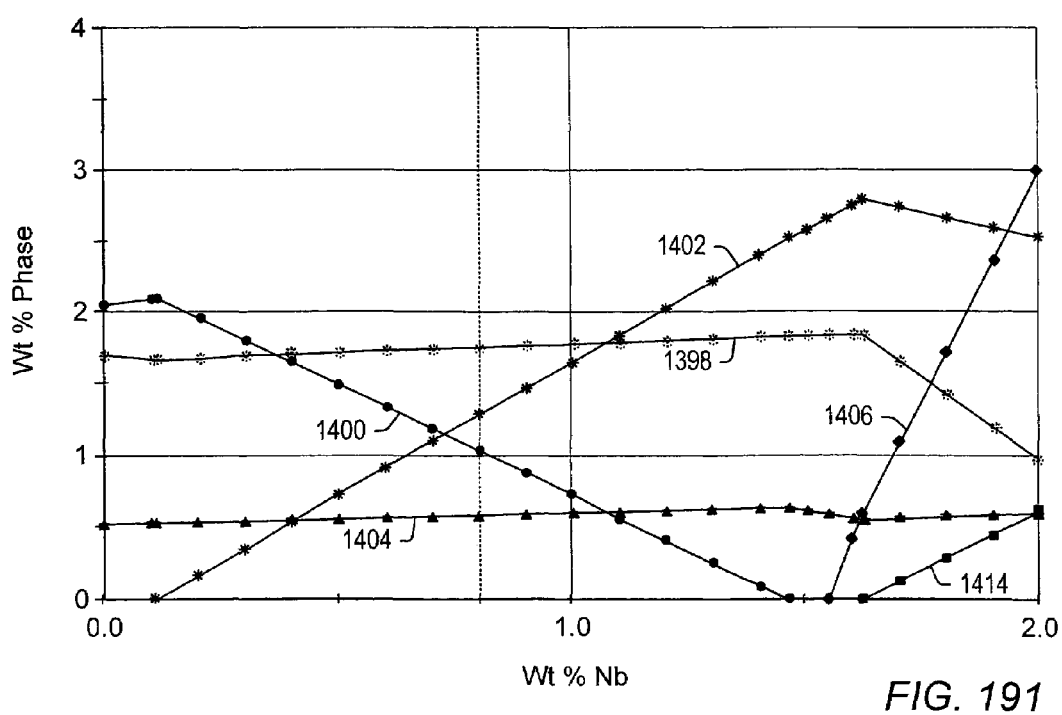

FIG. 191 depicts experimental calculation of weight percentages of phases versus weight percentages of niobium in an alloy.

Figure 192:
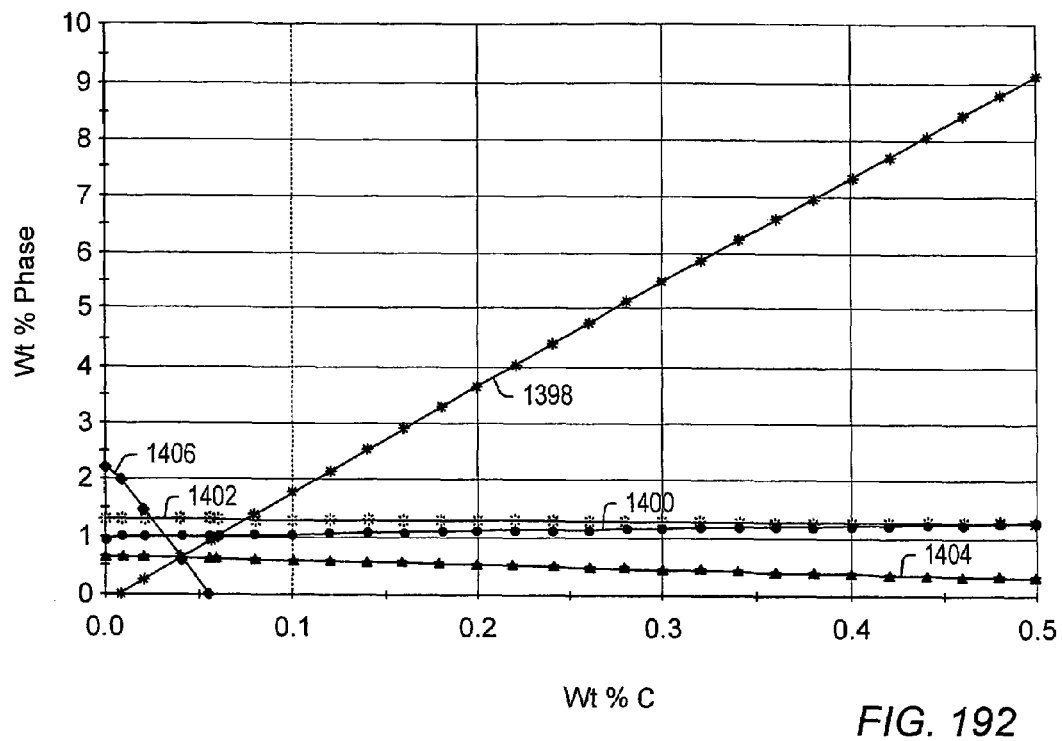

FIG. 192 depicts experimental calculation of weight percentages of phases versus weight percentages of carbon in an alloy.

Figure 193:
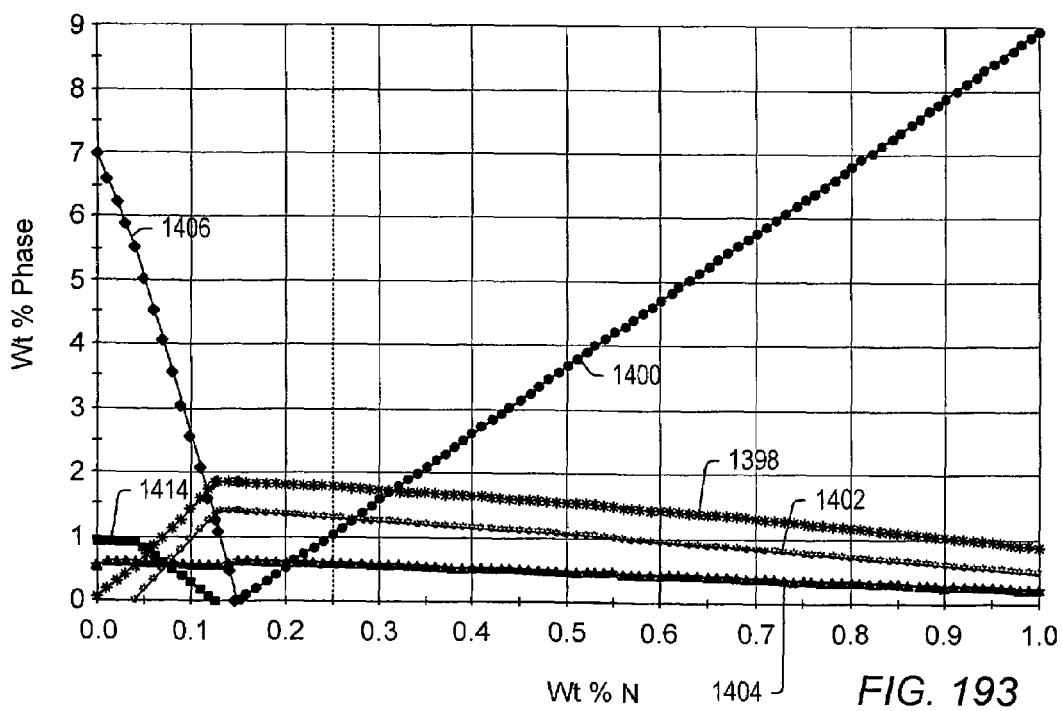

FIG. 193 depicts experimental calculation of weight percentages of phases versus weight percentages of nitrogen in an alloy.

Figure 194:
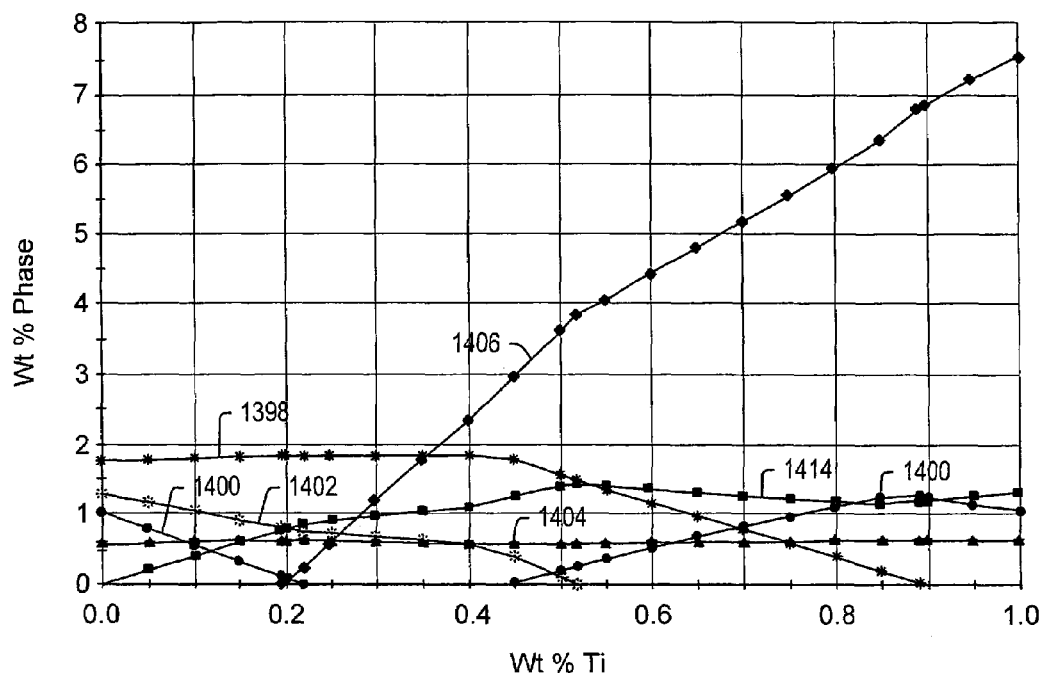

FIG. 194 depicts experimental calculation of weight percentages of phases versus weight percentages of titanium in an alloy.

Figure 195:
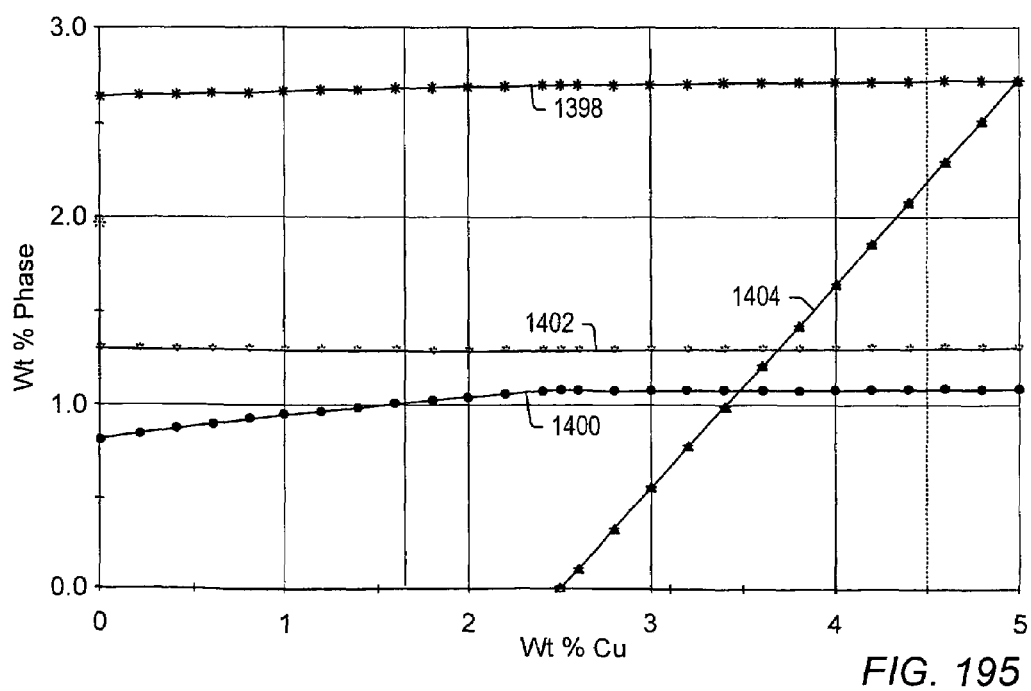

FIG. 195 depicts experimental calculation of weight percentages of phases versus weight percentages of copper in an alloy.

Figure 196:
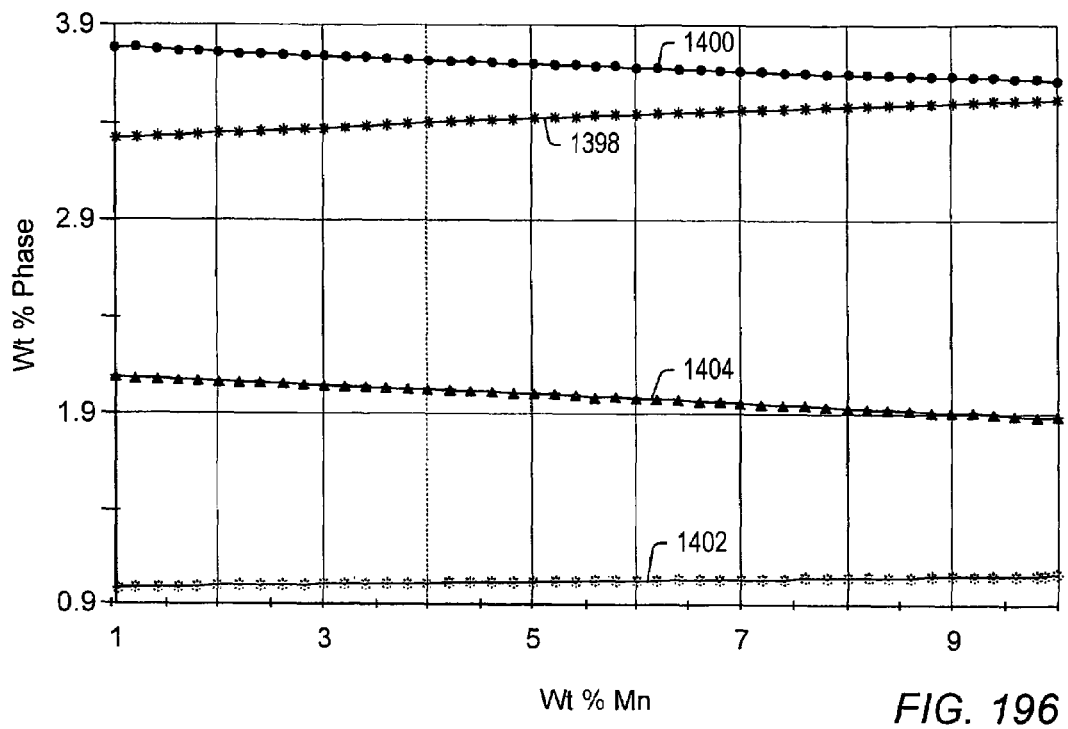

FIG. 196 depicts experimental calculation of weight percentages of phases versus weight percentages of manganese in an alloy.

Figure 197:
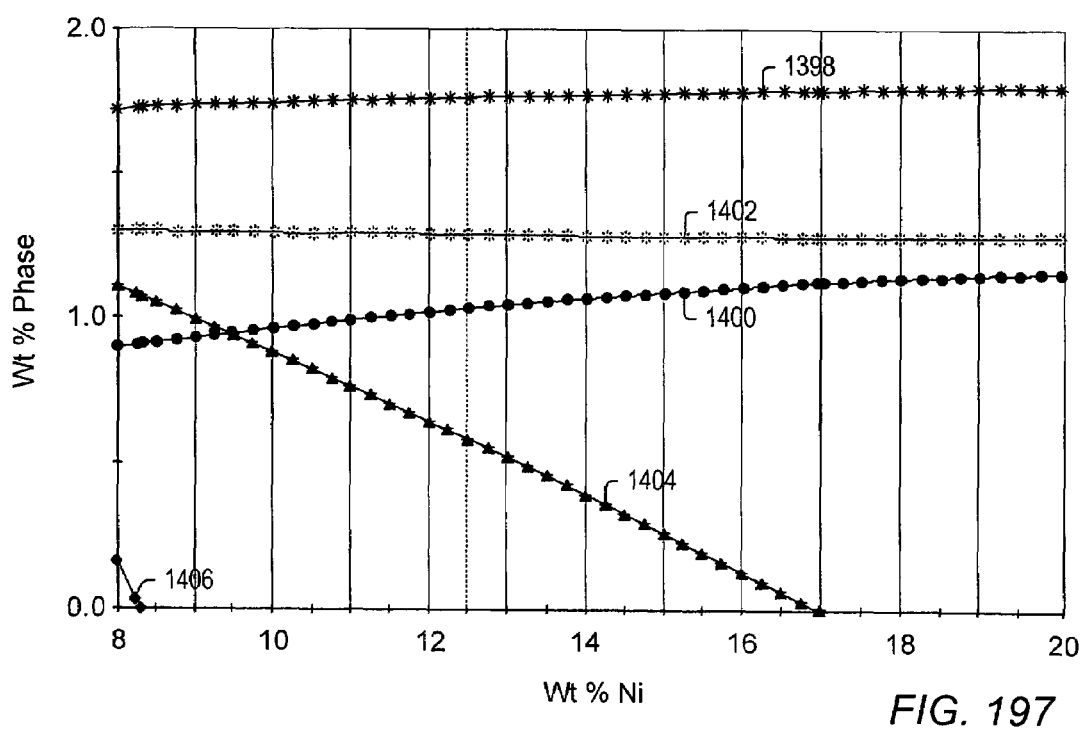

FIG. 197 depicts experimental calculation of weight percentages of phases versus weight percentages of nickel in an alloy.

Figure 198:
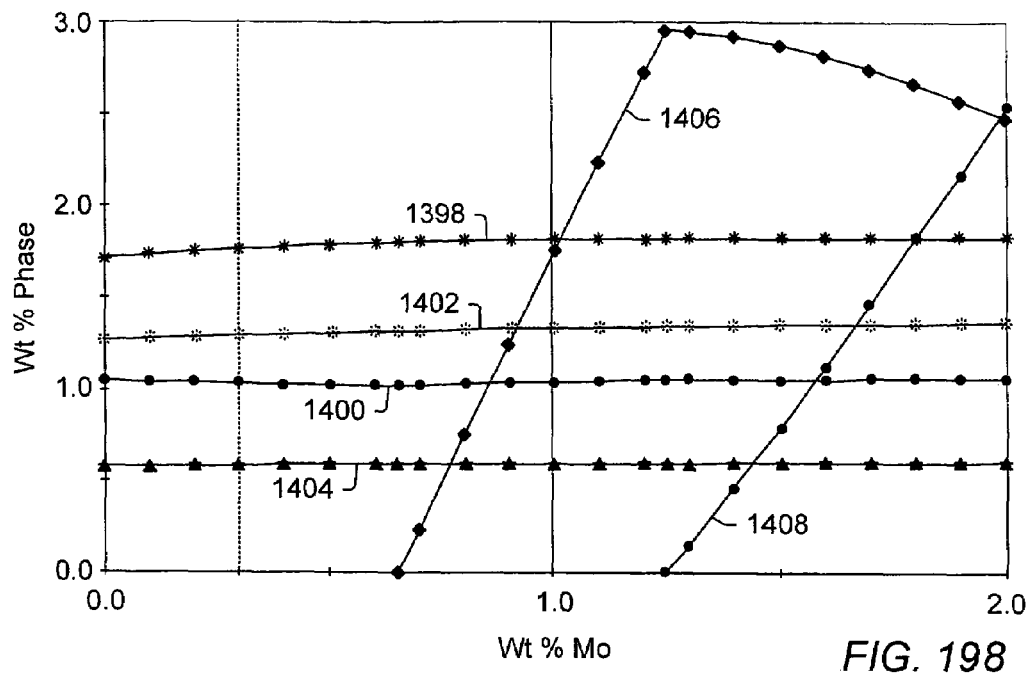

FIG. 198 depicts experimental calculation of weight percentages of phases versus weight percentages of molybdenum in an alloy.

Figure 199:
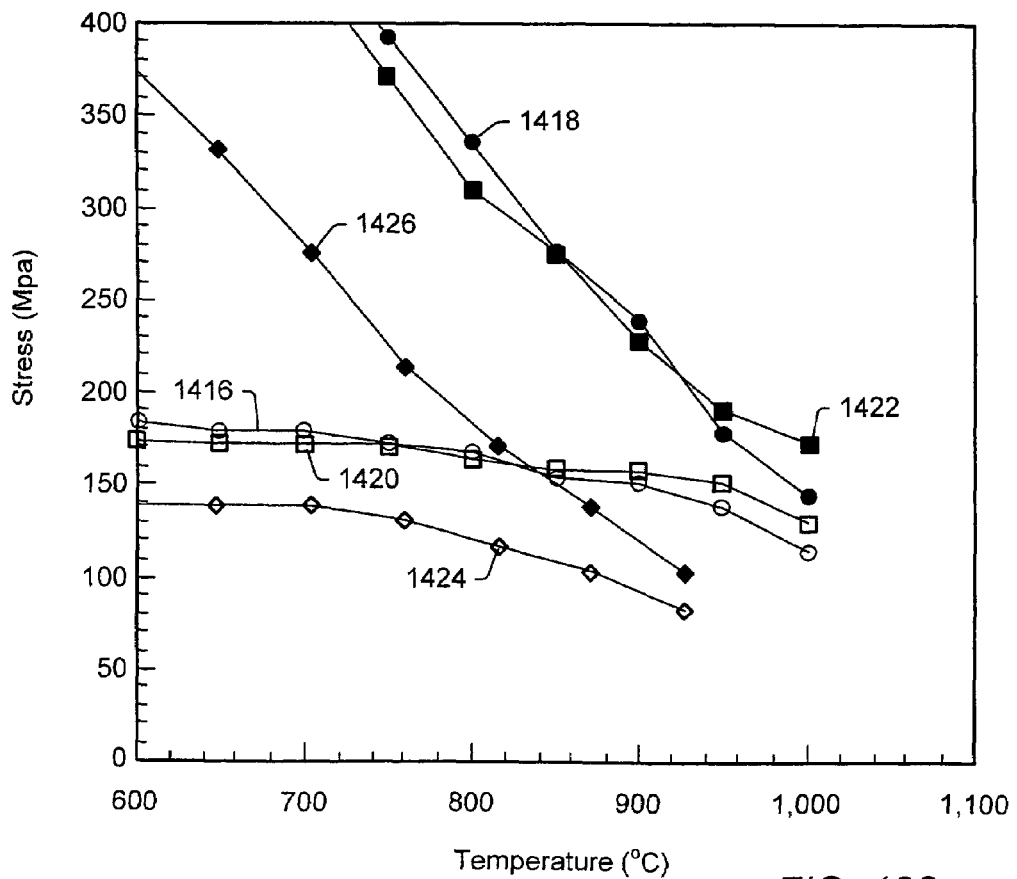

FIG. 199 depicts yield strengths and ultimate tensile strengths for different metals.

Figure 200:
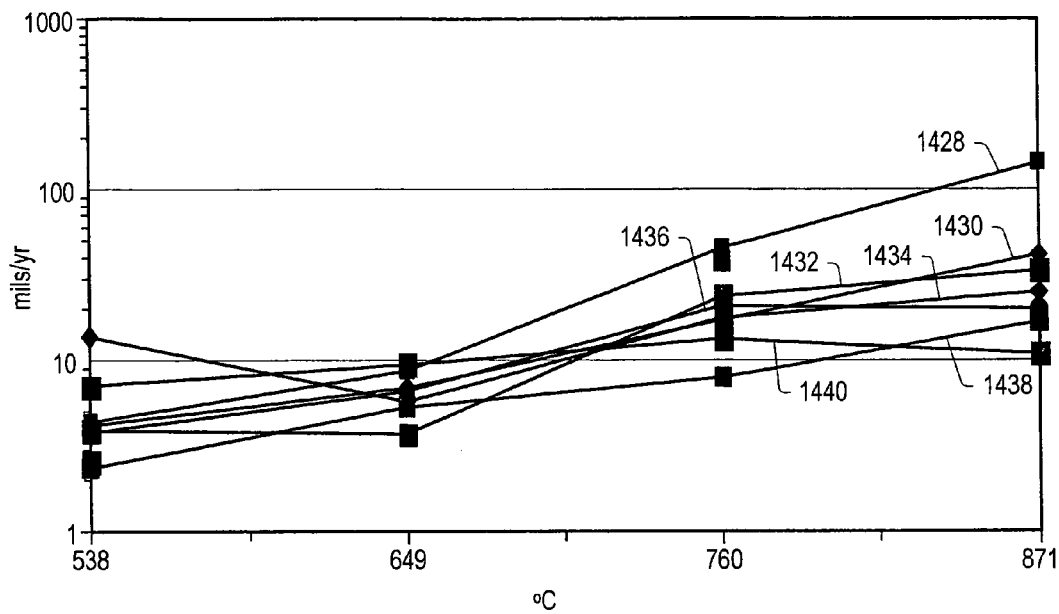

FIG. 200 depicts projected corrosion rates over a one-year period for several metals in a sulfidation atmosphere.

Figure 201:
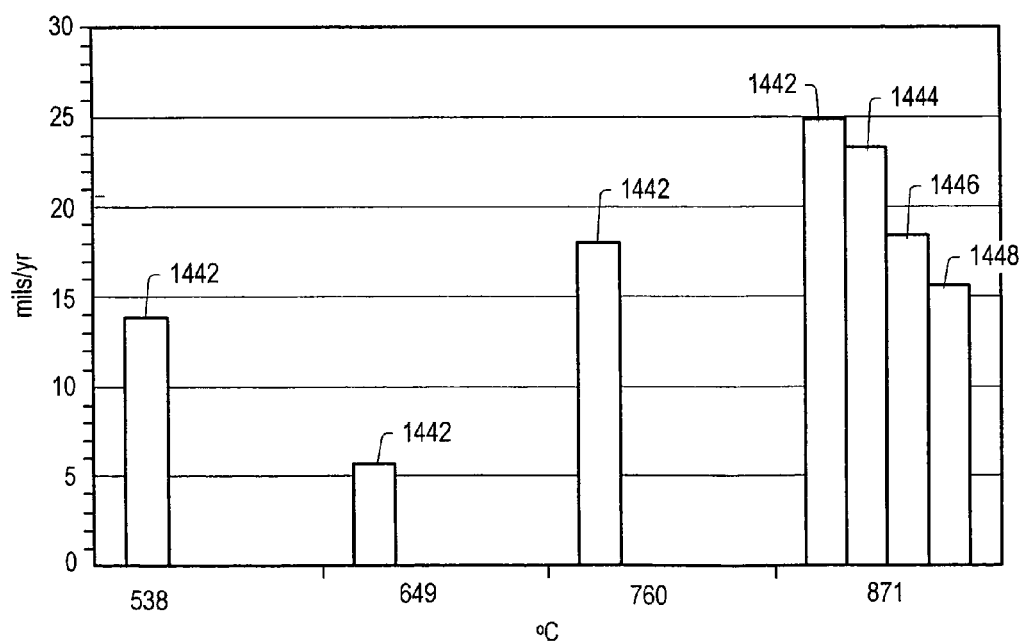

FIG. 201 depicts projected corrosion rates over a one-year period for 410 stainless steel and 410 stainless steel containing various amounts of cobalt in a sulfidation atmosphere.

Figure 202:
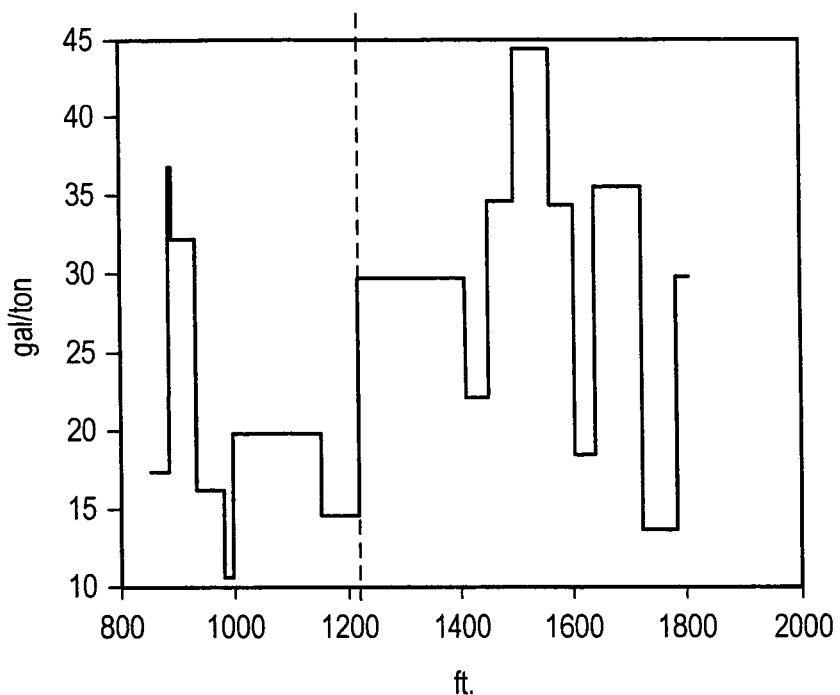

FIG. 202 depicts an example of richness of an oil shale formation (gal/ton) versus depth (ft).

Figure 203:
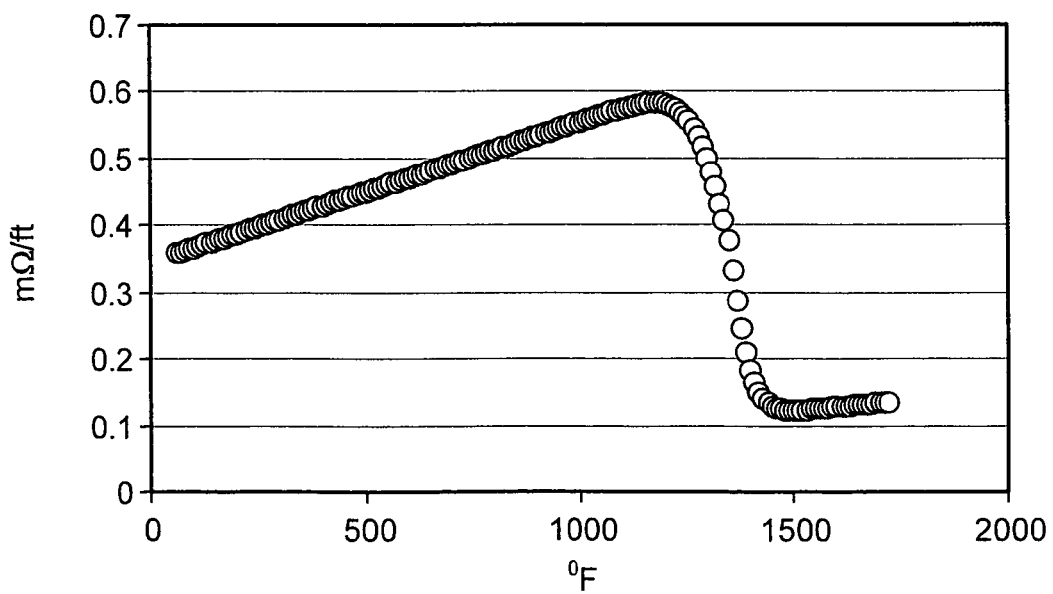

FIG. 203 depicts resistance per foot (mΩ/ft) versus temperature (° F.) profile of the first heater example.

Figure 204:
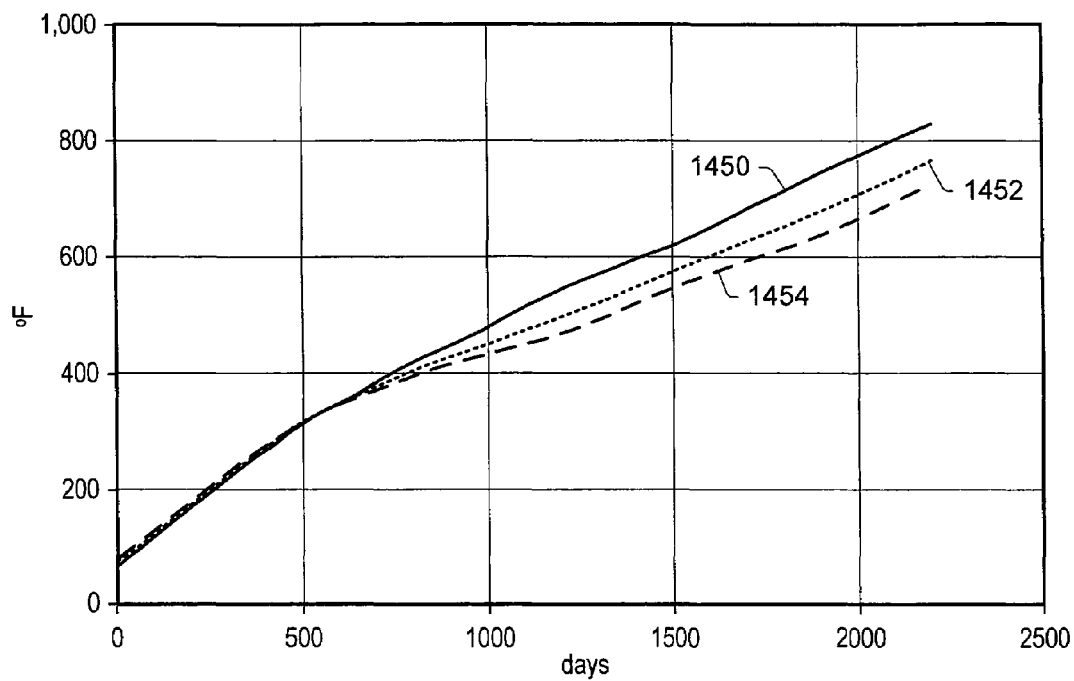

FIG. 204 depicts average temperature in the formation (° F.) versus time (days) as determined by the simulation for the first example.

Figure 205:
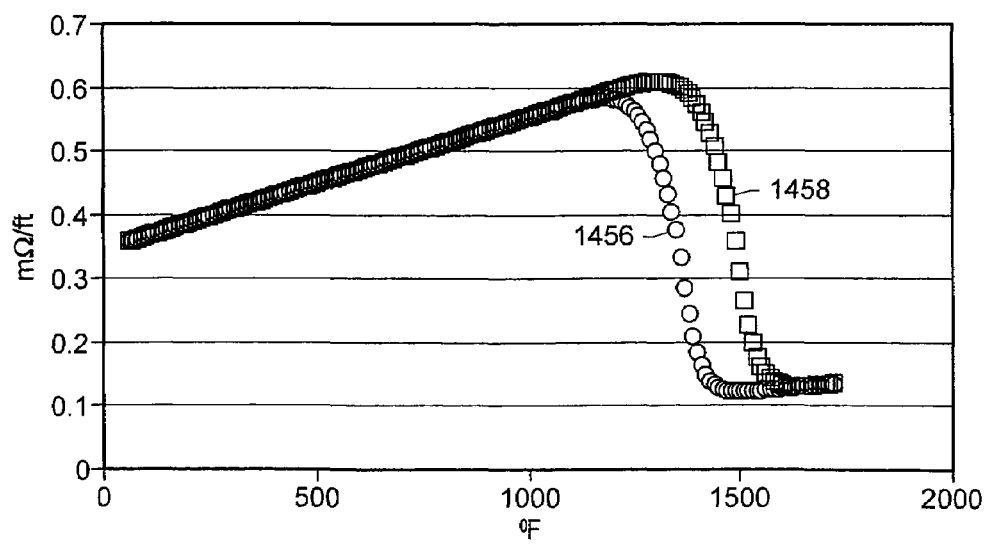

FIG. 205 depicts resistance per foot (mΩ/ft) versus temperature (° F.) for the second heater example.

Figure 206:
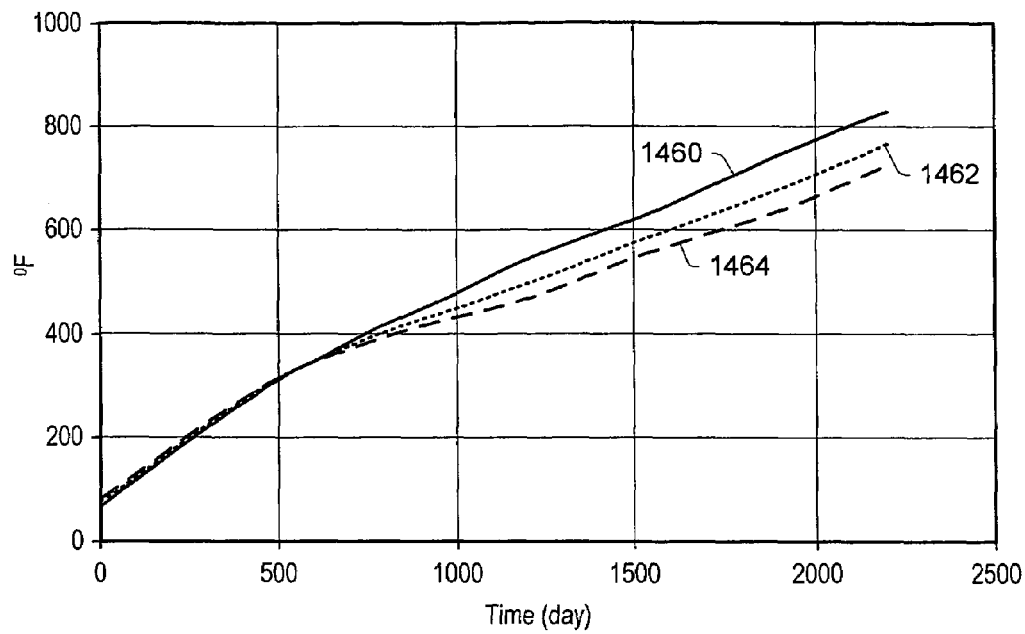

FIG. 206 depicts average temperature in the formation (° F.) versus time (days) as determined by the simulation for the second example.

Figure 207:
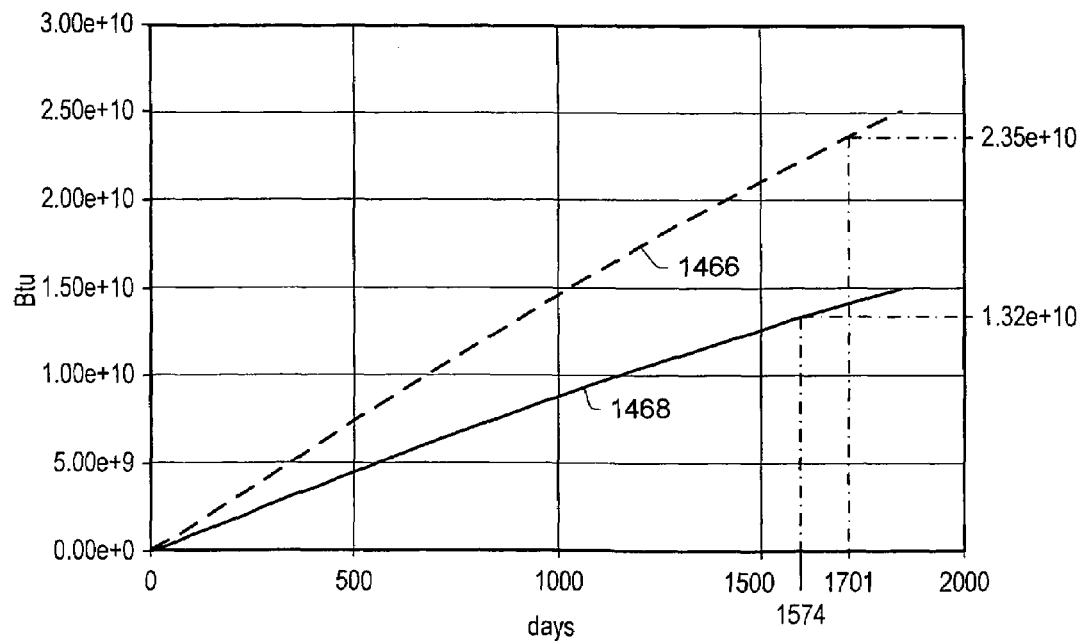

FIG. 207 depicts net heater energy input (Btu) versus time (days) for the second example.

Figure 208:
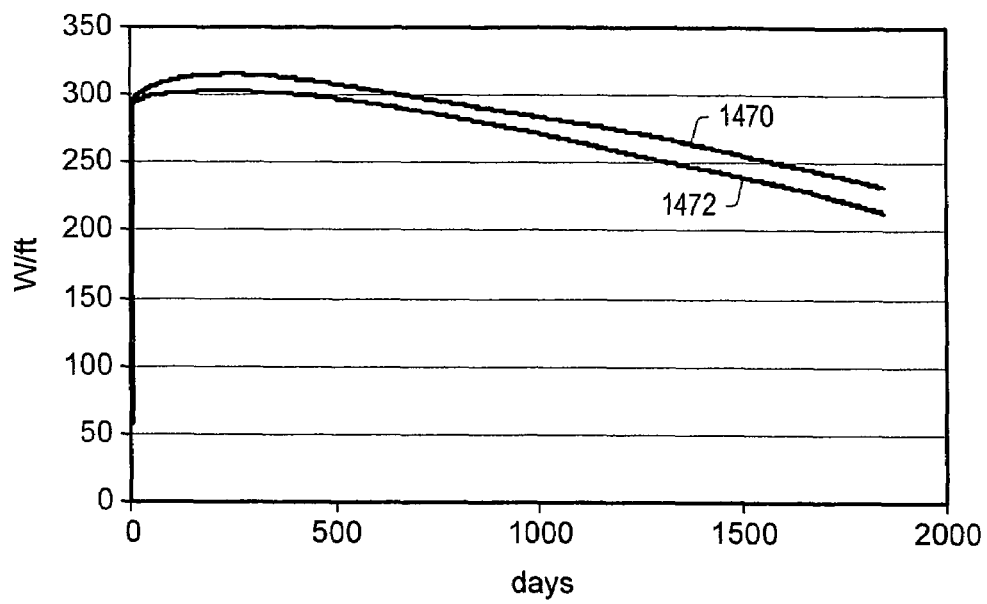

FIG. 208 depicts power injection per foot (W/ft) versus time (days) for the second example.

Figure 209:
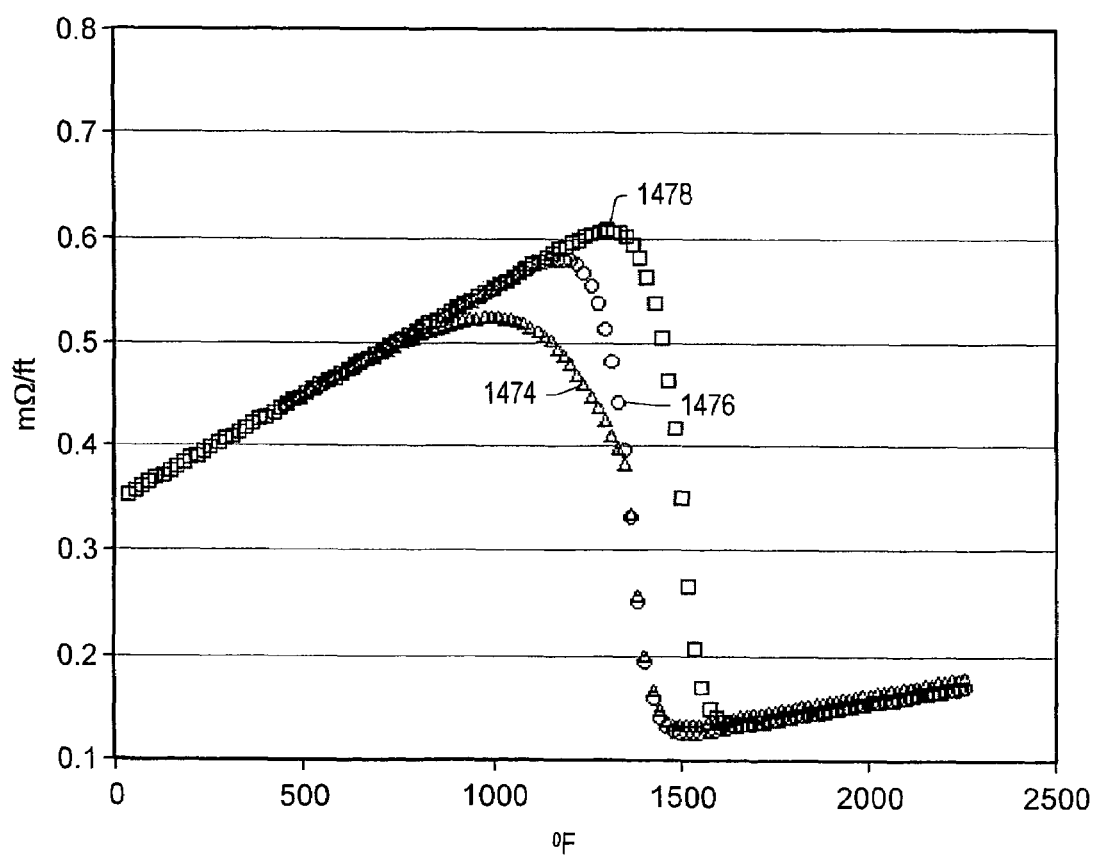

FIG. 209 depicts resistance per foot (mΩ/ft) versus temperature (° F.) for the third heater example.

Figure 210:
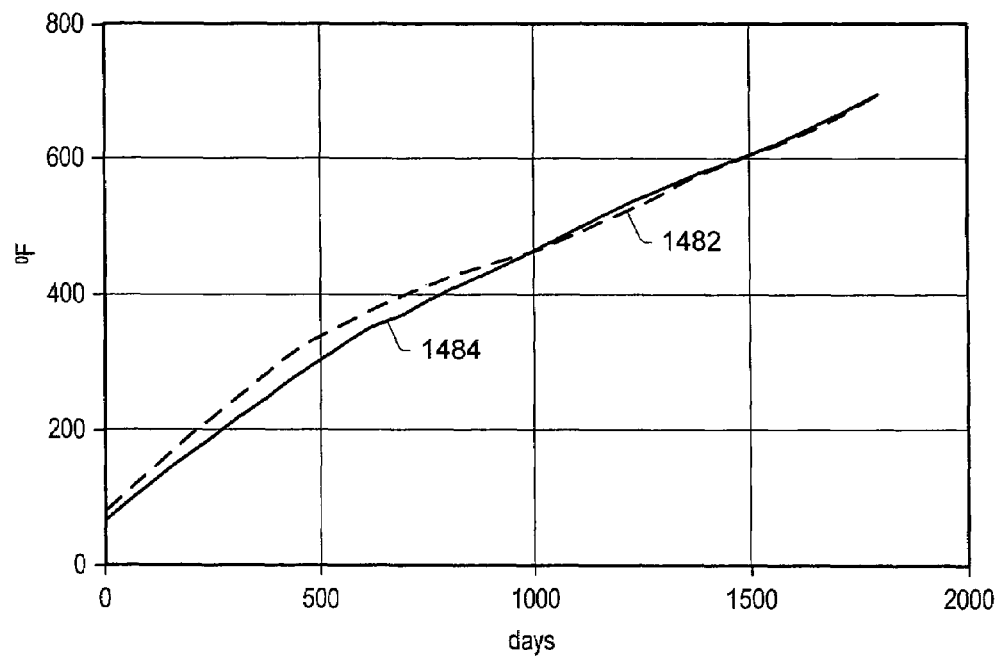

FIG. 210 depicts average temperature in the formation (° F.) versus time (days) as determined by the simulation for the third example.

Figure 211:
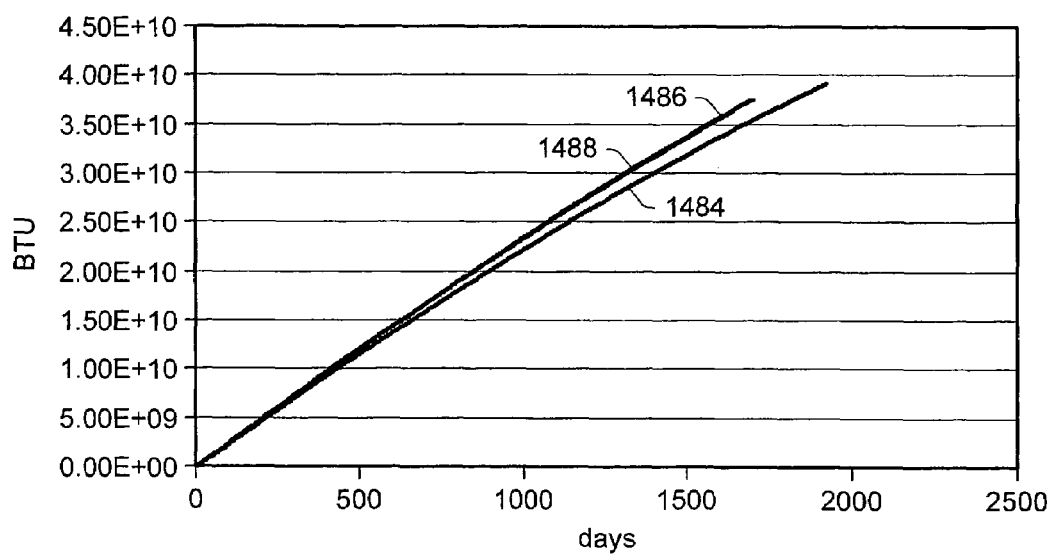

FIG. 211 depicts cumulative energy injection (Btu) versus time (days) for each of the three heater examples.

Figure 212:
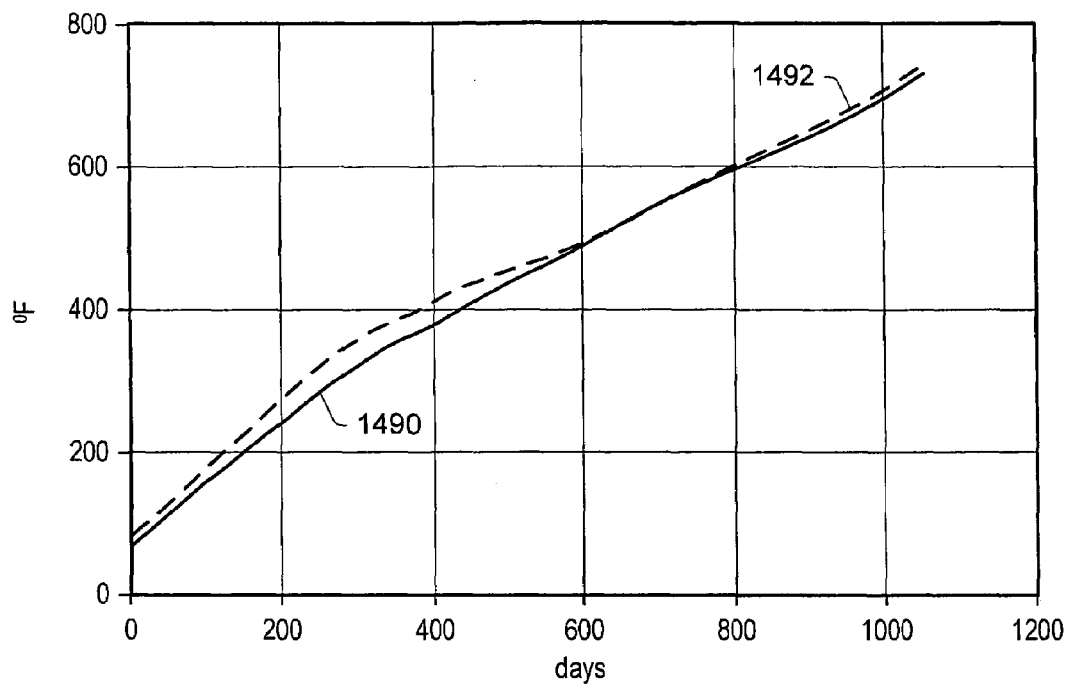

FIG. 212 depicts average temperature (° F.) versus time (days) for the third heater example with a 30 foot spacing between heaters in the formation as determined by the simulation.

Figure 213:
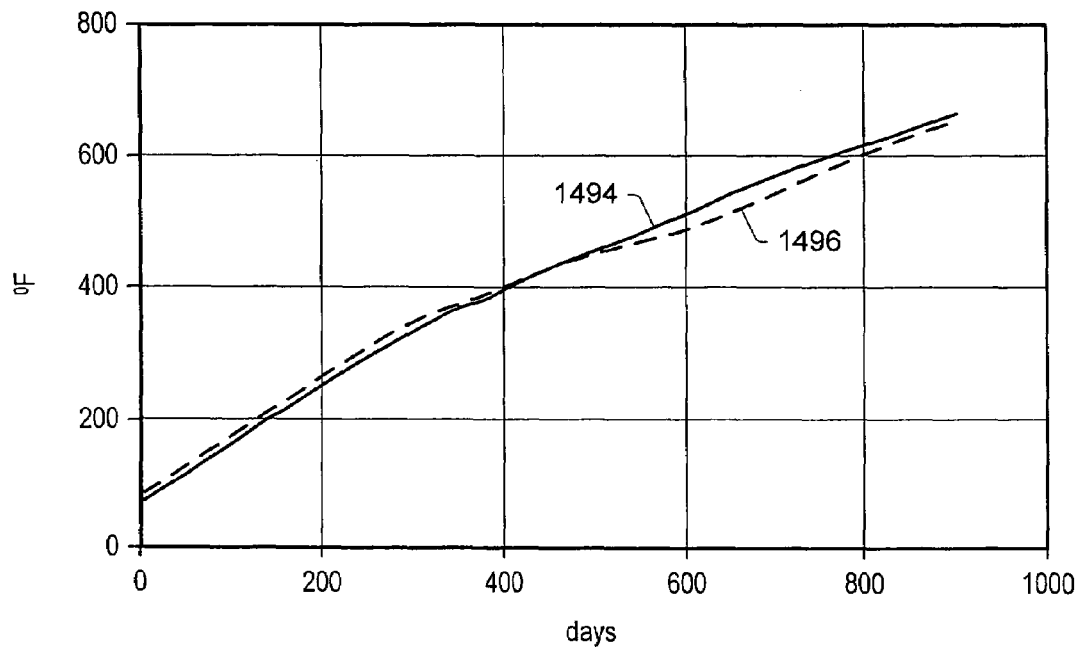

FIG. 213 depicts average temperature (° F.) versus time (days) for the fourth heater example using the heater configuration and pattern depicted in FIGS. 65 and 67 as determined by the simulation.

Figure 214:
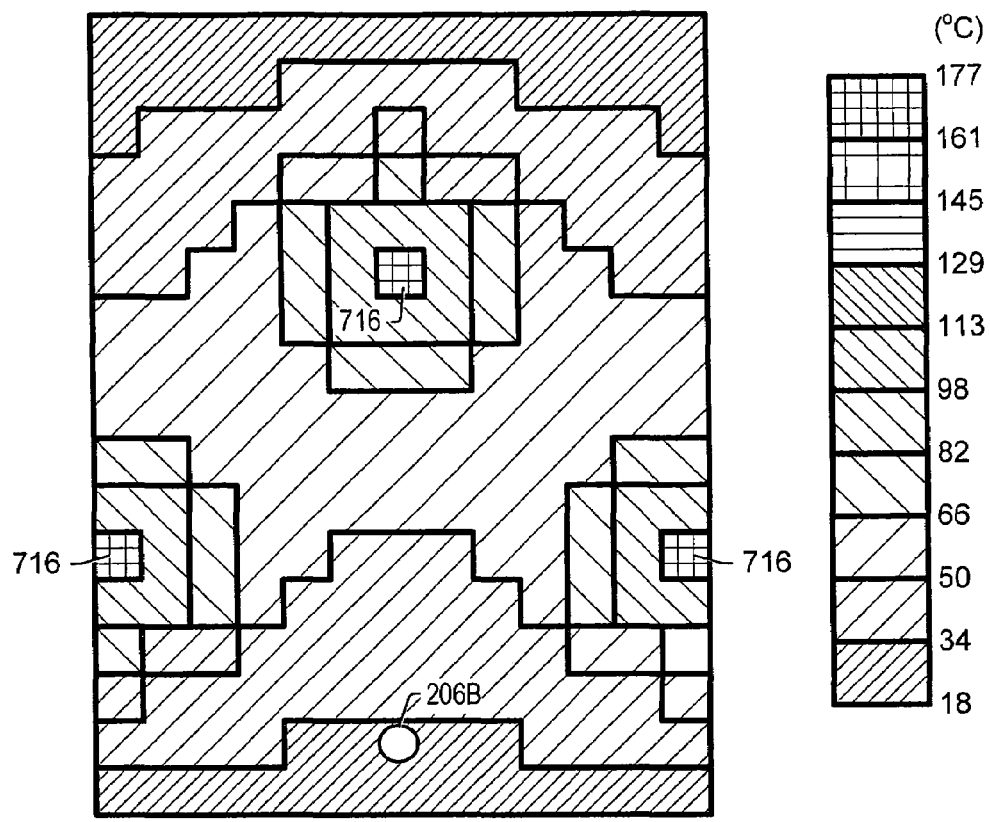

FIG. 214 depicts a temperature profile in the formation after 360 days using the STARS simulation.

Figure 215:
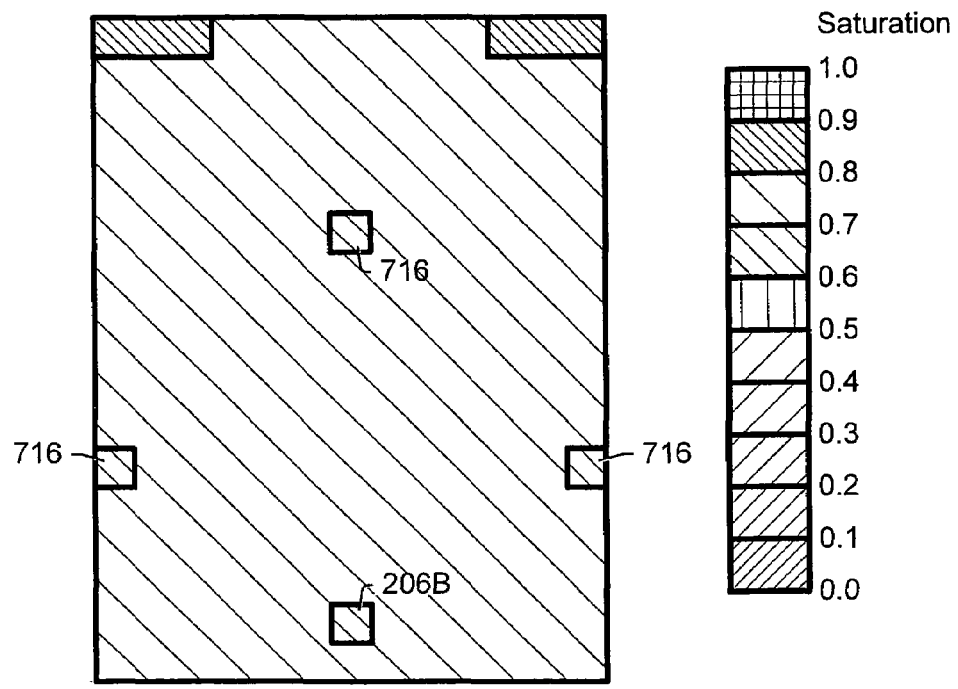

FIG. 215 depicts an oil saturation profile in the formation after 360 days using the STARS simulation.

FIG. 216 depicts the oil saturation profile in the formation after 1095 days using the STARS simulation.

FIG. 217 depicts the oil saturation profile in the formation after 1470 days using the STARS simulation.

Figure 218:
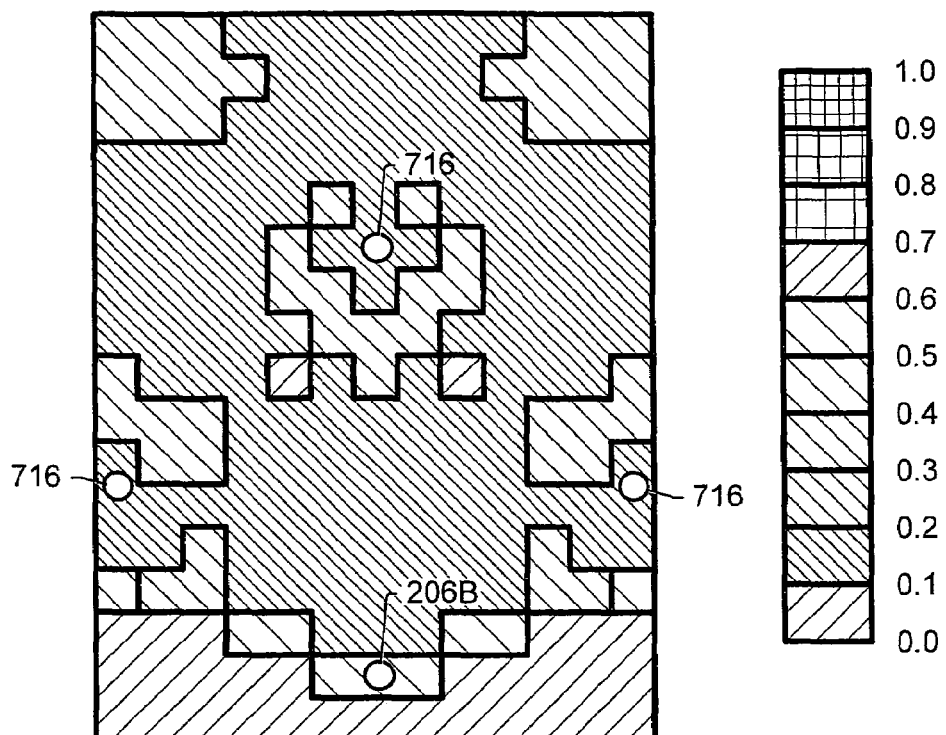

FIG. 218 depicts the oil saturation profile in the formation after 1826 days using the STARS simulation.

Figure 219:
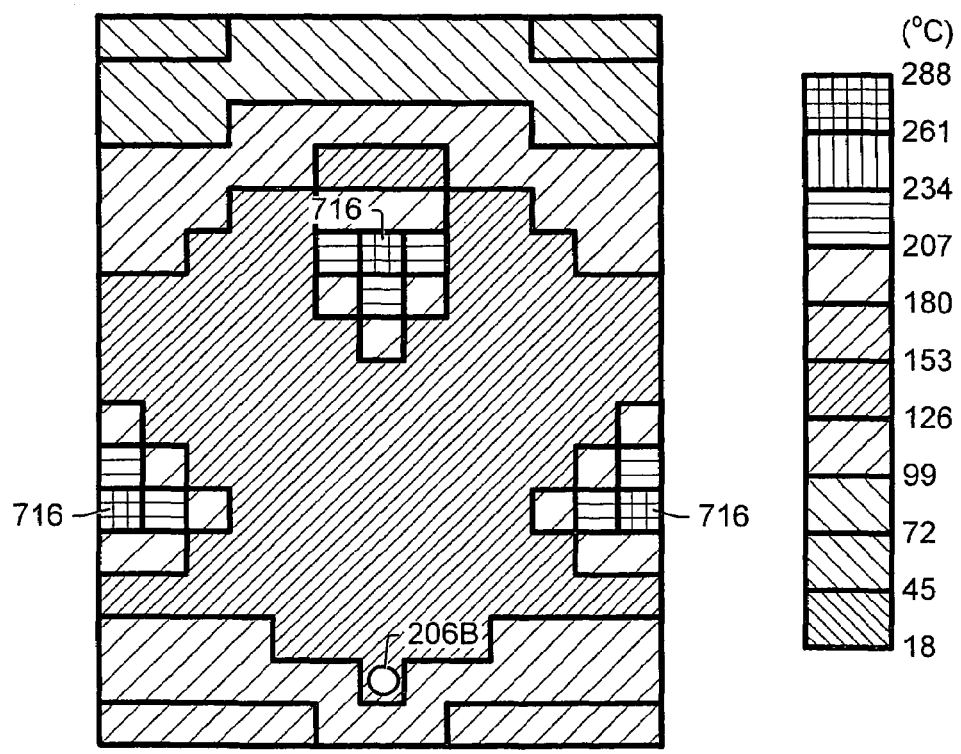

FIG. 219 depicts the temperature profile in the formation after 1826 days using the STARS simulation.

Figure 220:
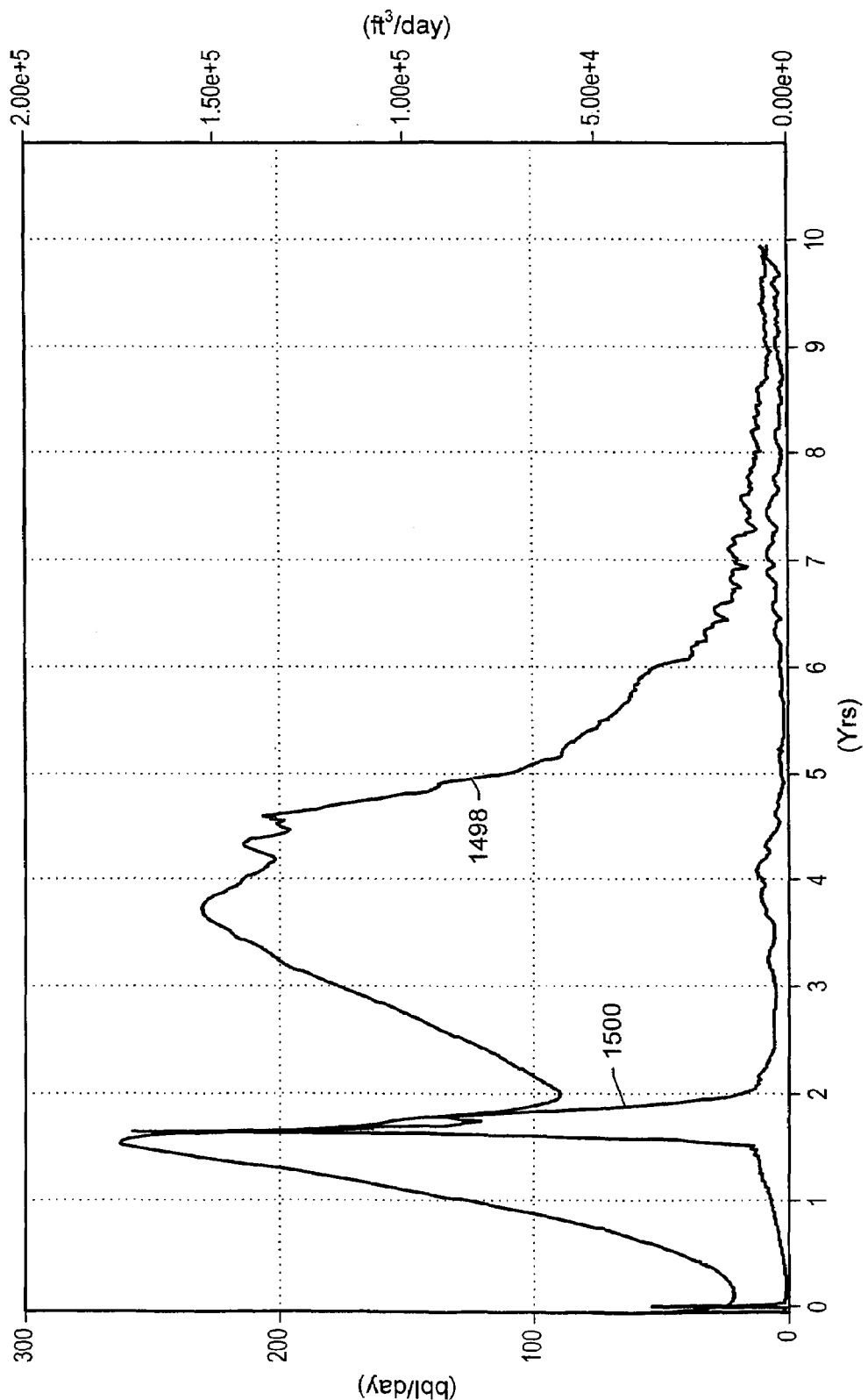

FIG. 220 depicts oil production rate and gas production rate versus time.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

The following description generally relates to systems and methods for treating hydrocarbons in the formations. Such formations may be treated to yield hydrocarbon products, hydrogen, and other products.

"Alternating current (AC)" refers to a time-varying current that reverses direction substantially sinusoidally. AC produces skin effect electricity flow in a ferromagnetic conductor.

"API gravity" refers to API gravity at 15.5° C. (60° F.). API gravity is as determined by ASTM Method D6822.

In the context of reduced heat output heating systems, apparatus, and methods, the term "automatically" means such systems, apparatus, and methods function in a certain way without the use of external control (for example, external controllers such as a controller with a temperature sensor and a feedback loop, PID controller, or predictive controller).

"Bare metal" and "exposed metal" refer to metals of elongated members that do not include a layer of electrical insulation, such as mineral insulation, that is designed to provide electrical insulation for the metal throughout an operating temperature range of the elongated member. Bare metal and exposed metal may encompass a metal that includes a corrosion inhibiter such as a naturally occurring oxidation layer, an applied oxidation layer, and/or a film. Bare metal and exposed metal include metals with polymeric or other types of electrical insulation that cannot retain electrical insulating properties at typical operating temperature of the elongated member. Such material may be placed on the metal and may be thermally degraded during use of the heater.

"Carbon number" refers to the number of carbon atoms in a molecule. A hydrocarbon fluid may include various hydrocarbons with different carbon numbers. The hydrocarbon fluid may be described by a carbon number distribution. Carbon numbers and/or carbon number distributions may be determined by true boiling point distribution and/or gas-liquid chromatography.

"Cenospheres" refers to hollow particulates that are formed in thermal processes at high temperatures when molten components are blown up like balloons by the volatilization of organic components.

"Chemically stability" refers to the ability of a formation fluid to be transported without components in the formation fluid reacting to form polymers and/or compositions that plug pipelines, valves, and/or vessels.

"Clogging" refers to impeding and/or inhibiting flow of one or more compositions through a process vessel or a conduit.

"Column X element" or "Column X elements" refer to one or more elements of Column X of the Periodic Table, and/or one or more compounds of one or more elements of Column X of the Periodic Table, in which X corresponds to a column number (for example, 13-18) of the Periodic Table. For example, "Column 15 elements" refer to elements from Column 15 of the Periodic Table and/or compounds of one or more elements from Column 15 of the Periodic Table.

"Column X metal" or "Column X metals" refer to one or more metals of Column X of the Periodic Table and/or one or more compounds of one or more metals of Column X of the Periodic Table, in which X corresponds to a column number (for example, 1-12) of the Periodic Table. For example, "Column 6 metals" refer to metals from Column 6 of the Periodic Table and/or compounds of one or more metals from Column 6 of the Periodic Table.

"Condensable hydrocarbons" are hydrocarbons that condense at 25° C. and one atmosphere absolute pressure. Condensable hydrocarbons may include a mixture of hydrocarbons having carbon numbers greater than 4. "Non-condensable hydrocarbons" are hydrocarbons that do not condense at 25° C. and one atmosphere absolute pressure. Non-condensable hydrocarbons may include hydrocarbons having carbon numbers less than 5.

"Coring" is a process that generally includes drilling a hole into a formation and removing a substantially solid mass of the formation from the hole.

"Cracking" refers to a process involving decomposition and molecular recombination of organic compounds to produce a greater number of molecules than were initially present. In cracking, a series of reactions take place accompanied by a transfer of hydrogen atoms between molecules. For example, naphtha may undergo a thermal cracking reaction to form ethene and $H_2$.

"Curie temperature" is the temperature above which a ferromagnetic material loses all of its ferromagnetic properties. In addition to losing all of its ferromagnetic properties above the Curie temperature, the ferromagnetic material begins to lose its ferromagnetic properties when an increasing electrical current is passed through the ferromagnetic material.

"Cycle oil" refers to a mixture of light cycle oil and heavy cycle oil. "Light cycle oil" refers to hydrocarbons having a boiling range distribution between 430° F. (221° C.) and 650° F. (343° C.) that are produced from a fluidized catalytic cracking system. Light cycle oil content is determined by ASTM Method D5307. "Heavy cycle oil" refers to hydrocarbons having a boiling range distribution between 650° F. (343° C.) and 800° F. (427° C.) that are produced from a fluidized catalytic cracking system. Heavy cycle oil content is determined by ASTM Method D5307.

"Diad" refers to a group of two items (for example, heaters, wellbores, or other objects) coupled together.

"Diesel" refers to hydrocarbons with a boiling range distribution between 260° C. and 343° C. (500-650° F.) at 0.101 MPa. Diesel content is determined by ASTM Method D2887.

"Enriched air" refers to air having a larger mole fraction of oxygen than air in the atmosphere. Air is typically enriched to increase combustion-supporting ability of the air.

"Fluid pressure" is a pressure generated by a fluid in a formation. "Lithostatic pressure" (sometimes referred to as "lithostatic stress") is a pressure in a formation equal to a weight per unit area of an overlying rock mass. "Hydrostatic pressure" is a pressure in a formation exerted by a column of water.

A "formation" includes one or more hydrocarbon containing layers, one or more non-hydrocarbon layers, an overburden, and/or an underburden. "Hydrocarbon layers" refer to layers in the formation that contain hydrocarbons. The hydrocarbon layers may contain non-hydrocarbon material and hydrocarbon material. The "overburden" and/or the "underburden" include one or more different types of impermeable materials. For example, the overburden and/or underburden may include rock, shale, mudstone, or wet/tight carbonate. In some embodiments of in situ heat treatment processes, the overburden and/or the underburden may include a hydrocarbon containing layer or hydrocarbon containing layers that are relatively impermeable and are not subjected to temperatures during in situ heat treatment processing that result in significant characteristic changes of the hydrocarbon containing layers of the overburden and/or the underburden. For example, the underburden may contain shale or mudstone, but the underburden is not allowed to heat to pyrolysis temperatures during the in situ heat treatment process. In some cases, the overburden and/or the underburden may be somewhat permeable.

"Formation fluids" refer to fluids present in a formation and may include pyrolyzation fluid, synthesis gas, mobilized hydrocarbon, and water (steam). Formation fluids may include hydrocarbon fluids as well as non-hydrocarbon fluids. The term "mobilized fluid" refers to fluids in a hydrocarbon containing formation that are able to flow as a result of thermal treatment of the formation. "Produced fluids" refer to fluids removed from the formation.

"Gasoline hydrocarbons" refer to hydrocarbons having a boiling point range from 32° C. (90° F.) to about 204° C. (400° F.). Gasoline hydrocarbons include, but are not limited to, straight run gasoline, naphtha, fluidized or thermally catalytically cracked gasoline, VB gasoline, and coker gasoline. Gasoline hydrocarbons content is determined by ASTM Method D2887.

A "heat source" is any system for providing heat to at least a portion of a formation substantially by conductive and/or radiative heat transfer. For example, a heat source may include electric heaters such as an insulated conductor, an elongated member, and/or a conductor disposed in a conduit. A heat source may also include systems that generate heat by burning a fuel external to or in a formation. The systems may be surface burners, downhole gas burners, flameless distributed combustors, and natural distributed combustors. In some embodiments, heat provided to or generated in one or more heat sources may be supplied by other sources of energy. The other sources of energy may directly heat a formation, or the energy may be applied to a transfer medium that directly or indirectly heats the formation. It is to be understood that one or more heat sources that are applying heat to a formation may use different sources of energy. Thus, for example, for a given formation some heat sources may supply heat from electric resistance heaters, some heat sources may provide heat from combustion, and some heat sources may provide heat from one or more other energy sources (for example, chemical reactions, solar energy, wind energy, biomass, or other sources of renewable energy). A chemical reaction may include an exothermic reaction (for example, an oxidation reaction). A heat source may also include a heater that provides heat to a zone proximate and/or surrounding a heating location such as a heater well.

A "heater" is any system or heat source for generating heat in a well or a near wellbore region. Heaters may be, but are not limited to, electric heaters, burners, combustors that react with material in or produced from a formation, and/or combinations thereof.

"Heavy hydrocarbons" are viscous hydrocarbon fluids. Heavy hydrocarbons may include highly viscous hydrocarbon fluids such as heavy oil, tar, and/or asphalt. Heavy hydrocarbons may include carbon and hydrogen, as well as smaller concentrations of sulfur, oxygen, and nitrogen. Additional elements may also be present in heavy hydrocarbons in trace amounts. Heavy hydrocarbons may be classified by API gravity. Heavy hydrocarbons generally have an API gravity below about 20°. Heavy oil, for example, generally has an API gravity of about 10-20°, whereas tar generally has an API gravity below about 10°. The viscosity of heavy hydrocarbons is generally greater than about 100 centipoise at 15° C. Heavy hydrocarbons may include aromatics or other complex ring hydrocarbons.

Heavy hydrocarbons may be found in a relatively permeable formation. The relatively permeable formation may include heavy hydrocarbons entrained in, for example, sand or carbonate. "Relatively permeable" is defined, with respect to formations or portions thereof, as an average permeability of 10 millidarcy or more (for example, 10 or 100 millidarcy). "Relatively low permeability" is defined, with respect to formations or portions thereof, as an average permeability of less than about 10 millidarcy. One darcy is equal to about 0.99 square micrometers. An impermeable layer generally has a permeability of less than about 0.1 millidarcy.

Certain types of formations that include heavy hydrocarbons may also be, but are not limited to, natural mineral waxes, or natural asphaltites. "Natural mineral waxes" typically occur in substantially tubular veins that may be several meters wide, several kilometers long, and hundreds of meters deep. "Natural asphaltites" include solid hydrocarbons of an aromatic composition and typically occur in large veins. In situ recovery of hydrocarbons from formations such as natural mineral waxes and natural asphaltites may include melting to form liquid hydrocarbons and/or solution mining of hydrocarbons from the formations.

"Hydrocarbons" are generally defined as molecules formed primarily by carbon and hydrogen atoms. Hydrocarbons may also include other elements such as, but not limited to, halogens, metallic elements, nitrogen, oxygen, and/or sulfur. Hydrocarbons may be, but are not limited to, kerogen, bitumen, pyrobitumen, oils, natural mineral waxes, and asphaltites. Hydrocarbons may be located in or adjacent to mineral matrices in the earth. Matrices may include, but are not limited to, sedimentary rock, sands, silicilytes, carbonates, diatomites, and other porous media. "Hydrocarbon fluids" are fluids that include hydrocarbons. Hydrocarbon fluids may include, entrain, or be entrained in non-hydrocarbon fluids such as hydrogen, nitrogen, carbon monoxide, carbon dioxide, hydrogen sulfide, water, and ammonia.

An "in situ conversion process" refers to a process of heating a hydrocarbon containing formation from heat sources to raise the temperature of at least a portion of the formation above a pyrolysis temperature so that pyrolyzation fluid is produced in the formation.

An "in situ heat treatment process" refers to a process of heating a hydrocarbon containing formation with heat sources to raise the temperature of at least a portion of the formation above a temperature that results in mobilized fluid, visbreaking, and/or pyrolysis of hydrocarbon containing material so that mobilized fluids, visbroken fluids, and/or pyrolyzation fluids are produced in the formation.

"Insulated conductor" refers to any elongated material that is able to conduct electricity and that is covered, in whole or in part, by an electrically insulating material.

"Karst" is a subsurface shaped by the dissolution of a soluble layer or layers of bedrock, usually carbonate rock such as limestone or dolomite. The dissolution may be caused by meteoric or acidic water. The Grosmont formation in Alberta, Canada is an example of a karst (or "karsted") carbonate formation.

"Kerogen" is a solid, insoluble hydrocarbon that has been converted by natural degradation and that principally contains carbon, hydrogen, nitrogen, oxygen, and sulfur. Coal and oil shale are typical examples of materials that contain kerogen. "Bitumen" is a non-crystalline solid or viscous hydrocarbon material that is substantially soluble in carbon disulfide. "Oil" is a fluid containing a mixture of condensable hydrocarbons.

"Kerosene" refers to hydrocarbons with a boiling range distribution between 204° C. and 260° C. at 0.101 MPa. Kerosene content is determined by ASTM Method D2887.

"Modulated direct current (DC)" refers to any substantially non-sinusoidal time-varying current that produces skin effect electricity flow in a ferromagnetic conductor.

"Naphtha" refers to hydrocarbon components with a boiling range distribution between 38° C. and 200° C. at 0.101 MPa. Naphtha content is determined by American Standard Testing and Materials (ASTM) Method D5307.

"Nitride" refers to a compound of nitrogen and one or more other elements of the Periodic Table. Nitrides include, but are not limited to, silicon nitride, boron nitride, or alumina nitride.

"Octane Number" refers to a calculated numerical representation of the antiknock properties of a motor fuel compared to a standard reference fuel. A calculated octane number is determined by ASTM Method D6730.

"Olefins" are molecules that include unsaturated hydrocarbons having one or more non-aromatic carbon-carbon double bonds.

"Orifices" refer to openings, such as openings in conduits, having a wide variety of sizes and cross-sectional shapes including, but not limited to, circles, ovals, squares, rectangles, triangles, slits, or other regular or irregular shapes.

"Periodic Table" refers to the Periodic Table as specified by the International Union of Pure and Applied Chemistry (IUPAC), November 2003. In the scope of this application, weight of a metal from the Periodic Table, weight of a compound of a metal from the Periodic Table, weight of an element from the Periodic Table, or weight of a compound of an element from the Periodic Table is calculated as the weight of metal or the weight of element. For example, if 0.1 grams of $MoO_3$ is used per gram of catalyst, the calculated weight of the molybdenum metal in the catalyst is 0.067 grams per gram of catalyst.

"Physical stability" refers the ability of a formation fluid to not exhibit phase separation or flocculation during transportation of the fluid. Physical stability is determined by ASTM Method D7060.

"Pyrolysis" is the breaking of chemical bonds due to the application of heat. For example, pyrolysis may include transforming a compound into one or more other substances by heat alone. Heat may be transferred to a section of the formation to cause pyrolysis.

"Pyrolyzation fluids" or "pyrolysis products" refers to fluid produced substantially during pyrolysis of hydrocarbons. Fluid produced by pyrolysis reactions may mix with other fluids in a formation. The mixture would be considered pyrolyzation fluid or pyrolyzation product. As used herein, "pyrolysis zone" refers to a volume of a formation (for example, a relatively permeable formation such as a tar sands formation) that is reacted or reacting to form a pyrolyzation fluid.

"Rich layers" in a hydrocarbon containing formation are relatively thin layers (typically about 0.2 m to about 0.5 m thick). Rich layers generally have a richness of about 0.150 L/kg or greater. Some rich layers have a richness of about 0.170 L/kg or greater, of about 0.190 L/kg or greater, or of about 0.210 L/kg or greater. Lean layers of the formation have a richness of about 0.100 L/kg or less and are generally thicker than rich layers. The richness and locations of layers are determined, for example, by coring and subsequent Fischer assay of the core, density or neutron logging, or other logging methods. Rich layers may have a lower initial thermal conductivity than other layers of the formation. Typically, rich layers have a thermal conductivity 1.5 times to 3 times lower than the thermal conductivity of lean layers. In addition, rich layers have a higher thermal expansion coefficient than lean layers of the formation.

"Smart well technology" or "smart wellbore" refers to wells that incorporate downhole measurement and/or control. For injection wells, smart well technology may allow for controlled injection of fluid into the formation in desired zones. For production wells, smart well technology may allow for controlled production of formation fluid from selected zones. Some wells may include smart well technology that allows for formation fluid production from selected zones and simultaneous or staggered solution injection into other zones. Smart well technology may include fiber optic systems and control valves in the wellbore. A smart wellbore used for an in situ heat treatment process may be Westbay Multilevel Well System MP55 available from Westbay Instruments Inc. (Burnaby, British Columbia, Canada).

"Subsidence" is a downward movement of a portion of a formation relative to an initial elevation of the surface.

"Superposition of heat" refers to providing heat from two or more heat sources to a selected section of a formation such that the temperature of the formation at least at one location between the heat sources is influenced by the heat sources.

"Synthesis gas" is a mixture including hydrogen and carbon monoxide. Additional components of synthesis gas may include water, carbon dioxide, nitrogen, methane, and other gases. Synthesis gas may be generated by a variety of processes and feedstocks. Synthesis gas may be used for synthesizing a wide range of compounds.

"Tar" is a viscous hydrocarbon that generally has a viscosity greater than about 10,000 centipoise at 15° C. The specific gravity of tar generally is greater than 1.000. Tar may have an API gravity less than 10°.

A "tar sands formation" is a formation in which hydrocarbons are predominantly present in the form of heavy hydrocarbons and/or tar entrained in a mineral grain framework or other host lithology (for example, sand or carbonate). Examples of tar sands formations include formations such as the Athabasca formation, the Grosmont formation, and the Peace River formation, all three in Alberta, Canada; and the Faja formation in the Orinoco belt in Venezuela.

"Temperature limited heater" generally refers to a heater that regulates heat output (for example, reduces heat output) above a specified temperature without the use of external controls such as temperature controllers, power regulators, rectifiers, or other devices. Temperature limited heaters may be AC (alternating current) or modulated (for example, "chopped") DC (direct current) powered electrical resistance heaters.

"Thermally conductive fluid" includes fluid that has a higher thermal conductivity than air at standard temperature and pressure (STP) (0° C. and 101.325 kPa).

"Thermal conductivity" is a property of a material that describes the rate at which heat flows, in steady state, between two surfaces of the material for a given temperature difference between the two surfaces.

"Thermal fracture" refers to fractures created in a formation caused by expansion or contraction of a formation and/or fluids in the formation, which is in turn caused by increasing/decreasing the temperature of the formation and/or fluids in the formation, and/or by increasing/decreasing a pressure of fluids in the formation due to heating.

"Thickness" of a layer refers to the thickness of a cross section of the layer, wherein the cross section is normal to a face of the layer.

"Time-varying current" refers to electrical current that produces skin effect electricity flow in a ferromagnetic conductor and has a magnitude that varies with time. Time-varying current includes both alternating current (AC) and modulated direct current (DC).

"Triad" refers to a group of three items (for example, heaters, wellbores, or other objects) coupled together.

"Turndown ratio" for the temperature limited heater is the ratio of the highest AC or modulated DC resistance below the Curie temperature to the lowest resistance above the Curie temperature for a given current.

A "u-shaped wellbore" refers to a wellbore that extends from a first opening in the formation, through at least a portion of the formation, and out through a second opening in the formation. In this context, the wellbore may be only roughly in the shape of a "v" or "u", with the understanding that the "legs" of the "u" do not need to be parallel to each other, or perpendicular to the "bottom" of the "u" for the wellbore to be considered "u-shaped".

"Upgrade" refers to increasing the quality of hydrocarbons. For example, upgrading heavy hydrocarbons may result in an increase in the API gravity of the heavy hydrocarbons.

"Visbreaking" refers to the untangling of molecules in fluid during heat treatment and/or to the breaking of large molecules into smaller molecules during heat treatment, which results in a reduction of the viscosity of the fluid.

"VGO" or "vacuum gas oil" refers to hydrocarbons with a boiling range distribution between 343° C. and 538° C. at 0.101 MPa. VGO content is determined by ASTM Method D5307.

A "vug" is a cavity, void or large pore in a rock that is commonly lined with mineral precipitates.

"Wax" refers to a low melting organic mixture, or a compound of high molecular weight that is a solid at lower temperatures and a liquid at higher temperatures, and when in solid form can form a barrier to water. Examples of waxes include animal waxes, vegetable waxes, mineral waxes, petroleum waxes, and synthetic waxes.

The term "wellbore" refers to a hole in a formation made by drilling or insertion of a conduit into the formation. A wellbore may have a substantially circular cross section, or another cross-sectional shape. As used herein, the terms "well" and "opening," when referring to an opening in the formation may be used interchangeably with the term "wellbore."

Figure 1:
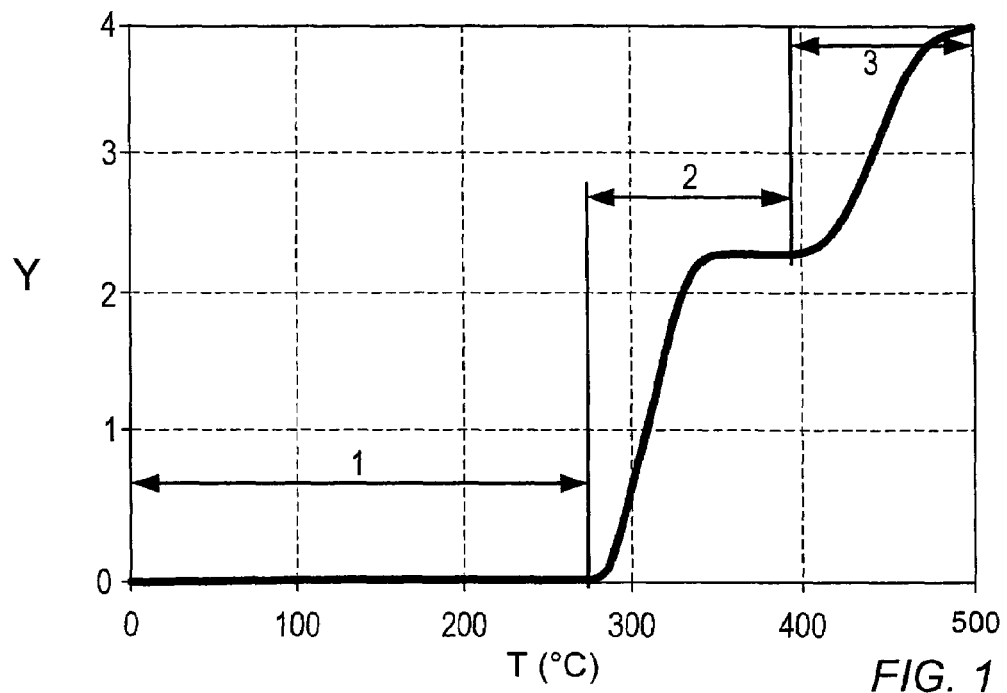
FIG. 1 depicts an illustration of stages of heating a hydrocarbon containing formation.

Hydrocarbons in formations may be treated in various ways to produce many different products. In certain embodiments, hydrocarbons in formations are treated in stages. FIG. 1 depicts an illustration of stages of heating the hydrocarbon containing formation. FIG. 1 also depicts an example of yield ("Y") in barrels of oil equivalent per ton (y axis) of formation fluids from the formation versus temperature ("T") of the heated formation in degrees Celsius (x axis).

Desorption of methane and vaporization of water occurs during stage 1 heating. Heating of the formation through stage 1 may be performed as quickly as possible. For example, when the hydrocarbon containing formation is initially heated, hydrocarbons in the formation desorb adsorbed methane. The desorbed methane may be produced from the formation. If the hydrocarbon containing formation is heated further, water in the hydrocarbon containing formation is vaporized. Water may occupy, in some hydrocarbon containing formations, between 10% and 50% of the pore volume in the formation. In other formations, water occupies larger or smaller portions of the pore volume. Water typically is vaporized in a formation between 160° C. and 285° C. at pressures of 600 kPa absolute to 7000 kPa absolute. In some embodiments, the vaporized water produces wettability changes in the formation and/or increased formation pressure. The wettability changes and/or increased pressure may affect pyrolysis reactions or other reactions in the formation. In certain embodiments, the vaporized water is produced from the formation. In other embodiments, the vaporized water is used for steam extraction and/or distillation in the formation or outside the formation. Removing the water from and increasing the pore volume in the formation increases the storage space for hydrocarbons in the pore volume.

In certain embodiments, after stage 1 heating, the formation is heated further, such that a temperature in the formation reaches (at least) an initial pyrolyzation temperature (such as a temperature at the lower end of the temperature range shown as stage 2). Hydrocarbons in the formation may be pyrolyzed throughout stage 2. A pyrolysis temperature range varies depending on the types of hydrocarbons in the formation. The pyrolysis temperature range may include temperatures between 250° C. and 900° C. The pyrolysis temperature range for producing desired products may extend through only a portion of the total pyrolysis temperature range. In some embodiments, the pyrolysis temperature range for producing desired products may include temperatures between 250° C. and 400° C. or temperatures between 270° C. and 350° C. If a temperature of hydrocarbons in the formation is slowly raised through the temperature range from 250° C. to 400° C., production of pyrolysis products may be substantially complete when the temperature approaches 400° C. Average temperature of the hydrocarbons may be raised at a rate of less than 5° C. per day, less than 2° C. per day, less than 1° C. per day, or less than 0.5° C. per day through the pyrolysis temperature range for producing desired products. Heating the hydrocarbon containing formation with a plurality of heat sources may establish thermal gradients around the heat sources that slowly raise the temperature of hydrocarbons in the formation through the pyrolysis temperature range.

The rate of temperature increase through the pyrolysis temperature range for desired products may affect the quality and quantity of the formation fluids produced from the hydrocarbon containing formation. Raising the temperature slowly through the pyrolysis temperature range for desired products may inhibit mobilization of large chain molecules in the formation. Raising the temperature slowly through the pyrolysis temperature range for desired products may limit reactions between mobilized hydrocarbons that produce undesired products. Slowly raising the temperature of the formation through the pyrolysis temperature range for desired products may allow for the production of high quality, high API gravity hydrocarbons from the formation. Slowly raising the temperature of the formation through the pyrolysis temperature range for desired products may allow for the removal of a large amount of the hydrocarbons present in the formation as hydrocarbon product.

In some in situ heat treatment embodiments, a portion of the formation is heated to a desired temperature instead of slowly heating the temperature through a temperature range. In some embodiments, the desired temperature is 300° C., 325° C., or 350° C. Other temperatures may be selected as the desired temperature. Superposition of heat from heat sources allows the desired temperature to be relatively quickly and efficiently established in the formation. Energy input into the formation from the heat sources may be adjusted to maintain the temperature in the formation substantially at the desired temperature. The heated portion of the formation is maintained substantially at the desired temperature until pyrolysis declines such that production of desired formation fluids from the formation becomes uneconomical. Parts of the formation that are subjected to pyrolysis may include regions brought into a pyrolysis temperature range by heat transfer from only one heat source.

In certain embodiments, formation fluids including pyrolyzation fluids are produced from the formation. As the temperature of the formation increases, the amount of condensable hydrocarbons in the produced formation fluid may decrease. At high temperatures, the formation may produce mostly methane and/or hydrogen. If the hydrocarbon containing formation is heated throughout an entire pyrolysis range, the formation may produce only small amounts of hydrogen towards an upper limit of the pyrolysis range. After all of the available hydrogen is depleted, a minimal amount of fluid production from the formation will typically occur.

After pyrolysis of hydrocarbons, a large amount of carbon and some hydrogen may still be present in the formation. A significant portion of carbon remaining in the formation can be produced from the formation in the form of synthesis gas. Synthesis gas generation may take place during stage 3 heating depicted in FIG. 1. Stage 3 may include heating a hydrocarbon containing formation to a temperature sufficient to allow synthesis gas generation. For example, synthesis gas may be produced in a temperature range from about 400° C. to about 1200° C., about 500° C. to about 1100° C., or about 550° C. to about 1000° C. The temperature of the heated portion of the formation when the synthesis gas generating fluid is introduced to the formation determines the composition of synthesis gas produced in the formation. The generated synthesis gas may be removed from the formation through a production well or production wells.

Total energy content of fluids produced from the hydrocarbon containing formation may stay relatively constant throughout pyrolysis and synthesis gas generation. During pyrolysis at relatively low formation temperatures, a significant portion of the produced fluid may be condensable hydrocarbons that have a high energy content. At higher pyrolysis temperatures, however, less of the formation fluid may include condensable hydrocarbons. More non-condensable formation fluids may be produced from the formation. Energy content per unit volume of the produced fluid may decline slightly during generation of predominantly non-condensable formation fluids. During synthesis gas generation, energy content per unit volume of produced synthesis gas declines significantly compared to energy content of pyrolyzation fluid. The volume of the produced synthesis gas, however, will in many instances increase substantially, thereby compensating for the decreased energy content.

Figure 2:
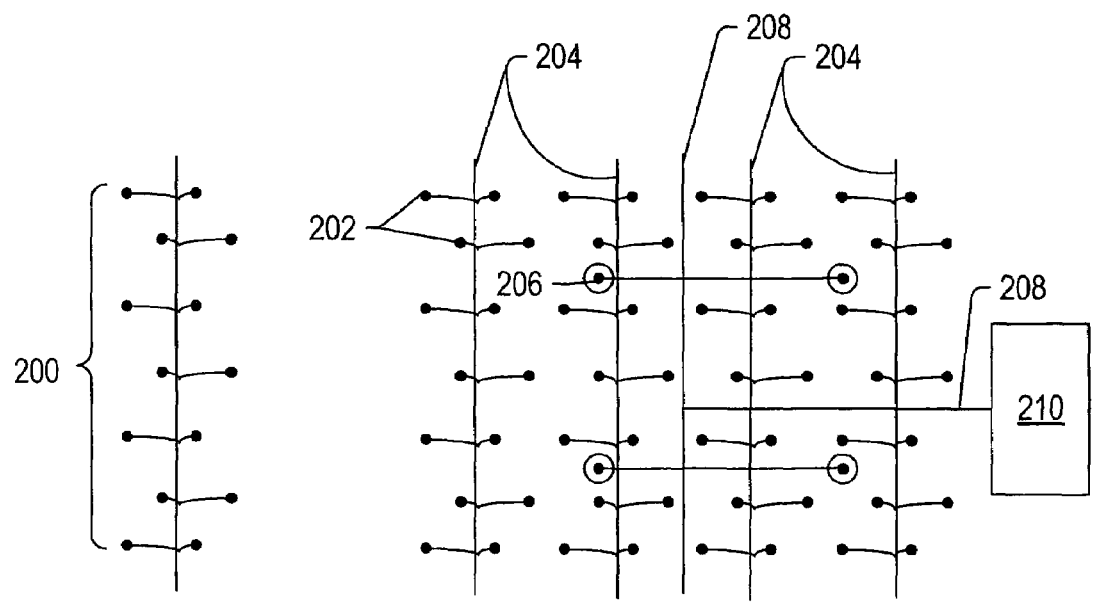
FIG. 2 shows a schematic view of an embodiment of a portion of an in situ heat treatment system for treating a hydrocarbon containing formation.

FIG. 2 depicts a schematic view of an embodiment of a portion of the in situ heat treatment system for treating the hydrocarbon containing formation. The in situ heat treatment system may include barrier wells 200. Barrier wells are used to form a barrier around a treatment area. The barrier inhibits fluid flow into and/or out of the treatment area. Barrier wells include, but are not limited to, dewatering wells, vacuum wells, capture wells, injection wells, grout wells, freeze wells, or combinations thereof. In some embodiments, barrier wells 200 are dewatering wells. Dewatering wells may remove liquid water and/or inhibit liquid water from entering a portion of the formation to be heated, or to the formation being heated. In the embodiment depicted in FIG. 2, the barrier wells 200 are shown extending only along one side of heat sources 202, but the barrier wells typically encircle all heat sources 202 used, or to be used, to heat a treatment area of the formation.

Heat sources 202 are placed in at least a portion of the formation. Heat sources 202 may include heaters such as insulated conductors, conductor-in-conduit heaters, surface burners, flameless distributed combustors, and/or natural distributed combustors. Heat sources 202 may also include other types of heaters. Heat sources 202 provide heat to at least a portion of the formation to heat hydrocarbons in the formation. Energy may be supplied to heat sources 202 through supply lines 204. Supply lines 204 may be structurally different depending on the type of heat source or heat sources used to heat the formation. Supply lines 204 for heat sources may transmit electricity for electric heaters, may transport fuel for combustors, or may transport heat exchange fluid that is circulated in the formation. In some embodiments, electricity for an in situ heat treatment process may be provided by a nuclear power plant or nuclear power plants. The use of nuclear power may allow for reduction or elimination of carbon dioxide emissions from the in situ heat treatment process.

When the formation is heated, the heat input into the formation may cause expansion of the formation and geomechanical motion. The heat sources may be turned on before, at the same time, or during a dewatering process. Computer simulations may model formation response to heating. The computer simulations may be used to develop a pattern and time sequence for activating heat sources in the formation so that geomechanical motion of the formation does not adversely affect the functionality of heat sources, production wells, and other equipment in the formation.

Heating the formation may cause an increase in permeability and/or porosity of the formation. Increases in permeability and/or porosity may result from a reduction of mass in the formation due to vaporization and removal of water, removal of hydrocarbons, and/or creation of fractures. Fluid may flow more easily in the heated portion of the formation because of the increased permeability and/or porosity of the formation. Fluid in the heated portion of the formation may move a considerable distance through the formation because of the increased permeability and/or porosity. The considerable distance may be over 1000 m depending on various factors, such as permeability of the formation, properties of the fluid, temperature of the formation, and pressure gradient allowing movement of the fluid. The ability of fluid to travel considerable distance in the formation allows production wells 206 to be spaced relatively far apart in the formation.

Production wells 206 are used to remove formation fluid from the formation. In some embodiments, production well 206 includes a heat source. The heat source in the production well may heat one or more portions of the formation at or near the production well. In some in situ heat treatment process embodiments, the amount of heat supplied to the formation from the production well per meter of the production well is less than the amount of heat applied to the formation from a heat source that heats the formation per meter of the heat source. Heat applied to the formation from the production well may increase formation permeability adjacent to the production well by vaporizing and removing liquid phase fluid adjacent to the production well and/or by increasing the permeability of the formation adjacent to the production well by formation of macro and/or micro fractures.

More than one heat source may be positioned in the production well. A heat source in a lower portion of the production well may be turned off when superposition of heat from adjacent heat sources heats the formation sufficiently to counteract benefits provided by heating the formation with the production well. In some embodiments, the heat source in an upper portion of the production well may remain on after the heat source in the lower portion of the production well is deactivated. The heat source in the upper portion of the well may inhibit condensation and reflux of formation fluid.

In some embodiments, the heat source in production well 206 allows for vapor phase removal of formation fluids from the formation. Providing heating at or through the production well may: (1) inhibit condensation and/or refluxing of production fluid when such production fluid is moving in the production well proximate the overburden, (2) increase heat input into the formation, (3) increase production rate from the production well as compared to a production well without a heat source, (4) inhibit condensation of high carbon number compounds ($C_6$ and above) in the production well, and/or (5) increase formation permeability at or proximate the production well.

Subsurface pressure in the formation may correspond to the fluid pressure generated in the formation. As temperatures in the heated portion of the formation increase, the pressure in the heated portion may increase as a result of increased fluid generation and vaporization of water. Controlling rate of fluid removal from the formation may allow for control of pressure in the formation. Pressure in the formation may be determined at a number of different locations, such as near or at production wells, near or at heat sources, or at monitor wells.

In some hydrocarbon containing formations, production of hydrocarbons from the formation is inhibited until at least some hydrocarbons in the formation have been pyrolyzed. Formation fluid may be produced from the formation when the formation fluid is of a selected quality. In some embodiments, the selected quality includes an API gravity of at least about 20°, 30°, or 40°. Inhibiting production until at least some hydrocarbons are pyrolyzed may increase conversion of heavy hydrocarbons to light hydrocarbons. Inhibiting initial production may minimize the production of heavy hydrocarbons from the formation. Production of substantial amounts of heavy hydrocarbons may require expensive equipment and/or reduce the life of production equipment.

In some hydrocarbon containing formations, hydrocarbons in the formation may be heated to pyrolysis temperatures before substantial permeability has been generated in the heated portion of the formation. An initial lack of permeability may inhibit the transport of generated fluids to production wells 206. During initial heating, fluid pressure in the formation may increase proximate heat sources 202. The increased fluid pressure may be released, monitored, altered, and/or controlled through one or more heat sources 202. For example, selected heat sources 202 or separate pressure relief wells may include pressure relief valves that allow for removal of some fluid from the formation.

In some embodiments, pressure generated by expansion of pyrolysis fluids or other fluids generated in the formation may be allowed to increase although an open path to production wells 206 or any other pressure sink may not yet exist in the formation. The fluid pressure may be allowed to increase towards a lithostatic pressure. Fractures in the hydrocarbon containing formation may form when the fluid approaches the lithostatic pressure. For example, fractures may form from heat sources 202 to production wells 206 in the heated portion of the formation. The generation of fractures in the heated portion may relieve some of the pressure in the portion. Pressure in the formation may have to be maintained below a selected pressure to inhibit unwanted production, fracturing of the overburden or underburden, and/or coking of hydrocarbons in the formation.

After pyrolysis temperatures are reached and production from the formation is allowed, pressure in the formation may be varied to alter and/or control a composition of formation fluid produced, to control a percentage of condensable fluid as compared to non-condensable fluid in the formation fluid, and/or to control an API gravity of formation fluid being produced. For example, decreasing pressure may result in production of a larger condensable fluid component. The condensable fluid component may contain a larger percentage of olefins.

In some in situ heat treatment process embodiments, pressure in the formation may be maintained high enough to promote production of formation fluid with an API gravity of greater than 20°. Maintaining increased pressure in the formation may inhibit formation subsidence during in situ heat treatment. Maintaining increased pressure may facilitate vapor phase production of fluids from the formation. Vapor phase production may allow for a reduction in size of collection conduits used to transport fluids produced from the formation. Maintaining increased pressure may reduce or eliminate the need to compress formation fluids at the surface to transport the fluids in collection conduits to treatment facilities.

Maintaining increased pressure in a heated portion of the formation may surprisingly allow for production of large quantities of hydrocarbons of increased quality and of relatively low molecular weight. Pressure may be maintained so that formation fluid produced has a minimal amount of compounds above a selected carbon number. The selected carbon number may be at most 25, at most 20, at most 12, or at most 8. Some high carbon number compounds may be entrained in vapor in the formation and may be removed from the formation with the vapor. Maintaining increased pressure in the formation may inhibit entrainment of high carbon number compounds and/or multi-ring hydrocarbon compounds in the vapor. High carbon number compounds and/or multi-ring hydrocarbon compounds may remain in a liquid phase in the formation for significant time periods. The significant time periods may provide sufficient time for the compounds to pyrolyze to form lower carbon number compounds.

Generation of relatively low molecular weight hydrocarbons is believed to be due, in part, to autogenous generation and reaction of hydrogen in a portion of the hydrocarbon containing formation. For example, maintaining an increased pressure may force hydrogen generated during pyrolysis into the liquid phase within the formation. Heating the portion to a temperature in a pyrolysis temperature range may pyrolyze hydrocarbons in the formation to generate liquid phase pyrolyzation fluids. The generated liquid phase pyrolyzation fluids components may include double bonds and/or radicals. Hydrogen ($H_2$) in the liquid phase may reduce double bonds of the generated pyrolyzation fluids, thereby reducing a potential for polymerization or formation of long chain compounds from the generated pyrolyzation fluids. In addition, $H_2$ may also neutralize radicals in the generated pyrolyzation fluids. Therefore, $H_2$ in the liquid phase may inhibit the generated pyrolyzation fluids from reacting with each other and/or with other compounds in the formation.

Formation fluid produced from production wells 206 may be transported through collection piping 208 to treatment facilities 210. Formation fluids may also be produced from heat sources 202. For example, fluid may be produced from heat sources 202 to control pressure in the formation adjacent to the heat sources. Fluid produced from heat sources 202 may be transported through tubing or piping to collection piping 208 or the produced fluid may be transported through tubing or piping directly to treatment facilities 210. Treatment facilities 210 may include separation units, reaction units, upgrading units, fuel cells, turbines, storage vessels, and/or other systems and units for processing produced formation fluids. The treatment facilities may form transportation fuel from at least a portion of the hydrocarbons produced from the formation. In some embodiments, the transportation fuel may be jet fuel, such as JP-8.

Formation fluid may be hot when produced from the formation through the production wells. Hot formation fluid may be produced during solution mining processes and/or during in situ heat treatment processes. In some embodiments, electricity may be generated using the heat of the fluid produced from the formation. Also, heat recovered from the formation after the in situ process may be used to generate electricity. The generated electricity may be used to supply power to the in situ heat treatment process. For example, the electricity may be used to power heaters, or to power a refrigeration system for forming or maintaining a low temperature barrier. Electricity may be generated using a Kalina cycle or a modified Kalina cycle.

Figure 3:
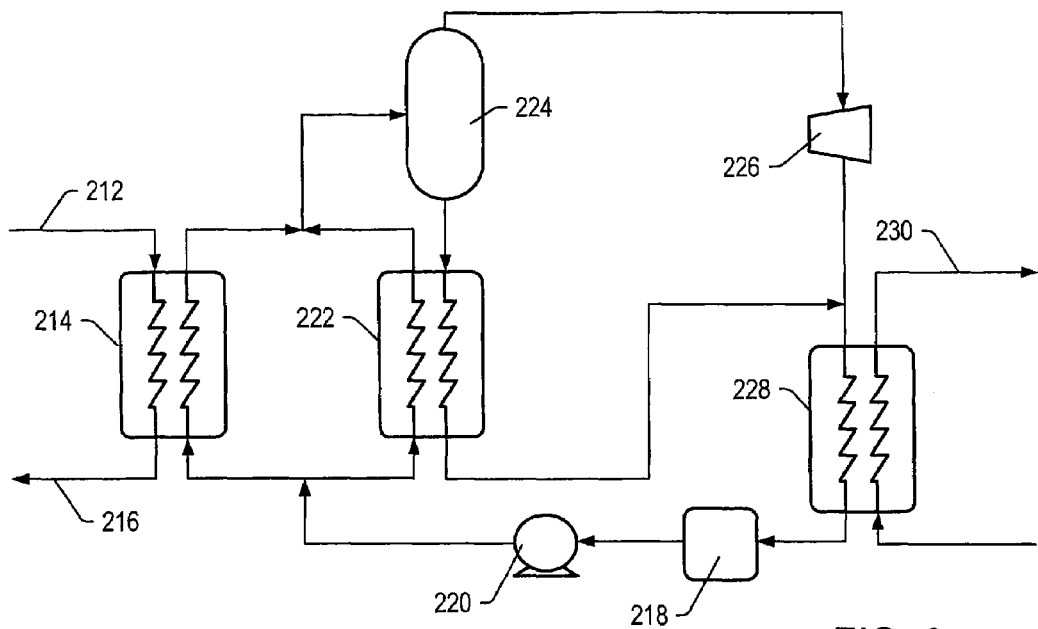
FIG. 3 depicts a schematic of an embodiment of a Kalina cycle for producing electricity.

FIG. 3 depicts a schematic representation of a Kalina cycle that uses relatively high pressure aqua ammonia as the working fluid. Hot produced fluid from the formation may pass through line 212 to heat exchanger 214. The produced fluid may have a temperature greater than about 100° C. Line 216 from heat exchanger 214 may direct the produced fluid to a separator or other treatment unit. In some embodiments, the produced fluid is a mineral containing fluid produced during solution mining. In some embodiments, the produced fluid includes hydrocarbons produced using an in situ heat treatment process or using an in situ mobilization process. Heat from the produced fluid is used to evaporate aqua ammonia in heat exchanger 214.

Aqua ammonia from tank 218 is directed by pump 220 to heat exchanger 214 and heat exchanger 222. Aqua ammonia from heat exchangers 214, 222 passes to separator 224. Separator 224 forms a rich ammonia gas stream and a lean ammonia gas stream. The rich ammonia gas stream is sent to turbine 226 to generate electricity.

The lean ammonia gas stream from separator 224 passes through heat exchanger 222. The lean gas stream leaving heat exchanger 222 is combined with the rich ammonia gas stream leaving turbine 226. The combination stream is passed through heat exchanger 228 and returned to tank 218. Heat exchanger 228 may be water cooled. Heater water from heat exchanger 228 may be sent to a surface water reservoir through line 230.

Figure 4:
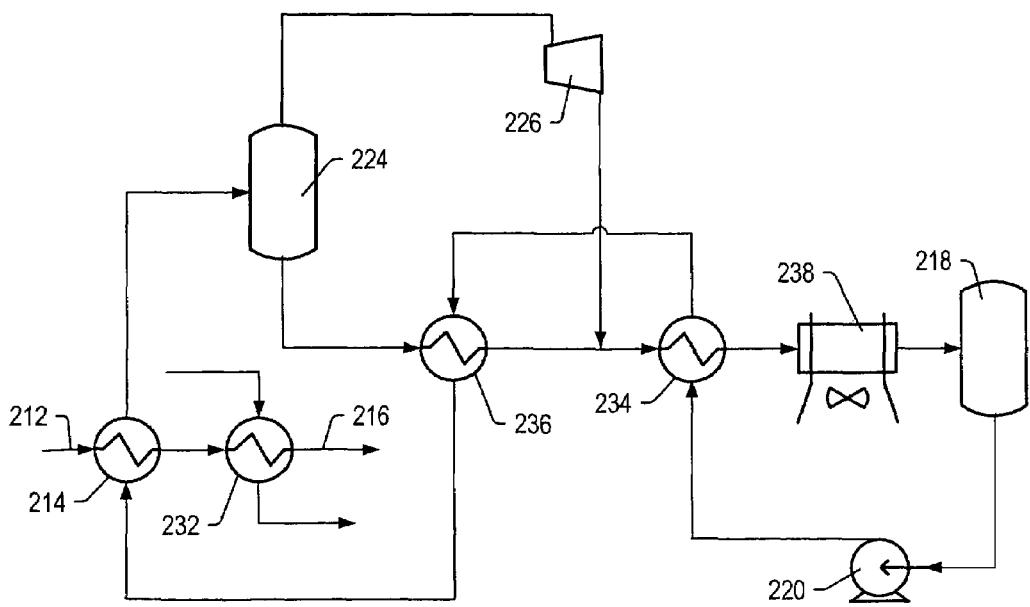
FIG. 4 depicts a schematic of an embodiment of a Kalina cycle for producing electricity.

FIG. 4 depicts a schematic representation of a modified Kalina cycle that uses lower pressure aqua ammonia as the working fluid. Hot produced fluid from the formation may pass through line 212 to heat exchanger 214. The produced fluid may have a temperature greater than about 100° C. Second heat exchanger 232 may further reduce the temperature of the produced fluid from the formation before the fluid is sent through line 216 to a separator or other treatment unit. Second heat exchanger may be water cooled.

Aqua ammonia from tank 218 is directed by pump 220 to heat exchanger 234. The temperature of the aqua ammonia from tank 218 is raised in heat exchanger 234 by heat transfer with a combined aqua ammonia stream from turbine 226 and separator 224. The aqua ammonia stream from heat exchanger 234 passes to heat exchanger 236. The temperature of the stream is raised again by transfer of heat with a lean ammonia stream that exits separator 224. The stream then passes to heat exchanger 214. Heat from the produced fluid is used to evaporate aqua ammonia in heat exchanger 214. The aqua ammonia passes to separator 224.

Separator 224 forms a rich ammonia gas stream and a lean ammonia gas stream. The rich ammonia gas stream is sent to turbine 226 to generate electricity. The lean ammonia gas stream passes through heat exchanger 236. After heat exchanger 236, the lean ammonia gas stream is combined with the rich ammonia gas stream leaving turbine 226. The combined gas stream is passed through heat exchanger 234 to cooler 238. After cooler 238, the stream returns to tank 218.

In some embodiments, formation fluid produced from the in situ heat treatment process is sent to a separator to split the stream into one or more in situ heat treatment process liquid streams and/or one or more in situ heat treatment process gas streams. The liquid streams and the gas streams may be further treated to yield desired products.

In some embodiments, in situ heat treatment process gas is treated at the site of the formation to produce hydrogen. Treatment processes to produce hydrogen from the in situ heat treatment process gas may include steam methane reforming, autothermal reforming, and/or partial oxidation reforming.

All or at least a portion of a gas stream may be treated to yield a gas that meets natural gas pipeline specifications. FIGS. 5, 6, 7, 8, and 9 depict schematic representations of embodiments of systems for producing pipeline gas from the in situ heat treatment process gas stream.

Figure 5:
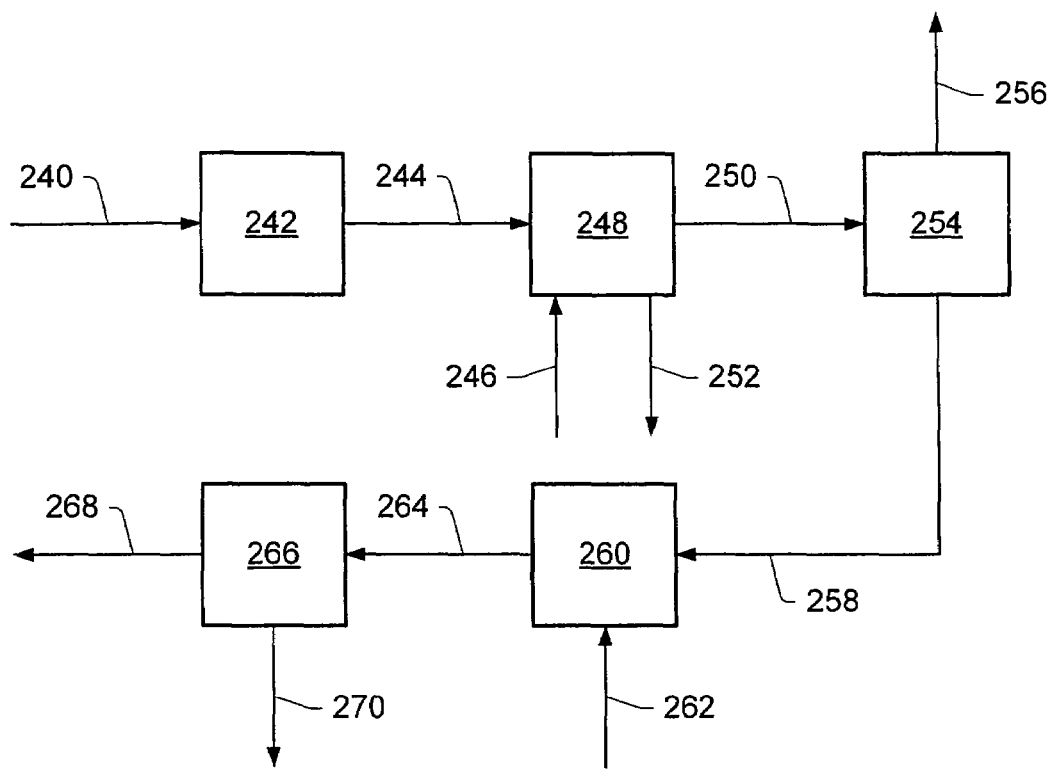
FIG. 5 depicts a schematic representation of an embodiment of a system for producing pipeline gas.

As depicted in FIG. 5, in situ heat treatment process gas 240 enters unit 242. In unit 242, treatment of in situ heat treatment process gas 240 removes sulfur compounds, carbon dioxide, and/or hydrogen to produce gas stream 244. Unit 242 may include a physical treatment system and/or a chemical treatment system. The physical treatment system includes, but is not limited to, a membrane unit, a pressure swing adsorption unit, a liquid absorption unit, and/or a cryogenic unit. The chemical treatment system may include units that use amines (for example, diethanolamine or di-isopropanolamine), zinc oxide, sulfolane, water, or mixtures thereof in the treatment process. In some embodiments, unit 242 uses a Sulfinol gas treatment process for removal of sulfur compounds. Carbon dioxide may be removed using Catacarb® (Catacarb, Overland Park, Kans., U.S.A.) and/or Benfield (UOP, Des Plaines, Ill., U.S.A.) gas treatment processes.

Gas stream 244 may include, but is not limited to, hydrogen, carbon monoxide, methane, and hydrocarbons having a carbon number of at least 2 or mixtures thereof. In some embodiments, gas stream 244 includes nitrogen and/or rare gases such as argon or helium. In some embodiments, gas stream 244 includes from about 0.0001 grams (g) to about 0.1 g, from about 0.001 g to about 0.05 g, or from about 0.01 g to about 0.03 g of hydrogen, per gram of gas stream. In certain embodiments, gas stream 244 includes from about 0.01 g to about 0.6 g, from about 0.1 g to about 0.5 g, or from about 0.2 g to 0.4 g of methane, per gram of gas stream.

In some embodiments, gas stream 244 includes from about 0.00001 g to about 0.01 g, from about 0.0005 g to about 0.005 g, or from about 0.0001 g to about 0.001 g of carbon monoxide, per gram of gas stream. In certain embodiments, gas stream 244 includes trace amounts of carbon dioxide.

In certain embodiments, gas stream 244 may include from about 0.0001 g to about 0.5 g, from about 0.001 g to about 0.2 g, or from about 0.01 g to about 0.1 g of hydrocarbons having a carbon number of at least 2, per gram of gas stream. Hydrocarbons having a carbon number of at least 2 include paraffins and olefins. Paraffins and olefins include, but are not limited to, ethane, ethylene, acetylene, propane, propylene, butanes, butylenes, or mixtures thereof. In some embodiments, hydrocarbons having a carbon number of at least 2 include from about 0.0001 g to about 0.5 g, from about 0.001 g to about 0.2 g, or from about 0.01 g to about 0.1 g of a mixture of ethylene, ethane, and propylene. In some embodiments, hydrocarbons having a carbon number of at least 2 includes trace amounts of hydrocarbons having a carbon number of at least 4.

Pipeline gas (for example, natural gas) after treatment to remove the hydrogen sulfide, includes methane, ethane, propane, butane, carbon dioxide, oxygen, nitrogen, and small amounts of rare gases. Typically, treated natural gas includes, per gram of natural gas, about 0.7 g to about 0.98 g of methane; about 0.0001 g to about 0.2 g or from about 0.001 g to about 0.05 g of a mixture of ethane, propane, and butane; about 0.0001 g to about 0.8 g or from about 0.001 g to about 0.02 g of carbon dioxide; about 0.00001 g to about 0.02 g or from about 0.0001 to about 0.002 of oxygen; trace amounts of rare gases; and the balance being nitrogen. Such treated natural gas has a heat content of about 40 MJ/Nm$^3$ to about 50 MJ/Nm$^3$.

Since gas stream 244 differs in composition from treated natural gas, gas stream 244 may not meet pipeline gas requirements. Emissions generated during burning of gas stream 244 may be unacceptable and/or not meet regulatory standards if the gas stream is to be used as a fuel. Gas stream 244 may include components or amounts of components that make the gas stream undesirable for use as a feed stream for making additional products.

In some embodiments, hydrocarbons having a carbon number greater than 2 are separated from gas stream 244. These hydrocarbons may be separated using cryogenic processes, adsorption processes, and/or membrane processes. Removal of hydrocarbons having a carbon number greater than 2 from gas stream 244 may facilitate and/or enhance further processing of the gas stream.

Process units as described herein may be operated at the following temperatures, pressures, hydrogen source flows, and gas stream flows, or operated otherwise as known in the art. Temperatures may range from about 50° C. to about 600° C., from about 100° C. to about 500° C., or from about 200° C. to about 400° C. Pressures may range from about 0.1 MPa to about 20 MPa, from about 1 MPa to about 12 MPa, from about 4 MPa to about 10 MPa, or from about 6 MPa to about 8 MPa. Flows of gas streams through units described herein may range from about 5 metric tons of gas stream per day ("MT/D") to about 15,000 MT/D. In some embodiments, flows of gas streams through units described herein range from about 10 MT/D to 10,000 MT/D or from about 15 MT/D to about 5,000 MT/D. In some embodiments, the hourly volume of gas processed is 5,000 to 25,000 times the volume of catalyst in one or more processing units.

As depicted in FIG. 5, gas stream 244 and hydrogen source 246 enter hydrogenation unit 248. Hydrogen source 246 includes, but is not limited to, hydrogen gas, hydrocarbons, and/or any compound capable of donating a hydrogen atom. In some embodiments, hydrogen source 246 is mixed with gas stream 244 prior to entering hydrogenation unit 248. In some embodiments, the hydrogen source is hydrogen and/or hydrocarbons present in gas stream 244. In hydrogenation unit 248, contact of gas stream 244 with hydrogen source 246 in the presence of one or more catalysts hydrogenates unsaturated hydrocarbons in gas stream 244 and produces gas stream 250. Gas stream 250 may include hydrogen and saturated hydrocarbons such as methane, ethane, and propane. Hydrogenation unit 248 may include a knock-out pot. The knock-out pot removes any heavy by-products 252 from the product gas stream.

Gas stream 250 exits hydrogenation unit 248 and enters hydrogen separation unit 254. Hydrogen separation unit 254 is any suitable unit capable of separating hydrogen from the incoming gas stream. Hydrogen separation unit 254 may be a membrane unit, a pressure swing adsorption unit, a liquid absorption unit, or a cryogenic unit. In certain embodiments, hydrogen separation unit 254 is a membrane unit. Hydrogen separation unit 254 may include PRISM® membranes available from Air Products and Chemicals, Inc. (Allentown, Pa., U.S.A.). The membrane separation unit may be operated at a temperature ranging from about 50° C. to about 80° C. (for examples, at a temperature of about 66° C.). In hydrogen separation unit 254, separation of hydrogen from gas stream 250 produces hydrogen rich stream 256 and gas stream 258. Hydrogen rich stream 256 may be used in other processes, or, in some embodiments, as hydrogen source 246 for hydrogenation unit 248.

In some embodiments, hydrogen separation unit 254 is a cryogenic unit. When hydrogen separation unit 254 is a cryogenic unit, gas stream 250 may be separated into a hydrogen rich stream, a methane rich stream, and/or a gas stream that contains components having a boiling point greater than or equal to ethane.

In some embodiments, hydrogen content in gas stream 258 is acceptable and further separation of hydrogen from gas stream 258 is not needed. When the hydrogen content in gas stream 258 is acceptable, the gas stream may be suitable for use as pipeline gas.

Further removal of hydrogen from gas stream 258 may be desired. In some embodiments, hydrogen is separated from gas stream 258 using a membrane. An example of a hydrogen separation membrane is described in U.S. Pat. No. 6,821,501 to Matzakos et al, which is incorporated by reference as if fully set forth herein.

In some embodiments, a method of removing hydrogen from gas stream 258 includes converting hydrogen to water. Gas stream 258 exits hydrogen separation unit 254 and enters oxidation unit 260, as shown in FIG. 5. Oxidation source 262 also enters oxidation unit 260. In oxidation unit 260, contact of gas stream 258 with oxidation source 262 produces gas stream 264. Gas stream 264 may include water produced as a result of the oxidation. The oxidation source may include, but is not limited to, pure oxygen, air, or oxygen enriched air. Since air or oxygen enriched air includes nitrogen, monitoring the quantity of air or oxygen enriched air provided to oxidation unit 260 may be desired to ensure the product gas meets the desired pipeline specification for nitrogen. Oxidation unit 260 includes, in some embodiments, a catalyst. Oxidation unit 260 is, in some embodiments, operated at a temperature in a range from about 50° C. to 500° C., from about 100° C. to about 400° C., or from about 200° C. to about 300° C.

Gas stream 264 exits oxidation unit 260 and enters dehydration unit 266. In dehydration unit 266, separation of water from gas stream 264 produces pipeline gas 268 and water 270. Dehydration unit 266 may be, for example, a standard gas plant glycol dehydration unit and/or molecular sieves.

In some embodiments, a change in the amount of methane in pipeline gas produced from an in situ heat treatment process gas is desired. The amount of methane in pipeline gas may be enhanced through removal of components and/or through chemical modification of components in the in situ heat treatment process gas.

Figure 6:
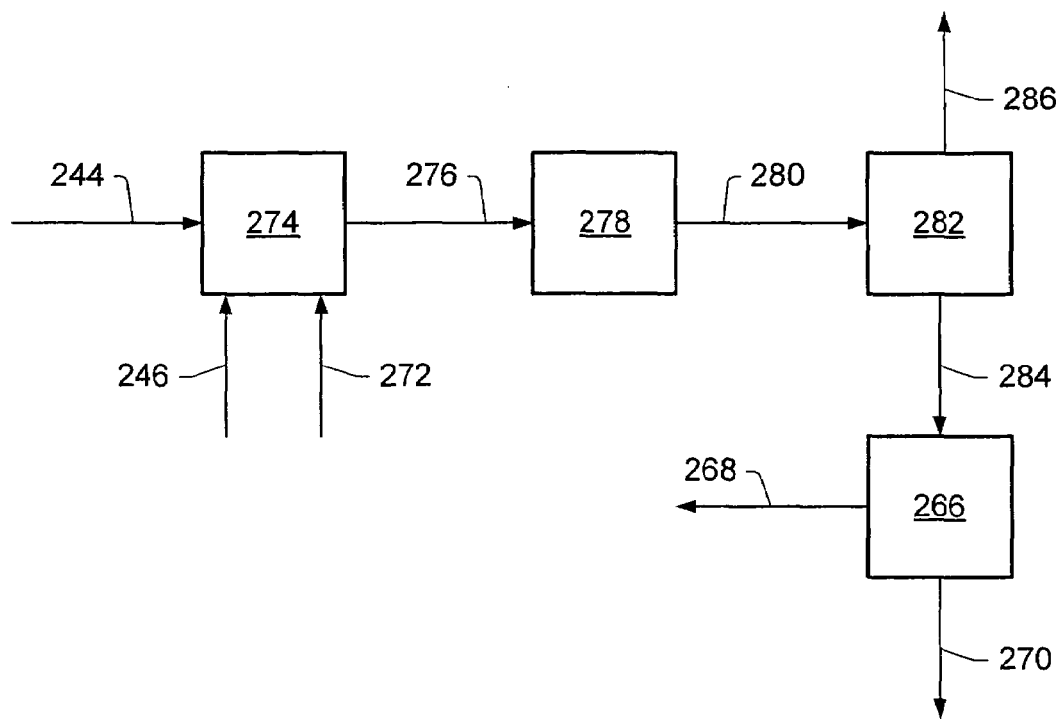
FIG. 6 depicts a schematic representation of an embodiment of a system for producing pipeline gas.

FIG. 6 depicts a schematic representation of an embodiment to enhance the amount of methane in pipeline gas through reformation and methanation of the in situ heat treatment process gas.

Treatment of in situ heat treatment process gas as described herein produces gas stream 244. Gas stream 244, hydrogen source 246, and steam source 272 enter reforming unit 274. In some embodiments, gas stream 244, hydrogen source 246, and/or steam source 272 are mixed together prior to entering reforming unit 274. In some embodiments, gas stream 244 includes an acceptable amount of a hydrogen source, and thus external addition of hydrogen source 246 is not needed. In reforming unit 274, contact of gas stream 244 with hydrogen source 246 in the presence of one or more catalysts and steam source 272 produces gas stream 276. The catalysts and operating parameters may be selected such that reforming of methane in gas stream 244 is minimized. Gas stream 276 includes methane, carbon monoxide, carbon dioxide, and/or hydrogen. The carbon dioxide in gas stream 276, at least a portion of the carbon monoxide in gas stream 276, and at least a portion of the hydrogen in gas stream 276 is from conversion of hydrocarbons with a carbon number greater than 2 (for example, ethylene, ethane, or propylene) to carbon monoxide and hydrogen. Methane in gas stream 276, at least a portion of the carbon monoxide in gas stream 276, and at least a portion of the hydrogen in gas stream 276 is from gas stream 244 and hydrogen source 246.

Reforming unit 274 may be operated at temperatures and pressures described herein, or operated otherwise as known in the art. In some embodiments, reforming unit 274 is operated at temperatures ranging from about 250° C. to about 500° C. In some embodiments, pressures in reforming unit 274 range from about 1 MPa to about 5 MPa.

Removal of excess carbon monoxide in gas stream 276 to meet, for example, pipeline specifications may be desired. Carbon monoxide may be removed from gas stream 276 using a methanation process. Methanation of carbon monoxide produces methane and water. Gas stream 276 exits reforming unit 274 and enters methanation unit 278. In methanation unit 278, contact of gas stream 276 with a hydrogen source in the presence of one or more catalysts produces gas stream 280. The hydrogen source may be provided by hydrogen and/or hydrocarbons present in gas stream 276. In some embodiments, an additional hydrogen source is added to the methanation unit and/or the gas stream. Gas stream 280 may include water, carbon dioxide, and methane.

Methanation unit 278 may be operated at temperatures and pressures described herein or operated otherwise as known in the art. In some embodiments, methanation unit 278 is operated at temperatures ranging from about 260° C. to about 320° C. In some embodiments, pressures in methanation unit 278 range from about 1 MPa to about 5 MPa.

Carbon dioxide may be separated from gas stream 280 in carbon dioxide separation unit 282. In some embodiments, gas stream 280 exits methanation unit 278 and passes through a heat exchanger prior to entering carbon dioxide separation unit 282. In carbon dioxide separation unit 282, separation of carbon dioxide from gas stream 280 produces gas stream 284 and carbon dioxide stream 286. In some embodiments, the separation process uses amines to facilitate the removal of carbon dioxide from gas stream 280. Gas stream 284 includes, in some embodiments, at most 0.1 g, at most 0.08 g, at most 0.06, or at most 0.04 g of carbon dioxide per gram of gas stream. In some embodiments, gas stream 284 is substantially free of carbon dioxide.

Gas stream 284 exits carbon dioxide separation unit 282 and enters dehydration unit 266. In dehydration unit 266, separation of water from gas stream 284 produces pipeline gas 268 and water 270.

Figure 7:
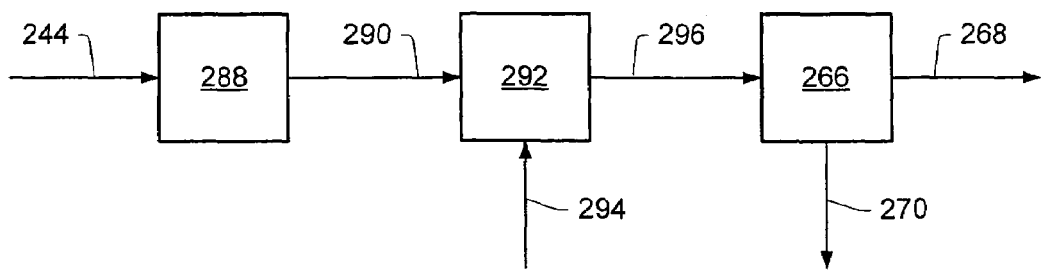
FIG. 7 depicts a schematic representation of an embodiment of a system for producing pipeline gas.

FIG. 7 depicts a schematic representation of an embodiment to enhance the amount of methane in pipeline gas through concurrent hydrogenation and methanation of in situ heat treatment process gas. Hydrogenation and methanation of carbon monoxide and hydrocarbons having a carbon number greater than 2 in the in situ heat treatment process gas produces methane. Concurrent hydrogenation and methanation in one processing unit may inhibit formation of impurities. Inhibiting the formation of impurities enhances production of methane from the in situ heat treatment process gas. In some embodiments, the hydrogen source content of the in situ heat treatment process gas is acceptable and an external source of hydrogen is not needed.

Treatment of in situ heat treatment process gas as described herein produces gas stream 244. Gas stream 244 enters hydrogenation and methanation unit 288. In hydrogenation and methanation unit 288, contact of gas stream 244 with a hydrogen source in the presence of a catalyst or multiple catalysts produces gas stream 290. The hydrogen source may be provided by hydrogen and/or hydrocarbons in gas stream 244. In some embodiments, an additional hydrogen source is added to hydrogenation and methanation unit 288 and/or gas stream 244. Gas stream 290 may include methane, hydrogen, and, in some embodiments, at least a portion of gas stream 244. In some embodiments, gas stream 290 includes from about 0.05 g to about 1 g, from about 0.8 g to about 0.99 g, or from about 0.9 g to 0.95 g of methane, per gram of gas stream. Gas stream 290 may include, per gram of gas stream, at most 0.1 g of hydrocarbons having a carbon number of at least 2 and at most 0.01 g of carbon monoxide. In some embodiments, gas stream 290 includes trace amounts of carbon monoxide and/or hydrocarbons having a carbon number of at least 2.

Hydrogenation and methanation unit 288 may be operated at temperatures, and pressures, described herein, or operated otherwise as known in the art. In some embodiments, hydrogenation and methanation unit 288 is operated at a temperature ranging from about 200° C. to about 350° C. In some embodiments, pressure in hydrogenation and methanation unit 288 is about 2 MPa to about 12 MPa, about 4 MPa to about 10 MPa, or about 6 MPa to about 8 MPa. In certain embodiments, pressure in hydrogenation and methanation unit 288 is about 4 MPa.

The removal of hydrogen from gas stream 290 may be desired. Removal of hydrogen from gas stream 290 may allow the gas stream to meet pipeline specification and/or handling requirements.

In FIG. 7, gas stream 290 exits methanation unit 288 and enters polishing unit 292. Carbon dioxide stream 294 also enters polishing unit 292, or it mixes with gas stream 290 upstream of the polishing unit. In polishing unit 292, contact of the gas stream 290 with carbon dioxide stream 294 in the presence of one or more catalysts produces gas stream 296. The reaction of hydrogen with carbon dioxide produces water and methane. Gas stream 296 may include methane, water, and, in some embodiments, at least a portion of gas stream 290. In some embodiments, polishing unit 292 is a portion of hydrogenation and methanation unit 288 with a carbon dioxide feed line.

Polishing unit 292 may be operated at temperatures and pressures described herein, or operated as otherwise known in the art. In some embodiments, polishing unit 292 is operated at a temperature ranging from about 200° C. to about 400° C. In some embodiments, pressure in polishing unit 292 is about 2 MPa to about 12 MPa, about 4 MPa to about 10 MPa, or about 6 MPa to about 8 MPa. In certain embodiments, pressure in polishing unit 292 is about 4 MPa.

Gas stream 296 enters dehydration unit 266. In dehydration unit 266, separation of water from gas stream 296 produces pipeline gas 268 and water 270.

Figure 8:
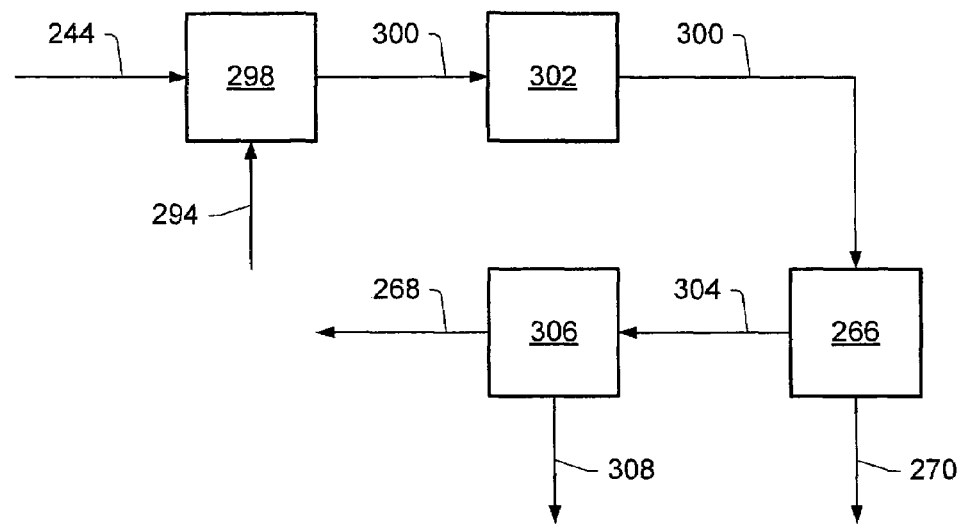
FIG. 8 depicts a schematic representation of an embodiment of a system for producing pipeline gas.

FIG. 8 depicts a schematic representation of an embodiment to enhance the amount of methane in pipeline gas through concurrent hydrogenation and methanation of in situ heat treatment process gas in the presence of excess carbon dioxide and the separation of ethane and heavier hydrocarbons. Hydrogen not used in the hydrogenation methanation process may react with carbon dioxide to form water and methane. Water may then be separated from the process stream. Concurrent hydrogenation and methanation in the presence of carbon dioxide in one processing unit may inhibit formation of impurities.

Treatment of in situ heat treatment process gas as described herein produces gas stream 244. Gas stream 244 and carbon dioxide stream 294 enter hydrogenation and methanation unit 298. In hydrogenation and methanation unit 298, contact of gas stream 244 with a hydrogen source in the presence of one or more catalysts and carbon dioxide produces gas stream 300. The hydrogen source may be provided by hydrogen and/or hydrocarbons in gas stream 244. In some embodiments, the hydrogen source is added to hydrogenation and methanation unit 298 or to gas stream 244. The quantity of hydrogen in hydrogenation and methanation unit 298 may be controlled and/or the flow of carbon dioxide may be controlled to provide a minimum quantity of hydrogen in gas stream 300.

Gas stream 300 may include water, hydrogen, methane, ethane, and, in some embodiments, at least a portion of the hydrocarbons having a carbon number greater than 2 from gas stream 244. In some embodiments, gas stream 300 includes from about 0.05 g to about 0.7 g, from about 0.1 g to about 0.6 g, or from about 0.2 g to 0.5 g of methane, per gram of gas stream. Gas stream 300 includes from about 0.0001 g to about 0.4 g, from about 0.001 g to about 0.2 g, or from about 0.01 g to 0.1 g of ethane, per gram of gas stream. In some embodiments, gas stream 300 includes a trace amount of carbon monoxide and olefins.

Hydrogenation and methanation unit 298 may be operated at temperatures and pressures, described herein, or operated otherwise as known in the art. In some embodiments, hydrogenation and methanation unit 298 is operated at a temperature ranging from about 60° C. to about 350° C. and a pressure ranging from about 1 MPa to about 12 MPa, about 2 MPa to about 10 MPa, or about 4 MPa to about 8 MPa.

In some embodiments, separation of ethane from methane is desirable. Separation may be performed using membrane and/or cryogenic techniques. Cryogenic processes may require that water levels in a gas stream be at most 1-10 part per million by weight.

Water in gas stream 300 may be removed using generally known water removal techniques. Gas stream 300 exits hydrogenation and methanation unit 298, passes through heat exchanger 302 and then enters dehydration unit 266. In dehydration unit 266, separation of water from gas stream 300 as previously described, as well as by contact with absorption units and/or molecular sieves, produces gas stream 304 and water 270. Gas stream 304 may have a water content of at most 10 ppm, at most 5 ppm, or at most 1 ppm. In some embodiments, water content in gas stream 304 ranges from about 0.01 ppm to about 10 ppm, from about 0.05 ppm to about 5 ppm, or from about 0.1 ppm to about 1 ppm.

Cryogenic separator 306 separates gas stream 304 into pipeline gas 268 and hydrocarbon stream 308. Pipeline gas stream 268 includes methane and/or carbon dioxide. Hydrocarbon stream 308 includes ethane and, in some embodiments, residual hydrocarbons having a carbon number of at least 2. In some embodiments, hydrocarbons having a carbon number of at least 2 may be separated into ethane and additional hydrocarbons and/or sent to other operating units.

Figure 9:
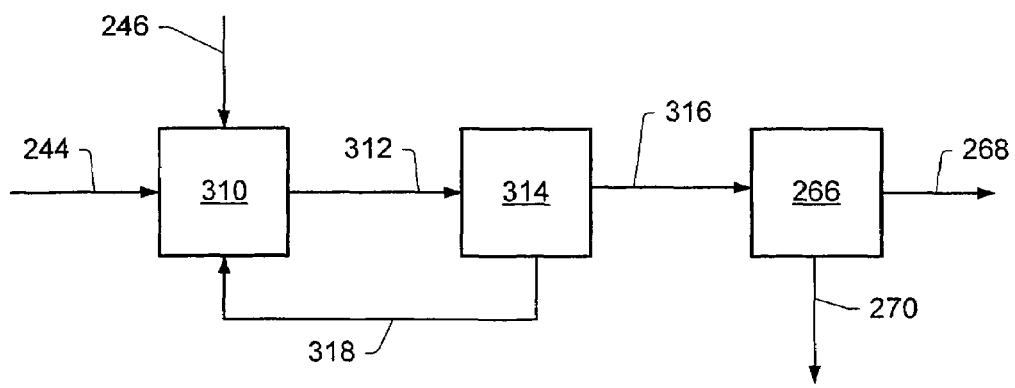
FIG. 9 depicts a schematic representation of an embodiment of a system for producing pipeline gas.

FIG. 9 depicts a schematic representation of an embodiment to enhance the amount of methane in pipeline gas through concurrent hydrogenation and methanation of in situ heat treatment process gas in the presence of excess hydrogen. The use of excess hydrogen during the hydrogenation and methanation process may prolong catalyst life, control reaction rates, and/or inhibit formation of impurities.

Treatment of in situ heat treatment process gas as described herein produces gas stream 244. Gas stream 244 and hydrogen source 246 enter hydrogenation and methanation unit 310. In some embodiments, hydrogen source 246 is added to gas stream 244. In hydrogenation and methanation unit 310, contact of gas stream 244 with hydrogen source 246 in the presence of one or more catalysts produces gas stream 312. In some embodiments, carbon dioxide may be added to hydrogen and methanation unit 310. The quantity of hydrogen in hydrogenation and methanation unit 310 may be controlled to provide an excess quantity of hydrogen to the hydrogenation and methanation unit.

Gas stream 312 may include water, hydrogen, methane, ethane, and, in some embodiments, at least a portion of the hydrocarbons having a carbon number greater than 2 from gas stream 244. In some embodiments, gas stream 312 includes from about 0.05 g to about 0.9 g, from about 0.1 g to about 0.6 g, or from about 0.2 g to 0.5 g of methane, per gram of gas stream. Gas stream 312 includes from about 0.0001 g to about 0.4 g, from about 0.001 g to about 0.2 g, or from about 0.01 g to 0.1 g of ethane, per gram of gas stream. In some embodiments, gas stream 312 includes carbon monoxide and trace amounts of olefins.

Hydrogenation and methanation unit 310 may be operated at temperatures and pressures, described herein, or operated otherwise as known in the art. In some embodiments, hydrogenation and methanation unit 310 is operated at a temperature ranging from about 60° C. to about 400° C. and a hydrogen partial pressure ranging from about 1 MPa to about 12 MPa, about 2 MPa to about 8 MPa, or about 3 MPa to about 5 MPa. In some embodiments, the hydrogen partial pressure in hydrogenation and methanation unit 310 is about 3 MPa.

Gas stream 312 enters gas separation unit 314. Gas separation unit 314 is any suitable unit or combination of units that is capable of separating hydrogen and/or carbon dioxide from gas stream 312. Gas separation unit may be a pressure swing adsorption unit, a membrane unit, a liquid absorption unit, and/or a cryogenic unit. In some embodiments, gas stream 312 exits hydrogenation and methanation unit 310 and passes through a heat exchanger prior to entering gas separation unit 314. In gas separation unit 314, separation of hydrogen from gas stream 312 produces gas stream 316 and hydrogen stream 318. Hydrogen stream 318 may be recycled to hydrogenation and methanation unit 310, mixed with gas stream 244 and/or mixed with hydrogen source 246 upstream of the hydrogenation methanation unit. In embodiments in which carbon dioxide is added to hydrogenation and methanation unit 310, carbon dioxide is separated from gas stream 316 in separation unit 314. The separated carbon dioxide may be recycled to the hydrogenation and methanation unit, mixed with gas stream 244 upstream of the hydrogenation and methanation unit, and/or mixed with the carbon dioxide stream entering the hydrogenation and methanation unit.

Gas stream 316 enters dehydration unit 266. In dehydration unit 266, separation of water from gas stream 316 produces pipeline gas 268 and water 270.

It should be understood that gas stream 244 may be treated by combinations of one or more of the processes described in FIGS. 5, 6, 7, 8, and 9. For example, all or at least a portion of gas streams from reforming unit 274 (FIG. 6) may be treated in hydrogenation and methanation units 288 (FIG. 7), 298 (FIG. 8), or 308 (FIG. 9). All or at least a portion of the gas stream produced from hydrogenation unit 248 may enter, or be combined with gas streams entering, reforming unit 274, hydrogenation and methanation unit 288, and/or hydrogenation and methanation unit 298. In some embodiments, gas stream 244 may be hydrotreated and/or used in other processing units.

Catalysts used to produce natural gas that meets pipeline specifications may be bulk metal catalysts or supported catalysts. Bulk metal catalysts include Columns 6-10 metals. Supported catalysts include Columns 6-10 metals on a support. Columns 6-10 metals include, but are not limited to, vanadium, chromium, molybdenum, tungsten, manganese, technetium, rhenium, iron, cobalt, nickel, ruthenium, palladium, rhodium, osmium, iridium, platinum, or mixtures thereof. The catalyst may have, per gram of catalyst, a total Columns 6-10 metals content of at least 0.0001 g, at least 0.001 g, at least 0.01 g, or in a range from about 0.0001-0.6 g, about 0.005-0.3 g, about 0.001-0.1 g, or about 0.01-0.08 g. In some embodiments, the catalyst includes a Column 15 element in addition to the Columns 6-10 metals. An example of a Column 15 element is phosphorus. The catalyst may have a total Column 15 elements content, per gram of catalyst, in a range from about 0.000001-0.1 g, about 0.00001-0.06 g, about 0.00005-0.03 g, or about 0.0001-0.001 g. In some embodiments, the catalyst includes a combination of Column 6 metals with one or more Columns 7-10 metals. A molar ratio of Column 6 metals to Columns 7-10 metals may be in a range from 0.1-20, 1-10, or 2-5. In some embodiments, the catalyst includes Column 15 elements in addition to the combination of Column 6 metals with one or more Columns 7-10 metals.

In some embodiments, Columns 6-10 metals are incorporated in, or deposited on, a support to form the catalyst. In certain embodiments, Columns 6-10 metals in combination with Column 15 elements are incorporated in, or deposited on, the support to form the catalyst. In embodiments in which the metals and/or elements are supported, the weight of the catalyst includes all support, all metals, and all elements. The support may be porous and may include refractory oxides; oxides of tantalum, niobium, vanadium, scandium, or lanthanide metals; porous carbon based materials; zeolites; or combinations thereof. Refractory oxides may include, but are not limited to, alumina, silica, silica-alumina, titanium oxide, zirconium oxide, magnesium oxide, or mixtures thereof. Supports may be obtained from a commercial manufacturer such as CRI/Criterion Inc. (Houston, Tex., U.S.A.). Porous carbon based materials include, but are not limited to, activated carbon and/or porous graphite. Examples of zeolites include Y-zeolites, beta zeolites, mordenite zeolites, ZSM-5 zeolites, and ferrierite zeolites. Zeolites may be obtained from a commercial manufacturer such as Zeolyst (Valley Forge, Pa., U.S.A.).

Supported catalysts may be prepared using generally known catalyst preparation techniques. Examples of catalyst preparations are described in U.S. Pat. No. 6,218,333 to Gabrielov et al.; U.S. Pat. No. 6,290,841 to Gabrielov et al.; U.S. Pat. No. 5,744,025 to Boon et al., and U.S. Pat. No. 6,759,364 to Bhan, all of which are incorporated by reference herein.

In some embodiments, the support is impregnated with metal to form the catalyst. In certain embodiments, the support is heat treated at temperatures in a range from about 400° C. to about 1200° C., from about 450° C. to about 1000° C., or from about 600° C. to about 900° C. prior to impregnation with a metal. In some embodiments, impregnation aids are used during preparation of the catalyst. Examples of impregnation aids include a citric acid component, ethylenediaminetetraacetic acid (EDTA), ammonia, or mixtures thereof.

The Columns 6-10 metals and support may be mixed with suitable mixing equipment to form a Columns 6-10 metals/support mixture. The Columns 6-10 metals/support mixture may be mixed using suitable mixing equipment. Examples of suitable mixing equipment include tumblers, stationary shells or troughs, Muller mixers (batch type or continuous type), impact mixers, and any other generally known mixer, or other device, that will suitably provide the Columns 6-10 metals support mixture. In certain embodiments, the materials are mixed until the Columns 6-10 metals are substantially homogeneously dispersed in the support.

In some embodiments, the catalyst is heat treated at temperatures from 150-750° C., from 200-740° C., or from 400-730° C. after combining the support with the metal. In some embodiments, the catalyst is heat treated in the presence of hot air and/or oxygen rich air at a temperature in a range between 400° C. and 1000° C. to remove volatile matter and/or to convert at least a portion of the Columns 6-10 metals to the corresponding metal oxide.

In other embodiments, a catalyst precursor is heat treated in the presence of air at temperatures in a range from 35-500° C. for a period of time in a range from 1-3 hours to remove a majority of the volatile components without converting the Columns 6-10 metals to the corresponding metal oxide. Catalysts prepared by such a method are generally referred to as "uncalcined" catalysts. When catalysts are prepared in this manner, in combination with a sulfiding method, the active metals may be substantially dispersed in the support. Preparations of such catalysts are described in U.S. Pat. No. 6,218,333 to Gabrielov et al., and U.S. Pat. No. 6,290,841 to Gabrielov et al.

In some embodiments, the catalyst and/or a catalyst precursor is sulfided to form metal sulfides (prior to use) using techniques known in the art (for example, ACTICAT™ process, CRI International, Inc. (Houston, Tex., U.S.A.)). In some embodiments, the catalyst is dried then sulfided. Alternatively, the catalyst may be sulfided in situ by contact of the catalyst with a gas stream that includes sulfur-containing compounds. In situ sulfurization may utilize either gaseous hydrogen sulfide in the presence of hydrogen or liquid-phase sulfurizing agents such as organosulfur compounds (including alkylsulfides, polysulfides, thiols, and sulfoxides). Exsitu sulfurization processes are described in U.S. Pat. No. 5,468,372 to Seamans et al., and U.S. Pat. No. 5,688,736 to Seamans et al., all of which are incorporated by reference herein.

In some embodiments, a first type of catalyst ("first catalyst") includes Columns 6-10 metals and the support. The first catalyst is, in some embodiments, an uncalcined catalyst. In some embodiments, the first catalyst includes molybdenum and nickel. In certain embodiments, the first catalyst includes phosphorus. In some embodiments, the first catalyst includes Columns 9-10 metals on a support. The Column 9 metal may be cobalt and the Column 10 metal may be nickel. In some embodiments, the first catalyst includes Columns 10-11 metals. The Column 10 metal may be nickel and the Column 11 metal may be copper.

The first catalyst may assist in the hydrogenation of olefins to alkanes. In some embodiments, the first catalyst is used in the hydrogenation unit. The first catalyst may include at least 0.1 g, at least 0.2 g, or at least 0.3 g of Column 10 metals per gram of support. In some embodiments, the Column 10 metal is nickel. In certain embodiments, the Column 10 metal is palladium and/or a mixed alloy of platinum and palladium. Use of a mixed alloy catalyst may enhance processing of gas streams with sulfur containing compounds. In some embodiments, the first catalyst is a commercial catalyst. Examples of commercial first catalysts include, but are not limited to, Criterion 424, DN-140, DN-200, and DN-3100, KL6566, KL6560, KL6562, KL6564, KL7756; KL7762, KL7763, KL7731, C-624, C654, all of which are available from CRI/Criterion Inc.

In some embodiments, a second type of catalyst ("second catalyst") includes Column 10 metal on a support. The Column 10 metal may be platinum and/or palladium. In some embodiments, the catalyst includes about 0.001 g to about 0.05 g, or about 0.01 g to about 0.02 g of platinum and/or palladium per gram of catalyst. The second catalyst may assist in the oxidation of hydrogen to form water. In some embodiments, the second catalyst is used in the oxidation unit. In some embodiments, the second catalyst is a commercial catalyst. An example of commercial second catalyst includes KL87748, available from CRI/Criterion Inc.

In some embodiments, a third type of catalyst ("third catalyst") includes Columns 6-10 metals on a support. In some embodiments, the third catalyst includes Columns 9-10 metals on a support. The Column 9 metal may be cobalt and the Column 10 metal may be nickel. In some embodiments, the content of nickel metal is from about 0.1 g to about 0.3 g, per gram of catalyst. The support for a third catalyst may include zirconia. The third catalyst may assist in the reforming of hydrocarbons having a carbon number greater than 2 to carbon monoxide and hydrogen. The third catalyst may be used in the reforming unit. In some embodiments, the third catalyst is a commercial catalyst. Examples of commercial third catalysts include, but are not limited to, CRG-FR and/or CRG-LH available from Johnson Matthey (London, England).

In some embodiments, a fourth type of catalyst ("fourth catalyst") includes Columns 6-10 metals on a support. In some embodiments, the fourth catalyst includes Column 8 metals in combination with Column 10 metals on a support. The Column 8 metal may be ruthenium and the Column 10 metal may be nickel, palladium, platinum, or mixtures thereof. In some embodiments, the fourth catalyst support includes oxides of tantalum, niobium, vanadium, the lanthanides, scandium, or mixtures thereof. The fourth catalyst may be used to convert carbon monoxide and hydrogen to methane and water. In some embodiments, the fourth catalyst is used in the methanation unit. In some embodiments, the fourth catalyst is a commercial catalyst. Examples of commercial fourth catalysts, include, but are not limited to, KATALCO® 11-4 and/or KATALCO® 11-4R available from Johnson Matthey.

In some embodiments, a fifth type of catalyst ("fifth catalyst") includes Columns 6-10 metals on a support. In some embodiments, the fifth catalyst includes a Column 10 metal. The fifth catalyst may include from about 0.1 g to about 0.99 g, from about 0.3 g to about 0.9 g, from about 0.5 g to about 0.8 g, or from 0.6 g to about 0.7 g of Column 10 metal per gram of fifth catalyst. In some embodiments, the Column 10 metal is nickel. In some embodiments, a catalyst that has at least 0.5 g of nickel per gram of fifth catalyst has enhanced stability in a hydrogenation and methanation process. The fifth catalyst may assist in the conversion of hydrocarbons and carbon dioxide to methane. The fifth catalyst may be used in hydrogenation and methanation units and/or polishing units. In some embodiments, the fifth catalyst is a commercial catalyst. An example of a commercial fifth catalyst is KL6524-T, available from CRI/Criterion Inc.

Heating a portion of the subsurface formation may cause the mineral structure of the formation to change and form particles. The particles may be dispersed and/or become partially dissolved in the formation fluid. The particles may include metals and/or compounds of metals from Columns 1-2 and Columns 4-13 of the Periodic Table (for example, aluminum, silicon, magnesium, calcium, potassium sodium, beryllium, lithium, chromium, magnesium, copper, zirconium, and so forth). In certain embodiments, the particles include cenospheres. In some embodiments, the particles are coated, for example, with hydrocarbons of the formation fluid. In certain embodiments, the particles include zeolites.

A concentration of particles in formation fluid may range from about 1 ppm to about 3000 ppm, from about 50 ppm to about 2000 ppm, or from about 100 ppm to about 1000 ppm. The size of particles may range from about 0.5 micrometers to about 200 micrometers, from about 5 micrometers to about 150 micrometers, from about 10 micrometers to about 100 micrometers, or about 20 micrometers to about 50 micrometers.

In certain embodiments, formation fluid may include a distribution of particles. The distribution of particles may be, but is not limited to, a trimodal or a bimodal distribution. For example, a trimodal distribution of particles may include from about 1 ppm to about 50 ppm of particles with a size of about 5 micrometers to about 10 micrometers, from about 2 ppm to about 2000 ppm of particles with a size of about 50 micrometers to about 80 micrometers, and from about 1 ppm to about 100 ppm with a size of between about 100 micrometers and about 200 micrometers. A bimodal distribution of particles may include from about 1 ppm to about 60 ppm of particles with a size of between about 50 micrometers and about 60 micrometers and from about 2 ppm to about 2000 ppm of particles with a size between about 100 micrometers and about 200 micrometers.

In some embodiments, the particles may contact the formation fluid and catalyze formation of compounds having a carbon number of at most 25, at most 20, at most 12, or at most 8. In certain embodiments, zeolitic particles may assist in the oxidation and/or reduction of formation fluids to produce compounds not generally found in fluids produced using conventional production methods. Contact of formation fluid with hydrogen in the presence of zeolitic particles may catalyze reduction of double bond compounds in the formation fluid.

In some embodiments, all or a portion of the particles in the produced fluid may be removed from the produced fluid. The particles may be removed by using a centrifuge, by washing, by acid washing, by filtration, by electrostatic precipitation, by froth flotation, and/or by another type of separation process.

Formation fluid produced from the in situ heat treatment process may be sent to the separator to split the stream into the in situ heat treatment process liquid stream and an in situ heat treatment process gas stream. The liquid stream and the gas stream may be further treated to yield desired products. When the liquid stream is treated using generally known conditions to produce commercial products, processing equipment may be adversely affected. For example, the processing equipment may clog. Examples of processes to produce commercial products include, but are not limited to, alkylation, distillation, catalytic reforming hydrocracking, hydrotreating, hydrogenation, hydrodesulfurization, catalytic cracking, delayed coking, gasification, or combinations thereof. Processes to produce commercial products are described in "Refining Processes 2000," Hydrocarbon Processing, Gulf Publishing Co., pp. 87-142, which is incorporated by reference herein. Examples of commercial products include, but are not limited to, diesel, gasoline, hydrocarbon gases, jet fuel, kerosene, naphtha, vacuum gas oil ("VGO"), or mixtures thereof.

Process equipment may become clogged or fouled by compositions in the in situ heat treatment process liquid. Clogging compositions may include, but are not limited to, hydrocarbons and/or solids produced from the in situ heat treatment process. Compositions that cause clogging may be formed during heating of the in situ heat treatment process liquid. The compositions may adhere to parts of the equipment and inhibit the flow of the liquid stream through processing units.

Solids that cause clogging may include, but are not limited to, organometallic compounds, inorganic compounds, minerals, mineral compounds, cenospheres, coke, semi-soot, and/or mixtures thereof. The solids may have a particle size such that conventional filtration may not remove the solids from the liquid stream. Hydrocarbons that cause clogging may include, but are not limited to, hydrocarbons that contain heteroatoms, aromatic hydrocarbons, cyclic hydrocarbons, cyclic di-olefins, and/or acyclic di-olefins. In some embodiments, solids and/or hydrocarbons present in the in situ heat treatment process liquid that cause clogging are partially soluble or insoluble in the in situ heat treatment process liquid. In some embodiments, conventional filtration of the liquid stream prior to or during heating is insufficient and/or ineffective for removal of all or some of the compositions that clog process equipment.

In some embodiments, clogging compositions are at least partially removed from the liquid stream by washing and/or desalting the liquid stream. In some embodiments, clogging of process equipment is inhibited by filtering at least a portion of the liquid stream through a nanofiltration system. In some embodiments, clogging of process equipment is inhibited by hydrotreating at least a portion of the liquid stream. In some embodiments, at least a portion the liquid stream is nanofiltered and then hydrotreated to remove composition that may clog and/or foul process equipment. The hydrotreated and/or nanofiltered liquid stream may be further processed to produce commercial products. In some embodiments, anti-fouling additives are added to the liquid stream to inhibit clogging of process equipment. Anti-fouling additives are described in U.S. Pat. No. 5,648,305 to Mansfield et al.; U.S. Pat. No. 5,282,957 to Wright et al.; U.S. Pat. No. 5,173,213 to Miller et al.; U.S. Pat. No. 4,840,720 to Reid; U.S. Pat. No. 4,810, 397 to Dvoracek; and U.S. Pat. No. 4,551,226 to Fem, all of which are incorporated by reference herein. Examples of commercially available additives include, but are not limited to, Chimec RO 303 Chimec RO 304, Chimec RO 305, Chimec RO 306, Chimec RO 307, Chimec RO 308, (available from Chimec, Rome, Italy), GE-Betz Thermal Flow 7R29 GE-Betz ProChem 3F28, Ge Betz ProChem 3F18 (available from GE Water and Process Technologies, Trevose, Pa., U.S.A.).

Figure 10:
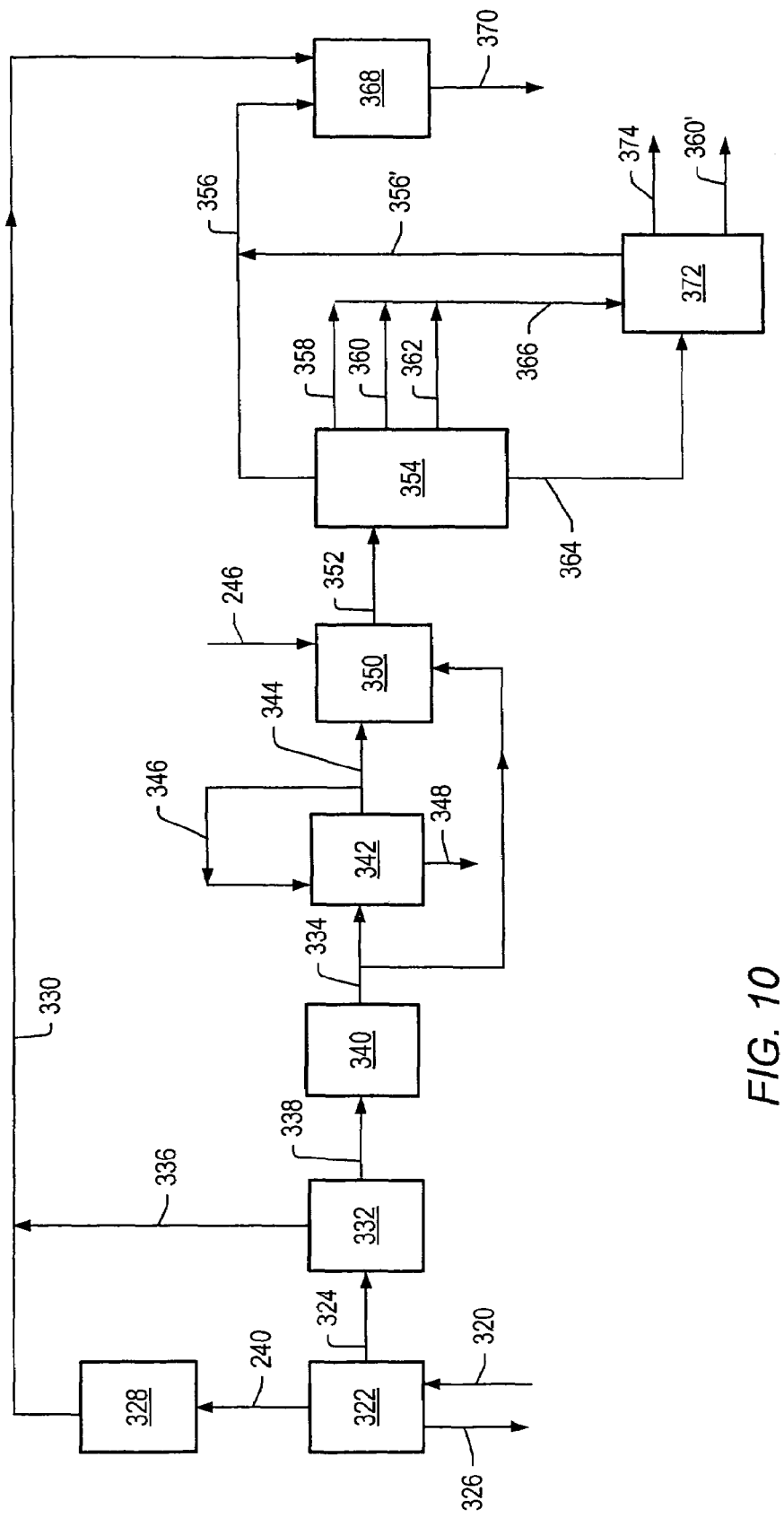
FIG. 10 depicts a schematic representation of an embodiment of a system for treating the mixture produced from the in situ heat treatment process.

FIG. 10 depicts a schematic representation of an embodiment of a system for producing crude products and/or commercial products from the in situ heat treatment process liquid stream and/or the in situ heat treatment process gas stream. Formation fluid 320 enters fluid separation unit 322 and is separated into in situ heat treatment process liquid stream 324, in situ heat treatment process gas 240 and aqueous stream 326. In some embodiments, fluid separation unit 322 includes a quench zone. As produced formation fluid enters the quench zone, quenching fluid such as water, nonpotable water and/or other components may be added to the formation fluid to quench and/or cool the formation fluid to a temperature suitable for handling in downstream processing equipment. Quenching the formation fluid may inhibit formation of compounds that contribute to physical and/or chemical instability of the fluid (for example, inhibit formation of compounds that may precipitate from solution, contribute to corrosion, and/or fouling of downstream equipment and/or piping). The quenching fluid may be introduced into the formation fluid as a spray and/or a liquid stream. In some embodiments, the formation fluid is introduced into the quenching fluid. In some embodiments, the formation fluid is cooled by passing the fluid through a heat exchanger to remove some heat from the formation fluid. The quench fluid may be added to the cooled formation fluid when the temperature of the formation fluid is near or at the dew point of the quench fluid. Quenching the formation fluid near or at the dew point of the quench fluid may enhance solubilization of salts that may cause chemical and/or physical instability of the quenched fluid (for example, ammonium salts). In some embodiments, an amount of water used in the quench is minimal so that salts of inorganic compounds and/or other components do not separate from the mixture. In separation unit 322, at least a portion of the quench fluid may be separated from the quench mixture and recycled to the quench zone with a minimal amount of treatment. Heat produced from the quench may be captured and used in other facilities. In some embodiments, vapor may be produced during the quench. The produced vapor may be sent to gas separation unit 328 and/or sent to other facilities for processing.

In situ heat treatment process gas 240 may enter gas separation unit 328 to separate gas hydrocarbon stream 330 from the in situ heat treatment process gas. The gas separation unit is, in some embodiments, a rectified adsorption and high pressure fractionation unit. Gas hydrocarbon stream 330 includes hydrocarbons having a carbon number of at least 3.

In situ heat treatment process liquid stream 324 enters liquid separation unit 332. In some embodiments, liquid separation unit 332 is not necessary. In liquid separation unit 332, separation of in situ heat treatment process liquid stream 324 produces gas hydrocarbon stream 336 and salty process liquid stream 338. Gas hydrocarbon stream 336 may include hydrocarbons having a carbon number of at most 5. A portion of gas hydrocarbon stream 336 may be combined with gas hydrocarbon stream 330. Salty process liquid stream 338 may be processed through desalting unit 340 to form liquid stream 334. Desalting unit 340 removes mineral salts and/or water from salty process liquid stream 338 using known desalting and water removal methods. In certain embodiments, desalting unit 340 is upstream of liquid separation unit 332.

Liquid stream 334 includes, but is not limited to, hydrocarbons having a carbon number of at least 5 and/or hydrocarbon containing heteroatoms (for example, hydrocarbons containing nitrogen, oxygen, sulfur, and phosphorus). Liquid stream 334 may include at least 0.001 g, at least 0.005 g, or at least 0.01 g of hydrocarbons with a boiling range distribution between 95° C. and 200° C. at 0.101 MPa; at least 0.01 g, at least 0.005 g, or at least 0.001 g of hydrocarbons with a boiling range distribution between 200° C. and 300° C. at 0.101 MPa; at least 0.001 g, at least 0.005 g, or at least 0.01 g of hydrocarbons with a boiling range distribution between 300° C. and 400° C. at 0.101 MPa; and at least 0.001 g, at least 0.005 g, or at least 0.01 g of hydrocarbons with a boiling range distribution between 400° C. and 650° C. at 0.101 MPa. In some embodiments, liquid stream 334 contains at most 10% by weight water, at most 5% by weight water, at most 1% by weight water, or at most 0.1% by weight water.

After exiting desalting unit 340, liquid stream 334 enters filtration system 342. In some embodiments, filtration system 342 is connected to the outlet of the desalting unit. Filtration system 342 separates at least a portion of the clogging compounds from liquid stream 334. In some embodiments, filtration system 342 is skid mounted. Skid mounting filtration system 342 may allow the filtration system to be moved from one processing unit to another. In some embodiments, filtration system 342 includes one or more membrane separators, for example, one or more nanofiltration membranes or one or more reverse osmosis membranes.

The membrane may be a ceramic membrane and/or a polymeric membrane. The ceramic membrane may be a ceramic membrane having a molecular weight cut off of at most 2000 Daltons (Da), at most 1000 Da, or at most 500 Da. Ceramic membranes do not have to swell in order to work under optimal conditions to remove the desired materials from a substrate (for example, clogging compositions from the liquid stream). In addition, ceramic membranes may be used at elevated temperatures. Examples of ceramic membranes include, but are not limited to, mesoporous titania, mesoporous gamma-alumina, mesoporous zirconia, mesoporous silica, and combinations thereof.

The polymeric membrane includes a top layer made of a dense membrane and a base layer (support) made of a porous membrane. The polymeric membrane may be arranged to allow the liquid stream (permeate) to flow first through the dense membrane top layer and then through the base layer so that the pressure difference over the membrane pushes the top layer onto the base layer. The polymeric membrane is an organophilic or hydrophobic membrane so that water present in the liquid stream is retained or substantially retained in the retentate.

The dense membrane layer may separate at least a portion of or substantially all of the clogging compositions from liquid stream 334. In some embodiments, the dense polymeric membrane has properties such that liquid stream 334 passes through the membrane by dissolving in and diffusing through its structure. At least a portion of the clogging particles may not dissolve and/or diffuse through the dense membrane, thus they are removed. The clogging particles may not dissolve and/or diffuse through the dense membrane because of the complex structure of the clogging particles and/or their high molecular weight. The dense membrane layer may include a cross-linked structure as described in WO 96/27430 to Schmidt et al., which is incorporated by reference herein. A thickness of the dense membrane layer may range from a 1 micrometer to 15 micrometers, from 2 micrometers to 10 micrometers, or from 3 micrometers to 5 micrometers.

The dense membrane may be made from polysiloxane, poly-di-methyl siloxane, poly-octyl-methyl siloxane, polyimide, polyaramide, poly-tri-methyl silyl propyne, or mixtures thereof. Porous base layers may be made of materials that provide mechanical strength to the membrane and may be any porous membrane used for ultra filtration, nanofiltration, or reverse osmosis. Examples of such materials are polyacrylonitrile, polyamideimide in combination with titanium oxide, polyetherimide, polyvinylidenediflouroide, polytetrafluoroethylene or combinations thereof.

During separation of clogging compositions from liquid stream 334, the pressure difference across the membrane may range from about 0.5 MPa to about 6 MPa, from about 1 MPa to about 5 MPa, or from about 2 MPa to about 4 MPa. A temperature of separation may range from the pour point of the liquid stream up to 100° C., from about −20° C. to about 100° C., from about 10° C. to about 90° C., or from about 20° C. to about 85° C. During a continuous operation, the permeate flux rate may be at most 50% of the initial flux, at most 70% of the initial flux, or at most 90% of the initial flux. A weight recovery of the permeate on feed may range from about 50% by weight to 97% by weight, from about 60% by weight to 90% by weight, or from about 70% by weight to 80% by weight.

Filtration system 342 may include one or more membrane separators. The membrane separators may include one or more membrane modules. When two or more membrane separators are used, they may be arranged in a parallel configuration to allow feed (retentate) from a first membrane separator to flow into a second membrane separator. Examples of membrane modules include, but are not limited to, spirally wound modules, plate and frame modules, hollow fibers, and tubular modules. Membrane modules are described in Encyclopedia of Chemical Engineering, 4$^{th}$ Ed., 1995, John Wiley & Sons Inc., Vol. 16, pages 158-164. Examples of spirally wound modules are described in, for example, WO/2006/040307 to Boestert et al., U.S. Pat. No. 5,102,551 to Pasternak; U.S. Pat. No. 5,093,002 to Pasternak; U.S. Pat. No. 5,275,726 to Feimer et al.; U.S. Pat. No. 5,458,774 to Mannapperuma; and U.S. Pat. No. 5,150,118 to Finkle et al, all of which are incorporated by reference herein.

In some embodiments, a spirally wound module is used when a dense membrane is used in filtration system 342. A spirally wound module may include a membrane assembly of two membrane sheets between which a permeate spacer sheet is sandwiched, and which membrane assembly is sealed at three sides. The fourth side is connected to a permeate outlet conduit such that the area between the membranes in fluid communication with the interior of the conduit. On top of one of the membranes a feed spacer sheet is arranged, and the assembly with feed spacer sheet is rolled up around the permeate outlet conduit, to form a substantially cylindrical spirally wound membrane module. The feed spacer may have a thickness of at least 0.6 mm, at least 1 mm, or at least 3 mm to allow sufficient membrane surface to be packed into a spirally wound module. In some embodiments, the feed spacer is a woven feed spacer. During operation, a feed mixture may be passed from one end of the cylindrical module between the membrane assemblies along the feed spacer sheet sandwiched between feed sides of the membranes. Part of the feed mixture passes through either one of the membrane sheets to the permeate side. The resulting permeate flows along the permeate spacer sheet into the permeate outlet conduit.

In some embodiments, the membrane separation is a continuous process. Liquid stream 334 passes over the membrane due to a pressure difference to obtain a filtered liquid stream 344 (permeate) and/or recycle liquid stream 346 (retentate).

In some embodiments, filtered liquid stream 344 may have reduced concentrations of compositions and/or particles that cause clogging in downstream processing systems. Continuous recycling of recycle liquid stream 346 through nanofiltration system can increase the production of filtered liquid stream 344 to as much as 95% of the original volume of liquid stream 334. Recycle liquid stream 346 may be continuously recycled through a spirally wound membrane module for at least 10 hours, for at least one day, or for at least one week without cleaning the feed side of the membrane. Upon completion of the filtration, waste stream 348 (retentate) may include a high concentration of compositions and/or particles that cause clogging. Waste stream 348 exits filtration system 342 and is transported to other processing units such as, for example, a delayed coking unit and/or a gasification unit.

Filtered liquid stream 344 may exit filtration system 342 and enter one or more process units. Process units as described herein for the production of crude products and/or commercial products may be operated at the following temperatures, pressures, hydrogen source flows, liquid stream flows, or combinations thereof, or operated otherwise as known in the art. Temperatures range from about 200° C. to about 900° C., from about 300° C. to about 800° C., or from about 400° C. to about 700° C. Pressures range from about 0.1 MPa to about 20 MPa, from about 1 MPa to about 12 MPa, from about 4 MPa to about 10 MPa, or from about 6 MPa to about 8 MPa. Liquid hourly space velocities of the liquid stream range from about $0.1\ h^{-1}$ to about $30\ h^{-1}$, from about $0.5\ h^{-1}$ to about $25\ h^{-1}$, from about $1\ h^{-1}$ to about $20\ h^{-1}$, from about $1.5\ h^{-1}$ to about $15\ h^{-1}$, or from about $2\ h^{-1}$ to about $10\ h^{-1}$.

In FIG. 10, filtered liquid stream 344 and hydrogen source 246 enter hydrotreating unit 350. In some embodiments, hydrogen source 246 may be added to filtered liquid stream 344 before entering hydrotreating unit 350. In some embodiments, sufficient hydrogen is present in liquid stream 334 and hydrogen source 246 is not needed. In hydrotreating unit 350, contact of filtered liquid stream 344 with hydrogen source 246 in the presence of one or more catalysts produces liquid stream 352. Hydrotreating unit 350 may be operated such that all or at least a portion of liquid stream 352 is changed sufficiently to remove compositions and/or inhibit formation of compositions that may clog equipment positioned downstream of the hydrotreating unit 350. The catalyst used in hydrotreating unit 350 may be a commercially available catalyst. In some embodiments, hydrotreating of liquid stream 334 is not necessary.

In some embodiments, liquid stream 334 is contacted with hydrogen in the presence of one or more catalysts to change one or more desired properties of the crude feed to meet transportation and/or refinery specifications. Methods to change one or more desired properties of the crude feed are described in U.S. Published Patent Applications Nos. 20050133414 to Bhan et al.; 20050133405 to Wellington et al.; and U.S. patent application Ser. No. 11/400,542 entitled "Systems, Methods, and Catalysts for Producing a Crude Product" filed Apr. 7, 2006; Ser. No. 11/425,979 to Bhan entitled "Systems, Methods, and Catalysts for Producing a Crude Product" filed Jun. 6, 2006; and Ser. No. 11/425,992 to Wellington et al., entitled "Systems, Methods, and Catalysts for Producing a Crude Product" filed Jun. 6, 2006, all of which are incorporated by reference herein.

In some embodiments, hydrotreating unit 350 is a selective hydrogenation unit. In hydrotreating unit 350, liquid stream 334 and/or filtered liquid stream 344 are selectively hydrogenated such that di-olefins are reduced to mono-olefins. For example, liquid stream 334 and/or filtered liquid stream 344 is contacted with hydrogen in the presence of a DN-200 (Criterion Catalysts & Technologies, Houston Tex., U.S.A.) at temperatures ranging from 100° C. to 200° C. and total pressures of 0.1 MPa to 40 MPa to produce liquid stream 352. Liquid stream 352 includes a reduced content of di-olefins and an increased content of mono-olefins relative to the di-olefin and mono-olefin content of liquid stream 334. The conversion of di-olefins to mono-olefins under these conditions is, in some embodiments, at least 50%, at least 60%, at least 80% or at least 90%. Liquid stream 352 exits hydrotreating unit 350 and enters one or more processing units positioned downstream of hydrotreating unit 350. The units positioned downstream of hydrotreating unit 350 may include distillation units, catalytic reforming units, hydrocracking units, hydrotreating units, hydrogenation units, hydrodesulfurization units, catalytic cracking units, delayed coking units, gasification units, or combinations thereof.

Liquid stream 352 may exit hydrotreating unit 350 and enter fractionation unit 354. Fractionation unit 354 produces one or more crude products. Fractionation may include, but is not limited to, an atmospheric distillation process and/or a vacuum distillation process. Crude products include, but are not limited to, $C_3$-$C_5$ hydrocarbon stream 356, naphtha stream 358, kerosene stream 360, diesel stream 362, and bottoms stream 364. Bottoms stream 364 generally includes hydrocarbons having a boiling range distribution of at least 340° C. at 0.101 MPa. In some embodiments, bottoms stream 364 is vacuum gas oil. In other embodiments, bottoms stream 364 includes hydrocarbons with a boiling range distribution of at least 537° C. One or more of the crude products may be sold and/or further processed to gasoline or other commercial products.

To enhance the use of the streams produced from formation fluid, hydrocarbons produced during fractionation of the liquid stream and hydrocarbon gases produced during separating the process gas may be combined to form hydrocarbons having a higher carbon number. The produced hydrocarbon gas stream may include a level of olefins acceptable for alkylation reactions.

In some embodiments, hydrotreated liquid streams and/or streams produced from fractions (for example, distillates and/or naphtha) are blended with the in situ heat treatment process liquid and/or formation fluid to produce a blended fluid. The blended fluid may have enhanced physical stability and chemical stability as compared to the formation fluid. The blended fluid may have a reduced amount of reactive species (for example, di-olefins, other olefins and/or compounds containing oxygen, sulfur and/or nitrogen) relative to the formation fluid. Thus, chemical stability of the blended fluid is enhanced. The blended fluid may decrease an amount of asphaltenes relative to the formation fluid. Thus, physical stability of the blended fluid is enhanced. The blended fluid may be a more a fungible feed than the formation fluid and/or the liquid stream produced from an in situ heat treatment process. The blended feed may be more suitable for transportation, for use in chemical processing units and/or for use in refining units than formation fluid.

In some embodiments, a fluid produced by methods described herein from an oil shale formation may be blended with heavy oil/tar sands in situ heat treatment process (IHTP) fluid. Since the oil shale liquid is substantially paraffinic and the heavy oil/tar sands IHTP fluid is substantially aromatic, the blended fluid exhibits enhanced stability. In certain embodiments, in situ heat treatment process fluid may be blended with bitumen to obtain a feed suitable for use in refining units. Blending of the IHTP fluid and/or bitumen with the produced fluid may enhance the chemical and/or physical stability of the blended product. Thus, the blend may be transported and/or distributed to processing units.

$C_3$-$C_5$ hydrocarbon stream 356 produced from fractionation unit 354 and hydrocarbon gas stream 330 enter alkylation unit 368. In alkylation unit 368, reaction of the olefins in hydrocarbon gas stream 330 (for example, propylene, butylenes, amylenes, or combinations thereof) with the iso-paraffins in $C_3$-$C_5$ hydrocarbon stream 356 produces hydrocarbon stream 370. In some embodiments, the olefin content in hydrocarbon gas stream 330 is acceptable and an additional source of olefins is not needed. Hydrocarbon stream 370 includes hydrocarbons having a carbon number of at least 4. Hydrocarbons having a carbon number of at least 4 include, but are not limited to, butanes, pentanes, hexanes, heptanes, and octanes. In certain embodiments, hydrocarbons produced from alkylation unit 368 have an octane number greater than 70, greater than 80, or greater than 90. In some embodiments, hydrocarbon stream 370 is suitable for use as gasoline without further processing.

In some embodiments, bottoms stream 364 may be hydrocracked to produce naphtha and/or other products. The resulting naphtha may, however, need reformation to alter the octane level so that the product may be sold commercially as gasoline. Alternatively, bottoms stream 364 may be treated in a catalytic cracker to produce naphtha and/or feed for an alkylation unit. In some embodiments, naphtha stream 358, kerosene stream 360, and diesel stream 362 have an imbalance of paraffinic hydrocarbons, olefinic hydrocarbons, and/or aromatic hydrocarbons. The streams may not have a suitable quantity of olefins and/or aromatics for use in commercial products. This imbalance may be changed by combining at least a portion of the streams to form combined stream 366 which has a boiling range distribution from about 38° C. to about 343° C. Catalytically cracking combined stream 366 may produce olefins and/or other streams suitable for use in an alkylation unit and/or other processing units. In some embodiments, naphtha stream 358 is hydrocracked to produce olefins.

In FIG. 10, combined stream 366 and bottoms stream 364 from fractionation unit 354 enters catalytic cracking unit 372. Under controlled cracking conditions (for example, controlled temperatures and pressures), catalytic cracking unit 372 produces additional $C_3$-$C_5$ hydrocarbon stream 356', gasoline hydrocarbons stream 374, and additional kerosene stream 360'.

Additional $C_3$-$C_5$ hydrocarbon stream 356' may be sent to alkylation unit 368, combined with $C_3$-$C_5$ hydrocarbon stream 356, and/or combined with hydrocarbon gas stream 330 to produce gasoline suitable for commercial sale. In some embodiments, the olefin content in hydrocarbon gas stream 330 is acceptable and an additional source of olefins is not needed.

In some embodiments, an amount of the produced bottoms stream (for example, VGO) is too low to sustain operation of a hydrocracking unit or catalytic cracking unit and the concentration of olefins in the produced gas streams from a fractionation unit and/or a catalytic cracking unit (for example, from fractionation unit 354 and/or from catalytic cracking unit 372 in FIG. 10) may be too low to sustain operation of an alkylation unit. The naphtha produced from the fractionation unit may be treated to produce olefins for further processing in, for example, an alkylation unit. Reformulated gasoline produced by conventional naphtha reforming processes may not meet commercial specifications such as, for example, California Air Resources Board mandates when liquid stream produced from an in situ heat treatment process liquid is used as a feed stream. An amount of olefins in the naphtha may be saturated during conventional hydrotreating prior to the reforming naphtha process. Thus, reforming of all the hydrotreated naphtha may result in a higher than desired aromatics content in the gasoline pool for reformulated gasoline. The imbalance in the olefin and aromatic content in the reformed naphtha may be changed by producing sufficient alkylate from an alkylation unit to produce reformulated gasoline. Olefins (for example, propylene and butylenes) generated from fractionation and/or cracking of the naphtha may be combined with isobutane to produce gasoline. In addition, it has been found that catalytically cracking the naphtha and/or other fractionated streams produced in a fractionating unit requires additional heat because of a reduced amount of coke production relative to other feedstocks used in catalytic cracking units.

Figure 11:
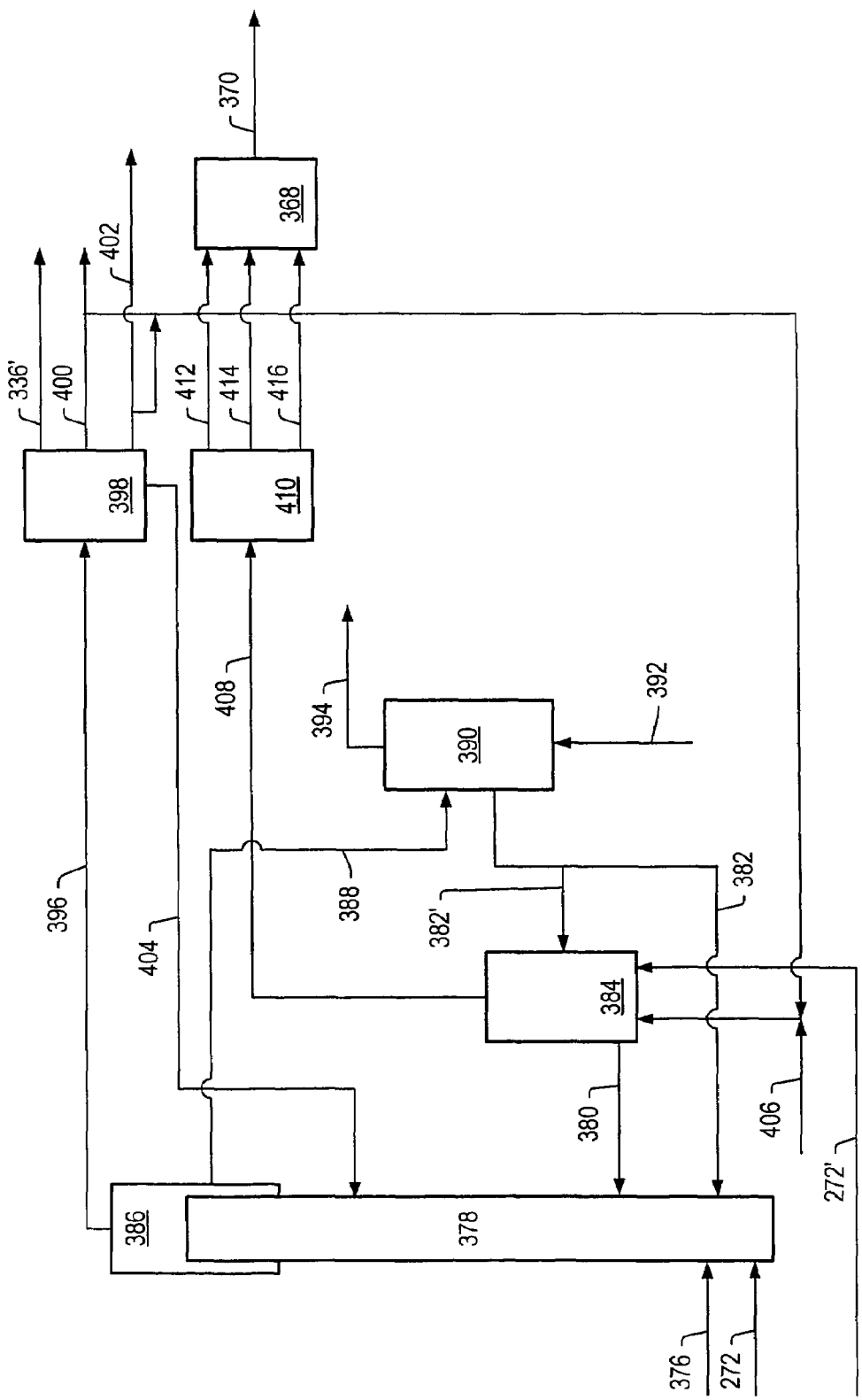
FIG. 11 depicts a schematic representation of an embodiment of a system for treating a liquid stream produced from an in situ heat treatment process.

FIG. 11 depicts a schematic for treating liquid streams produced from an in situ heat treatment process stream to produce olefins and/or liquid streams. Similar processes to produce middle distillate and olefins are described in International Publication No. WO 2006/020547 and U.S. Patent Application Publication Nos. 20060191820 and 20060178546 to Mo et al., all of which are incorporated by referenced herein. Liquid stream 376 enters catalytic cracking system 378. Liquid stream 376 may include, but is not limited to, liquid stream 334, hydrotreated liquid stream 352, filtered liquid stream 344, naphtha stream 358, kerosene stream 360, diesel stream 362, and bottoms stream 364 from the system depicted in FIG. 10, any hydrocarbon stream having a boiling range distribution between 65° C. and 800° C., or mixtures thereof. In some embodiments, steam 272 enters catalytic cracking system 378 and may atomize and/or lift liquid stream 376 to enhance contact of the liquid stream with the catalytic cracking catalyst. A ratio of steam to atomize liquid stream 376 to feedstock may range from 0.01 to 2 by weight, or from 0.1 to 1 by weight.

In catalytic cracking system 378, liquid stream 376 is contacted with a catalytic cracking catalyst to produce one or more crude products. The catalytic cracking catalyst includes a selected catalytic cracking catalyst, at least a portion of used regenerated cracking catalyst stream 380, at least a portion of a regenerated cracking catalyst stream 382, or a mixture thereof. Used regenerated cracking catalyst 380 includes a regenerated cracking catalyst that has been used in second catalytic cracking system 384. Second catalytic cracking system 384 may be used to crack hydrocarbons to produce olefins and/or other crude products. Hydrocarbons provided to second catalytic cracking system 384 may include $C_3$-$C_5$ hydrocarbons produced from the production wells, gasoline hydrocarbons, hydrowax, hydrocarbons produced from Fischer-Tropsch processes, biofuels, or combinations thereof. The use of a mixture of different types of hydrocarbon feed to the second catalytic cracking system may enhance $C_3$-$C_5$ olefin production to meet the alkylate demand. Thus, integration of the products with refinery processes may be enhanced. Second catalytic cracking system 384 may be a dense phase unit, a fixed fluidized bed unit, a riser, a combination of the above mentioned units, or any unit or configuration of units known in the art for cracking hydrocarbons.

Contact of the catalytic cracking catalyst and the liquid stream 376 in catalytic cracking system 378 produces a crude product and spent cracking catalyst. The crude product may include, but is not limited to, hydrocarbons having a boiling point distribution that is less than the boiling point distribution of liquid stream 376, a portion of liquid stream 376, or mixtures thereof. The crude product and spent catalyst enters separation system 386. Separation system 386 may include, for example, a distillation unit, a stripper, a filtration system, a centrifuge, or any device known in the art capable of separating the crude product from the spent catalyst.

Separated spent cracking catalyst stream 388 exits separation system 386 and enters regeneration unit 390. In regeneration unit 390, spent cracking catalyst is contacted with oxygen source 392 (for example, oxygen and/or air) under carbon burning conditions to produce regenerated cracking catalyst stream 382 and combustion gases 394. Combustion gases may form as a by-product of the removal of carbon and/or other impurities formed on the catalyst during the catalytic cracking process.

The temperature in regeneration unit 390 may range from about 621° C. to about 760° C. or from about 677° C. to about 715° C. The pressure in regeneration unit 390 may range from atmospheric to about 0.345 MPa or from about 0.034 to about 0.345 MPa. The residence time of the separated spent cracking catalyst in regeneration unit 390 ranges from about 1 to about 6 minutes or from or about 2 to about 4 minutes. The coke content on the regenerated cracking catalyst is less than the coke content on the separated spent cracking catalyst. Such coke content is less than 0.5% by weight, with the weight percent being based on the weight of the regenerated cracking catalyst excluding the weight of the coke content. The coke content of the regenerated cracking catalyst may range from 0.01% by weight to 0.5% by weight, 0.05% by weight to 0.3% by weight, or 0.1% by weight to 0.2% by weight.

In some embodiments, regenerated cracking catalyst stream 382 may be divided into two streams with at least a portion of regenerated cracking catalyst stream 382' exiting regeneration unit 390 and entering second catalytic cracking system 384. At least another portion of regenerated cracking catalyst stream 382 exits regenerator 390 and enters catalytic cracking system 378. The relative amount of the used regenerated cracking catalyst to the regenerated cracking catalyst is adjusted to provide for the desired cracking conditions within catalytic cracking system 378. Adjusting the ratio of used regenerated cracking catalyst to regenerated cracking catalyst may assist in the control of the cracking conditions in catalytic cracking system 378. A weight ratio of the used regenerated cracking catalyst to the regenerated cracking catalyst may range from 0.1:1 to 100:1, from 0.5:1 to 20:1, or from 1:1 to 10:1. For a system operated at steady state, the weight ratio of used regenerated cracking catalyst to regenerated cracking catalyst approximates the weight ratio of the portion of regenerated cracking catalyst passing to the second catalytic cracking system 384 to the remaining portion of regenerated cracking catalyst that is mixed with liquid stream 376 introduced into catalytic cracking system 378, and, thus, the aforementioned ranges are also applicable to such weight ratio.

Crude product 396 exits separation system 386 and enters liquid separation unit 398. Liquid separation unit 398 may be any system known to those skilled in the art for recovering and separating the crude product into product streams such as, for example, gas stream 336', gasoline hydrocarbons stream 400, cycle oil stream 402, and bottom stream 404. In some embodiments, bottom stream 404 is recycled to catalytic cracking system 378. Liquid separation unit 398 may include components and/or units such as, for example, absorbers and strippers, fractionators, compressors and separators, or any combination of known systems for providing recovery and separation of products from the crude product. In some embodiments, at least a portion of light cycle oil stream 402 exits liquid separation unit 398 and enters second catalytic cracking system 384. In some embodiments, none of the light cycle oil stream is sent to the second catalytic cracking system. In some embodiments, at least a portion of gasoline hydrocarbons stream 400 exits liquid separation unit 398 and enters second catalytic cracking system 384. In some embodiments, none of the gasoline hydrocarbons stream is sent to the second catalytic cracking system. In some embodiments, gasoline hydrocarbons stream 400 is suitable for sale and/or for use in other processes.

At least a portion of gas oil hydrocarbon stream 406 (for example, vacuum gas oil) and/or portions of gasoline hydrocarbons stream 400 and at least a portion of light cycle oil stream 402 are sent to catalytic cracking system 384. The streams are catalytically cracked in the presence of steam 272' to produce crude olefin stream 408. Crude olefin stream 408 may include hydrocarbons having a carbon number of at least 2. In some embodiments, crude olefin stream 408 contains at least 30% by weight $C_2$-$C_5$ olefins, at least 40% by weight $C_2$-$C_5$ olefins, at least 50% by weight $C_2$-$C_5$ olefins, at least 70% by weight $C_2$-$C_5$ olefins, or at least 90% by weight $C_2$-$C_5$ olefins. Recycling of the gasoline hydrocarbons stream 400 into second catalytic cracking system 384 may provide for an additional conversion across the overall process system of gas oil hydrocarbon stream 406 to $C_2$-$C_5$ olefins.

In some embodiments, second catalytic cracking system 384 includes an intermediate reaction zone and a stripping zone that are in fluid communication with each other, with the stripping zone located below the intermediate reaction zone. To provide for a high steam velocity within the stripping zone, as compared to the velocity within the intermediate reaction zone, the cross-sectional area of the stripping zone is less than the cross-sectional area of the intermediate reaction zone. The ratio of the stripping zone cross sectional area to the intermediate reaction zone cross sectional area may range from 0.1:1 to 0.9:1; from 0.2:1 to 0.8:1; or from 0.3:1 to 0.7:1.

In some embodiments, the geometry of the second catalytic cracking system is such that it is generally cylindrical. The length-to-diameter ratio of the stripping zone of the catalytic cracking system provides for the desired high steam velocity within the stripping zone and provides enough contact time within the stripping zone for the desired stripping of the used regenerated catalyst that is to be removed from the second catalytic cracking system. Thus, the length-to-diameter ratio of the stripping zone may range of from 1:1 to 25:1; from 2:1 to 15:1; or from 3:1 to 10:1.

In some embodiments, second catalytic cracking system 384 is operated or controlled independently from the operation or control of catalytic cracking system 378. Independent operation or control of second catalytic cracking system 384 may improve overall conversion of the gasoline hydrocarbons into the desired products such as ethylene, propylene and butylenes. With independent operation of second catalytic cracking system 384, the severity of catalytic cracking unit 378 may be reduced to optimize the yield of $C_2$-$C_5$ olefins. A temperature in second catalytic cracking system 384 may range from about 482° C. (900° F.) to about 871° C. (1600° F.), from about 510° C. (950° F.) to about 871° C. (1600° F.), or from about 538° C. (1000° F.) to about 732° C. (1350° F.). The operating pressure of second catalytic cracking system 384 may range from atmospheric to about 0.345 MPa (50 psig) or from about 0.034 to 0.345 MPa (5 to 50 psig).

Addition of steam 272' into second catalytic cracking system 384 may assist in the operational control of the second catalytic cracking unit. In some embodiments, steam is not necessary. In some embodiments, the use of the steam for a given gasoline hydrocarbon conversion across the process system, and in the cracking of the gasoline hydrocarbons, may provide for an improved selectivity toward $C_2$-$C_5$ olefin yield with an increase in propylene and butylenes yield relative to other catalytic cracking processes. A weight ratio of steam to gasoline hydrocarbons introduced into second catalytic cracking system 384 may be up to or about 15:1; from 0.1:1 to 10:1; from 0.2:1 to 9:1; or from 0.5:1 to 8:1.

Crude olefin stream 408 enters olefin separation system 410. Olefin separation system 410 can be any system known to those skilled in the art for recovering and separating the crude olefin stream 408 into $C_2$-$C_5$ olefin product streams (for example, ethylene product stream 412, propylene product stream 414, and butylenes products stream 416). Olefin separation system 410 may include such systems as absorbers and strippers, fractionators, compressors and separators, or any combination of known systems or equipment providing for the recovery and separation of $C_2$-$C_5$ olefin products from fluid stream 408. In some embodiments, olefin streams 412, 414, 416 enter alkylation unit 368 to generate hydrocarbon stream 370. In some embodiments, hydrocarbon stream 370 has an octane number of at least 70, at least 80, or at least 90. In some embodiments, all or portions of one or more of streams 412, 414, 416 are transported to other processing units, such as polymerization units, for use as feedstocks.

In some embodiments, the crude product from the catalytic cracking system and the crude olefin stream from second catalytic cracking system may be combined. The combined stream may enter a single separation unit (for example, a combination of liquid separation system 398 and olefin separation system 410).

In FIG. 11, used cracking catalyst stream 380 exits second catalytic cracking system 384 and enters catalytic cracking system 378. Catalyst in used cracking catalyst stream 380 may include a slightly higher concentration of carbon than the concentration of carbon that is on the catalyst in regenerated cracking catalyst 382. A high concentration of carbon on the catalyst may partially deactivate the catalytic cracking catalysts which provides for an enhanced yield of olefins from the catalytic cracking system 378. Coke content of the used regenerated catalyst may be at least 0.1% by weight or at least 0.5% by weight. The coke content of the used regenerated catalyst may range from about 0.1% by weight to about 1% by weight or from about 0.1% by weight to about 0.6% by weight.

The catalytic cracking catalyst used in catalytic cracking system 378 and second catalytic cracking system 384 may be any fluidizable cracking catalyst known in the art. The fluidizable cracking catalyst may include a molecular sieve having cracking activity dispersed in a porous, inorganic refractory oxide matrix or binder. "Molecular sieve" refers to any material capable of separating atoms or molecules based on their respective dimensions. Molecular sieves suitable for use as a component of the cracking catalyst include pillared clays, delaminated clays, and crystalline aluminosilicates. In some embodiments, the cracking catalyst contains a crystalline aluminosilicate. Examples of such aluminosilicates include Y zeolites, ultrastable Y zeolites, X zeolites, zeolite beta, zeolite L, offretite, mordenite, faujasite, and zeolite omega. In some embodiments, crystalline aluminosilicates for use in the cracking catalyst are X and/or Y zeolites. U.S. Pat. No. 3,130,007 to Breck describes Y-type zeolites.

The stability and/or acidity of a zeolite used as a component of the cracking catalyst may be increased by exchanging the zeolite with hydrogen ions, ammonium ions, polyvalent metal cations, such as rare earth-containing cations, magnesium cations or calcium cations, or a combination of hydrogen ions, ammonium ions and polyvalent metal cations. The sodium content may be lowered until it is at most 0.8% by weight, at most 0.5% by weight and at most 0.3% by weight, calculated as $Na_2O$. Methods of carrying out the ion exchange are well known in the art.

The zeolite or other molecular sieve component of the cracking catalyst is combined with a porous, inorganic refractory oxide matrix, or binder to form a finished catalyst prior to use. The refractory oxide component in the finished catalyst may be silica-alumina, silica, alumina, natural or synthetic clays, pillared or delaminated clays, mixtures of one or more of these components, and the like. In some embodiments, the inorganic refractory oxide matrix includes a mixture of silica-alumina and a clay such as kaolin, hectorite, sepiolite, and attapulgite. A finished catalyst may contain between about 5% by weight and about 40% by weight zeolite or other molecular sieve and greater than about 20 weight percent inorganic refractory oxide. In some embodiments, the finished catalyst may contain between about 10% and about 35% by weight zeolite or other molecular sieve, between about 10% and about 30% by weight inorganic refractory oxide, and between about 30% and about 70% by weight clay.

The crystalline aluminosilicate or other molecular sieve component of the cracking catalyst may be combined with the porous, inorganic refractory oxide component or a precursor thereof by any suitable technique known in the art including mixing, mulling, blending or homogenization. Examples of precursors that may be used include, but are not limited to, alumina, alumina sols, silica sols, zirconia, alumina hydrogels, polyoxycations of aluminum and zirconium, and peptized alumina. In some embodiments, the zeolite is combined with an alumino-silicate gel or sol or other inorganic, refractory oxide component, and the resultant mixture is spray dried to produce finished catalyst particles normally ranging in diameter between about 40 micrometers and about 80 micrometers. In some embodiments, the zeolite or other molecular sieve may be mulled or otherwise mixed with the refractory oxide component or precursor thereof, extruded and then ground into the desired particle size range. The finished catalyst may have an average bulk density between about 0.30 and about 0.90 gram per cubic centimeter and a pore volume between about 0.10 and about 0.90 cubic centimeter per gram.

In some embodiments, a ZSM-5 additive may be introduced into the intermediate cracking reactor of second catalytic cracking system 384. When a ZSM-5 additive is used along with the selected cracking catalyst in the intermediate cracking reactor, a yield of the lower olefins such as propylene and butylenes is enhanced. An amount of ZSM-5 ranges from at most 30% by weight, at most 20% by weight, or at most 18% by weight of the regenerated catalyst being introduced into second catalytic cracking system 384. An amount of ZSM-5 additive is introduced into second catalytic cracking system 384 may range from 1% to 30% by weight, 3% to 20% by weight, or 5% to 18% by weight of the regenerated cracking catalyst being introduced into second catalytic cracking system 384.

The ZSM-5 additive is a molecular sieve additive selected from the family of medium pore size crystalline aluminosilicates or zeolites. Molecular sieves that can be used as the ZSM-5 additive include, but are not limited to, medium pore zeolites as described in "Atlas of Zeolite Structure Types," Eds. W. H. Meier and D. H. Olson, Butterworth-Heineman, Third Edition, 1992. The medium pore size zeolites generally have a pore size from about 0.5 nm, to about 0.7 nm and include, for example, MFI, MFS, MEL, MTW, EUO, MTT, HEU, FER, and TON structure type zeolites (IUPAC Commission of Zeolite Nomenclature). Non-limiting examples of such medium pore size zeolites, including ZSM-5, ZSM-12, ZSM-22, ZSM-23, ZSM-34, ZSM-35, ZSM-38, ZSM-48, ZSM-50, silicalite, and silicalite 2. ZSM-5, are described in U.S. Pat. No. 3,702,886 to Argauer et al. and U.S. Pat. No. 3,770,614 to Graven, both of which are incorporated by reference herein.

ZSM-11 is described in U.S. Pat. No. 3,709,979 to Chu; ZSM-12 in U.S. Pat. No. 3,832,449 to Rosinski et al.; ZSM-21 and ZSM-38 in U.S. Pat. No. 3,948,758 to Bonacci et al.; ZSM-23 in U.S. Pat. No. 4,076,842 to Plank et al.; and ZSM-35 in U.S. Pat. No. 4,016,245 to Plank et al., all of which are incorporated by reference herein. Other suitable molecular sieves include the silicoaluminophosphates (SAPO), such as SAPO-4 and SAPO-11 which is described in U.S. Pat. No. 4,440,871 to Lok et al.; chromosilicates; gallium silicates, iron silicates; aluminum phosphates (ALPO), such as ALPO-1 1 described in U.S. Pat. No. 4,310,440 to Wilson et al.; titanium aluminosilicates (TASO), such as TASO-45 described in U.S. Pat. No. 4,686,029 to Pellet et al.; boron silicates, described in U.S. Pat. No. 4,254,297 Frenken et al.; titanium aluminophosphates (TAPO), such as TAPO-11 described in U.S. Pat. No. 4,500,651 to Lok et al.; and iron aluminosilicates, all of which are incorporated by reference herein.

U.S. Pat. No. 4,368,114 to Chester et al., which is incorporated by reference herein, describes in detail the class of zeolites that can be suitable ZSM-5 additives. The ZSM-5 additive may be held together with a catalytically inactive inorganic oxide matrix component, in accordance with conventional methods.

In some embodiments, residue produced from units described in FIGS. 10 and 11 may be used as an energy source. The residue may be gasified to produce gases which are burned (for example, burned in a turbine) and/or injected into a subsurface formation (for example, injection of produced carbon dioxide into a subsurface formation). In certain embodiments, the residue is de-asphalted to produce asphalt. The asphalt may be gasified.

During some in situ heat treatment processes, ammonia may be in formation fluid produced from the formation. Produced ammonia may be used for a number of purposes. In some embodiments, the ammonia or a portion of the ammonia may be used to produce hydrogen. In some embodiments, the Haber-Bosch process may be used to produce hydrogen. Ammonia may produce hydrogen and nitrogen according to the following equilibrium reaction:

$$N_2 + 3H_2 \leftrightarrow 2NH_3 \qquad (1)$$

The reaction may be a high temperature, high pressure, catalyzed reaction. The temperature may be from about 300° C. to about 800° C. The pressure may be from about 80 bars to about 220 bars. The catalyst may be composed substantially of iron. The total amount of hydrogen produced may be increased by shifting the equilibrium towards hydrogen and nitrogen production. Equilibrium may be shifted to produce more nitrogen and hydrogen by removing nitrogen and/or hydrogen as they are produced.

Many wells are needed for treating a hydrocarbon formation using an in situ heat treatment process. In some embodiments, vertical or substantially vertical wells are formed in the formation. In some embodiments, horizontal or U-shaped wells are formed in the formation. In some embodiments, combinations of horizontal and vertical wells are formed in the formation. Wells may be formed using drilling rigs.

In an embodiment, a rig for drilling wells includes equipment on the rig for drilling multiple wellbores simultaneously. The rig may include one or more systems for constructing the wells, including drilling, fluid handling, and cementing of the wells through the overburden, drilling to total depth, and placing completion equipment such as heaters and casing. The rig may be particularly useful for forming closely spaced wells, such as freeze wells.

In some embodiments, a rig for drilling wellbores for an in situ heat treatment process may be a movable platform. The working surface of the platform may be 20 m or more above the ground. Piping may be suspended from the bottom of the platform before being deployed.

In some embodiments, wells are drilled in sequential stages with different drilling machines. The wells may be barrier wells, heater wells, production wells, production/heater wells, monitor wells, injection wells, or other types of wells. A conductor drilling machine may set the conductor of the well. A main hole drilling machine may drill the wellbore to depth. A completion drilling machine may place casing, cement, tubing, cables, heaters, and perform other well completion tasks. The drilling machines may be on the same location moving 3 to 10 meters between wells for 2 to 3 years. The size and the shape of the drilling machines may not have to meet existing road transportation regulations since once in the field, the drilling machines may remain there for the duration of the project. The major components of the drilling machines may be transported to location and assembled there. The drilling machines may not have to be disassembled for a multi-mile move for several years.

One or more central plants may support the drilling machines. The use of a central plant may allow for smaller drilling machines. The central plant may include prime movers, mud tanks, solids handling equipment, pipe handling, power, and other equipment common to the drilling machines. The equipment of the central plant may be coupled to the drilling machines by flexible umbilicals, by easily modifiable piping, and/or by quick release electrical connections. Several wells may be drilled before the need to move the central plant arises. In some embodiments, the central plant may be moved while connected to one or more operating drilling machines. The drilling machines and central plant may be designed with integrated drip pans to capture leaks and spills.

In some embodiments, the drilling machines are powered directly off the electric grid. In other embodiments, the drilling machines are diesel powered. Using diesel power may avoid complications associated with interfering with the installation of electrical and other systems needed for the wells of the in situ heat treatment process.

The drilling machines may be automated so that little or no human interaction is required. The tubulars used by the drilling machines may be stacked and stored on or by the drilling machines so that the drilling machines can access and manipulate the tubulars with minimal or no human intervention. For example, a carousel or other device may be used to store a tubular and move the tubular from storage to the drilling mast. The carousel or other device may also be used to move the tubular from the drilling mast to storage.

The drilling machines may include propulsion units so that the drilling machines do not need to be skidded. The central plant may also include propulsion units. Skidding involves extra equipment not used for drilling the wells and may be complicated by the dense concentration of surface facilities and equipment. In some embodiments, the drilling machines and/or central plant may include tracks or a walking mechanism to eliminate railroad-type tracks. Eliminating railroad-type tracks may reduce the amount of pre-work road and rail formation that needs to be completed before drilling operations can begin. In some embodiments, the propulsion units may include a fixed-movement mechanism. The fixed-movement mechanism may advance the drilling machine a set distance when activated so that the drilling machine is located at the next well location. Fine adjustment may allow for exact positioning of the drilling machine after initial position location by the fixed-movement mechanism. In some embodiments, laser guidance systems may be utilized to position the drilling machines. The laser guidance systems may ensure that the wellbores being formed are started at the right location in the well pattern. In some embodiments, drilling machines and/or the central plant are positioned on a central track or access lane. The drilling equipment may be extended from one side to the other of the central track to form the wells. The drilling machine is able to stay in one place while an arm or cantilever mechanism allows multiples of wells to be drilled around the drilling machine. The wells may be drilled in very close proximity if required.

The drilling machines and the central plant may be self-leveling and able to function on up to a 10% grade or higher. In some embodiments, the drilling machines include hydraulic and/or mechanical leveling systems. The drilling machines and central plant may have ground clearances of at least 1 meter so that the units may be moved unobstructed over wellheads. Each drilling machine may include a mechanism for precisely placing the working components of the drilling machine over the hole center of the well being formed. In some embodiments, the mechanism adjusts the position of a derrick of the drilling machine.

The drilling machines may be moved from one well to another with derricks of the drilling machines in upright or inclined positions. The term "derrick" is used to represent whatever top drive support device is employed on the rig, whether the top drive support device is a derrick, stiff mast, or hydraulic arm. Because some drilling machines may use three 10 m pipe sections, the derrick may have to be lowered for rig moves. If the derrick must be lowered, lowering and raising the derrick needs to be a quick and safe operation. In some embodiments, the derrick is lowered with the bottom hole assembly racked in the derrick to save time handling the bottom hole assembly. In other embodiments, the bottom hole assembly is separated from the derrick for servicing during a move of the drilling machine.

In some embodiments, one of the drilling machines is able to do more than one stage of well formation. In some embodiments, a freeze wall or other barrier is formed around all or a portion of a treatment area. There may be about a year or more of time from when the last freeze well is drilled to the time that main holes for heater and producer wells can be drilled. In the intervening time, the drilling machine used to drill the main hole of a well may be used to preset conductors for heater wells and/or production wells in the treatment area.

In some embodiments, two or more drilling machines are placed on the same carrier. For example, the carrier may include equipment that presets the conductor for a well. The carrier may also carry equipment for forming the main hole. One portion of the machine could be presetting a conductor while another portion of the machine could be simultaneously forming the main hole of a second well.

Running drill pipe to replace bits, running in down hole equipment and pulling the equipment out after use may be time consuming and expensive. To save time and expense, all drilling and completion tools may go into the hole and not come out. For example, drill pipe may become casing. Once data is obtained from logging runs, the logging tools are left in the hole and drilling proceeds through them or past them if necessary. Downhole equipment is integrated into the drill pipe. In some embodiments, the drill pipe becomes a conduit of a conduit-in-conduit heater.

In some embodiments, a retractable drilling assembly is used. Using a retractable drilling assembly may be beneficial when using continuous coiled tubing. When total depth of the well is reached, the drill bit and bottom hole assembly may be retracted to a smaller diameter. The drill bit and bottom hole assembly may be brought to the surface through the coiled tubing. The coiled tubing may be left in the hole as casing.

In some embodiments, the main hole drilling machine and the completion drilling machine include a quick-connect device for attaching the fluid diverter spool (drilling wellhead) to the conductor casing. The use of a quick-connect device may be faster than threading or welding the diverter to the conductor casing. The quick-connect device may be a snap-on or clamp-on type diverter. Wellheads are typically designed to fit a multitude of casing configurations, everything from 48 inch conductor to 2-⅜ inch tubing. For an in situ heat treatment process, the wellheads may not need to span such a large casing diameter set or have multiple string requirements. The wellheads may only handle a very limited pipe diameter range and only one or two casing strings. Having a fit for purpose wellhead may significantly reduce the cost of fabricating and installing the wellheads for the wells of the in situ heat treatment process.

In some embodiments, the main hole drilling machine includes a slickline/boom system. The slickline/boom system may allow running ranging equipment in a close offset well while drilling the well the drilling machine is positioned over. The use of the slickline/boom system on the drilling machine may eliminate the need for additional equipment for employing the ranging equipment.

In some embodiments, the conductor drilling machine is a blast-hole rig. The blast-hole rig may be mounted on a crawler or carrier with metal tracks. Air or gas compression is on board the blast-hole rig. Tubulars may be racked horizontally on the blast-hole rig. The derrick of the blast-hole rig may be adjusted to hole center. The bottom hole drilling assembly of the blast-hole rig may be left in the derrick when the blast-hole rig is moved. In some embodiments, the blast-hole rig includes an integral drilling fluid tank, solids control equipment, and a mist collector. In some embodiments, the drilling fluid tank, the solids control equipment, and/or the mist collector is part of the central plant.

During well formation with jointed pipe, one time consuming task is making connections. To reduce the number of connections needed during formation of wells, long lengths of pipe may be used. In some embodiments, the drilling machines are able to use pipe with a length of about 25 m to 30 m. The 25 m to 30 m piping may be made up of two or more shorter joints, but is preferably a single joint of the appropriate length. Using a single joint may decrease the complexity of pipe handling and result in fewer potential leak paths in the drill string. In some embodiments, the drilling machines use jointed pipe having other lengths, such as 20 m lengths, or 10 m lengths.

The drilling machine may use a top drive system. In some embodiments, the top drive system functions using a rack and pinion. In some embodiments, the top drive system functions using a hydraulic system.

The drilling machines may include automated pipe handling systems. The automated pipe handling system may be able to lift pipe, make connections, and have another joint in the raised position ready for the next connection. The automated pipe handling systems may include an iron roughneck to make and break connections. In some embodiments, the pipe skid for the drilling machine is an integral component of the drilling machine.

String floats (check valves) may be needed in the drill string because air and/or liquid will be used during drilling. An integral float valve may be positioned in each joint used by the drilling machine. Including a string float in each joint may minimize circulating times at connections and speed up the connection process.

Drilling the wells may be done at low operating pressures. In some embodiments, a quick-connect coupler is used to connect drill pipe together because of the low operating pressures. Using quick-connect couplers to join drill pipe may reduce drilling time and simplify pipe handling automation.

In certain embodiments, the main hole drilling machine is designed to drill 6-¼ inch or 6-½ inch holes. The pumping capabilities needed to support the main hole drilling machine may include 3×900 scfm air compressors, a 2000 psi booster, and a liquid pump with an operational maximum of 325 gpm. A 35 gpm pump may also be included if mist drilling is required.

In some embodiments, the main hole drilling machine and/or the completion drilling machine uses coiled tubing. Coiled tubing may allow for minimal or no pipe connections above the bottom hole assembly. However, the drilling machine still needs the ability to deploy and retrieve the individual components of the bottom hole assembly. In some embodiments, components are automatically retrieved by a carousel, deployed, and made up over the hole when running in the hole. The process may be reversed when tripping out of the hole. Alternatively, components may be racked horizontally on the drilling machine. The components may be maneuvered with automatic pipe arms.

The drilling machine may employ a split injector system. When coiled tubing operations are halted, the two sides of the injector may be remotely unlatched and retracted to allow for over hole access.

In some embodiments that use coiled tubing, a bottom hole assembly handling rig is used to make up and deploy the bottom hole assembly in the well conductor of a well to be drilled to total depth. The drilling machine may leave the current bottom hole assembly in the well after reaching total depth and prior to moving to the next well. After latching on to the bottom hole assembly in the follow up well, the bottom hole assembly handling rig may pull the bottom hole assembly from the previous well and prepare it for the next well in sequence. The mast for the bottom hole assembly handling rig may be a very simple arrangement supporting a sandline for bottom hole assembly handling. In some embodiments, the wellbore in which the coiled tubing is placed is formed by jet drilling.

In some embodiments, coiled tubing may be carbon steel. Carbon steel coiled tubing may be used for only a limited number of cycles because coiling and/or uncoiling the steel forces the coiled tubing past the elastic region of the stress/strain curve and into the plastic region. In the plastic region, the steel is permanently deformed and/or weakened. For some coiled tubing uses, the coiled tubing is placed in the formation and left in the formation, so the use of carbon steel coiled tubing does not present a problem. For some coiled tubing uses, the coiled tubing may be coiled and uncoiled many times. For coiled tubing that needs to be coiled and uncoiled many times, the coiled tubing may be composite coiled tubing. Composite coiled tubing may stay in the elastic region during coiling and uncoiling so that there is little or no permanent deformation of the coiled tubing during deployment and retrieval. Composite coiled tubing is available from Fiberspar LinePipe LLC (Houston, Tex., U.S.A.). In some embodiments, composite coiled tubing may include one or more electrical wires in the composite. The electrical wires may be coupled to equipment and lowered into the wellbore with the coiled tubing.

Coiled tubing may be stored on a reel before deployment. A reel used by the drilling machine may have 500-1000 m of pipe. To increase the number of cycles the coiled tubing may be used, the reel may have a large diameter and be relatively narrow. In some embodiments, the coiled tubing reel is the wellhead. Having the wellhead and the reel as one unit eliminates the additional handling of a separate wellhead and an empty reel.

Reverse circulation drilling enables fast penetration rates and the use of low density drilling fluid such as air or mist. When tri-cone rock bits are used, a skirted rock bit assembly replaces the conventional tri-cone bit. The skirt directs the drilling fluid from the pipe-in-pipe drill rod annulus to the outside portion of the hole being drilled. As the cuttings are generated by the action of the rotating drill bit, the cuttings mix with the drilling fluid, pass through a hole in the center of the bit and are carried out of the hole through the center of the drill rods. When a non-skirted drill bit is used, a reverse-circulation crossover is installed between the standard bit and the drill rods. The crossover redirects the drilling fluid from the pipe-in-pipe drill rod annulus to the inside of the drill string about a meter above the bit. The drilling fluid passes through the bit jets, mixes with the cuttings, and returns up the drill string. At the crossover, the fluid/cuttings mixture enters the drill string and continues to the surface inside the inner tube of the drill rod.

Figure 12:
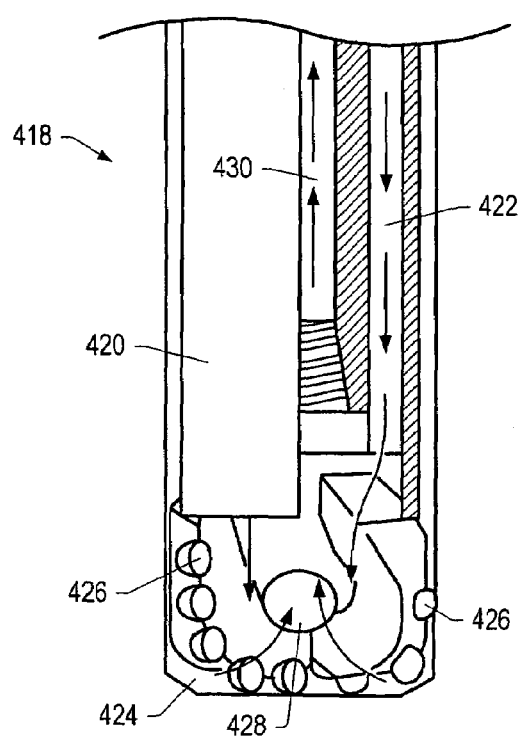
FIG. 12 depicts a schematic drawing of an embodiment of a reverse-circulating polycrystalline diamond compact drill bit design.

FIG. 12 depicts a schematic drawing of a reverse-circulating polycrystalline diamond compact drill bit design. The reverse-circulating polycrystalline diamond compact (RC-PDC) drill bit design eliminates the crossover. RC-PDC bit 418 may include skirt 420 that directs the drilling fluid from pipe-in-pipe drill rod annulus 422 to bottom portion 424 of the wellbore being formed. In bottom portion 424, the drilling fluid mixes with the cuttings generated by cutters 426 of the RC-PDC bit. The drilling fluid and cuttings pass through opening 428 in the center of RC-PDC bit 418 and are carried out of the wellbore through drill rod center 430.

In some embodiments, the cuttings generated during drilling are milled and used as a filler material in a slurry used for forming a grout wall. Cuttings that contain hydrocarbon material may be retorted to extract the hydrocarbons. Retorting the cuttings may be environmentally beneficial because the reinjected cuttings are free of organic material. Recovering the hydrocarbons may offset a portion of the milling cost.

Figure 13:
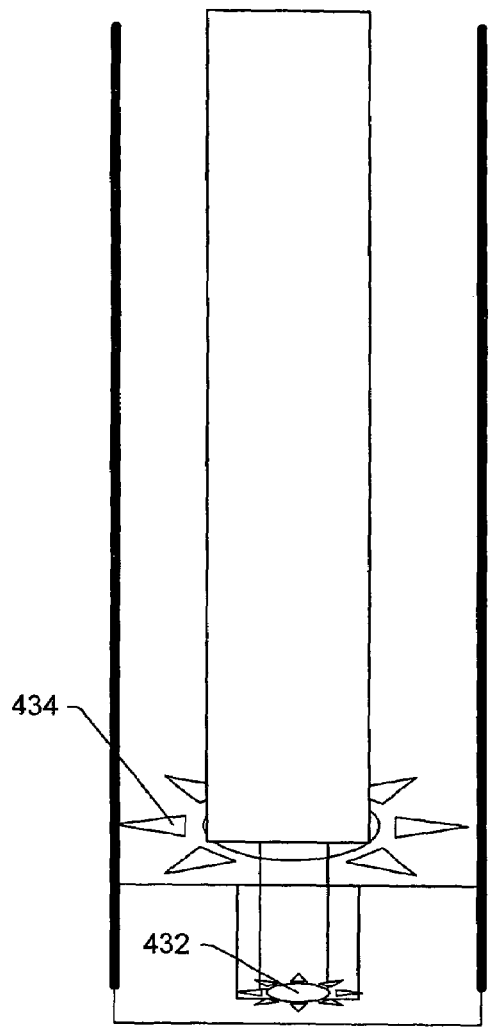
FIG. 13 depicts a schematic drawing of an embodiment of a drilling system.

FIG. 13 depicts a schematic drawing of a drilling system. Pilot bit 432 may form an opening in the formation. Pilot bit 432 may be followed by final diameter bit 434. In some embodiments, pilot bit 432 may be about 2.5 cm in diameter. Pilot bit 432 may be one or more meters below final diameter bit 434. Pilot bit 432 may rotate in a first direction and final diameter bit 434 may rotate in the opposite direction. Counter-rotating bits may allow for the formation of the wellbore along a desired path. Standard mud may be used in both pilot bit 432 and final diameter bit 434. In some embodiments, air or mist may be used as the drilling fluid in one or both bits.

During some in situ heat treatment processes, wellbores may need to be formed in heated formations. Wellbores drilled into hot formation may be additional or replacement heater wells, additional or replacement production wells and/or monitor wells. In some in situ heat treatment processes, a barrier formed around all or a portion of the in situ heat treatment process is formed by freeze wells that form a low temperature zone around the freeze wells. A portion of the cooling capacity of the freeze well equipment may be utilized to cool the equipment needed to drill into the hot formation.

Drilling bits may be advanced slowly in hot sections to ensure that the formed wellbore cools sufficiently to preclude drilling problems.

FIG. 14 depicts a schematic drawing of a system for drilling into a hot formation. Cold mud is introduced to drilling bit 434 through conduit 436. As the bit penetrates into the formation, the mud cools the bit and the surrounding formation. In an embodiment, a pilot hole is formed first and the wellbore is finished with a larger drill bit later. In an embodiment, the finished wellbore is formed without a pilot hole being formed. Well advancement is very slow to ensure sufficient cooling.

FIG. 15 depicts a schematic drawing of a system for drilling into a hot formation. Mud is introduced through conduit 436. Closed loop system 438 is used to circulate cooling fluid. The cooling fluid cools the drilling mud and the formation as drilling bit 434 slowly penetrates into the formation.

FIG. 16 depicts a schematic drawing of a system for drilling into a hot formation. Mud is introduced through conduit 436. Pilot bit 432 is followed by final diameter bit 434. Closed loop system 438 is used to circulate cooling fluid. The cooling fluid cools the drilling mud supplied to the drill bits. The cooled drilling mud cools the formation.

In some embodiments, one or more portions of a wellbore may need to be isolated from other portions of the wellbore to establish zonal isolation. In some embodiments, an expandable may be positioned in the wellbore adjacent to a section of the wellbore that is to be isolated. A pig or hydraulic pressure may be used to enlarge the expandable to establish zonal isolation.

In some embodiments, pathways may be formed in the formation after the wellbores are formed. Pathways may be formed adjacent to heater wellbores and/or adjacent to production wellbores. The pathways may promote better fluid flow and/or better heat conduction. In some embodiments, pathways are formed by hydraulically fracturing the formation. Other fracturing techniques may also be used. In some embodiments, small diameter bores may be formed in the formation. In some embodiments, heating the formation may expand and close or substantially close the fractures or bores formed in the formation to enhance heat conduction.

Some wellbores formed in the formation may be used to facilitate formation of a perimeter barrier around a treatment area. Heat sources in the treatment area may heat hydrocarbons in the formation within the treatment area. The perimeter barrier may be, but is not limited to, a low temperature or frozen barrier formed by freeze wells, dewatering wells, a grout wall formed in the formation, a sulfur cement barrier, a barrier formed by a gel produced in the formation, a barrier formed by precipitation of salts in the formation, a barrier formed by a polymerization reaction in the formation, and/or sheets driven into the formation. Heat sources, production wells, injection wells, dewatering wells, and/or monitoring wells may be installed in the treatment area defined by the barrier prior to, simultaneously with, or after installation of the barrier.

A low temperature zone around at least a portion of a treatment area may be formed by freeze wells. In an embodiment, refrigerant is circulated through freeze wells to form low temperature zones around each freeze well. The freeze wells are placed in the formation so that the low temperature zones overlap and form a low temperature zone around the treatment area. The low temperature zone established by freeze wells is maintained below the freezing temperature of aqueous fluid in the formation. Aqueous fluid entering the low temperature zone freezes and forms the frozen barrier. In other embodiments, the freeze barrier is formed by batch operated freeze wells. A cold fluid, such as liquid nitrogen, is introduced into the freeze wells to form low temperature zones around the freeze wells. The fluid is replenished as needed.

In some embodiments, two or more rows of freeze wells are located about all or a portion of the perimeter of the treatment area to form a thick interconnected low temperature zone. Thick low temperature zones may be formed adjacent to areas in the formation where there is a high flow rate of aqueous fluid in the formation. The thick barrier may ensure that breakthrough of the frozen barrier established by the freeze wells does not occur.

In some embodiments, a double barrier system is used to isolate a treatment area. The double barrier system may be formed with a first barrier and a second barrier. The first barrier may be formed around at least a portion of the treatment area to inhibit fluid from entering or exiting the treatment area. The second barrier may be formed around at least a portion of the first barrier to isolate an inter-barrier zone between the first barrier and the second barrier. The inter-barrier zone may have a thickness from about 1 m to about 300 m. In some embodiments, the thickness of the inter-barrier zone is from about 10 m to about 100 m, or from about 20 m to about 50 m.

The double barrier system may allow greater project depths than a single barrier system. Greater depths are possible with the double barrier system because the stepped differential pressures across the first barrier and the second barrier is less than the differential pressure across a single barrier. The smaller differential pressures across the first barrier and the second barrier make a breach of the double barrier system less likely to occur at depth for the double barrier system as compared to the single barrier system.

The double barrier system reduces the probability that a barrier breach will affect the treatment area or the formation on the outside of the double barrier. That is, the probability that the location and/or time of occurrence of the breach in the first barrier will coincide with the location and/or time of occurrence of the breach in the second barrier is low, especially if the distance between the first barrier and the second barrier is relatively large (for example, greater than about 15 m). Having a double barrier may reduce or eliminate influx of fluid into the treatment area following a breach of the first barrier or the second barrier. The treatment area may not be affected if the second barrier breaches. If the first barrier breaches, only a portion of the fluid in the inter-barrier zone is able to enter the contained zone. Also, fluid from the contained zone will not pass the second barrier. Recovery from a breach of a barrier of the double barrier system may require less time and fewer resources than recovery from a breach of a single barrier system. For example, reheating a treatment area zone following a breach of a double barrier system may require less energy than reheating a similarly sized treatment area zone following a breach of a single barrier system.

The first barrier and the second barrier may be the same type of barrier or different types of barriers. In some embodiments, the first barrier and the second barrier are formed by freeze wells. In some embodiments, the first barrier is formed by freeze wells, and the second barrier is a grout wall. The grout wall may be formed of cement, sulfur, sulfur cement, or combinations thereof. In some embodiments, a portion of the first barrier and/or a portion of the second barrier is a natural barrier, such as an impermeable rock formation.

Vertically positioned freeze wells and/or horizontally positioned freeze wells may be positioned around sides of the treatment area. If the upper layer (the overburden) or the lower layer (the underburden) of the formation is likely to allow fluid flow into the treatment area or out of the treatment area, horizontally positioned freeze wells may be used to form an upper and/or a lower barrier for the treatment area. In some embodiments, an upper barrier and/or a lower barrier may not be necessary if the upper layer and/or the lower layer are at least substantially impermeable. If the upper freeze barrier is formed, portions of heat sources, production wells, injection wells, and/or dewatering wells that pass through the low temperature zone created by the freeze wells forming the upper freeze barrier wells may be insulated and/or heat traced so that the low temperature zone does not adversely affect the functioning of the heat sources, production wells, injection wells and/or dewatering wells passing through the low temperature zone.

Spacing between adjacent freeze wells may be a function of a number of different factors. The factors may include, but are not limited to, physical properties of formation material, type of refrigeration system, coldness and thermal properties of the refrigerant, flow rate of material into or out of the treatment area, time for forming the low temperature zone, and economic considerations. Consolidated or partially consolidated formation material may allow for a large separation distance between freeze wells. A separation distance between freeze wells in consolidated or partially consolidated formation material may be from about 3 m to about 20 m, about 4 m to about 15 m, or about 5 m to about 10 m. In an embodiment, the spacing between adjacent freeze wells is about 5 m. Spacing between freeze wells in unconsolidated or substantially unconsolidated formation material, such as in tar sand, may need to be smaller than spacing in consolidated formation material. A separation distance between freeze wells in unconsolidated material may be from about 1 m to about 5 m.

Freeze wells may be placed in the formation so that there is minimal deviation in orientation of one freeze well relative to an adjacent freeze well. Excessive deviation may create a large separation distance between adjacent freeze wells that may not permit formation of an interconnected low temperature zone between the adjacent freeze wells. Factors that influence the manner in which freeze wells are inserted into the ground include, but are not limited to, freeze well insertion time, depth that the freeze wells are to be inserted, formation properties, desired well orientation, and economics.

Relatively low depth wellbores for freeze wells may be impacted and/or vibrationally inserted into some formations. Wellbores for freeze wells may be impacted and/or vibrationally inserted into formations to depths from about 1 m to about 100 m without excessive deviation in orientation of freeze wells relative to adjacent freeze wells in some types of formations.

Wellbores for freeze wells placed deep in the formation, or wellbores for freeze wells placed in formations with layers that are difficult to impact or vibrate a well through, may be placed in the formation by directional drilling and/or geo-steering. Acoustic signals, electrical signals, magnetic signals, and/or other signals produced in a first wellbore may be used to guide directionally drilling of adjacent wellbores so that desired spacing between adjacent wells is maintained. Tight control of the spacing between wellbores for freeze wells is an important factor in minimizing the time for completion of barrier formation.

In some embodiments, one or more portions of freeze wells may be angled in the formation. The freeze wells may be angled in the formation adjacent to aquifers. In some embodiments, the angled portions are angled outwards from the treatment area. In some embodiments, the angled portions may be angled inwards towards the treatment area. The angled portions of the freeze wells allow extra length of freeze well to be positioned in the aquifer zones. Also, the angled portions of the freeze wells may reduce the shear load applied to the frozen barrier by water flowing in the aquifer.

After formation of the wellbore for the freeze well, the wellbore may be backflushed with water adjacent to the part of the formation that is to be reduced in temperature to form a portion of the freeze barrier. The water may displace drilling fluid remaining in the wellbore. The water may displace indigenous gas in cavities adjacent to the formation. In some embodiments, the wellbore is filled with water from a conduit up to the level of the overburden. In some embodiments, the wellbore is backflushed with water in sections. The wellbore maybe treated in sections having lengths of about 6 m, 10 m, 14 m, 17 m, or greater. Pressure of the water in the wellbore is maintained below the fracture pressure of the formation. In some embodiments, the water, or a portion of the water is removed from the wellbore, and a freeze well is placed in the formation.

FIG. 17 depicts an embodiment of freeze well 440. Freeze well 440 may include canister 442, inlet conduit 444, spacers 446, and wellcap 448. Spacers 446 may position inlet conduit 444 in canister 442 so that an annular space is formed between the canister and the conduit. Spacers 446 may promote turbulent flow of refrigerant in the annular space between inlet conduit 444 and canister 442, but the spacers may also cause a significant fluid pressure drop. Turbulent fluid flow in the annular space may be promoted by roughening the inner surface of canister 442, by roughening the outer surface of inlet conduit 444, and/or by having a small cross-sectional area annular space that allows for high refrigerant velocity in the annular space. In some embodiments, spacers are not used. Wellhead 450 may suspend canister 442 in wellbore 452.

Formation refrigerant may flow through cold side conduit 454 from a refrigeration unit to inlet conduit 444 of freeze well 440. The formation refrigerant may flow through an annular space between inlet conduit 444 and canister 442 to warm side conduit 456. Heat may transfer from the formation to canister 442 and from the canister to the formation refrigerant in the annular space. Inlet conduit 444 may be insulated to inhibit heat transfer to the formation refrigerant during passage of the formation refrigerant into freeze well 440. In an embodiment, inlet conduit 444 is a high density polyethylene tube. At cold temperatures, some polymers may exhibit a large amount of thermal contraction. For example, a 260 m initial length of polyethylene conduit subjected to a temperature of about −25° C. may contract by 6 m or more. If a high density polyethylene conduit, or other polymer conduit, is used, the large thermal contraction of the material must be taken into account in determining the final depth of the freeze well. For example, the freeze well may be drilled deeper than needed, and the conduit may be allowed to shrink back during use. In some embodiments, inlet conduit 444 is an insulated metal tube. In some embodiments, the insulation may be a polymer coating, such as, but not limited to, polyvinylchloride, high density polyethylene, and/or polystyrene.

Freeze well 440 may be introduced into the formation using a coiled tubing rig. In an embodiment, canister 442 and inlet conduit 444 are wound on a single reel. The coiled tubing rig introduces the canister and inlet conduit 444 into the formation. In an embodiment, canister 442 is wound on a first reel and inlet conduit 444 is wound on a second reel. The coiled tubing rig introduces canister 442 into the formation. Then, the coiled tubing rig is used to introduce inlet conduit 444 into the canister. In other embodiments, freeze well is assembled in sections at the wellbore site and introduced into the formation.

An insulated section of freeze well 440 may be placed adjacent to overburden 458. An uninsulated section of freeze well 440 may be placed adjacent to layer or layers 460 where a low temperature zone is to be formed. In some embodiments, uninsulated sections of the freeze wells may be positioned adjacent only to aquifers or other permeable portions of the formation that would allow fluid to flow into or out of the treatment area. Portions of the formation where uninsulated sections of the freeze wells are to be placed may be determined using analysis of cores and/or logging techniques.

Various types of refrigeration systems may be used to form a low temperature zone. Determination of an appropriate refrigeration system may be based on many factors, including, but not limited to: a type of freeze well; a distance between adjacent freeze wells; a refrigerant; a time frame in which to form a low temperature zone; a depth of the low temperature zone; a temperature differential to which the refrigerant will be subjected; one or more chemical and/or physical properties of the refrigerant; one or more environmental concerns related to potential refrigerant releases, leaks or spills; one or more economic factors; water flow rate in the formation; composition and/or properties of formation water including the salinity of the formation water; and one or more properties of the formation such as thermal conductivity, thermal diffusivity, and heat capacity.

A circulated fluid refrigeration system may utilize a liquid refrigerant (formation refrigerant) that is circulated through freeze wells. Some of the desired properties for the formation refrigerant are: low working temperature, low viscosity at and near the working temperature, high density, high specific heat capacity, high thermal conductivity, low cost, low corrosiveness, and low toxicity. A low working temperature of the formation refrigerant allows a large low temperature zone to be established around a freeze well. The low working temperature of formation refrigerant should be about $-20°$ C. or lower. Formation refrigerants having low working temperatures of at least $-60°$ C. may include aqua ammonia, potassium formate solutions such as Dynalene® HC-50 (Dynalene® Heat Transfer Fluids (Whitehall, Pa., U.S.A.)) or FREEZIUM® (Kemira Chemicals (Helsinki, Finland)); silicone heat transfer fluids such as Syltherm XLT® (Dow Corning Corporation (Midland, Mich., U.S.A.); hydrocarbon refrigerants such as propylene; and chlorofluorocarbons such as R-22. Aqua ammonia is a solution of ammonia and water with a weight percent of ammonia between about 20% and about 40%. Aqua ammonia has several properties and characteristics that make use of aqua ammonia as the formation refrigerant desirable. Such properties and characteristics include, but are not limited to, a very low freezing point, a low viscosity, ready availability, and low cost.

Formation refrigerant that is capable of being chilled below a freezing temperature of aqueous formation fluid may be used to form the low temperature zone around the treatment area. The following equation (the Sanger equation) may be used to model the time $t_1$ needed to form a frozen barrier of radius R around a freeze well having a surface temperature of $T_s$:

$$t_1 = \frac{R^2 L_1}{4k_f v_s}\left(2\ln\frac{R}{r_o} - 1 + \frac{c_{vf} v_s}{L_1}\right) \quad (2)$$

in which:

-continued $$L_1 = L\frac{a_r^2 - 1}{2\ln a_r}c_{vu}v_o$$

$$a_r = \frac{R_A}{R}.$$

In these equations, $k_f$ is the thermal conductivity of the frozen material; $c_{vf}$ and $c_{vu}$ are the volumetric heat capacity of the frozen and unfrozen material, respectively; $r_o$ is the radius of the freeze well; $v_s$ is the temperature difference between the freeze well surface temperature $T_s$ and the freezing point of water $T_o$; $v_o$ is the temperature difference between the ambient ground temperature $T_g$ and the freezing point of water $T_o$; L is the volumetric latent heat of freezing of the formation; R is the radius at the frozen-unfrozen interface; and $R_A$ is a radius at which there is no influence from the refrigeration pipe. The Sanger equation may provide a conservative estimate of the time needed to form a frozen barrier of radius R because the equation does not take into consideration superposition of cooling from other freeze wells. The temperature of the formation refrigerant is an adjustable variable that may significantly affect the spacing between freeze wells.

EQN. 2 implies that a large low temperature zone may be formed by using a refrigerant having an initial temperature that is very low. The use of formation refrigerant having an initial cold temperature of about $-30°$ C. or lower is desirable. Formation refrigerants having initial temperatures warmer than about $-30°$ C. may also be used, but such formation refrigerants require longer times for the low temperature zones produced by individual freeze wells to connect. In addition, such formation refrigerants may require the use of closer freeze well spacings and/or more freeze wells.

The physical properties of the material used to construct the freeze wells may be a factor in the determination of the coldest temperature of the formation refrigerant used to form the low temperature zone around the treatment area. Carbon steel may be used as a construction material of freeze wells. ASTM A333 grade 6 steel alloys and ASTM A333 grade 3 steel alloys may be used for low temperature applications. ASTM A333 grade 6 steel alloys typically contain little or no nickel and have a low working temperature limit of about $-50°$ C. ASTM A333 grade 3 steel alloys typically contain nickel and have a much colder low working temperature limit. The nickel in the ASTM A333 grade 3 alloy adds ductility at cold temperatures, but also significantly raises the cost of the metal. In some embodiments, the coldest temperature of the refrigerant is from about $-35°$ C. to about $-55°$ C., from about $-38°$ C. to about $-47°$ C., or from about $-40°$ C. to about $-45°$ C. to allow for the use of ASTM A333 grade 6 steel alloys for construction of canisters for freeze wells. Stainless steels, such as 304 stainless steel, may be used to form freeze wells, but the cost of stainless steel is typically much more than the cost of ASTM A333 grade 6 steel alloy.

In some embodiments, the metal used to form the canisters of the freeze wells may be provided as pipe. In some embodiments, the metal used to form the canisters of the freeze wells may be provided in sheet form. The sheet metal may be longitudinally welded to form pipe and/or coiled tubing. Forming the canisters from sheet metal may improve the economics of the system by allowing for coiled tubing insulation and by reducing the equipment and manpower needed to form and install the canisters using pipe.

A refrigeration unit may be used to reduce the temperature of formation refrigerant to the low working temperature. In some embodiments, the refrigeration unit may utilize an ammonia vaporization cycle. Refrigeration units are available from Cool Man Inc. (Milwaukee, Wis., U.S.A.), Gartner Refrigeration & Manufacturing (Minneapolis, Minn., U.S.A.), and other suppliers. In some embodiments, a cascading refrigeration system may be utilized with a first stage of ammonia and a second stage of carbon dioxide. The circulating refrigerant through the freeze wells may be 30% by weight ammonia in water (aqua ammonia). Alternatively, a single stage carbon dioxide refrigeration system may be used.

In some embodiments, refrigeration systems for forming a low temperature barrier for a treatment area may be installed and activated before freeze wells are formed in the formation. As the freeze well wellbores are formed, freeze wells may be installed in the wellbores. Refrigerant may be circulated through the wellbores soon after the freeze well is installed into the wellbore. Limiting the time between wellbore formation and cooling initiation may limit or inhibit cross mixing of formation water between different aquifers.

Grout may be used in combination with freeze wells to provide a barrier for the in situ heat treatment process. The grout fills cavities (vugs) in the formation and reduces the permeability of the formation. Grout may have higher thermal conductivity than gas and/or formation fluid that fills cavities in the formation. Placing grout in the cavities may allow for faster low temperature zone formation. The grout forms a perpetual barrier in the formation that may strengthen the formation. The use of grout in unconsolidated or substantially unconsolidated formation material may allow for larger well spacing than is possible without the use of grout. The combination of grout and the low temperature zone formed by freeze wells may constitute a double barrier for environmental regulation purposes. In some embodiments, the grout is introduced into the formation as a liquid, and the liquid sets in the formation to form a solid. The grout may be any type of grout, including but not limited to, fine cement, micro fine cement, sulfur, sulfur cement, viscous thermoplastics, and/or waxes. The grout may include surfactants, stabilizers or other chemicals that modify the properties of the grout. For example, the presence of surfactant in the grout may promote entry of the grout into small openings in the formation.

Grout may be introduced into the formation through freeze well wellbores. The grout may be allowed to set. The integrity of the grout wall may be checked. The integrity of the grout wall may be checked by logging techniques and/or by hydrostatic testing. If the permeability of a grouted section is too high, additional grout may be introduced into the formation through freeze well wellbores. After the permeability of the grouted section is sufficiently reduced, freeze wells may be installed in the freeze well wellbores.

Grout may be injected into the formation at a pressure that is high, but below the fracture pressure of the formation. In some embodiments, grouting is performed in 16 m increments in the freeze wellbore. Larger or smaller increments may be used if desired. In some embodiments, grout is only applied to certain portions of the formation. For example, grout may be applied to the formation through the freeze wellbore only adjacent to aquifer zones and/or to relatively high permeability zones (for example, zones with a permeability greater than about 0.1 darcy). Applying grout to aquifers may inhibit migration of water from one aquifer to a different aquifer. For grout placed in the formation through freeze well wellbores, the grout may inhibit water migration between aquifers during formation of the low temperature zone. The grout may also inhibit water migration between aquifers when an established low temperature zone is allowed to thaw.

In some embodiments, the grout used to form a barrier may be fine cement and micro fine cement. Cement may provide structural support in the formation. Fine cement may be ASTM type 3 Portland cement. Fine cement may be less expensive than micro fine cement. In an embodiment, a freeze wellbore is formed in the formation. Selected portions of the freeze wellbore are grouted using fine cement. Then, micro fine cement is injected into the formation through the freeze wellbore. The fine cement may reduce the permeability down to about 10 millidarcy. The micro fine cement may further reduce the permeability to about 0.1 millidarcy. After the grout is introduced into the formation, a freeze wellbore canister may be inserted into the formation. The process may be repeated for each freeze well that will be used to form the barrier.

In some embodiments, fine cement is introduced into every other freeze wellbore. Micro fine cement is introduced into the remaining wellbores. For example, grout may be used in a formation with freeze wellbores set at about 5 m spacing. A first wellbore is drilled and fine cement is introduced into the formation through the wellbore. A freeze well canister is positioned in the first wellbore. A second wellbore is drilled 10 m away from the first wellbore. Fine cement is introduced into the formation through the second wellbore. A freeze well canister is positioned in the second wellbore. A third wellbore is drilled between the first wellbore and the second wellbore. In some embodiments, grout from the first and/or second wellbores may be detected in the cuttings of the third wellbore. Micro fine cement is introduced into the formation through the third wellbore. A freeze wellbore canister is positioned in the third wellbore. The same procedure is used to form the remaining freeze wells that will form the barrier around the treatment area.

In some embodiments, wax may be used to form a grout barrier. Wax barriers may be formed in wet, dry or oil wetted formations. Liquid wax introduced into the formation may permeate into adjacent rock and fractures in the formation. Liquid wax may permeate into rock to fill microscopic as well as macroscopic pores and vugs in the rock. The wax solidifies to form a grout barrier that inhibits fluid flow into or out of a treatment area. A wax grout barrier may provide a minimal amount of structural support in the formation. Molten wax may reduce the strength of poorly consolidated soil by reducing inter-grain friction so that the poorly consolidated soil sloughs or liquefies. Poorly consolidated layers may be consolidated by use of cement or other binding agents before introduction of molten wax.

The wax of a barrier may be a branched paraffin to, for example, inhibit biological degradation of the wax. The wax may include stabilizers, surfactants or other chemicals that modify the physical and/or chemical properties of the wax. The physical properties may be tailored to meet specific needs. The wax may melt at a relative low temperature (for example, the wax may have a typical melting point of about 52° C.). The temperature at which the wax congeals may be at least 5° C., 10° C., 20° C., or 30° C. above the ambient temperature of the formation prior to any heating of the formation. When molten, the wax may have a relatively low viscosity (for example, 4 to 10 cp at about 99° C.). The flash point of the wax may be relatively high (for example, the flash point may be over 204° C.). The wax may have a density less than the density of water and may have a heat capacity that is less than half the heat capacity of water. The solid wax may have a low thermal conductivity (for example, about 0.18 W/m ° C.) so that the solid wax is a thermal insulator. Waxes suitable for forming a barrier are available as WAXFIX™ from Carter Technologies Company (Sugar Land, Tex., U.S.A.).

In some embodiments, a wax barrier or wax barriers may be used as the barriers for the in situ heat treatment process. In some embodiments, a wax barrier may be used in conjunction with freeze wells that form a low temperature barrier around the treatment area. In some embodiments, the wax barrier is formed and freeze wells are installed in the wellbores used for introducing wax into the formation. In some embodiments, the wax barrier is formed in wellbores offset from the freeze well wellbores. The wax barrier may be on the outside or the inside of the freeze wells. In some embodiments, a wax barrier may be formed on both the inside and outside of the freeze wells. The wax barrier may inhibit water flow in the formation that would inhibit the formation of the low temperature zone by the freeze wells. In some embodiments, a wax barrier is formed in the inter-barrier zone between two freeze barriers of a double barrier system.

Wellbores may be formed in the formation around the treatment area at a close spacing. In some embodiments, the spacing is from about 1.5 m to about 4 m. Low temperature heaters may be inserted in the wellbores. The heaters may operate at temperatures from about 260° C. to about 320° C. so that the temperature at the formation face is below the pyrolysis temperature of hydrocarbons in the formation. The heaters may be activated to heat the formation until the overlap between two adjacent heaters raises the temperature of the zone between the two heaters above the melting temperature of the wax. Heating the formation to obtain superposition of heat with a temperature above the melting temperature of the wax may take one month, two months, or longer. After heating, the heaters may be turned off. Wax may be introduced into the wellbores to form the barrier. The wax may flow into the formation and fill any fractures and porosity that has been heated. The wax congeals when the wax flows to cold regions beyond the heated circumference. This wax barrier formation method may form a more complete barrier than some other methods of wax barrier formation, but the time for heating may be longer than for some of the other methods. Also, if a low temperature barrier is to be formed with the freeze wells placed in the wellbores used for wax injection, the freeze wells will have to remove the heat supplied to the formation to allow for introduction of the wax. The low temperature barrier may take longer to form.

In some embodiments, the wax barrier may be formed using a conduit placed in the wellbore. FIG. 18A depicts an embodiment of a system for forming a wax barrier in a formation. Wellbore 452 may extend into one or more layers 460 below overburden 458. Wellbore 452 may be an open wellbore below underburden 458. One or more of the layers 460 may include fracture systems 462. One or more of the layers may be vuggy so that the layer or a portion of the layer has a high porosity. Conduit 464 may be positioned in wellbore 452. In some embodiments, low temperature heater 466 may be strapped or attached to conduit 464. In some embodiments, conduit 464 may be a heater element. Heater 466 may be operated so that the heater does not cause pyrolysis of hydrocarbons adjacent to the heater. At least a portion of wellbore 452 may be filled with fluid. The fluid may be formation fluid or water. Heater 466 may be activated to heat the fluid. A portion of the heated fluid may move outwards from heater 466 into the formation. The heated fluid may be injected into the fractures and permeable vuggy zones. The heated fluid may be injected into the fractures and permeable vuggy zones by introducing heated wax into wellbore 452 in the annular space between conduit 464 and the wellbore. The introduced wax flows to the areas heated by the fluid and congeals when the fluid reaches cold regions not heated by the fluid. The wax fills fracture systems 462 and permeable vuggy pathways heated by the fluid, but the wax may not permeate through a significant portion of the rock matrix as when the hot wax is introduced into a heated formation as described above. The wax flows into fracture systems 462 a sufficient distance to join with wax injected from an adjacent well so that a barrier to fluid flow through the fracture systems forms when the wax congeals. A portion of wax may congeal along the wall of a fracture or a vug without completely blocking the fracture or filling the vug. The congealed wax may act as an insulator and allow additional liquid wax to flow beyond the congealed portion to penetrate deeply into the formation and form blockages to fluid flow when the wax cools below the melting temperature of the wax.

Wax in the annular space of wellbore 452 between conduit 464 and the formation may be removed through conduit by displacing the wax with water or other fluid. Conduit 464 may be removed and a freeze well may be installed in the wellbore. This method may use less wax than the method described above. The heating of the fluid may be accomplished in less than a week or within a day. The small amount of heat input may allow for quicker formation of a low temperature barrier if freeze wells are to be positioned in the wellbores used to introduce wax into the formation.

In some embodiments, a heater may be suspended in the well without a conduit that allows for removal of excess wax from the wellbore. The wax may be introduced into the well. After wax introduction, the heater may be removed from the well. In some embodiments, a conduit may be positioned in the wellbore, but a heater may not be coupled to the conduit. Hot wax may be circulated through the conduit so that the wax enters fractures systems and/or vugs adjacent to the wellbore.

In some embodiments, wax may be used during the formation of a wellbore to improve inter-zonal isolation and protect a low-pressure zone from inflow from a high-pressure zone. During wellbore formation where a high pressure zone and a low pressure zone are penetrated by a common wellbore, it is possible for the high pressure zone to flow into the low pressure zone and cause an underground blowout. To avoid this, the wellbore may be formed through the first zone. Then, an intermediate casing may be set and cemented through the first zone. Setting casing may be time consuming and expensive. Instead of setting a casing, wax may be used to seal the first zone. The wax may also inhibit or prevent mixing of high salinity brines from lower, high pressure zones with fresher brines in upper, lower pressure zones.

Figure 18B:
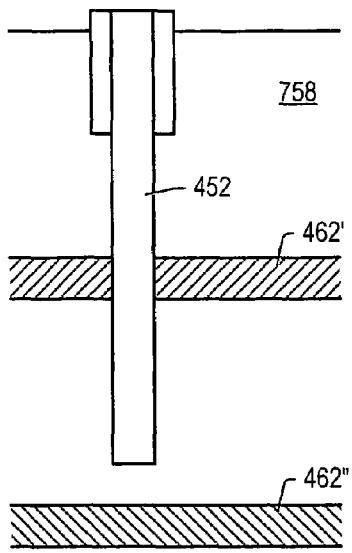
FIG. 18B depicts a representation of a wellbore drilled to an intermediate depth in a formation.
Figure 18C:
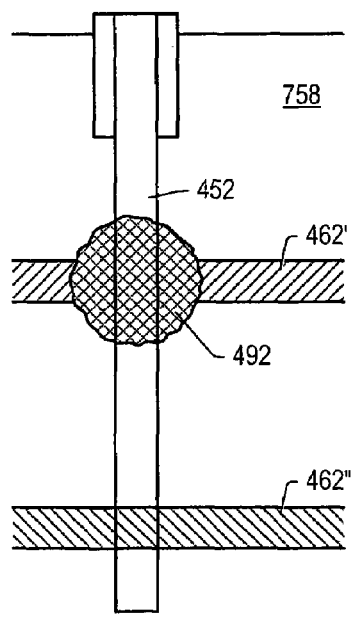
FIG. 18C depicts a representation of the wellbore drilled to the final depth in the formation.

FIG. 18B depicts wellbore 452 drilled to a first depth in formation 758. After the surface casing for wellbore 452 is set and cemented in place, the wellbore is drilled to the first depth which passes through a permeable zone, such as an aquifer. The permeable zone may be fracture system 462'. In some embodiments, a heater is placed in wellbore 452 to heat the vertical interval of fracture system 462'. In some embodiments, hot fluid is circulated in wellbore 452 to heat the vertical interval of fracture system 462'. After heating, molten wax is pumped down wellbore 452. The molten wax flows a selected distance into fracture system 462' before the wax cools sufficiently to solidify and form a seal. The molten wax is introduced into formation 758 at a pressure below the fracture pressure of the formation. In some embodiments, pressure is maintained on the wellhead until the wax has solidified. In some embodiments, the wax is allowed to cool until the wax in wellbore 452 is almost to the congealing temperature of the wax. The wax in wellbore 452 may then be displaced out of the wellbore. The wax makes the portion of formation 758 near wellbore 452 into a substantially impermeable zone. Wellbore 452 may be drilled to depth through one or more permeable zones that are at higher pressures than the pressure in the first permeable zone, such as fracture system 462". Congealed wax in fracture system 462' may inhibit blowout into the lower pressure zone. FIG. 18C depicts wellbore 452 drilled to depth with congealed wax 492 in formation 758.

In some embodiments, wax may be used to contain and inhibit migration in a subsurface formation that has liquid hydrocarbon contaminants (for example, compounds such as benzene, toluene, ethylbenzene and xylene) condensed in fractures in the formation. The location of the contaminants may be surrounded with heated wax injection wells. Wax may be introduced into the wells to form an outer wax barrier. The wax injected into the fractures from the wax injection wells may mix with the contaminants. The contaminants may be solubilized into the wax. When the wax congeals, the contaminants may be permanently contained in the solid wax phase.

In some embodiments, a composition that includes a cross-linkable polymer may be used with or in addition to a wax. Such composition may be provided to the formation as is described above for the wax. The composition may be configured to react and solidify after a selected time in the formation, thereby allowing the composition to be provided as a liquid to the formation. The cross-linkable polymer may include, for example, acrylates, methacrylates, urethanes, and/or epoxies. A cross-linking initiator may be included in the composition. The composition may also include a cross-linking inhibitor. The cross-linking inhibitor may be configured to degrade while in the formation, thereby allowing the composition to solidify.

In certain embodiments, a barrier may be formed in the formation after an in situ heat treatment process or a solution mining process by introducing a fluid into the formation. The in situ heat treatment process may heat the treatment area and greatly increase the permeability of the treatment area. The solution mining process may remove material from the treatment area and greatly increase the permeability of the treatment area. In certain embodiments, the treatment area has an increased permeability of at least 0.1 darcy. In some embodiments, the treatment area has an increased permeability of at least 1 darcy, of at least 10 darcy, or of at least 100 darcy. The increased permeability allows the fluid to spread in the formation into fractures, microfractures, and/or pore spaces in the formation. The fluid may include wax, bitumen, heavy oil, sulfur, polymer, saturated saline solution, and/or a reactant or reactants that react to form a precipitate, solid or a high viscosity fluid in the formation. In some embodiments, bitumen, heavy oil, and/or sulfur used to form the barrier are obtained from treatment facilities of the in situ heat treatment process.

The fluid may be introduced into the formation as a liquid, vapor, or mixed phase fluid. The fluid may be introduced into a portion of the formation that is at an elevated temperature. In some embodiments, the fluid is introduced into the formation through wells located near a perimeter of the treatment area. The fluid may be directed away from the treatment area. The elevated temperature of the formation maintains or allows the fluid to have a low viscosity so that the fluid moves away from the wells. A portion of the fluid may spread outwards in the formation towards a cooler portion of the formation. In the cooler portion of the formation, the viscosity of the fluid increases, a portion of the fluid precipitates, and/or the fluid solidifies or thickens so that the fluid forms the barrier to flow of formation fluid into or out of the treatment area.

In some embodiments, a low temperature barrier formed by freeze wells surrounds all or a portion of the treatment area. As the fluid introduced into the formation approaches the low temperature barrier, the temperature of the formation becomes colder. The colder temperature increases the viscosity of the fluid, enhances precipitation, and/or solidifies the fluid to form the barrier to the flow of formation fluid into or out of the formation. The fluid may remain in the formation as a highly viscous fluid or a solid after the low temperature barrier has dissipated.

In certain embodiments, saturated saline solution is introduced into the formation. Components in the saturated saline solution may precipitate out of solution when the solution reaches a colder temperature. The solidified particles may form the barrier to the flow of formation fluid into or out of the formation. The solidified components may be substantially insoluble in formation fluid.

In certain embodiments, brine is introduced into the formation as a reactant. A second reactant, such a carbon dioxide may be introduced into the formation to react with the brine. The reaction may generate a mineral complex that grows in the formation. The mineral complex may be substantially insoluble to formation fluid. In an embodiment, the brine solution includes a sodium and aluminum solution. The second reactant introduced in the formation is carbon dioxide. The carbon dioxide reacts with the brine solution to produce dawsonite. The minerals may solidify and form the barrier to the flow of formation fluid into or out of the formation.

In some embodiments, the barrier may be formed using sulfur. Molten sulfur may be introduced into the formation through wells located near the perimeter of the treatment area. At least a portion of the sulfur spreads outwards from the treatment area towards a cooler portion of the formation. The introduced sulfur spreads outward and solidifies in the formation to form a sulfur barrier. The solidified sulfur in the formation forms a barrier to formation fluid flow into or out of the treatment area.

A temperature monitoring system may be installed in wellbores of freeze wells and/or in monitor wells adjacent to the freeze wells to monitor the temperature profile of the freeze wells and/or the low temperature zone established by the freeze wells. The monitoring system may be used to monitor progress of low temperature zone formation. The monitoring system may be used to determine the location of high temperature areas, potential breakthrough locations, or breakthrough locations after the low temperature zone has formed. Periodic monitoring of the temperature profile of the freeze wells and/or low temperature zone established by the freeze wells may allow additional cooling to be provided to potential trouble areas before breakthrough occurs. Additional cooling may be provided at or adjacent to breakthroughs and high temperature areas to ensure the integrity of the low temperature zone around the treatment area. Additional cooling may be provided by increasing refrigerant flow through selected freeze wells, installing an additional freeze well or freeze wells, and/or by providing a cryogenic fluid, such as liquid nitrogen, to the high temperature areas. Providing additional cooling to potential problem areas before breakthrough occurs may be more time efficient and cost efficient than sealing a breach, reheating a portion of the treatment area that has been cooled by influx of fluid, and/or remediating an area outside of the breached frozen barrier.

In some embodiments, a traveling thermocouple may be used to monitor the temperature profile of selected freeze wells or monitor wells. In some embodiments, the temperature monitoring system includes thermocouples placed at discrete locations in the wellbores of the freeze wells, in the freeze wells, and/or in the monitoring wells. In some embodiments, the temperature monitoring system comprises a fiber optic temperature monitoring system.

Fiber optic temperature monitoring systems are available from Sensornet (London, United Kingdom), Sensa (Houston, Tex., U.S.A.), Luna Energy (Blacksburg, Va., U.S.A.), Lios Technology GMBH (Cologne, Germany), Oxford Electronics Ltd. (Hampshire, United Kingdom), and Sabeus Sensor Systems (Calabasas, Calif., U.S.A.). The fiber optic temperature monitoring system includes a data system and one or more fiber optic cables. The data system includes one or more lasers for sending light to the fiber optic cable; and one or more computers, software and peripherals for receiving, analyzing, and outputting data. The data system may be coupled to one or more fiber optic cables.

A single fiber optic cable may be several kilometers long. The fiber optic cable may be installed in many freeze wells and/or monitor wells. In some embodiments, two fiber optic cables may be installed in each freeze well and/or monitor well. The two fiber optic cables may be coupled. Using two fiber optic cables per well allows for compensation due to optical losses that occur in the wells and allows for better accuracy of measured temperature profiles.

The fiber optic temperature monitoring system may be used to detect the location of a breach or a potential breach in a frozen barrier. The search for potential breaches may be performed at scheduled intervals, for example, every two or three months. To determine the location of the breach or potential breach, flow of formation refrigerant to the freeze wells of interest is stopped. In some embodiments, the flow of formation refrigerant to all of the freeze wells is stopped. The rise in the temperature profiles, as well as the rate of change of the temperature profiles, provided by the fiber optic temperature monitoring system for each freeze well can be used to determine the location of any breaches or hot spots in the low temperature zone maintained by the freeze wells. The temperature profile monitored by the fiber optic temperature monitoring system for the two freeze wells closest to the hot spot or fluid flow will show the quickest and greatest rise in temperature. A temperature change of a few degrees Centigrade in the temperature profiles of the freeze wells closest to a troubled area may be sufficient to isolate the location of the trouble area. The shut down time of flow of circulation fluid in the freeze wells of interest needed to detect breaches, potential breaches, and hot spots may be on the order of a few hours or days, depending on the well spacing and the amount of fluid flow affecting the low temperature zone.

Fiber optic temperature monitoring systems may also be used to monitor temperatures in heated portions of the formation during in situ heat treatment processes. The fiber of a fiber optic cable used in the heated portion of the formation may be clad with a reflective material to facilitate retention of a signal or signals transmitted down the fiber. In some embodiments, the fiber is clad with gold, copper, nickel, aluminum and/or alloys thereof. The cladding may be formed of a material that is able to withstand chemical and temperature conditions in the heated portion of the formation. For example, gold cladding may allow an optical sensor to be used up to temperatures of 700° C. In some embodiments, the fiber is clad with aluminum. The fiber may be dipped in or run through a bath of liquid aluminum. The clad fiber may then be allowed to cool to secure the aluminum to the fiber. The gold or aluminum cladding may reduce hydrogen darkening of the optical fiber.

A potential source of heat loss from the heated formation is due to reflux in wells. Refluxing occurs when vapors condense in a well and flow into a portion of the well adjacent to the heated portion of the formation. Vapors may condense in the well adjacent to the overburden of the formation to form condensed fluid. Condensed fluid flowing into the well adjacent to the heated formation absorbs heat from the formation. Heat absorbed by condensed fluids cools the formation and necessitates additional energy input into the formation to maintain the formation at a desired temperature. Some fluids that condense in the overburden and flow into the portion of the well adjacent to the heated formation may react to produce undesired compounds and/or coke. Inhibiting fluids from refluxing may significantly improve the thermal efficiency of the in situ heat treatment system and/or the quality of the product produced from the in situ heat treatment system.

For some well embodiments, the portion of the well adjacent to the overburden section of the formation is cemented to the formation. In some well embodiments, the well includes packing material placed near the transition from the heated section of the formation to the overburden. The packing material inhibits formation fluid from passing from the heated section of the formation into the section of the wellbore adjacent to the overburden. Cables, conduits, devices, and/or instruments may pass through the packing material, but the packing material inhibits formation fluid from passing up the wellbore adjacent to the overburden section of the formation.

In some embodiments, a gas may be introduced into the formation through wellbores to inhibit reflux in the wellbores. In some embodiments, gas may be introduced into wellbores that include baffle systems to inhibit reflux of fluid in the wellbores. The gas may be carbon dioxide, methane, nitrogen or other desired gas.

Figure 19:
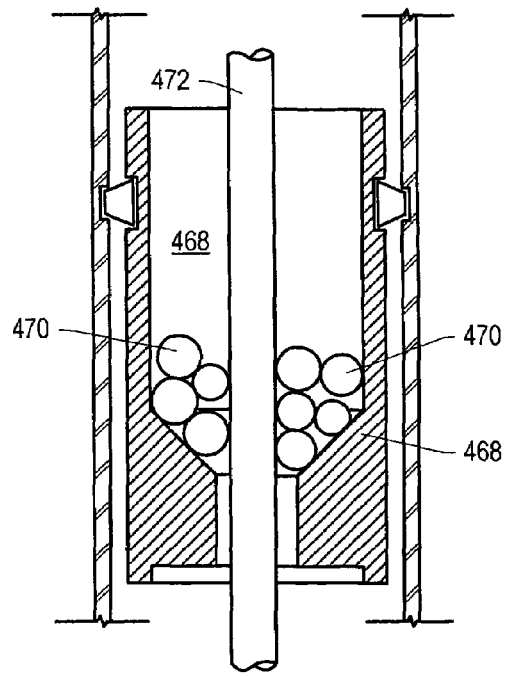
FIG. 19 depicts an embodiment of a ball type reflux baffle system positioned in a heater well.

In some well embodiments, a ball type reflux baffle system may be used in heater wells to inhibit reflux. FIG. 19 depicts an embodiment of ball type reflux baffle system positioned in a cased portion of a heater well. Ball type reflux baffle may include insert 468, and balls 470. A portion of heater element 472 passes through insert 468. The portion of heater element 472 that passes through insert 468 is a portion of the heater element that does not heat to a high temperature. Insert 468 may be made of metal, plastic and/or steel able to withstand temperatures of over 160° C. In an embodiment, insert 468 is made of phenolic resin.

Insert 468 may be guided down the casing of the wellbore using a coil tubing guide string. Insert 468 may be set in position using slips that fit in one or more indentions in the insert, using protrusions of the insert that fit in one or more recesses in the casing, or the insert may rest on a shoulder of the casing. After removal of the coil tubing guide string, balls 470 may be dropped down the casing onto insert 468. Balls may be made of any desired material able to withstand temperatures of over 160° C. In some embodiments, balls 470 are made of silicon nitride. Balls of varying diameters may be used. Balls 470 inhibit fluid convection.

During the in situ heat treatment process, heater element 472 may need to be pulled from the well. When heater element 472 is removed from the well, balls 470 may pass through insert 468 to the bottom of the well. Another heater element may be installed in the well, and additional balls may be dropped down the well to land on insert 468.

In some embodiments, one or more circular baffles may be coupled to a portion of a heating element to inhibit convection of fluid. The baffles may substantially fill the annular space between the heating element and the casing. The baffles may be made of an electrically insulative material such as a ceramic, or plastic. In some embodiments, the baffles may be made of fiberglass or silicon nitride. The baffles may position the heating element in the center of the casing.

The ball type baffle system and/or the circular baffle system may work better if a gas purge is introduced into the wellbore. The gas purge may maintain sufficient pressure in the wellbore to inhibit fluid flow from the heated portion of the formation into the wellbore. The gas purge may enhance heat exchange at the baffle system to help maintain a top portion of the baffle system colder than the lower portion of the baffle system.

The flow of production fluid up the well to the surface is desired for some types of wells, especially for production wells. Flow of production fluid up the well is also desirable for some heater wells that are used to control pressure in the formation. The overburden, or a conduit in the well used to transport formation fluid from the heated portion of the formation to the surface, may be heated to inhibit condensation on or in the conduit. Providing heat in the overburden, however, may be costly and/or may lead to increased cracking or coking of formation fluid as the formation fluid is being produced from the formation.

To avoid the need to heat the overburden or to heat the conduit passing through the overburden, one or more diverters may be placed in the wellbore to inhibit fluid from refluxing into the wellbore adjacent to the heated portion of the formation. In some embodiments, the diverter retains fluid above the heated portion of the formation. Fluids retained in the diverter may be removed from the diverter using a pump, gas lifting, and/or other fluid removal technique. In certain embodiments, two or more diverters that retain fluid above the heated portion of the formation may be located in the production well. Two or more diverters provide a simple way of separating initial fractions of condensed fluid produced from the in situ heat treatment system. A pump may be placed in each of the diverters to remove condensed fluid from the diverters.

In some embodiments, the diverter directs fluid to a sump below the heated portion of the formation. An inlet for a lift system may be located in the sump. In some embodiments, the intake of the lift system is located in casing in the sump. In some embodiments, the intake of the lift system is located in an open wellbore. The sump is below the heated portion of the formation. The intake of the pump may be located 1 m, 5 m, 10 m, 20 m or more below the deepest heater used to heat the heated portion of the formation. The sump may be at a cooler temperature than the heated portion of the formation. The sump may be more than 10° C., more than 50° C., more than 75° C., or more than 100° C. below the temperature of the heated portion of the formation. A portion of the fluid entering the sump may be liquid. A portion of the fluid entering the sump may condense within the sump. The lift system moves the fluid in the sump to the surface.

Production well lift systems may be used to efficiently transport formation fluid from the bottom of the production wells to the surface. Production well lift systems may provide and maintain the maximum required well drawdown (minimum reservoir producing pressure) and producing rates. The production well lift systems may operate efficiently over a wide range of high temperature/multiphase fluids (gas/vapor/steam/water/hydrocarbon liquids) and production rates expected during the life of a typical project. Production well lift systems may include dual concentric rod pump lift systems, chamber lift systems and other types of lift systems.

Temperature limited heaters may be in configurations and/or may include materials that provide automatic temperature limiting properties for the heater at certain temperatures. In certain embodiments, ferromagnetic materials are used in temperature limited heaters. Ferromagnetic material may self-limit temperature at or near the Curie temperature of the material to provide a reduced amount of heat at or near the Curie temperature when a time-varying current is applied to the material. In certain embodiments, the ferromagnetic material self-limits temperature of the temperature limited heater at a selected temperature that is approximately the Curie temperature. In certain embodiments, the selected temperature is within about 35° C., within about 25° C., within about 20° C., or within about 10° C. of the Curie temperature. In certain embodiments, ferromagnetic materials are coupled with other materials (for example, highly conductive materials, high strength materials, corrosion resistant materials, or combinations thereof) to provide various electrical and/or mechanical properties. Some parts of the temperature limited heater may have a lower resistance (caused by different geometries and/or by using different ferromagnetic and/or non-ferromagnetic materials) than other parts of the temperature limited heater. Having parts of the temperature limited heater with various materials and/or dimensions allows for tailoring the desired heat output from each part of the heater.

Temperature limited heaters may be more reliable than other heaters. Temperature limited heaters may be less apt to break down or fail due to hot spots in the formation. In some embodiments, temperature limited heaters allow for substantially uniform heating of the formation. In some embodiments, temperature limited heaters are able to heat the formation more efficiently by operating at a higher average heat output along the entire length of the heater. The temperature limited heater operates at the higher average heat output along the entire length of the heater because power to the heater does not have to be reduced to the entire heater, as is the case with typical constant wattage heaters, if a temperature along any point of the heater exceeds, or is about to exceed, a maximum operating temperature of the heater. Heat output from portions of a temperature limited heater approaching a Curie temperature of the heater automatically reduces without controlled adjustment of the time-varying current applied to the heater. The heat output automatically reduces due to changes in electrical properties (for example, electrical resistance) of portions of the temperature limited heater. Thus, more power is supplied by the temperature limited heater during a greater portion of a heating process.

In certain embodiments, the system including temperature limited heaters initially provides a first heat output and then provides a reduced (second heat output) heat output, near, at, or above the Curie temperature of an electrically resistive portion of the heater when the temperature limited heater is energized by a time-varying current. The first heat output is the heat output at temperatures below which the temperature limited heater begins to self-limit. In some embodiments, the first heat output is the heat output at a temperature about 50° C., about 75° C., about 100° C., or about 125° C. below the Curie temperature of the ferromagnetic material in the temperature limited heater.

The temperature limited heater may be energized by time-varying current (alternating current or modulated direct current) supplied at the wellhead. The wellhead may include a power source and other components (for example, modulation components, transformers, and/or capacitors) used in supplying power to the temperature limited heater. The temperature limited heater may be one of many heaters used to heat a portion of the formation.

In certain embodiments, the temperature limited heater includes a conductor that operates as a skin effect or proximity effect heater when time-varying current is applied to the conductor. The skin effect limits the depth of current penetration into the interior of the conductor. For ferromagnetic materials, the skin effect is dominated by the magnetic permeability of the conductor. The relative magnetic permeability of ferromagnetic materials is typically between 10 and 1000 (for example, the relative magnetic permeability of ferromagnetic materials is typically at least 10 and may be at least 50, 100, 500, 1000 or greater). As the temperature of the ferromagnetic material is raised above the Curie temperature and/or as the applied electrical current is increased, the magnetic permeability of the ferromagnetic material decreases substantially and the skin depth expands rapidly (for example, the skin depth expands as the inverse square root of the magnetic permeability). The reduction in magnetic permeability results in a decrease in the AC or modulated DC resistance of the conductor near, at, or above the Curie temperature and/or as the applied electrical current is increased. When the temperature limited heater is powered by a substantially constant current source, portions of the heater that approach, reach, or are above the Curie temperature may have reduced heat dissipation. Sections of the temperature limited heater that are not at or near the Curie temperature may be dominated by skin effect heating that allows the heater to have high heat dissipation due to a higher resistive load.

Curie temperature heaters have been used in soldering equipment, heaters for medical applications, and heating elements for ovens (for example, pizza ovens). Some of these uses are disclosed in U.S. Pat. No. 5,579,575 to Lamome et al.; U.S. Pat. No. 5,065,501 to Henschen et al.; and U.S. Pat. No. 5,512,732 to Yagnik et al., all of which are incorporated by reference as if fully set forth herein. U.S. Pat. No. 4,849,611 to Whitney et al., which is incorporated by reference as if fully set forth herein, describes a plurality of discrete, spaced-apart heating units including a reactive component, a resistive heating component, and a temperature responsive component.

An advantage of using the temperature limited heater to heat hydrocarbons in the formation is that the conductor is chosen to have a Curie temperature in a desired range of temperature operation. Operation within the desired operating temperature range allows substantial heat injection into the formation while maintaining the temperature of the temperature limited heater, and other equipment, below design limit temperatures. Design limit temperatures are temperatures at which properties such as corrosion, creep, and/or deformation are adversely affected. The temperature limiting properties of the temperature limited heater inhibit overheating or burnout of the heater adjacent to low thermal conductivity "hot spots" in the formation. In some embodiments, the temperature limited heater is able to lower or control heat output and/or withstand heat at temperatures above 25° C., 37° C., 100° C., 250° C., 500° C., 700° C., 800° C., 900° C., or higher up to 1131° C., depending on the materials used in the heater.

The temperature limited heater allows for more heat injection into the formation than constant wattage heaters because the energy input into the temperature limited heater does not have to be limited to accommodate low thermal conductivity regions adjacent to the heater. For example, in Green River oil shale there is a difference of at least a factor of 3 in the thermal conductivity of the lowest richness oil shale layers and the highest richness oil shale layers. When heating such a formation, substantially more heat is transferred to the formation with the temperature limited heater than with the conventional heater that is limited by the temperature at low thermal conductivity layers. The heat output along the entire length of the conventional heater needs to accommodate the low thermal conductivity layers so that the heater does not overheat at the low thermal conductivity layers and burn out. The heat output adjacent to the low thermal conductivity layers that are at high temperature will reduce for the temperature limited heater, but the remaining portions of the temperature limited heater that are not at high temperature will still provide high heat output. Because heaters for heating hydrocarbon formations typically have long lengths (for example, at least 10 m, 100 m, 300 m, 500 m, 1 km or more up to about 10 km), the majority of the length of the temperature limited heater may be operating below the Curie temperature while only a few portions are at or near the Curie temperature of the temperature limited heater.

The use of temperature limited heaters allows for efficient transfer of heat to the formation. Efficient transfer of heat allows for reduction in time needed to heat the formation to a desired temperature. For example, in Green River oil shale, pyrolysis typically requires 9.5 years to 10 years of heating when using a 12 m heater well spacing with conventional constant wattage heaters. For the same heater spacing, temperature limited heaters may allow a larger average heat output while maintaining heater equipment temperatures below equipment design limit temperatures. Pyrolysis in the formation may occur at an earlier time with the larger average heat output provided by temperature limited heaters than the lower average heat output provided by constant wattage heaters. For example, in Green River oil shale, pyrolysis may occur in 5 years using temperature limited heaters with a 12 m heater well spacing. Temperature limited heaters counteract hot spots due to inaccurate well spacing or drilling where heater wells come too close together. In certain embodiments, temperature limited heaters allow for increased power output over time for heater wells that have been spaced too far apart, or limit power output for heater wells that are spaced too close together. Temperature limited heaters also supply more power in regions adjacent the overburden and underburden to compensate for temperature losses in these regions.

Temperature limited heaters may be advantageously used in many types of formations. For example, in tar sands formations or relatively permeable formations containing heavy hydrocarbons, temperature limited heaters may be used to provide a controllable low temperature output for reducing the viscosity of fluids, mobilizing fluids, and/or enhancing the radial flow of fluids at or near the wellbore or in the formation. Temperature limited heaters may be used to inhibit excess coke formation due to overheating of the near wellbore region of the formation.

The use of temperature limited heaters, in some embodiments, eliminates or reduces the need for expensive temperature control circuitry. For example, the use of temperature limited heaters eliminates or reduces the need to perform temperature logging and/or the need to use fixed thermocouples on the heaters to monitor potential overheating at hot spots.

In certain embodiments, phase transformation (for example, crystalline phase transformation or a change in the crystal structure) of materials used in a temperature limited heater change the selected temperature at which the heater self-limits. Ferromagnetic material used in the temperature limited heater may have a phase transformation (for example, a transformation from ferrite to austenite) that decreases the magnetic permeability of the ferromagnetic material. This reduction in magnetic permeability is similar to reduction in magnetic permeability due to the magnetic transition of the ferromagnetic material at the Curie temperature. The Curie temperature is the magnetic transition temperature of the ferrite phase of the ferromagnetic material. The reduction in magnetic permeability results in a decrease in the AC or modulated DC resistance of the temperature limited heater near, at, or above the temperature of the phase transformation and/or the Curie temperature of the ferromagnetic material.

The phase transformation of the ferromagnetic material may occur over a temperature range. The temperature range of the phase transformation depends on the ferromagnetic material and may vary, for example, over a range of about 20° C. to a range of about 200° C. Because the phase transformation takes place over a temperature range, the reduction in the magnetic permeability due to the phase transformation takes place over the temperature range. The reduction in magnetic permeability may also occur irregularly over the temperature range of the phase transformation. In some embodiments, the phase transformation back to the lower temperature phase of the ferromagnetic material is slower than the phase transformation to the higher temperature phase (for example, the transition from austenite back to ferrite is slower than the transition from ferrite to austenite). The slower phase transformation back to the lower temperature phase may cause irregular operation of the heater at or near the phase transformation temperature range.

In some embodiments, the phase transformation temperature range overlaps with the reduction in the magnetic permeability when the temperature approaches the Curie temperature of the ferromagnetic material. The overlap may produce a slower drop in electrical resistance versus temperature than if the reduction in magnetic permeability is solely due to the temperature approaching the Curie temperature. The overlap may also produce irregular behavior of the temperature limited heater near the Curie temperature and/or in the phase transformation temperature range.

In certain embodiments, alloy additions are made to the ferromagnetic material to adjust the temperature range of the phase transformation. For example, adding carbon to the ferromagnetic material may increase the phase transformation temperature range and lower the onset temperature of the phase transformation. Adding titanium to the ferromagnetic material may increase the onset temperature of the phase transformation and decrease the phase transformation temperature range. Alloy compositions may be adjusted to provide desired Curie temperature and phase transformation properties for the ferromagnetic material. The alloy composition of the ferromagnetic material may be chosen based on desired properties for the ferromagnetic material (such as, but not limited to, magnetic permeability transition temperature or temperature range, resistance versus temperature profile, or power output). Addition of titanium may allow higher Curie temperatures to be obtained when adding cobalt to 410 stainless steel by raising the ferrite to austenite phase transformation temperature range to a temperature range that is above, or well above, the Curie temperature of the ferromagnetic material.

In certain embodiments, the temperature limited heater is deformation tolerant. Localized movement of material in the wellbore may result in lateral stresses on the heater that could deform its shape. Locations along a length of the heater at which the wellbore approaches or closes on the heater may be hot spots where a standard heater overheats and has the potential to burn out. These hot spots may lower the yield strength and creep strength of the metal, allowing crushing or deformation of the heater. The temperature limited heater may be formed with S curves (or other non-linear shapes) that accommodate deformation of the temperature limited heater without causing failure of the heater.

In some embodiments, temperature limited heaters are more economical to manufacture or make than standard heaters. Typical ferromagnetic materials include iron, carbon steel, or ferritic stainless steel. Such materials are inexpensive as compared to nickel-based heating alloys (such as nichrome, Kanthal™ (Bulten-Kanthal AB, Sweden), and/or LOHM™ (Driver-Harris Company, Harrison, N.J., U.S.A.)) typically used in insulated conductor (mineral insulated cable) heaters. In one embodiment of the temperature limited heater, the temperature limited heater is manufactured in continuous lengths as an insulated conductor heater to lower costs and improve reliability.

In some embodiments, the temperature limited heater is placed in the heater well using a coiled tubing rig. A heater that can be coiled on a spool may be manufactured by using metal such as ferritic stainless steel (for example, 409 stainless steel) that is welded using electrical resistance welding (ERW). To form a heater section, a metal strip from a roll is passed through a first former where it is shaped into a tubular and then longitudinally welded using ERW. The tubular is passed through a second former where a conductive strip (for example, a copper strip) is applied, drawn down tightly on the tubular through a die, and longitudinally welded using ERW. A sheath may be formed by longitudinally welding a support material (for example, steel such as 347H or 347HH) over the conductive strip material. The support material may be a strip rolled over the conductive strip material. An overburden section of the heater may be formed in a similar manner.

Figure 20:
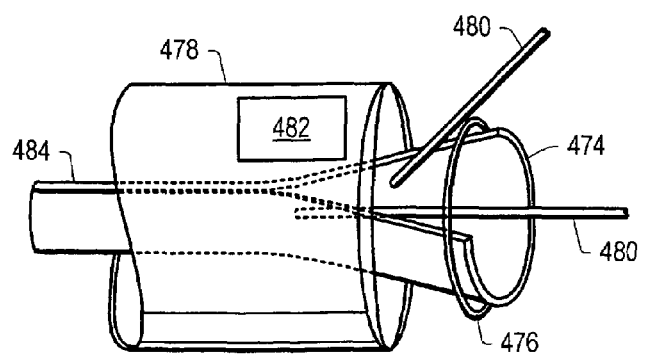
FIG. 20 depicts an embodiment of a device for longitudinal welding of a tubular using ERW.

FIG. 20 depicts an embodiment of a device for longitudinal welding of a tubular using ERW. Metal strip 474 is shaped into tubular form as it passes through ERW coil 476. Metal strip 474 is then welded into a tubular inside shield 478. As metal strip 474 is joined inside shield 478, inert gas (for example, argon or another suitable welding gas) is provided inside the forming tubular by gas inlets 480. Flushing the tubular with inert gas inhibits oxidation of the tubular as it is formed. Shield 478 may have window 482. Window 482 allows an operator to visually inspect the welding process. Tubular 484 is formed by the welding process.

In certain embodiments, the overburden section uses a non-ferromagnetic material such as 304 stainless steel or 316 stainless steel instead of a ferromagnetic material. The heater section and overburden section may be coupled using standard techniques such as butt welding using an orbital welder. In some embodiments, the overburden section material (the non-ferromagnetic material) may be pre-welded to the ferromagnetic material before rolling. The pre-welding may eliminate the need for a separate coupling step (for example, butt welding). In an embodiment, a flexible cable (for example, a furnace cable such as a MGT 1000 furnace cable) may be pulled through the center after forming the tubular heater. An end bushing on the flexible cable may be welded to the tubular heater to provide an electrical current return path. The tubular heater, including the flexible cable, may be coiled onto a spool before installation into a heater well. In an embodiment, the temperature limited heater is installed using the coiled tubing rig. The coiled tubing rig may place the temperature limited heater in a deformation resistant container in the formation. The deformation resistant container may be placed in the heater well using conventional methods.

Temperature limited heaters may be used for heating hydrocarbon formations including, but not limited to, oil shale formations, coal formations, tar sands formations, and formations with heavy viscous oils. Temperature limited heaters may also be used in the field of environmental remediation to vaporize or destroy soil contaminants. Embodiments of temperature limited heaters may be used to heat fluids in a wellbore or sub-sea pipeline to inhibit deposition of paraffin or various hydrates. In some embodiments, a temperature limited heater is used for solution mining a subsurface formation (for example, an oil shale or a coal formation). In certain embodiments, a fluid (for example, molten salt) is placed in a wellbore and heated with a temperature limited heater to inhibit deformation and/or collapse of the wellbore. In some embodiments, the temperature limited heater is attached to a sucker rod in the wellbore or is part of the sucker rod itself. In some embodiments, temperature limited heaters are used to heat a near wellbore region to reduce near wellbore oil viscosity during production of high viscosity crude oils and during transport of high viscosity oils to the surface. In some embodiments, a temperature limited heater enables gas lifting of a viscous oil by lowering the viscosity of the oil without coking the oil. Temperature limited heaters may be used in sulfur transfer lines to maintain temperatures between about 110° C. and about 130° C.

The ferromagnetic alloy or ferromagnetic alloys used in the temperature limited heater determine the Curie temperature of the heater. Curie temperature data for various metals is listed in "American Institute of Physics Handbook," Second Edition, McGraw-Hill, pages 5-170 through 5-176. Ferromagnetic conductors may include one or more of the ferromagnetic elements (iron, cobalt, and nickel) and/or alloys of these elements. In some embodiments, ferromagnetic conductors include iron-chromium (Fe—Cr) alloys that contain tungsten (W) (for example, HCM12A and SAVE12 (Sumitomo Metals Co., Japan) and/or iron alloys that contain chromium (for example, Fe—Cr alloys, Fe—Cr—W alloys, Fe—Cr—V (vanadium) alloys, and Fe—Cr—Nb (Niobium) alloys). Of the three main ferromagnetic elements, iron has a Curie temperature of approximately 770° C.; cobalt (Co) has a Curie temperature of approximately 1131° C.; and nickel has a Curie temperature of approximately 358° C. An iron-cobalt alloy has a Curie temperature higher than the Curie temperature of iron. For example, iron-cobalt alloy with 2% by weight cobalt has a Curie temperature of approximately 800° C.; iron-cobalt alloy with 12% by weight cobalt has a Curie temperature of approximately 900° C.; and iron-cobalt alloy with 20% by weight cobalt has a Curie temperature of approximately 950° C. Iron-nickel alloy has a Curie temperature lower than the Curie temperature of iron. For example, iron-nickel alloy with 20% by weight nickel has a Curie temperature of approximately 720° C., and iron-nickel alloy with 60% by weight nickel has a Curie temperature of approximately 560° C.

Some non-ferromagnetic elements used as alloys raise the Curie temperature of iron. For example, an iron-vanadium alloy with 5.9% by weight vanadium has a Curie temperature of approximately 815° C. Other non-ferromagnetic elements (for example, carbon, aluminum, copper, silicon, and/or chromium) may be alloyed with iron or other ferromagnetic materials to lower the Curie temperature. Non-ferromagnetic materials that raise the Curie temperature may be combined with non-ferromagnetic materials that lower the Curie temperature and alloyed with iron or other ferromagnetic materials to produce a material with a desired Curie temperature and other desired physical and/or chemical properties. In some embodiments, the Curie temperature material is a ferrite such as $NiFe_2O_4$. In other embodiments, the Curie temperature material is a binary compound such as $FeNi_3$ or $Fe_3Al$.

In some embodiments, the improved alloy includes carbon, cobalt, iron, manganese, silicon, or mixtures thereof. In certain embodiments, the improved alloy includes, by weight: about 0.1% to about 10% cobalt; about 0.1% carbon, about 0.5% manganese, about 0.5% silicon, with the balance being iron. In certain embodiments, the improved alloy includes, by weight: about 0.1% to about 10% cobalt; about 0.1% carbon, about 0.5% manganese, about 0.5% silicon, with the balance being iron.

In some embodiments, the improved alloy includes chromium, carbon, cobalt, iron, manganese, silicon, titanium, vanadium, or mixtures thereof. In certain embodiments, the improved alloy includes, by weight: about 5% to about 20% cobalt, about 0.1% carbon, about 0.5% manganese, about 0.5% silicon, about 0.1% to about 2% vanadium with the balance being iron. In some embodiments, the improved alloy includes, by weight: about 12% chromium, about 0.1% carbon, about 0.5% silicon, about 0.1% to about 0.5% manganese, above 0% to about 15% cobalt, above 0% to about 2% vanadium, above 0% to about 1% titanium, with the balance being iron. In some embodiments, the improved alloy includes, by weight: about 12% chromium, about 0.1% carbon, about 0.5% silicon, about 0.1% to about 0.5% manganese, above 0% to about 2% vanadium, above 0% to about 1% titanium, with the balance being iron. In some embodiments, the improved alloy includes, by weight: about 12% chromium, about 0.1% carbon, about 0.5% silicon, about 0.1% to about 0.5% manganese, above 0% to about 2% vanadium, with the balance being iron. In certain embodiments, the improved alloy includes, by weight: about 12% chromium, about 0.1% carbon, about 0.5% silicon, about 0.1% to about 0.5% manganese, above 0% to about 15% cobalt, above 0% to about 1% titanium, with the balance being iron. In certain embodiments, the improved alloy includes, by weight: about 12% chromium, about 0.1% carbon, about 0.5% silicon, about 0.1% to about 0.5% manganese, above 0% to about 15% cobalt, with the balance being iron. The addition of vanadium may allow for use of higher amounts of cobalt in the improved alloy.

Certain embodiments of temperature limited heaters may include more than one ferromagnetic material. Such embodiments are within the scope of embodiments described herein if any conditions described herein apply to at least one of the ferromagnetic materials in the temperature limited heater.

Ferromagnetic properties generally decay as the Curie temperature is approached. The "Handbook of Electrical Heating for Industry" by C. James Erickson (IEEE Press, 1995) shows a typical curve for 1% carbon steel (steel with 1% carbon by weight). The loss of magnetic permeability starts at temperatures above 650° C. and tends to be complete when temperatures exceed 730° C. Thus, the self-limiting temperature may be somewhat below the actual Curie temperature of the ferromagnetic conductor. The skin depth for current flow in 1% carbon steel is 0.132 cm at room temperature and increases to 0.445 cm at 720° C. From 720° C. to 730° C., the skin depth sharply increases to over 2.5 cm. Thus, a temperature limited heater embodiment using 1% carbon steel begins to self-limit between 650° C. and 730° C.

Skin depth generally defines an effective penetration depth of time-varying current into the conductive material. In general, current density decreases exponentially with distance from an outer surface to the center along the radius of the conductor. The depth at which the current density is approximately 1/e of the surface current density is called the skin depth. For a solid cylindrical rod with a diameter much greater than the penetration depth, or for hollow cylinders with a wall thickness exceeding the penetration depth, the skin depth, δ, is:

$$\delta = 1981.5 * (\rho/(\mu * f))^{1/2}; \qquad (3)$$

in which:

δ=skin depth in inches;
ρ=resistivity at operating temperature (ohm-cm);
μ=relative magnetic permeability; and
f=frequency (Hz).

EQN. 3 is obtained from "Handbook of Electrical Heating for Industry" by C. James Erickson (IEEE Press, 1995). For most metals, resistivity (ρ) increases with temperature. The relative magnetic permeability generally varies with temperature and with current. Additional equations may be used to assess the variance of magnetic permeability and/or skin depth on both temperature and/or current. The dependence of μ on current arises from the dependence of μ on the electromagnetic field.

Materials used in the temperature limited heater may be selected to provide a desired turndown ratio. Turndown ratios of at least 1.1:1, 2:1, 3:1, 4:1, 5:1, 10:1, 30:1, or 50:1 may be selected for temperature limited heaters. Larger turndown ratios may also be used. A selected turndown ratio may depend on a number of factors including, but not limited to, the type of formation in which the temperature limited heater is located (for example, a higher turndown ratio may be used for an oil shale formation with large variations in thermal conductivity between rich and lean oil shale layers) and/or a temperature limit of materials used in the wellbore (for example, temperature limits of heater materials). In some embodiments, the turndown ratio is increased by coupling additional copper or another good electrical conductor to the ferromagnetic material (for example, adding copper to lower the resistance above the Curie temperature).

The temperature limited heater may provide a maximum heat output (power output) below the Curie temperature of the heater. In certain embodiments, the maximum heat output is at least 400 W/m (Watts per meter), 600 W/m, 700 W/m, 800 W/m, or higher up to 2000 W/m. The temperature limited heater reduces the amount of heat output by a section of the heater when the temperature of the section of the heater approaches or is above the Curie temperature. The reduced amount of heat may be substantially less than the heat output below the Curie temperature. In some embodiments, the reduced amount of heat is at most 400 W/m, 200 W/m, 100 W/m or may approach 0 W/m.

In certain embodiments, the temperature limited heater operates substantially independently of the thermal load on the heater in a certain operating temperature range. "Thermal load" is the rate that heat is transferred from a heating system to its surroundings. It is to be understood that the thermal load may vary with temperature of the surroundings and/or the thermal conductivity of the surroundings. In an embodiment, the temperature limited heater operates at or above the Curie temperature of the temperature limited heater such that the operating temperature of the heater increases at most by 3° C., 2° C., 1.5° C., 1° C., or 0.5° C. for a decrease in thermal load of 1 W/m proximate to a portion of the heater. In certain embodiments, the temperature limited heater operates in such a manner at a relatively constant current.

The AC or modulated DC resistance and/or the heat output of the temperature limited heater may decrease as the temperature approaches the Curie temperature and decrease sharply near or above the Curie temperature due to the Curie effect. In certain embodiments, the value of the electrical resistance or heat output above or near the Curie temperature is at most one-half of the value of electrical resistance or heat output at a certain point below the Curie temperature. In some embodiments, the heat output above or near the Curie temperature is at most 90%, 70%, 50%, 30%, 20%, 10%, or less (down to 1%) of the heat output at a certain point below the Curie temperature (for example, 30° C. below the Curie temperature, 40° C. below the Curie temperature, 50° C. below the Curie temperature, or 100° C. below the Curie temperature). In certain embodiments, the electrical resistance above or near the Curie temperature decreases to 80%, 70%, 60%, 50%, or less (down to 1%) of the electrical resistance at a certain point below the Curie temperature (for example, 30° C. below the Curie temperature, 40° C. below the Curie temperature, 50° C. below the Curie temperature, or 100° C. below the Curie temperature).

In some embodiments, AC frequency is adjusted to change the skin depth of the ferromagnetic material. For example, the skin depth of 1% carbon steel at room temperature is 0.132 cm at 60 Hz, 0.0762 cm at 180 Hz, and 0.046 cm at 440 Hz. Since heater diameter is typically larger than twice the skin depth, using a higher frequency (and thus a heater with a smaller diameter) reduces heater costs. For a fixed geometry, the higher frequency results in a higher turndown ratio. The turndown ratio at a higher frequency is calculated by multiplying the turndown ratio at a lower frequency by the square root of the higher frequency divided by the lower frequency. In some embodiments, a frequency between 100 Hz and 1000 Hz, between 140 Hz and 200 Hz, or between 400 Hz and 600 Hz is used (for example, 180 Hz, 540 Hz, or 720 Hz). In some embodiments, high frequencies may be used. The frequencies may be greater than 1000 Hz.

To maintain a substantially constant skin depth until the Curie temperature of the temperature limited heater is reached, the heater may be operated at a lower frequency when the heater is cold and operated at a higher frequency when the heater is hot. Line frequency heating is generally favorable, however, because there is less need for expensive components such as power supplies, transformers, or current modulators that alter frequency. Line frequency is the frequency of a general supply of current. Line frequency is typically 60 Hz, but may be 50 Hz or another frequency depending on the source for the supply of the current. Higher frequencies may be produced using commercially available equipment such as solid state variable frequency power supplies. Transformers that convert three-phase power to single-phase power with three times the frequency are commercially available. For example, high voltage three-phase power at 60 Hz may be transformed to single-phase power at 180 Hz and at a lower voltage. Such transformers are less expensive and more energy efficient than solid state variable frequency power supplies. In certain embodiments, transformers that convert three-phase power to single-phase power are used to increase the frequency of power supplied to the temperature limited heater.

In certain embodiments, modulated DC (for example, chopped DC, waveform modulated DC, or cycled DC) may be used for providing electrical power to the temperature limited heater. A DC modulator or DC chopper may be coupled to a DC power supply to provide an output of modulated direct current. In some embodiments, the DC power supply may include means for modulating DC. One example of a DC modulator is a DC-to-DC converter system. DC-to-DC converter systems are generally known in the art. DC is typically modulated or chopped into a desired waveform. Waveforms for DC modulation include, but are not limited to, square-wave, sinusoidal, deformed sinusoidal, deformed square-wave, triangular, and other regular or irregular waveforms.

The modulated DC waveform generally defines the frequency of the modulated DC. Thus, the modulated DC waveform may be selected to provide a desired modulated DC frequency. The shape and/or the rate of modulation (such as the rate of chopping) of the modulated DC waveform may be varied to vary the modulated DC frequency. DC may be modulated at frequencies that are higher than generally available AC frequencies. For example, modulated DC may be provided at frequencies of at least 1000 Hz. Increasing the frequency of supplied current to higher values advantageously increases the turndown ratio of the temperature limited heater.

In certain embodiments, the modulated DC waveform is adjusted or altered to vary the modulated DC frequency. The DC modulator may be able to adjust or alter the modulated DC waveform at any time during use of the temperature limited heater and at high currents or voltages. Thus, modulated DC provided to the temperature limited heater is not limited to a single frequency or even a small set of frequency values. Waveform selection using the DC modulator typically allows for a wide range of modulated DC frequencies and for discrete control of the modulated DC frequency. Thus, the modulated DC frequency is more easily set at a distinct value whereas AC frequency is generally limited to multiples of the line frequency. Discrete control of the modulated DC frequency allows for more selective control over the turndown ratio of the temperature limited heater. Being able to selectively control the turndown ratio of the temperature limited heater allows for a broader range of materials to be used in designing and constructing the temperature limited heater.

In some embodiments, the modulated DC frequency or the AC frequency is adjusted to compensate for changes in properties (for example, subsurface conditions such as temperature or pressure) of the temperature limited heater during use. The modulated DC frequency or the AC frequency provided to the temperature limited heater is varied based on assessed downhole conditions. For example, as the temperature of the temperature limited heater in the wellbore increases, it may be advantageous to increase the frequency of the current provided to the heater, thus increasing the turndown ratio of the heater. In an embodiment, the downhole temperature of the temperature limited heater in the wellbore is assessed.

In certain embodiments, the modulated DC frequency, or the AC frequency, is varied to adjust the turndown ratio of the temperature limited heater. The turndown ratio may be adjusted to compensate for hot spots occurring along a length of the temperature limited heater. For example, the turndown ratio is increased because the temperature limited heater is getting too hot in certain locations. In some embodiments, the modulated DC frequency, or the AC frequency, are varied to adjust a turndown ratio without assessing a subsurface condition.

At or near the Curie temperature of the ferromagnetic material, a relatively small change in voltage may cause a relatively large change in current to the load. The relatively small change in voltage may produce problems in the power supplied to the temperature limited heater, especially at or near the Curie temperature. The problems include, but are not limited to, reducing the power factor, tripping a circuit breaker, and/or blowing a fuse. In some cases, voltage changes may be caused by a change in the load of the temperature limited heater. In certain embodiments, an electrical current supply (for example, a supply of modulated DC or AC) provides a relatively constant amount of current that does not substantially vary with changes in load of the temperature limited heater. In an embodiment, the electrical current supply provides an amount of electrical current that remains within 15%, within 10%, within 5%, or within 2% of a selected constant current value when a load of the temperature limited heater changes.

Temperature limited heaters may generate an inductive load. The inductive load is due to some applied electrical current being used by the ferromagnetic material to generate a magnetic field in addition to generating a resistive heat output. As downhole temperature changes in the temperature limited heater, the inductive load of the heater changes due to changes in the ferromagnetic properties of ferromagnetic materials in the heater with temperature. The inductive load of the temperature limited heater may cause a phase shift between the current and the voltage applied to the heater.

A reduction in actual power applied to the temperature limited heater may be caused by a time lag in the current waveform (for example, the current has a phase shift relative to the voltage due to an inductive load) and/or by distortions in the current waveform (for example, distortions in the current waveform caused by introduced harmonics due to a non-linear load). Thus, it may take more current to apply a selected amount of power due to phase shifting or waveform distortion. The ratio of actual power applied and the apparent power that would have been transmitted if the same current were in phase and undistorted is the power factor. The power factor is always less than or equal to 1. The power factor is 1 when there is no phase shift or distortion in the waveform.

Actual power applied to a heater due to a phase shift may be described by EQN. 4:

$$P = I \times V \times \cos(\theta); \qquad (4)$$

in which P is the actual power applied to a heater; I is the applied current; V is the applied voltage; and θ is the phase angle difference between voltage and current. Other phenomena such as waveform distortion may contribute to further lowering of the power factor. If there is no distortion in the waveform, then cos(θ) is equal to the power factor.

In certain embodiments, the temperature limited heater includes an inner conductor inside an outer conductor. The inner conductor and the outer conductor are radially disposed about a central axis. The inner and outer conductors may be separated by an insulation layer. In certain embodiments, the inner and outer conductors are coupled at the bottom of the temperature limited heater. Electrical current may flow into the temperature limited heater through the inner conductor and return through the outer conductor. One or both conductors may include ferromagnetic material.

The insulation layer may comprise an electrically insulating ceramic with high thermal conductivity, such as magnesium oxide, aluminum oxide, silicon dioxide, beryllium oxide, boron nitride, silicon nitride, or combinations thereof. The insulating layer may be a compacted powder (for example, compacted ceramic powder). Compaction may improve thermal conductivity and provide better insulation resistance. For lower temperature applications, polymer insulation made from, for example, fluoropolymers, polyimides, polyamides, and/or polyethylenes, may be used. In some embodiments, the polymer insulation is made of perfluoroalkoxy (PFA) or polyetheretherketone (PEEK™ (Victrex Ltd, England)). The insulating layer may be chosen to be substantially infrared transparent to aid heat transfer from the inner conductor to the outer conductor. In an embodiment, the insulating layer is transparent quartz sand. The insulation layer may be air or a non-reactive gas such as helium, nitrogen, or sulfur hexafluoride. If the insulation layer is air or a non-reactive gas, there may be insulating spacers designed to inhibit electrical contact between the inner conductor and the outer conductor. The insulating spacers may be made of, for example, high purity aluminum oxide or another thermally conducting, electrically insulating material such as silicon nitride. The insulating spacers may be a fibrous ceramic material such as Nextel™ 312 (3M Corporation, St. Paul, Minn., U.S.A.), mica tape, or glass fiber. Ceramic material may be made of alumina, alumina-silicate, alumina-borosilicate, silicon nitride, boron nitride, or other materials.

The insulation layer may be flexible and/or substantially deformation tolerant. For example, if the insulation layer is a solid or compacted material that substantially fills the space between the inner and outer conductors, the temperature limited heater may be flexible and/or substantially deformation tolerant. Forces on the outer conductor can be transmitted through the insulation layer to the solid inner conductor, which may resist crushing. Such a temperature limited heater may be bent, dog-legged, and spiraled without causing the outer conductor and the inner conductor to electrically short to each other. Deformation tolerance may be important if the wellbore is likely to undergo substantial deformation during heating of the formation.

In certain embodiments, an outermost layer of the temperature limited heater (for example, the outer conductor) is chosen for corrosion resistance, yield strength, and/or creep resistance. In one embodiment, austenitic (non-ferromagnetic) stainless steels such as 201, 304H, 347H, 347HH, 316H, 310H, 347HP, NF709 (Nippon Steel Corp., Japan) stainless steels, or combinations thereof may be used in the outer conductor. The outermost layer may also include a clad conductor. For example, a corrosion resistant alloy such as 800H or 347H stainless steel may be clad for corrosion protection over a ferromagnetic carbon steel tubular. If high temperature strength is not required, the outermost layer may be constructed from ferromagnetic metal with good corrosion resistance such as one of the ferritic stainless steels. In one embodiment, a ferritic alloy of 82.3% by weight iron with 17.7% by weight chromium (Curie temperature of 678° C.) provides desired corrosion resistance.

The Metals Handbook, vol. 8, page 291 (American Society of Materials (ASM)) includes a graph of Curie temperature of iron-chromium alloys versus the amount of chromium in the alloys. In some temperature limited heater embodiments, a separate support rod or tubular (made from 347H stainless steel) is coupled to the temperature limited heater made from an iron-chromium alloy to provide yield strength and/or creep resistance. In certain embodiments, the support material and/or the ferromagnetic material is selected to provide a 100,000 hour creep-rupture strength of at least 20.7 MPa at 650° C. In some embodiments, the 100,000 hour creep-rupture strength is at least 13.8 MPa at 650° C. or at least 6.9 MPa at 650° C. For example, 347H steel has a favorable creep-rupture strength at or above 650° C. In some embodiments, the 100,000 hour creep-rupture strength ranges from 6.9 MPa to 41.3 MPa or more for longer heaters and/or higher earth or fluid stresses.

In temperature limited heater embodiments with both an inner ferromagnetic conductor and an outer ferromagnetic conductor, the skin effect current path occurs on the outside of the inner conductor and on the inside of the outer conductor. Thus, the outside of the outer conductor may be clad with the corrosion resistant alloy, such as stainless steel, without affecting the skin effect current path on the inside of the outer conductor.

A ferromagnetic conductor with a thickness of at least the skin depth at the Curie temperature allows a substantial decrease in resistance of the ferromagnetic material as the skin depth increases sharply near the Curie temperature. In certain embodiments when the ferromagnetic conductor is not clad with a highly conducting material such as copper, the thickness of the conductor may be 1.5 times the skin depth near the Curie temperature, 3 times the skin depth near the Curie temperature, or even 10 or more times the skin depth near the Curie temperature. If the ferromagnetic conductor is clad with copper, thickness of the ferromagnetic conductor may be substantially the same as the skin depth near the Curie temperature. In some embodiments, the ferromagnetic conductor clad with copper has a thickness of at least three-fourths of the skin depth near the Curie temperature.

In certain embodiments, the temperature limited heater includes a composite conductor with a ferromagnetic tubular and a non-ferromagnetic, high electrical conductivity core. The non-ferromagnetic, high electrical conductivity core reduces a required diameter of the conductor. For example, the conductor may be composite 1.19 cm diameter conductor with a core of 0.575 cm diameter copper clad with a 0.298 cm thickness of ferritic stainless steel or carbon steel surrounding the core. The core or non-ferromagnetic conductor may be copper or copper alloy. The core or non-ferromagnetic conductor may also be made of other metals that exhibit low electrical resistivity and relative magnetic permeabilities near 1 (for example, substantially non-ferromagnetic materials such as aluminum and aluminum alloys, phosphor bronze, beryllium copper, and/or brass). A composite conductor allows the electrical resistance of the temperature limited heater to decrease more steeply near the Curie temperature. As the skin depth increases near the Curie temperature to include the copper core, the electrical resistance decreases very sharply.

The composite conductor may increase the conductivity of the temperature limited heater and/or allow the heater to operate at lower voltages. In an embodiment, the composite conductor exhibits a relatively flat resistance versus temperature profile at temperatures below a region near the Curie temperature of the ferromagnetic conductor of the composite conductor. In some embodiments, the temperature limited heater exhibits a relatively flat resistance versus temperature profile between 100° C. and 750° C. or between 300° C. and 600° C. The relatively flat resistance versus temperature profile may also be exhibited in other temperature ranges by adjusting, for example, materials and/or the configuration of materials in the temperature limited heater. In certain embodiments, the relative thickness of each material in the composite conductor is selected to produce a desired resistivity versus temperature profile for the temperature limited heater.

In certain embodiments, the relative thickness of each material in a composite conductor is selected to produce a desired resistivity versus temperature profile for a temperature limited heater. In an embodiment, the composite conductor is an inner conductor surrounded by 0.127 cm thick magnesium oxide powder as an insulator. The outer conductor may be 304H stainless steel with a wall thickness of 0.127 cm. The outside diameter of the heater may be about 1.65 cm.

A composite conductor (for example, a composite inner conductor or a composite outer conductor) may be manufactured by methods including, but not limited to, coextrusion, roll forming, tight fit tubing (for example, cooling the inner member and heating the outer member, then inserting the inner member in the outer member, followed by a drawing operation and/or allowing the system to cool), explosive or electromagnetic cladding, arc overlay welding, longitudinal strip welding, plasma powder welding, billet coextrusion, electroplating, drawing, sputtering, plasma deposition, coextrusion casting, magnetic forming, molten cylinder casting (of inner core material inside the outer or vice versa), insertion followed by welding or high temperature braising, shielded active gas welding (SAG), and/or insertion of an inner pipe in an outer pipe followed by mechanical expansion of the inner pipe by hydroforming or use of a pig to expand and swage the inner pipe against the outer pipe. In some embodiments, a ferromagnetic conductor is braided over a non-ferromagnetic conductor. In certain embodiments, composite conductors are formed using methods similar to those used for cladding (for example, cladding copper to steel). A metallurgical bond between copper cladding and base ferromagnetic material may be advantageous. Composite conductors produced by a coextrusion process that forms a good metallurgical bond (for example, a good bond between copper and 446 stainless steel) may be provided by Anomet Products, Inc. (Shrewsbury, Mass., U.S.A.).

FIGS. 21-42 depict various embodiments of temperature limited heaters. One or more features of an embodiment of the temperature limited heater depicted in any of these figures may be combined with one or more features of other embodiments of temperature limited heaters depicted in these figures. In certain embodiments described herein, temperature limited heaters are dimensioned to operate at a frequency of 60 Hz AC. It is to be understood that dimensions of the temperature limited heater may be adjusted from those described herein to operate in a similar manner at other AC frequencies or with modulated DC current.

Figure 23:
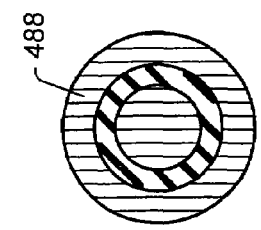
FIGS. 21, 22, and 23 depict cross-sectional representations of an embodiment of a temperature limited heater with an outer conductor having a ferromagnetic section and a non-ferromagnetic section.
Figure 21:
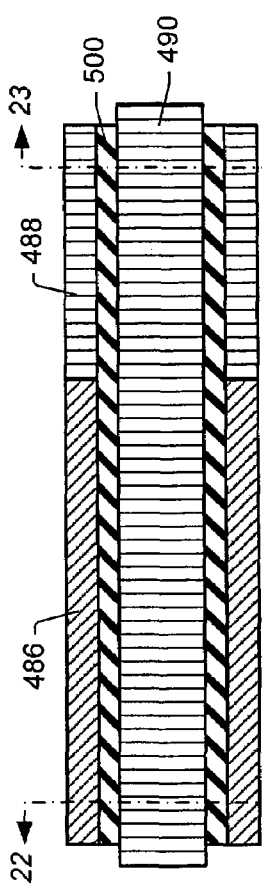
Figure 22:
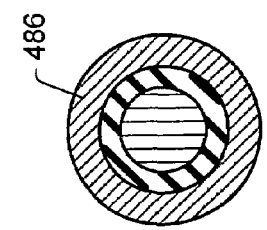

FIG. 21 depicts a cross-sectional representation of an embodiment of the temperature limited heater with an outer conductor having a ferromagnetic section and a non-ferromagnetic section. FIGS. 22 and 23 depict transverse cross-sectional views of the embodiment shown in FIG. 21. In one embodiment, ferromagnetic section 486 is used to provide heat to hydrocarbon layers in the formation. Non-ferromagnetic section 488 is used in the overburden of the formation. Non-ferromagnetic section 488 provides little or no heat to the overburden, thus inhibiting heat losses in the overburden and improving heater efficiency. Ferromagnetic section 486 includes a ferromagnetic material such as 409 stainless steel or 410 stainless steel. Ferromagnetic section 486 has a thickness of 0.3 cm. Non-ferromagnetic section 488 is copper with a thickness of 0.3 cm. Inner conductor 490 is copper. Inner conductor 490 has a diameter of 0.9 cm. Electrical insulator 500 is silicon nitride, boron nitride, magnesium oxide powder, or another suitable insulator material. Electrical insulator 500 has a thickness of 0.1 cm to 0.3 cm.

Figure 26:
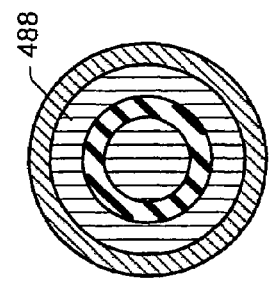
FIGS. 24, 25, 26, and 27 depict cross-sectional representations of an embodiment of a temperature limited heater with an outer conductor having a ferromagnetic section and a non-ferromagnetic section placed inside a sheath.
Figure 24:
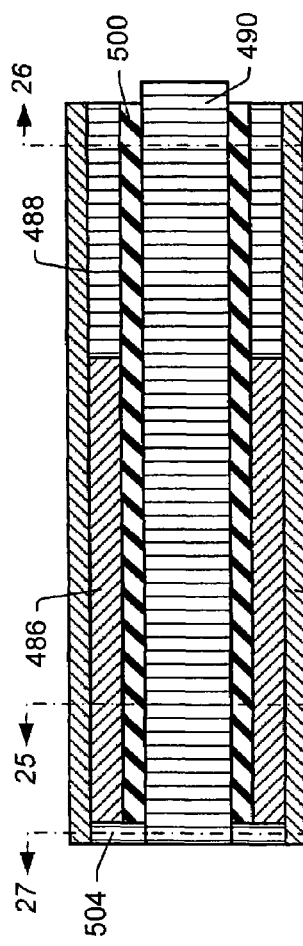
Figures 25, 27:
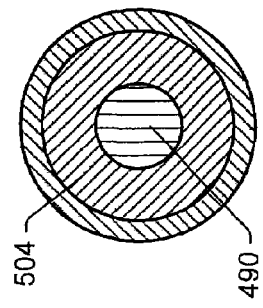

FIG. 24 depicts a cross-sectional representation of an embodiment of the temperature limited heater with an outer conductor having a ferromagnetic section and a non-ferromagnetic section placed inside a sheath. FIGS. 25, 26, and 27 depict transverse cross-sectional views of the embodiment shown in FIG. 24. Ferromagnetic section 486 is 410 stainless steel with a thickness of 0.6 cm. Non-ferromagnetic section 488 is copper with a thickness of 0.6 cm. Inner conductor 490 is copper with a diameter of 0.9 cm. Outer conductor 502 includes ferromagnetic material. Outer conductor 502 provides some heat in the overburden section of the heater. Providing some heat in the overburden inhibits condensation or refluxing of fluids in the overburden. Outer conductor 502 is 409, 410, or 446 stainless steel with an outer diameter of 3.0 cm and a thickness of 0.6 cm. Electrical insulator 500 includes compacted magnesium oxide powder with a thickness of 0.3 cm. In some embodiments, electrical insulator 500 includes silicon nitride, boron nitride, or hexagonal type boron nitride. Conductive section 504 may couple inner conductor 490 with ferromagnetic section 486 and/or outer conductor 502.

FIG. 28A and FIG. 28B depict cross-sectional representations of an embodiment of a temperature limited heater with a ferromagnetic inner conductor. Inner conductor 490 is a 1" Schedule XXS 446 stainless steel pipe. In some embodiments, inner conductor 490 includes 409 stainless steel, 410 stainless steel, Invar 36, alloy 42-6, alloy 52, or other ferromagnetic materials. Inner conductor 490 has a diameter of 2.5 cm. Electrical insulator 500 includes compacted silicon nitride, boron nitride, or magnesium oxide powders; or polymers, Nextel ceramic fiber, mica, or glass fibers. Outer conductor 502 is copper or any other non-ferromagnetic material, such as but not limited to copper alloys, aluminum and/or aluminum alloys. Outer conductor 502 is coupled to jacket 506. Jacket 506 is 304H, 316H, or 347H stainless steel. In this embodiment, a majority of the heat is produced in inner conductor 490.

FIG. 29A and FIG. 29B depict cross-sectional representations of an embodiment of a temperature limited heater with a ferromagnetic inner conductor and a non-ferromagnetic core. Inner conductor 490 may be made of 446 stainless steel, 409 stainless steel, 410 stainless steel, carbon steel, Armco ingot iron, iron-cobalt alloys, or other ferromagnetic materials. Core 508 may be tightly bonded inside inner conductor 490. Core 508 is copper or other non-ferromagnetic material. In certain embodiments, core 508 is inserted as a tight fit inside inner conductor 490 before a drawing operation. In some embodiments, core 508 and inner conductor 490 are coextrusion bonded. Outer conductor 502 is 347H stainless steel. A drawing or rolling operation to compact electrical insulator 500 (for example, compacted silicon nitride, boron nitride, or magnesium oxide powder) may ensure good electrical contact between inner conductor 490 and core 508. In this embodiment, heat is produced primarily in inner conductor 490 until the Curie temperature is approached. Resistance then decreases sharply as current penetrates core 508.

FIG. 30A and FIG. 30B depict cross-sectional representations of an embodiment of a temperature limited heater with a ferromagnetic outer conductor. Inner conductor 490 is nickel-clad copper. Electrical insulator 500 is silicon nitride, boron nitride, or magnesium oxide. Outer conductor 502 is a 1" Schedule XXS carbon steel pipe. In this embodiment, heat is produced primarily in outer conductor 502, resulting in a small temperature differential across electrical insulator 500.

FIG. 31A and FIG. 31B depict cross-sectional representations of an embodiment of a temperature limited heater with a ferromagnetic outer conductor that is clad with a corrosion resistant alloy. Inner conductor 490 is copper. Outer conductor 502 is a 1" Schedule XXS carbon steel pipe. Outer conductor 502 is coupled to jacket 506. Jacket 506 is made of corrosion resistant material (for example, 347H stainless steel). Jacket 506 provides protection from corrosive fluids in the wellbore (for example, sulfidizing and carburizing gases). Heat is produced primarily in outer conductor 502, resulting in a small temperature differential across electrical insulator 500.

FIG. 32A and FIG. 32B depict cross-sectional representations of an embodiment of a temperature limited heater with a ferromagnetic outer conductor. The outer conductor is clad with a conductive layer and a corrosion resistant alloy. Inner conductor 490 is copper. Electrical insulator 500 is silicon nitride, boron nitride, or magnesium oxide. Outer conductor 502 is a 1" Schedule 80 446 stainless steel pipe. Outer conductor 502 is coupled to jacket 506. Jacket 506 is made from corrosion resistant material such as 347H stainless steel. In an embodiment, conductive layer 510 is placed between outer conductor 502 and jacket 506. Conductive layer 510 is a copper layer. Heat is produced primarily in outer conductor 502, resulting in a small temperature differential across electrical insulator 500. Conductive layer 510 allows a sharp decrease in the resistance of outer conductor 502 as the outer conductor approaches the Curie temperature. Jacket 506 provides protection from corrosive fluids in the wellbore.

In some embodiments, the conductor (for example, an inner conductor, an outer conductor, or a ferromagnetic conductor) is the composite conductor that includes two or more different materials. In certain embodiments, the composite conductor includes two or more ferromagnetic materials. In some embodiments, the composite ferromagnetic conductor includes two or more radially disposed materials. In certain embodiments, the composite conductor includes a ferromagnetic conductor and a non-ferromagnetic conductor. In some embodiments, the composite conductor includes the ferromagnetic conductor placed over a non-ferromagnetic core. Two or more materials may be used to obtain a relatively flat electrical resistivity versus temperature profile in a temperature region below the Curie temperature and/or a sharp decrease (a high turndown ratio) in the electrical resistivity at or near the Curie temperature. In some cases, two or more materials are used to provide more than one Curie temperature for the temperature limited heater.

The composite electrical conductor may be used as the conductor in any electrical heater embodiment described herein. For example, the composite conductor may be used as the conductor in a conductor-in-conduit heater or an insulated conductor heater. In certain embodiments, the composite conductor may be coupled to a support member such as a support conductor. The support member may be used to provide support to the composite conductor so that the composite conductor is not relied upon for strength at or near the Curie temperature. The support member may be useful for heaters of lengths of at least 100 m. The support member may be a non-ferromagnetic member that has good high temperature creep strength. Examples of materials that are used for a support member include, but are not limited to, Haynes® 625 alloy and Haynes® HR120® alloy (Haynes International, Kokomo, Ind., U.S.A.), NF709, Incoloy® 800H alloy and 347HP alloy (Allegheny Ludlum Corp., Pittsburgh, Pa., U.S.A.). In some embodiments, materials in a composite conductor are directly coupled (for example, brazed, metallurgically bonded, or swaged) to each other and/or the support member. Using a support member may reduce the need for the ferromagnetic member to provide support for the temperature limited heater, especially at or near the Curie temperature. Thus, the temperature limited heater may be designed with more flexibility in the selection of ferromagnetic materials.

FIG. 33 depicts a cross-sectional representation of an embodiment of the composite conductor with the support member. Core 508 is surrounded by ferromagnetic conductor 512 and support member 514. In some embodiments, core 508, ferromagnetic conductor 512, and support member 514 are directly coupled (for example, brazed together or metallurgically bonded together). In one embodiment, core 508 is copper, ferromagnetic conductor 512 is 446 stainless steel, and support member 514 is 347H alloy. In certain embodiments, support member 514 is a Schedule 80 pipe. Support member 514 surrounds the composite conductor having ferromagnetic conductor 512 and core 508. Ferromagnetic conductor 512 and core 508 may be joined to form the composite conductor by, for example, a coextrusion process. For example, the composite conductor is a 1.9 cm outside diameter 446 stainless steel ferromagnetic conductor surrounding a 0.95 cm diameter copper core.

In certain embodiments, the diameter of core 508 is adjusted relative to a constant outside diameter of ferromagnetic conductor 512 to adjust the turndown ratio of the temperature limited heater. For example, the diameter of core 508 may be increased to 1.14 cm while maintaining the outside diameter of ferromagnetic conductor 512 at 1.9 cm to increase the turndown ratio of the heater.

In some embodiments, conductors (for example, core 508 and ferromagnetic conductor 512) in the composite conductor are separated by support member 514. FIG. 34 depicts a cross-sectional representation of an embodiment of the composite conductor with support member 514 separating the conductors. In one embodiment, core 508 is copper with a diameter of 0.95 cm, support member 514 is 347H alloy with an outside diameter of 1.9 cm, and ferromagnetic conductor 512 is 446 stainless steel with an outside diameter of 2.7 cm. The support member depicted in FIG. 34 has a lower creep strength relative to the support members depicted in FIG. 33.

In certain embodiments, support member 514 is located inside the composite conductor. FIG. 35 depicts a cross-sectional representation of an embodiment of the composite conductor surrounding support member 514. Support member 514 is made of 347H alloy. Inner conductor 490 is copper. Ferromagnetic conductor 512 is 446 stainless steel. In one embodiment, support member 514 is 1.25 cm diameter 347H alloy, inner conductor 490 is 1.9 cm outside diameter copper, and ferromagnetic conductor 512 is 2.7 cm outside diameter 446 stainless steel. The turndown ratio is higher than the turndown ratio for the embodiments depicted in FIGS. 33, 34, and 36 for the same outside diameter, but the creep strength is lower.

In some embodiments, the thickness of inner conductor 490, which is copper, is reduced and the thickness of support member 514 is increased to increase the creep strength at the expense of reduced turndown ratio. For example, the diameter of support member 514 is increased to 1.6 cm while maintaining the outside diameter of inner conductor 490 at 1.9 cm to reduce the thickness of the conduit. This reduction in thickness of inner conductor 490 results in a decreased turndown ratio relative to the thicker inner conductor embodiment but an increased creep strength.

In one embodiment, support member 514 is a conduit (or pipe) inside inner conductor 490 and ferromagnetic conductor 512. FIG. 36 depicts a cross-sectional representation of an embodiment of the composite conductor surrounding support member 514. In one embodiment, support member 514 is 347H alloy with a 0.63 cm diameter center hole. In some embodiments, support member 514 is a preformed conduit. In certain embodiments, support member 514 is formed by having a dissolvable material (for example, copper dissolvable by nitric acid) located inside the support member during formation of the composite conductor. The dissolvable material is dissolved to form the hole after the conductor is assembled. In an embodiment, support member 514 is 347H alloy with an inside diameter of 0.63 cm and an outside diameter of 1.6 cm, inner conductor 490 is copper with an outside diameter of 1.8 cm, and ferromagnetic conductor 512 is 446 stainless steel with an outside diameter of 2.7 cm.

In certain embodiments, the composite electrical conductor is used as the conductor in the conductor-in-conduit heater. For example, the composite electrical conductor may be used as conductor 516 in FIG. 37 FIG. 37 depicts a cross-sectional representation of an embodiment of the conductor-in-conduit heater. Conductor 516 is disposed in conduit 518. Conductor 516 is a rod or conduit of electrically conductive material. Low resistance sections 520 are present at both ends of conductor 516 to generate less heating in these sections. Low resistance section 520 is formed by having a greater cross-sectional area of conductor 516 in that section, or the sections are made of material having less resistance. In certain embodiments, low resistance section 520 includes a low resistance conductor coupled to conductor 516.

Conduit 518 is made of an electrically conductive material. Conduit 518 is disposed in opening 522 in hydrocarbon layer 460. Opening 522 has a diameter that accommodates conduit 518.

Conductor 516 may be centered in conduit 518 by centralizers 524. Centralizers 524 electrically isolate conductor 516 from conduit 518. Centralizers 524 inhibit movement and properly locate conductor 516 in conduit 518. Centralizers 524 are made of ceramic material or a combination of ceramic and metallic materials. Centralizers 524 inhibit deformation of conductor 516 in conduit 518. Centralizers 524 are touching or spaced at intervals between approximately 0.1 m (meters) and approximately 3 m or more along conductor 516.

A second low resistance section 520 of conductor 516 may couple conductor 516 to wellhead 450, as depicted in FIG. 37. Electrical current may be applied to conductor 516 from power cable 526 through low resistance section 520 of conductor 516. Electrical current passes from conductor 516 through sliding connector 528 to conduit 518. Conduit 518 may be electrically insulated from overburden casing 530 and from wellhead 450 to return electrical current to power cable 526. Heat may be generated in conductor 516 and conduit 518. The generated heat may radiate in conduit 518 and opening 522 to heat at least a portion of hydrocarbon layer 460.

Overburden casing 530 may be disposed in overburden 458. Overburden casing 530 is, in some embodiments, surrounded by materials (for example, reinforcing material and/or cement) that inhibit heating of overburden 458. Low resistance section 520 of conductor 516 may be placed in overburden casing 530. Low resistance section 520 of conductor 516 is made of, for example, carbon steel. Low resistance section 520 of conductor 516 may be centralized in overburden casing 530 using centralizers 524. Centralizers 524 are spaced at intervals of approximately 6 m to approximately 12 m or, for example, approximately 9 m along low resistance section 520 of conductor 516. In a heater embodiment, low resistance section 520 of conductor 516 is coupled to conductor 516 by one or more welds. In other heater embodiments, low resistance sections are threaded, threaded and welded, or otherwise coupled to the conductor. Low resistance section 520 generates little or no heat in overburden casing 530. Packing 532 may be placed between overburden casing 530 and opening 522. Packing 532 may be used as a cap at the junction of overburden 458 and hydrocarbon layer 460 to allow filling of materials in the annulus between overburden casing 530 and opening 522. In some embodiments, packing 532 inhibits fluid from flowing from opening 522 to surface 534.

Figure 38:
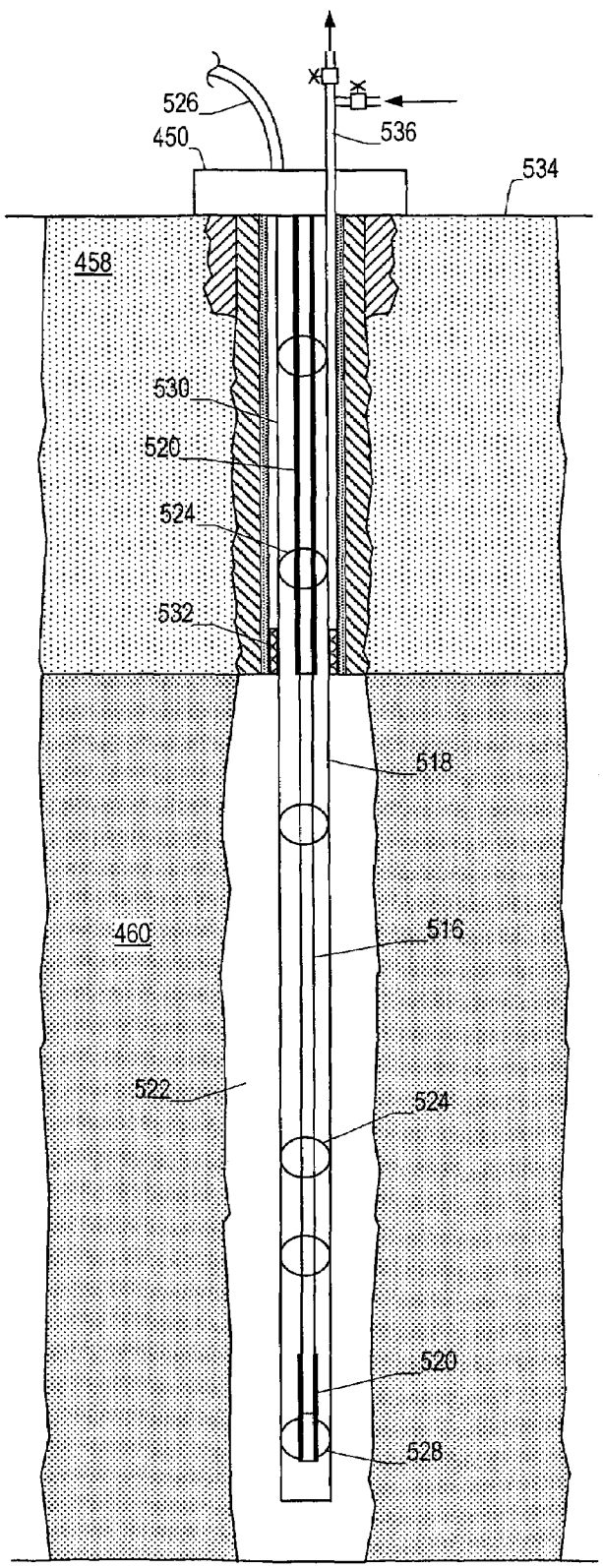
FIG. 38 depicts a cross-sectional representation of an embodiment of a removable conductor-in-conduit heat source.

FIG. 38 depicts a cross-sectional representation of an embodiment of a removable conductor-in-conduit heat source. Conduit 518 may be placed in opening 522 through overburden 458 such that a gap remains between the conduit and overburden casing 530. Fluids may be removed from opening 522 through the gap between conduit 518 and overburden casing 530. Fluids may be removed from the gap through conduit 536. Conduit 518 and components of the heat source included in the conduit that are coupled to wellhead 450 may be removed from opening 522 as a single unit. The heat source may be removed as a single unit to be repaired, replaced, and/or used in another portion of the formation.

For a temperature limited heater in which the ferromagnetic conductor provides a majority of the resistive heat output below the Curie temperature, a majority of the current flows through material with highly non-linear functions of magnetic field (H) versus magnetic induction (B). These non-linear functions may cause strong inductive effects and distortion that lead to decreased power factor in the temperature limited heater at temperatures below the Curie temperature. These effects may render the electrical power supply to the temperature limited heater difficult to control and may result in additional current flow through surface and/or overburden power supply conductors. Expensive and/or difficult to implement control systems such as variable capacitors or modulated power supplies may be used to compensate for these effects and to control temperature limited heaters where the majority of the resistive heat output is provided by current flow through the ferromagnetic material.

In certain temperature limited heater embodiments, the ferromagnetic conductor confines a majority of the flow of electrical current to an electrical conductor coupled to the ferromagnetic conductor when the temperature limited heater is below or near the Curie temperature of the ferromagnetic conductor. The electrical conductor may be a sheath, jacket, support member, corrosion resistant member, or other electrically resistive member. In some embodiments, the ferromagnetic conductor confines a majority of the flow of electrical current to the electrical conductor positioned between an outermost layer and the ferromagnetic conductor. The ferromagnetic conductor is located in the cross section of the temperature limited heater such that the magnetic properties of the ferromagnetic conductor at or below the Curie temperature of the ferromagnetic conductor confine the majority of the flow of electrical current to the electrical conductor. The majority of the flow of electrical current is confined to the electrical conductor due to the skin effect of the ferromagnetic conductor. Thus, the majority of the current is flowing through material with substantially linear resistive properties throughout most of the operating range of the heater.

In certain embodiments, the ferromagnetic conductor and the electrical conductor are located in the cross section of the temperature limited heater so that the skin effect of the ferromagnetic material limits the penetration depth of electrical current in the electrical conductor and the ferromagnetic conductor at temperatures below the Curie temperature of the ferromagnetic conductor. Thus, the electrical conductor provides a majority of the electrically resistive heat output of the temperature limited heater at temperatures up to a temperature at or near the Curie temperature of the ferromagnetic conductor. In certain embodiments, the dimensions of the electrical conductor may be chosen to provide desired heat output characteristics.

Because the majority of the current flows through the electrical conductor below the Curie temperature, the temperature limited heater has a resistance versus temperature profile that at least partially reflects the resistance versus temperature profile of the material in the electrical conductor. Thus, the resistance versus temperature profile of the temperature limited heater is substantially linear below the Curie temperature of the ferromagnetic conductor if the material in the electrical conductor has a substantially linear resistance versus temperature profile. For example, the temperature limited heater in which the majority of the current flows in the electrical conductor below the Curie temperature may have a resistance versus temperature profile similar to the profile shown in FIG. 162. The resistance of the temperature limited heater has little or no dependence on the current flowing through the heater until the temperature nears the Curie temperature. The majority of the current flows in the electrical conductor rather than the ferromagnetic conductor below the Curie temperature.

Resistance versus temperature profiles for temperature limited heaters in which the majority of the current flows in the electrical conductor also tend to exhibit sharper reductions in resistance near or at the Curie temperature of the ferromagnetic conductor. For example, the reduction in resistance shown in FIG. 162 is sharper than the reduction in resistance shown in FIG. 148. The sharper reductions in resistance near or at the Curie temperature are easier to control than more gradual resistance reductions near the Curie temperature.

In certain embodiments, the material and/or the dimensions of the material in the electrical conductor are selected so that the temperature limited heater has a desired resistance versus temperature profile below the Curie temperature of the ferromagnetic conductor.

Temperature limited heaters in which the majority of the current flows in the electrical conductor rather than the ferromagnetic conductor below the Curie temperature are easier to predict and/or control. Behavior of temperature limited heaters in which the majority of the current flows in the electrical conductor rather than the ferromagnetic conductor below the Curie temperature may be predicted by, for example, its resistance versus temperature profile and/or its power factor versus temperature profile. Resistance versus temperature profiles and/or power factor versus temperature profiles may be assessed or predicted by, for example, experimental measurements that assess the behavior of the temperature limited heater, analytical equations that assess or predict the behavior of the temperature limited heater, and/or simulations that assess or predict the behavior of the temperature limited heater.

In certain embodiments, assessed or predicted behavior of the temperature limited heater is used to control the temperature limited heater. The temperature limited heater may be controlled based on measurements (assessments) of the resistance and/or the power factor during operation of the heater. In some embodiments, the power, or current, supplied to the temperature limited heater is controlled based on assessment of the resistance and/or the power factor of the heater during operation of the heater and the comparison of this assessment versus the predicted behavior of the heater. In certain embodiments, the temperature limited heater is controlled without measurement of the temperature of the heater or a temperature near the heater. Controlling the temperature limited heater without temperature measurement eliminates operating costs associated with downhole temperature measurement. Controlling the temperature limited heater based on assessment of the resistance and/or the power factor of the heater also reduces the time for making adjustments in the power or current supplied to the heater compared to controlling the heater based on measured temperature.

As the temperature of the temperature limited heater approaches or exceeds the Curie temperature of the ferromagnetic conductor, reduction in the ferromagnetic properties of the ferromagnetic conductor allows electrical current to flow through a greater portion of the electrically conducting cross section of the temperature limited heater. Thus, the electrical resistance of the temperature limited heater is reduced and the temperature limited heater automatically provides reduced heat output at or near the Curie temperature of the ferromagnetic conductor. In certain embodiments, a highly electrically conductive member is coupled to the ferromagnetic conductor and the electrical conductor to reduce the electrical resistance of the temperature limited heater at or above the Curie temperature of the ferromagnetic conductor. The highly electrically conductive member may be an inner conductor, a core, or another conductive member of copper, aluminum, nickel, or alloys thereof.

The ferromagnetic conductor that confines the majority of the flow of electrical current to the electrical conductor at temperatures below the Curie temperature may have a relatively small cross section compared to the ferromagnetic conductor in temperature limited heaters that use the ferromagnetic conductor to provide the majority of resistive heat output up to or near the Curie temperature. A temperature limited heater that uses the electrical conductor to provide a majority of the resistive heat output below the Curie temperature has low magnetic inductance at temperatures below the Curie temperature because less current is flowing through the ferromagnetic conductor as compared to the temperature limited heater where the majority of the resistive heat output below the Curie temperature is provided by the ferromagnetic material. Magnetic field (H) at radius (r) of the ferromagnetic conductor is proportional to the current (I) flowing through the ferromagnetic conductor and the core divided by the radius, or:

$$H \propto I/r. \tag{5}$$

Since only a portion of the current flows through the ferromagnetic conductor for a temperature limited heater that uses the outer conductor to provide a majority of the resistive heat output below the Curie temperature, the magnetic field of the temperature limited heater may be significantly smaller than the magnetic field of the temperature limited heater where the majority of the current flows through the ferromagnetic material. The relative magnetic permeability ($\mu$) may be large for small magnetic fields.

The skin depth ($\delta$) of the ferromagnetic conductor is inversely proportional to the square root of the relative magnetic permeability ($\mu$):

$$\delta \propto (1/\mu)^{1/2}. \tag{6}$$

Increasing the relative magnetic permeability decreases the skin depth of the ferromagnetic conductor. However, because only a portion of the current flows through the ferromagnetic conductor for temperatures below the Curie temperature, the radius (or thickness) of the ferromagnetic conductor may be decreased for ferromagnetic materials with large relative magnetic permeabilities to compensate for the decreased skin depth while still allowing the skin effect to limit the penetration depth of the electrical current to the electrical conductor at temperatures below the Curie temperature of the ferromagnetic conductor. The radius (thickness) of the ferromagnetic conductor may be between 0.3 mm and 8 mm, between 0.3 mm and 2 mm, or between 2 mm and 4 mm depending on the relative magnetic permeability of the ferromagnetic conductor. Decreasing the thickness of the ferromagnetic conductor decreases costs of manufacturing the temperature limited heater, as the cost of ferromagnetic material tends to be a significant portion of the cost of the temperature limited heater. Increasing the relative magnetic permeability of the ferromagnetic conductor provides a higher turndown ratio and a sharper decrease in electrical resistance for the temperature limited heater at or near the Curie temperature of the ferromagnetic conductor.

Ferromagnetic materials (such as purified iron or iron-cobalt alloys) with high relative magnetic permeabilities (for example, at least 200, at least 1000, at least $1 \times 10^4$, or at least $1 \times 10^5$) and/or high Curie temperatures (for example, at least 600° C., at least 700° C., or at least 800° C.) tend to have less corrosion resistance and/or less mechanical strength at high temperatures. The electrical conductor may provide corrosion resistance and/or high mechanical strength at high temperatures for the temperature limited heater. Thus, the ferromagnetic conductor may be chosen primarily for its ferromagnetic properties.

Confining the majority of the flow of electrical current to the electrical conductor below the Curie temperature of the ferromagnetic conductor reduces variations in the power factor. Because only a portion of the electrical current flows through the ferromagnetic conductor below the Curie temperature, the non-linear ferromagnetic properties of the ferromagnetic conductor have little or no effect on the power factor of the temperature limited heater, except at or near the Curie temperature. Even at or near the Curie temperature, the effect on the power factor is reduced compared to temperature limited heaters in which the ferromagnetic conductor provides a majority of the resistive heat output below the Curie temperature. Thus, there is less or no need for external compensation (for example, variable capacitors or waveform modification) to adjust for changes in the inductive load of the temperature limited heater to maintain a relatively high power factor.

In certain embodiments, the temperature limited heater, which confines the majority of the flow of electrical current to the electrical conductor below the Curie temperature of the ferromagnetic conductor, maintains the power factor above 0.85, above 0.9, or above 0.95 during use of the heater. Any reduction in the power factor occurs only in sections of the temperature limited heater at temperatures near the Curie temperature. Most sections of the temperature limited heater are typically not at or near the Curie temperature during use. These sections have a high power factor that approaches 1.0. The power factor for the entire temperature limited heater is maintained above 0.85, above 0.9, or above 0.95 during use of the heater even if some sections of the heater have power factors below 0.85.

Maintaining high power factors allows for less expensive power supplies and/or control devices such as solid state power supplies or SCRs (silicon controlled rectifiers). These devices may fail to operate properly if the power factor varies by too large an amount because of inductive loads. With the power factors maintained at high values; however, these devices may be used to provide power to the temperature limited heater. Solid state power supplies have the advantage of allowing fine tuning and controlled adjustment of the power supplied to the temperature limited heater.

In some embodiments, transformers are used to provide power to the temperature limited heater. Multiple voltage taps may be made into the transformer to provide power to the temperature limited heater. Multiple voltage taps allows the current supplied to switch back and forth between the multiple voltages. This maintains the current within a range bound by the multiple voltage taps.

The highly electrically conductive member, or inner conductor, increases the turndown ratio of the temperature limited heater. In certain embodiments, thickness of the highly electrically conductive member is increased to increase the turndown ratio of the temperature limited heater. In some embodiments, the thickness of the electrical conductor is reduced to increase the turndown ratio of the temperature limited heater. In certain embodiments, the turndown ratio of the temperature limited heater is between 1.1 and 10, between 2 and 8, or between 3 and 6 (for example, the turndown ratio is at least 1.1, at least 2, or at least 3).

Figure 39:
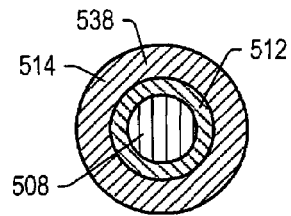
FIG. 39 depicts an embodiment of a temperature limited heater in which the support member provides a majority of the heat output below the Curie temperature of the ferromagnetic conductor.

FIG. 39 depicts an embodiment of a temperature limited heater in which the support member provides a majority of the heat output below the Curie temperature of the ferromagnetic conductor. Core 508 is an inner conductor of the temperature limited heater. In certain embodiments, core 508 is a highly electrically conductive material such as copper or aluminum. In some embodiments, core 508 is a copper alloy that provides mechanical strength and good electrically conductivity such as a dispersion strengthened copper. In one embodiment, core 508 is Glidcop® (SCM Metal Products, Inc., Research Triangle Park, N.C., U.S.A.). Ferromagnetic conductor 512 is a thin layer of ferromagnetic material between electrical conductor 538 and core 508. In certain embodiments, electrical conductor 538 is also support member 514. In certain embodiments, ferromagnetic conductor 512 is iron or an iron alloy. In some embodiments, ferromagnetic conductor 512 includes ferromagnetic material with a high relative magnetic permeability. For example, ferromagnetic conductor 512 may be purified iron such as Armco ingot iron (AK Steel Ltd., United Kingdom). Iron with some impurities typically has a relative magnetic permeability on the order of 400. Purifying the iron by annealing the iron in hydrogen gas ($H_2$) at 1450° C. increases the relative magnetic permeability of the iron. Increasing the relative magnetic permeability of ferromagnetic conductor 512 allows the thickness of the ferromagnetic conductor to be reduced. For example, the thickness of unpurified iron may be approximately 4.5 mm while the thickness of the purified iron is approximately 0.76 mm.

In certain embodiments, electrical conductor 538 provides support for ferromagnetic conductor 512 and the temperature limited heater. Electrical conductor 538 may be made of a material that provides good mechanical strength at temperatures near or above the Curie temperature of ferromagnetic conductor 512. In certain embodiments, electrical conductor 538 is a corrosion resistant member. Electrical conductor 538 (support member 514) may provide support for ferromagnetic conductor 512 and corrosion resistance. Electrical conductor 538 is made from a material that provides desired electrically resistive heat output at temperatures up to and/or above the Curie temperature of ferromagnetic conductor 512.

In an embodiment, electrical conductor 538 is 347H stainless steel. In some embodiments, electrical conductor 538 is another electrically conductive, good mechanical strength, corrosion resistant material. For example, electrical conductor 538 may be 304H, 316H, 347HH, NF709, Incoloy® 800H alloy (Inco Alloys International, Huntington, West Va., U.S.A.), Haynes® HR120® alloy, or Inconel® 617 alloy.

In some embodiments, electrical conductor 538 (support member 514) includes different alloys in different portions of the temperature limited heater. For example, a lower portion of electrical conductor 538 (support member 514) is 347H stainless steel and an upper portion of the electrical conductor (support member) is NF709. In certain embodiments, different alloys are used in different portions of the electrical conductor (support member) to increase the mechanical strength of the electrical conductor (support member) while maintaining desired heating properties for the temperature limited heater.

In some embodiments, ferromagnetic conductor 512 includes different ferromagnetic conductors in different portions of the temperature limited heater. Different ferromagnetic conductors may be used in different portions of the temperature limited heater to vary the Curie temperature and, thus, the maximum operating temperature in the different portions. In some embodiments, the Curie temperature in an upper portion of the temperature limited heater is lower than the Curie temperature in a lower portion of the heater. The lower Curie temperature in the upper portion increases the creep-rupture strength lifetime in the upper portion of the heater.

In the embodiment depicted in FIG. 39, ferromagnetic conductor 512, electrical conductor 538, and core 508 are dimensioned so that the skin depth of the ferromagnetic conductor limits the penetration depth of the majority of the flow of electrical current to the support member when the temperature is below the Curie temperature of the ferromagnetic conductor. Thus, electrical conductor 538 provides a majority of the electrically resistive heat output of the temperature limited heater at temperatures up to a temperature at or near the Curie temperature of ferromagnetic conductor 512. In certain embodiments, the temperature limited heater depicted in FIG. 39 is smaller (for example, an outside diameter of 3 cm, 2.9 cm, 2.5 cm, or less) than other temperature limited heaters that do not use electrical conductor 538 to provide the majority of electrically resistive heat output. The temperature limited heater depicted in FIG. 39 may be smaller because ferromagnetic conductor 512 is thin as compared to the size of the ferromagnetic conductor needed for a temperature limited heater in which the majority of the resistive heat output is provided by the ferromagnetic conductor.

Figure 40:
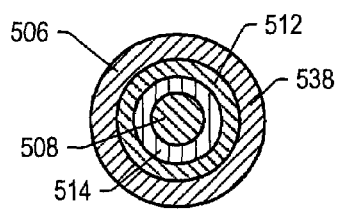
FIGS. 40 and 41 depict embodiments of temperature limited heaters in which the jacket provides a majority of the heat output below the Curie temperature of the ferromagnetic conductor.
Figure 41:
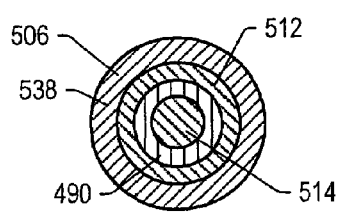

In some embodiments, the support member and the corrosion resistant member are different members in the temperature limited heater. FIGS. 40 and 41 depict embodiments of temperature limited heaters in which the jacket provides a majority of the heat output below the Curie temperature of the ferromagnetic conductor. In these embodiments, electrical conductor 538 is jacket 506. Electrical conductor 538, ferromagnetic conductor 512, support member 514, and core 508 (in FIG. 40) or inner conductor 490 (in FIG. 41) are dimensioned so that the skin depth of the ferromagnetic conductor limits the penetration depth of the majority of the flow of electrical current to the thickness of the jacket. In certain embodiments, electrical conductor 538 is a material that is corrosion resistant and provides electrically resistive heat output below the Curie temperature of ferromagnetic conductor 512. For example, electrical conductor 538 is 825 stainless steel or 347H stainless steel. In some embodiments, electrical conductor 538 has a small thickness (for example, on the order of 0.5 mm).

In FIG. 40, core 508 is highly electrically conductive material such as copper or aluminum. Support member 514 is 347H stainless steel or another material with good mechanical strength at or near the Curie temperature of ferromagnetic conductor 512.

In FIG. 41, support member 514 is the core of the temperature limited heater and is 347H stainless steel or another material with good mechanical strength at or near the Curie temperature of ferromagnetic conductor 512. Inner conductor 490 is highly electrically conductive material such as copper or aluminum.

Figure 42:
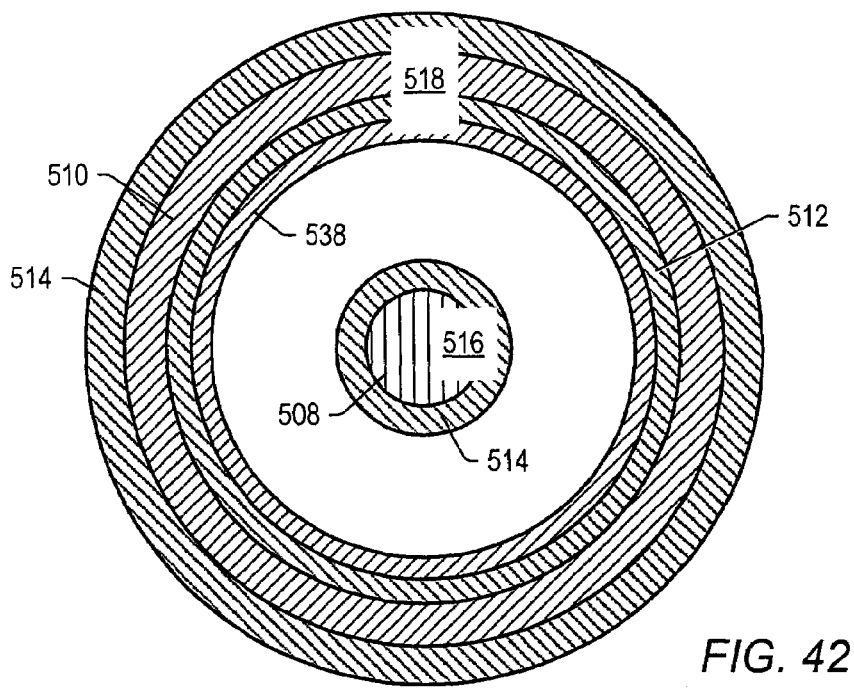
FIG. 42 depicts a high temperature embodiment of a temperature limited heater.

In certain embodiments, the materials and design of the temperature limited heater are chosen to allow use of the heater at high temperatures (for example, above 850° C.). FIG. 42 depicts a high temperature embodiment of the temperature limited heater. The heater depicted in FIG. 42 operates as a conductor-in-conduit heater with the majority of heat being generated in conduit 518. The conductor-in-conduit heater may provide a higher heat output because the majority of heat is generated in conduit 518 rather than conductor 516. Having the heat generated in conduit 518 reduces heat losses associated with transferring heat between the conduit and conductor 516.

Core 508 and conductive layer 510 are copper. In some embodiments, core 508 and conductive layer 510 are nickel if the operating temperatures is to be near or above the melting point of copper. Support members 514 are electrically conductive materials with good mechanical strength at high temperatures. Materials for support members 514 that withstand at least a maximum temperature of about 870° C. may be, but are not limited to, MO-RE® alloys (Duraloy Technologies, Inc. (Scottdale, Pa., U.S.A.)), CF8C+ (Metaltek Intl. (Waukesha, Wis., U.S.A.)), or Inconel® 617 alloy. Materials for support members 514 that withstand at least a maximum temperature of about 980° C. include, but are not limited to, Incoloy® Alloy MA 956. Support member 514 in conduit 518 provides mechanical support for the conduit. Support member 514 in conductor 516 provides mechanical support for core 508.

Electrical conductor 538 is a thin corrosion resistant material. In certain embodiments, electrical conductor 538 is 347H, 617, 625, or 800H stainless steel. Ferromagnetic conductor 512 is a high Curie temperature ferromagnetic material such as iron-cobalt alloy (for example, a 15% by weight cobalt, iron-cobalt alloy).

In certain embodiments, electrical conductor 538 provides the majority of heat output of the temperature limited heater at temperatures up to a temperature at or near the Curie temperature of ferromagnetic conductor 512. Conductive layer 510 increases the turndown ratio of the temperature limited heater.

Figure 43:
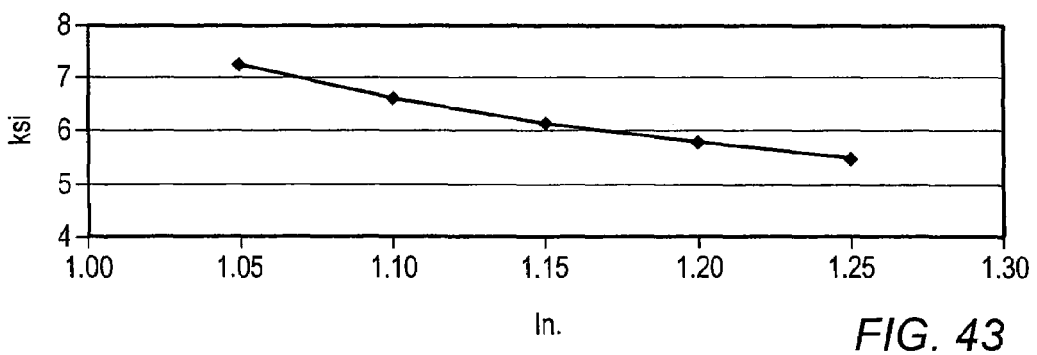
FIG. 43 depicts hanging stress versus outside diameter for the temperature limited heater shown in FIG. 39 with 347H as the support member.

For long vertical temperature limited heaters (for example, heaters at least 300 m, at least 500 m, or at least 1 km in length), the hanging stress becomes important in the selection of materials for the temperature limited heater. Without the proper selection of material, the support member may not have sufficient mechanical strength (for example, creep-rupture strength) to support the weight of the temperature limited heater at the operating temperatures of the heater. FIG. 43 depicts hanging stress (ksi (kilopounds per square inch)) versus outside diameter (in.) for the temperature limited heater shown in FIG. 39 with 347H as the support member. The hanging stress was assessed with the support member outside a 0.5" copper core and a 0.75" outside diameter carbon steel ferromagnetic conductor. This assessment assumes the support member bears the entire load of the heater and that the heater length is 1000 ft. (about 305 m). As shown in FIG. 43, increasing the thickness of the support member decreases the hanging stress on the support member. Decreasing the hanging stress on the support member allows the temperature limited heater to operate at higher temperatures.

In certain embodiments, materials for the support member are varied to increase the maximum allowable hanging stress at operating temperatures of the temperature limited heater and, thus, increase the maximum operating temperature of the temperature limited heater. Altering the materials of the support member affects the heat output of the temperature limited heater below the Curie temperature because changing the materials changes the resistance versus temperature profile of the support member. In certain embodiments, the support member is made of more than one material along the length of the heater so that the temperature limited heater maintains desired operating properties (for example, resistance versus temperature profile below the Curie temperature) as much as possible while providing sufficient mechanical properties to support the heater.

Figure 44:
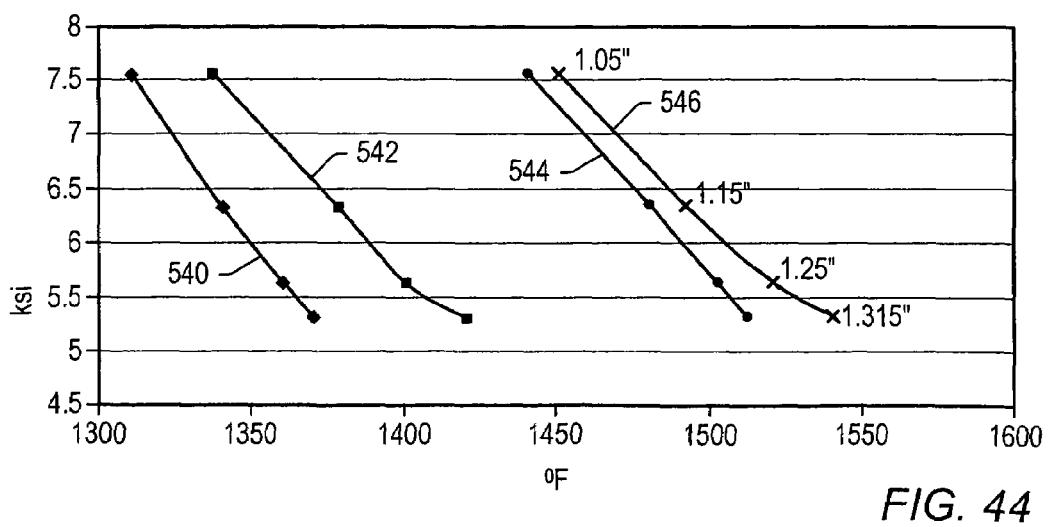
FIG. 44 depicts hanging stress versus temperature for several materials and varying outside diameters of the temperature limited heater.

FIG. 44 depicts hanging stress (ksi) versus temperature (° F.) for several materials and varying outside diameters for the temperature limited heaters. Curve 540 is for 347H stainless steel. Curve 542 is for Incoloy® alloy 800H. Curve 544 is for Haynes® HR120® alloy. Curve 546 is for NF709. Each of the curves includes four points that represent various outside diameters of the support member. The point with the highest stress for each curve corresponds to outside diameter of 1.05". The point with the second highest stress for each curve corresponds to outside diameter of 1.15". The point with the second lowest stress for each curve corresponds to outside diameter of 1.25". The point with the lowest stress for each curve corresponds to outside diameter of 1.315". As shown in FIG. 44, increasing the strength and/or outside diameter of the material and the support member increases the maximum operating temperature of the temperature limited heater.

outside diameters (OD) of the support member. The core diameter and the outside diameter of the iron ferromagnetic conductor in each case are 0.5" and 0.765", respectively.

TABLE 1

| Material | OD = 1.05" | | OD = 1.15" | | OD = 1.25" | | OD = 1.315" | |
|---|---|---|---|---|---|---|---|---|
| | σ (ksi) | T (° F.) | σ (ksi) | T (° F.) | σ (ksi) | T (° F.) | σ (ksi) | T (° F.) |
| 347H stainless steel | 7.55 | 1310 | 6.33 | 1340 | 5.63 | 1360 | 5.31 | 1370 |
| Incoloy ® alloy 800H | 7.55 | 1337 | 6.33 | 1378 | 5.63 | 1400 | 5.31 | 1420 |
| Haynes ® HR120 ® alloy | 7.57 | 1450 | 6.36 | 1492 | 5.65 | 1520 | 5.34 | 1540 |
| HA230 | 7.91 | 1475 | 6.69 | 1510 | 5.99 | 1530 | 5.67 | 1540 |
| Haynes ® alloy 556 | 7.65 | 1458 | 6.43 | 1492 | 5.72 | 1512 | 5.41 | 1520 |
| NF709 | 7.57 | 1440 | 6.36 | 1480 | 5.65 | 1502 | 5.34 | 1512 |

Figure 45:
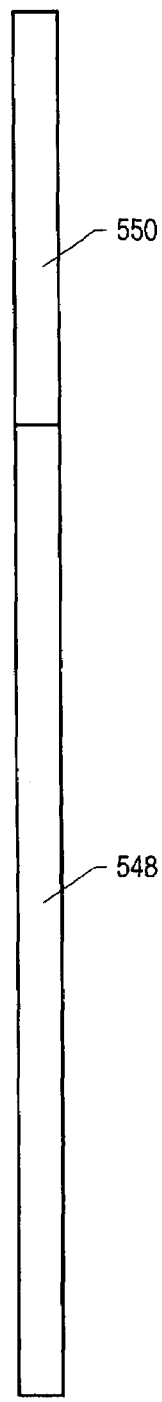
FIGS. 45, 46, 47, and 48 depict examples of embodiments for temperature limited heaters that vary the materials and/or dimensions along the length of the heaters to provide desired operating properties.
Figure 46:
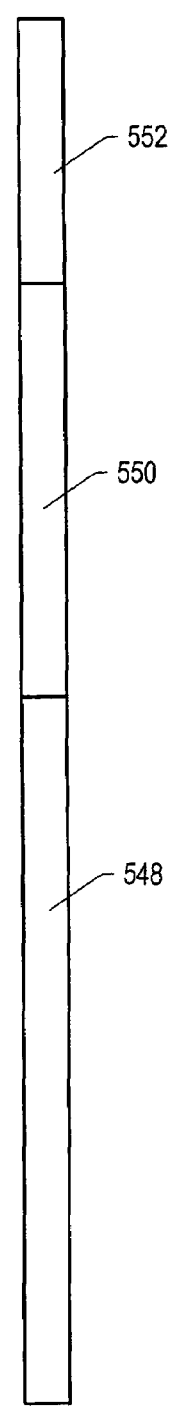
Figure 47:
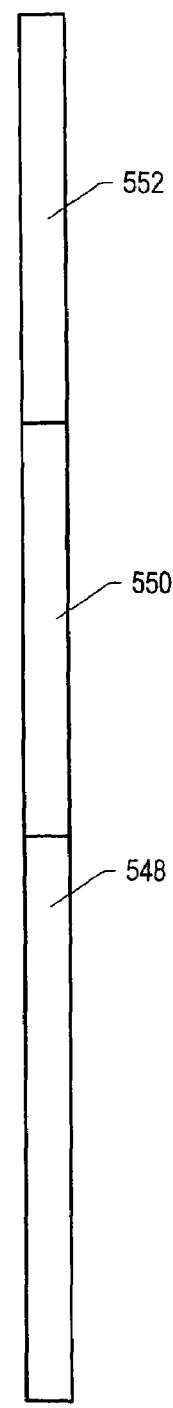

FIGS. 45, 46, 47, and 48 depict examples of embodiments for temperature limited heaters able to provide desired heat output and mechanical strength for operating temperatures up to about 770° C. for 30,000 hrs. creep-rupture lifetime. The depicted temperature limited heaters have lengths of 1000 ft, copper cores of 0.5" diameter, and iron ferromagnetic conductors with outside diameters of 0.765". In FIG. 45, the support member in heater portion 548 is 347H stainless steel. The support member in heater portion 550 is Incoloy® alloy 800H. Portion 548 has a length of 750 ft. and portion 550 has a length of 250 ft. The outside diameter of the support member is 1.315". In FIG. 46, the support member in heater portion 548 is 347H stainless steel. The support member in heater portion 550 is Incoloy® alloy 800H. The support member in heater portion 552 is Haynes® HR120® alloy. Portion 548 has a length of 650 ft., portion 550 has a length of 300 ft., and portion 552 has a length of 50 ft. The outside diameter of the support member is 1.15". In FIG. 47, the support member in heater portion 548 is 347H stainless steel. The support member in heater portion 550 is Incoloy® alloy 800H. The support member in heater portion 552 is Haynes® HR120® alloy. Portion 548 has a length of 550 ft., portion 550 has a length of 250 ft., and portion 552 has a length of 200 ft. The outside diameter of the support member is 1.05".

Figure 48:
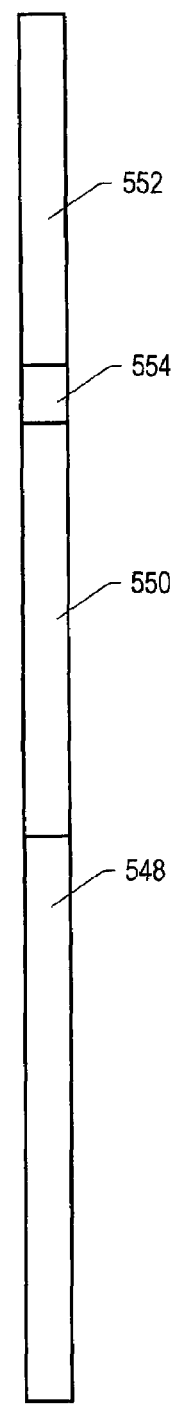

In some embodiments, a transition section is used between sections of the heater. For example, if one or more portions of the heater have varying Curie temperatures, a transition section may be used between portions to provide strength that compensates for the differences in temperatures in the portions. FIG. 48 depicts another example of an embodiment of a temperature limited heater able to provide desired heat output and mechanical strength. The support member in heater portion 548 is 347H stainless steel. The support member in heater portion 550 is NF709. The support member in heater portion 552 is 347H. Portion 548 has a length of 550 ft. and a Curie temperature of 843° C., portion 550 has a length of 250 ft. and a Curie temperature of 843° C., and portion 552 has a length of 180 ft. and a Curie temperature of 770° C. Transition section 554 has a length of 20 ft., a Curie temperature of 770° C., and the support member is NF709.

Figure 50:
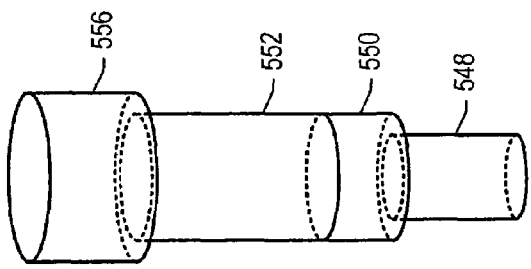
FIGS. 49 and 50 depict examples of embodiments for temperature limited heaters that vary the diameter and/or materials of the support member along the length of the heaters to provide desired operating properties and sufficient mechanical properties.
Figure 49:
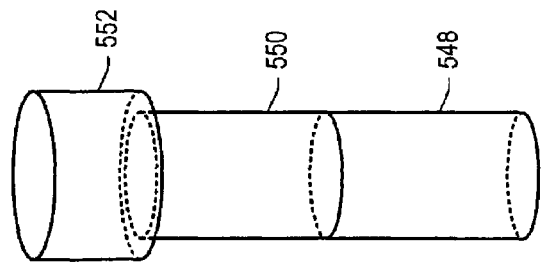

The materials of the support member along the length of the temperature limited heater may be varied to achieve a variety of desired operating properties. The choice of the materials of the temperature limited heater is adjusted depending on a desired use of the temperature limited heater. TABLE 1 lists examples of materials that may be used for the support member. The table provides the hanging stresses (σ) of the support members and the maximum operating temperatures of the temperature limited heaters for several different In certain embodiments, one or more portions of the temperature limited heater have varying outside diameters and/or materials to provide desired properties for the heater. FIGS. 49 and 50 depict examples of embodiments for temperature limited heaters that vary the diameter and/or materials of the support member along the length of the heaters to provide desired operating properties and sufficient mechanical properties (for example, creep-rupture strength properties) for operating temperatures up to about 834° C. for 30,000 hrs., heater lengths of 850 ft, a copper core diameter of 0.5", and an iron-cobalt (6% by weight cobalt) ferromagnetic conductor outside diameter of 0.75". In FIG. 49, portion 548 is 347H stainless steel with a length of 300 ft and an outside diameter of 1.15". Portion 550 is NF709 with a length of 400 ft and an outside diameter of 1.15". Portion 552 is NF709 with a length of 150 ft and an outside diameter of 1.25". In FIG. 50, portion 548 is 347H stainless steel with a length of 300 ft and an outside diameter of 1.15". Portion 550 is 347H stainless steel with a length of 100 ft and an outside diameter of 1.20". Portion 552 is NF709 with a length of 350 ft and an outside diameter of 1.20". Portion 556 is NF709 with a length of 100 ft and an outside diameter of 1.25".

In certain embodiments, one or more portions of the temperature limited heater have varying dimensions and/or varying materials to provide different power outputs along the length of the heater. More or less power output may be provided by varying the selected temperature (for example, the Curie temperature) of the temperature limited heater by using different ferromagnetic materials along its length and/or by varying the electrical resistance of the heater by using different dimensions in the heat generating member along the length of the heater. Different power outputs along the length of the temperature limited heater may be needed to compensate for different thermal properties in the formation adjacent to the heater. For example, an oil shale formation may have different water-filled porosities, dawsonite compositions, and/or nahcolite compositions at different depths in the formation. Portions of the formation with higher water-filled porosities, higher dawsonite compositions, and/or higher nahcolite compositions may need more power input than portions with lower water-filled porosities, lower dawsonite compositions, and/or lower nahcolite compositions to achieve a similar heating rate. Power output may be varied along the length of the heater so that the portions of the formation with different properties (such as water-filled porosities, dawsonite compositions, and/or nahcolite compositions) are heated at approximately the same heating rate.

In certain embodiments, portions of the temperature limited heater have different selected self-limiting temperatures (for example, Curie temperatures), materials, and/or dimensions to compensate for varying thermal properties of the formation along the length of the heater. For example, Curie temperatures, support member materials, and/or dimensions of the portions of the heaters depicted in FIGS. 45-50 may be varied to provide varying power outputs and/or operating temperatures along the length of the heater.

As one example, in an embodiment of the temperature limited heater depicted in FIG. 45, portion 550 may be used to heat portions of the formation that, on average, have higher water-filled porosities, dawsonite compositions, and/or nahcolite compositions than portions of the formation heated by portion 548. Portion 550 may provide less power output than portion 548 to compensate for the differing thermal properties of the different portions of the formation so that the entire formation is heated at an approximately constant heating rate. Portion 550 may require less power output because, for example, portion 550 is used to heat portions of the formation with low water-filled porosities and/or little or no dawsonite. In one embodiment, portion 550 has a Curie temperature of 770° C. (pure iron) and portion 548 has a Curie temperature of 843° C. (iron with added cobalt). Such an embodiment may provide more power output from portion 548 so that the temperature lag between the two portions is reduced. Adjusting the Curie temperature of portions of the heater adjusts the selected temperature at which the heater self-limits. In some embodiments, the dimensions of portion 550 are adjusted to further reduce the temperature lag so that the formation is heated at an approximately constant heating rate throughout the formation. Dimensions of the heater may be adjusted to adjust the heating rate of one or more portions of the heater. For example, the thickness of an outer conductor in portion 550 may be increased relative to the ferromagnetic member and/or the core of the heater so that the portion has a higher electrical resistance and the portion provides a higher power output below the Curie temperature of the portion.

Reducing the temperature lag between different portions of the formation may reduce the overall time needed to bring the formation to a desired temperature. Reducing the time needed to bring the formation to the desired temperature reduces heating costs and produces desirable production fluids more quickly.

Temperature limited heaters with varying Curie temperatures may also have varying support member materials to provide mechanical strength for the heater (for example, to compensate for hanging stress of the heater and/or provide sufficient creep-rupture strength properties). For example, in the embodiment of the temperature limited heater depicted in FIG. 48, portions 548 and 550 have a Curie temperature of 843° C. Portion 548 has a support member made of 347H stainless steel. Portion 550 has a support member made of NF709. Portion 552 has a Curie temperature of 770° C. and a support member made of 347H stainless steel. Transition section 554 has a Curie temperature of 770° C. and a support member made of NF709. Transition section 554 may be short in length compared to portions 548, 550, and 552. Transition section 554 may be placed between portions 550 and 552 to compensate for the temperature and material differences between the portions. For example, transition section 554 may be used to compensate for differences in creep properties between portions 550 and 552.

Such a substantially vertical temperature limited heater may have less expensive, lower strength materials in portion 552 because of the lower Curie temperature in this portion of the heater. For example, 347H stainless steel may be used for the support member because of the lower maximum operating temperature of portion 552 as compared to portion 550. Portion 550 may require more expensive, higher strength material because of the higher operating temperature of portion 550 due to the higher Curie temperature in this portion.

In some embodiments, a relatively thin conductive layer is used to provide the majority of the electrically resistive heat output of the temperature limited heater at temperatures up to a temperature at or near the Curie temperature of the ferromagnetic conductor. Such a temperature limited heater may be used as the heating member in an insulated conductor heater. The heating member of the insulated conductor heater may be located inside a sheath with an insulation layer between the sheath and the heating member.

Figure 51B:
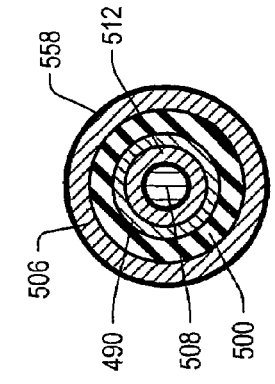
FIGS. 51A and 51B depict cross-sectional representations of an embodiment of a temperature limited heater component used in an insulated conductor heater.
Figure 51A:
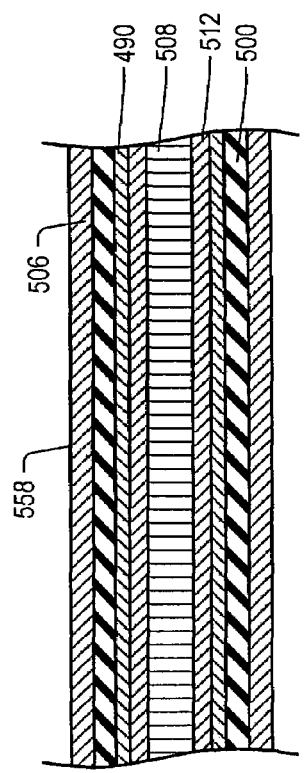

FIGS. 51A and 51B depict cross-sectional representations of an embodiment of the insulated conductor heater with the temperature limited heater as the heating member. Insulated conductor 558 includes core 508, ferromagnetic conductor 512, inner conductor 490, electrical insulator 500, and jacket 506. Core 508 is a copper core. Ferromagnetic conductor 512 is, for example, iron or an iron alloy.

Inner conductor 490 is a relatively thin conductive layer of non-ferromagnetic material with a higher electrical conductivity than ferromagnetic conductor 512. In certain embodiments, inner conductor 490 is copper. Inner conductor 490 may be a copper alloy. Copper alloys typically have a flatter resistance versus temperature profile than pure copper. A flatter resistance versus temperature profile may provide less variation in the heat output as a function of temperature up to the Curie temperature. In some embodiments, inner conductor 490 is copper with 6% by weight nickel (for example, CuNi6 or LOHM™). In some embodiments, inner conductor 490 is CuNi10Fe1Mn alloy. Below the Curie temperature of ferromagnetic conductor 512, the magnetic properties of the ferromagnetic conductor confine the majority of the flow of electrical current to inner conductor 490. Thus, inner conductor 490 provides the majority of the resistive heat output of insulated conductor 558 below the Curie temperature.

In certain embodiments, inner conductor 490 is dimensioned, along with core 508 and ferromagnetic conductor 512, so that the inner conductor provides a desired amount of heat output and a desired turndown ratio. For example, inner conductor 490 may have a cross-sectional area that is around 2 or 3 times less than the cross-sectional area of core 508. Typically, inner conductor 490 has to have a relatively small cross-sectional area to provide a desired heat output if the inner conductor is copper or copper alloy. In an embodiment with copper inner conductor 490, core 508 has a diameter of 0.66 cm, ferromagnetic conductor 512 has an outside diameter of 0.91 cm, inner conductor 490 has an outside diameter of 1.03 cm, electrical insulator 500 has an outside diameter of 1.53 cm, and jacket 506 has an outside diameter of 1.79 cm. In an embodiment with a CuNi6 inner conductor 490, core 508 has a diameter of 0.66 cm, ferromagnetic conductor 512 has an outside diameter of 0.91 cm, inner conductor 490 has an outside diameter of 1.12 cm, electrical insulator 500 has an outside diameter of 1.63 cm, and jacket 506 has an outside diameter of 1.88 cm. Such insulated conductors are typically smaller and cheaper to manufacture than insulated conductors that do not use the thin inner conductor to provide the majority of heat output below the Curie temperature.

Electrical insulator 500 may be magnesium oxide, aluminum oxide, silicon dioxide, beryllium oxide, boron nitride, silicon nitride, or combinations thereof. In certain embodiments, electrical insulator 500 is a compacted powder of magnesium oxide. In some embodiments, electrical insulator 500 includes beads of silicon nitride.

In certain embodiments, a small layer of material is placed between electrical insulator 500 and inner conductor 490 to inhibit copper from migrating into the electrical insulator at higher temperatures. For example, a small layer of nickel (for example, about 0.5 mm of nickel) may be placed between electrical insulator 500 and inner conductor 490.

Jacket 506 is made of a corrosion resistant material such as, but not limited to, 347 stainless steel, 347H stainless steel, 446 stainless steel, or 825 stainless steel. In some embodiments, jacket 506 provides some mechanical strength for insulated conductor 558 at or above the Curie temperature of ferromagnetic conductor 512. In certain embodiments, jacket 506 is not used to conduct electrical current.

In certain embodiments of temperature limited heaters, three temperature limited heaters are coupled together in a three-phase wye configuration. Coupling three temperature limited heaters together in the three-phase wye configuration lowers the current in each of the individual temperature limited heaters because the current is split between the three individual heaters. Lowering the current in each individual temperature limited heater allows each heater to have a small diameter. The lower currents allow for higher relative magnetic permeabilities in each of the individual temperature limited heaters and, thus, higher turndown ratios. In addition, there may be no return current needed for each of the individual temperature limited heaters. Thus, the turndown ratio remains higher for each of the individual temperature limited heaters than if each temperature limited heater had its own return current path.

In the three-phase wye configuration, individual temperature limited heaters may be coupled together by shorting the sheaths, jackets, or canisters of each of the individual temperature limited heaters to the electrically conductive sections (the conductors providing heat) at their terminating ends (for example, the ends of the heaters at the bottom of a heater wellbore). In some embodiments, the sheaths, jackets, canisters, and/or electrically conductive sections are coupled to a support member that supports the temperature limited heaters in the wellbore.

FIG. 52A depicts an embodiment for installing and coupling heaters in a wellbore. The embodiment in FIG. 52A depicts insulated conductor heaters being installed into the wellbore. Other types of heaters, such as conductor-in-conduit heaters, may also be installed in the wellbore using the embodiment depicted. Also, in FIG. 52A, two insulated conductors 558 are shown while a third insulated conductor is not seen from the view depicted. Typically, three insulated conductors 558 would be coupled to support member 560, as shown in FIG. 52B. In an embodiment, support member 560 is a thick walled 347H pipe. In some embodiments, thermocouples or other temperature sensors are placed inside support member 560. The three insulated conductors may be coupled in a three-phase wye configuration.

In FIG. 52A, insulated conductors 558 are coiled on coiled tubing rigs 562. As insulated conductors 558 are uncoiled from rigs 562, the insulated conductors are coupled to support member 560. In certain embodiments, insulated conductors 558 are simultaneously uncoiled and/or simultaneously coupled to support member 560. Insulated conductors 558 may be coupled to support member 560 using metal (for example, 304 stainless steel or Inconel® alloys) straps 564. In some embodiments, insulated conductors 558 are coupled to support member 560 using other types of fasteners such as buckles, wire holders, or snaps. Support member 560 along with insulated conductors 558 are installed into opening 522. In some embodiments, insulated conductors 558 are coupled together without the use of a support member. For example, one or more straps 564 may be used to couple insulated conductors 558 together.

Insulated conductors 558 may be electrically coupled to each other at a lower end of the insulated conductors. In a three-phase wye configuration, insulated conductors 558 operate without a current return path. In certain embodiments, insulated conductors 558 are electrically coupled to each other in contactor section 566. In section 566, sheaths, jackets, canisters, and/or electrically conductive sections are electrically coupled to each other and/or to support member 560 so that insulated conductors 558 are electrically coupled in the section.

In certain embodiments, the sheaths of insulated conductors 558 are shorted to the conductors of the insulated conductors. FIG. 52C depicts an embodiment of insulated conductor 558 with the sheath shorted to the conductors. Sheath 506 is electrically coupled to core 508, ferromagnetic conductor 512, and inner conductor 490 using termination 568. Termination 568 may be a metal strip or a metal plate at the lower end of insulated conductor 558. For example, termination 568 may be a copper plate coupled to sheath 506, core 508, ferromagnetic conductor 512, and inner conductor 490 so that they are shorted together. In some embodiments, termination 568 is welded or brazed to sheath 506, core 508, ferromagnetic conductor 512, and inner conductor 490.

The sheaths of individual insulated conductors 558 may be shorted together to electrically couple the conductors of the insulated conductors. In some embodiments, the sheaths may be shorted together because the sheaths are in physical contact with each other. For example, the sheaths may be physical contact if the sheaths are strapped together by straps 564. In some embodiments, the lower ends of the sheaths are physically coupled (for example, welded) at the surface of opening 522 before insulated conductors 558 are installed into the opening.

Figure 53:
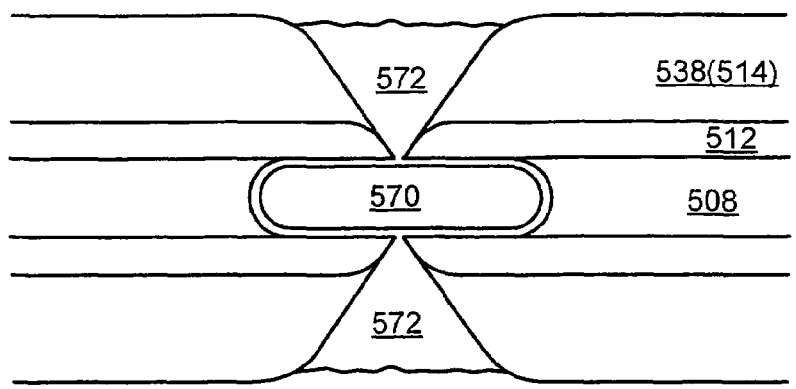
FIG. 53 depicts an embodiment for coupling together sections of a long temperature limited heater.

In some embodiments, a long temperature limited heater (for example, a temperature limited heater in which the support member provides a majority of the heat output below the Curie temperature of the ferromagnetic conductor) is formed from several sections of heater. The sections of heater may be coupled using a welding process. FIG. 53 depicts an embodiment for coupling together sections of a long temperature limited heater. Ends of ferromagnetic conductors 512 and ends of electrical conductors 538 (support members 514) are beveled to facilitate coupling the sections of the heater. Core 508 has recesses to allow core coupling material 570 to be placed inside the abutted ends of the heater. Core coupling material 570 may be a pin or dowel that fits tightly in the recesses of cores 508. Core coupling material 570 may be made out of the same material as cores 508 or a material suitable for coupling the cores together. Core coupling material 570 allows the heaters to be coupled together without welding cores 508 together. Cores 508 are coupled together as a "pin" or "box" joint.

Beveled ends of ferromagnetic conductors 512 and electrical conductors 538 may be coupled together with coupling material 572. In certain embodiments, ends of ferromagnetic conductors 512 and electrical conductors 538 are welded (for example, orbital welded) together. Coupling material 572 may be 625 stainless steel or any other suitable non-ferromagnetic material for welding together ferromagnetic conductors 512 and/or electrical conductors 538. Using beveled ends when coupling together sections of the heater may produce a reliable and durable coupling between the sections of the heater.

During heating with the temperature limited heater, core coupling material 570 may expand more radially than ferromagnetic conductors 512, electrical conductors 538, and/or coupling material 572. The greater expansion of core coupling material 570 maintains good electrical contact with the core coupling material. At the coupling junction of the heater, electricity flows through core coupling material 570 rather than coupling material 572. This flow of electricity inhibits heat generation at the coupling junction so that the junction remains at lower temperatures than other portions of the heater during application of electrical current to the heater. The corrosion resistance and strength of the coupling junction is increased by maintaining the junction at lower temperatures.

In certain embodiments, the junction may be enclosed in a shield during orbital welding to ensure reliability of the weld. If the junction is not enclosed, disturbance of the inert gas caused by wind, humidity or other conditions may cause oxidation and/or porosity of the weld. Without a shield, a first portion of the weld was formed and allowed to cool. A grinder would be used to remove the oxide layer. The process would be repeated until the weld was complete. Enclosing the junction in the shield with an inert gas allows the weld to be formed with no oxidation, thus allowing the weld to be formed in one pass with no need for grinding. Enclosing the junction increases the safety of forming the weld because the arc of the orbital welder is enclosed in the shield during welding. Enclosing the junction in the shield may reduce the time needed to form the weld. Without a shield, producing each weld may take 30 minutes or more. With the shield, each weld may take 10 minutes or less.

Figure 54:
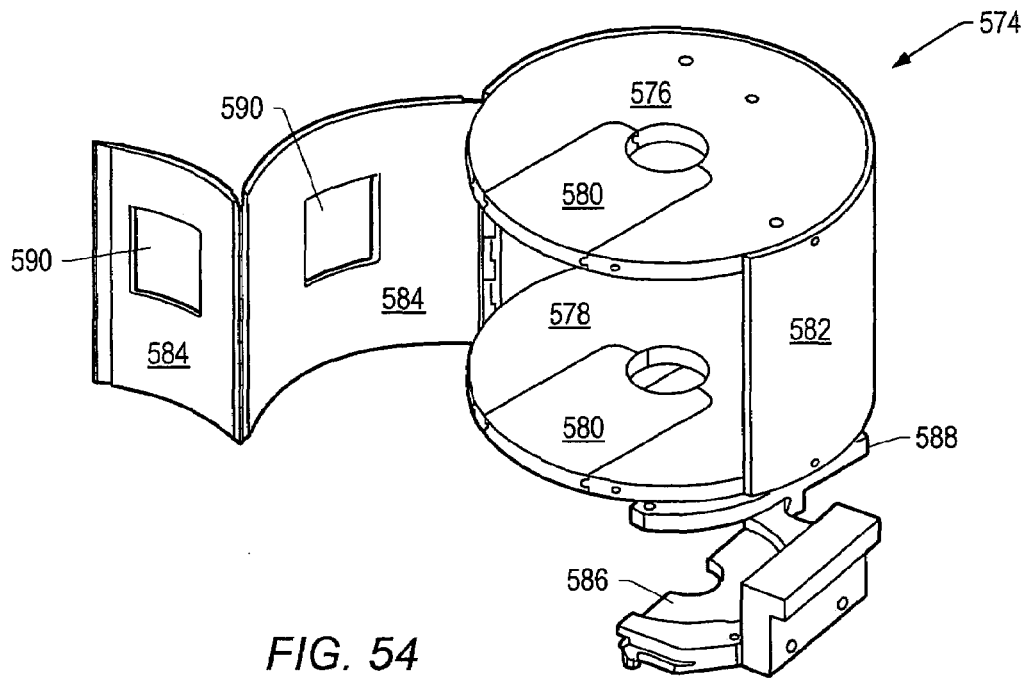
FIG. 54 depicts an embodiment of a shield for orbital welding sections of a long temperature limited heater.

FIG. 54 depicts an embodiment of a shield for orbital welding sections of a long temperature limited heater. Orbital welding may also be used to form canisters for freeze wells from sections of pipe. Shield 574 may include upper plate 576, lower plate 578, inserts 580, wall 582, hinged door 584, first clamp member 586, and second clamp member 588. Wall 582 may include one or more inert gas inlets. Wall 582, upper plate 576, and/or lower plate 578 may include one or more openings for monitoring equipment or gas purging. Shield 574 is configured to work with an orbital welder, such as AMI Power Supply (Model 227) and AMI Orbital Weld Head (Model 97-2375) available from Arc Machines, Inc. (Pacoima, Calif., U.S.A.). Inserts 580 may be withdrawn from upper plate 576 and lower plate 578. The orbital weld head may be positioned in shield 574. Shield 574 may be placed around a lower conductor of the conductors that are to be welded together. When shield is positioned so that the end of the lower conductor is at a desired position in the middle of the shield, first clamp member may be fastened to second clamp member to secure shield 574 to the lower conductor. The upper conductor may be positioned in shield 574. Inserts 580 may be placed in upper plate 576 and lower plate 578.

Hinged door 584 may be closed. The orbital welder may be used to weld the lower conductor to the upper conductor. Progress of the welding operation may be monitored through viewing windows 590. When the weld is complete, shield 574 may be supported and first clamp member 586 may be unfastened from second clamp member 588. One or both inserts 580 may be removed or partially removed from lower plate 578 and upper plate 576 to facilitate lowering of the conductor. The conductor may be lowered in the wellbore until the end of the conductor is located at a desired position in shield 574. Shield 574 may be secured to the conductor with first clamp member 586 and second clamp member 588. Another conductor may be positioned in the shield. Inserts 580 may be positioned in upper and lower plates 576, 578; hinged door is closed 584; and the orbital welder is used to weld the conductors together. The process may be repeated until a desired length of conductor is formed.

Figure 55:
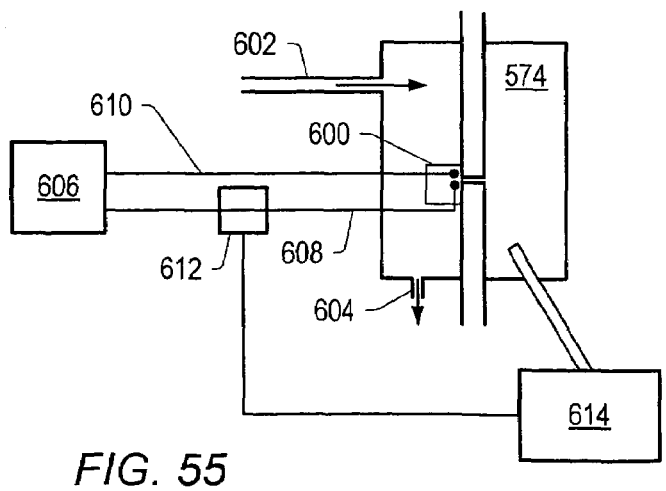
FIG. 55 depicts a schematic representation of an embodiment of a shut off circuit for an orbital welding machine.

The shield may be used to weld joints of pipe over an opening in the hydrocarbon containing formation. Hydrocarbon vapors from the formation may create an explosive atmosphere in the shield even though the inert gas supplied to the shield inhibits the formation of dangerous concentrations of hydrocarbons in the shield. A control circuit may be coupled to a power supply for the orbital welder to stop power to the orbital welder to shut off the arc forming the weld if the hydrocarbon level in the shield rises above a selected concentration. FIG. 55 depicts a schematic representation of an embodiment of a shut off circuit for orbital welding machine 600. An inert gas, such as argon, may enter shield 574 through inlet 602. Gas may exit shield 574 through purge 604. Power supply 606 supplies electricity to orbital welding machine 600 through lines 608, 610. Switch 612 may be located in line 608 to orbital welding machine 600. Switch 612 may be electrically coupled to hydrocarbon monitor 614. Hydrocarbon monitor 614 may detect the hydrocarbon concentration in shield 574. If the hydrocarbon concentration in shield becomes too high, for example, over 25% of a lower explosion limit concentration, hydrocarbon monitor 614 may open switch 612. When switch 612 is open, power to orbital welder 600 is interrupted and the arc formed by the orbital welder ends.

In some embodiments, the temperature limited heater is used to achieve lower temperature heating (for example, for heating fluids in a production well, heating a surface pipeline, or reducing the viscosity of fluids in a wellbore or near wellbore region). Varying the ferromagnetic materials of the temperature limited heater allows for lower temperature heating. In some embodiments, the ferromagnetic conductor is made of material with a lower Curie temperature than that of 446 stainless steel. For example, the ferromagnetic conductor may be an alloy of iron and nickel. The alloy may have between 30% by weight and 42% by weight nickel with the rest being iron. In one embodiment, the alloy is Invar 36. Invar 36 is 36% by weight nickel in iron and has a Curie temperature of 277° C. In some embodiments, an alloy is a three component alloy with, for example, chromium, nickel, and iron. For example, an alloy may have 6% by weight chromium, 42% by weight nickel, and 52% by weight iron. A 2.5 cm diameter rod of Invar 36 has a turndown ratio of approximately 2 to 1 at the Curie temperature. Placing the Invar 36 alloy over a copper core may allow for a smaller rod diameter. A copper core may result in a high turndown ratio. The insulator in lower temperature heater embodiments may be made of a high performance polymer insulator (such as PFA or PEEK™) when used with alloys with a Curie temperature that is below the melting point or softening point of the polymer insulator.

In certain embodiments, a conductor-in-conduit temperature limited heater is used in lower temperature applications by using lower Curie temperature ferromagnetic materials. For example, a lower Curie temperature ferromagnetic material may be used for heating inside sucker pump rods. Heating sucker pump rods may be useful to lower the viscosity of fluids in the sucker pump or rod and/or to maintain a lower viscosity of fluids in the sucker pump rod. Lowering the viscosity of the oil may inhibit sticking of a pump used to pump the fluids. Fluids in the sucker pump rod may be heated up to temperatures less than about 250° C. or less than about 300° C. Temperatures need to be maintained below these values to inhibit coking of hydrocarbon fluids in the sucker pump system.

Figure 56:
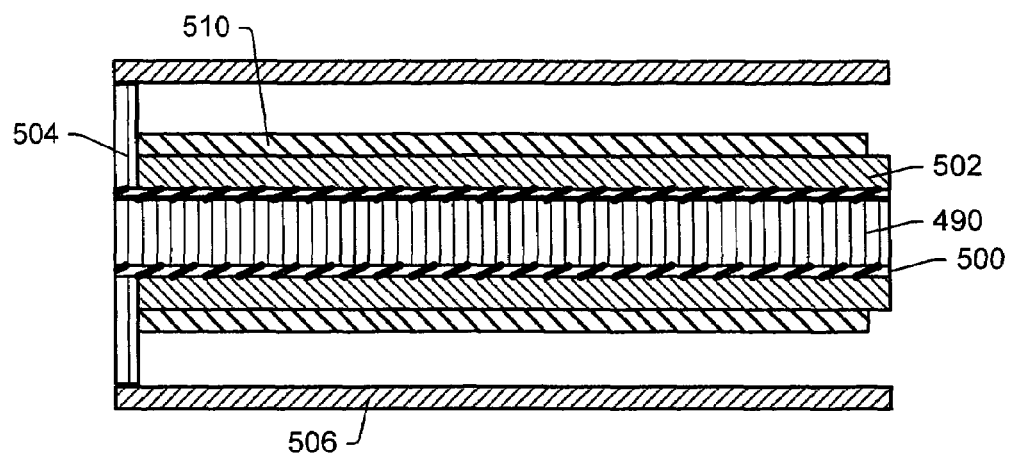
FIG. 56 depicts an embodiment of a temperature limited heater with a low temperature ferromagnetic outer conductor.

FIG. 56 depicts an embodiment of a temperature limited heater with a low temperature ferromagnetic outer conductor. Outer conductor 502 is glass sealing Alloy 42-6. Alloy 42-6 may be obtained from Carpenter Metals (Reading, Pa., U.S.A.) or Anomet Products, Inc. In some embodiments, outer conductor 502 includes other compositions and/or materials to get various Curie temperatures (for example, Carpenter Temperature Compensator "32" (Curie temperature of 199° C.; available from Carpenter Metals) or Invar 36). In an embodiment, conductive layer 510 is coupled (for example, clad, welded, or brazed) to outer conductor 502. Conductive layer 510 is a copper layer. Conductive layer 510 improves a turndown ratio of outer conductor 502. Jacket 506 is a ferromagnetic metal such as carbon steel. Jacket 506 protects outer conductor 502 from a corrosive environment. Inner conductor 490 may have electrical insulator 500. Electrical insulator 500 may be a mica tape winding with overlaid fiberglass braid. In an embodiment, inner conductor 490 and electrical insulator 500 are a 4/0 MGT-1000 furnace cable or 3/0 MGT-1000 furnace cable. 4/0 MGT-1000 furnace cable or 3/0 MGT-1000 furnace cable is available from Allied Wire and Cable (Phoenixville, Pa., U.S.A.). In some embodiments, a protective braid such as a stainless steel braid may be placed over electrical insulator 500.

Conductive section 504 electrically couples inner conductor 490 to outer conductor 502 and/or jacket 506. In some embodiments, jacket 506 touches or electrically contacts conductive layer 510 (for example, if the heater is placed in a horizontal configuration). If jacket 506 is a ferromagnetic metal such as carbon steel (with a Curie temperature above the Curie temperature of outer conductor 502), current will propagate only on the inside of the jacket. Thus, the outside of the jacket remains electrically uncharged during operation. In some embodiments, jacket 506 is drawn down (for example, swaged down in a die) onto conductive layer 510 so that a tight fit is made between the jacket and the conductive layer. The heater may be spooled as coiled tubing for insertion into a wellbore. In other embodiments, an annular space is present between conductive layer 510 and jacket 506, as depicted in FIG. 56.

Figure 57:
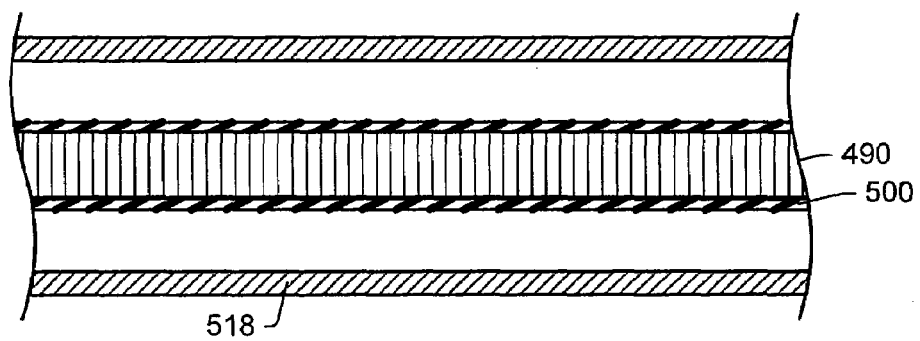
FIG. 57 depicts an embodiment of a temperature limited conductor-in-conduit heater.

FIG. 57 depicts an embodiment of a temperature limited conductor-in-conduit heater. Conduit 518 is a hollow sucker rod made of a ferromagnetic metal such as Alloy 42-6, Alloy 32, Alloy 52, Invar 36, iron-nickel-chromium alloys, iron-nickel alloys, nickel alloys, or nickel-chromium alloys. Inner conductor 490 has electrical insulator 500. Electrical insulator 500 is a mica tape winding with overlaid fiberglass braid. In an embodiment, inner conductor 490 and electrical insulator 500 are a 4/0 MGT-1000 furnace cable or 3/0 MGT-1000 furnace cable. In some embodiments, polymer insulations are used for lower temperature Curie heaters. In certain embodiments, a protective braid is placed over electrical insulator 500. Conduit 518 has a wall thickness that is greater than the skin depth at the Curie temperature (for example, 2 to 3 times the skin depth at the Curie temperature). In some embodiments, a more conductive conductor is coupled to conduit 518 to increase the turndown ratio of the heater.

Figure 58:
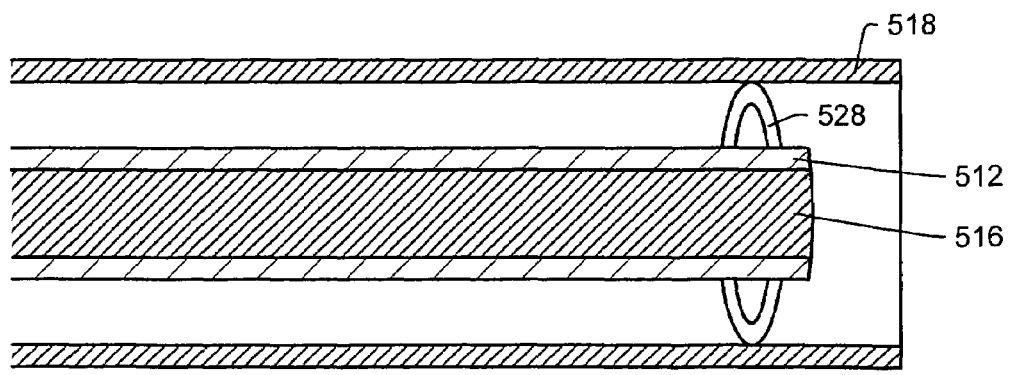
FIG. 58 depicts a cross-sectional representation of an embodiment of a conductor-in-conduit temperature limited heater.

FIG. 58 depicts a cross-sectional representation of an embodiment of a conductor-in-conduit temperature limited heater. Conductor 516 is coupled (for example, clad, coextruded, press fit, or drawn inside) to ferromagnetic conductor 512. A metallurgical bond between conductor 516 and ferromagnetic conductor 512 is favorable. Ferromagnetic conductor 512 is coupled to the outside of conductor 516 so that current propagates through the skin depth of the ferromagnetic conductor at room temperature. Conductor 516 provides mechanical support for ferromagnetic conductor 512 at elevated temperatures. Ferromagnetic conductor 512 is iron, an iron alloy (for example, iron with 10% to 27% by weight chromium for corrosion resistance), or any other ferromagnetic material. In one embodiment, conductor 516 is 304 stainless steel and ferromagnetic conductor 512 is 446 stainless steel. Conductor 516 and ferromagnetic conductor 512 are electrically coupled to conduit 518 with sliding connector 528. Conduit 518 may be a non-ferromagnetic material such as austenitic stainless steel.

Figure 59:
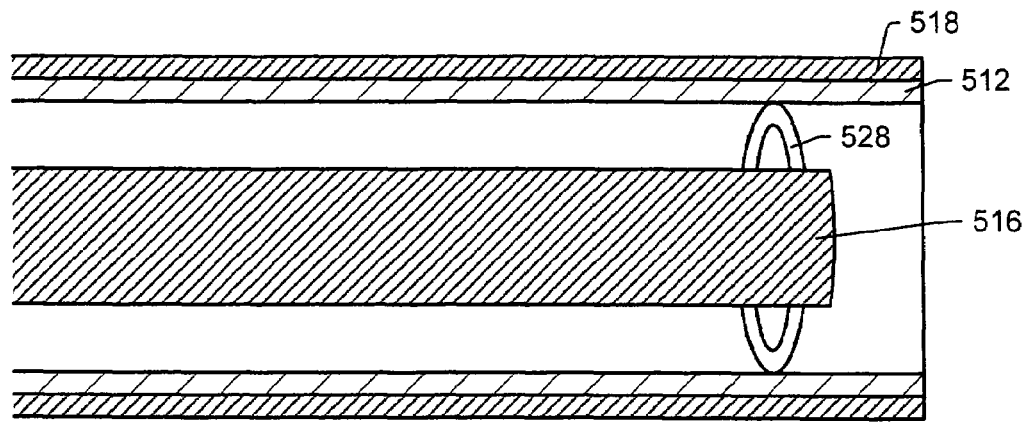
FIG. 59 depicts a cross-sectional representation of an embodiment of a conductor-in-conduit temperature limited heater.

FIG. 59 depicts a cross-sectional representation of an embodiment of a conductor-in-conduit temperature limited heater. Conduit 518 is coupled to ferromagnetic conductor 512 (for example, clad, press fit, or drawn inside of the ferromagnetic conductor). Ferromagnetic conductor 512 is coupled to the inside of conduit 518 to allow current to propagate through the skin depth of the ferromagnetic conductor at room temperature. Conduit 518 provides mechanical support for ferromagnetic conductor 512 at elevated temperatures. Conduit 518 and ferromagnetic conductor 512 are electrically coupled to conductor 516 with sliding connector 528.

Figure 60:
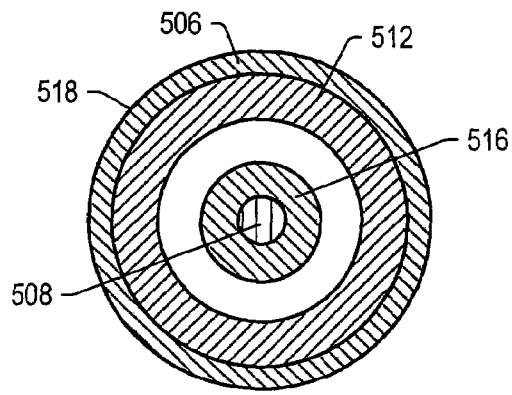
FIG. 60 depicts a cross-sectional view of an embodiment of a conductor-in-conduit temperature limited heater.

FIG. 60 depicts a cross-sectional view of an embodiment of a conductor-in-conduit temperature limited heater. Conductor 516 may surround core 508. In an embodiment, conductor 516 is 347H stainless steel and core 508 is copper. Conductor 516 and core 508 may be formed together as a composite conductor. Conduit 518 may include ferromagnetic conductor 512. In an embodiment, ferromagnetic conductor 512 is Sumitomo HCM12A or 446 stainless steel. Ferromagnetic conductor 512 may have a Schedule XXH thickness so that the conductor is inhibited from deforming. In certain embodiments, conduit 518 also includes jacket 506. Jacket 506 may include corrosion resistant material that inhibits electrons from flowing away from the heater and into a subsurface formation at higher temperatures (for example, temperatures near the Curie temperature of ferromagnetic conductor 512). For example, jacket 506 may be about a 0.4 cm thick sheath of 410 stainless steel. Inhibiting electrons from flowing to the formation may increase the safety of using the heater in the subsurface formation.

Figure 61:
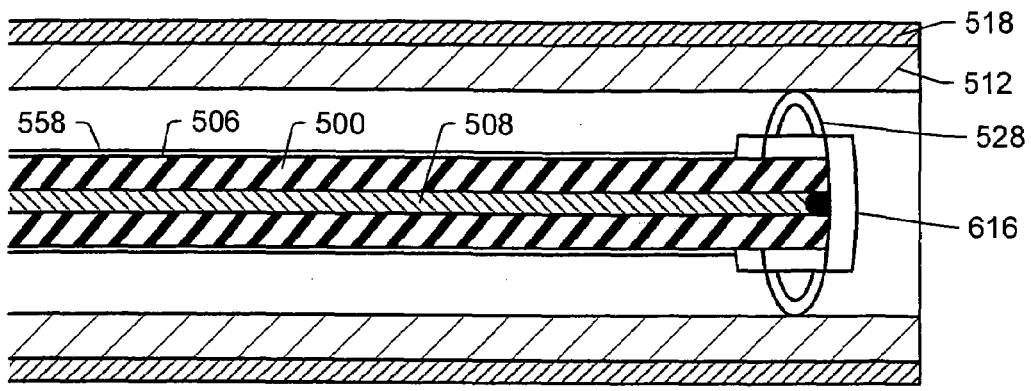
FIG. 61 depicts a cross-sectional representation of an embodiment of a conductor-in-conduit temperature limited heater with an insulated conductor.

FIG. 61 depicts a cross-sectional representation of an embodiment of a conductor-in-conduit temperature limited heater with an insulated conductor. Insulated conductor 558 may include core 508, electrical insulator 500, and jacket 506. Jacket 506 may be made of a corrosion resistant material (for example, stainless steel). Endcap 616 may be placed at an end of insulated conductor 558 to couple core 508 to sliding connector 528. Endcap 616 may be made of non-corrosive, electrically conducting materials such as nickel or stainless steel. Endcap 616 may be coupled to the end of insulated conductor 558 by any suitable method (for example, welding, soldering, or braising). Sliding connector 528 may electrically couple core 508 and endcap 616 to ferromagnetic conductor 512. Conduit 518 may provide support for ferromagnetic conductor 512 at elevated temperatures.

Figure 62:
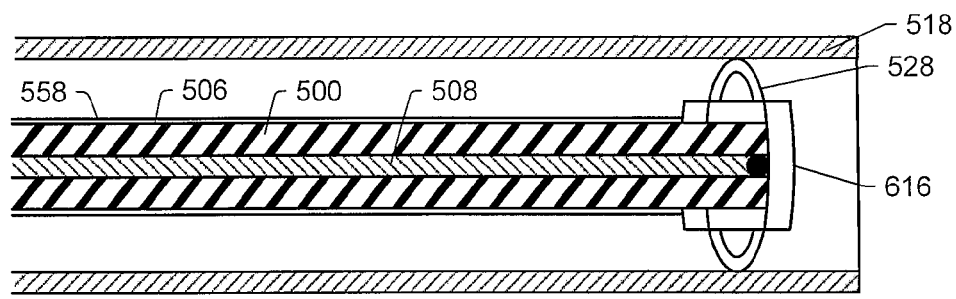
FIG. 62 depicts a cross-sectional representation of an embodiment of a conductor-in-conduit temperature limited heater with an insulated conductor.

FIG. 62 depicts a cross-sectional representation of an embodiment of a conductor-in-conduit temperature limited heater with an insulated conductor. Insulated conductor 558 includes core 508, electrical insulator 500, and jacket 506. Jacket 506 is made of a highly electrically conductive material such as copper. Core 508 is made of a lower temperature ferromagnetic material such as such as Alloy 42-6, Alloy 32, Invar 36, iron-nickel-chromium alloys, iron-nickel alloys, nickel alloys, or nickel-chromium alloys. In certain embodiments, the materials of jacket 506 and core 508 are reversed so that the jacket is the ferromagnetic conductor and the core is the highly conductive portion of the heater. Ferromagnetic material used in jacket 506 or core 508 may have a thickness greater than the skin depth at the Curie temperature (for example, 2 to 3 times the skin depth at the Curie temperature). Endcap 616 is placed at an end of insulated conductor 558 to couple core 508 to sliding connector 528. Endcap 616 is made of corrosion resistant, electrically conducting materials such as nickel or stainless steel. In certain embodiments, conduit 518 is a hollow sucker rod made from, for example, carbon steel.

In certain embodiments, a temperature limited heater includes a flexible cable (for example, a furnace cable) as the inner conductor. For example, the inner conductor may be a 27% nickel-clad or stainless steel-clad stranded copper wire with four layers of mica tape surrounded by a layer of ceramic and/or mineral fiber (for example, alumina fiber, aluminosilicate fiber, borosilicate fiber, or aluminoborosilicate fiber). A stainless steel-clad stranded copper wire furnace cable may be available from Anomet Products, Inc. The inner conductor may be rated for applications at temperatures of 1000° C. or higher. The inner conductor may be pulled inside a conduit. The conduit may be a ferromagnetic conduit (for example, a ¾" Schedule 80 446 stainless steel pipe). The conduit may be covered with a layer of copper, or other electrical conductor, with a thickness of about 0.3 cm or any other suitable thickness. The assembly may be placed inside a support conduit (for example, a 1¼" Schedule 80 347H or 347HH stainless steel tubular). The support conduit may provide additional creep-rupture strength and protection for the copper and the inner conductor. For uses at temperatures greater than about 1000° C., the inner copper conductor may be plated with a more corrosion resistant alloy (for example, Incoloy® 825) to inhibit oxidation. In some embodiments, the top of the temperature limited heater is sealed to inhibit air from contacting the inner conductor.

The temperature limited heater may be a single-phase heater or a three-phase heater. In a three-phase heater embodiment, the temperature limited heater has a delta or a wye configuration. Each of the three ferromagnetic conductors in the three-phase heater may be inside a separate sheath. A connection between conductors may be made at the bottom of the heater inside a splice section. The three conductors may remain insulated from the sheath inside the splice section.

Figure 63:
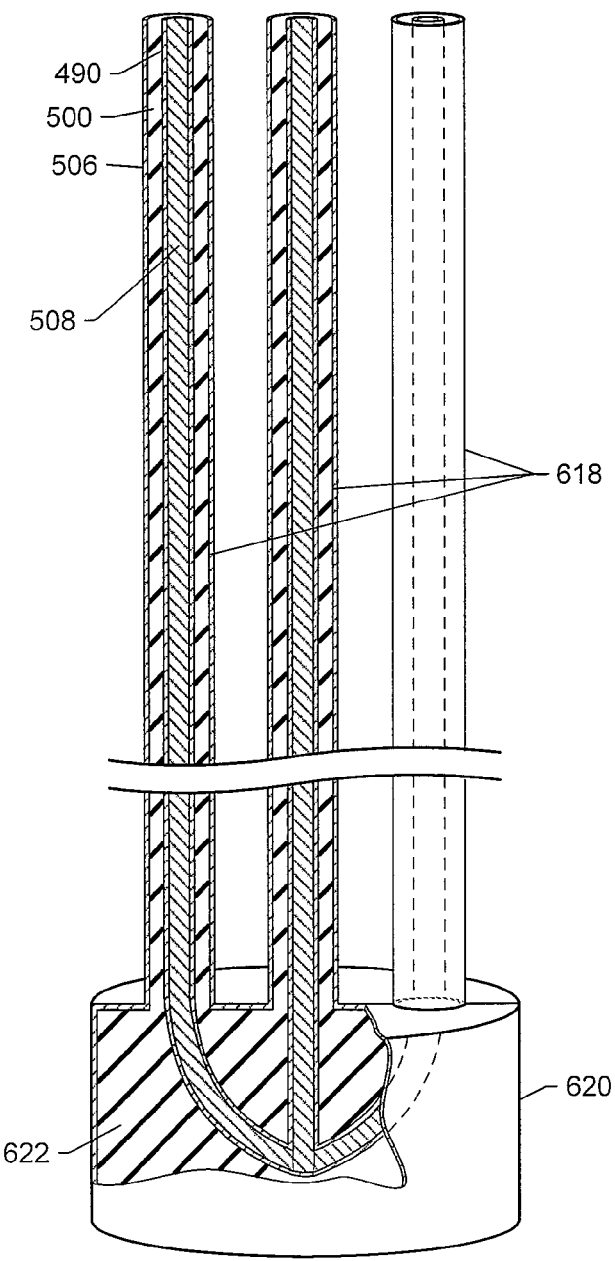
FIG. 63 depicts an embodiment of a three-phase temperature limited heater with a portion shown in cross section.

FIG. 63 depicts an embodiment of a three-phase temperature limited heater with ferromagnetic inner conductors. Each leg 618 has inner conductor 490, core 508, and jacket 506. Inner conductors 490 are ferritic stainless steel or 1% carbon steel. Inner conductors 490 have core 508. Core 508 may be copper. Each inner conductor 490 is coupled to its own jacket 506. Jacket 506 is a sheath made of a corrosion resistant material (such as 304H stainless steel). Electrical insulator 500 is placed between inner conductor 490 and jacket 506. Inner conductor 490 is ferritic stainless steel or carbon steel with an outside diameter of 1.14 cm and a thickness of 0.445 cm. Core 508 is a copper core with a 0.25 cm diameter. Each leg 618 of the heater is coupled to terminal block 620. Terminal block 620 is filled with insulation material 622 and has an outer surface of stainless steel. Insulation material 622 is, in some embodiments, silicon nitride, boron nitride, magnesium oxide or other suitable electrically insulating material. Inner conductors 490 of legs 618 are coupled (welded) in terminal block 620. Jackets 506 of legs 618 are coupled (welded) to an outer surface of terminal block 620. Terminal block 620 may include two halves coupled around the coupled portions of legs 618.

Figure 64:
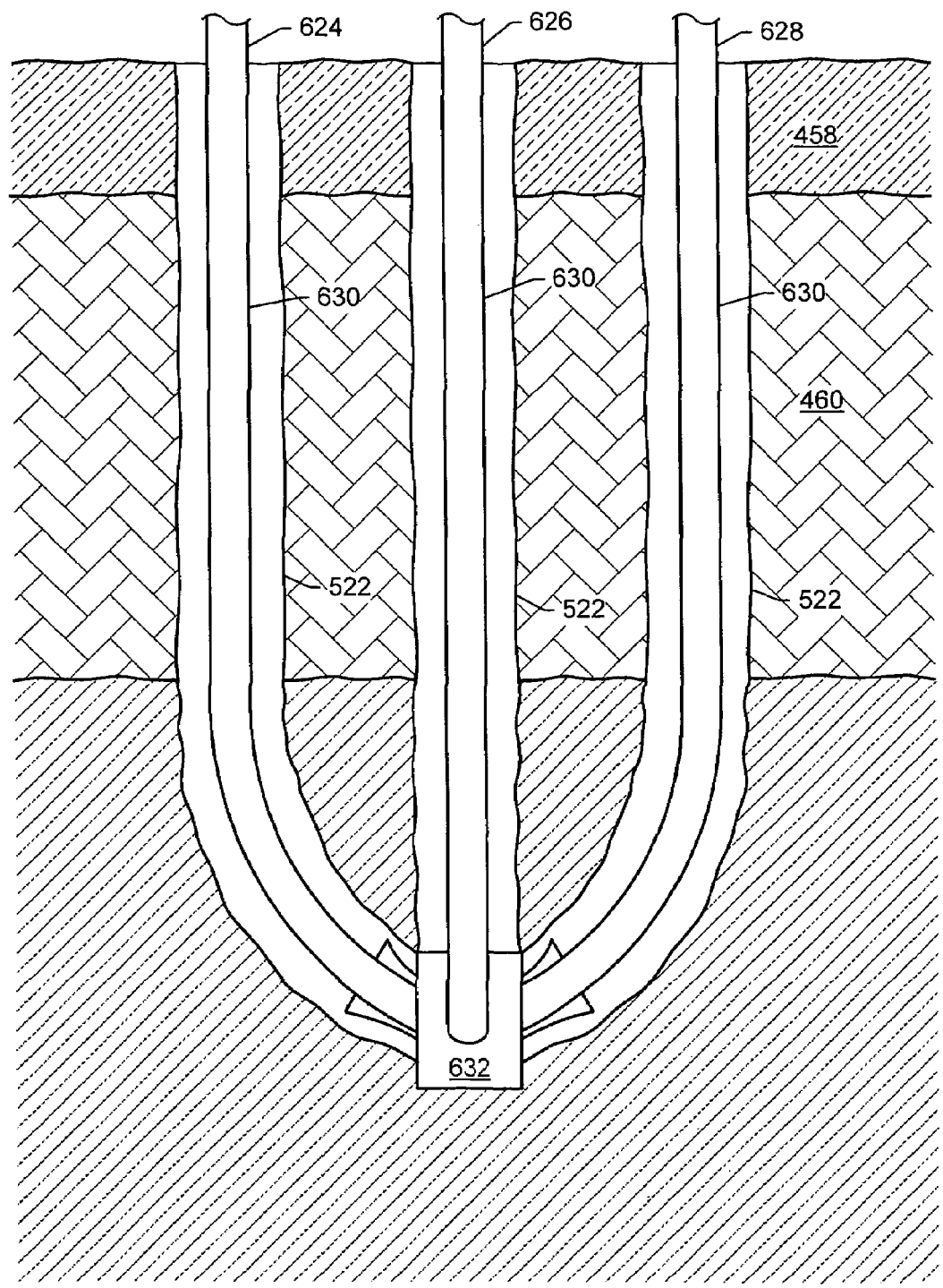
FIG. 64 depicts an embodiment of temperature limited heaters coupled together in a three-phase configuration.

In some embodiments, the three-phase heater includes three legs that are located in separate wellbores. The legs may be coupled in a common contacting section (for example, a central wellbore, a connecting wellbore, or a solution filled contacting section). FIG. 64 depicts an embodiment of temperature limited heaters coupled in a three-phase configuration. Each leg 624, 626, 628 may be located in separate openings 522 in hydrocarbon layer 460. Each leg 624, 626, 628 may include heating element 630. Each leg 624, 626, 628 may be coupled to single contacting element 632 in one opening 522. Contacting element 632 may electrically couple legs 624, 626, 628 together in a three-phase configuration. Contacting element 632 may be located in, for example, a central opening in the formation. Contacting element 632 may be located in a portion of opening 522 below hydrocarbon layer 460 (for example, in the underburden). In certain embodiments, magnetic tracking of a magnetic element located in a central opening (for example, opening 522 of leg 626) is used to guide the formation of the outer openings (for example, openings 522 of legs 624 and 628) so that the outer openings intersect the central opening. The central opening may be formed first using standard wellbore drilling methods. Contacting element 632 may include funnels, guides, or catchers for allowing each leg to be inserted into the contacting element.

FIG. 65 depicts an embodiment of three heaters coupled in a three-phase configuration. Conductor "legs" 624, 626, 628 are coupled to three-phase transformer 634. Transformer 634 may be an isolated three-phase transformer. In certain embodiments, transformer 634 provides three-phase output in a wye configuration, as shown in FIG. 65. Input to transformer 634 may be made in any input configuration (such as the delta configuration shown in FIG. 65). Legs 624, 626, 628 each include lead-in conductors 636 in the overburden of the formation coupled to heating elements 630 in hydrocarbon layer 460. Lead-in conductors 636 include copper with an insulation layer. For example, lead-in conductors 636 may be a 4-0 copper cables with TEFLON® insulation, a copper rod with polyurethane insulation, or other metal conductors such as bare copper or aluminum. In certain embodiments, lead-in conductors 636 are located in an overburden portion of the formation. The overburden portion may include overburden casings 530. Heating elements 630 may be temperature limited heater heating elements. In an embodiment, heating elements 630 are 410 stainless steel rods (for example, 3.1 cm diameter 410 stainless steel rods). In some embodiments, heating elements 630 are composite temperature limited heater heating elements (for example, 347 stainless steel, 410 stainless steel, copper composite heating elements; 347 stainless steel, iron, copper composite heating elements; or 410 stainless steel and copper composite heating elements). In certain embodiments, heating elements 630 have a length of at least about 10 m to about 2000 m, about 20 m to about 400 m, or about 30 m to about 300 m.

In certain embodiments, heating elements 630 are exposed to hydrocarbon layer 460 and fluids from the hydrocarbon layer. Thus, heating elements 630 are "bare metal" or "exposed metal" heating elements. Heating elements 630 may be made from a material that has an acceptable sulfidation rate at high temperatures used for pyrolyzing hydrocarbons. In certain embodiments, heating elements 630 are made from material that has a sulfidation rate that decreases with increasing temperature over at least a certain temperature range (for example, 500° C. to 650° C., 530° C. to 650° C., or 550° C. to 650° C.). For example, 410 stainless steel may have a sulfidation rate that decreases with increasing temperature between 530° C. and 650° C. Using such materials reduces corrosion problems due to sulfur-containing gases (such as $H_2S$) from the formation. In certain embodiments, heating elements 630 are made from material that has a sulfidation rate below a selected value in a temperature range. In some embodiments, heating elements 630 are made from material that has a sulfidation rate at most about 25 mils per year at a temperature between about 800° C. and about 880° C. In some embodiments, the sulfidation rate is at most about 35 mils per year at a temperature between about 800° C. and about 880° C., at most about 45 mils per year at a temperature between about 800° C. and about 880° C., or at most about 55 mils per year at a temperature between about 800° C. and about 880° C. Heating elements 630 may also be substantially inert to galvanic corrosion.

In some embodiments, heating elements 630 have a thin electrically insulating layer such as aluminum oxide or thermal spray coated aluminum oxide. In some embodiments, the thin electrically insulating layer is a ceramic composition such as an enamel coating. Enamel coatings include, but are not limited to, high temperature porcelain enamels. High temperature porcelain enamels may include silicon dioxide, boron oxide, alumina, and alkaline earth oxides (CaO or MgO), and minor amounts of alkali oxides ($Na_2O$, $K_2O$, LiO). The enamel coating may be applied as a finely ground slurry by dipping the heating element into the slurry or spray coating the heating element with the slurry. The coated heating element is then heated in a furnace until the glass transition temperature is reached so that the slurry spreads over the surface of the heating element and makes the porcelain enamel coating. The porcelain enamel coating contracts when cooled below the glass transition temperature so that the coating is in compression. Thus, when the coating is heated during operation of the heater, the coating is able to expand with the heater without cracking.

The thin electrically insulating layer has low thermal impedance allowing heat transfer from the heating element to the formation while inhibiting current leakage between heating elements in adjacent openings and/or current leakage into the formation. In certain embodiments, the thin electrically insulating layer is stable at temperatures above at least 350° C., above 500° C., or above 800° C. In certain embodiments, the thin electrically insulating layer has an emissivity of at least 0.7, at least 0.8, or at least 0.9. Using the thin electrically insulating layer may allow for long heater lengths in the formation with low current leakage.

Heating elements 630 may be coupled to contacting elements 632 at or near the underburden of the formation. Contacting elements 632 are copper or aluminum rods or other highly conductive materials. In certain embodiments, transition sections 638 are located between lead-in conductors 636 and heating elements 630, and/or between heating elements 630 and contacting elements 632. Transition sections 638 may be made of a conductive material that is corrosion resistant such as 347 stainless steel over a copper core. In certain embodiments, transition sections 638 are made of materials that electrically couple lead-in conductors 636 and heating elements 630 while providing little or no heat output. Thus, transition sections 638 help to inhibit overheating of conductors and insulation used in lead-in conductors 636 by spacing the lead-in conductors from heating elements 630. Transition section 638 may have a length of between about 3 m and about 9 m (for example, about 6 m).

Contacting elements 632 are coupled to contactor 640 in contacting section 642 to electrically couple legs 624, 626, 628 to each other. In some embodiments, contact solution 644 (for example, conductive cement) is placed in contacting section 642 to electrically couple contacting elements 632 in the contacting section. In certain embodiments, legs 624, 626, 628 are substantially parallel in hydrocarbon layer 460 and leg 624 continues substantially vertically into contacting section 642. The other two legs 626, 628 are directed (for example, by directionally drilling the wellbores for the legs) to intercept leg 624 in contacting section 642.

Each leg 624, 626, 628 may be one leg of a three-phase heater embodiment so that the legs are substantially electrically isolated from other heaters in the formation and are substantially electrically isolated from the formation. Legs 624, 626, 628 may be arranged in a triangular pattern so that the three legs form a triangular shaped three-phase heater. In an embodiment, legs 624, 626, 628 are arranged in a triangular pattern with 12 m spacing between the legs (each side of the triangle has a length of 12 m).

Figure 66:
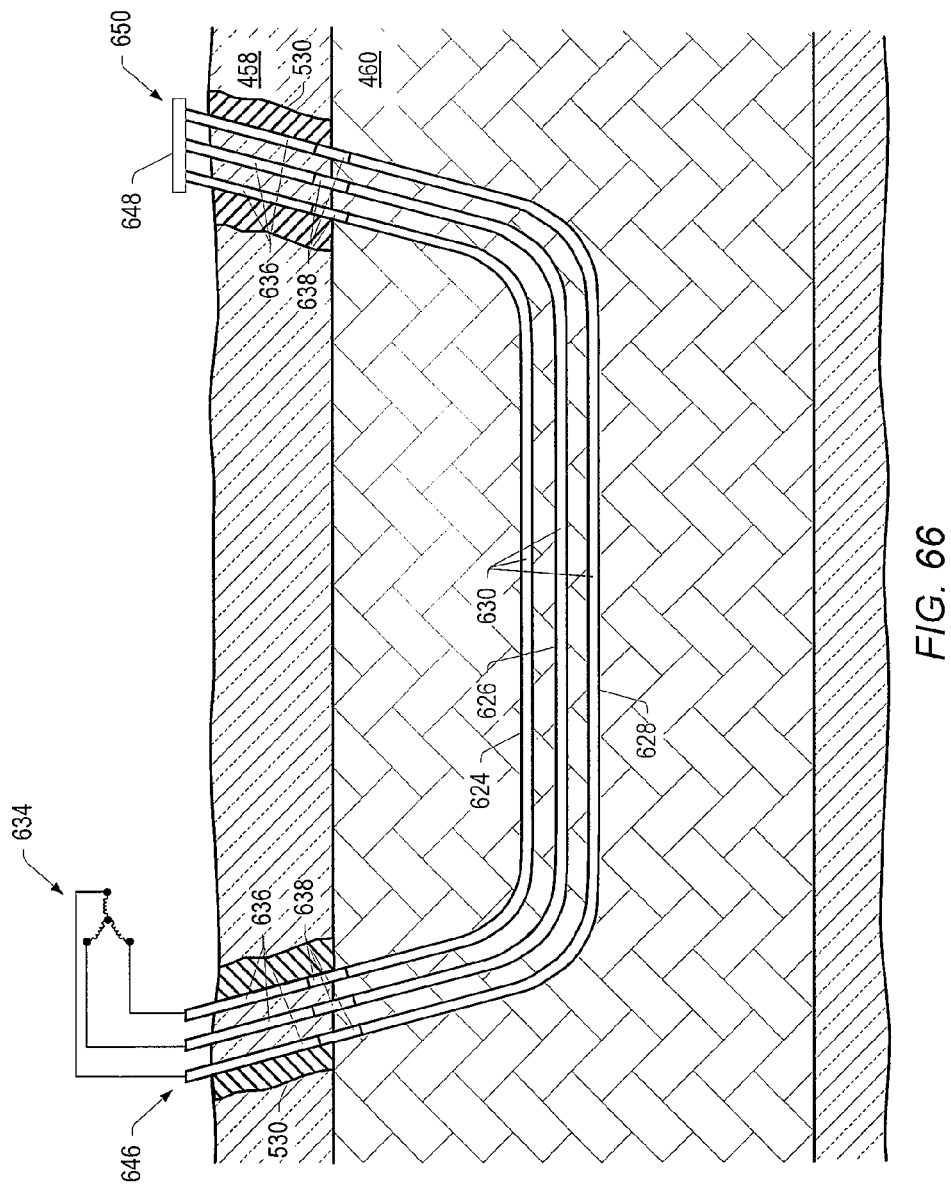
FIG. 66 depicts a side view representation of an embodiment of a substantially u-shaped three-phase heater.

In certain embodiments, the thin electrically insulating layer allows for relatively long, substantially horizontal heater leg lengths in the hydrocarbon layer with a substantially u-shaped heater. FIG. 66 depicts a side-view representation of an embodiment of a substantially u-shaped three-phase heater. First ends of legs 624, 626, 628 are coupled to transformer 634 at first location 646. In an embodiment, transformer 634 is a three-phase AC transformer. Ends of legs 624, 626, 628 are electrically coupled together with connector 648 at second location 650. Connector 648 electrically couples the ends of legs 624, 626, 628 so that the legs can be operated in a three-phase configuration. In certain embodiments, legs 624, 626, 628 are coupled to operate in a three-phase wye configuration. In certain embodiments, legs 624, 626, 628 are substantially parallel in hydrocarbon layer 460. In certain embodiments, legs 624, 626, 628 are arranged in a triangular pattern in hydrocarbon layer 460. In certain embodiments, heating elements 630 include a thin electrically insulating material (such as a porcelain enamel coating) to inhibit current leakage from the heating elements. In certain embodiments, legs 624, 626, 628 are electrically coupled so that the legs are substantially electrically isolated from other heaters in the formation and are substantially electrically isolated from the formation.

In certain embodiments, overburden casings (for example, overburden casings 530, depicted in FIGS. 65 and 66) in overburden 458 include materials that inhibit ferromagnetic effects in the casings. Inhibiting ferromagnetic effects in casings 530 reduces heat losses to the overburden. In some embodiments, casings 530 may include non-metallic materials such as fiberglass, polyvinylchloride (PVC), chlorinated polyvinylchloride (CPVC), or high-density polyethylene (HDPE). HDPEs with working temperatures in a range for use in overburden 458 include HDPEs available from Dow Chemical Co., Inc. (Midland, Mich., U.S.A.). A non-metallic casing may also eliminate the need for an insulated overburden conductor. In some embodiments, casings 530 include carbon steel coupled on the inside diameter of a non-ferromagnetic metal (for example, carbon steel clad with copper or aluminum) to inhibit ferromagnetic effects or inductive effects in the carbon steel. Other non-ferromagnetic metals include, but are not limited to, manganese steels with at least 10% by weight manganese, iron aluminum alloys with at least 18% by weight aluminum, and austentitic stainless steels such as 304 stainless steel or 316 stainless steel.

In certain embodiments, one or more non-ferromagnetic materials used in casings 530 are used in a wellhead coupled to the casings and legs 624, 626, 628. Using non-ferromagnetic materials in the wellhead inhibits undesirable heating of components in the wellhead. In some embodiments, a purge gas (for example, carbon dioxide, nitrogen or argon) is introduced into the wellhead and/or inside of casings 530 to inhibit reflux of heated gases into the wellhead and/or the casings.

In certain embodiments, one or more of legs 624, 626, 628 are installed in the formation using coiled tubing. In certain embodiments, coiled tubing is installed in the formation, the leg is installed inside the coiled tubing, and the coiled tubing is pulled out of the formation to leave the leg installed in the formation. The leg may be placed concentrically inside the coiled tubing. In some embodiments, coiled tubing with the leg inside the coiled tubing is installed in the formation and the coiled tubing is removed from the formation to leave the leg installed in the formation. The coiled tubing may extend only to a junction of the hydrocarbon layer and the contacting section or to a point at which the leg begins to bend in the contacting section.

FIG. 67 depicts a top view representation of an embodiment of a plurality of triads of three-phase heaters in the formation. Each triad 652 includes legs A, B, C (which may correspond to legs 624, 626, 628 depicted in FIGS. 65 and 66) that are electrically coupled by linkage 654. Each triad 652 is coupled to its own electrically isolated three-phase transformer so that the triads are substantially electrically isolated from each other. Electrically isolating the triads inhibits net current flow between triads.

The phases of each triad 652 may be arranged so that legs A, B, C correspond between triads as shown in FIG. 67. In FIG. 67, legs A, B, C are arranged such that a phase leg (for example, leg A) in a given triad is about two triad heights from a same phase leg (leg A) in an adjacent triad. The triad height is the distance from a vertex of the triad to a midpoint of the line intersecting the other two vertices of the triad. In certain embodiments, the phases of triads 652 are arranged to inhibit net current flow between individual triads. There may be some leakage of current within an individual triad but little net current flows between two triads due to the substantial electrical isolation of the triads and, in certain embodiments, the arrangement of the triad phases.

In the early stages of heating, an exposed heating element (for example, heating element 630 depicted in FIGS. 65 and 66) may leak some current to water or other fluids that are electrically conductive in the formation so that the formation itself is heated. After water or other electrically conductive fluids are removed from the wellbore (for example, vaporized or produced), the heating elements become electrically isolated from the formation. Later, when water is removed from the formation, the formation becomes even more electrically resistant and heating of the formation occurs even more predominantly via thermally conductive and/or radiative heating. Typically, the formation (the hydrocarbon layer) has an initial electrical resistance that averages at least 10 ohm·m. In some embodiments, the formation has an initial electrical resistance of at least 100 ohm·m or of at least 300 ohm·m.

Using the temperature limited heaters as the heating elements limits the effect of water saturation on heater efficiency. With water in the formation and in heater wellbores, there is a tendency for electrical current to flow between heater elements at the top of the hydrocarbon layer where the voltage is highest and cause uneven heating in the hydrocarbon layer. This effect is inhibited with temperature limited heaters because the temperature limited heaters reduce localized overheating in the heating elements and in the hydrocarbon layer.

Figure 68:
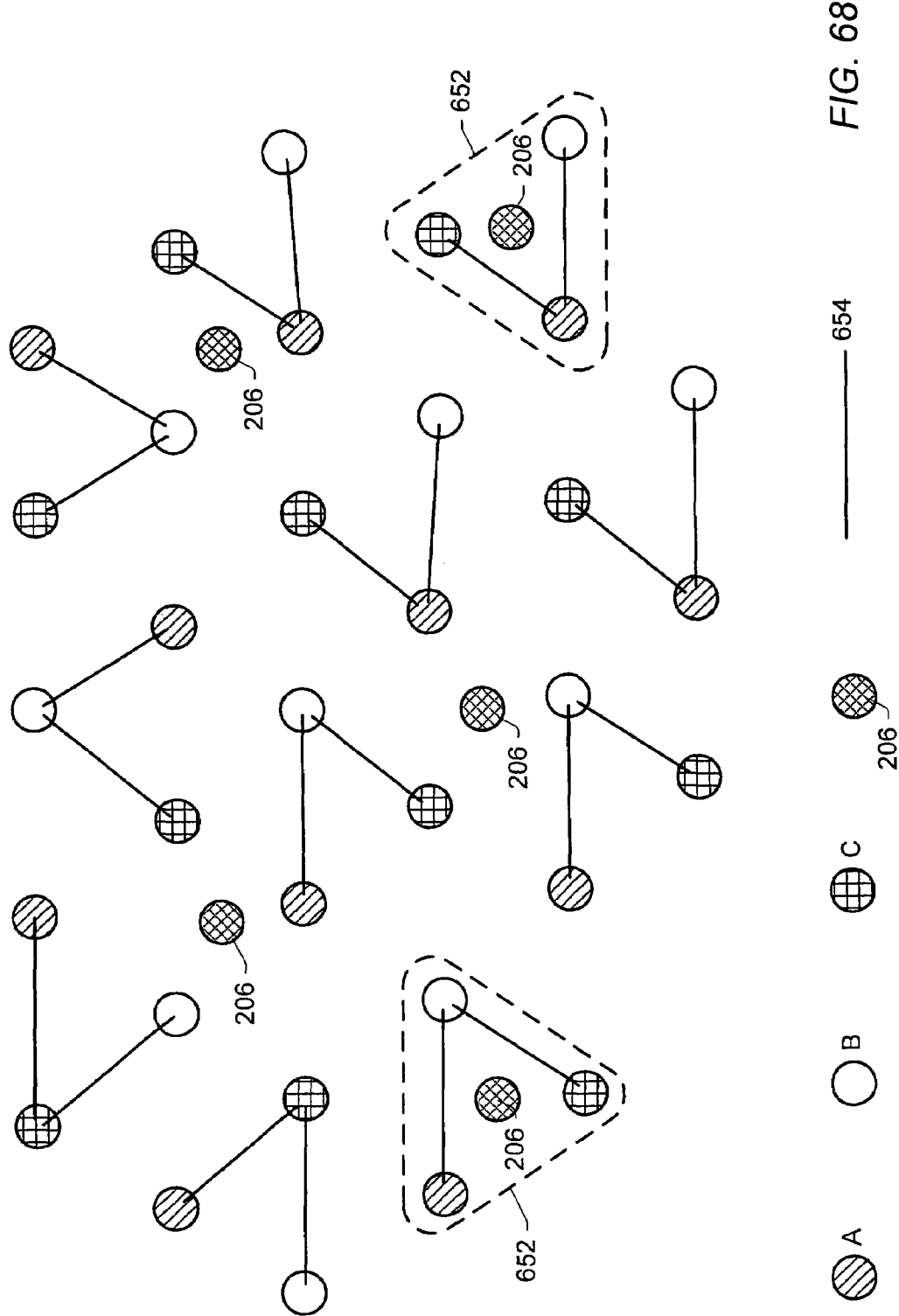
FIG. 68 depicts a top view representation of the embodiment depicted in FIG. 67 with production wells.

In certain embodiments, production wells are placed at a location at which there is relatively little or zero voltage potential. This location minimizes stray potentials at the production well. Placing production wells at such locations improves the safety of the system and reduces or inhibits undesired heating of the production wells caused by electrical current flow in the production wells. FIG. 68 depicts a top view representation of the embodiment depicted in FIG. 67 with production wells 206. In certain embodiments, production wells 206 are located at or near center of triad 652. In certain embodiments, production wells 206 are placed at a location between triads at which there is relatively little or zero voltage potential (at a location at which voltage potentials from vertices of three triads average out to relatively little or zero voltage potential). For example, production well 206 may be at a location equidistant from legs A of one triad, leg B of a second triad, and leg C of a third triad, as shown in FIG. 68.

FIG. 69 depicts a top view representation of an embodiment of a plurality of triads of three-phase heaters in a hexagonal pattern in the formation. FIG. 70 depicts a top view representation of an embodiment of a hexagon from FIG. 69. Hexagon 656 includes two triads of heaters. The first triad includes legs A1, B1, C1 electrically coupled together by linkages 654 in a three-phase configuration. The second triad includes legs A2, B2, C2 electrically coupled together by linkages 654 in a three-phase configuration. The triads are arranged so that corresponding legs of the triads (for example, A1 and A2, B1 and B2, C1 and C2) are at opposite vertices of hexagon 656. The triads are electrically coupled and arranged so that there is relatively little or zero voltage potential at or near the center of hexagon 656.

Production well 206 may be placed at or near the center of hexagon 656. Placing production well 206 at or near the center of hexagon 656 places the production well at a location that reduces or inhibits undesired heating due to electromagnetic effects caused by electrical current flow in the legs of the triads and increases the safety of the system. Having two triads in hexagon 656 provides for redundant heating around production well 206. Thus, if one triad fails or has to be turned off, production well 206 still remains at a center of one triad.

As shown in FIG. 69, hexagons 656 may be arranged in a pattern in the formation such that adjacent hexagons are offset. Using electrically isolated transformers on adjacent hexagons may inhibit electrical potentials in the formation so that little or no net current leaks between hexagons.

Triads of heaters and/or heater legs may be arranged in any shape or desired pattern. For example, as described above, triads may include three heaters and/or heater legs arranged in an equilateral triangular pattern. In some embodiments, triads include three heaters and/or heater legs arranged in other triangular shapes (for example, an isosceles triangle or a right angle triangle). In some embodiments, heater legs in the triad cross each other (for example, criss-cross) in the formation. In certain embodiments, triads includes three heaters and/or heater legs arranged sequentially along a straight line.

FIG. 71 depicts an embodiment with triads coupled to a horizontal connector well. Triad 652A includes legs 624A, 626A, 628A. Triad 652B includes legs 624B, 626B, 628B. Legs 624A, 626A, 628A and legs 624B, 626B, 628B may be arranged along a straight line on the surface of the formation. In some embodiments, legs 624A, 626A, 628A are arranged along a straight line and offset from legs 624B, 626B, 628B, which may be arranged along a straight line. Legs 624A, 626A, 628A and legs 624B, 626B, 628B include heating elements 630 located in hydrocarbon layer 460. Lead-in conductors 636 couple heating elements 630 to the surface of the formation. Heating elements 630 are coupled to contacting elements 632 at or near the underburden of the formation. In certain embodiments, transition sections (for example, transition sections 638 depicted in FIG. 65) are located between lead-in conductors 636 and heating elements 630, and/or between heating elements 630 and contacting elements 632.

Contacting elements 632 are coupled to contactor 640 in contacting section 642 to electrically couple legs 624A, 626A, 628A to each other to form triad 652A and electrically couple legs 624B, 626B, 628B to each other to form triad 652B. In certain embodiments, contactor 640 is a ground conductor so that triad 652A and/or triad 652B may be coupled in three-phase wye configurations. In certain embodiments, triad 652A and triad 652B are electrically isolated from each other. In some embodiments, triad 652A and triad 652B are electrically coupled to each other (for example, electrically coupled in series or parallel).

In certain embodiments, contactor 640 is a substantially horizontal contactor located in contacting section 642. Contactor 640 may be a casing or a solid rod placed in a wellbore drilled substantially horizontally in contacting section 642. Legs 624A, 626A, 628A and legs 624B, 626B, 628B may be electrically coupled to contactor 640 by any method described herein or any method known in the art. For example, containers with thermite powder are coupled to contactor 640 (for example, by welding or brazing the containers to the contactor); legs 624A, 626A, 628A and legs 624B, 626B, 628B are placed inside the containers; and the thermite powder is activated to electrically couple the legs to the contactor. The containers may be coupled to contactor 640 by, for example, placing the containers in holes or recesses in contactor 640 or coupled to the outside of the contactor and then brazing or welding the containers to the contactor.

Figure 72:
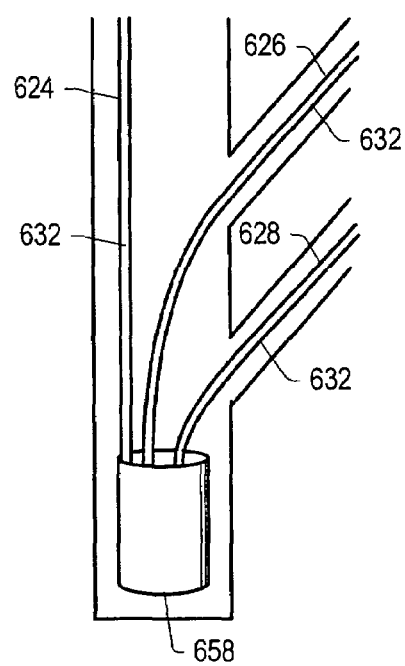
FIGS. 72 and 73 depict embodiments for coupling contacting elements of three legs of a heater.
Figure 73:
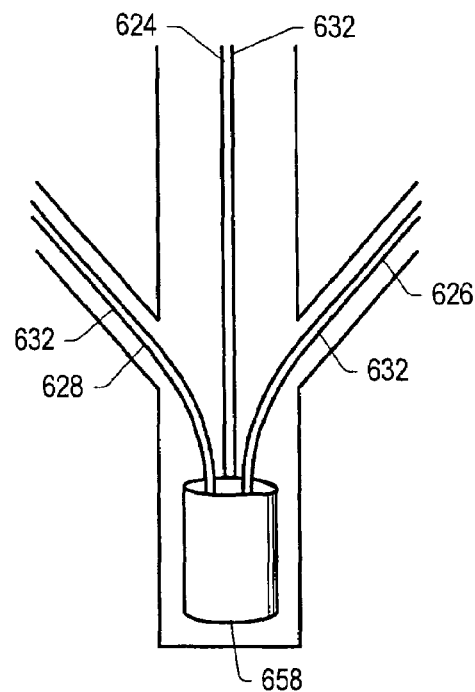

As shown in FIG. 65, contacting elements 632 of legs 624, 626, 628 may be coupled using contactor 640 and/or contact solution 644. In certain embodiments, contacting elements 632 of legs 624, 626, 628 are physically coupled, for example, through soldering, welding, or other techniques. FIGS. 72 and 73 depict embodiments for coupling contacting elements 632 of legs 624, 626, 628. Legs 626, 628 may enter the wellbore of leg 624 from any direction desired. In one embodiment, legs 626, 628 enter the wellbore of leg 624 from approximately the same side of the wellbore, as shown in FIG. 72. In an alternative embodiment, legs 626, 628 enter the wellbore of leg 624 from approximately opposite sides of the wellbore, as shown in FIG. 73.

Container 658 is coupled to contacting element 632 of leg 624. Container 658 may be soldered, welded, or otherwise electrically coupled to contacting element 632. Container 658 is a metal can or other container with at least one opening for receiving one or more contacting elements 632. In an embodiment, container 658 is a can that has an opening for receiving contacting elements 632 from legs 626, 628, as shown in FIG. 72. In certain embodiments, wellbores for legs 626, 628 are drilled parallel to the wellbore for leg 624 through the hydrocarbon layer that is to be heated and directionally drilled below the hydrocarbon layer to intercept wellbore for leg 624 at an angle between about 10° and about 20° from vertical. Wellbores may be directionally drilled using known techniques such as techniques used by Vector Magnetics, Inc.

In some embodiments, contacting elements 632 contact the bottom of container 658. Contacting elements 632 may contact the bottom of container 658 and/or each other to promote electrical connection between the contacting elements and/or the container. In certain embodiments, end portions of contacting elements 632 are annealed to a "dead soft" condition to facilitate entry into container 658. In some embodiments, rubber or other softening material is attached to end portions of contacting elements 632 to facilitate entry into container 658. In some embodiments, contacting elements 632 include reticulated sections, such as knuckle-joints or limited rotation knuckle-joints, to facilitate entry into container 658.

In certain embodiments, an electrical coupling material is placed in container 658. The electrical coupling material may line the walls of container 658 or fill up a portion of the container. In certain embodiments, the electrical coupling material lines an upper portion, such as the funnel-shaped portion shown in FIG. 74, of container 658. The electrical coupling material includes one or more materials that when activated (for example, heated, ignited, exploded, combined, mixed, and/or reacted) form a material that electrically couples one or more elements to each other. In an embodiment, the coupling material electrically couples contacting elements 632 in container 658. In some embodiments, the coupling material metallically bonds to contacting elements 632 so that the contacting elements are metallically bonded to each other. In some embodiments, container 658 is initially filled with a high viscosity water-based polymer fluid to inhibit drill cuttings or other materials from entering the container prior to using the coupling material to couple the contacting elements. The polymer fluid may be, but is not limited to, a cross-linked XC polymer (available from Baroid Industrial Drilling Products (Houston, Tex., U.S.A.)), a frac gel, or a cross-linked polyacrylamide gel.

In certain embodiments, the electrical coupling material is a low-temperature solder that melts at relatively low temperature and when cooled forms an electrical connection to exposed metal surfaces. In certain embodiments, the electrical coupling material is a solder that melts at a temperature below the boiling point of water at the depth of container 658. In one embodiment, the electrical coupling material is a 58% by weight bismuth and 42% by weight tin eutectic alloy. Other examples of such solders include, but are not limited to, a 54% by weight bismuth, 16% by weight tin, 30% by weight indium alloy, and a 48% by weight tin, 52% by weight indium alloy. Such low-temperature solders will displace water upon melting so that the water moves to the top of container 658. Water at the top of container 658 may inhibit heat transfer into the container and thermally insulate the low-temperature solder so that the solder remains at cooler temperatures and does not melt during heating of the formation using the heating elements.

Container 658 may be heated to activate the electrical coupling material to facilitate the connection of contacting elements 632. In certain embodiments, container 658 is heated to melt the electrical coupling material in the container. The electrical coupling material flows when melted and surrounds contacting elements 632 in container 658. Any water within container 658 will float to the surface of the metal when the metal is melted. The electrical coupling material is allowed to cool and electrically connects contacting elements 632 to each other. In certain embodiments, contacting elements 632 of legs 626, 628, the inside walls of container 658, and/or the bottom of the container are initially pre-tinned with electrical coupling material.

End portions of contacting elements 632 of legs 624, 626, 628 may have shapes and/or features that enhance the electrical connection between the contacting elements and the coupling material. The shapes and/or features of contacting elements 632 may also enhance the physical strength of the connection between the contacting elements and the coupling material (for example, the shape and/or features of the contacting element may anchor the contacting element in the coupling material). Shapes and/or features for end portions of contacting elements 632 include, but are not limited to, grooves, notches, holes, threads, serrated edges, openings, and hollow end portions. In certain embodiments, the shapes and/or features of the end portions of contacting elements 632 are initially pre-tinned with electrical coupling material.

Figure 74:
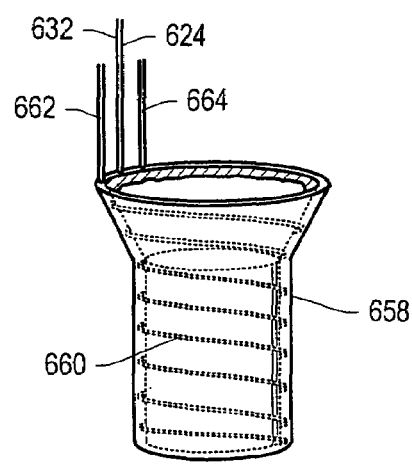
FIG. 74 depicts an embodiment of a container with an initiator for melting the coupling material.

FIG. 74 depicts an embodiment of container 658 with an initiator for melting the coupling material. The initiator is an electrical resistance heating element or any other element for providing heat that activates or melts the coupling material in container 658. In certain embodiments, heating element 660 is a heating element located in the walls of container 658. In some embodiments, heating element 660 is located on the outside of container 658. Heating element 660 may be, for example, a nichrome wire, a mineral-insulated conductor, a polymer-insulated conductor, a cable, or a tape that is inside the walls of container 658 or on the outside of the container. In some embodiments, heating element 660 wraps around the inside walls of the container or around the outside of the container. Lead-in wire 662 may be coupled to a power source at the surface of the formation. Lead-out wire 664 may be coupled to the power source at the surface of the formation. Lead-in wire 662 and/or lead-out wire 664 may be coupled along the length of leg 624 for mechanical support. Lead-in wire 662 and/or lead-out wire 664 may be removed from the wellbore after melting the coupling material. Lead-in wire 662 and/or lead-out wire 664 may be reused in other wellbores.

In some embodiments, container 658 has a funnel-shape, as shown in FIG. 74, that facilitates the entry of contacting elements 632 into the container. In certain embodiments, container 658 is made of or includes copper for good electrical and thermal conductivity. A copper container 658 makes good electrical contact with contacting elements (such as contacting elements 632 shown in FIGS. 72 and 73) if the contacting elements touch the walls and/or bottom of the container.

FIG. 75 depicts an embodiment of container 658 with bulbs on contacting elements 632. Protrusions 666 may be coupled to a lower portion of contacting elements 632. Protrusions 668 may be coupled to the inner wall of container 658. Protrusions 666, 668 may be made of copper or another suitable electrically conductive material. Lower portion of contacting element 632 of leg 628 may have a bulbous shape, as shown in FIG. 75. In certain embodiments, contacting element 632 of leg 628 is inserted into container 658. Contacting element 632 of leg 626 is inserted after insertion of contacting element 632 of leg 628. Both legs may then be pulled upwards simultaneously. Protrusions 666 may lock contacting elements 632 into place against protrusions 668 in container 658. A friction fit is created between contacting elements 632 and protrusions 666, 668.

Lower portions of contacting elements 632 inside container 658 may include 410 stainless steel or any other heat generating electrical conductor. Portions of contacting elements 632 above the heat generating portions of the contacting elements include copper or another highly electrically conductive material. Centralizers 524 may be located on the portions of contacting elements 632 above the heat generating portions of the contacting elements. Centralizers 524 inhibit physical and electrical contact of portions of contacting elements 632 above the heat generating portions of the contacting elements against walls of container 658.

When contacting elements 632 are locked into place inside container 658 by protrusions 666, 668, at least some electrical current may be pass between the contacting elements through the protrusions. As electrical current is passed through the heat generating portions of contacting elements 632, heat is generated in container 658. The generated heat may melt coupling material 670 located inside container 658. Water in container 658 may boil. The boiling water may convect heat to upper portions of container 658 and aid in melting of coupling material 670. Walls of container 658 may be thermally insulated to reduce heat losses out of the container and allow the inside of the container to heat up faster. Coupling material 670 flows down into the lower portion of container 658 as the coupling material melts. Coupling material 670 fills the lower portion of container 658 until the heat generating portions of contacting elements 632 are below the fill line of the coupling material. Coupling material 670 then electrically couples the portions of contacting elements 632 above the heat generating portions of the contacting elements. The resistance of contacting elements 632 decreases at this point and heat is no longer generated in the contacting elements and the coupling materials is allowed to cool.

In certain embodiments, container 658 includes insulation layer 672 inside the housing of the container. Insulation layer 672 may include thermally insulating materials to inhibit heat losses from the canister. For example, insulation layer 672 may include magnesium oxide, silicon nitride, or other thermally insulating materials that withstand operating temperatures in container 658. In certain embodiments, container 658 includes liner 674 on an inside surface of the container. Liner 674 may increase electrical conductivity inside container 658. Liner 674 may include electrically conductive materials such as copper or aluminum.

FIG. 76 depicts an alternative embodiment for container 658. Coupling material in container 658 includes powder 676. Powder 676 is a chemical mixture that produces a molten metal product from a reaction of the chemical mixture. In an embodiment, powder 676 is thermite powder. Powder 676 lines the walls of container 658 and/or is placed in the container. Igniter 678 is placed in powder 676. Igniter 678 may be, for example, a magnesium ribbon that when activated ignites the reaction of powder 676. When powder 676 reacts, a molten metal produced by the reaction flows and surrounds contacting elements 632 placed in container 658. When the molten metal cools, the cooled metal electrically connects contacting elements 632. In some embodiments, powder 676 is used in combination with another coupling material, such as a low-temperature solder, to couple contacting elements 632. The heat of reaction of powder 676 may be used to melt the low temperature-solder.

In certain embodiments, an explosive element is placed in container 658, depicted in FIG. 72 or FIG. 76. The explosive element may be, for example, a shaped charge explosive or other controlled explosive element. The explosive element may be exploded to crimp contacting elements 632 and/or container 658 together so that the contacting elements and the container are electrically connected. In some embodiments, an explosive element is used in combination with an electrical coupling material such as low-temperature solder or thermite powder to electrically connect contacting elements 632.

FIG. 77 depicts an alternative embodiment for coupling contacting elements 632 of legs 624, 626, 628. Container 658A is coupled to contacting element 632 of leg 626. Container 658B is coupled to contacting element 632 of leg 628. Container 658B is sized and shaped to be placed inside container 658A. Container 658C is coupled to contacting element 632 of leg 624. Container 658C is sized and shaped to be placed inside container 658B. In some embodiments, contacting element 632 of leg 624 is placed in container 658B without a container attached to the contacting element. One or more of containers 658A, 658B, 658C may be filled with a coupling material that is activated to facilitate an electrical connection between contacting elements 632 as described above.

Figure 78:
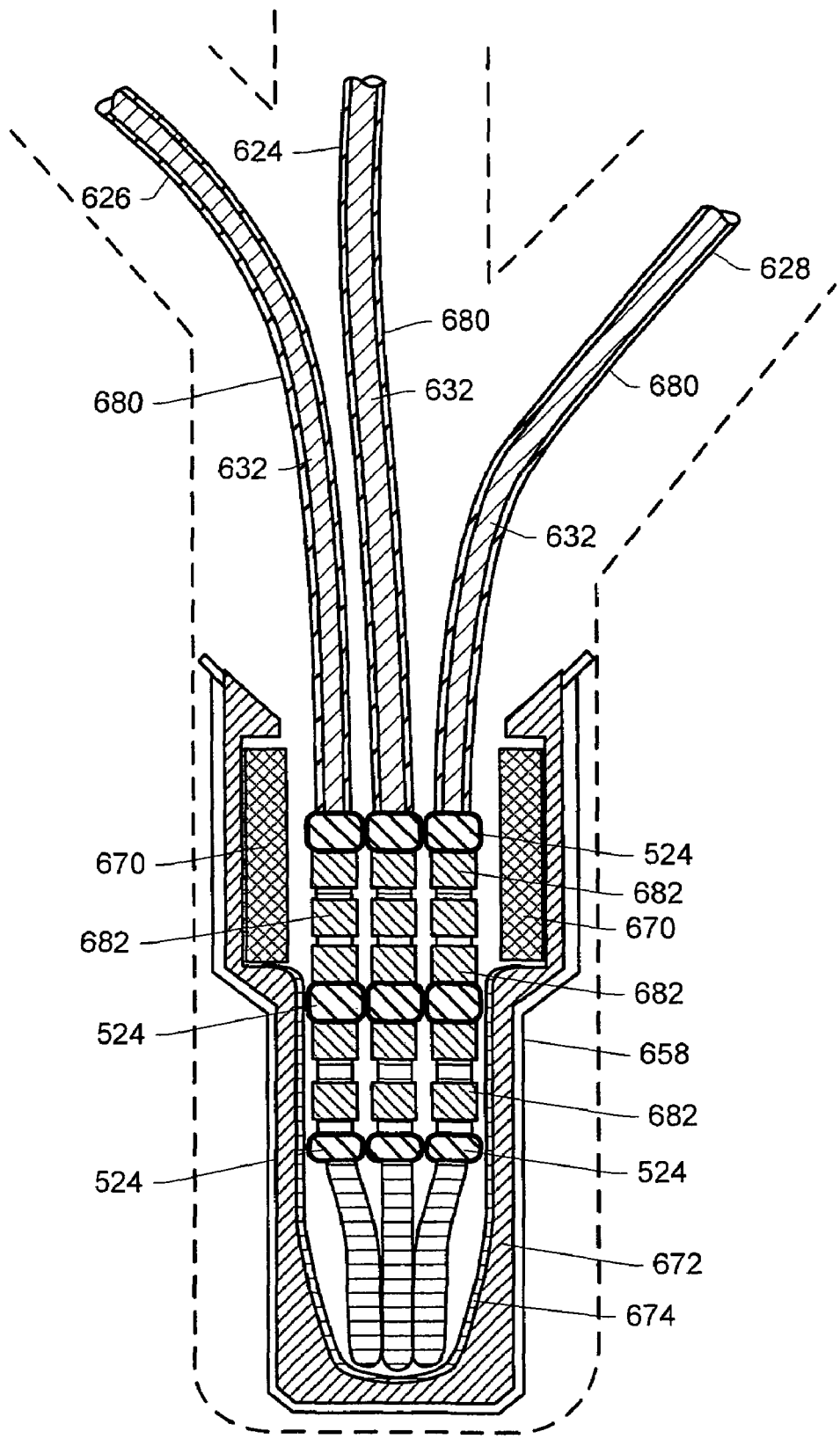
FIG. 78 depicts a cross-sectional representation of an embodiment for coupling contacting elements using temperature limited heating elements.

FIG. 78 depicts a cross-sectional representation of an embodiment for coupling contacting elements using temperature limited heating elements. Contacting elements 632 of legs 624, 626, 628 may have insulation 680 on portions of the contacting elements above container 658. Container 658 may be shaped and/or have guides at the top to guide the insertion of contacting elements 632 into the container. Coupling material 670 may be located inside container 658 at or near a top of the container. Coupling material 670 may be, for example, a solder material. In some embodiments, inside walls of container 658 are pre-coated with coupling material or another electrically conductive material such as copper or aluminum. Centralizers 524 may be coupled to contacting elements 632 to maintain a spacing of the contacting elements in container 658. Container 658 may be tapered at the bottom to push lower portions of contacting elements 632 together for at least some electrical contact between the lower portions of the contacting elements.

Heating elements 682 may be coupled to portions of contacting elements 632 inside container 658. Heating elements 682 may include ferromagnetic materials such as iron or stainless steel. In an embodiment, heating elements 682 are iron cylinders clad onto contacting elements 632. Heating elements 682 may be designed with dimensions and materials that will produce a desired amount of heat in container 658. In certain embodiments, walls of container 658 are thermally insulated with insulation layer 672, as shown in FIG. 78 to inhibit heat loss from the container. Heating elements 682 may be spaced so that contacting elements 632 have one or more portions of exposed material inside container 658. The exposed portions include exposed copper or another suitable highly electrically conductive material. The exposed portions allow for better electrical contact between contacting elements 632 and coupling material 670 after the coupling material has been melted, fills container 658, and is allowed to cool.

In certain embodiments, heating elements 682 operate as temperature limited heaters when a time-varying current is applied to the heating elements. For example, a 400 Hz, AC current may be applied to heating elements 682. Application of the time-varying current to contacting elements 632 causes heating elements 682 to generate heat and melt coupling material 670. Heating elements 682 may operate as temperature limited heating elements with a self-limiting temperature selected so that coupling material 670 is not overheated. As coupling material 670 fills container 658, the coupling material makes electrical contact between portions of exposed material on contacting elements 632 and electrical current begins to flow through the exposed material portions rather than heating elements 682. Thus, the electrical resistance between the contacting elements decreases. As this occurs, temperatures inside container 658 begin to decrease and coupling material 670 is allowed to cool to create an electrical contacting section between contacting elements 632. In certain embodiments, electrical power to contacting elements 632 and heating elements 682 is turned off when the electrical resistance in the system falls below a selected resistance. The selected resistance may indicate that the coupling material has sufficiently electrically connected the contacting elements. In some embodiments, electrical power is supplied to contacting elements 632 and heating elements 682 for a selected amount of time that is determined to provide enough heat to melt the mass of coupling material 670 provided in container 658.

Figure 79:
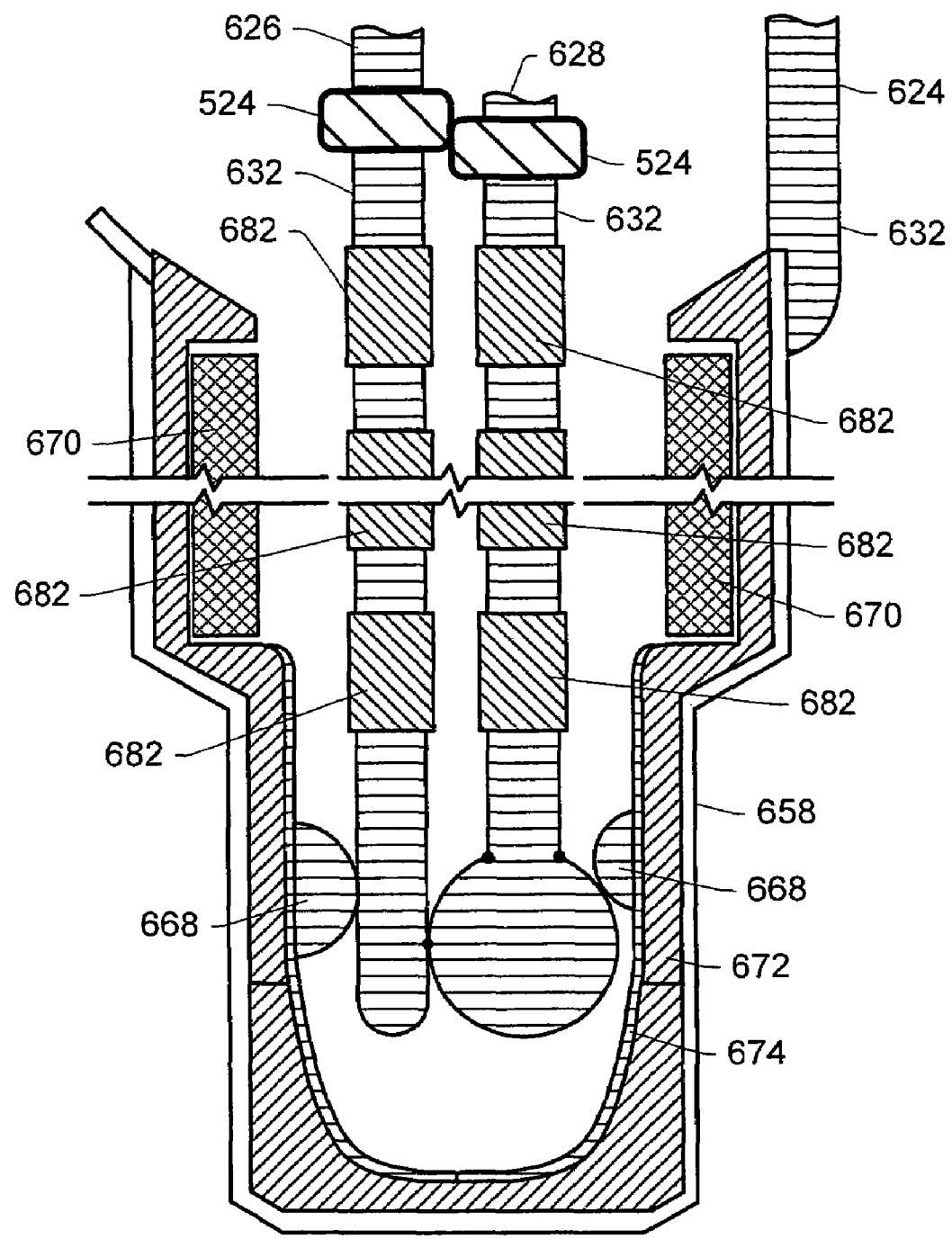
FIG. 79 depicts a cross-sectional representation of an alternative embodiment for coupling contacting elements using temperature limited heating elements.

FIG. 79 depicts a cross-sectional representation of an alternative embodiment for coupling contacting elements using temperature limited heating elements. Contacting element 632 of leg 624 may be coupled to container 658 by welding, brazing, or another suitable method. Lower portion of contacting element 632 of leg 628 may have a bulbous shape. Contacting element 632 of leg 628 is inserted into container 658. Contacting element 632 of leg 626 is inserted after insertion of contacting element 632 of leg 628. Both legs may then be pulled upwards simultaneously. Protrusions 668 may lock contacting elements 632 into place and a friction fit may be created between the contacting elements 632. Centralizers 524 may inhibit electrical contact between upper portions of contacting elements 632.

Time-varying electrical current may be applied to contacting elements 632 so that heating elements 682 generate heat. The generated heat may melt coupling material 670 located in container 658, as described for the embodiment depicted in FIG. 78. After cooling of coupling material 670, contacting elements 632 of legs 626, 628, shown in FIG. 79, are electrically coupled in container 658 with the coupling material. In some embodiments, lower portions of contacting elements 632 have protrusions or openings that anchor the contacting elements in cooled coupling material. Exposed portions of the contacting elements provide a low electrical resistance path between the contacting elements and the coupling material.

FIG. 80 depicts a cross-sectional representation of another embodiment for coupling contacting elements using temperature limited heating elements. Contacting element 632 of leg 624 may be coupled to container 658 by welding, brazing, or another suitable method. Lower portion of contacting element 632 of leg 628 may have a bulbous shape. Contacting element 632 of leg 628 is inserted into container 658. Contacting element 632 of leg 626 is inserted after insertion of contacting element 632 of leg 628. Both legs may then be pulled upwards simultaneously. Protrusions 668 may lock contacting elements 632 into place and a friction fit may be created between the contacting elements 632. Centralizers 524 may inhibit electrical contact between upper portions of contacting elements 632.

End portions 632B of contacting elements 632 may be made of a ferromagnetic material such as 410 stainless steel. Portions 632A may include non-ferromagnetic electrically conductive material such as copper or aluminum. Time-varying electrical current may be applied to contacting elements 632 so that end portions 632B generate heat due to the resistance of the end portions. The generated heat may melt coupling material 670 located in container 658, as described for the embodiment depicted in FIG. 78. After cooling of coupling material 670, contacting elements 632 of legs 626, 628, shown in FIG. 79, are electrically coupled in container 658 with the coupling material. Portions 632A may be below the fill line of coupling material 670 so that these portions of the contacting elements provide a low electrical resistance path between the contacting elements and the coupling material.

Figure 82:
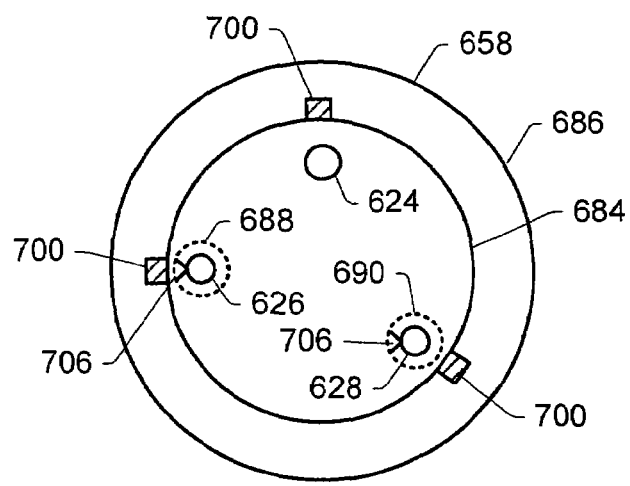
FIG. 82 depicts a top view representation of the alternative embodiment for coupling contacting elements of three legs of a heater depicted in FIG. 81.

FIG. 81 depicts a side view representation of an alternative embodiment for coupling contacting elements of three legs of a heater. FIG. 82 depicts a top view representation of the alternative embodiment for coupling contacting elements of three legs of a heater depicted in FIG. 81. Container 658 may include inner container 684 and outer container 686. Inner container 684 may be made of copper or another malleable, electrically conductive metal such as aluminum. Outer container 686 may be made of a rigid material such as stainless steel. Outer container 686 protects inner container 684 and its contents from environmental conditions outside of container 658.

Inner container 684 may be substantially solid with two openings 688 and 690. Inner container 684 is coupled to contacting element 632 of leg 624. For example, inner container 684 may be welded or brazed to contacting element 632 of leg 624. Openings 688, 690 are shaped to allow contacting elements 632 of legs 626, 628 to enter the openings as shown in FIG. 81. Funnels or other guiding mechanisms may be coupled to the entrances to openings 688, 690 to guide contacting elements 632 of legs 626, 628 into the openings. Contacting elements 632 of legs 624, 626, 628 may be made of the same material as inner container 684.

Explosive elements 700 may be coupled to the outer wall of inner container 684. In certain embodiments, explosive elements 700 are elongated explosive strips that extend along the outer wall of inner container 684. Explosive elements 700 may be arranged along the outer wall of inner container 684 so that the explosive elements are aligned at or near the centers of contacting elements 632, as shown in FIG. 82. Explosive elements 700 are arranged in this configuration so that energy from the explosion of the explosive elements causes contacting elements 632 to be pushed towards the center of inner container 684.

Explosive elements 700 may be coupled to battery 702 and timer 704. Battery 702 may provide power to explosive elements 700 to initiate the explosion. Timer 704 may be used to control the time for igniting explosive elements 700. Battery 702 and timer 704 may be coupled to triggers 706. Triggers 706 may be located in openings 688, 690. Contacting elements 632 may set off triggers 706 as the contacting elements are placed into openings 688, 690. When both triggers 706 in openings 688, 690 are triggered, timer 704 may initiate a countdown before igniting explosive elements 700. Thus, explosive elements 700 are controlled to explode only after contacting elements 632 are placed sufficiently into openings 688, 690 so that electrical contact may be made between the contacting elements and inner container 684 after the explosions. Explosion of explosive elements 700 crimps contacting elements 632 and inner container 684 together to make electrical contact between the contacting elements and the inner container. In certain embodiments, explosive elements 700 fire from the bottom towards the top of inner container 684. Explosive elements 700 may be designed with a length and explosive power (band width) that gives an optimum electrical contact between contacting elements 632 and inner container 684.

In some embodiments, triggers 706, battery 702, and timer 704 may be used to ignite a powder (for example, copper thermite powder) inside a container (for example, container 658 or inner container 684). Battery 702 may charge a magnesium ribbon or other ignition device in the powder to initiate reaction of the powder to produce a molten metal product. The molten metal product may flow and then cool to electrically contact the contacting elements.

Figure 83:
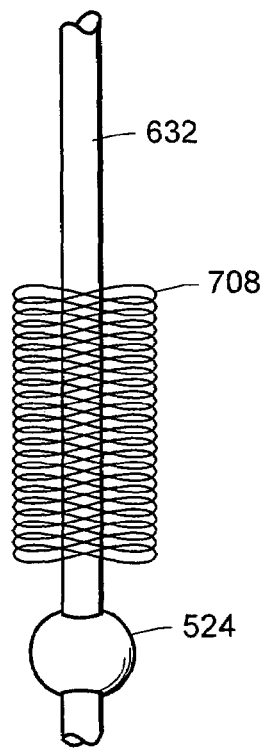
FIG. 83 depicts an embodiment of a contacting element with a brush contactor.

In certain embodiments, electrical connection is made between contacting elements 632 through mechanical means. FIG. 83 depicts an embodiment of contacting element 632 with a brush contactor. Brush contactor 708 is coupled to a lower portion of contacting element 632. Brush contactor 708 may be made of a malleable, electrically conductive material such as copper or aluminum. Brush contactor 708 may be a webbing of material that is compressible and/or flexible. Centralizer 524 may be located at or near the bottom of contacting element 632.

Figure 84:
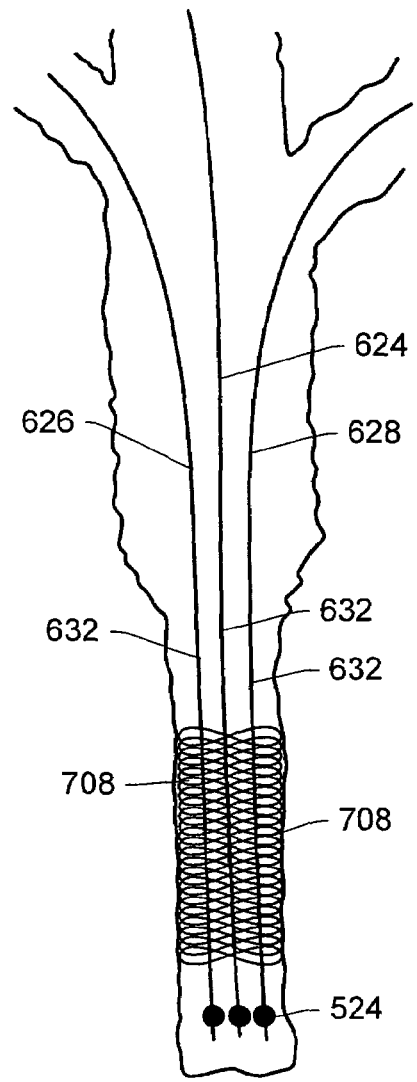
FIG. 84 depicts an embodiment for coupling contacting elements with brush contactors.

FIG. 84 depicts an embodiment for coupling contacting elements 632 with brush contactors 708. Brush contactors 708 are coupled to each contacting element 632 of legs 624, 626, 628. Brush contactors 708 compress against each other and interlace to electrically couple contacting elements 632 of legs 624, 626, 628. Centralizers 524 maintain spacing between contacting elements 632 of legs 624, 626, 628 so that interference and/or clearance issues between the contacting elements are inhibited.

In certain embodiments, contacting elements 632 (depicted in FIGS. 72-84) are coupled in a zone of the formation that is cooler than the layer of the formation to be heated (for example, in the underburden of the formation). Contacting elements 632 are coupled in a cooler zone to inhibit melting of the coupling material and/or degradation of the electrical connection between the elements during heating of the hydrocarbon layer above the cooler zone. In certain embodiments, contacting elements 632 are coupled in a zone that is at least about 3 m, at least about 6 m, or at least about 9 m below the layer of the formation to be heated. In some embodiments, the zone has a standing water level that is above a depth of containers 658.

Figure 85:
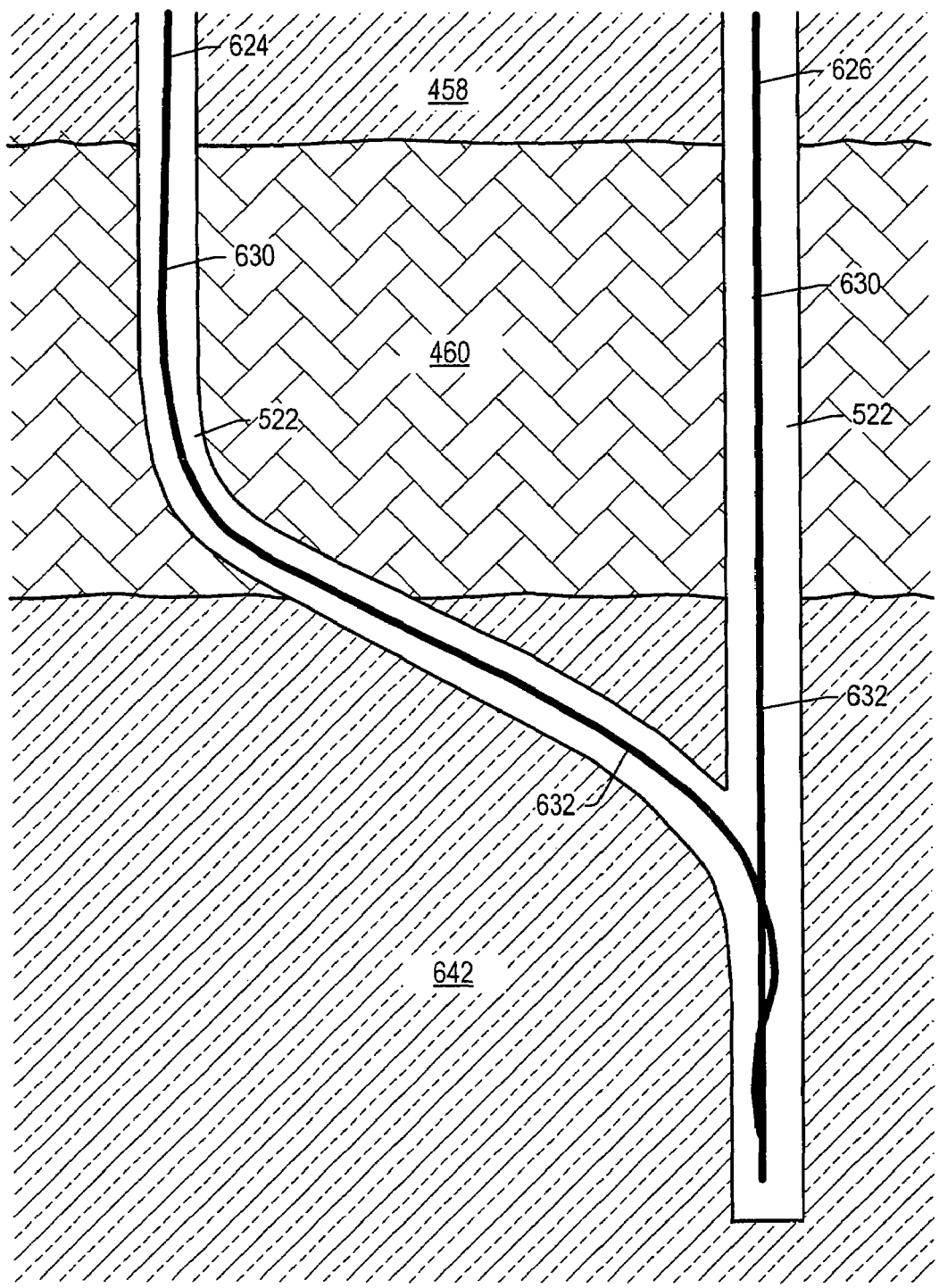
FIG. 85 depicts an embodiment of two temperature limited heaters coupled together in a single contacting section.

In certain embodiments, two legs in separate wellbores intercept in a single contacting section. FIG. 85 depicts an embodiment of two temperature limited heaters coupled in a single contacting section. Legs 624 and 626 include one or more heating elements 630. Heating elements 630 may include one or more electrical conductors. In certain embodiments, legs 624 and 626 are electrically coupled in a single-phase configuration with one leg positively biased versus the other leg so that current flows downhole through one leg and returns through the other leg.

Heating elements 630 in legs 624 and 626 may be temperature limited heaters. In certain embodiments, heating elements 630 are solid rod heaters. For example, heating elements 630 may be rods made of a single ferromagnetic conductor element or composite conductors that include ferromagnetic material. During initial heating when water is present in the formation being heated, heating elements 630 may leak current into hydrocarbon layer 460. The current leaked into hydrocarbon layer 460 may resistively heat the hydrocarbon layer.

In some embodiments (for example, in oil shale formations), heating elements 630 do not need support members. Heating elements 630 may be partially or slightly bent, curved, made into an S-shape, or made into a helical shape to allow for expansion and/or contraction of the heating elements. In certain embodiments, solid rod heating elements 630 are placed in small diameter wellbores (for example, about 3¾" (about 9.5 cm) diameter wellbores). Small diameter wellbores may be less expensive to drill or form than larger diameter wellbores, and there will be less cuttings to dispose of.

In certain embodiments, portions of legs 624 and 626 in overburden 458 have insulation (for example, polymer insulation) to inhibit heating the overburden. Heating elements 630 may be substantially vertical and substantially parallel to each other in hydrocarbon layer 460. At or near the bottom of hydrocarbon layer 460, leg 624 may be directionally drilled towards leg 626 to intercept leg 626 in contacting section 642. Drilling two wellbores to intercept each other may be easier and less expensive than drilling three or more wellbores to intercept each other. The depth of contacting section 642 depends on the length of bend in leg 624 needed to intercept leg 626. For example, for a 40 ft (about 12 m) spacing between vertical portions of legs 624 and 626, about 200 ft (about 61 m) is needed to allow the bend of leg 624 to intercept leg 626. Coupling two legs may require a thinner contacting section 642 than coupling three or more legs in the contacting section.

Figure 86:
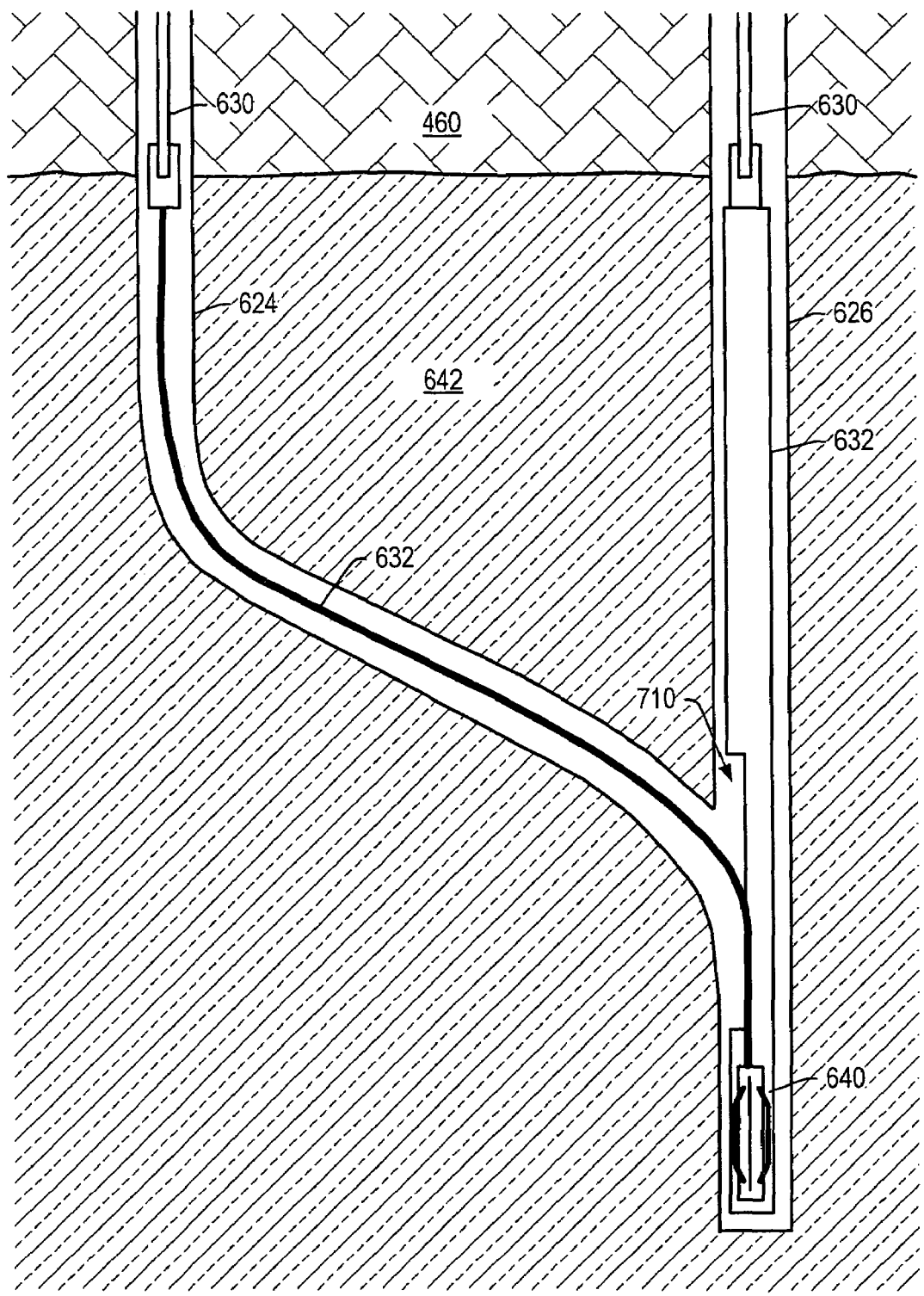
FIG. 86 depicts an embodiment of two temperature limited heaters with legs coupled in a contacting section.

FIG. 86 depicts an embodiment for coupling legs 624 and 626 in contacting section 642. Heating elements 630 are coupled to contacting elements 632 at or near junction of contacting section 642 and hydrocarbon layer 460. Contacting elements 632 may be copper or another suitable electrical conductor. In certain embodiments, contacting element 632 in leg 626 is a liner with opening 710. Contacting element 632 from leg 624 passes through opening 710. Contactor 640 is coupled to the end of contacting element 632 from leg 624. Contactor 640 provides electrical coupling between contacting elements in legs 624 and 626.

In certain embodiments, contacting elements 632 include one or more fins or projections. The fins or projections may increase an electrical contact area of contacting elements 632. In some embodiments, contacting element 632 of leg 626 has an opening or other orifice that allows the contacting element of 624 to couple to the contacting element of leg 626.

Figure 87:
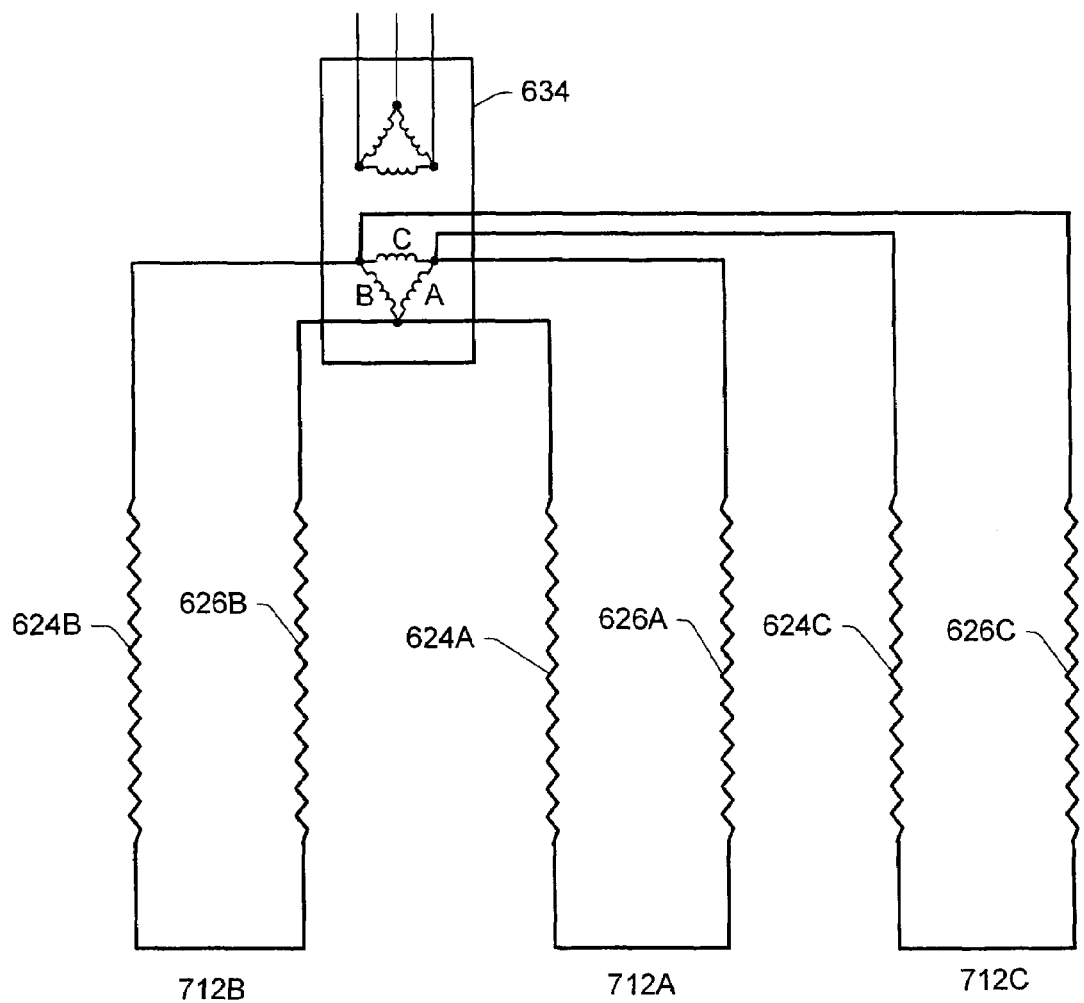
FIG. 87 depicts an embodiment of three diads coupled to a three-phase transformer.

In certain embodiments, legs 624 and 626 are coupled together to form a diad. Three diads may be coupled to a three-phase transformer to power the legs of the heaters. FIG. 87 depicts an embodiment of three diads coupled to a three-phase transformer. In certain embodiments, transformer 634 is a delta three-phase transformer. Diad 712A includes legs 624A and 626A. Diad 712B includes legs 624B and 626B. Diad 712C includes legs 624C and 626C. Diads 712A, 712B, 712C are coupled to the secondaries of transformer 634. Diad 712A is coupled to the "A" secondary. Diad 712B is coupled to the "B" secondary. Diad 712C is coupled to the "C" secondary.

Coupling the diads to the secondaries of the delta three-phase transformer isolates the diads from ground. Isolating the diads from ground inhibits leakage to the formation from the diads. Coupling the diads to different phases of the delta three-phase transformer also inhibits leakage between the heating legs of the diads in the formation.

Figure 88:
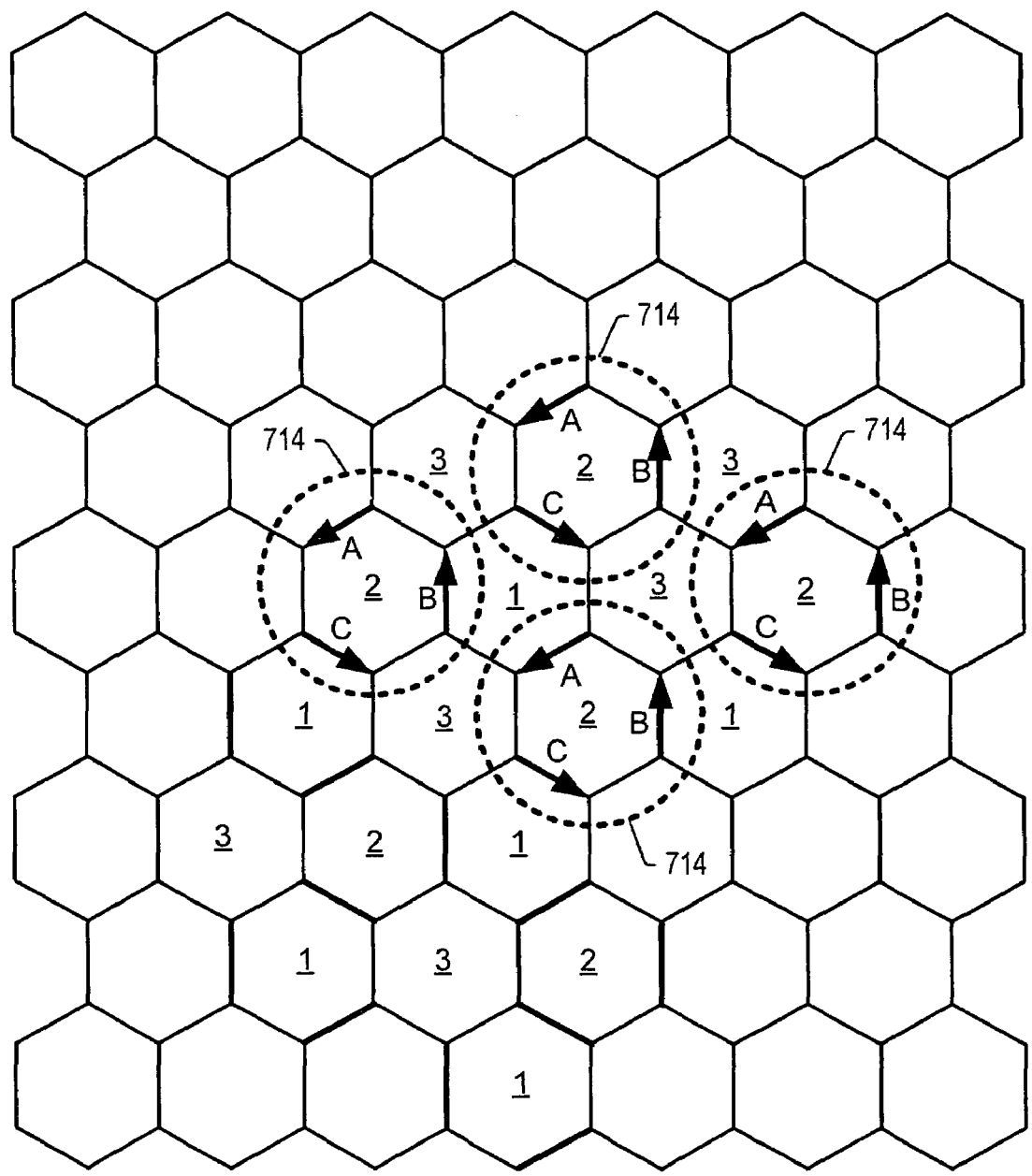
FIG. 88 depicts an embodiment of groups of diads in a hexagonal pattern.

In some embodiments, diads are used for treating formations using triangular or hexagonal heater patterns. FIG. 88 depicts an embodiment of groups of diads in a hexagonal pattern. Heaters may be placed at the vertices of each of the hexagons in the hexagonal pattern. Each group 714 of diads (enclosed by dashed circles) may be coupled to a separate three-phase transformer. "A", "B", and "C" inside groups 714 represent each diad (for example, diads 712A, 712B, 712C depicted in FIG. 87) that is coupled to each of the three secondary phases of the transformer with each phase coupled to one diad (with the heaters at the vertices of the hexagon). The numbers "1", "2", and "3" inside the hexagons represent the three repeating types of hexagons in the pattern depicted in FIG. 88.

Figure 89:
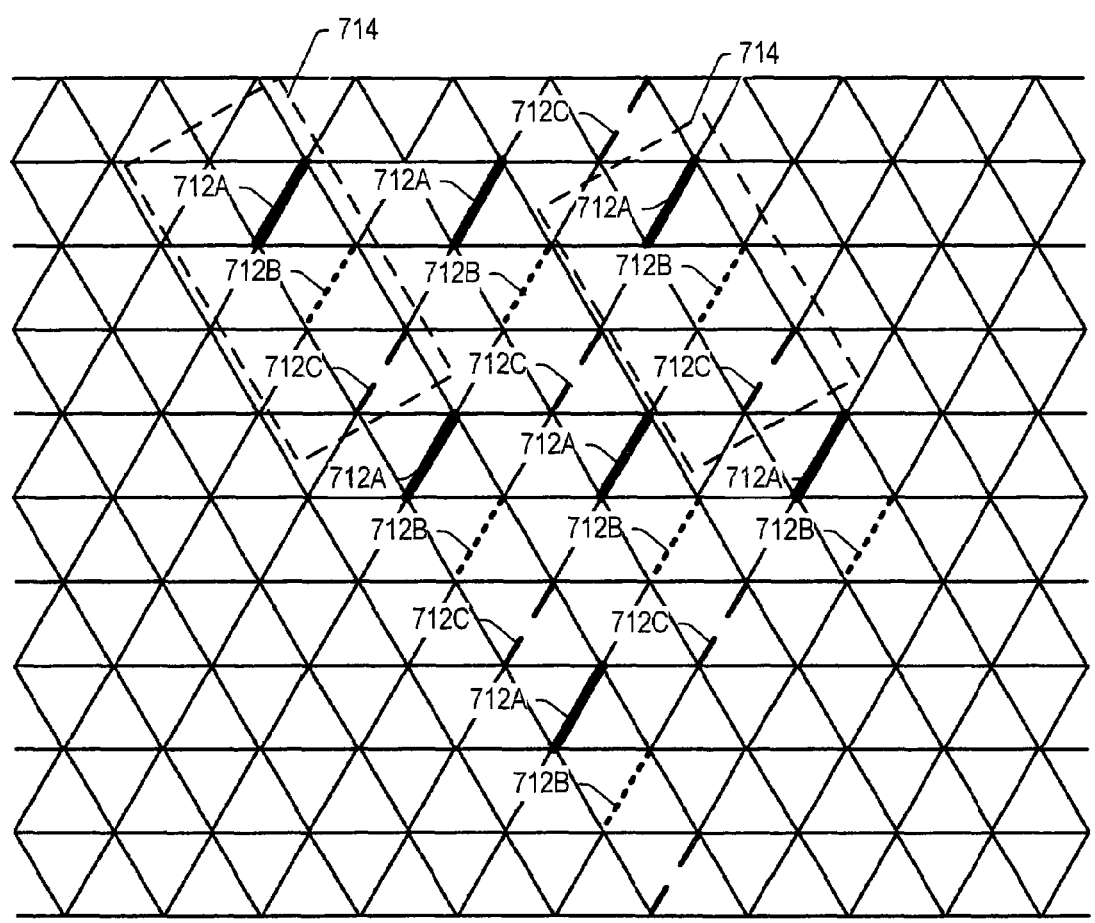
FIG. 89 depicts an embodiment of diads in a triangular pattern.

FIG. 89 depicts an embodiment of diads in a triangular pattern. Three diads 712A, 712B, 712C may be enclosed in each group 714 of diads (enclosed by dashed rectangles). Each group 714 may be coupled to a separate three-phase transformer.

In certain embodiments, exposed metal heating elements are used in substantially horizontal sections of u-shaped wellbores. Substantially u-shaped wellbores may be used in tar sands formations, oil shale formation, or other formations with relatively thin hydrocarbon layers. Tar sands or thin oil shale formations may have thin shallow layers that are more easily and uniformly heated using heaters placed in substantially u-shaped wellbores. Substantially u-shaped wellbores may also be used to process formations with thick hydrocarbon layers in formations. In some embodiments, substantially u-shaped wellbores are used to access rich layers in a thick hydrocarbon formation.

Heaters in substantially u-shaped wellbores may have long lengths compared to heaters in vertical wellbores because horizontal heating sections do not have problems with creep or hanging stress encountered with vertical heating elements. Substantially u-shaped wellbores may make use of natural seals in the formation and/or the limited thickness of the hydrocarbon layer. For example, the wellbores may be placed above or below natural seals in the formation without punching large numbers of holes in the natural seals, as would be needed with vertically oriented wellbores. Using substantially u-shaped wellbores instead of vertical wellbores may also reduce the number of wells needed to treat a surface footprint of the formation. Using less wells reduces capital costs for equipment and reduces the environmental impact of treating the formation by reducing the amount of wellbores on the surface and the amount of equipment on the surface. Substantially u-shaped wellbores may also utilize a lower ratio of overburden section to heated section than vertical wellbores.

Substantially u-shaped wellbores may allow for flexible placement of opening of the wellbores on the surface. Openings to the wellbores may be placed according to the surface topology of the formation. In certain embodiments, the openings of wellbores are placed at geographically accessible locations such as topological highs (for examples, hills). For example, the wellbore may have a first opening on a first topologic high and a second opening on a second topologic high and the wellbore crosses beneath a topologic low (for example, a valley with alluvial fill) between the first and second topologic highs. This placement of the openings may avoid placing openings or equipment in topologic lows or other inaccessible locations. In addition, the water level may not be artesian in topologically high areas. Wellbores may be drilled so that the openings are not located near environmentally sensitive areas such as, but not limited to, streams, nesting areas, or animal refuges.

Figure 90:
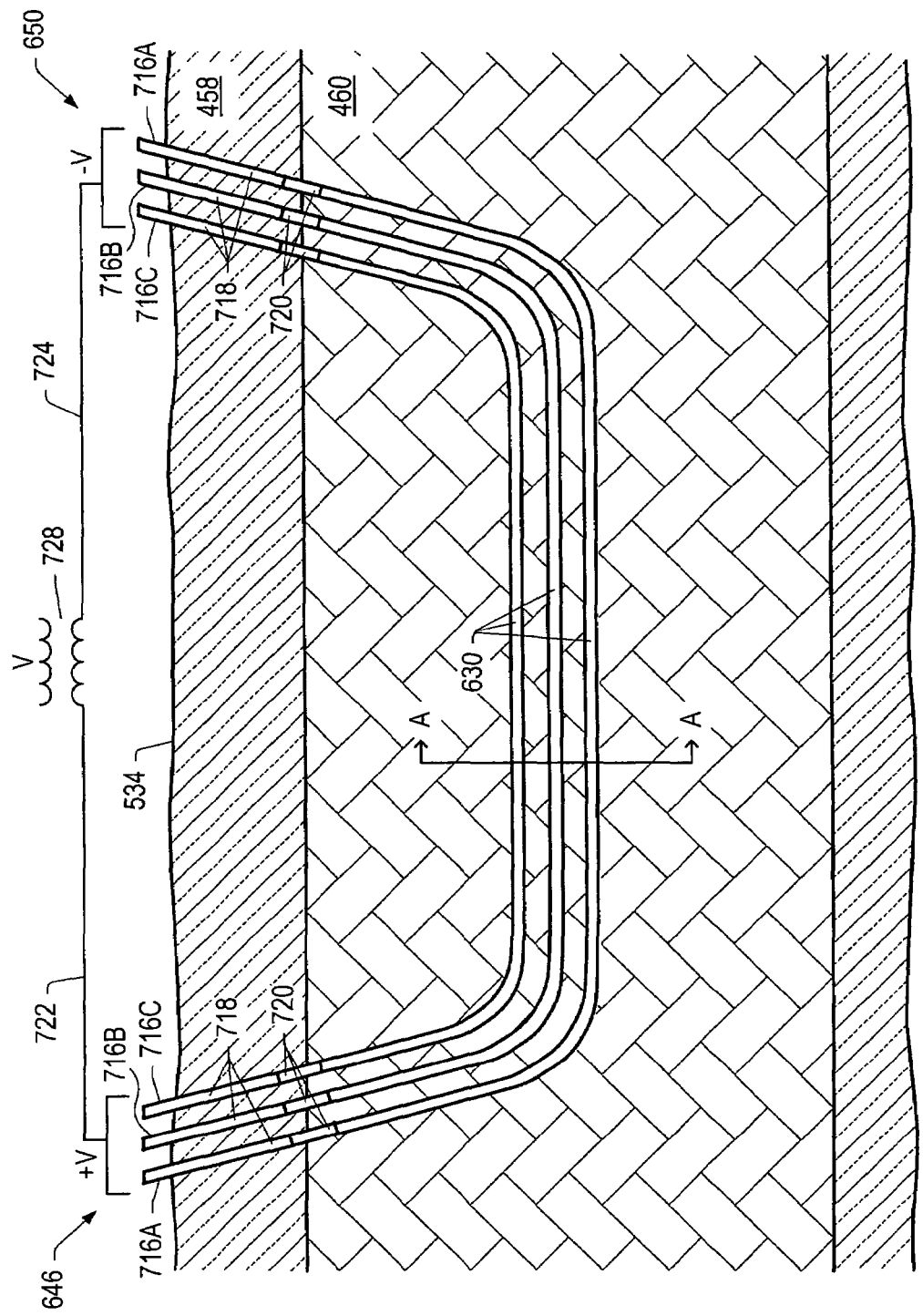
FIG. 90 depicts a cross-sectional representation of an embodiment of substantially u-shaped heaters.

FIG. 90 depicts a cross-sectional representation of an embodiment of a heater with an exposed metal heating element placed in a substantially u-shaped wellbore. Heaters 716A, 716B, 716C have first end portions at first location 646 on surface 534 of the formation and second end portions at second location 650 on the surface. Heaters 716A, 716B, 716C have sections 718 in overburden 458. Sections 718 are configured to provide little or no heat output. In certain embodiments, sections 718 include an insulated electrical conductor such as insulated copper. Sections 718 are coupled to heating elements 630.

In certain embodiments, portions of heating elements 630 are substantially parallel in hydrocarbon layer 460. In certain embodiments, heating elements 630 are exposed metal heating elements. In certain embodiments, heating elements 630 are exposed metal temperature limited heating elements. Heating elements 630 may include ferromagnetic materials such as 9% by weight to 13% by weight chromium stainless steel like 410 stainless steel, chromium stainless steels such as T/P91 or T/P92, 409 stainless steel, VM12 (Vallourec and Mannesmann Tubes, France) or iron-cobalt alloys for use as temperature limited heaters. In some embodiments, heating elements 630 are composite temperature limited heating elements such as 410 stainless steel and copper composite heating elements or 347H, iron, copper composite heating elements. Heating elements 630 may have lengths of at least about 100 m, at least about 500 m, or at least about 1000 m, up to lengths of about 6000 m.

Heating elements 630 may be solid rods or tubulars. In certain embodiments, solid rod heating elements have diameters several times the skin depth at the Curie temperature of the ferromagnetic material. Typically, the solid rod heating elements may have diameters of 1.91 cm or larger (for example, 2.5 cm, 3.2 cm, 3.81 cm, or 5.1 cm). In certain embodiments, tubular heating elements have wall thicknesses of at least twice the skin depth at the Curie temperature of the ferromagnetic material. Typically, the tubular heating elements have outside diameters of between about 2.5 cm and about 15.2 cm and wall thickness in range between about 0.13 cm and about 1.01 cm.

In certain embodiments, tubular heating elements 630 allow fluids to be convected through the tubular heating elements. Fluid flowing through the tubular heating elements may be used to preheat the tubular heating elements, to initially heat the formation, and/or to recover heat from the formation after heating is completed for the in situ heat treatment process. Fluids that may flow through the tubular heating elements include, but are not limited to, air, water, steam, helium, carbon dioxide or other fluids. In some embodiments, a hot fluid, such as carbon dioxide or helium, flows through the tubular heating elements to provide heat to the formation. The hot fluid may be used to provide heat to the formation before electrical heating is used to provide heat to the formation. In some embodiments, the hot fluid is used to provide heat in addition to electrical heating. Using the hot fluid to provide heat to the formation in addition to providing electrical heating may be less expensive than using electrical heating alone to provide heat to the formation. In some embodiments, water and/or steam flows through the tubular heating element to recover heat from the formation. The heated water and/or steam may be used for solution mining and/or other processes.

Transition sections 720 may couple heating elements 630 to sections 718. In certain embodiments, transition sections 720 include material that has a high electrical conductivity but is corrosion resistant, such as 347 stainless steel over copper. In an embodiment, transition sections include a composite of stainless steel clad over copper. Transition sections 720 inhibit overheating of copper and/or insulation in sections 718.

Figure 91:
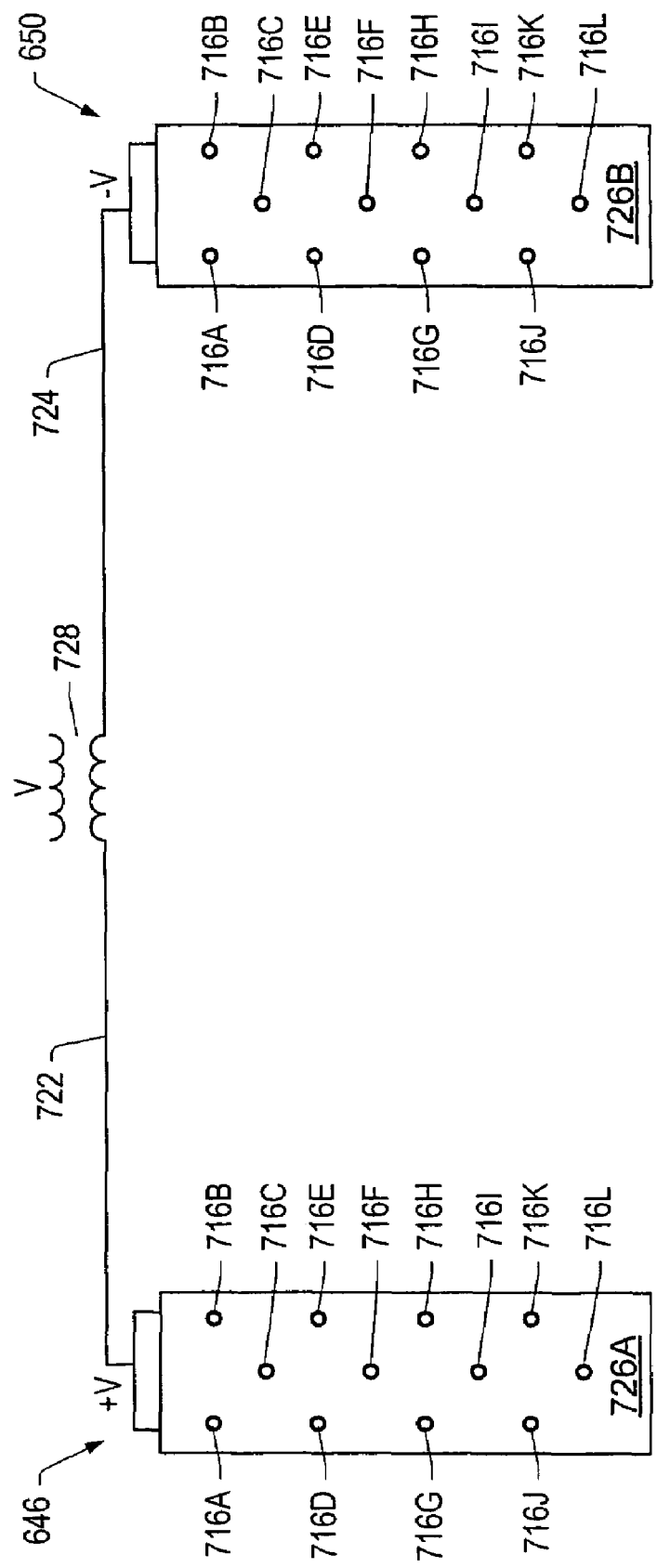
FIG. 91 depicts a representational top view of an embodiment of a surface pattern of heaters depicted in FIG. 90.

FIG. 91 depicts a representational top view of an embodiment of a surface pattern of heaters depicted in FIG. 90. Heaters 716A-L may be arranged in a repeating triangular pattern on the surface of the formation, as shown in FIG. 91. A triangle may be formed by heaters 716A, 716B, and 716C and a triangle formed by heaters 716C, 716D, and 716E. In some embodiments, heaters 716A-L are arranged in a straight line on the surface of the formation. Heaters 716A-L have first end portions at first location 646 on the surface and second end portions at second location 650 on the surface. Heaters 716A-L are arranged such that (a) the patterns at first location 646 and second location 650 correspond to each other, (b) the spacing between heaters is maintained at the two locations on the surface, and/or (c) the heaters all have substantially the same length (substantially the same horizontal distance between the end portions of the heaters on the surface as shown in the top view of FIG. 91).

As depicted in FIGS. 90 and 91, cables 722, 724 may be coupled to transformer 728 and one or more heater units, such as the heater unit including heaters 716A, 716B, 716C. Cables 722, 724 may carry a large amount of power. In certain embodiments, cables 722, 724 are capable of carrying high currents with low losses. For example, cables 722, 724 may be thick copper or aluminum conductors. The cables may also have thick insulation layers. In some embodiments, cable 722 and/or cable 724 may be superconducting cables. The superconducting cables may be cooled by liquid nitrogen. Superconducting cables are available from Superpower, Inc. (Schenectady, N.Y., U.S.A.). Superconducting cables may minimize power loss and reduce the size of the cables needed to couple transformer 728 to the heaters. In some embodiments, cables 722, 724 may be made of carbon nanotubes. Carbon nanotubes as conductors may have about 1000 times the conductivity of copper for the same diameter. Also, carbon nanotubes may not require refrigeration during use.

In certain embodiments, bus bar 726A is coupled to first end portions of heaters 716A-L and bus bar 726B is coupled to second end portions of heaters 716A-L. Bus bars 726A,B electrically couple heaters 716A-L to cables 722, 724 and transformer 728. Bus bars 726A,B distribute power to heaters 716A-L. In certain embodiments, bus bars 726A,B are capable of carrying high currents with low losses. In some embodiments, bus bars 726A,B are made of superconducting material such as the superconductor material used in cables 722, 724. In some embodiments, bus bars 726A,B may include carbon nanotube conductors.

As shown in FIGS. 90 and 91, heaters 716A-L are coupled to a single transformer 728. In certain embodiments, transformer 728 is a source of time-varying current. In certain embodiments, transformer 728 is an electrically isolated, single-phase transformer. In certain embodiments, transformer 728 provides power to heaters 716A-L from an isolated secondary phase of the transformer. First end portions of heaters 716A-L may be coupled to one side of transformer 728 while second end portions of the heaters are coupled to the opposite side of the transformer. Transformer 728 provides a substantially common voltage to the first end portions of heaters 716A-L and a substantially common voltage to the second end portions of heaters 716A-L. In certain embodiments, transformer 728 applies a voltage potential to the first end portions of heaters 716A-L that is opposite in polarity and substantially equal in magnitude to a voltage potential applied to the second end portions of the heaters. For example, a +660 V potential may be applied to the first end portions of heaters 716A-L and a −660 V potential applied to the second end portions of the heaters at a selected point on the wave of time-varying current (such as AC or modulated DC). Thus, the voltages at the two end portion of the heaters may be equal in magnitude and opposite in polarity with an average voltage that is substantially at ground potential.

Figure 92:
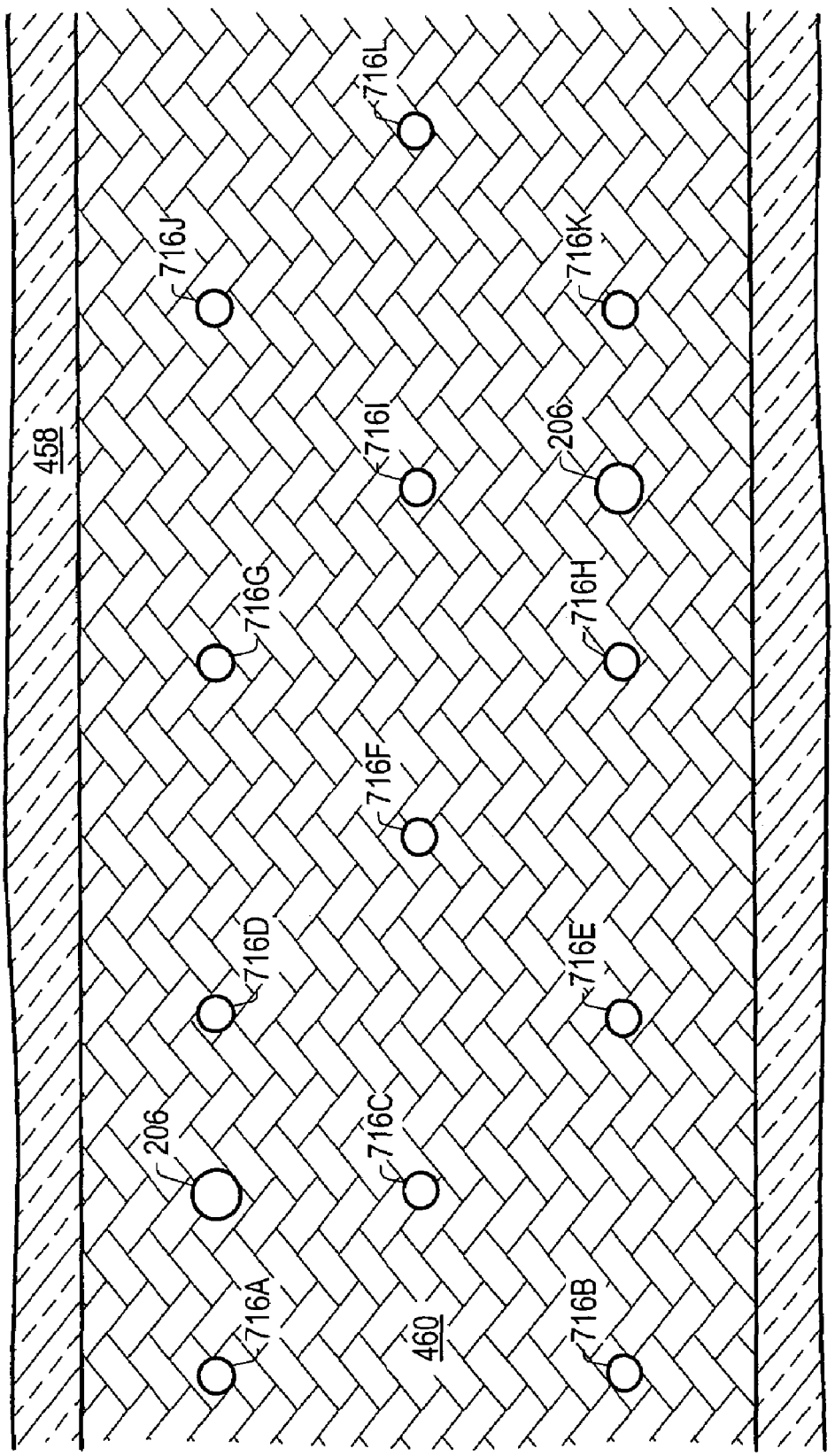
FIG. 92 depicts a cross-sectional representation of substantially u-shaped heaters in a hydrocarbon layer.

Applying the same voltage potentials to the end portions of all heaters 716A-L produces voltage potentials along the lengths of the heaters that are substantially the same along the lengths of the heaters. FIG. 92 depicts a cross-sectional representation, along a vertical plane, such as the plane A-A shown in FIG. 90, of substantially u-shaped heaters in a hydrocarbon layer. The voltage potential at the cross-sectional point shown in FIG. 92 along the length of heater 716A is substantially the same as the voltage potential at the corresponding cross-sectional points on heaters 716A-L shown in FIG. 92. At lines equidistant between heater wellheads, the voltage potential is approximately zero. Other wells, such as production wells or monitoring wells, may be located along these zero voltage potential lines, if desired. Production wells 206 located close to the overburden may be used to transport formation fluid that is initially in a vapor phase to the surface. Production wells located close to a bottom of the heated portion of the formation may be used to transport formation fluid that is initially in a liquid phase to the surface.

In certain embodiments, the voltage potential at the midpoint of heaters 716A-L is about zero. Having similar voltage potentials along the lengths of heaters 716A-L inhibits current leakage between the heaters. Thus, there is little or no current flow in the formation and the heaters may have long lengths as described above. Having the opposite polarity and substantially equal voltage potentials at the end portions of the heaters also halves the voltage applied at either end portion of the heater versus having one end portion of the heater grounded and one end portion at full potential. Reducing (halving) the voltage potential applied to an end portion of the heater generally reduces current leakage, reduces insulator requirements, and/or reduces arcing distances because of the lower voltage potential to ground applied at the end portions of the heaters.

Figure 93:
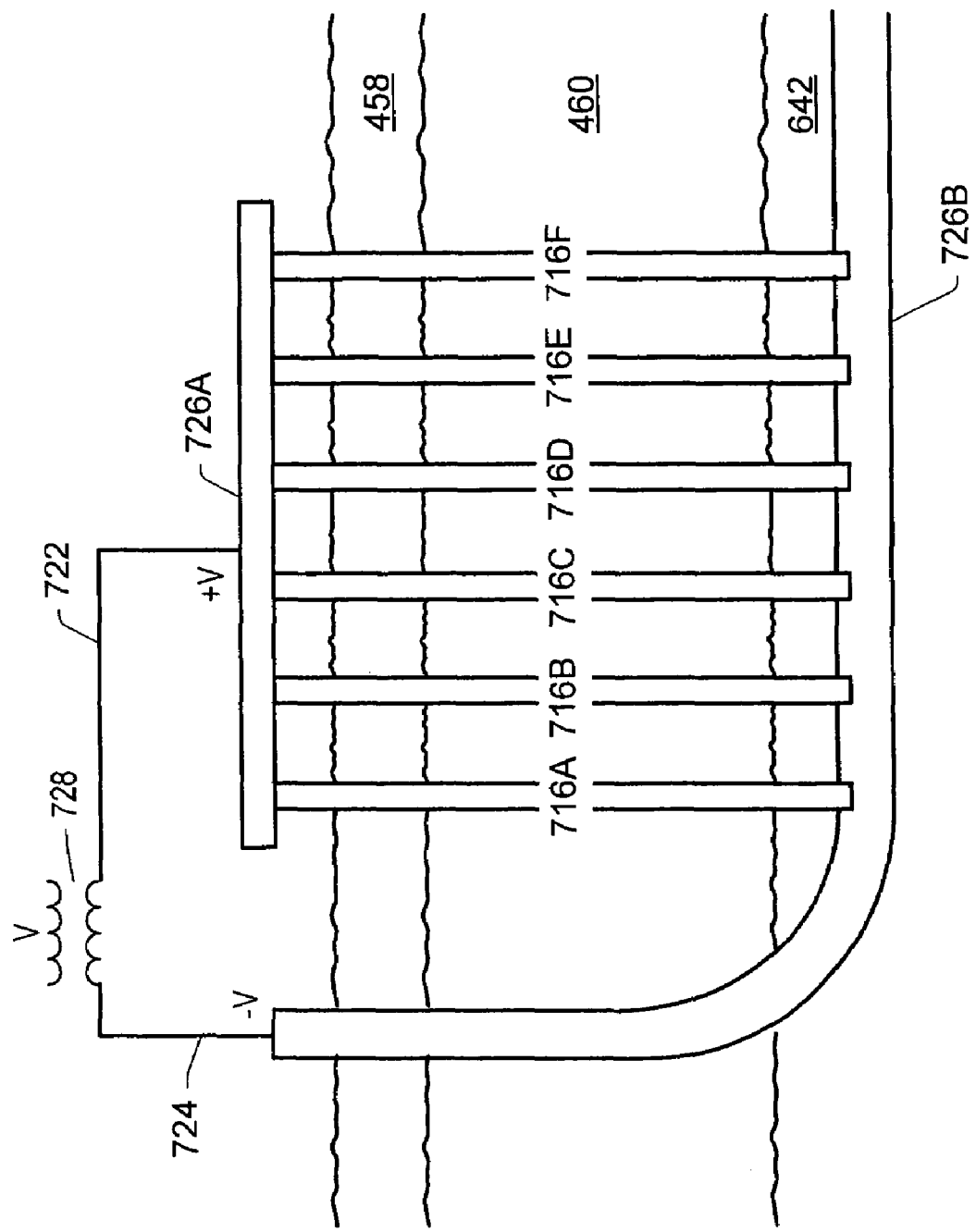
FIG. 93 depicts a side view representation of an embodiment of substantially vertical heaters coupled to a substantially horizontal wellbore.

In certain embodiments, substantially vertical heaters are used to provide heat to the formation. Opposite polarity and substantially equal voltage potentials, as described above, may be applied to the end portions of the substantially vertical heaters. FIG. 93 depicts a side-view representation of substantially vertical heaters coupled to a substantially horizontal wellbore. Heaters 716A, 716B, 716C, 716D, 716E, 716F are located substantially vertical in hydrocarbon layer 460. First end portions of heaters 716A, 716B, 716C, 716D, 716E, 716F are coupled to bus bar 726A on a surface of the formation. Second end portions of heaters 716A, 716B, 716C, 716D, 716E, 716F are coupled to bus bar 726B in contacting section 642.

Bus bar 726B may be a bus bar located in a substantially horizontal wellbore in contacting section 642. Second end portions of heaters 716A, 716B, 716C, 716D, 716E, 716F may be coupled to bus bar 726B by any method described herein or any method known in the art. For example, containers with thermite powder are coupled to bus bar 726B (for example, by welding or brazing the containers to the bus bar), end portions of heaters 716A, 716B, 716C, 716D, 716E, 716F are placed inside the containers, and the thermite powder is activated to electrically couple the heaters to the bus bar. The containers may be coupled to bus bar 726B by, for example, placing the containers in holes or recesses in bus bar 726B or coupled to the outside of the bus bar and then brazing or welding the containers to the bus bar.

Bus bar 726A and bus bar 726B may be coupled to transformer 728 with cables 722, 724, as described above. Transformer 728 may provide voltages to bar 726A and bus bar 726B as described above for the embodiments depicted in FIGS. 90 and 91. For example, transformer 728 may apply a voltage potential to the first end portions of heaters 716A-F that is opposite in polarity and substantially equal in magnitude to a voltage potential applied to the second end portions of the heaters. Applying the same voltage potentials to the end portions of all heaters 716A-F may produce voltage potentials along the lengths of the heaters that are substantially the same along the lengths of the heaters. Applying the same voltage potentials to the end portions of all heaters 716A-F may inhibit current leakage between the heaters and/or into the formation.

In certain embodiments, it may be advantageous to allow some current leakage into the formation during early stages of heating to heat the formation at a faster rate. Current leakage from the heaters into the formation electrically heats the formation directly. The formation is heated by direct electrical heating in addition to conductive heat provided by the heaters. The formation (the hydrocarbon layer) may have an initial electrical resistance that averages at least 10 ohm·m. In some embodiments, the formation has an initial electrical resistance of at least 100 ohm·m or of at least 300 ohm·m. Direct electrical heating is achieved by having opposite potentials applied to adjacent heaters in the hydrocarbon layer. Current may be allowed to leak into the formation until a selected temperature is reached in the heaters or in the formation. The selected temperature may be below or near the temperature that water proximate one or more heaters boils off. After water boils off, the hydrocarbon layer is substantially electrically isolated from the heaters and direct heating of the formation is inefficient. After the selected temperature is reached, the voltage potential is applied in the opposite polarity and substantially equal magnitude manner described above for FIGS. 90 and 91 so that adjacent heaters will have the same voltage potential along their lengths.

Current is allowed to leak into the formation by reversing the polarity of one or more heaters shown in FIG. 91 so that a first group of heaters has a positive voltage potential at first location 646 and a second group of heaters has a negative voltage potential at the first location. The first end portions, at first location 646, of a first group of heaters (for example, heaters 716A, 716B, 716D, 716E, 716G, 716H, 716J, 716K, depicted in FIG. 91) are applied with a positive voltage potential that is substantially equal in magnitude to a negative voltage potential applied to the second end portions, at second location 650, of the first group of heaters. The first end portions, at first location 646, of the second group of heaters (for example, heaters 716C, 716F, 716I, 716L) are applied with a negative voltage potential that is substantially equal in magnitude to the positive voltage potential applied to the first end portions of the first group of heaters. Similarly, the second end portions, at second location 650, of the second group of heaters are applied with a positive voltage potential substantially equal in magnitude to the negative potential applied to the second end portions of the first group of heaters. After the selected temperature is reached, the first end portions of both groups of heaters are applied with voltage potential that is opposite in polarity and substantially similar in magnitude to the voltage potential applied to the second end portions of both groups of heaters.

In some embodiments, the heating elements have thin electrically insulating layer, described above, to inhibit current leakage from the heating elements. In some embodiments, the thin electrically insulating layer is aluminum oxide or thermal spray coated aluminum oxide. In some embodiments, the thin electrically insulating layer is an enamel coating of a ceramic composition. The thin electrically insulating layer may inhibit heating elements of a three-phase heater from leaking current between the elements, from leaking current into the formation, and from leaking current to other heaters in the formation. Thus, the three-phase heater may have a longer heater length.

Figure 94:
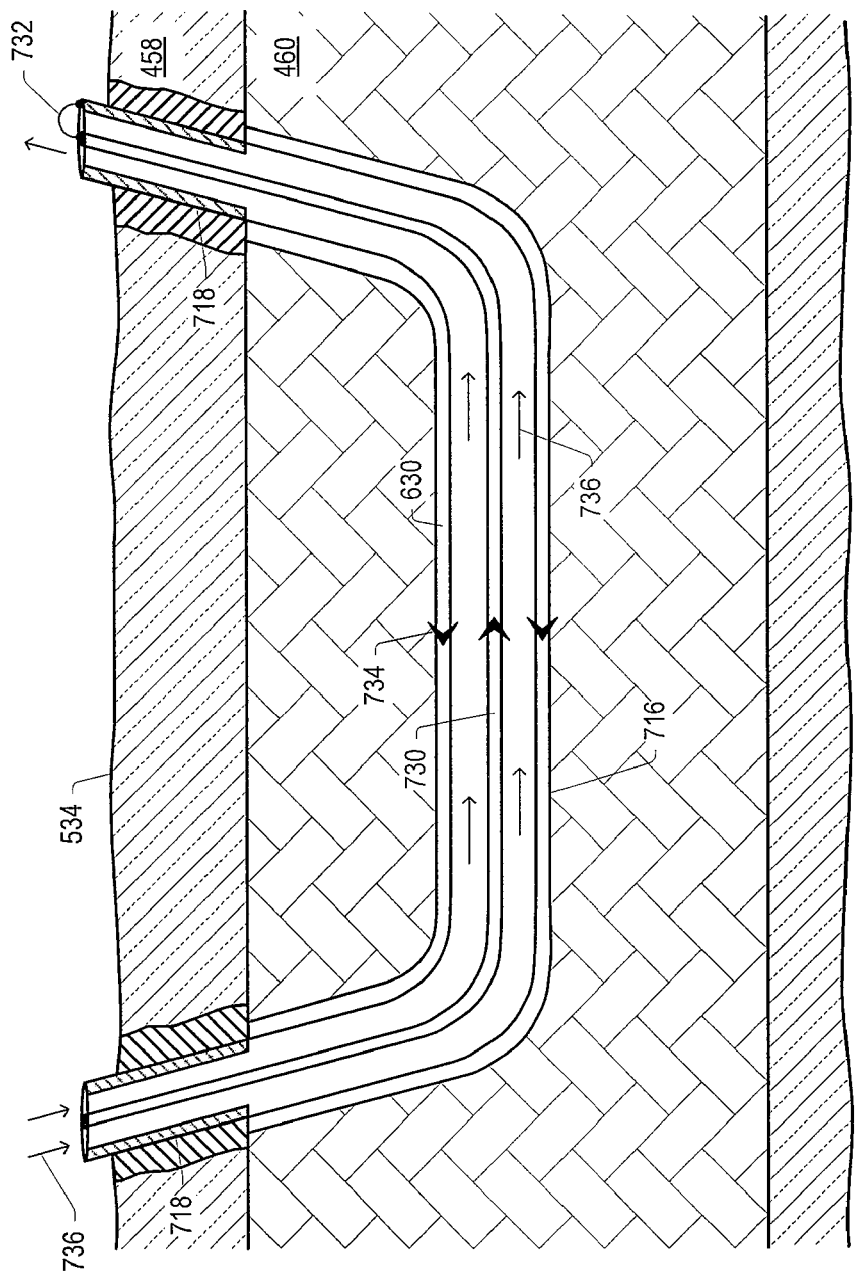
FIG. 94 depicts an embodiment of a substantially u-shaped heater that electrically isolates itself from the formation.
Figure 95:
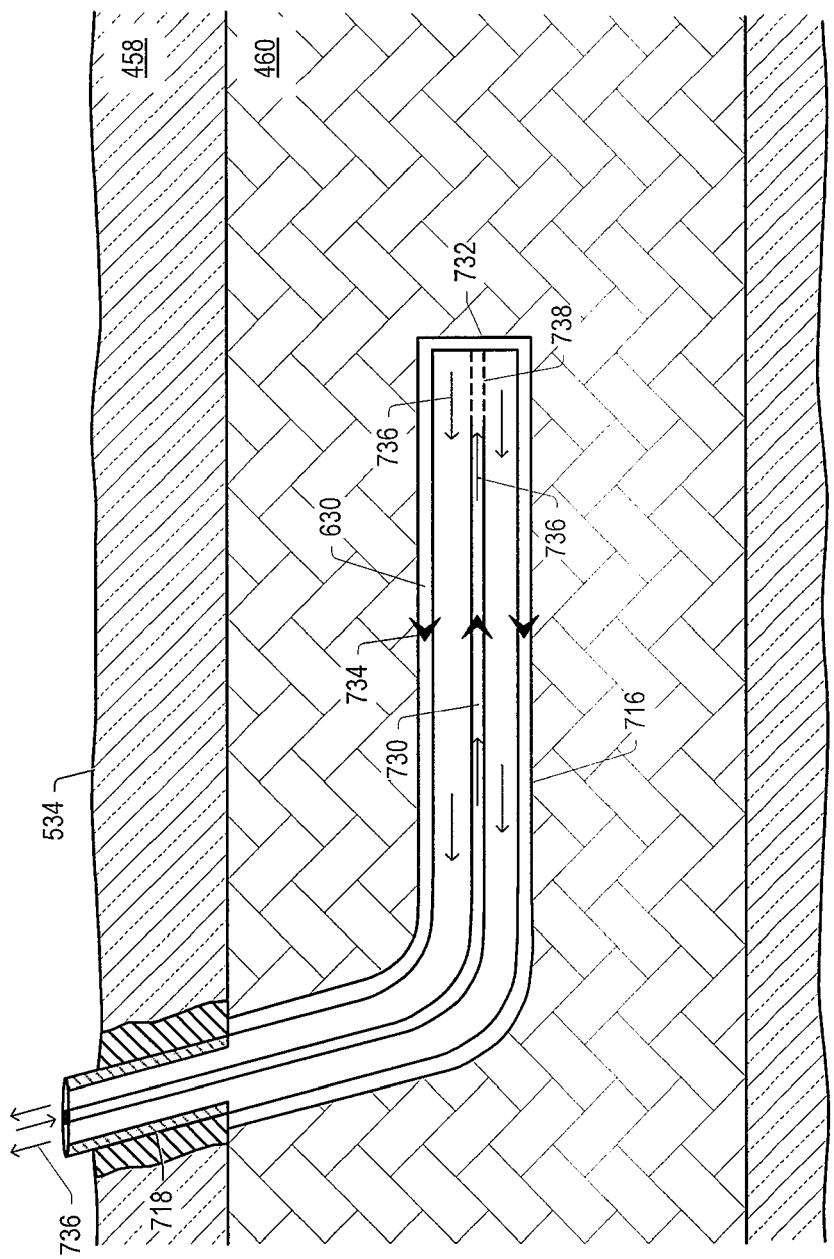
FIG. 95 depicts an embodiment of a single-ended, substantially horizontal heater that electrically isolates itself from the formation.
Figure 96:
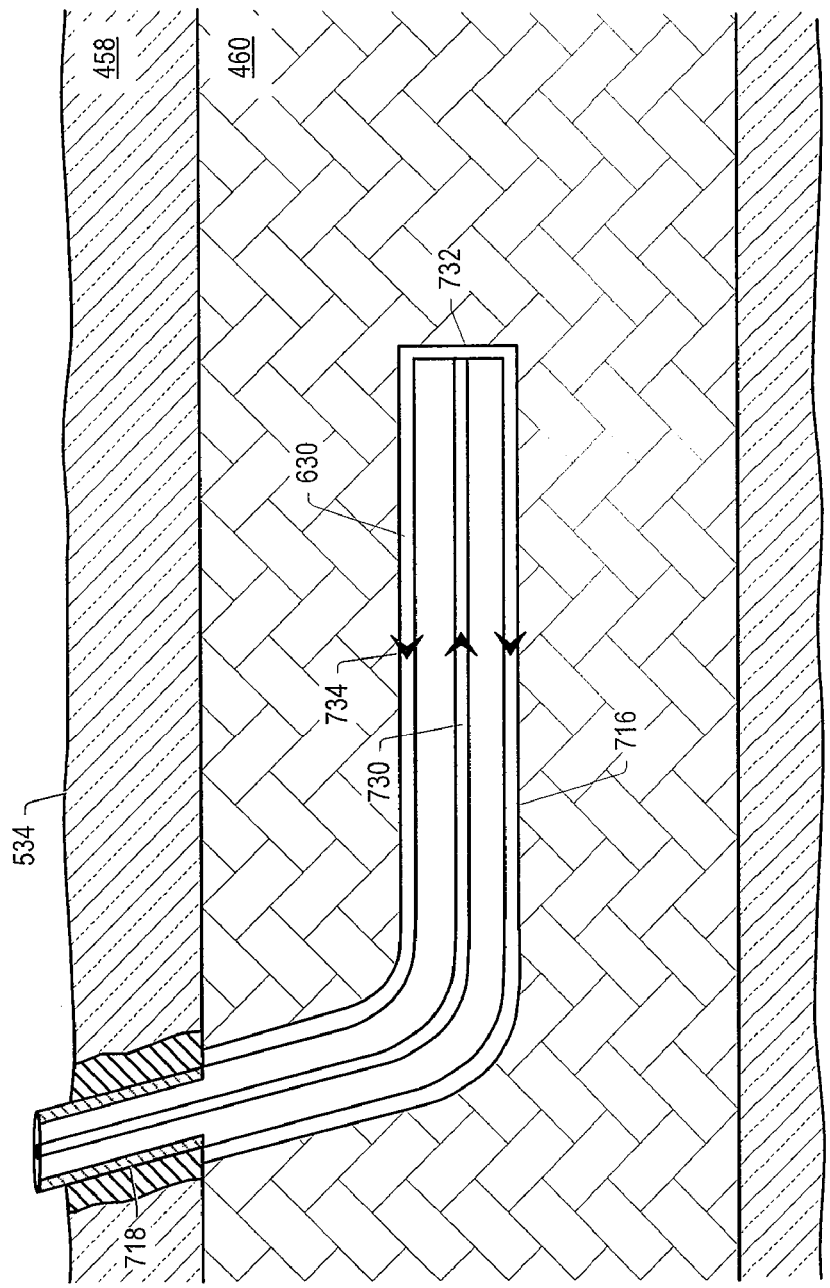
FIG. 96 depicts an embodiment of a single-ended, substantially horizontal heater that electrically isolates itself from the formation using an insulated conductor as the center conductor.

In certain embodiments, a heater is electrically isolated from the formation because the heater has little or no voltage potential on the outside of the heater. FIG. 94 depicts an embodiment of a substantially u-shaped heater that electrically isolates itself from the formation. Heater 716 has a first end portion at a first opening on surface 534 and a second end portion at a second opening on the surface. In some embodiments, heater 716 has only the first end portion at the surface with the second end of the heater located in hydrocarbon layer 460 (the heater is a single-ended heater). FIGS. 95 and 96 depict embodiments of single-ended heaters that electrically isolate themselves from the formation. In certain embodiments, single-ended heater 716 has an elongated portion that is substantially horizontal in hydrocarbon layer 460, as shown in FIGS. 95 and 96. In some embodiments, single-ended heater 716 has an elongated portion with an orientation other than substantially horizontal in hydrocarbon layer 460. For example, the single-ended heater may have an elongated portion that is oriented 15° off horizontal in the hydrocarbon layer.

As shown in FIGS. 94-96, heater 716 includes heating element 630 located in hydrocarbon layer 460. Heating element 630 may be a ferromagnetic conduit heating element or ferromagnetic tubular heating element. In certain embodiments, heating element 630 is a temperature limited heater tubular heating element. In certain embodiments, heating element 630 is a 9% by weight to 13% by weight chromium stainless steel tubular such as a 410 stainless steel tubular, a T/P91 stainless steel tubular, or a T/P92 stainless steel tubular. In certain embodiments, heating element 630 includes ferromagnetic material with a wall thickness of at least about one skin depth of the ferromagnetic material at 25° C. In some embodiments, heating element 630 includes ferromagnetic material with a wall thickness of at least about two times the skin depth of the ferromagnetic material at 25° C., at least about three times the skin depth of the ferromagnetic material at 25° C., or at least about four times the skin depth of the ferromagnetic material at 25° C.

Heating element 630 is coupled to one or more sections 718. Sections 718 are located in overburden 458. Sections 718 include higher electrical conductivity materials such as copper or aluminum. In certain embodiments, sections 718 are copper clad inside carbon steel.

Center conductor 730 is positioned inside heating element 630. In some embodiments, heating element 630 and center conductor 730 are placed or installed in the formation by unspooling the heating element and the center conductor from one or more spools while they are placed into the formation. In some embodiments, heating element 630 and center conductor 730 are coupled together on a single spool and unspooled as a single system with the center conductor inside the heating element. In some embodiments, heating element 630 and center conductor 730 are located on separate spools and the center conductor is positioned inside the heating element after the heating element is placed in the formation.

In certain embodiments, center conductor 730 is located at or near a center of heating element 630. Center conductor 730 may be substantially electrically isolated from heating element 630 along a length of the center conductor (for example, the length of the center conductor in hydrocarbon layer 460). In certain embodiments, center conductor 730 is separated from heating element 630 by one or more electrically-insulating centralizers. The centralizers may include silicon nitride or another electrically insulating material. The centralizers may inhibit electrical contact between center conductor 730 and heating element 630 so that, for example, arcing or shorting between the center conductor and the heating element is inhibited. In some embodiments, center conductor 730 is a conductor (for example, a solid conductor or a tubular conductor) so that the heater is in a conductor-in-conduit configuration.

In certain embodiments, center conductor 730 is a copper rod or copper tubular. In some embodiments, center conductor 730 and/or heating element 630 has a thin electrically insulating layer to inhibit current leakage from the heating elements. In some embodiments, the thin electrically insulating layer is aluminum oxide or thermal spray coated aluminum oxide. In some embodiments, the thin electrically insulating layer is an enamel coating of a ceramic composition. The thin electrically insulating layer may inhibit heating elements of a three-phase heater from leaking current between the elements, from leaking current into the formation, and from leaking current to other heaters in the formation. Thus, the three-phase heater may have a longer heater length.

In certain embodiments, center conductor 730 is an insulated conductor. The insulated conductor may include an electrically conductive core inside an electrically conductive sheath with electrical insulation between the core and the sheath. In certain embodiments, the insulated conductor includes a copper core inside a non-ferromagnetic stainless steel (for example, 347 stainless steel) sheath with magnesium oxide insulation between the core and the sheath. The core may be used to conduct electrical current through the insulated conductor. In some embodiments, the insulated conductor is placed inside heating element 630 without centralizers or spacers between the insulated conductor and the heating element. The sheath and the electrical insulation of the insulated conductor may electrically insulate the core from heating element 630 if the center conductor and the heating element touch. Thus, the core and heating element 630 are inhibited from electrically shorting to each other. The insulated conductor or another solid center conductor 730 may be inhibited from being crushed or deformed by heating element 630. In certain embodiments, one end portion of center conductor 730 is electrically coupled to one end portion of heating element 630 at surface 534 using electrical coupling 732, as shown in FIG. 94. In some embodiments, the end of center conductor 730 is electrically coupled to the end of heating element 630 in hydrocarbon layer 460 using electrical coupling 732, as shown in FIGS. 95 and 96. Thus, center conductor 730 is electrically coupled to heating element 630 in a series configuration in the embodiments depicted in FIGS. 94-96. In certain embodiments, center conductor 730 is the insulated conductor and the core of the insulated conductor is electrically coupled to heating element 630 in the series configuration. Center conductor 730 is a return electrical conductor for heating element 630 so that current in the center conductor flows in an opposite direction from current in the heating element (as represented by arrows 734). The electromagnetic field generated by current flow in center conductor 730 substantially confines the flow of electrons and heat generation to the inside of heating element 630 (for example, the inside wall of the heating element) below the Curie temperature of the ferromagnetic material in the heating element. Thus, the outside of heating element 630 is at substantially zero potential and the heating element is electrically isolated from the formation and any adjacent heater or heating element at temperatures below the Curie temperature of the ferromagnetic material (for example, at 25° C.). Having the outside of heating element 630 at substantially zero potential and the heating element electrically isolated from the formation and any adjacent heater or heating element allows for long length heaters to be used in hydrocarbon layer 460 without significant electrical (current) losses to the hydrocarbon layer. For example, heaters with lengths of at least about 100 m, at least about 500 m, or at least about 1000 m may be used in hydrocarbon layer 460.

During application of electrical current to heating element 630 and center conductor 730, heat is generated by the heater. In certain embodiments, heating element 630 generates a majority or all of the heat output of the heater. For example, when electrical current flows through ferromagnetic material in heating element 630 and copper or another low resistivity material in center conductor 730, the heating element generates a majority or all of the heat output of the heater. Generating a majority of the heat in the outer conductor (heating element 630) instead of center conductor 730 may increase the efficiency of heat transfer to the formation by allowing direct heat transfer from the heat generating element (heating element 630) to the formation and may reduce heat losses across heater 716 (for example, heat losses between the center conductor and the outer conductor if the center conductor is the heat generating element). Generating heat in heating element 630 instead of center conductor 730 also increases the heat generating surface area of heater 716. Thus, for the same operating temperature of heater 716, more heat can be provided to the formation using the outer conductor (heating element 630) as the heat generating element rather than center conductor 730.

In some embodiments, a fluid flows through heater 716 (represented by arrows 736 in FIGS. 94 and 95) to preheat the formation and/or to recover heat from the heating element. In the embodiment depicted in FIG. 94, fluid flows from one end of heater 716 to the other end of the heater inside and through heating element 630 and outside center conductor 730, as shown by arrows 736. In the embodiment depicted in FIG. 95, fluid flows into heater 716 through center conductor 730, which is a tubular conductor, as shown by arrows 736. Center conductor 730 includes openings 738 at the end of the center conductor to allow fluid to exit the center conductor. Openings 738 may be perforations or other orifices that allow fluid to flow into and/or out of center conductor 730. Fluid then returns to the surface inside heating element 630 and outside center conductor 730, as shown by arrows 736.

Fluid flowing inside heater 716 (represented by arrows 736 in FIGS. 94 and 95) may be used to preheat the heater, to initially heat the formation, and/or to recover heat from the formation after heating is completed for the in situ heat treatment process. Fluids that may flow through the heater include, but are not limited to, air, water, steam, helium, carbon dioxide or other high heat capacity fluids. In some embodiments, a hot fluid, such as carbon dioxide, helium, or DOWTHERM® (The Dow Chemical Company, Midland, Mich., U.S.A.), flows through the tubular heating elements to provide heat to the formation. The hot fluid may be used to provide heat to the formation before electrical heating is used to provide heat to the formation. In some embodiments, the hot fluid is used to provide heat in addition to electrical heating. Using the hot fluid to provide heat to or preheat the formation in addition to providing electrical heating may be less expensive than using electrical heating alone to provide heat to the formation. In some embodiments, water and/or steam flows through the tubular heating element to recover heat from the formation after in situ heat treatment of the formation. The heated water and/or steam may be used for solution mining and/or other processes.

Figure 97A:
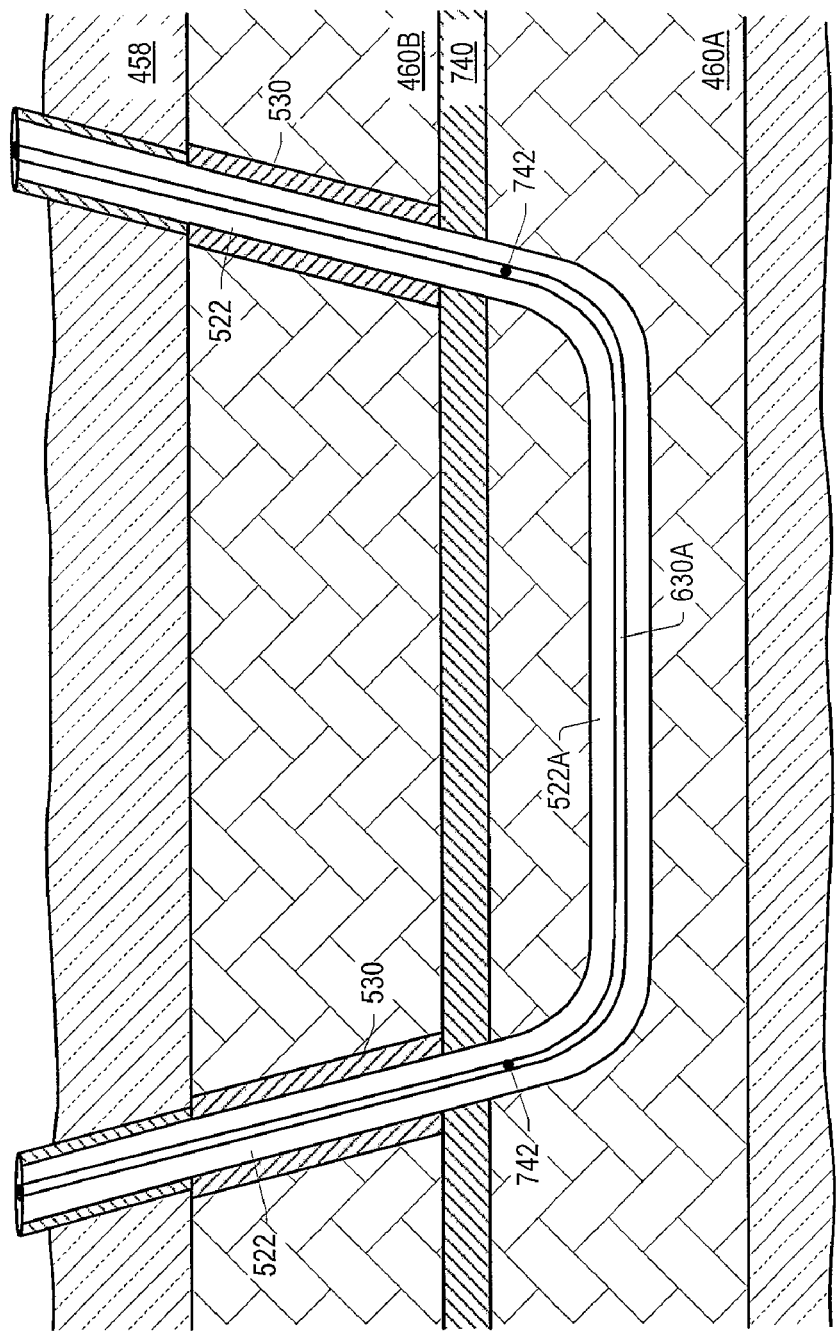
FIGS. 97A and 97B depict an embodiment for using substantially u-shaped wellbores to time sequence heat two layers in a hydrocarbon containing formation.
Figure 97B:
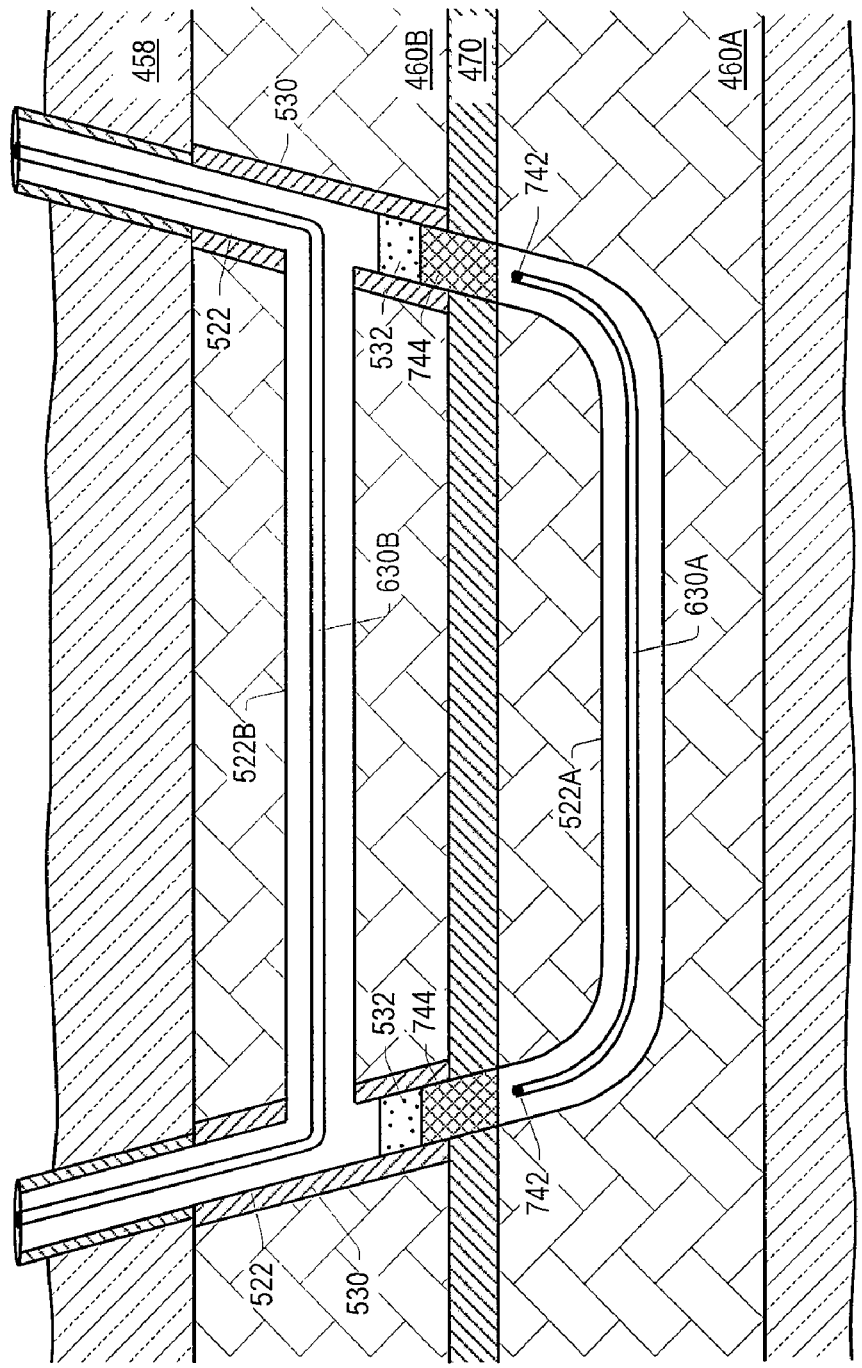

FIGS. 97A and 97B depict an embodiment for using substantially u-shaped wellbores to time sequence heat two layers in a hydrocarbon containing formation. In FIG. 97A, substantially horizontal opening 522A is formed in hydrocarbon layer 460A extending from relatively vertical openings 522. Hydrocarbon layer 460A is separated from hydrocarbon layer 460B by impermeable zone 740. In certain embodiments, hydrocarbon layer 460B is an upper layer or lesser depth layer than hydrocarbon layer 460A. Impermeable zone 740 provides a substantially impermeable seal for fluid flow between hydrocarbon layer 460A and hydrocarbon layer 460B. In certain embodiments (for example, in an oil shale formation), hydrocarbon layer 460A has a higher richness than hydrocarbon layer 460B.

Heating element 630A is placed in opening 522A in hydrocarbon layer 460A. Overburden casing 530 is placed along the relatively vertical walls of openings 522 in hydrocarbon layer 460B. Overburden casing 530 inhibits heat transfer to hydrocarbon layer 460B while heat is provided to hydrocarbon layer 460A by heating element 630A. Heating element 630A is used to provide heat to hydrocarbon layer 460A. Formation fluids, such as pyrolyzed hydrocarbons, may be produced from hydrocarbon layer 460A.

Heat may be provided to hydrocarbon layer 460A by heating element 630A for a selected length of time. The selected length of time may be based on a variety of factors including, but not limited to, formation characteristics, present or future economic factors, or capital costs. For example, for an oil shale formation, hydrocarbon layer 460A may have a richness of about 0.12 L/kg (30.5 gals/ton) so the layer is heated for about 25 years. Production of formation fluids from hydrocarbon layer 460A may continue from the layer until production slows down to an uneconomical rate.

After hydrocarbon layer 460A is heated for the selected time, heating element 630A is turned off. Heating element 630A may be pulled firmly (for example, yanked) upwards so that the heating element breaks off at links 742. Links 742 may be weak links designed to pull apart when a selected or sufficient amount of pulling force is applied to the links. The upper portions of heating element 630A are then pulled out of the formation and the substantially horizontal portion of heating element 630A is left in opening 522A, as shown in FIG. 97B. In some embodiments, only one link 742 may be broken so that the upper portion above the one link can be removed and the remaining portions of the heater can be removed by pulling on the opposite end of the heater. Thus, the entire length of heating element 630A may be removed from the formation.

After upper portions of heating element 630A are removed from openings 522, plugs 744 may be placed into openings 522 at a selected location in hydrocarbon layer 460B, as depicted in FIG. 97B. In certain embodiments, plugs 744 are placed into openings 522 at or near impermeable zone 740. Packing 532 may be placed into openings 522 above plugs 744. In some embodiments, packing 532 is filled into openings 522 without plugs in the openings.

After plugs 744 and/or packing 532 is set into place in openings 522, substantially horizontal opening 522B may be formed in hydrocarbon layer 460B through casing 530. Heating element 630B is placed into opening 522B. Heating element 630B is used to provide heat to hydrocarbon layer 460B. Formation fluids, such as pyrolyzed hydrocarbons, may be produced from hydrocarbon layer 460B.

Heating hydrocarbon layers 460A, 460B in the time-sequenced manner described above may be more economical than producing from only one layer or using vertical heaters to provide heat to the layers simultaneously. Using relatively vertical openings 522 to access both hydrocarbon layers at different times may save on capital costs associated with forming openings in the formation and providing surface facilities to power the heating elements. Heating hydrocarbon layer 460A first before heating hydrocarbon layer 460B may improve the economics of treating the formation (for example, the net present value of a project to treat the formation). In addition, impermeable zone 740 and packing 532 may provide a seal for hydrocarbon layer 460A after heating and production from the layer. This seal may be useful for abandonment of the hydrocarbon layer after treating the hydrocarbon layer.

In certain embodiments, portions of the wellbore that extend through the overburden include casings. The casings may include materials that inhibit inductive effects in the casings. Inhibiting inductive effects in the casings may inhibit induced currents in the casing and/or reduce heat losses to the overburden. In some embodiments, the overburden casings may include non-metallic materials such as fiberglass, polyvinylchloride (PVC), chlorinated PVC (CPVC), high-density polyethylene (HDPE), or other high temperature plastics. HDPEs with working temperatures in a usable range include HDPEs available from Dow Chemical Co., Inc. (Midland, Mich., U.S.A.). The overburden casings may be made of materials that are spoolable so that the overburden casings can be spooled into the wellbore. In some embodiments, overburden casings may include non-magnetic metals such as aluminum or non-magnetic alloys such as manganese steels having at least 10% manganese, iron aluminum alloys with at least 18% aluminum, or austenitic stainless steels such as 304 stainless steel or 316 stainless steel. In some embodiments, overburden casings may include carbon steel or other ferromagnetic material coupled on the inside diameter to a highly conductive non-ferromagnetic metal (for example, copper or aluminum) to inhibit inductive effects or skin effects. In some embodiments, overburden casings are made of inexpensive materials that may left in the formation (sacrificial casings).

In certain embodiments, wellheads for the wellbores may be made of one or more non-ferromagnetic materials. The wellheads may include fiberglass, PVC, CPVC, HDPE, and/or non-magnetic alloys or metals. Using non-ferromagnetic materials in the wellhead may inhibit undesired heating of components in the wellhead. Ferromagnetic materials used in the wellhead may be electrically and/or thermally insulated from other components of the wellhead. In some embodiments, an inert gas (for example, nitrogen or argon) is purged inside the wellhead and/or inside of casings to inhibit reflux of heated gases into the wellhead and/or the casings.

In some embodiments, ferromagnetic materials in the wellhead are electrically coupled to a non-ferromagnetic material (for example, copper) to inhibit skin effect heat generation in the ferromagnetic materials in the wellhead. The non-ferromagnetic material is in electrical contact with the ferromagnetic material so that current flows through the non-ferromagnetic material. For example, copper may be plasma sprayed, coated, or lined on the inside and/or outside walls of the wellhead. In some embodiments, a non-ferromagnetic material such as copper is welded, brazed, clad, or otherwise electrically coupled to the inside and/or outside walls of the wellhead. For example, copper may be swaged out to line the inside walls in the wellhead. Copper may be liquid nitrogen cooled and then allowed to expand to contact and swage against the inside walls of the wellhead. In some embodiments, the copper is hydraulically expanded to contact against the inside walls of the wellhead.

In some embodiments, two or more substantially horizontal wellbores are branched off of a first substantially vertical wellbore drilled downwards from a first location on a surface of the formation. The substantially horizontal wellbores may be substantially parallel through a hydrocarbon layer. The substantially horizontal wellbores may reconnect at a second substantially vertical wellbore drilled downwards at a second location on the surface of the formation. Having multiple wellbores branching off of a single substantially vertical wellbore drilled downwards from the surface reduces the number of openings made at the surface of the formation.

In certain embodiments, a temperature limited heater is utilized for heavy oil applications (for example, treatment of relatively permeable formations or tar sands formations). A temperature limited heater may provide a relatively low Curie temperature so that a maximum average operating temperature of the heater is less than 350° C., 300° C., 250° C., 225° C., 200° C., or 150° C. In an embodiment (for example, for a tar sands formation), a maximum temperature of the heater is less than about 250° C. to inhibit olefin generation and production of other cracked products. In some embodiments, a maximum temperature of the heater above about 250° C. is used to produce lighter hydrocarbon products. For example, the maximum temperature of the heater may be at or less than about 500° C.

A heater may heat a volume of formation adjacent to a production wellbore (a near production wellbore region) so that the temperature of fluid in the production wellbore and in the volume adjacent to the production wellbore is less than the temperature that causes degradation of the fluid. The heat source may be located in the production wellbore or near the production wellbore. In some embodiments, the heat source is a temperature limited heater. In some embodiments, two or more heat sources may supply heat to the volume. Heat from the heat source may reduce the viscosity of crude oil in or near the production wellbore. In some embodiments, heat from the heat source mobilizes fluids in or near the production wellbore and/or enhances the radial flow of fluids to the production wellbore. In some embodiments, reducing the viscosity of crude oil allows or enhances gas lifting of heavy oil (approximately at most 10° API gravity oil) or intermediate gravity oil (approximately 12° to 20° API gravity oil) from the production wellbore. In certain embodiments, the initial API gravity of oil in the formation is at most 10°, at most 20°, at most 25°, or at most 30°. In certain embodiments, the viscosity of oil in the formation is at least 0.05 Pa·s (50 cp). In some embodiments, the viscosity of oil in the formation is at least 0.10 Pa·s (100 dp), at least 0.15 Pa·s (150 cp), or at least at least 0.20 Pa·s (200 cp). Large amounts of natural gas may have to be utilized to provide gas lift of oil with viscosities above 0.05 Pa·s. Reducing the viscosity of oil at or near the production wellbore in the formation to a viscosity of 0.05 Pa·s (50 cp), 0.03 Pa·s (30 cp), 0.02 Pa·s (20 cp), 0.01 Pa·s (10 cp), or less (down to 0.001 Pa·s (1 cp) or lower) lowers the amount of natural gas needed to lift oil from the formation. In some embodiments, reduced viscosity oil is produced by other methods such as pumping.

The rate of production of oil from the formation may be increased by raising the temperature at or near a production wellbore to reduce the viscosity of the oil in the formation in and adjacent to the production wellbore. In certain embodiments, the rate of production of oil from the formation is increased by 2 times, 3 times, 4 times, or greater up to 20 times over standard cold production, which has no external heating of formation during production. Certain formations may be more economically viable for enhanced oil production using the heating of the near production wellbore region. Formations that have a cold production rate approximately between 0.05 m$^3$/(day per meter of wellbore length) and 0.20 m$^3$/(day per meter of wellbore length) may have significant improvements in production rate using heating to reduce the viscosity in the near production wellbore region. In some formations, production wells up to 775 m, up to 1000 m, or up to 1500 m in length are used. For example, production wells between 450 m and 775 m in length are used, between 550 m and 800 m are used, or between 650 m and 900 m are used. Thus, a significant increase in production is achievable in some formations. Heating the near production wellbore region may be used in formations where the cold production rate is not between 0.05 m$^3$/(day per meter of wellbore length) and 0.20 m$^3$/(day per meter of wellbore length), but heating such formations may not be as economically favorable. Higher cold production rates may not be significantly increased by heating the near wellbore region, while lower production rates may not be increased to an economically useful value.

Using the temperature limited heater to reduce the viscosity of oil at or near the production well inhibits problems associated with non-temperature limited heaters and heating the oil in the formation due to hot spots. One possible problem is that non-temperature limited heaters can cause coking of oil at or near the production well if the heater overheats the oil because the heaters are at too high a temperature. Higher temperatures in the production well may also cause brine to boil in the well, which may lead to scale formation in the well. Non-temperature limited heaters that reach higher temperatures may also cause damage to other wellbore components (for example, screens used for sand control, pumps, or valves). Hot spots may be caused by portions of the formation expanding against or collapsing on the heater. In some embodiments, the heater (either the temperature limited heater or another type of non-temperature limited heater) has sections that are lower because of sagging over long heater distances. These lower sections may sit in heavy oil or bitumen that collects in lower portions of the wellbore. At these lower sections, the heater may develop hot spots due to coking of the heavy oil or bitumen. A standard non-temperature limited heater may overheat at these hot spots, thus producing a non-uniform amount of heat along the length of the heater. Using the temperature limited heater may inhibit overheating of the heater at hot spots or lower sections and provide more uniform heating along the length of the wellbore.

In some embodiments, oil or bitumen cokes in a perforated liner or screen in a heater/production wellbore (for example, coke may form between the heater and the liner or between the liner and the formation). Oil or bitumen may also coke in a toe section of a heel and toe heater/production wellbore, as shown in and described below for FIG. 112. A temperature limited heater may limit a temperature of a heater/production wellbore below a coking temperature to inhibit coking in the well so that the wellbore does not plug up.

In certain embodiments, fluids in the relatively permeable formation containing heavy hydrocarbons are produced with little or no pyrolyzation of hydrocarbons in the formation. In certain embodiments, the relatively permeable formation containing heavy hydrocarbons is a tar sands formation. For example, the formation may be a tar sands formation such as the Athabasca tar sands formation in Alberta, Canada or a carbonate formation such as the Grosmont carbonate formation in Alberta, Canada. The fluids produced from the formation are mobilized fluids. Producing mobilized fluids may be more economical than producing pyrolyzed fluids from the tar sands formation. Producing mobilized fluids may also increase the total amount of hydrocarbons produced from the tar sands formation.

Figure 98:
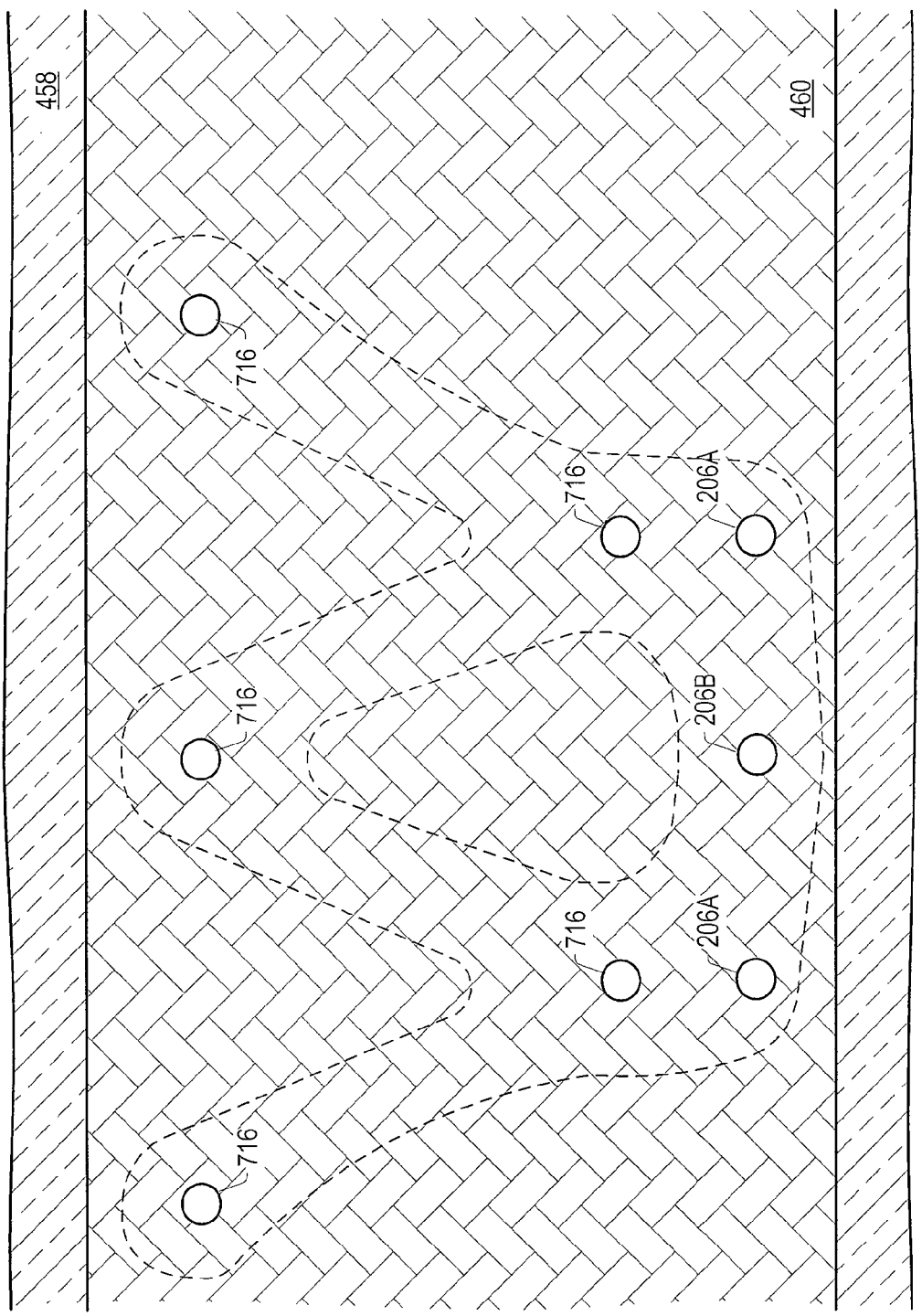
FIG. 98 depicts a side view representation of an embodiment for producing mobilized fluids from a tar sands formation with a relatively thin hydrocarbon layer.
Figure 99:
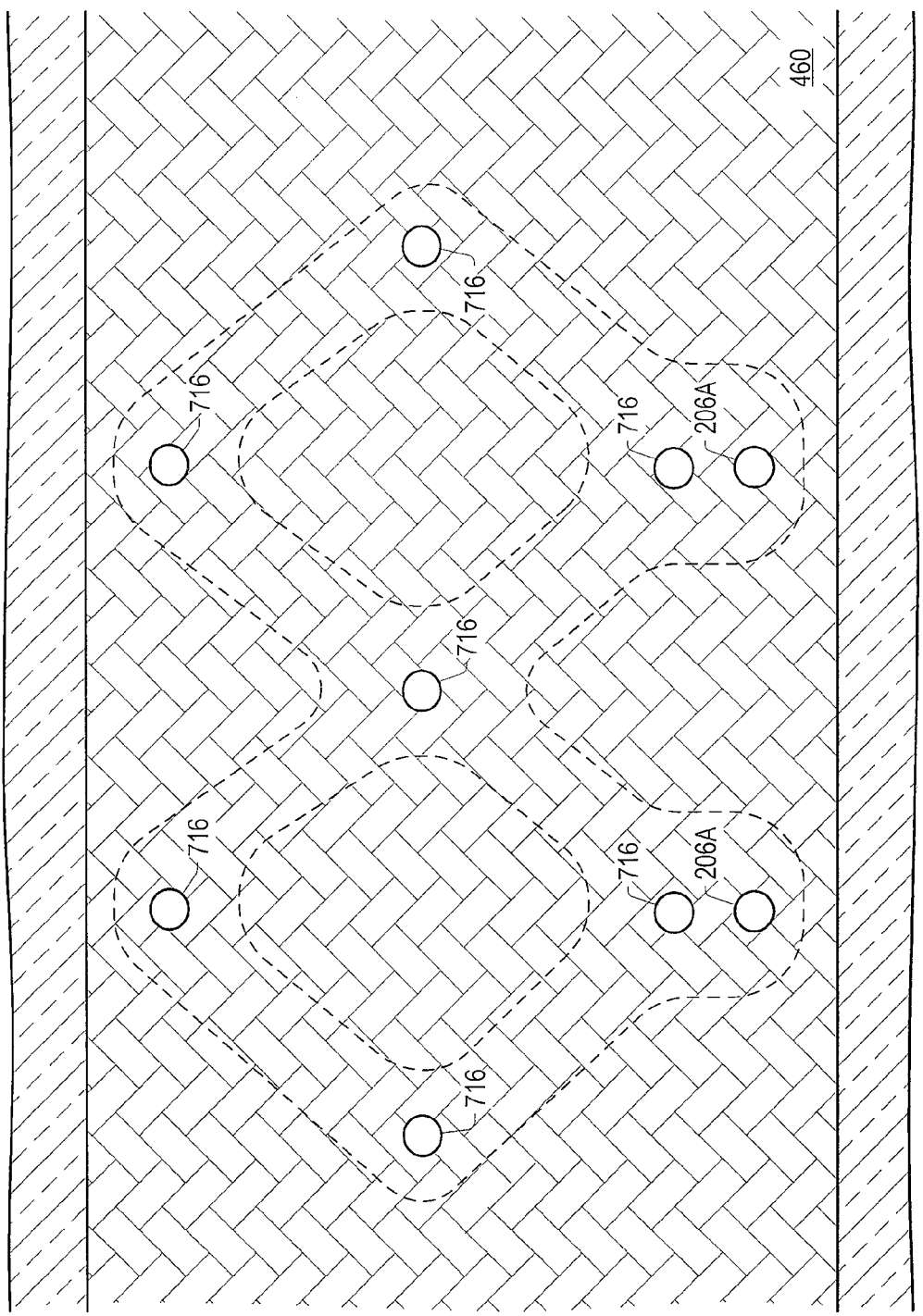
FIG. 99 depicts a side view representation of an embodiment for producing mobilized fluids from a tar sands formation with a hydrocarbon layer that is thicker than the hydrocarbon layer depicted in FIG. 98.
Figure 100:
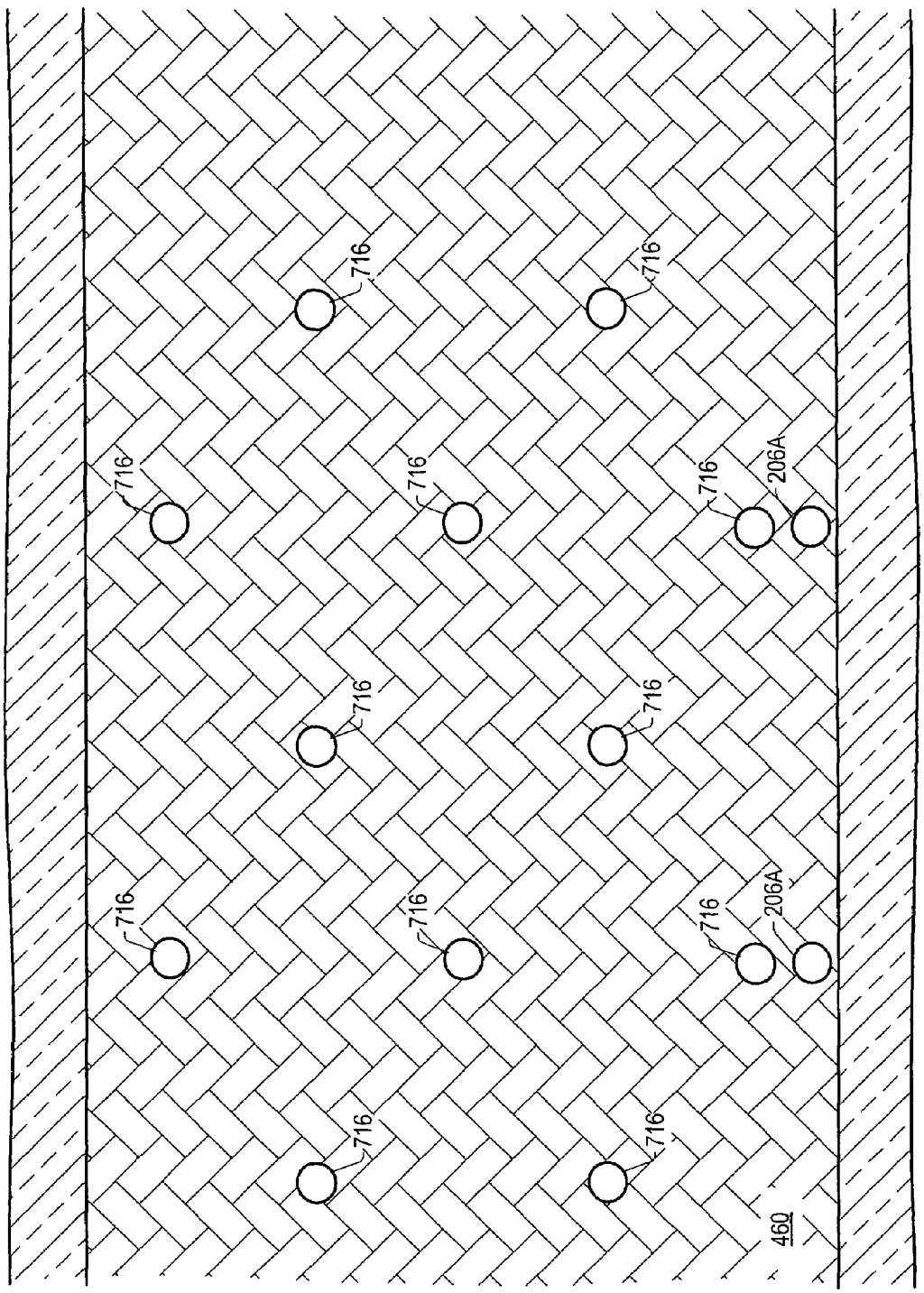
FIG. 100 depicts a side view representation of an embodiment for producing mobilized fluids from a tar sands formation with a hydrocarbon layer that is thicker than the hydrocarbon layer depicted in FIG. 99.
Figure 101:
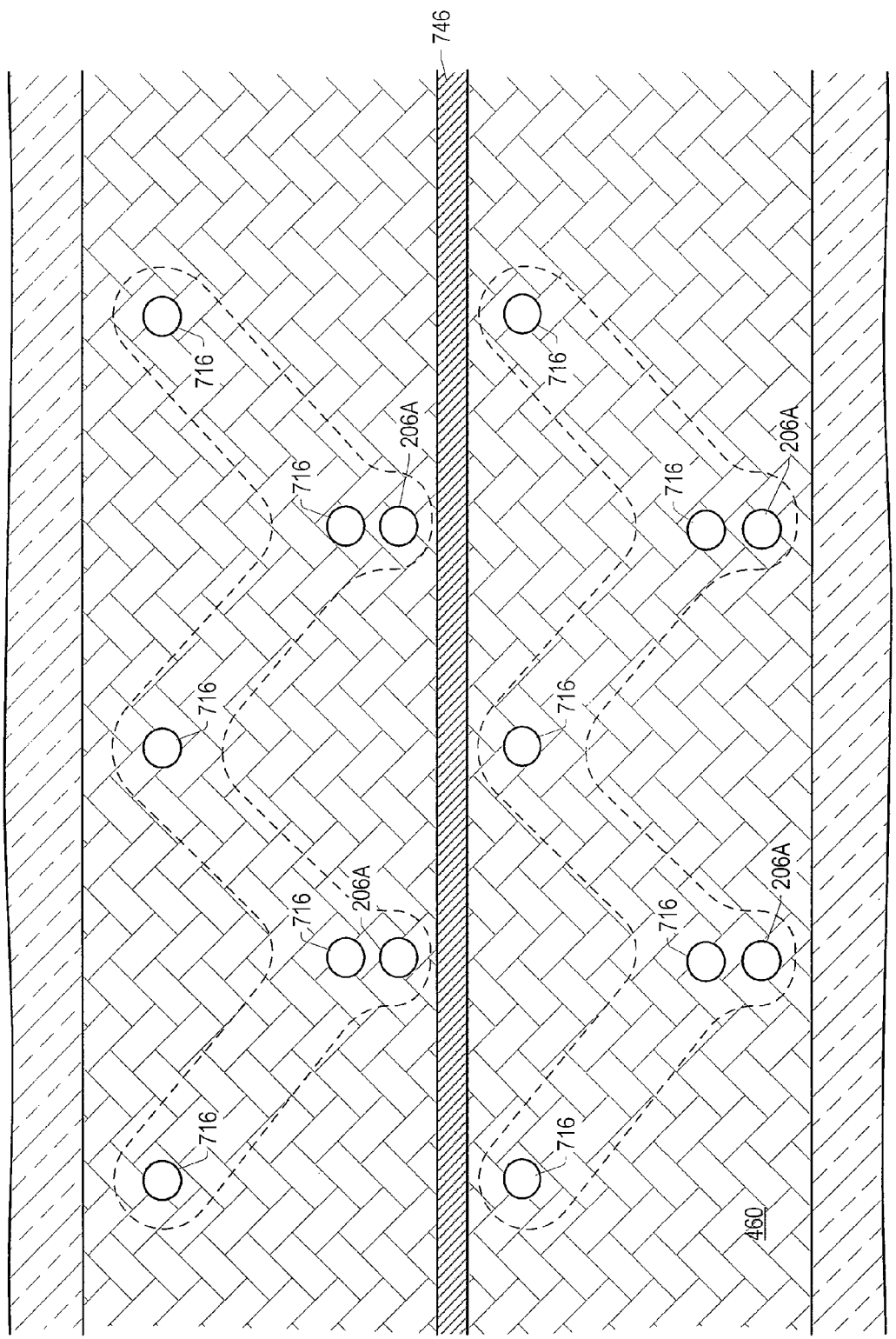
FIG. 101 depicts a side view representation of an embodiment for producing mobilized fluids from a tar sands formation with a hydrocarbon layer that has a shale break.

FIGS. 98-101 depict side view representations of embodiments for producing mobilized fluids from tar sands formations. In FIGS. 98-101, heaters 716 have substantially horizontal heating sections in hydrocarbon layer 460 (as shown, the heaters have heating sections that go into and out of the page). FIG. 98 depicts a side view representation of an embodiment for producing mobilized fluids from a tar sands formation with a relatively thin hydrocarbon layer. FIG. 99 depicts a side view representation of an embodiment for producing mobilized fluids from a thicker hydrocarbon layer (the hydrocarbon layer depicted in FIG. 99 is thicker than the hydrocarbon layer depicted in FIG. 98). FIG. 100 depicts a side view representation of an embodiment for producing mobilized fluids from an even thicker hydrocarbon layer (the hydrocarbon layer depicted in FIG. 100 is thicker than the hydrocarbon layer depicted in FIG. 99). FIG. 101 depicts a side view representation of an embodiment for producing mobilized fluids from a tar sands formation with a hydrocarbon layer that has a shale break.

In FIG. 98, heaters 716 are placed in an alternating triangular pattern in hydrocarbon layer 460. In FIGS. 99, 100, and 101, heaters 716 are placed in an alternating triangular pattern in hydrocarbon layer 460 that repeats vertically to encompass a majority or all of the hydrocarbon layer. In FIG. 101, the alternating triangular pattern of heaters 716 in hydrocarbon layer 460 repeats uninterrupted across shale break 746. In FIGS. 98-101, heaters 716 may be equidistantly spaced from each other. In the embodiments depicted in FIGS. 98-101, the number of vertical rows of heaters 716 depends on factors such as, but not limited to, the desired spacing between the heaters, the thickness of hydrocarbon layer 460, and/or the number and location of shale breaks 746. In some embodiments, heaters 716 are arranged in other patterns. For example, heaters 716 may be arranged in patterns such as, but not limited to, hexagonal patterns, square patterns, or rectangular patterns.

In the embodiments depicted in FIGS. 98-101, heaters 716 provide heat that mobilizes hydrocarbons (reduces the viscosity of the hydrocarbons) in hydrocarbon layer 460. In certain embodiments, heaters 716 provide heat that reduces the viscosity of the hydrocarbons in hydrocarbon layer 460 below about 0.50 Pa·s (500 cp), below about 0.10 Pa·s (100 cp), or below about 0.05 Pa·s (50 cp). The spacing between heaters 716 and/or the heat output of the heaters may be designed and/or controlled to reduce the viscosity of the hydrocarbons in hydrocarbon layer 460 to desirable values. Heat provided by heaters 716 may be controlled so that little or no pyrolyzation occurs in hydrocarbon layer 460. Superposition of heat between the heaters may create one or more drainage paths (for example, paths for flow of fluids)(representative drainage paths are shown by dotted lines in FIGS. 98, 99, and 101) between the heaters. In certain embodiments, production wells 206A and/or production wells 206B are located proximate heaters 716 so that heat from the heaters superimposes over the production wells. The superimposition of heat from heaters 716 over production wells 206A and/or production wells 206B creates one or more drainage paths from the heaters to the production wells. In certain embodiments, one or more of the drainage paths converge. (as shown by the dotted lines in FIGS. 98, 99, and 101). For example, the drainage paths may converge at or near a bottommost heater and/or the drainage paths may converge at or near production wells 206A and/or production wells 206B. Fluids mobilized in hydrocarbon layer 460 tend to flow towards the bottommost heaters 716, production wells 206A and/or production wells 206B in the hydrocarbon layer because of gravity and the heat and pressure gradients established by the heaters and/or the production wells. The drainage paths and/or the converged drainage paths allow production wells 206A and/or production wells 206B to collect mobilized fluids in hydrocarbon layer 460.

In certain embodiments, hydrocarbon layer 460 has sufficient permeability to allow mobilized fluids to drain to production wells 206A and/or production wells 206B. For example, hydrocarbon layer 460 may have a permeability of at least about 0.1 darcy, at least about 1 darcy, at least about 10 darcy, or at least about 100 darcy. In some embodiments, hydrocarbon layer 460 has a relatively large vertical permeability to horizontal permeability ratio ($K_v/K_h$). For example, hydrocarbon layer 460 may have a $K_v/K_h$ ratio between about 0.01 and about 2, between about 0.1 and about 1, or between about 0.3 and about 0.7.

In certain embodiments, fluids are produced through production wells 206A located near heaters 716 in the lower portion of hydrocarbon layer 460. In some embodiments, fluids are produced through production wells 206B located below and approximately midway between heaters 716 in the lower portion of hydrocarbon layer 460. At least a portion of production wells 206A and/or production wells 206B may be oriented substantially horizontal in hydrocarbon layer 460 (as shown in FIGS. 98-101, the production wells have horizontal portions that go into and out of the page). Production wells 206A and/or 206B may be located proximate lower portion heaters 716 or the bottommost heaters.

In some embodiments, production wells 206A are positioned substantially vertically below the bottommost heaters in hydrocarbon layer 460. Production wells 206A may be located below heaters 716 at the bottom vertex of a pattern of the heaters (for example, at the bottom vertex of the triangular pattern of heaters depicted in FIGS. 98-101). Locating production wells 206A substantially vertically below the bottommost heaters may provide efficient collection of mobilized fluids in hydrocarbon layer 460.

In certain embodiments, the bottommost heaters are located between about 2 m and about 10 m from the bottom of hydrocarbon layer 460, between about 4 m and about 8 m from the bottom of the hydrocarbon layer, or between about 5 m and about 7 m from the bottom of the hydrocarbon layer. In certain embodiments, production wells 206A and/or production wells 206B are located at a distance from the bottommost heaters 716 that allows heat from the heaters to superimpose over the production wells but at a distance from the heaters that inhibits coking at the production wells. Production wells 206A and/or production wells 206B may be located a distance from the nearest heater (for example, the bottommost heater) of at most ¾ of the spacing between heaters in the pattern of heaters (for example, the triangular pattern of heaters depicted in FIGS. 98-101). In some embodiments, production wells 206A and/or production wells 206B are located a distance from the nearest heater of at most ⅔, at most ½, or at most ⅓ of the spacing between heaters in the pattern of heaters. In certain embodiments, production wells 206A and/or production wells 206B are located between about 2 m and about 10 m from the bottommost heaters, between about 4 m and about 8 m from the bottommost heaters, or between about 5 m and about 7 m from the bottommost heaters. Production wells 206A and/or production wells 206B may be located between about 0.5 m and about 8 m from the bottom of hydrocarbon layer 460, between about 1 m and about 5 m from the bottom of the hydrocarbon layer, or between about 2 m and about 4 m from the bottom of the hydrocarbon layer.

In some embodiments, at least some production wells 206A are located substantially vertically below heaters 716 near shale break 746, as depicted in FIG. 101. Production wells 206A may be located between heaters 716 and shale break 746 to produce fluids that flow and collect above the shale break. Shale break 746 may be an impermeable barrier in hydrocarbon layer 460. In some embodiments, shale break 746 has a thickness between about 1 m and about 6 m, between about 2 m and about 5 m, or between about 3 m and about 4 m. Production wells 206A between heaters 716 and shale break 746 may produce fluids from the upper portion of hydrocarbon layer 460 (above the shale break) and production wells 206A below the bottommost heaters in the hydrocarbon layer may produce fluids from the lower portion of the hydrocarbon layer (below the shale break), as depicted in FIG. 101. In some embodiments, two or more shale breaks may exist in a hydrocarbon layer. In such an embodiment, production wells are placed at or near each of the shale breaks to produce fluids flowing and collecting above the shale breaks.

In some embodiments, shale break 746 breaks down (is desiccated) as the shale break is heated by heaters 716 on either side of the shale break. As shale break 746 breaks down, the permeability of the shale break increases and the shale break allows fluids to flow through the shale break. Once fluids are able to flow through shale break 746, production wells above the shale break may not be needed for production as fluids can flow to production wells at or near the bottom of hydrocarbon layer 460 and be produced there.

In certain embodiments, the bottommost heaters above shale break 746 are located between about 2 m and about 10 m from the shale break, between about 4 m and about 8 m from the bottom of the shale break, or between about 5 m and about 7 m from the shale break. Production wells 206A may be located between about 2 m and about 10 m from the bottommost heaters above shale break 746, between about 4 m and about 8 m from the bottommost heaters above the shale break, or between about 5 m and about 7 m from the bottommost heaters above the shale break. Production wells 206A may be located between about 0.5 m and about 8 m from shale break 746, between about 1 m and about 5 m from the shale break, or between about 2 m and about 4 m from the shale break.

In some embodiments, heat is provided in production wells 206A and/or production wells 206B, depicted in FIGS. 98-101. Providing heat in production wells 206A and/or production wells 206B may maintain and/or enhance the mobility of the fluids in the production wells. Heat provided in production wells 206A and/or production wells 206B may superpose with heat from heaters 716 to create the flow path from the heaters to the production wells. In some embodiments, production wells 206A and/or production wells 206B include a pump to remove fluids to the surface of the formation. In some embodiments, the viscosity of fluids (oil) in production wells 206A and/or production wells 206B is lowered using heaters and/or diluent injection (for example, using a conduit in the production wells for injecting the diluent).

In certain embodiments, in situ heat treatment of the relatively permeable formation containing hydrocarbons (for example, the tar sands formation) includes heating the formation to visbreaking temperatures. For example, the formation may be heated to temperatures between about 100° C. and 260° C., between about 150° C. and about 250° C., or between about 200° C. and about 240° C. At visbreaking temperatures, fluids in the formation have a reduced viscosity (versus their initial viscosity at ambient formation temperature) that allows fluids to flow in the formation. The visbroken fluids may have low API gravities (for example, at most about 10°, about 12°, or about 15° API gravity).

In some embodiments, heaters in the formation are operated at full power output to heat the formation to visbreaking temperatures. Operating at full power may rapidly increase the pressure in the formation. In certain embodiments, fluids are produced from the formation to maintain a pressure in the formation below a selected pressure as the temperature of the formation increases to visbreaking temperatures. In some embodiments, the selected pressure is a fracture pressure of the formation. In certain embodiments, the selected pressure is between about 1000 kPa and about 15000 kPa, between about 2000 kPa and about 10000 kPa, or between about 2500 kPa and about 5000 kPa. The fluids produced from the formation may be visbroken and/or mobilized fluids. Maintaining the pressure as close to the fracture pressure as possible may minimize the number of production wells needed for producing fluids from the formation because fluids are more mobile at higher pressures.

In certain embodiments, after the formation reaches visbreaking temperatures, the pressure in the formation is reduced. The pressure may be reduced by producing fluids (for example, visbroken fluids and/or mobilized fluids) from the formation. In some embodiments, the pressure is reduced below a pressure at which fluids coke in the formation to inhibit coking at pyrolysis temperatures. For example, the pressure is reduced to a pressure below about 1000 kPa, below about 800 kPa, or below about 700 kPa. The pressure may be reduced to inhibit coking of asphaltenes or other large hydrocarbons in the formation. In some embodiments, the pressure may be maintained below a pressure at which water passes through a liquid phase at downhole (formation) temperatures to inhibit liquid water and dolomite reactions. After reducing the pressure in the formation, the temperature may be increased to pyrolysis temperatures to begin pyrolyzation and/or upgrading of fluids in the formation. The pyrolyzed and/or upgraded fluids may be produced from the formation.

The amount of fluids produced at temperatures below visbreaking temperatures, the amount of fluids produced at visbreaking temperatures, and the amount of upgraded fluids produced may be varied to control the quality and amount of fluids produced from the formation and the total recovery of hydrocarbons from the formation. For example, producing more fluid during the early stages of treatment (for example, producing at temperatures below visbreaking temperatures) may increase the total recovery of hydrocarbons from the formation while reducing the overall quality (lowering the overall API gravity) of fluid produced from the formation. The overall quality is reduced because more heavy hydrocarbons are produced by producing more fluids at the lower temperatures. Producing less fluids at the lower temperatures may increase the overall quality of the fluids produced from the formation but may lower the total recovery of hydrocarbons from the formation.

In certain embodiments, the formation is heated using isolated cells of heaters (cells or sections of the formation that are not interconnected for fluid flow). The isolated cells may be created by using larger heater spacings in the formation. For example, large heater spacings may be used in the embodiments depicted in FIGS. 98-101. These isolated cells may be produced during early stages of heating (for example, at temperatures below visbreaking temperatures). Because the cells are isolated from other cells in the formation, the pressures in the isolated cells are high and more liquids are producible from the isolated cells. Thus, more liquids may be produced from the formation and a higher total recovery of hydrocarbons may be reached. During later stages of heating, the heat gradient will interconnect the isolated cells and pressures in the formation will drop.

In certain embodiments, the heat gradient in the formation is modified so that a gas cap is created at or near an upper portion of the hydrocarbon layer. For example, the heat gradient made by heaters 716 depicted in the embodiments depicted in FIGS. 98-101 may be modified to create the gas cap at or near overburden 458 of hydrocarbon layer 460. The gas cap may push or drive liquids to the bottom of the hydrocarbon layer so that more liquids may be produced from the formation.

In certain embodiments, fluids produced at temperatures below visbreaking temperatures and/or fluids produced at visbreaking temperatures are blended with diluent to produce fluids with lower viscosities. In some embodiments, the diluent includes upgraded or pyrolyzed fluids produced from the formation. In some embodiments, the diluent includes upgraded or pyrolyzed fluids produced from another portion of the formation or another formation. In certain embodiments, the amount of fluids produced at temperatures below visbreaking temperatures and/or fluids produced at visbreaking temperatures that are blended with upgraded fluids from the formation is adjusted to create a fluid suitable for transportation and/or use in a refinery. The amount of blending may be adjusted so that the fluid has chemical and physical stability. Maintaining the chemical and physical stability of the fluid may allow the fluid to be transported, reduce pretreatment processes at a refinery and/or reduce or eliminate the need for adjusting the refinery process to compensate for the fluid.

In certain embodiments, formation conditions (for example, pressure and temperature) and/or fluid production are controlled to produce fluids with selected properties. For example, formation conditions and/or fluid production may be controlled to produce fluids with a selected API gravity and/or a selected viscosity. The selected API gravity and/or selected viscosity may be produced by combining fluids produced at different formation conditions (for example, combining fluids produced at different temperatures during the treatment as described above). As an example, formation conditions and/or fluid production may be controlled to produce fluids with an API gravity of about 19° and a viscosity of about 0.35 Pa·s (350 cp) at 19° C.

In some embodiments, formation conditions and/or fluid production is controlled so that water (for example, connate water) is recondensed in the treatment area. Recondensing water in the treatment area keeps the heat of condensation in the formation. In addition, having liquid water in the formation may increase mobility of liquid hydrocarbons (oil) in the formation. Liquid water may wet rock or other strata in the formation by occupying pores or corners in the strata and creating a slick surface that moves liquid hydrocarbons more readily through the formation.

In certain embodiments, a drive process (for example, a steam injection process such as cyclic steam injection, a steam assisted gravity drainage process (SAGD), a solvent injection process, or a carbon dioxide injection process) is used to treat the tar sands formation in addition to the in situ heat treatment process. In some embodiments, heaters are used to create high permeability zones (or injection zones) in the formation for the drive process. Heaters may be used to create a mobilization geometry or production network in the formation to allow fluids to flow through the formation during the drive process. For example, heaters may be used to create drainage paths between the heaters and production wells for the drive process. In some embodiments, the heaters are used to provide heat during the drive process. The amount of heat provided by the heaters may be small compared to the heat input from the drive process (for example, the heat input from steam injection).

In some embodiments, the in situ heat treatment process may provide less heat to the formation (for example, use a wider heat spacing) if the in situ heat treatment process is followed by the drive process. The drive process may be used to increase the amount of heat provided to the formation to compensate for the loss of heat injection.

In some embodiments, the drive process is used to treat the formation and produce hydrocarbons from the formation. The drive process may recover a low amount of oil in place from the formation (for example, less than 20% recovery of oil in place from the formation). The in situ heat treatment process may be used following the drive process to increase the recovery of oil in place from the formation. In some embodiments, the drive process preheats the formation for the in situ heat treatment process. In some embodiments, the formation is treated using the in situ heat treatment process a significant time after the formation has been treated using the drive process. For example, the in situ heat treatment process is used 1 year, 2 years, or 3 years after a formation has been treated using the drive process. The in situ heat treatment process may be used on formations that have been left dormant after the drive process treatment because further hydrocarbon production using the drive process is not possible and/or not economically feasible on the formation. In some embodiments, the formation remains at least somewhat preheated from the drive process even after the significant time.

In some embodiments, heaters are used to preheat the formation for the drive process. For example, heaters may be used to create injectivity in the formation for a drive fluid. The heaters may create high permeability zones (or injection zones) in the formation for the drive process. In certain embodiments, heaters are used to create injectivity in formations with little or no initial injectivity (for example, karsted formations such as the Grosmont formation in Alberta, Canada). Heating the formation may create a mobilization geometry or production network in the formation to allow fluids to flow through the formation for the drive process. For example, heaters may be used to create a fluid production network between a horizontal heater and a vertical production well. The heaters used to preheat the formation for the drive process may also be used to provide heat during the drive process.

Figure 102:
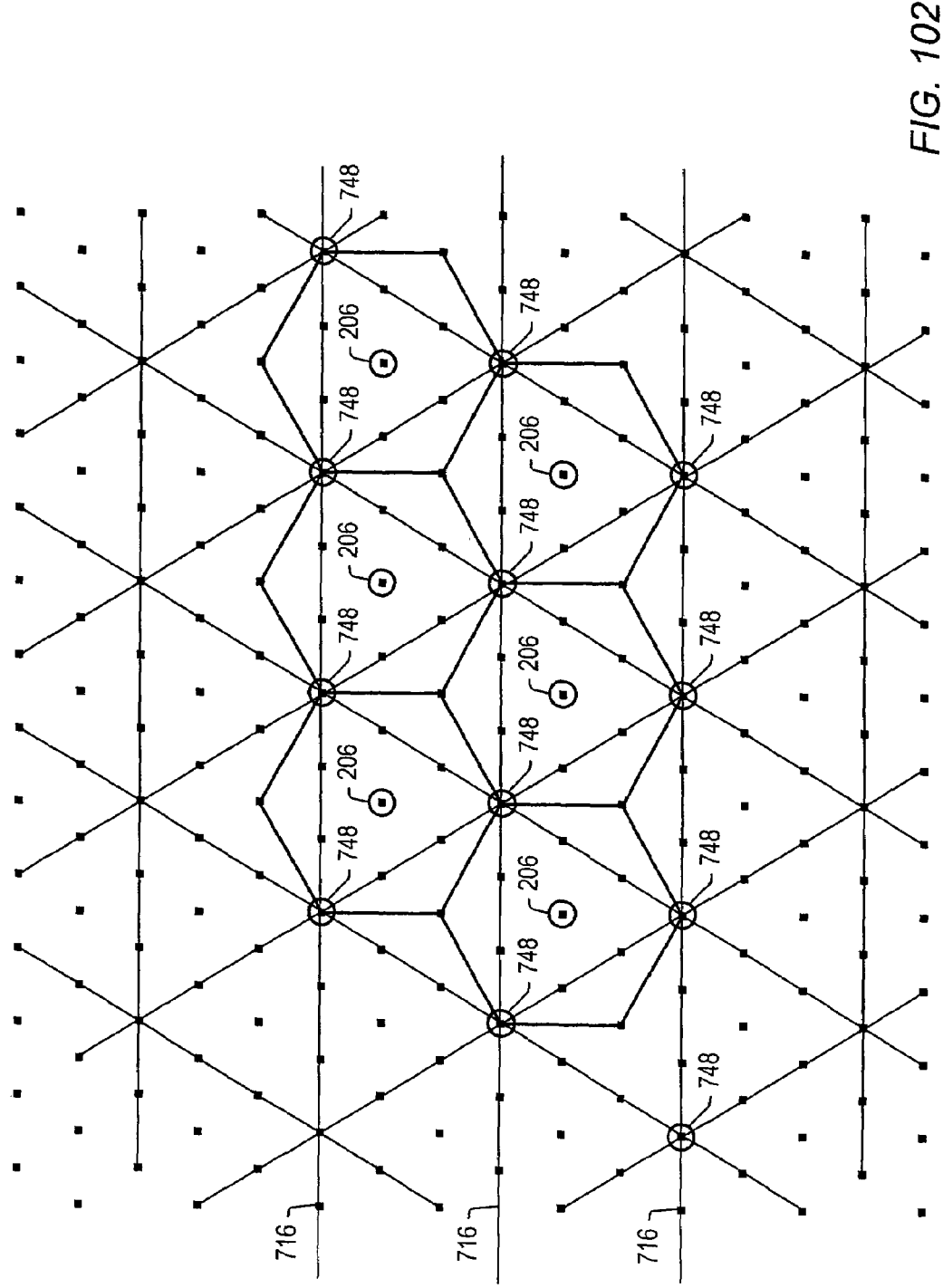
FIG. 102 depicts a top view representation of an embodiment for preheating using heaters for the drive process.

FIG. 102 depicts a top view representation of an embodiment for preheating using heaters for the drive process. Injection wells 748 and production wells 206 are substantially vertical wells. Heaters 716 are long substantially horizontal heaters positioned so that the heaters pass in the vicinity of injection wells 748. Heaters 716 intersect the vertical well patterns slightly displaced from the vertical rows.

Figure 103:
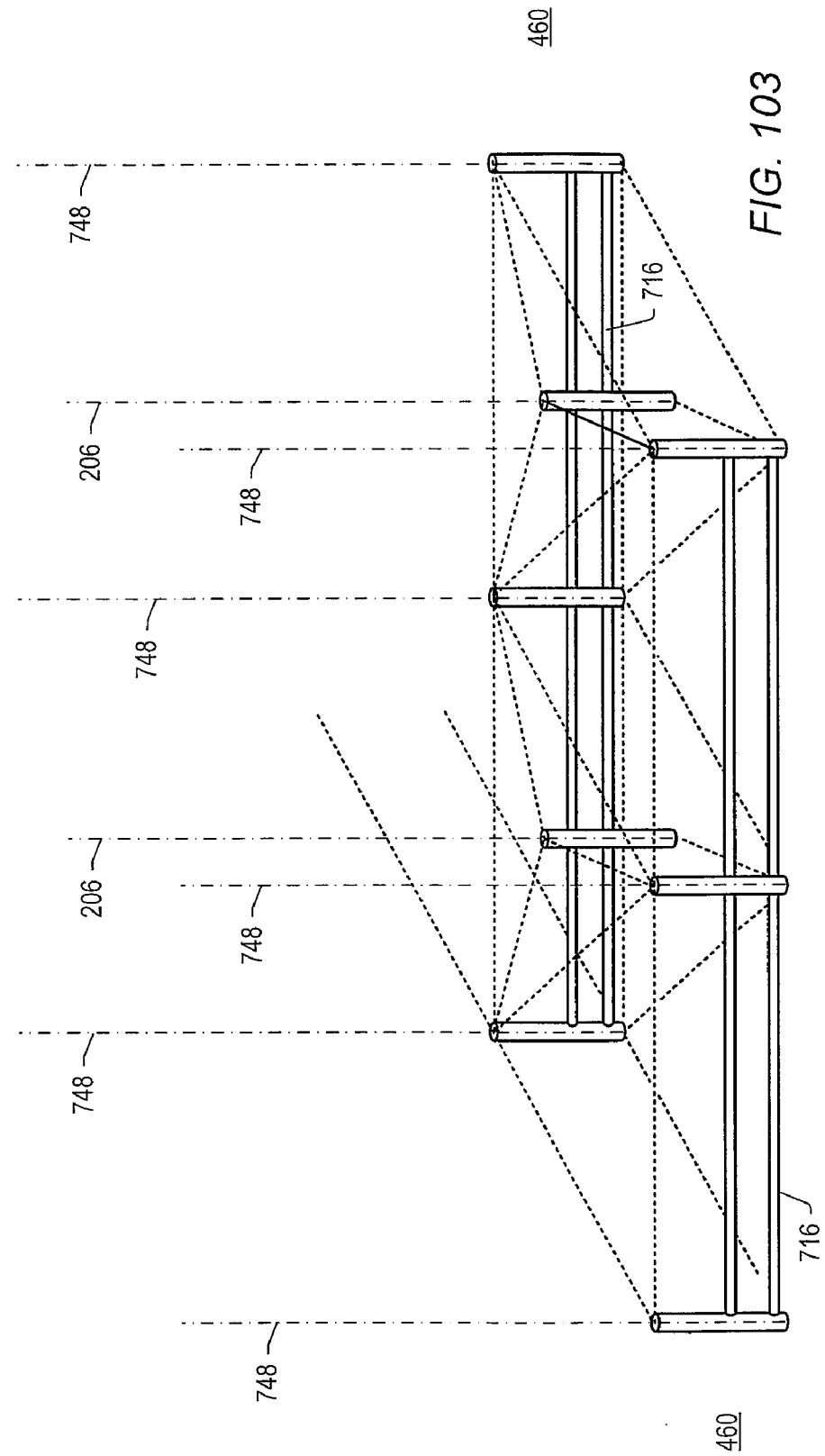
FIG. 103 depicts a side view representation of an embodiment for preheating using heaters for the drive process.

The vertical location of heaters 716 with respect to injection wells 748 and production wells 206 depends on, for example, the vertical permeability of the formation. In formations with at least some vertical permeability, injected steam will rise to the top of the permeable layer in the formation. In such formations, heaters 716 may be located near the bottom of hydrocarbon layer 460, as shown in FIG. 103. In formations with very low vertical permeabilities, more than one horizontal heater may be used with the heaters stacked substantially vertically or with heaters at varying depths in the hydrocarbon layer (for example, heater patterns as shown in FIGS. 98-101). The vertical spacing between the horizontal heaters in such formations may correspond to the distance between the heaters and the injection wells. Heaters 716 are located in the vicinity of injection wells 748 and/or production wells 206 so that sufficient energy is delivered by the heaters to provide flow rates for the drive process that are economically viable. The spacing between heaters 716 and injection wells 748 or production wells 206 may be varied to provide an economically viable drive process. The amount of preheating may also be varied to provide an economically viable process.

Some embodiments of formations with little or no initial injectivity (such as karsted formations or karsted layers informations) may have tight vugs in one or more layers of the formations. The tight vugs may be vugs filled with viscous fluids such as bitumen or heavy oil. In some embodiments, the vugs have a porosity of at least about 20 porosity units, at least about 30 porosity units, or at least about 35 porosity units. The formation may have a porosity of at most about 15 porosity units, at most about 10 porosity units, or at most about 5 porosity units. The tight vugs inhibit steam or other fluids from being injected into the formation or the layers with tight vugs. In certain embodiments, the karsted formation or karsted layers of the formation are treated using the in situ heat treatment process. Heating of these formations or layers may decrease the viscosity of the fluids in the tight vugs and allow the fluids to drain (for example, mobilize the fluids).

In certain embodiments, only the karsted layers of the formation are treated using the in situ heat treatment process. Other non-karsted layers of the formation may be used as seals for the in situ heat treatment process. For example, in the Grosmont formation, the Grosmont 3 layer may be used as a bottom seal for in situ heat treatment of the Nisku and upper Ireton layers.

In some embodiments, the drive process is used after the in situ heat treatment of the karsted formation or karsted layers. In some embodiments, heaters are used to preheat the karsted formation or karsted layers to create injectivity in the formation.

In certain embodiments, the karsted formation or karsted layers are heated to temperatures below the decomposition temperature of rock (for example, dolomite) in the formation (for example, temperatures at most about 407° C.). In some embodiments, the karsted formation or karsted layers are heated to temperatures above the decomposition temperature of dolomite in the formation. At temperatures above the dolomite decomposition temperature, the dolomite may decompose to produce carbon dioxide. The decomposition of the dolomite and the carbon dioxide production may create permeability in the formation and mobilize viscous fluids in the formation. In some embodiments, the produced carbon dioxide is maintained in the formation to produce a gas cap in the formation. The carbon dioxide may be allowed to rise to the upper portions of the karsted layers to produce the gas cap.

In some embodiments, heaters are used to produce and/or maintain the gas cap in the formation for the in situ heat treatment process and/or the drive process. The gas cap may drive fluids from upper portions to lower portions of the formation and/or from portions of the formation towards portions of the formation at lower pressures (for example, portions with production wells). In some embodiments, little or no heating is provided in the portions of the formation with the gas cap. In some embodiments, heaters in the gas cap are turned down and/or off after formation of the gas cap. Using less heating in the gas cap may reduce the energy input into the formation and increase the efficiency of the in situ heat treatment process and/or the drive process. In some embodiments, production wells and/or heater wells that are located in the gas cap portion of the formation may be used for injection of fluid (for example, steam) to maintain the gas cap.

In some embodiments, the production front of the drive process follows behind the heat front of the in situ heat treatment process. In some embodiments, areas behind the production front are further heated to produce more fluids from the formation. Further heating behind the production front may also maintain the gas cap behind the production front and/or maintain quality in the production front of the drive process.

In certain embodiments, the drive process is used before the in situ heat treatment of the formation. In some embodiments, the drive process is used to mobilize fluids in a first section of the formation. The mobilized fluids may then be pushed into a second section by heating the first section with heaters. Fluids may be produced from the second section. In some embodiments, the fluids in the second section are pyrolyzed and/or upgraded using the heaters.

In some embodiments, the drive process is used to create a "gas cushion" or pressure sink before the in situ heat treatment process in formations with low permeabilities. The gas cushion may be created by fracturing the formation during the drive process. The gas cushion may inhibit pressures from increasing to quickly to fracture pressure during the in situ heat treatment process. The gas cushion may provide a path for gases to escape or travel during early stages of heating during the in situ heat treatment process.

In some embodiments, the drive process (for example, the steam injection process) is used to mobilize fluids before the in situ heat treatment process. Steam injection may be used to get hydrocarbons (oil) away from rock or other strata in the formation. The steam injection may mobilize the oil without heating the rock.

In some embodiments, injection of a fluid (for example, steam or carbon dioxide) may consume heat in the formation and cool the formation depending on the pressure in the formation. In some embodiments, the injected fluid is used to recover heat from the formation. The recovered heat may be used in surface processing of fluids and/or to preheat other portions of the formation using the drive process.

Figure 104:
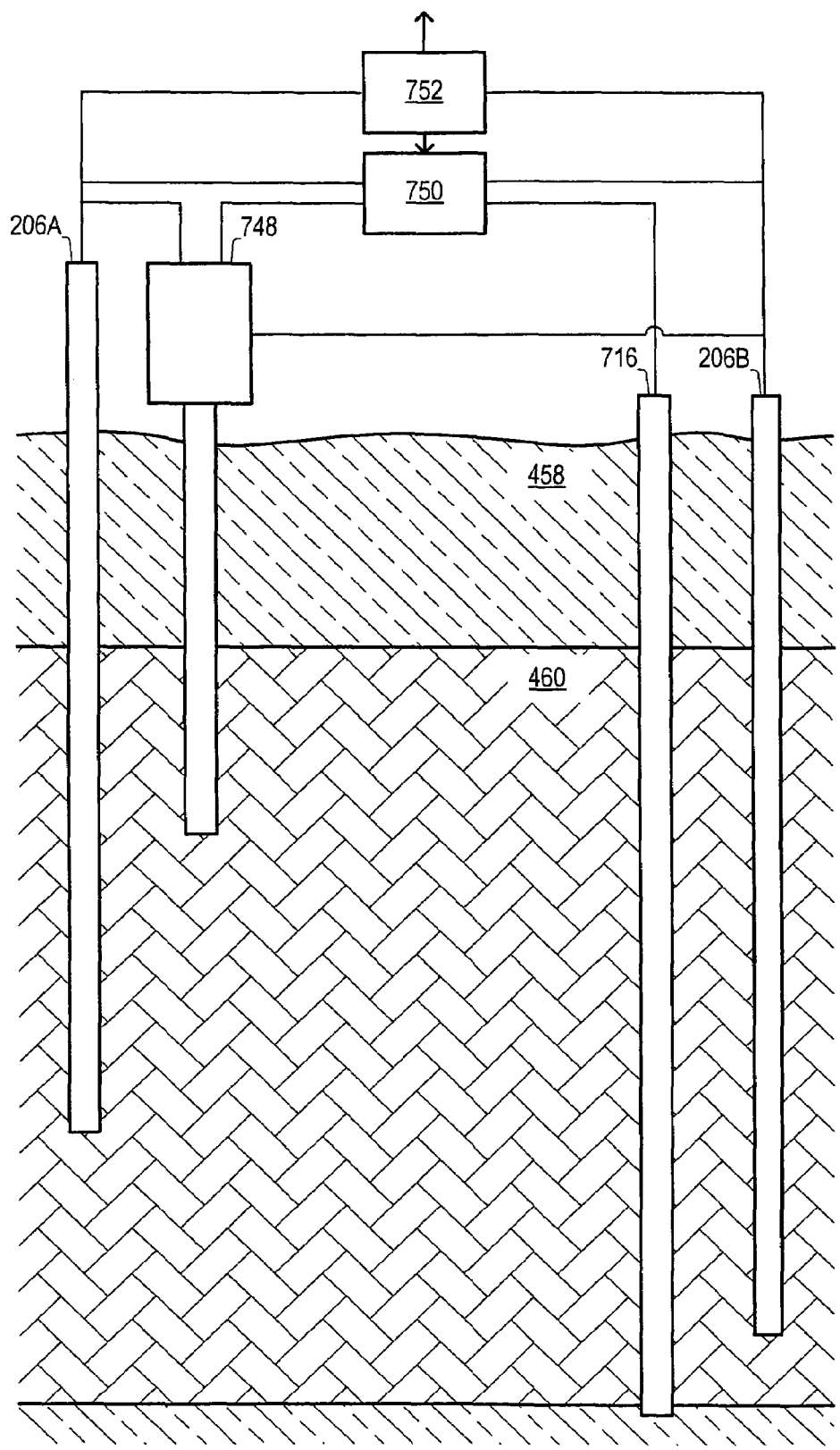
FIG. 104 depicts a representation of an embodiment for producing hydrocarbons from a tar sands formation.

FIG. 104 depicts a representation of an embodiment for producing hydrocarbons from a hydrocarbon containing formation (for example, a tar sands formation). Hydrocarbon layer 460 includes one or more portions with heavy hydrocarbons. Hydrocarbons may be produced from hydrocarbon layer 460 using more than one process. In certain embodiments, hydrocarbons are produced from a first portion of hydrocarbon layer 460 using a steam injection process (for example, cyclic steam injection or steam-assisted gravity drainage) and a second portion of the hydrocarbon layer using an in situ heat treatment process. In the steam injection process, steam is injected into the first portion of hydrocarbon layer 460 through injection well 748. First hydrocarbons are produced from the first portion through production well 206A. The first hydrocarbons include hydrocarbons mobilized by the injection of steam. In certain embodiments, the first hydrocarbons have an API gravity of at most 15°, at most 10°, at most 8°, or at most 6°.

Heaters 716 are used to heat the second portion of hydrocarbon layer 460 to mobilization, visbreaking, and/or pyrolysis temperatures. Second hydrocarbons are produced from the second portion through production well 206B. In some embodiments, the second hydrocarbons include at least some pyrolyzed hydrocarbons. In certain embodiments, the second hydrocarbons have an API gravity of at least 15°, at least 20°, or at least 25°.

In some embodiments, the first portion of hydrocarbon layer 460 is treated using heaters after the steam injection process. Heaters may be used to increase the temperature of the first portion and/or treat the first portion using an in situ heat treatment process. Second hydrocarbons (including at least some pyrolyzed hydrocarbons) may be produced from the first portion through production well 206A.

In some embodiments, the second portion of hydrocarbon layer 460 is treated using the steam injection process before using heaters 716 to treat the second portion. The steam injection process may be used to produce some fluids (for example, first hydrocarbons or hydrocarbons mobilized by the steam injection) through production well 206B from the second portion and/or preheat the second portion before using heaters 716. In some embodiments, the steam injection process may be used after using heaters 716 to treat the first portion and/or the second portion.

Producing hydrocarbons through both processes increases the total recovery of hydrocarbons from hydrocarbon layer 460 and may be more economical than using either process alone. In some embodiments, the first portion is treated with the in situ heat treatment process after the steam injection process is completed. For example, after the steam injection process no longer produces viable amounts of hydrocarbon from the first portion, the in situ heat treatment process may be used on the first portion.

Steam is provided to injection well 748 from facility 750. Facility 750 is a steam and electricity cogeneration facility. Facility 750 may burn hydrocarbons in generators to make electricity. Facility 750 may burn gaseous and/or liquid hydrocarbons to make electricity. The electricity generated is used to provide electrical power for heaters 716. Waste heat from the generators is used to make steam. In some embodiments, some of the hydrocarbons produced from the formation are used to provide gas for heaters 716, if the heaters utilize gas to provide heat to the formation. The amount of electricity and steam generated by facility 750 may be controlled to vary the production rate and/or quality of hydrocarbons produced from the first portion and/or the second portion of hydrocarbon layer 460. The production rate and/or quality of hydrocarbons produced from the first portion and/or the second portion may be varied to produce a selected API gravity in a mixture made by blending the first hydrocarbons with the second hydrocarbons. The first hydrocarbon and the second hydrocarbons may be blended after production to produce the selected API gravity. The production from the first portion and/or the second portion may be varied in response to changes in the marketplace for either first hydrocarbons, second hydrocarbons, and/or a mixture of the first and second hydrocarbons.

First hydrocarbons produced from production well 206A and/or second hydrocarbons produced from production well 206B may be used as fuel for facility 750. In some embodiments, first hydrocarbons and/or second hydrocarbons are treated (for example, removing undesirable products) before being used as fuel for facility 750. The amount of first hydrocarbons and second hydrocarbons used as fuel for facility 750 may be determined, for example, by economics for the overall process, the marketplace for either first or second hydrocarbons, availability of treatment facilities for either first or second hydrocarbons, and/or transportation facilities available for either first or second hydrocarbons. In some embodiments, most or all the hydrocarbon gas produced from hydrocarbon layer 460 is used as fuel for facility 750. Burning all the hydrocarbon gas in facility 750 eliminates the need for treatment and/or transportation of gases produced from hydrocarbon layer 460.

The produced first hydrocarbons and the second hydrocarbons may be treated and/or blended in facility 752. In some embodiments, the first and second hydrocarbons are blended to make a mixture that is transportable through a pipeline. In some embodiments, the first and second hydrocarbons are blended to make a mixture that is useable as a feedstock for a refinery. The amount of first and second hydrocarbons produced may be varied based on changes in the requirements for treatment and/or blending of the hydrocarbons. In some embodiments, treated hydrocarbons are used in facility 750.

Figure 105:
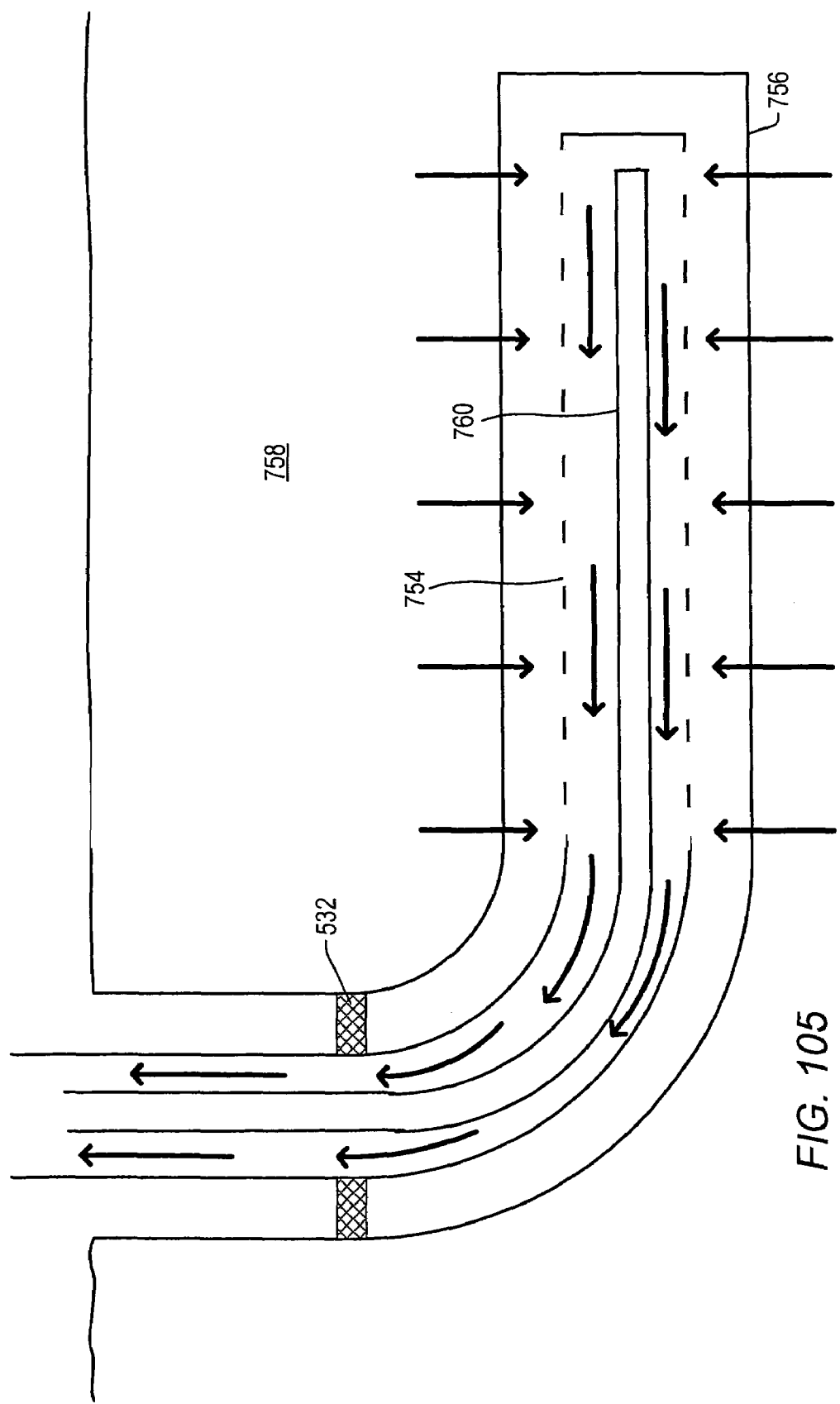
FIG. 105 depicts an embodiment for heating and producing from a formation with a temperature limited heater in a production wellbore.

FIG. 105 depicts an embodiment for heating and producing from the formation with the temperature limited heater in a production wellbore. Production conduit 754 is located in wellbore 756. In certain embodiments, a portion of wellbore 756 is located substantially horizontally in formation 758. In some embodiments, the wellbore is located substantially vertically in the formation. In an embodiment, wellbore 756 is an open wellbore (an uncased wellbore). In some embodiments, the wellbore has a casing or liner with perforations or openings to allow fluid to flow into the wellbore.

Conduit 754 may be made from carbon steel or more corrosion resistant materials such as stainless steel. Conduit 754 may include apparatus and mechanisms for gas lifting or pumping produced oil to the surface. For example, conduit 754 includes gas lift valves used in a gas lift process. Examples of gas lift control systems and valves are disclosed in U.S. Pat. No. 6,715,550 to Vinegar et al. and U.S. Patent Application Publication Nos. 2002-0036085 to Bass et al. and 2003-0038734 to Hirsch et al., each of which is incorporated by reference as if fully set forth herein. Conduit 754 may include one or more openings (perforations) to allow fluid to flow into the production conduit. In certain embodiments, the openings in conduit 754 are in a portion of the conduit that remains below the liquid level in wellbore 756. For example, the openings are in a horizontal portion of conduit 754.

Figure 106:
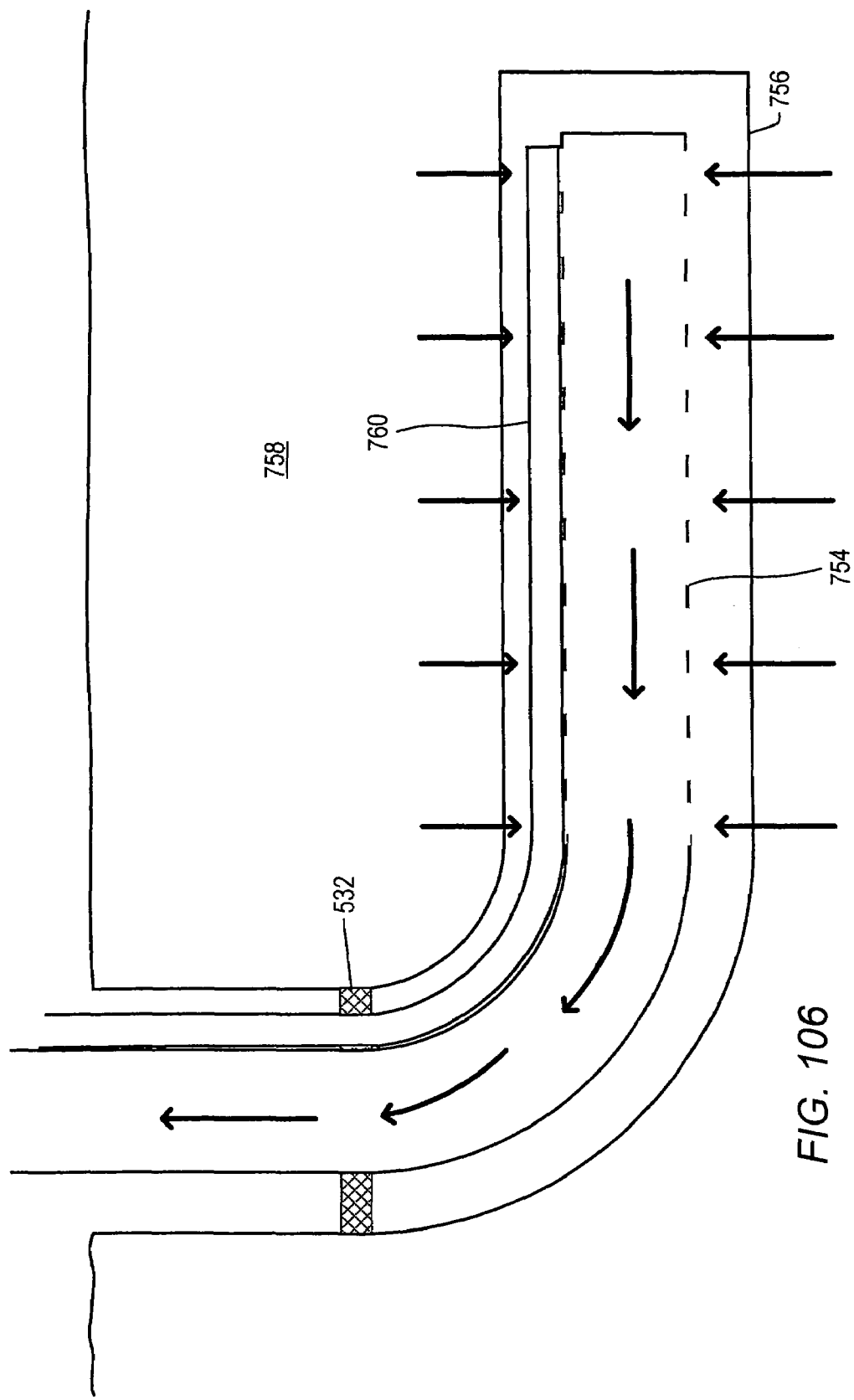
FIG. 106 depicts an embodiment for heating and producing from a formation with a temperature limited heater and a production wellbore.

Heater 760 is located in conduit 754, as shown in FIG. 105. In some embodiments, heater 760 is located outside conduit 754, as shown in FIG. 106. The heater located outside the production conduit may be coupled (strapped) to the production conduit. In some embodiments, more than one heater (for example, two, three, or four heaters) are placed about conduit 754. The use of more than one heater may reduce bowing or flexing of the production conduit caused by heating on only one side of the production conduit. In an embodiment, heater 760 is a temperature limited heater. Heater 760 provides heat to reduce the viscosity of fluid (such as oil or hydrocarbons) in and near wellbore 756. In certain embodiments, heater 760 raises the temperature of the fluid in wellbore 756 up to a temperature of 250° C. or less (for example, 225° C., 200° C., or 150° C.). Heater 760 may be at higher temperatures (for example, 275° C., 300° C., or 325° C.) because the heater provides heat to conduit 754 and there is some temperature differential between the heater and the conduit. Thus, heat produced from the heater does not raise the temperature of fluids in the wellbore above 250° C.

In certain embodiments, heater 760 includes ferromagnetic materials such as Carpenter Temperature Compensator "32", Alloy 42-6, Alloy 52, Invar 36, or other iron-nickel or iron-nickel-chromium alloys. In certain embodiments, nickel or nickel-chromium alloys are used in heater 760. In some embodiments, heater 760 includes a composite conductor with a more highly conductive material such as copper on the inside of the heater to improve the turndown ratio of the heater. Heat from heater 760 heats fluids in or near wellbore 756 to reduce the viscosity of the fluids and increase a production rate through conduit 754.

In certain embodiments, portions of heater 760 above the liquid level in wellbore 756 (such as the vertical portion of the wellbore depicted in FIGS. 105 and 106) have a lower maximum temperature than portions of the heater located below the liquid level. For example, portions of heater 760 above the liquid level in wellbore 756 may have a maximum temperature of 100° C. while portions of the heater located below the liquid level have a maximum temperature of 250° C. In certain embodiments, such a heater includes two or more ferromagnetic sections with different Curie temperatures to achieve the desired heating pattern. Providing less heat to portions of wellbore 756 above the liquid level and closer to the surface may save energy.

In certain embodiments, heater 760 is electrically isolated on the heater's outside surface and allowed to move freely in conduit 754. In some embodiments, electrically insulating centralizers are placed on the outside of heater 760 to maintain a gap between conduit 754 and the heater.

In some embodiments, heater 760 is cycled (turned on and off) so that fluids produced through conduit 754 are not overheated. In an embodiment, heater 760 is turned on for a specified amount of time until a temperature of fluids in or near wellbore 756 reaches a desired temperature (for example, the maximum temperature of the heater). During the heating time (for example, 10 days, 20 days, or 30 days), production through conduit 754 may be stopped to allow fluids in the formation to "soak" and obtain a reduced viscosity. After heating is turned off or reduced, production through conduit 754 is started and fluids from the formation are produced without excess heat being provided to the fluids. During production, fluids in or near wellbore 756 will cool down without heat from heater 760 being provided. When the fluids reach a temperature at which production significantly slows down, production is stopped and heater 760 is turned back on to reheat the fluids. This process may be repeated until a desired amount of production is reached. In some embodiments, some heat at a lower temperature is provided to maintain a flow of the produced fluids. For example, low temperature heat (for example, 100° C., 125° C., or 150° C.) may be provided in the upper portions of wellbore 756 to keep fluids from cooling to a lower temperature.

Figure 107:
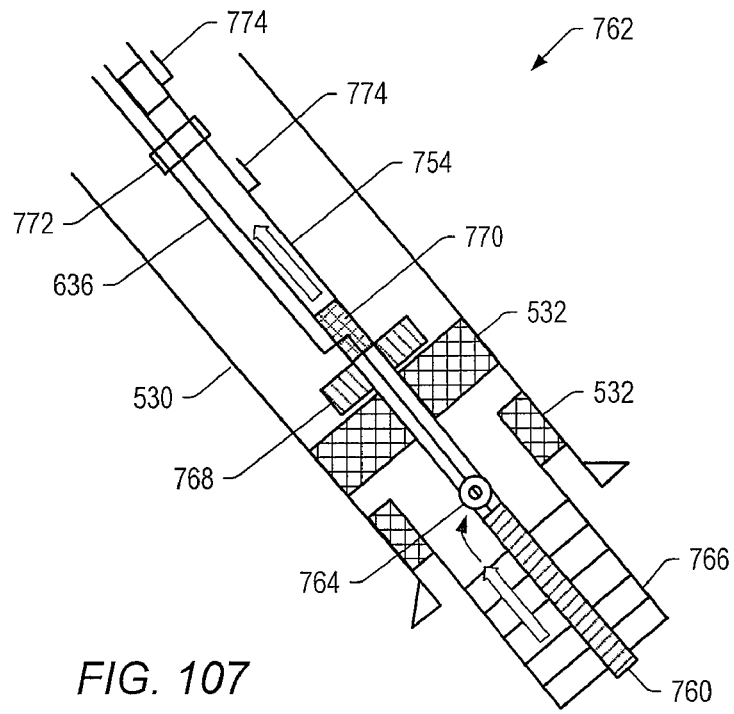
FIG. 107 depicts an embodiment of a heating/production assembly that may be located in a wellbore for gas lifting.

FIG. 107 depicts an embodiment of a heating/production assembly that may be located in a wellbore for gas lifting. Heating/production assembly 762 may be located in a wellbore in the formation (for example, wellbore 756 depicted in FIG. 105 or 106). Conduit 754 is located inside casing 530. In an embodiment, conduit 754 is coiled tubing such as 6 cm diameter coiled tubing. Casing 530 has a diameter between 10 cm and 25 cm (for example, a diameter of 14 cm, 16 cm, or 18 cm). Heater 760 is coupled to an end of conduit 754. In some embodiments, heater 760 is located inside conduit 754. In some embodiments, heater 760 is a resistive portion of conduit 754. In some embodiments, heater 760 is coupled to a length of conduit 754.

Opening 764 is located at or near a junction of heater 760 and conduit 754. In some embodiments, opening 764 is a slot or a slit in conduit 754. In some embodiments, opening 764 includes more than one opening in conduit 754. Opening 764 allows production fluids to flow into conduit 754 from a wellbore. Perforated casing 766 allows fluids to flow into the heating/production assembly 762. In certain embodiments, perforated casing 766 is a wire wrapped screen. In one embodiment, perforated casing 766 is a 9 cm diameter wire wrapped screen.

Perforated casing 766 may be coupled to casing 530 with packing material 532. Packing material 532 inhibits fluids from flowing into casing 530 from outside perforated casing 766. Packing material 532 may also be placed inside casing 530 to inhibit fluids from flowing up the annulus between the casing and conduit 754. Seal assembly 768 is used to seal conduit 754 to packing material 532. Seal assembly 768 may fix a position of conduit 754 along a length of a wellbore. In some embodiments, seal assembly 768 allows for unsealing of conduit 754 so that the production conduit and heater 760 may be removed from the wellbore.

Feedthrough 770 is used to pass lead-in cable 636 to supply power to heater 760. Lead-in cable 636 may be secured to conduit 754 with clamp 772. In some embodiments, lead-in cable 636 passes through packing material 532 using a separate feedthrough.

A lifting gas (for example, natural gas, methane, carbon dioxide, propane, and/or nitrogen) may be provided to the annulus between conduit 754 and casing 530. Valves 774 are located along a length of conduit 754 to allow gas to enter the production conduit and provide for gas lifting of fluids in the production conduit. The lifting gas may mix with fluids in conduit 754 to lower the density of the fluids and allow for gas lifting of the fluids out of the formation. In certain embodiments, valves 774 are located in or near the overburden section of the formation so that gas lifting is provided in the overburden section. In some embodiments, fluids are produced through the annulus between conduit 754 and casing 530 and the lifting gas is supplied through valves 774.

In an embodiment, fluids are produced using a pump coupled to conduit 754. The pump may be a submersible pump (for example, an electric or gas powered submersible pump). In some embodiments, a heater is coupled to conduit 754 to maintain the reduced viscosity of fluids in the conduit and/or the pump.

In certain embodiments, an additional conduit such as an additional coiled tubing conduit is placed in the formation. Sensors may be placed in the additional conduit. For example, a production logging tool may be placed in the additional conduit to identify locations of producing zones and/or to assess flow rates. In some embodiments, a temperature sensor (for example, a distributed temperature sensor, a fiber optic sensor, and/or an array of thermocouples) is placed in the additional conduit to determine a subsurface temperature profile.

Figure 108:
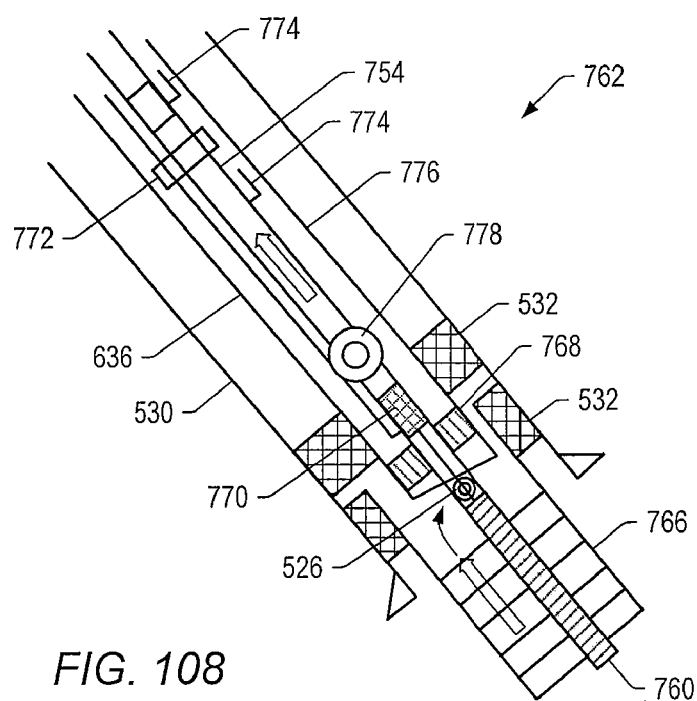
FIG. 108 depicts an embodiment of a heating/production assembly that may be located in a wellbore for gas lifting.

Some embodiments of the heating/production assembly are used in a well that preexists (for example, the heating/production assembly is retrofitted for a preexisting production well, heater well, or monitoring well). An example of the heating/production assembly that may be used in the preexisting well is depicted in FIG. 108. Some preexisting wells include a pump. The pump in the preexisting well may be left in the heating/production well retrofitted with the heating/production assembly.

FIG. 108 depicts an embodiment of the heating/production assembly that may be located in the wellbore for gas lifting. In FIG. 108, conduit 754 is located in outside production conduit 776. In an embodiment, outside production conduit 776 is 11.4 cm diameter production tubing. Casing 530 has a diameter of 24.4 cm. Perforated casing 766 has a diameter of 11.4 cm. Seal assembly 768 seals conduit 754 inside outside production conduit 776. In an embodiment, pump 778 is a jet pump such as a bottomhole assembly jet pump.

Figure 109:
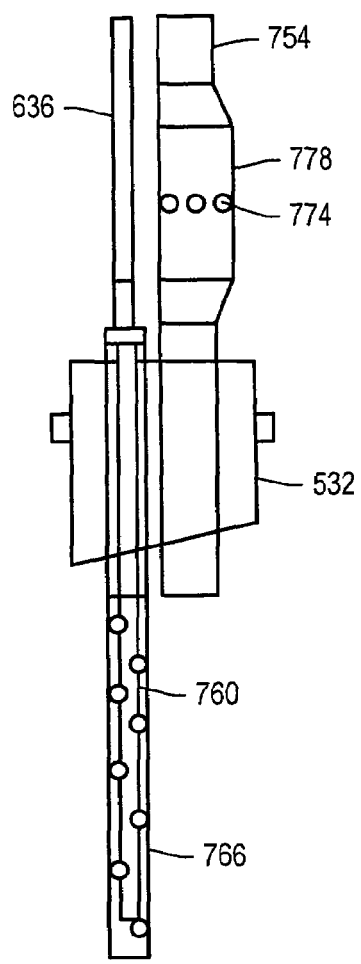
FIG. 109 depicts another embodiment of a heating/production assembly that may be located in a wellbore for gas lifting.

FIG. 109 depicts another embodiment of a heating/production assembly that may be located in a wellbore for gas lifting. Heater 760 is located inside perforated casing 766. Heater 760 is coupled to lead-in cable 636 through a feedthrough in packing material 532. Production conduit 754 extends through packing material 532. Pump 778 is located along conduit 754. In certain embodiments, pump 778 is a jet pump or a bean pump. Valves 774 are located along conduit 754 for supplying lift gas to the conduit.

Figure 110:
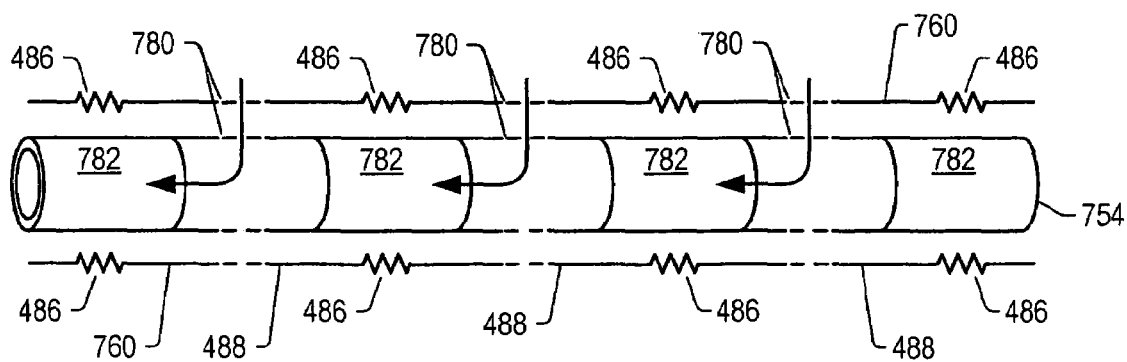
FIG. 110 depicts an embodiment of a production conduit and a heater.

In some embodiments, heat is inhibited from transferring into conduit 754. FIG. 110 depicts an embodiment of conduit 754 and heaters 760 that inhibit heat transfer into the conduit. Heaters 760 are coupled to conduit 754. Heaters 760 include ferromagnetic sections 486 and non-ferromagnetic sections 488. Ferromagnetic sections 486 provide heat at a temperature that reduces the viscosity of fluids in or near a wellbore. Non-ferromagnetic sections 488 provide little or no heat. In certain embodiments, ferromagnetic sections 486 and non-ferromagnetic sections 488 are 6 m in length. In some embodiments, ferromagnetic sections 486 and non-ferromagnetic sections 488 are between 3 m and 12 m in length, between 4 m and 11 m in length, or between 5 m and 10 m in length. In certain embodiments, non-ferromagnetic sections 488 include perforations 780 to allow fluids to flow to conduit 754. In some embodiments, heater 760 is positioned so that perforations are not needed to allow fluids to flow to conduit 754.

Conduit 754 may have perforations 780 to allow fluid to enter the conduit. Perforations 780 coincide with non-ferromagnetic sections 488 of heater 760. Sections of conduit 754 that coincide with ferromagnetic sections 486 include insulation conduit 782. Conduit 782 may be a vacuum insulated tubular. For example, conduit 782 may be a vacuum insulated production tubular available from Oil Tech Services, Inc. (Houston, Tex., U.S.A.). Conduit 782 inhibits heat transfer into conduit 754 from ferromagnetic sections 486. Limiting the heat transfer into conduit 754 reduces heat loss and/or inhibits overheating of fluids in the conduit. In an embodiment, heater 760 provides heat along an entire length of the heater and conduit 754 includes conduit 782 along an entire length of the production conduit.

Figure 111:
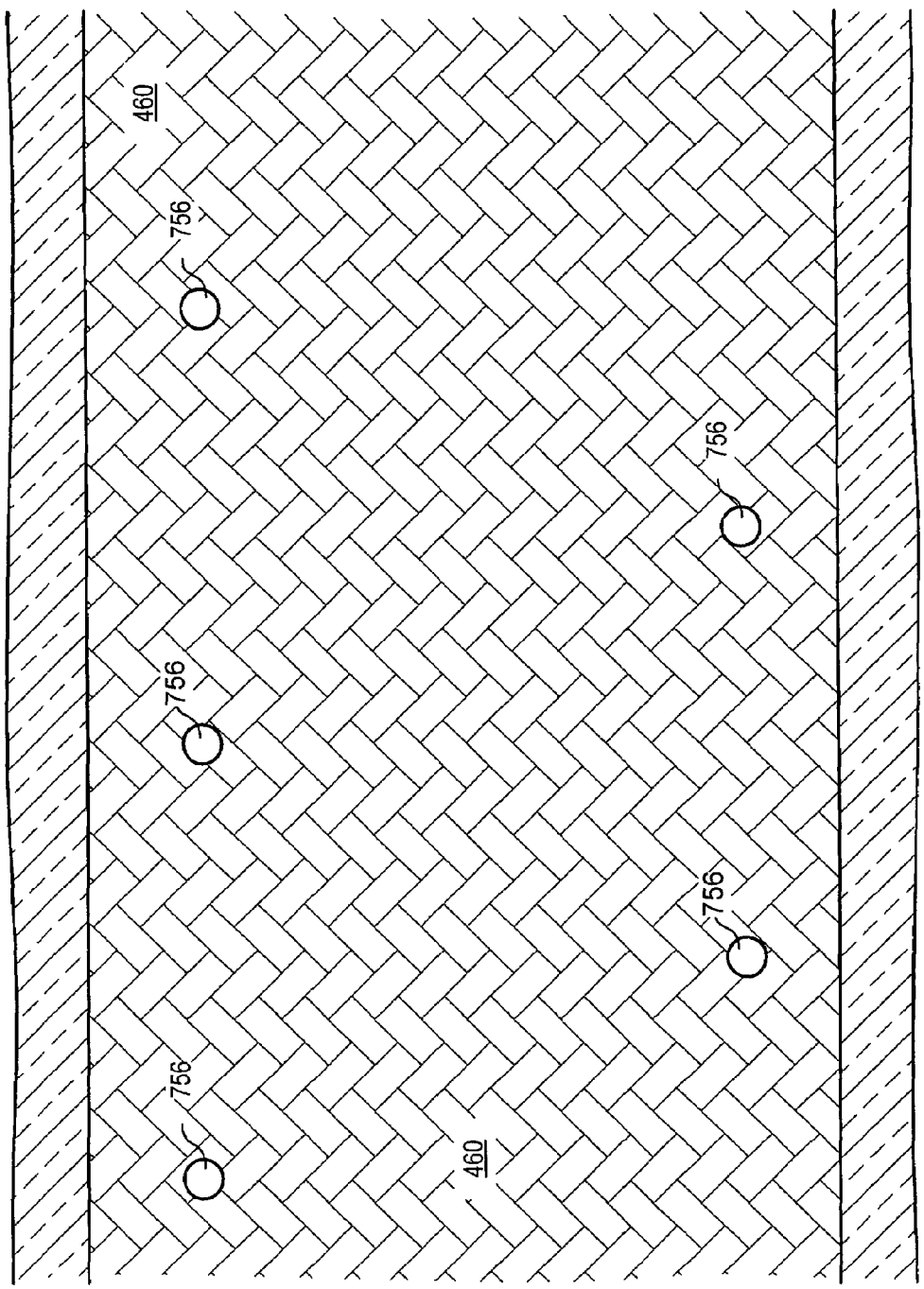
FIG. 111 depicts an embodiment for treating a formation.

In certain embodiments, more than one wellbore 756 is used to produce heavy oils from a formation using the temperature limited heater. FIG. 111 depicts an end view of an embodiment with wellbores 756 located in hydrocarbon layer 460. Portions of wellbores 756 are placed substantially horizontally in a triangular pattern in hydrocarbon layer 460. In certain embodiments, wellbores 756 have a spacing of 30 m to 60 m, 35 m to 55 m, or 40 m to 50 m. Wellbores 756 may include production conduits and heaters previously described. Fluids may be heated and produced through wellbores 756 at an increased production rate above a cold production rate for the formation. Production may continue for a selected time (for example, 5 years to 10 years, 6 years to 9 years, or 7 years to 8 years) until heat produced from each of wellbores 756 begins to overlap (superposition of heat begins). At such a time, heat from lower wellbores (such as wellbores 756 near the bottom of hydrocarbon layer 460) is continued, reduced, or turned off while production is continued. Production in upper wellbores (such as wellbores 756 near the top of hydrocarbon layer 460) may be stopped so that fluids in the hydrocarbon layer drain towards the lower wellbores. In some embodiments, power is increased to the upper wellbores and the temperature raised above the Curie temperature to increase the heat injection rate. Draining fluids in the formation in such a process increases total hydrocarbon recovery from the formation.

In an embodiment, a temperature limited heater is used in a horizontal heater/production well. The temperature limited heater may provide selected amounts of heat to the "toe" and the "heel" of the horizontal portion of the well. More heat may be provided to the formation through the toe than through the heel, creating a "hot portion" at the toe and a "warm portion" at the heel. Formation fluids may be formed in the hot portion and produced through the warm portion, as shown in FIG. 112.

Figure 112:
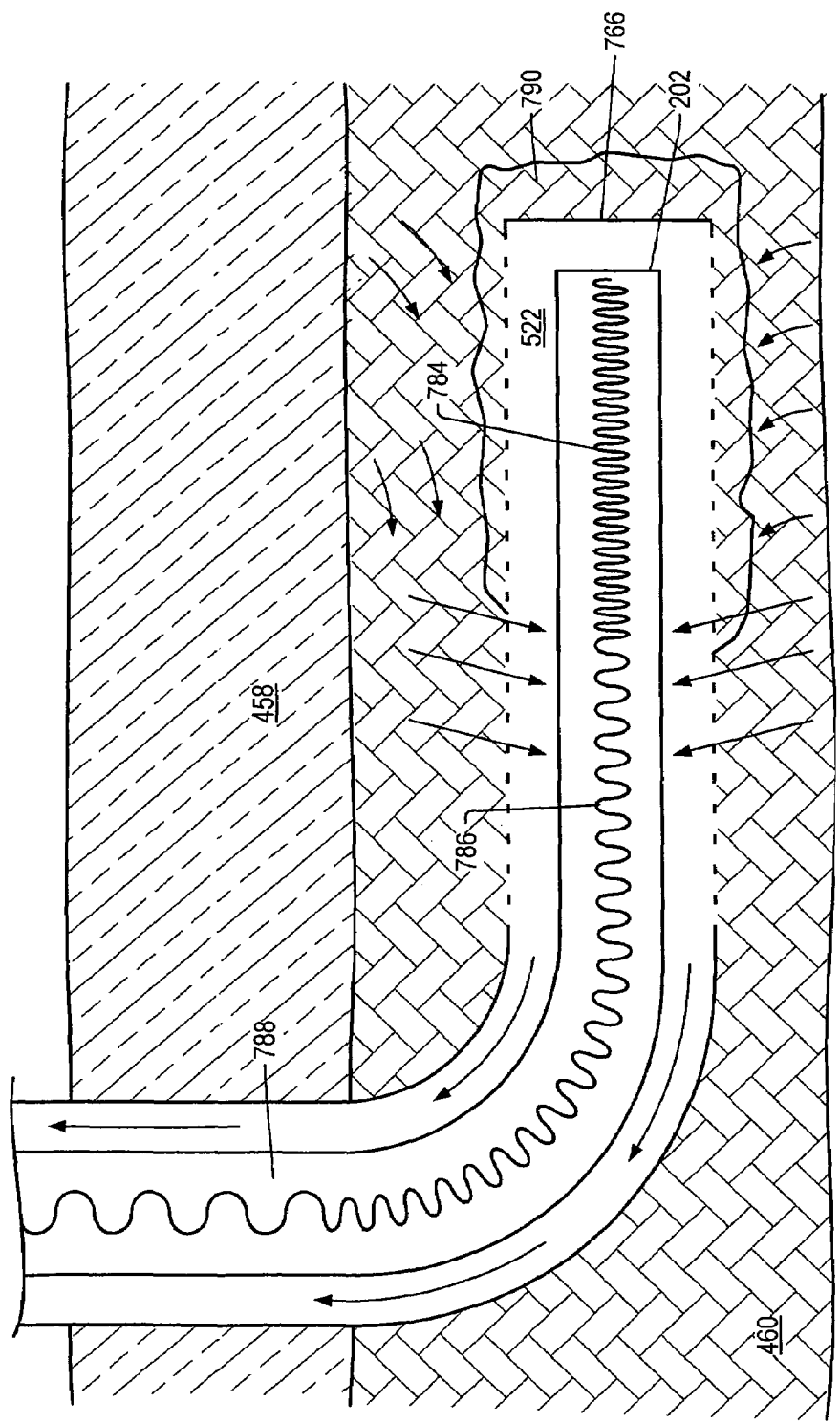
FIG. 112 depicts an embodiment of a heater well with selective heating.

FIG. 112 depicts an embodiment of a heater well for selectively heating a formation. Heat source 202 is placed in opening 522 in hydrocarbon layer 460. In certain embodiments, opening 522 is a substantially horizontal opening in hydrocarbon layer 460. Perforated casing 766 is placed in opening 522. Perforated casing 766 provides support that inhibits hydrocarbon and/or other material in hydrocarbon layer 460 from collapsing into opening 522. Perforations in perforated casing 766 allow for fluid flow from hydrocarbon layer 460 into opening 522. Heat source 202 may include hot portion 784. Hot portion 784 is a portion of heat source 202 that operates at higher heat output than adjacent portions of the heat source. For example, hot portion 784 may output between 650 W/m and 1650 W/m, 650 W/m and 1500 W/m, or 800 W/m and 1500 W/m. Hot portion 784 may extend from a "heel" of the heat source to the "toe" of the heat source. The heel of the heat source is the portion of the heat source closest to the point at which the heat source enters a hydrocarbon layer. The toe of the heat source is the end of the heat source furthest from the entry of the heat source into the hydrocarbon layer.

In an embodiment, heat source 202 includes warm portion 786. Warm portion 786 is a portion of heat source 202 that operates at lower heat outputs than hot portion 784. For example, warm portion 786 may output between 30 W/m and 1000 W/m, 30 W/m and 750 W/m, or 100 W/m and 750 W/m. Warm portion 786 may be located closer to the heel of heat source 202. In certain embodiments, warm portion 786 is a transition portion (for example, a transition conductor) between hot portion 784 and overburden portion 788. Overburden portion 788 is located in overburden 458. Overburden portion 788 provides a lower heat output than warm portion 786. For example, overburden portion 788 may output between 10 W/m and 90 W/m, 15 W/m and 80 W/m, or 25 W/m and 75 W/m. In some embodiments, overburden portion 788 provides as close to no heat (0 W/m) as possible to overburden 458. Some heat, however, may be used to maintain fluids produced through opening 522 in a vapor phase or at elevated temperature in overburden 458.

In certain embodiments, hot portion 784 of heat source 202 heats hydrocarbons to high enough temperatures to result in coke 790 forming in hydrocarbon layer 460. Coke 790 may occur in an area surrounding opening 522. Warm portion 786 may be operated at lower heat outputs so that coke does not form at or near the warm portion of heat source 202. Coke 790 may extend radially from opening 522 as heat from heat source 202 transfers outward from the opening. At a certain distance, however, coke 790 no longer forms because temperatures in hydrocarbon layer 460 at the certain distance will not reach coking temperatures. The distance at which no coke forms is a function of heat output (W/m from heat source 202), type of formation, hydrocarbon content in the formation, and/or other conditions in the formation.

The formation of coke 790 inhibits fluid flow into opening 522 through the coking. Fluids in the formation may, however, be produced through opening 522 at the heel of heat source 202 (for example, at warm portion 786 of the heat source) where there is little or no coke formation. The lower temperatures at the heel of heat source 202 reduce the possibility of increased cracking of formation fluids produced through the heel. Fluids may flow in a horizontal direction through the formation more easily than in a vertical direction. Typically, horizontal permeability in a relatively permeable formation is approximately 5 to 10 times greater than vertical permeability. Thus, fluids flow along the length of heat source 202 in a substantially horizontal direction. Producing formation fluids through opening 522 is possible at earlier times than producing fluids through production wells in hydrocarbon layer 460. The earlier production times through opening 522 is possible because temperatures near the opening increase faster than temperatures further away due to conduction of heat from heat source 202 through hydrocarbon layer 460. Early production of formation fluids may be used to maintain lower pressures in hydrocarbon layer 460 during start-up heating of the formation. Start-up heating of the formation is the time of heating before production begins at production wells in the formation. Lower pressures in the formation may increase liquid production from the formation. In addition, producing formation fluids through opening 522 may reduce the number of production wells needed in the formation.

In some embodiments, a temperature limited heater positioned in a wellbore heats steam that is provided to the wellbore. The heated steam may be introduced into a portion of the formation. In certain embodiments, the heated steam may be used as a heat transfer fluid to heat a portion of the formation. In some embodiments, the steam is used to solution mine desired minerals from the formation. In some embodiments, the temperature limited heater positioned in the wellbore heats liquid water that is introduced into a portion of the formation.

In an embodiment, the temperature limited heater includes ferromagnetic material with a selected Curie temperature. The use of a temperature limited heater may inhibit a temperature of the heater from increasing beyond a maximum selected temperature (for example, at or about the Curie temperature). Limiting the temperature of the heater may inhibit potential burnout of the heater. The maximum selected temperature may be a temperature selected to heat the steam to above or near 100% saturation conditions, superheated conditions, or supercritical conditions. Using a temperature limited heater to heat the steam may inhibit overheating of the steam in the wellbore. Steam introduced into a formation may be used for synthesis gas production, to heat the hydrocarbon containing formation, to carry chemicals into the formation, to extract chemicals or minerals from the formation, and/or to control heating of the formation.

A portion of the formation where steam is introduced or that is heated with steam may be at significant depths below the surface (for example, greater than about 1000 m, about 2500, or about 5000 m below the surface). If steam is heated at the surface of the formation and introduced to the formation through a wellbore, a quality of the heated steam provided to the wellbore at the surface may have to be relatively high to accommodate heat losses to the wellbore casing and/or the overburden as the steam travels down the wellbore. Heating the steam in the wellbore may allow the quality of the steam to be significantly improved before the steam is provided to the formation. A temperature limited heater positioned in a lower section of the overburden and/or adjacent to a target zone of the formation may be used to controllably heat steam to improve the quality of the steam injected into the formation and/or inhibit condensation along the length of the heater. In certain embodiments, the temperature limited heater improves the quality of the steam injected and/or inhibits condensation in the wellbore for long steam injection wellbores (especially for long horizontal steam injection wellbores).

A temperature limited heater positioned in a wellbore may be used to heat the steam to above or near 100% saturation conditions or superheated conditions. In some embodiments, a temperature limited heater may heat the steam so that the steam is above or near supercritical conditions. The static head of fluid above the temperature limited heater may facilitate producing 100% saturation, superheated, and/or supercritical conditions in the steam. Supercritical or near supercritical steam may be used to strip hydrocarbon material and/or other materials from the formation. In certain embodiments, steam introduced into the formation may have a high density (for example, a specific gravity of about 0.8 or above). Increasing the density of the steam may improve the ability of the steam to strip hydrocarbon material and/or other materials from the formation.

Improved iron, chromium, and nickel alloys containing manganese, copper and tungsten, in combination with niobium, carbon and nitrogen, may maintain a finer grain size despite high temperature solution annealing or processing. Such behavior may be beneficial in reducing a heat-affected-zone in welded material. Higher solution-annealing temperatures are particularly important for achieving the best metal carbide (MC), nanocarbide. For example, niobium carbide (NbC) nanocarbide strengthening during high-temperature creep service, and such effects are amplified (finer nanocarbide structures that are stable) by compositions of the improved alloys. Tubing and canister applications that include the composition of the improved alloys and are wrought processed result in stainless steels that may be able to age-harden during service at about 700° C. to about 800° C. Improved alloys may be able to age-harden even more if the alloys are cold-strained prior to high-temperature service, but such cold-prestraining is not necessary for good high temperature properties or age-hardening. Some prior art alloys, such as NF709 require cold-prestraining to achieve good high temperature creep properties, and this is a disadvantage in particular because after such alloys are welded, the advantages of the cold-prestraining in the weld heat effected zone are lost. Cold-prestraining may degrade rather than enhance high-temperature strength and long-term durability, and therefore may be limited or not permitted by, for example, construction codes. The improved alloys described herein are suitable for low temperature applications, for example, cryogenic applications. The improved alloys which have strength and sufficient ductility at temperatures of, for example, −50° C. to −200° C., also retain strength at higher temperatures than many alloys often used in cryogenic applications, such as 201 LN and YUS130, thus for services such as liquefied natural gas, where a failure may result in a fire, the improved alloy would retain strength in the vicinity of the fire longer than other materials.

An improved alloy composition may include, by weight: about 18% to about 22% chromium, about 12% to about 13% nickel, above about 0% to about 4.5% copper (and in some embodiments, above 3.0% to about 4.5% copper), about 1% to about 10% manganese, about 0.3% to about 1% silicon, about 0.5% to about 1% niobium, about 0.3% to about 1% molybdenum, about 0.08% to about 0.2% carbon, about 0.2% to about 0.5% nitrogen, above 0% to about 2% tungsten, and with the balance being essentially iron (for example, about 47.8% to about 68.12% iron and optionally other components). Such an improved alloy may be useful when processed by hot deformation, cold deformation, and/or welding into, for example, casings, canisters, or strength members for heaters. In some embodiments, the improved alloy includes, by weight: about 20% chromium, about 3% copper, about 4% manganese, about 0.3% molybdenum, about 0.77% niobium, about 13% nickel, about 0.5% silicon, about 1% tungsten, about 0.09% carbon, and about 0.26% nitrogen, with the balance being essentially iron. In certain embodiments, the improved alloy includes, by weight: about 19% chromium, about 4.2% manganese, about 0.3% molybdenum, about 0.8% niobium, about 12.5% nickel, about 0.5% silicon, about 0.09% carbon, about 0.24% nitrogen by weight with the balance being iron. In some embodiments, improved alloys may vary an amount of manganese, amount of nickel, and/or a Mn/Ni ratio to enhance resistance to high temperature sulfidation, increase high temperature strength, and/or reduce cost.

Improved wrought alloy compositions may include the compositions described in the preceding paragraphs, compositions disclosed in U.S. Patent Application Publication No. 2003/0056860 to Maziasz et al., which is incorporated by reference herein or similar compositions. The improved wrought alloy composition may include at least 3.25% by weight precipitates at 800° C. The improved wrought alloy composition may have been processed by aging or hot working and/or by cold working. As a result of such aging or hot working and/or cold working, the improved wrought alloy compositions (for example, NbC, Cr-rich $M_{23}C_6$) may contain nanocarbonitrides precipitates. Such nanocarbonitride precipitates are not known to be present in cast compositions such as those disclosed in U.S. Published Patent Application No. 2003/0056860, and are believed to formed upon hot working and/or cold working of the compositions. The nanocarbonitride precipitates may include particles having dimensions from about 5 nanometers to about 100 nanometers, from about 10 nanometers to about 90 nanometers, or from about 20 to about 80 nanometers. These wrought alloys may have microstructures consisting of at least, but not limited to, nanocarbides (NbC, Cr-rich $M_{23}C_6$), which form during aging (stress-free) or creep (stress<0.5 yield stress (YS)). The microstructures may be a consequence of both the native alloy composition and the details of the wrought processing. In solution annealed material, the concentration of such nanoscale particles may be low. The nanoscale particles may be affected by solution anneal temperature/time (more and finer dispersion with longer anneal above 1150° C.) and by cold- or warm-prestrain (cold work) after the solution anneal treatment. Cold prestrain may create dislocation networks within the grains that may serve as nucleation sites for the nanocarbides. Solution annealed material initially has zero percent cold work. Bending, stretching, coiling, rolling or swaging may create, for example 5-15% cold work. The effect of the nanocarbides on yield strength or creep strength may be to provide strength based on dislocation-pinning, with more closely-spaced pinning sites (higher concentration, finer dispersion) providing more strength (particles are barriers to climb or glide of dislocations).

The improved wrought alloy may include nanonitrides (for example, NbCrN) in the matrix together with nanocarbides, after, for example, being aged for 1000 hours at 800° C. The NbCr nitrides have been identified using analytical electron microscopy (AEM) as rich in Nb and Cr, and as the tetragonal nitride phase by electron diffraction (both carbides are cubic phases). X-ray energy dispersive quantitative analysis has shown that for the improved alloy compositions, these nanoscale nitride particles may have a composition by weight of: about 63% Nb, 28% Cr, and 6% Fe, with other components being less than 1.5% each. Such NbCr nitrides were not observed in aged cast stainless steels with similar compositions, and appear to be a direct consequence of the wrought processing. The mixed microstructures of nanocarbides and nanonitrides may be responsible for the improved strength of these alloy compositions at elevated temperatures, such as, for example, 900-1000° C.

In some embodiments, the improved alloys are processed to produce a wrought material. A 6" inside diameter, centrifugal cast pipe having a wall thickness of 1.5" may be cast from the improved alloy. A section may be removed from the casting and heat treated at least 1250° C. for, for example, about three hours. The heat treated section may be hot rolled at least 1200° C. to a 0.75" thickness, annealed at least 1200° C. for fifteen minutes, and then sandblasted. The sandblasted section may be cold rolled to a thickness of about 0.55". The cold rolled section may be annealed at least 1250° C. for about an hour in, for example, air with an argon cover, and then given a final additional heat treatment for about one hour at least 1250° C. in air with an argon blanket. An alternative process may include any of the following: initially homogenizing the cast plate at a temperature of at least 1200° C. for about 1½ hours; hot rolling at least 1200° C. to a 1" thickness; and annealing the cold-rolled plate for about one hour at least 1200° C. The improved alloys may be extruded at, for example, about 1200° C., with, for example, a mandrel diameter of 0.9" and a die diameter of 1.35" to produce good quality tubes. The wrought material may be welded by, for example, laser welding or tungsten gas arc welding. Thus, tubes may be produced by rolling plates and welding seams.

Annealing the improved alloys at higher temperatures, such as 1250° C., may improve properties of the alloys. At a higher temperature, more of the phases go into solution and upon cooling precipitate into phases that contribute positively to the properties, such as high temperature creep and tensile strength. Annealing at temperatures higher than 1250° C., such as 1300° C. may be beneficial. For example, calculated phase present in the improved alloys may decrease by 0.08% at 1300° C. as opposed to the phase present in the improved alloys at 1200° C. Thus, upon cooling, more useful precipitates may form by 0.08%. Improved alloys may have high temperature creep strengths and tensile strengths that are superior to conventional alloys. For example, niobium stabilized stainless steel alloys that include manganese, nitrogen, copper and tungsten may have high temperature creep strengths and tensile strengths that are improved, or substantially improved relative to conventional alloys such as 347H.

Improved alloys may have increased strength relative to standard stainless steel alloys such as Super 304H at high temperatures (for example, about 700° C., about 800° C., or above 1000° C.). Superior high temperature creep-rupture strength (for example, creep-rupture strength at about 800° C., about 900° C. or about 1250° C.) may be improved as a result of (a) composition, (b) stable, fine-grain microstructures induced by high temperature processing, and (c) age-induced precipitation structures in the improved alloys. Precipitation structures include, for example, micro-carbides that strengthen grain boundaries and stable nanocarbides that strengthen inside the grains. Presence of phases other than sigma, laves, G, and chi phases contribute to high temperature properties. Stable microstructures may be achieved by proper selection of components. High temperature aging induced or creep-induced microstructures may have minimal or no intermetallic sigma, laves and chi phases. Intermetallic sigma, lava and chi phases may weaken the strength properties of alloys.

At about 800° C., the improved alloys may include at least 3% or at least 3.25% by weight of microcarbides, other phases, and/or stable, fine grain microstructure that produce strength. At about 900° C., the improved alloys may include, by weight, at least 1.5%, at least 2%, at least 3%, at least 3.5%, or at least 5% microcarbides, other phases, and/or stable, fine grain microstructure that produce strength. These values may be higher than the corresponding values in 347H or Super 304H stainless steel alloys at about 900° C. At about 1250° C. improved alloys may include at least 0.5% by weight microcarbides, other phases, and/or stable, fine grain microstructure that produce strength. The resulting higher weight percent of microcarbides, other phases, and/or stable, fine grain microstructure, and the exclusion of sigma and laves phases, may account for superior high temperature performance of the improved alloys.

Alloys having similar or superior high temperature performance to the improved alloys may be derived by modeling phase behavior at elevated temperatures and selecting compositions that retain at least 1.5%, at least 2%, or at least 2.5% by weight of phases other than sigma or laves phases at, for example, about 900° C. For example, a stable microstructure may include an amount, by weight, of: niobium that is nearly ten times the amount of carbon, from about 1% to about 12% manganese, and from about 0.15 to about 0.5% of nitrogen. Copper and tungsten may be included in the composition to increase the amount of stable microstructures. The choice of elements for the improved alloys allows processing by various methods and results in a stable, fine grain size, even after heat treatments of at least 1250° C. Many prior art alloys tend to grain coarsen significantly when annealed at such high temperatures whereas the improved alloy can be improved by such high temperature treatment. In some embodiments, grain size is controlled to achieve desirable high temperature tensile and creep properties. Stable grain structure in the improved alloys reduces grain boundary sliding, and may be a contributing factor for the better strength relative to commercially available alloys at temperatures above, for example, about 650° C.

A downhole heater assembly may include 5, 10, 20, 40, or more heaters coupled together. For example, a heater assembly may include between 10 and 40 heaters. Heaters in a downhole heater assembly may be coupled in series. In some embodiments, heaters in a heater assembly may be spaced from about 7.6 m to about 30.5 m apart. For example, heaters in a heater assembly may be spaced about 15 m apart. Spacing between heaters in a heater assembly may be a function of heat transfer from the heaters to the formation. For example, a spacing between heaters may be chosen to limit temperature variation along a length of a heater assembly to acceptable limits. A heater assembly may advantageously provide substantially uniform heating over a relatively long length of an opening in a formation. Heaters in a heater assembly may include, but are not limited to, electrical heaters (for example, insulated conductor heaters, conductor-in-conduit heaters, pipe-in-pipe heaters), flameless distributed combustors, natural distributed combustors, and/or oxidizers. In some embodiments, heaters in a downhole heater assembly may include only oxidizers.

Figure 113:
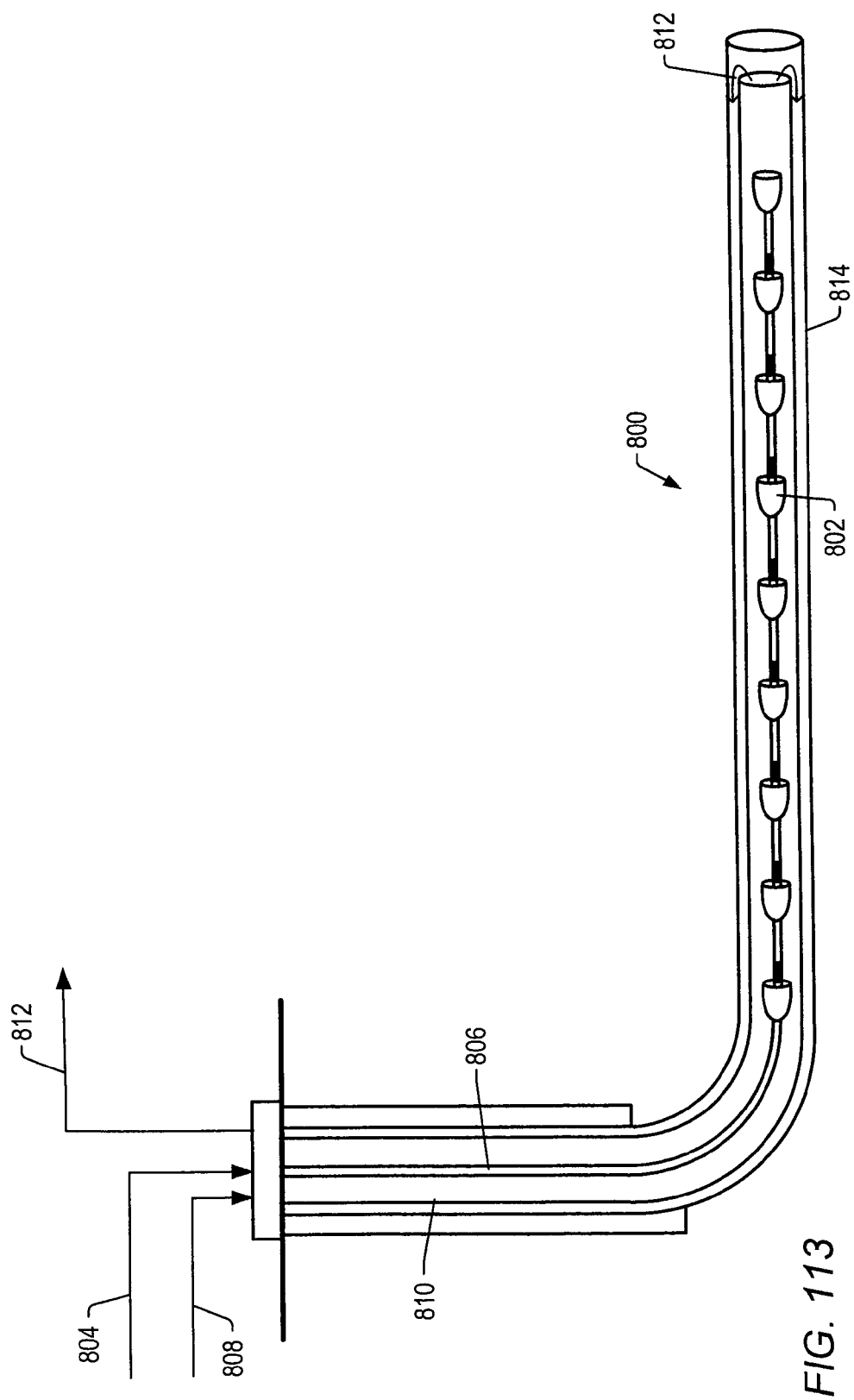
FIG. 113 depicts a schematic representation of an embodiment of a downhole oxidizer assembly.

FIG. 113 depicts a schematic of an embodiment of downhole oxidizer assembly 800 including oxidizers 802. In some embodiments, oxidizer assembly 800 may include oxidizers 802 and flameless distributed combustors. Oxidizer assembly 800 may be lowered into an opening in a formation and positioned as desired. In some embodiments, a portion of the opening in the formation may be substantially parallel to the surface of the Earth. In some embodiments, the opening of the formation may be otherwise angled with respect to the surface of the Earth. In an embodiment, the opening may include a significant vertical portion and a portion otherwise angled with respect to the surface of the Earth. In certain embodiments, the opening may be a branched opening. Oxidizer assemblies may branch from common fuel and/or oxidizer conduits in a central portion of the opening.

Fuel 804 may be supplied to oxidizers 802 through fuel conduit 806. In some embodiments, the fuel for the oxidizers may be hydrogen or a high hydrogen content hydrocarbon mixture. Using hydrogen as the fuel has several advantages over hydrocarbon fuels. For example, hydrogen is easy to ignite, oxidizing hydrogen does not result in the generation of carbon dioxide or other undesired reaction products, and coking of the fuel line is eliminated.

In some embodiments, the fuel may be methane or natural gas. In some embodiments, the fuel may be a mixture of hydrocarbons produced from an in situ heat treatment process. In certain embodiments, fuel used to initiate combustion may be enriched to decrease the temperature required for ignition. In some embodiments, hydrogen ($H_2$) or other hydrogen rich fluids may be used to enrich fuel initially supplied to the oxidizers. After ignition of the oxidizers, enrichment of the fuel may be stopped. In some embodiments, a portion or portions of fuel conduit 806 may include a catalytic surface (for example, a catalytic outer surface) to decrease an ignition temperature of fuel 804.

Portions of the fuel conduit subjected to high temperatures, may include heat shielding. The heat shielding may include an insulative underlayer and a thermally conductive overlayer. The overlayer may be a ceramic layer. The underlayer may be a low thermal conductivity ceramic sleeve or coating. The overlayer may be a high thermal conductivity coating. In some embodiments, the fuel line may be positioned in a conduit. A cooling flow may be circulated through the space between the fuel line and the conduit.

Oxidizing fluid 808 may be supplied to oxidizer assembly 800 through oxidizer conduit 810. In some embodiments, fuel conduit 806 and/or oxidizers 802 may be positioned concentrically, or substantially concentrically, in oxidizer conduit 810. In some embodiments, fuel conduit 806 and/or oxidizers 802 may be arranged other than concentrically with respect to oxidizer conduit 810. In certain branched opening embodiments, fuel conduit 806 and/or oxidizer conduit 810 may have a weld or coupling to allow placement of oxidizer assemblies 800 in branches of the opening.

An ignition source may be positioned in or proximate oxidizers 802 to initiate combustion. In some embodiments, an ignition source may heat the fuel and/or the oxidizing fluid supplied to a particular heater to a temperature sufficient to support ignition of the fuel. The fuel may be oxidized with the oxidizing fluid in oxidizers 802 to generate heat. Oxidation products may mix with oxidizing fluid downstream of the first oxidizer in oxidizer conduit 810. Exhaust gas 812 may include unreacted oxidizing fluid and unreacted fuel as well as oxidation products. In some embodiments, a portion of exhaust gas 812 from a first oxidizer, may be provided to oxidizers 802 downstream of the first oxidizer. In some embodiments, a portion of exhaust gas 812 may return to the surface through outer conduit 814. As the exhaust gas returns to the surface through outer conduit 814, heat from exhaust gas 812 may be transferred to the formation. Returning exhaust gas 812 through outer conduit 814 may provide substantially uniform heating along oxidizer assembly 800 due to heat from the exhaust gas integrating with the heat provided from individual oxidizers of the oxidizer assembly. In some embodiments, oxidizing fluid 808 may be introduced through outer conduit 814 and exhaust gas 812 may be returned through oxidizer conduit 810. In certain embodiments, heat integration may occur along an extended vertical portion of an opening.

In some embodiments, the oxidizer assembly may be a heat source used to heat water or steam. Steam produced by heat from the oxidizer assembly may be introduced into the formation. The oxidizer assembly may be placed in a conduit. The conduit may include critical flow orifices. The oxidizer may be started. Heat produced by the oxidizer assembly may be used to heat water introduced into the space between the oxidizer assembly and the conduit. Steam produced from the heat may pass through the critical flow orifices in the conduit into the formation.

Oxidizing fluid supplied to an oxidizer assembly may include, but is not limited to, air, oxygen enriched air, and/or hydrogen peroxide. Depletion of oxygen in oxidizing fluid may occur toward a terminal end of an oxidizer assembly. In an embodiment, a flow of oxidizing fluid may be increased (for example, by using compression to provide excess oxidizing fluid) such that sufficient oxygen is present for operation of the terminal oxidizer. In some embodiments, oxidizing fluid may be enriched by increasing an oxygen content of the oxidizing fluid prior to introduction of the oxidizing fluid to the oxidizers. Oxidizing fluid may be enriched by methods including, but not limited to, adding oxygen to the oxidizing fluid, adding an additional oxidant such as hydrogen peroxide to the oxidizing fluid (for example, air) and/or flowing oxidizing fluid through a membrane that allows preferential diffusion of oxygen.

For oxidizers that use hydrocarbon fuel, steps may be taken to reduce coking of fuel in the fuel conduit after ignition of the oxidizers. For example, steam may be added to the fuel to inhibit coking in the fuel conduit. In some embodiments, the fuel may be methane that is mixed with steam in a molar ratio of up to 1:1. In some embodiments, coking may be inhibited by decreasing a residence time of fuel in the fuel conduit. In some embodiments, coking may be inhibited by insulating portions of the fuel conduit that pass through high temperature zones proximate oxidizers.

If steam is to be added to the fuel, the steam needs to be added at the right point. If steam is added to the fuel at the surface, the steam may condense in the fuel line on the way down to the first oxidizer. The resulting water may slug into the first oxidizer and flameout the oxidizer. In some embodiments, a separate water line is used to introduce water into the fuel line. In an embodiment, the water line is ¼" tubing that transports softened water to the fuel line near the first oxidizer. When the oxidizers are first initialized, coking prevention may not be needed, so water is not sent through the water line. When the first oxidizer is hot, water may be sent through the water line to the fuel line. The water may be introduced into the fuel conduit at a location where the temperature is about 65° C. The entrance nozzle, the heat from the first oxidizer and the velocity of the fuel in the fuel line may atomize or vaporize the water supplied to the fuel conduit.

During operation, there is enough flow through the oxidizer system to protect the fuel line from overheating and to minimize the flame temperature. The openings of the oxidizers are designed to allow a certain flowrate through the system that increases as the bypass flow increases. At lower bypass flows, the amount of gas is restricted and temperatures may become elevated. At the design bypass flow, the maximum temperatures are lower, which may result in no or low amounts of oxides of nitrogen and a low fuel line temperature.

In some embodiments, opening sizes in the oxidizers and the fuel line pressure relative to the oxidant line pressure may be controlled to create a flammable mixture in each oxidizer. The composition of the fuel may be controlled to minimize flame temperatures. The composition of the fuel may be changed by adding diluent such as, but not limited to, steam and/or nitrogen. Opening sizes, fuel line pressure and fuel composition allow the flame region of each oxidizer to remain hot, stable and protected from the bypass flow around the oxidizers so that the oxidizers burn out the fuel supplied to the individual oxidizers.

Figure 114:
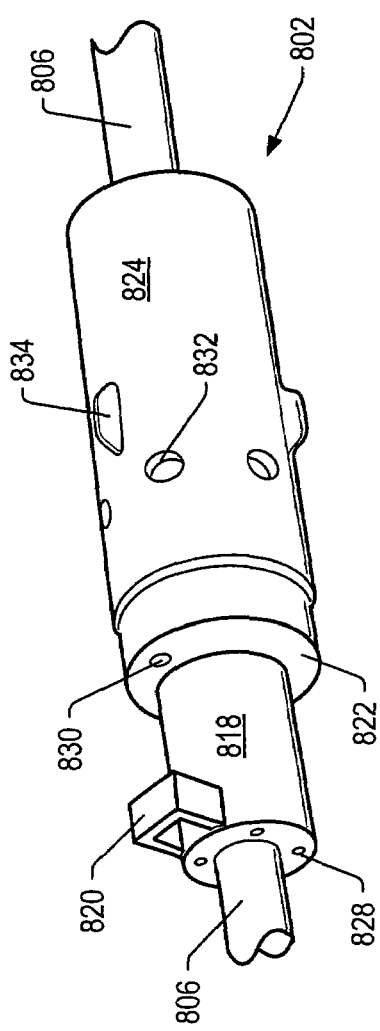
FIG. 114 depicts an embodiment of a portion of an oxidizer of an oxidation system.
Figure 115:
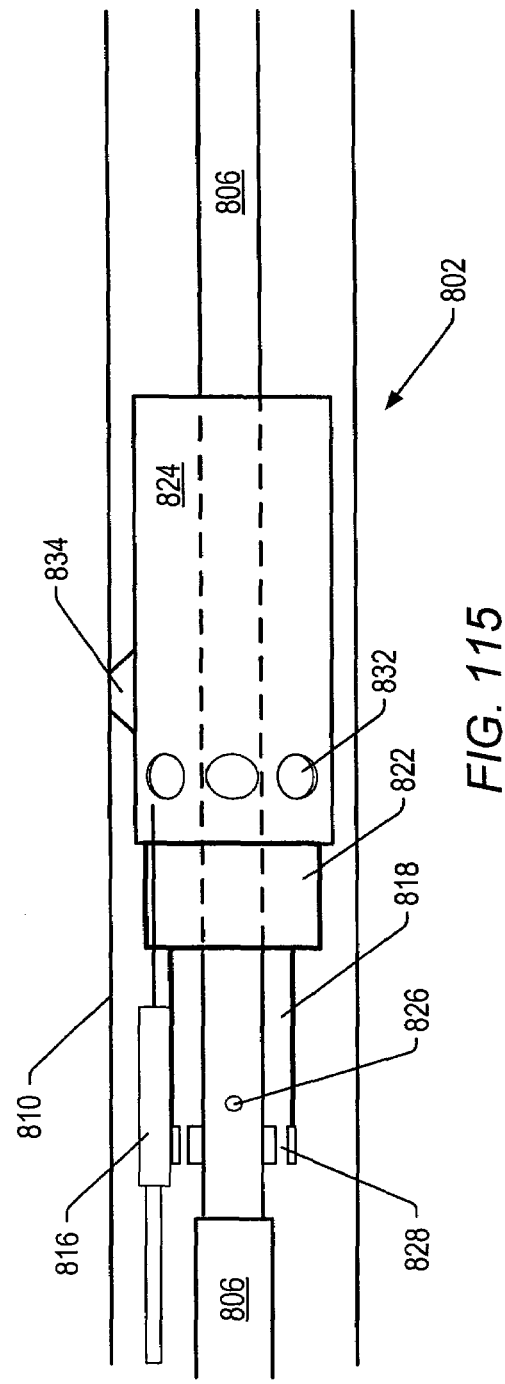
FIG. 115 depicts a schematic representation of an oxidizer positioned in an oxidant line.

FIG. 114 depicts a perspective view of an embodiment of oxidizer 802 of the downhole heater assembly without an igniter. FIG. 115 depicts a schematic representation of oxidizer 802 with igniter 816 positioned in oxidant line 810. Oxidizer 802 may include mix chamber 818, igniter holder 820, nozzle and flame holder 822, and heat shield 824. In some embodiments, the flame area in flame holder 822 and/or heat shield 824 may be at a temperature of about 1100° C. The temperature adjacent to the oxidizer may be about 700° C. Fuel conduit 806 may pass through oxidizer 802. Fuel conduit 806 may have one or more fuel openings 826 within mix chamber 818. Openings 828 allow oxidant to flow into mix chamber 818. Opening 830 allows a portion of the igniter supported on igniter holder 820 to pass into oxidizer 802. Heat shield 824 may include openings 832. Openings 832 may provide additional oxidant to a flame in heat shield 824. Openings 832 may stabilize the flame in oxidizer 802 and moderate the temperature of the flame. The size and/or number of openings 832 may be varied depending on position of the oxidizer in the oxidizer assembly to moderate the temperature and ensure fuel combustion. Spacers 834 may be positioned on heat shield 824 to keep oxidizer positioned in the oxidizer conduit.

In some embodiments, the igniters for the oxidizers include temperature limited heater elements. When the oxidizer is operating, the temperature of the oxidizer heats the igniter element above the Curie temperature of the igniter element so that skin effect heating goes away and electricity flows through all or substantially all of the heater element. If the igniter element temperature is below the Curie temperature of the igniter element, the electricity flowing through the igniter element is confined to a certain depth so the effective resistance of the igniter element increases. The increase in effective resistance causes resistive heating that raises the temperature of the igniter element above the ignition temperature of the fuel and gas mixture for the oxidizer.

In some embodiments, catalytic igniters may be used. The catalytic igniters may have long operation life at high temperatures. Catalytic igniters may enable hot restarts without having to shut down all flames in the remaining burners when one or more burners flame out. The amount of hydrogen can be varied in the fuel supply to the catalytic igniters so that fluid flow through the oxidizer system does not have to be lowered to hit ignition conditions for a particular oxidizer. Under certain operating conditions, one or more of the catalytic igniters could be supplied with fuel so that the igniter is hot to assist combustion in case an oxidizer becomes weak or troublesome due to manufacturing or long term degradation of the oxidizer. Use of catalytic igniters may allow for relatively simple startups.

Figure 116:
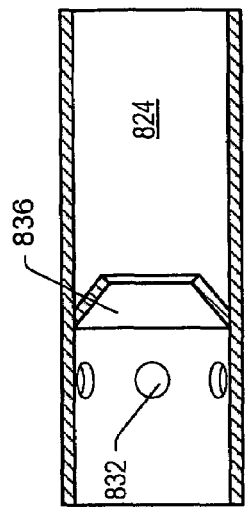
FIG. 116 depicts a cross-sectional view of an embodiment of a heat shield.
Figure 117:
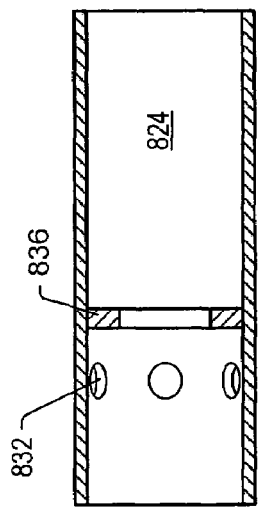
FIG. 117 depicts a cross-sectional view of an embodiment of a heat shield.

In some embodiments, flame stabilizers may be added to the oxidizers. The flame stabilizers may attach the flame to the heat shield. The high bypass flow around the oxidizer cools the heat shield and protects the internals of the oxidizer from damage. FIGS. 116-120 depict various embodiments of heat shields 824 with flame stabilizers 836. Flame stabilizer 836 depicted in FIG. 116 is a ring. Flame stabilizer 836 depicted in FIG. 117 is an angled ring. The rings may amount to up to about 25% annular area blockage. The rings may establish a recirculation zone near heat shield 824 and away from the fuel line passing through the center of the heat shield.

Figure 118:
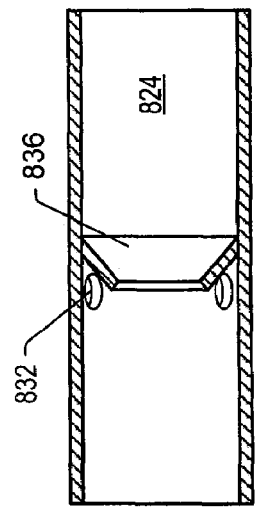
FIG. 118 depicts a cross-sectional view of an embodiment of a heat shield.

FIG. 118 depicts an embodiment of multiple flame stabilizers 836 in heat shield 824. Flame shield 824 may have two or more sets of openings 832 along an axial length of the flame shield. Rings may be positioned behind one or more of the sets of openings 832. In some embodiments, adjacent rings may cause interference. To inhibit interference, 3 partial rings (each ring being about ⅙ the circumference) may be evenly space about the circumference instead of one complete ring. The next set of 3 partial rings along the axial length of heat shield may be staggered (for example, the rings may be rotated by 120° relative to the first set of 3 rings).

Figure 119:
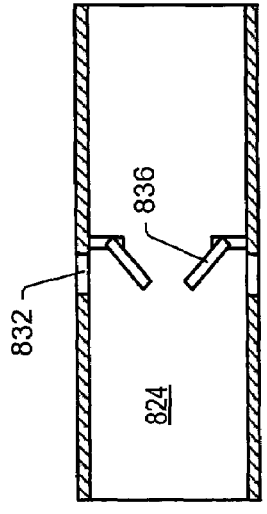
FIG. 119 depicts a cross-sectional view of an embodiment of a heat shield.

FIG. 119 depicts an embodiment of flame stabilizer 836 in heat shield 824. Flame stabilizer 836 is a ring that angles over upstream openings 832. Flame stabilizer 836 may divert incoming fluid flow through openings 832 in an upstream direction. The diverted incoming fluid may set up a flow condition somewhat analogous to high swirl recirculation (reverse flow). One or more stagnation zones may develop where a flame front is stable.

Figure 120:
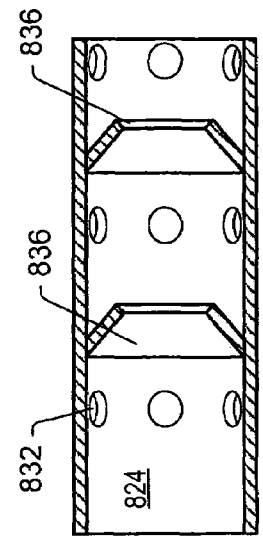
FIG. 120 depicts a cross-sectional view of an embodiment of a heat shield.

FIG. 120 depicts an embodiment wherein flame stabilizers 836 are rounded deflectors positioned upstream of openings 832. The portion of flame stabilizers 836 positioned over the openings may be cylindrical sections with the concave portions facing openings 832. Flame stabilizers 836 may divert incoming fluid flow and allow the flame root area to develop around the deflectors.

One of more of the oxidizers in an oxidizer assembly may be a catalytic burner. The catalytic burners may include a catalytic portion followed by a homogenous portion. Catalytic burners may be started late in an ignition sequence, and may ignite without igniters. Oxidant for the catalytic burners would be sufficiently hot from upstream burners (for example, the oxidant may be at a temperature of about 370° C. if the fuel is primarily methane) so that a primary mixture would react over the catalyst in the catalyst portion and produce enough heat so that exiting products ignite a secondary mixture in the homogenous portion of the oxidizer. In some embodiments, the fuel may include enough hydrogen to allow the needed temperature of the oxidant to be lower. The catalytic portion of the catalytic burner may use significantly less fuel than the homogenous portion so that a significant portion of the heat of the catalytic burner is produced in the homogenous portion of the burner.

FIG. 121 depicts a cross-sectional representation of catalytic burner 838. Oxidizer may enter mix chamber 818 through openings 828. Fuel may enter mix chamber 818 from fuel conduit 806 through fuel openings 826'. Fuel and oxidizer may flow to catalyst 840. Catalyst 840 may include palladium on a honeycomb ceramic support. The fuel and oxidant react on catalyst 840 to form hot reaction products. The hot reaction products may be directed to heat shield 824. Additional fuel enters heat shield 824 through openings 826" in fuel conduit 806. Additional oxidant enters heat shield 824 through openings 832. The hot reaction products generated by catalyst 840 may ignite fuel and oxidant in autoignition zone 842. Autoignition zone 842 may allow fuel and oxidant to form main combustion zone 844.

In some embodiments a catalytic burner may include an igniter to simplify startup procedures. FIG. 122 depicts catalytic burner 838 that includes igniter 816. Igniter 816 is positioned in mix chamber 818. Oxidant enters mix chamber through openings 828A. Fuel enters the mix chamber from fuel line through fuel openings 826A. The fuel input into mixture chamber 818 may be only a small fraction of the fuel input for catalytic burner 838. Inputs into mixture chamber 818 may be critical flow orifices to maintain tight control of the mixture under a wide range of operating conditions. Igniter 816 raises the temperature of the fuel and oxidant to combustion temperatures in pre-heat zone 846. Flame stabilizer 836 may be positioned in mixing chamber 818. Heat from pre-heat zone 846 and/or combustion products may heat additional fuel that enters mixing chamber 818 through fuel openings 826B and additional oxidant that enters the mixing chamber through openings 828B. Openings 826B and openings 828B may be upstream of flame stabilizer 836. The additional fuel and oxidant are heated to a temperature sufficient to support reaction on catalyst 840.

Heated fuel and oxidant from mixing chamber 818 pass to catalyst 840. The fuel and oxidant react on catalyst 840 to form hot reaction products. The hot reaction products may be directed to heat shield 824. Additional fuel enters heat shield 824 through openings 826C in fuel conduit 806. Additional oxidant enters heat shield 824 through openings 832. The hot reaction products generated by catalyst 840 may ignite fuel and oxidant in autoignition zone 842. Autoignition zone 842 may allow fuel and oxidant to form main combustion zone 844.

In some embodiments, all of the oxidizers in the oxidizer assembly are catalytic burners. In some embodiments, the first or the first several oxidizers in the oxidizer assembly are catalytic burners. The oxidant supplied to these burners may be at a lower temperature than subsequent burners. Using catalytic burners with igniters may stabilize the first performance of the first several oxidizers in the oxidizer assembly. Catalytic burners may be used in-line with other burners to reduce emissions by allowing lower flame temperatures while still having substantially complete combustion.

In some embodiments, a catalytic converter may be positioned at the end of the oxidizer assembly or in the exhaust gas return. The catalytic converter may remove unburned hydrocarbons and/or remaining oxides of nitrogen or other pollutants. The catalytic converter may benefit from the relatively high temperature of the exhaust gas. In some embodiments, catalytic burners in series may be integrated with coupled catalytic converters to limit undesired emissions from the oxidizer assembly. In some embodiments, a selectively permeable material may be used to allow carbon dioxide or other fluids to be separated from the exhaust gas. The carbon dioxide may be sequestered in a spent portion of the formation to sequester the carbon dioxide.

In some embodiments, a flameless distributed combustor may be the front and/or back burner. Having a flameless distributed combustor as the front burner may stabilize the front burner and provide heated oxidant to the next oxidizer. Having a flameless distributed combustor as the back burner may ensure that the exhaust is depleted in case one or more of the oxidizers flame out.

In some embodiments, the igniters may be removable or retractable from the flame after ignition. The igniter may be placed in a sheath or pulled back from the flame. Having the ability to remove or retract the igniters may extend the life of the igniters and provide for a more reliable system should one or more of the oxidizers need to be restarted.

The spacing of the oxidizers in an oxidizer assembly may be varied. The spacing may be varied to accommodate rich and lean portions of the formation. In some embodiments, the heat duty of selected oxidizers may be increased by using ceramic parts inside the oxidizers. Increasing the heat duty may simplify the overall design and/or permit a system with fewer burners.

In some embodiments, the fuel line may be located adjacent to the oxidizers. A separate line would need to be routed from the fuel line to each oxidizer. Air shields would be needed to shield and stabilize the flame due to the high gas flow requirements. Also, shielding may be needed to protect oxidizer components.

In some in situ heat treatment embodiments, a downhole gas turbine is used to provide a portion of the electricity for an electric heater. The exhaust from the gas turbine may heat the formation. The heater may be a temperature limited heater in a horizontal section of a U-shaped well. In some embodiments, the substantially horizontal section of the U-shaped well is over 1000 m long, over 1300 m long, over 1600 m long, or over 1900 m long.

Figure 123:
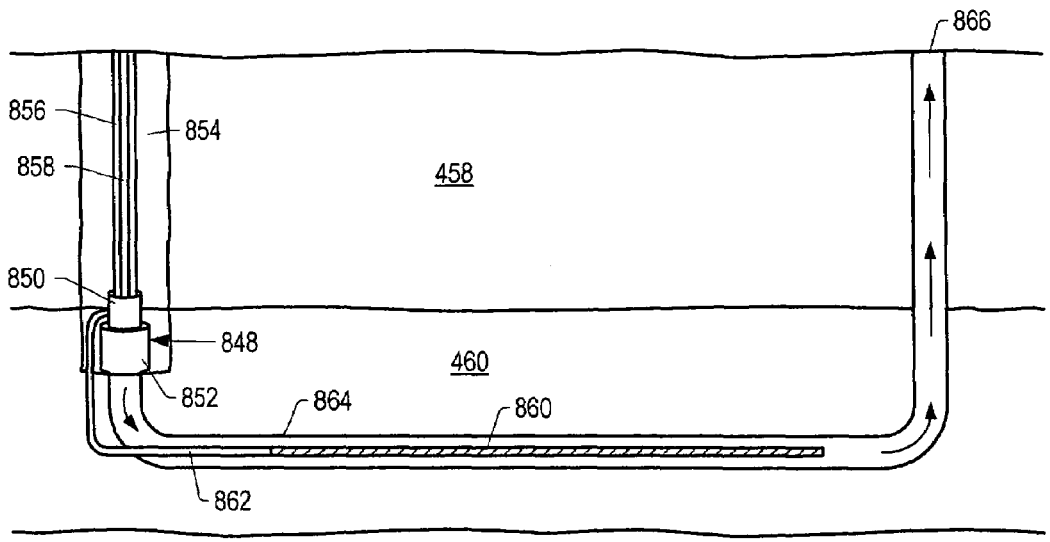
FIG. 123 depicts a schematic representation of an embodiment of a heating system with a downhole gas turbine.

FIG. 123 depicts a schematic representation of a heating system with a downhole gas turbine. Gas turbine 848 is placed at or near the transition between overburden 458 and hydrocarbon layer 460. Gas turbine 848 may include electrical generator 850 and turbine gas combustor 852. Inlet leg 854 to gas turbine 848 may have a relatively large diameter. The diameter may be 0.3 m, 0.4 m, 0.5 m or greater. Oxidant line 856 and fuel line 858 supply gas turbine 848. In some embodiments, fuel line 858 is placed within oxidant line 856, or the oxidant line is placed in the fuel line. In some embodiments, the oxidant line is positioned adjacent to the fuel line. In some embodiments, inlet oxidant and fuel are used to cool gas turbine 848. Oxidant may be, but is not limited to, air, oxygen, or oxygen enriched air.

Electricity provided by electrical generator 850 is directed to temperature limited heater 860 through lead-in conductors 862. Lead-in conductors 862 may be insulated conductors. If electrical generator 850 is not able to supply enough electricity to temperature limited heater 860 to heat hydrocarbon layer 460 to a desired temperature, additional electricity may be supplied to the temperature limited heater through a conductor placed in inlet leg 850 and electrically coupled to the temperature limited heater.

Exhaust gas from gas turbine 852 passes through tubular 864 to outlet 866. In an embodiment, the tubular is 4" stainless steel pipe placed in a 6" wellbore. The exhaust gases heat an initial section of hydrocarbon layer 460 before the gases become too cool to heat the hydrocarbon layer to the desired temperature. Temperature limited heater 860 begins a selected distance from gas turbine 848. The distance may be 200 m, 150 m, 100 m, or less. Heat provided to the portion of the formation from gas turbine 848 to temperature limited heater 860 may come from the exhaust gases passing through tubular 864. Temperature limited heater 860, which is at least partially supplied with electricity generated by gas turbine 848, heats hydrocarbon layer 460 and the exhaust gases from the gas turbine. Temperature limited heater 860 may be an insulated conductor heater with a self-limiting temperature of about 760° C. In some embodiments, temperature limited heater 860 is placed in tubular 864. In other embodiments, the temperature limited heater is on the outside of the tubular. Temperature limited heater 860 may end at a selected horizontal distance from the outlet 866 of the temperature limited heater. The distance may be 200 m, 150 m, 100 m, or less. The exhaust gases heated by temperature limited heater 860 transfer heat to hydrocarbon layer 460 before passing through overburden 458 to outlet 866.

Inlets and outlets of the U-shaped wells for heating a portion of the formation may be placed in alternating directions in adjacent wells. Alternating inlets and outlets of the U-shaped wells may allow for uniform heating of the hydrocarbon layer of the formation.

In some embodiments, a portion of oxidant for gas turbine 848 is routed to the gas turbine from outlet 866 of an adjacent U-shaped well. The portion of oxidant may be sent to the gas turbine through a separate line. Using oxidant from the exit of the adjacent well may allow some of the oxidant and/or heat from the exiting exhaust gases to be recovered and utilized. The separate exhaust gas line to the gas turbine may transfer heat to the main oxidant line and/or fuel line to the gas turbine.

Compressors and partial expanders may be located at the surface. Compressed fuel lines and oxidant lines extend to gas turbine 848. Generators, burners, and expanders of the gas turbine may be located at or near the transition between the overburden and the hydrocarbon layer that is to be heated. Locating equipment in this manner may reduce the complexity of the downhole equipment, and reduce pressure drops for the oxidant going down the wellbore and the combustion gases going through the heater sections and back to the surface. The surface expander for a first well can expand gases from an adjacent well outlet since the adjacent well outlet is physically closer to the inlet of the first well than is the outlet of the first well. Moving compressed fuel and compressed oxidant down to the gas turbine may result in less pressure drop as compared to having cool fuel and oxidant travel down to the gas turbine. Placing gas turbine 848 at or near the transition between overburden 458 and hydrocarbon layer 460 allows exhaust gas from the gas turbine to heat portions of the formation that are to be pyrolyzed. Placing the gas turbine 848 at or near the transition between overburden 458 and hydrocarbon layer 460 may eliminate or reduce the amount of insulation needed between the overburden and inlet leg 854. In some embodiments, tapered insulation may be applied at the exit of gas turbine 848 to reduce excess heating of the formation near the gas turbine.

Figure 124:
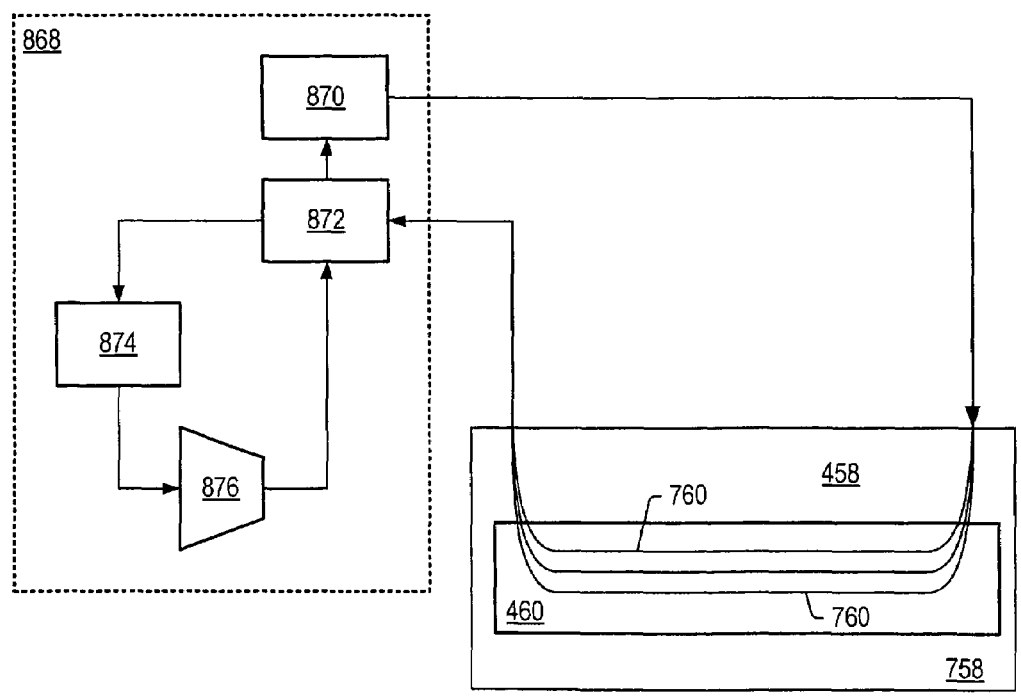
FIG. 124 depicts a schematic representation of a closed loop circulation system for heating a portion of a formation.

In some in situ heat treatment process embodiments, a circulation system is used to heat the formation. The circulation system may be a closed loop circulation system. FIG. 124 depicts a schematic representation of a system for heating a formation using a circulation system. The system may be used to heat hydrocarbons that are relatively deep in the ground and that are in formations that are relatively large in extent. In some embodiments, the hydrocarbons may be 100 m, 200 m, 300 m or more below the surface. The circulation system may also be used to heat hydrocarbons that are not as deep in the ground. The hydrocarbons may be in formations that extend lengthwise up to 500 m, 750 m, 1000 m, or more. The circulation system may become economically viable in formations where the length of the hydrocarbon containing formation to be treated is long compared to the thickness of the overburden. The ratio of the hydrocarbon formation extent to be heated by heaters to the overburden thickness may be at least 3, at least 5, or at least 10. The heaters of the circulation system may be positioned relative to adjacent heaters so that superposition of heat between heaters of the circulation system allows the temperature of the formation to be raised at least above the boiling point of aqueous formation fluid in the formation.

In some embodiments, heaters 760 may be formed in the formation by drilling a first wellbore and then drilling a second wellbore that connects with the first wellbore. Piping may be positioned in the U-shaped wellbore to form U-shaped heater 760. Heaters 760 are connected to heat transfer fluid circulation system 868 by piping. Gas at high pressure may be used as the heat transfer fluid in the closed loop circulation system. In some embodiments, the heat transfer fluid is carbon dioxide. Carbon dioxide is chemically stable at the required temperatures and pressures and has a relatively high molecular weight that results in a high volumetric heat capacity. Other fluids such as steam, air, helium and/or nitrogen may also be used. The pressure of the heat transfer fluid entering the formation may be 3000 kPa or higher. The use of high pressure heat transfer fluid allows the heat transfer fluid to have a greater density, and therefore a greater capacity to transfer heat. Also, the pressure drop across the heaters is less for a system where the heat transfer fluid enters the heaters at a first pressure for a given mass flow rate than when the heat transfer fluid enters the heaters at a second pressure at the same mass flow rate when the first pressure is greater than the second pressure. In some embodiments, a liquid heat transfer fluid may be used. The liquid heat transfer fluid may be a natural or synthetic oil, or other type of high temperature heat transfer fluid.

Heat transfer fluid circulation system 868 may include heat supply 870, first heat exchanger 872, second heat exchanger 874, and compressor 876. Heat supply 870 heats the heat transfer fluid to a high temperature. Heat supply 870 may be a furnace, solar collector, chemical reactor, nuclear reactor, fuel cell exhaust heat, or other high temperature source able to supply heat to the heat transfer fluid. In the embodiment depicted in FIG. 124, heat supply 870 is a furnace that heats the heat transfer fluid to a temperature in a range from about 700° C. to about 920° C., from about 770° C. to about 870° C., or from about 800° C. to about 850° C. In an embodiment, heat supply 870 heats the heat transfer fluid to a temperature of about 820° C. The heat transfer fluid flows from heat supply 870 to heaters 760. Heat transfers from heaters 760 to formation 758 adjacent to the heaters. The temperature of the heat transfer fluid exiting formation 758 may be in a range from about 350° C. to about 580° C., from about 400° C. to about 530° C., or from about 450° C. to about 500° C. In an embodiment, the temperature of the heat transfer fluid exiting formation 758 is about 480° C. The metallurgy of the piping used to form heat transfer fluid circulation system 868 may be varied to significantly reduce costs of the piping. High temperature steel may be used from heat supply 870 to a point where the temperature is sufficiently low so that less expensive steel can be used from that point to first heat exchanger 872. Several different steel grades may be used to form the piping of heat transfer fluid circulation system 868.

Heat transfer fluid from heat supply 870 of heat transfer fluid circulation system 868 passes through overburden 458 of formation 758 to hydrocarbon layer 460. Portions of heaters 760 extending through overburden 458 may be insulated. In some embodiments, the insulation or part of the insulation is a polyimide insulating material. Inlet portions of heaters 760 in hydrocarbon layer 460 may have tapering insulation to reduce overheating of the hydrocarbon layer near the inlet of the heater into the hydrocarbon layer.

In some embodiments, the diameter of the pipe in overburden 458 may be smaller than the diameter of pipe through hydrocarbon layer 460. The smaller diameter pipe through overburden 458 may allow for less heat transfer to the overburden. Reducing the amount of heat transfer to overburden 458 reduces the amount of cooling of the heat transfer fluid supplied to pipe adjacent to hydrocarbon layer 460. The increased heat transfer in the smaller diameter pipe due to increased velocity of heat transfer fluid through the small diameter pipe is offset by the smaller surface area of the smaller diameter pipe and the decrease in residence time of the heat transfer fluid in the smaller diameter pipe.

After exiting formation 758, the heat transfer fluid passes through first heat exchanger 872 and second heat exchanger 874 to compressor 876. First heat exchanger 872 transfers heat between heat transfer fluid exiting formation 758 and heat transfer fluid exiting compressor 876 to raise the temperature of the heat transfer fluid that enters heat supply 870 and reduce the temperature of the fluid exiting formation 758. Second heat exchanger 874 further reduces the temperature of the heat transfer fluid before the heat transfer fluid enters compressor 876.

Figure 125:
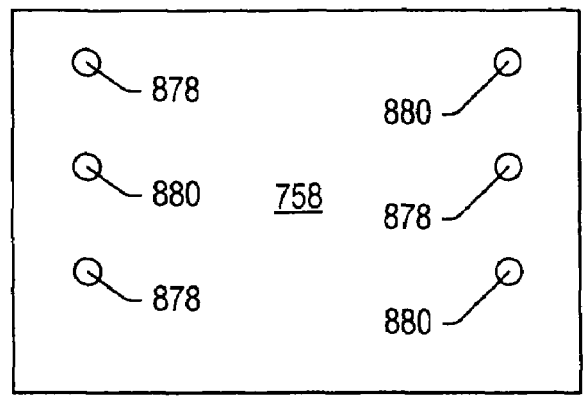
FIG. 125 depicts a plan view of wellbore entries and exits from a portion of a formation to be heated using a closed loop circulation system.

FIG. 125 depicts a plan view of an embodiment of wellbore openings in the formation that is to be heated using the circulation system. Heat transfer fluid entries 878 into formation 758 alternate with heat transfer fluid exits 880. Alternating heat transfer fluid entries 878 with heat transfer fluid exits 880 may allow for more uniform heating of the hydrocarbons in formation 758.

In some embodiments, piping for the circulation system may allow the direction of heat transfer fluid flow through the formation to be changed. Changing the direction of heat transfer fluid flow through the formation allows each end of a u-shaped wellbore to initially receive the heat transfer fluid at the heat transfer fluid's hottest temperature for a period of time, which may result in more uniform heating of the formation. The direction of heat transfer fluid may be changed at desired time intervals. The desired time interval may be about a year, about six months, about three months, about two months or any other desired time interval.

In some embodiments, nuclear energy may be used to heat the heat transfer fluid used in the circulation system to heat a portion of the formation. Heat supply 870 in FIG. 124 may be a pebble bed reactor or other type of nuclear reactor, such as a light water reactor. The use of nuclear energy provides a heat source with no carbon dioxide emissions. Also, the use of nuclear energy can be more efficient because energy losses resulting from the conversion of heat to electricity and electricity to heat are avoided by directly utilizing the heat produced from the nuclear reactions without producing electricity.

In some embodiments, a nuclear reactor may heat helium. For example, helium flows through a pebble bed reactor, and heat transfers to the helium. The helium may be used as the heat transfer fluid to heat the formation. In some embodiments, the nuclear reactor may heat helium, and the helium may be passed through a heat exchanger to provide heat to the heat transfer fluid used to heat the formation. The pebble bed reactor may include a pressure vessel that contains encapsulated enriched uranium dioxide fuel. Helium may be used as a heat transfer fluid to remove heat from the pebble bed reactor. Heat may be transferred in a heat exchanger from the helium to the heat transfer fluid used in the circulation system. The heat transfer fluid used in the circulation system may be carbon dioxide, a molten salt, or other fluid. Pebble bed reactor systems are available from PBMR Ltd (Centurion, South Africa).

Figure 126:
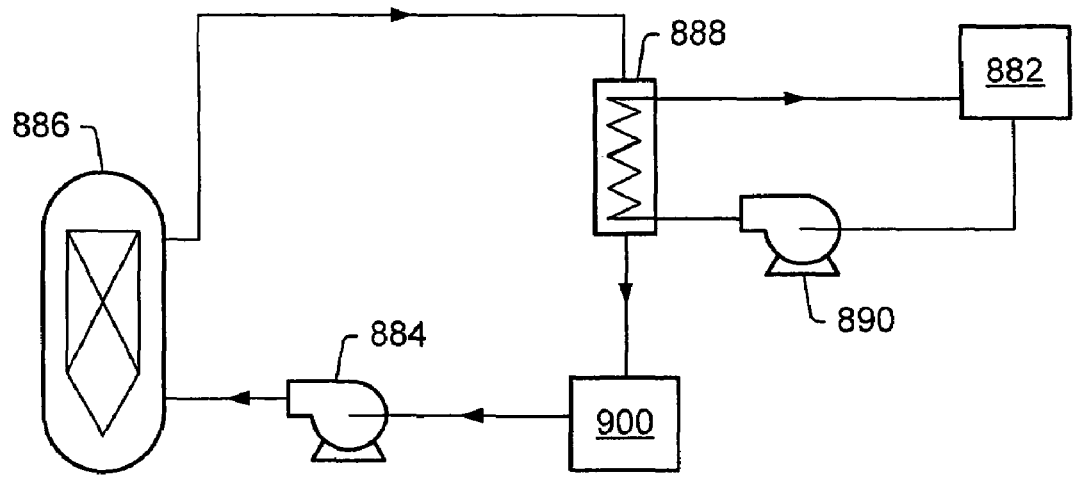
FIG. 126 depicts a schematic representation of an embodiment of an in situ heat treatment system that uses a nuclear reactor.

FIG. 126 depicts a schematic diagram of a system that uses nuclear energy to heat treatment area 882. The system may include helium system gas blower 884, nuclear reactor 886, heat exchanger units 888, and heat transfer fluid blower 890. Helium system gas blower 884 may draw heated helium from nuclear reactor 886 to heat exchanger units 888. Helium from heat exchanger units 888 may pass through helium system gas blower 884 to nuclear reactor 886. Helium from nuclear reactor 886 may be at a temperature of about 900° C. to about 1000° C. Helium from helium gas blower 884 may be at a temperature of about 500° C. to about 600° C. Heat transfer fluid blower 890 may draw heat transfer fluid from heat exchanger units 888 through treatment area 882. Heat transfer fluid may pass through heat transfer fluid blower 890 to heat exchanger units 888. The heat transfer fluid may be carbon dioxide. The heat transfer fluid may be at a temperature from about 850° C. to about 950° C. after exiting heat exchanger units 888.

In some embodiments, the system may include auxiliary power unit 900. In some embodiments, auxiliary power unit 900 generates power by passing the helium from heat exchanger units 888 through a generator to make electricity. The helium may be sent to one or more compressors and/or heat exchangers to adjust the pressure and temperature of the helium before the helium is sent to nuclear reactor 886. In some embodiments, auxiliary power unit 900 generates power using a heat transfer fluid (for example, ammonia or aqua ammonia). Helium from heat exchanger units 888 is sent to additional heat exchanger units to transfer heat to the heat transfer fluid. The heat transfer fluid is taken through a power cycle (such as a Kalina cycle) to generate electricity. In an embodiment, nuclear reactor 886 is a 400 MW reactor and auxiliary power unit 900 generates about 30 MW of electricity.

Figure 127:
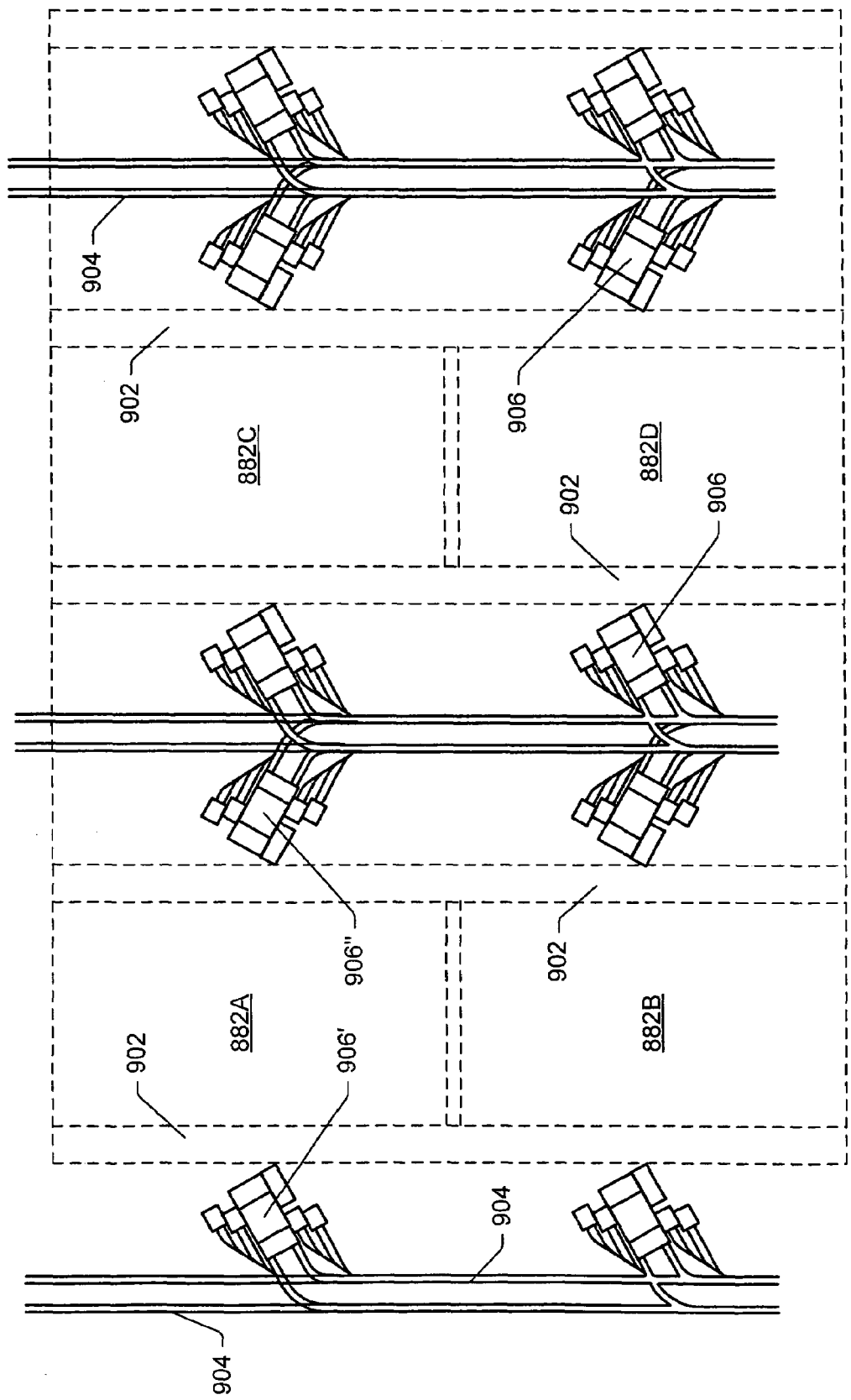

FIG. 127 depicts a schematic elevational view of an arrangement for an in situ heat treatment process. U-shaped wellbores may be formed in the formation to define treatment areas 882A, 882B, 882C, 882D. Additional treatment areas could be formed to the sides of the shown treatment areas. Treatment areas 882A, 882B, 882C, 882D may have widths of over 300 m, 500 m, 1000 m, or 1500 m. Well exits and entrances for the wellbores may be formed in well openings area 902. Rail lines 904 may be formed along sides of treatment areas 882. Warehouses, administration offices and/or spent fuel storage facilities may be located near ends of rail lines 904. Facilities 906 may be formed at intervals along spurs of rail lines 904. Each facility 906 may include a nuclear reactor, compressors, heat exchanger units and other equipment needed for circulating hot heat transfer fluid to the wellbores. Facilities 906 may also include surface facilities for treating formation fluid produced from the formation. In some embodiments, heat transfer fluid produced in facility 906' may be reheated by the reactor in facility 906" after passing through treatment area 882A. In some embodiments, each facility 906 is used to provide hot treatment fluid to wells in one half of the treatment area 882 adjacent to the facility. Facilities 906 may be moved by rail to another facility site after production from a treatment area is completed.

Circulation systems may be used to heat portions of the formation. Production wells in the formation are used to remove produced fluids. After production from the formation has ended, the circulation system may be used to recover heat from the formation. FIG. 124 depicts an embodiment of a circulation system. Heat transfer fluid may be circulated through heaters 760 after heat supply 870 is disconnected from the circulation system. The heat transfer fluid may be a different heat transfer fluid than the heat transfer fluid used to heat the formation. Heat transfers from the heated formation to the heat transfer fluid. The heat transfer fluid may be used to heat another portion of the formation or the heat transfer fluid may be used for other purposes. In some embodiments, water is introduced into heaters 760 to produce steam. In some embodiments, low temperature steam is introduced into heaters 760 so that the passage of the steam through the heaters increases the temperature of the steam. Other heat transfer fluids including natural or synthetic oils, such as Syltherm oil (Dow Corning Corporation (Midland, Mich., U.S.A.), may be used instead of steam or water.

In some embodiments, the circulation system may be used in conjunction with electrical heating. In some embodiments, at least a portion of the pipe in the U-shaped wellbores adjacent to portions of the formation that are to be heated is made of a ferromagnetic material. For example, the piping adjacent to a layer or layers of the formation to be heated is made of a 9% to 13% chromium steel, such as 410 stainless steel. The pipe may be a temperature limited heater when time varying electric current is applied to the piping. The time varying electric current may resistively heat the piping, which heats the formation. In some embodiments, direct electric current may be used to resistively heat the piping, which heats the formation.

In some embodiments, the circulation system is used to heat the formation to a first temperature, and electrical energy is used to maintain the temperature of the formation and/or heat the formation to higher temperatures. The first temperature may be sufficient to vaporize aqueous formation fluid in the formation. The first temperature may be at most about 200° C., at most about 300° C., at most about 350° C., or at most about 400° C. Using the circulation system to heat the formation to the first temperature allows the formation to be dry when electricity is used to heat the formation. Heating the dry formation may minimize electrical current leakage into the formation.

In some embodiments, the circulation system and electrical heating may be used to heat the formation to a first temperature. The formation may be maintained, or the temperature of the formation may be increased from the first temperature, using the circulation system and/or electrical heating. In some embodiments, the formation may be raised to the first temperature using electrical heating, and the temperature may be maintained and/or increased using the circulation system. Economic factors, available electricity, availability of fuel for heating the heat transfer fluid, and other factors may be used to determine when electrical heating and/or circulation system heating are to be used.

In certain embodiments, the portion of heater 760 in hydrocarbon layer 460 is coupled to lead-in conductors. Lead-in conductors may be located in overburden 458. Lead-in conductors may electrically couple the portion of heater 760 in hydrocarbon layer 460 to one or more wellheads at the surface. Electrical isolators may be located at a junction of the portion of heater 760 in hydrocarbon layer 460 with portions of heater 760 in overburden 458 so that the portions of the heater in the overburden are electrically isolated from the portion of the heater in the hydrocarbon layer. In some embodiments, the lead-in conductors are placed inside of the pipe of the closed loop circulation system. In some embodiments, the lead-in conductors are positioned outside of the pipe of the closed loop circulation system. In some embodiments, the lead-in conductors are insulated conductors with mineral insulation, such as magnesium oxide. The lead-in conductors may include highly electrically conductive materials such as copper or aluminum to reduce heat losses in overburden 458 during electrical heating.

In certain embodiments, the portions of heater 760 in overburden 458 may be used as lead-in conductors. The portions of heater 760 in overburden 458 may be electrically coupled to the portion of heater 760 in hydrocarbon layer 460. In some embodiments, one or more electrically conducting materials (such as copper or aluminum) are coupled (for example, cladded or welded) to the portions of heater 760 in overburden 458 to reduce the electrical resistance of the portions of the heater in the overburden. Reducing the electrical resistance of the portions of heater 760 in overburden 458 reduces heat losses in the overburden during electrical heating.

In some embodiments, the portion of heater 760 in hydrocarbon layer 460 is a temperature limited heater with a self-limiting temperature between about 600° C. and about 1000° C. The portion of heater 760 in hydrocarbon layer 460 may be a 9% to 13% chromium stainless steel. For example, portion of heater 760 in hydrocarbon layer 460 may be 410 stainless steel. Time-varying current may be applied to the portion of heater 760 in hydrocarbon layer 460 so that the heater operates as a temperature limited heater.

Figure 128:
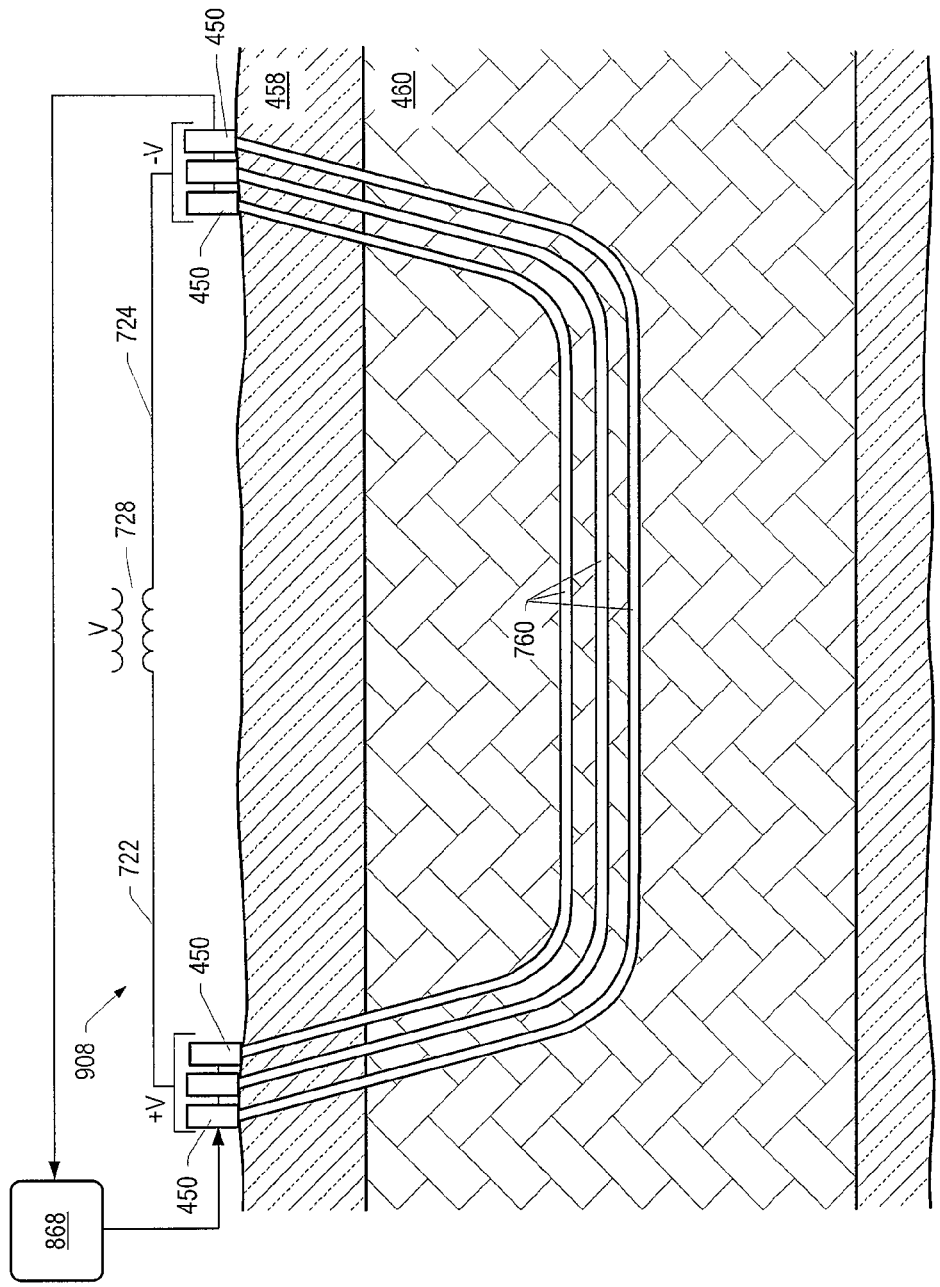

FIG. 128 depicts a side view representation of an embodiment of a system for heating a portion of a formation using a circulated fluid system and/or electrical heating. Wellheads 450 of heaters 760 may be coupled to heat transfer fluid circulation system 868 by piping. Wellheads 450 may also be coupled to electrical power supply system 908. In some embodiments, heat transfer fluid circulation system 868 is disconnected from the heaters when electrical power is used to heat the formation. In some embodiments, electrical power supply system 908 is disconnected from the heaters when heat transfer fluid circulation system 868 is used to heat the formation.

Electrical power supply system 908 may include transformer 728 and cables 722, 724. In certain embodiments, cables 722, 724 are capable of carrying high currents with low losses. For example, cables 722, 724 may be thick copper or aluminum conductors. The cables may also have thick insulation layers. In some embodiments, cable 722 and/or cable 724 may be superconducting cables. The superconducting cables may be cooled by liquid nitrogen. Superconducting cables are available from Superpower, Inc. (Schenectady, N.Y., U.S.A.). Superconducting cables may minimize power loss and/or reduce the size of the cables needed to couple transformer 728 to the heaters. In some embodiments, cables 722, 724 may be made of carbon nanotubes.

In some embodiments, geothermal energy may be used to heat or preheat a treatment area of an in situ heat treatment process or a treatment area to be solution mined. Geothermal energy may have little or no carbon dioxide emissions. In some embodiments, hot fluid may be produced from a layer or layers located below or near the treatment area. The hot fluid may be steam, water, and/or brine. One or more of the layers may be geothermally pressurized geysers. Hot fluid may be pumped from one or more of the layers. The layer or layers may be 2 km, 4 km, 8 km or more below the surface. The hot fluid may be at a temperature of over 100° C., over 200° C., or over 300° C.

The hot fluid may be produced and circulated through piping in the treatment area to raise the temperature of the treatment area. In some embodiments, the hot fluid is introduced directly into the treatment area. In some embodiments, the hot fluid is circulated through the treatment area or piping in the treatment area without being produced to the surface and re-introduced into the treatment area. In some embodiments, the hot fluid may be produced from a location near the treatment area. The hot fluid may be transported to the treatment area. Once transported to the treatment area, the hot fluid is circulated through piping in the treatment area or the hot fluid is introduced directly into the treatment area.

In some embodiments, hot fluid produced from a layer or layers is used to solution mine minerals from the formation. The hot fluid may be used to raise the temperature of the formation to a temperature below the dissociation temperature of the minerals but to a temperature high enough to increase the amount of mineral going into solution in a first fluid introduced into the formation. The hot fluid may be introduced directly into the formation as all or a portion of the first fluid, or the hot fluid may be circulated through piping in the formation.

In some embodiments, hot fluid produced from a layer or layers may be used to heat the treatment area before using electrical energy or other types of heat sources to heat the treatment area to pyrolysis temperatures. The hot fluid may not be at a temperature sufficient to raise the temperature of the treatment area to pyrolysis temperatures. Using the hot fluid to heat the treatment area before using electrical heaters or other heat sources to heat the treatment area to pyrolysis temperatures may reduce energy costs for the in situ heat treatment process.

In some embodiments, hot dry rock technology may be used to produce steam or other hot heat transfer fluid from a deep portion of the formation. Injection wells may be drilled to a depth where the formation is hot. The injection wells may be over 2 km, over 4 km, or over 8 km deep. Sections of the formation adjacent to the bottom portions of the injection wells may be hydraulically or otherwise fractured to provide large contact area with the formation and/or to provide flow paths to heated fluid production wells. Water, steam and/or other heat transfer fluid may be introduced into the formation through the injection wells. Heat transfers to the introduced fluid from the formation. Steam and/or hot heat transfer fluid may be produced from the heated fluid production wells. In some embodiments, the steam and/or hot heat transfer fluid is directed into the treatment area from the production wells without first producing the steam and/or hot heat transfer fluid to the surface. The steam and/or hot heat transfer fluid may be used to heat a portion of a hydrocarbon containing formation above the deep hot portion of the formation.

In some embodiments, steam produced from heated fluid production wells may be used as the steam for a drive process (for example, a steam flood process or steam assisted gravity drainage process). In some embodiments, steam or other hot heat transfer fluid produced through heated fluid production wells is passed through U-shaped wellbores or other types of wellbores to provide initial heating to the formation. In some embodiments, cooled steam or water, or cooled heat transfer fluid, resulting from the use of the steam and/or heat transfer fluid from the hot portion of the formation may be collected and sent to the hot portion of the formation to be reheated.

In certain embodiments, a controlled or staged in situ heating and production process is used to in situ heat treat a hydrocarbon containing formation (for example, an oil shale formation). The staged in situ heating and production process may use less energy input to produce hydrocarbons from the formation than a continuous or batch in situ heat treatment process. In some embodiments, the staged in situ heating and production process is about 30% more efficient in treating the formation than the continuous or batch in situ heat treatment process. The staged in situ heating and production process may also produce less carbon dioxide emissions than a continuous or batch in situ heat treatment process. In certain embodiments, the staged in situ heating and production process is used to treat rich layers in the oil shale formation. Treating only the rich layers may be more economical than treating both rich layers and lean layers because heat may be wasted heating the lean layers.

Figure 129:
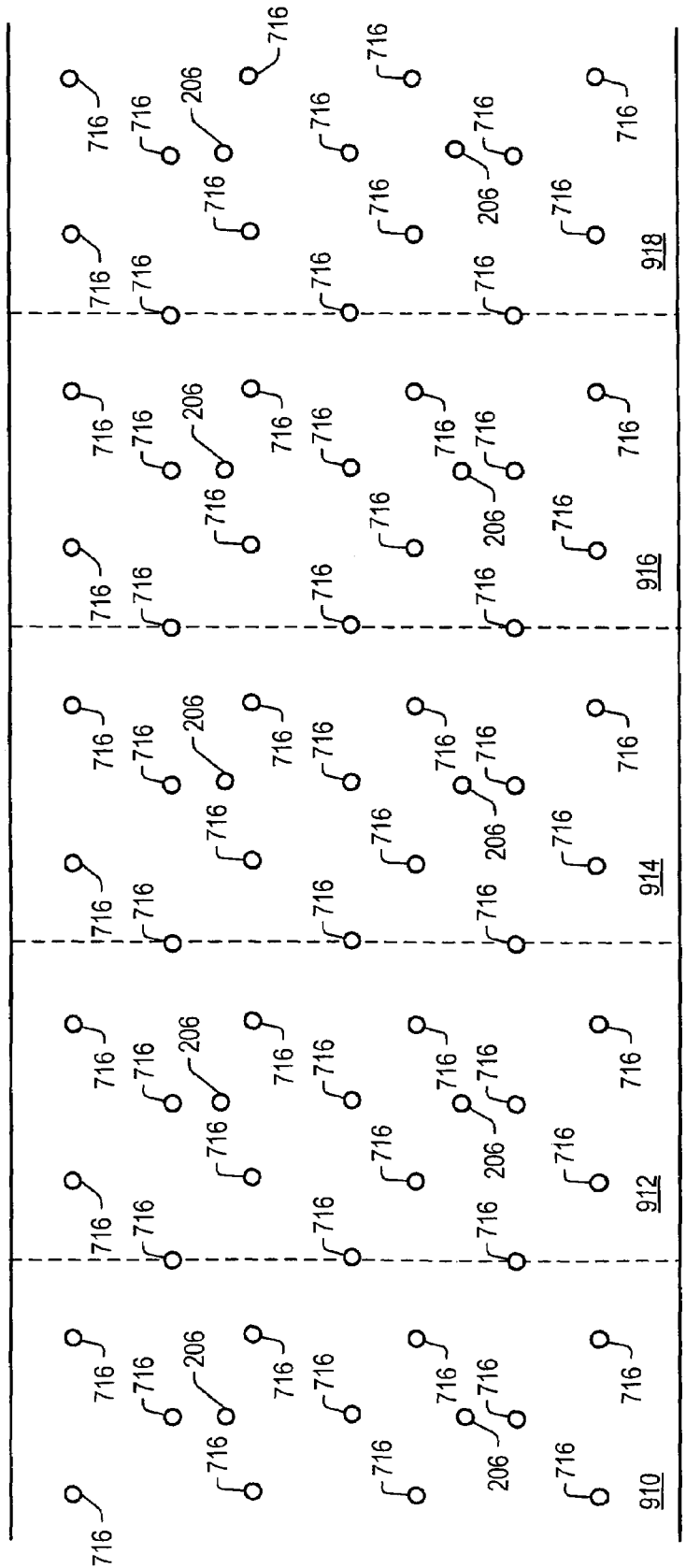

FIG. 129 depicts a top view representation of an embodiment for the staged in situ heating and producing process for treating the formation. In certain embodiments, heaters 716 are arranged in triangular patterns. In other embodiments, heaters 716 are arranged in any other regular or irregular patterns. The heater patterns may be divided into one or more sections 910, 912, 914, 916, and/or 918. The number of heaters 716 in each section may vary depending on, for example, properties of the formation or a desired heating rate for the formation. One or more production wells 206 may be located in each section 910, 912, 914, 916, and/or 918. In certain embodiments, production wells 206 are located at or near the centers of the sections. In some embodiments, production wells 206 are in other portions of sections 910, 912, 914, 916, and 918. Production wells 206 may be located at other locations in sections 910, 912, 914, 916, and/or 918 depending on, for example, a desired quality of products produced from the sections and/or a desired production rate from the formation.

In certain embodiments, heaters 716 in one of the sections are turned on while the heaters in other sections remain turned off. For example, heaters 716 in section 910 may be turned on while the heaters in the other sections are left turned off. Heat from heaters 716 in section 910 may create permeability, mobilize fluids, and/or pyrolysis fluids in section 910. While heat is being provided by heaters 716 in section 910, production well 206 in section 912 may be opened to produce fluids from the formation. Some heat from heaters 716 in section 910 may transfer to section 912 and "pre-heat" section 912. The pre-heating of section 912 may create permeability in section 912, mobilize fluids in section 912, and allow fluids to be produced from the section through production well 206. As fluids are produced from section 912, the movement of fluids from section 910 to section 912 transfers heat between the sections. The movement of the hot fluids through the formation increases heat transfer within the formation. Allowing hot fluids to flow between the sections uses the energy of the hot fluids for heating of unheated sections rather than removing the heat from the formation by producing the hot fluids directly from section 910. Thus, the movement of the hot fluids allows for less energy input to get production from the formation than is required if heat is provided from heaters 716 in both sections to get production from the sections.

In some embodiments, section 910 and/or section 912 may be treated prior to turning on heaters 716 to increase the permeability in the sections. For example, the sections may be dewatered to increase the permeability in the sections. In some embodiments, steam injection or other fluid injection may be used to increase the permeability in the sections.

In certain embodiments, after a selected time, heaters 716 in section 912 are turned on. Turning on heaters 716 in section 912 may provide additional heat to sections 910 and 912 to increase the permeability, mobility, and/or pyrolysis of fluids in these sections. In some embodiments, as heaters 716 in section 912 are turned on, production in section 912 is turned off (shut down) and production well 206 in section 914 is opened to produce fluids from the formation. Thus, fluid flow in the formation towards production well 206 in section 914 and section 914 is heated by the flow of hot fluids as described above for section 912. In some embodiments, production well 206 in section 912 may be left open after the heaters are turned on in the section, if desired. This process may be repeated for subsequent sections in the formation. For example, after a selected time, heaters in section 914 may be turned on and fluids produced from production well 206 in section 916 and so on through the formation.

In some embodiments, heat is provided by heaters 716 in alternating sections (for example, sections 910, 914, and 918) while fluids are produced from the sections in between the heated sections (for example, sections 912 and 916). After a selected time, heaters 716 in the unheated sections (sections 912 and 916) are turned on and fluids are produced from one or more of the sections as desired.

In certain embodiments, a smaller heater spacing is used in the staged in situ heating and producing process than in the continuous or batch in situ heat treatment processes. For example, the continuous or batch in situ heat treatment process may use a heater spacing of about 12 m while the in situ staged heating and producing process uses a heater spacing of about 10 m. The staged in situ heating and producing process may use the smaller heater spacing because the staged process allows for relatively rapid heating of the formation and expansion of the formation.

In some embodiments, the sequence of heated sections begins with the outermost sections and moves inwards. For example, for a selected time, heat may be provided by heaters 716 in sections 910 and 918 as fluids are produced from sections 912 and 916. After the selected time, heaters 716 in sections 912 and 916 may be turned on and fluids are produced from section 914. After another selected amount of time, heaters 716 in section 914 may be turned on, if needed.

In certain embodiments, sections 910-918 are substantially equal sized sections. The size and/or location of sections 910-918 may vary based on desired heating and/or production from the formation. For example, simulation of the staged in situ heating and production process treatment of the formation may be used to determine the number of heaters in each section, the optimum pattern of sections and/or the sequence for heater power up and production well startup for the staged in situ heating and production process. The simulation may account for properties such as, but not limited to, formation properties and desired properties and/or quality in the produced fluids. In some embodiments, heaters 716 at the edges of the treated portions of the formation (for example, heaters 716 at the left edge of section 910 or the right edge of section 918) may have tailored or adjusted heat outputs to produce desired heat treatment of the formation.

Figure 130:
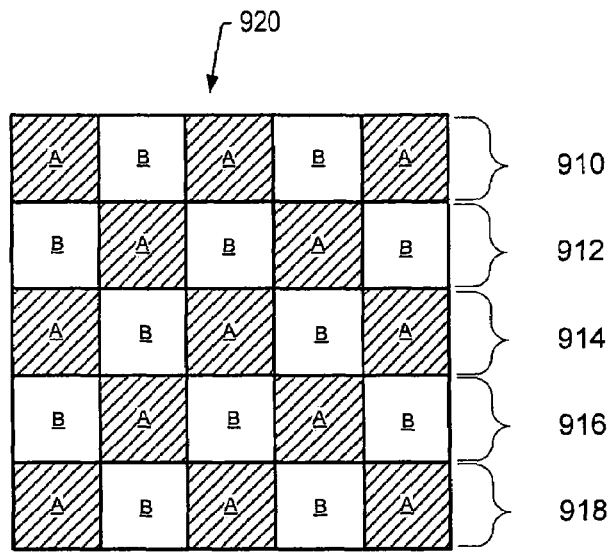

In some embodiments, the formation is sectioned into a checkerboard pattern for the staged in situ heating and production process. FIG. 130 depicts a top view of rectangular checkerboard pattern 920 embodiment for the staged in situ heating and production process. In some embodiments, heaters in the "A" sections (sections 910A, 912A, 914A, 916A, and 918A) may be turned on and fluids are produced from the "B" sections (sections 910B, 912B, 914B, 916B, and 918B). After the selected time, heaters in the "B" sections may be turned on. The size and/or number of "A" and "B" sections in rectangular checkerboard pattern 920 may be varied depending on factors such as, but not limited to, heater spacing, desired heating rate of the formation, desired production rate, size of treatment area, subsurface geomechanical properties, subsurface composition, and/or other formation properties.

In some embodiments, heaters in sections 910A are turned on and fluids are produced from sections 910B and/or sections 912B. After the selected time, heaters in sections 912A may be turned on and fluids are produced from sections 912B and/or 914B. After another selected time, heaters in sections 914A may be turned on and fluids are produced from sections 914B and/or 916B. After another selected time, heaters in sections 916A may be turned on and fluids are produced from sections 916B and/or 918B. In some embodiments, heaters in a "B" section that has been produced from may be turned on when heaters in the subsequent "A" section are turned on. For example, heaters in section 910B may be turned on when the heaters in section 912A are turned on. Other alternating heater startup and production sequences may also be contemplated for the in situ staged heating and production process embodiment depicted in FIG. 130.

Figure 131:
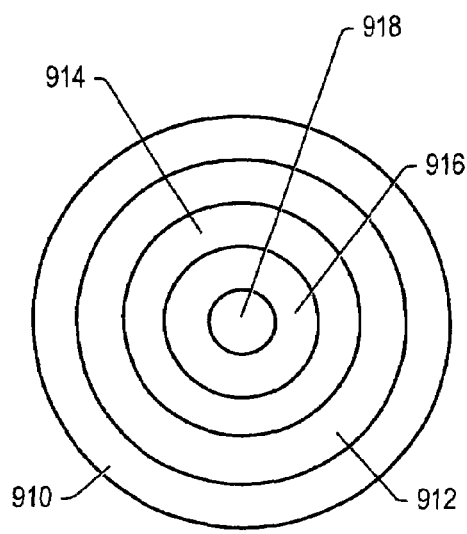

In some embodiments, the formation is divided into a circular, ring, or spiral pattern for the staged in situ heating and production process. FIG. 131 depicts a top view of the ring pattern embodiment for the staged in situ heating and production process. Sections 910, 912, 914, 916, and 918 may be treated with heater startup and production sequences similar to the sequences described above for the embodiments depicted in FIG. 129. The heater startup and production sequences for the embodiment depicted in FIG. 131 may start with section 910 (going inwards towards the center) or with section 918 (going outwards from the center). Starting with section 910 may allow expansion of the formation as heating moves towards the center of the ring pattern. Shearing of the formation may be minimized or inhibited because the formation is allowed to expand into heated and/or pyrolyzed portions of the formation. In some embodiments, the center section (section 918) is cooled after treatment.

Figure 132:
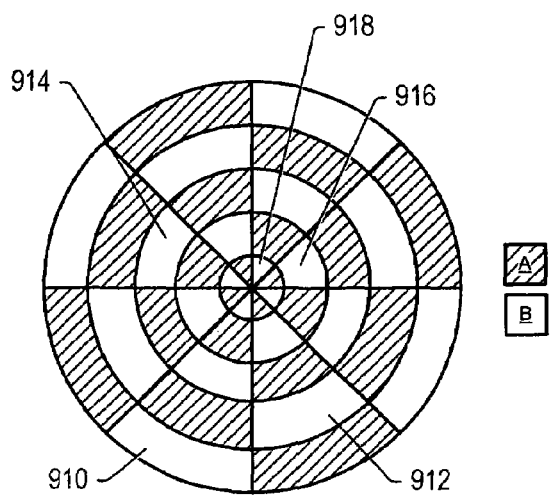

FIG. 132 depicts a top view of a checkerboard ring pattern embodiment for the staged in situ heating and production process. The embodiment depicted in FIG. 132 divides the ring pattern embodiment depicted in 131 into a checkerboard pattern similar to the checkerboard pattern depicted in FIG. 130. Sections 910A, 912A, 914A, 916A, 918A, 910B, 912B, 914B, 916B, and 918B, depicted in 132, may be treated with heater startup and production sequences similar to the sequences described above for the embodiment depicted in 130.

In some embodiments, fluids are injected to drive fluids between sections of the formation. Injecting fluids such as steam or carbon dioxide may increase the mobility of hydrocarbons and may increase the efficiency of the staged in situ heating and production process. In some embodiments, fluids are injected into the formation after the in situ heat treatment process to recover heat from the formation. In some embodiments, the fluids injected into the formation for heat recovery include some fluids produced from the formation (for example, carbon dioxide, water, and/or hydrocarbons produced from the formation). In some embodiments, the embodiments depicted in FIGS. 129-132 are used for in situ solution mining of the formation. Hot water or another fluid may be used to get permeability in the formation at low temperatures for solution mining.

Figure 133:
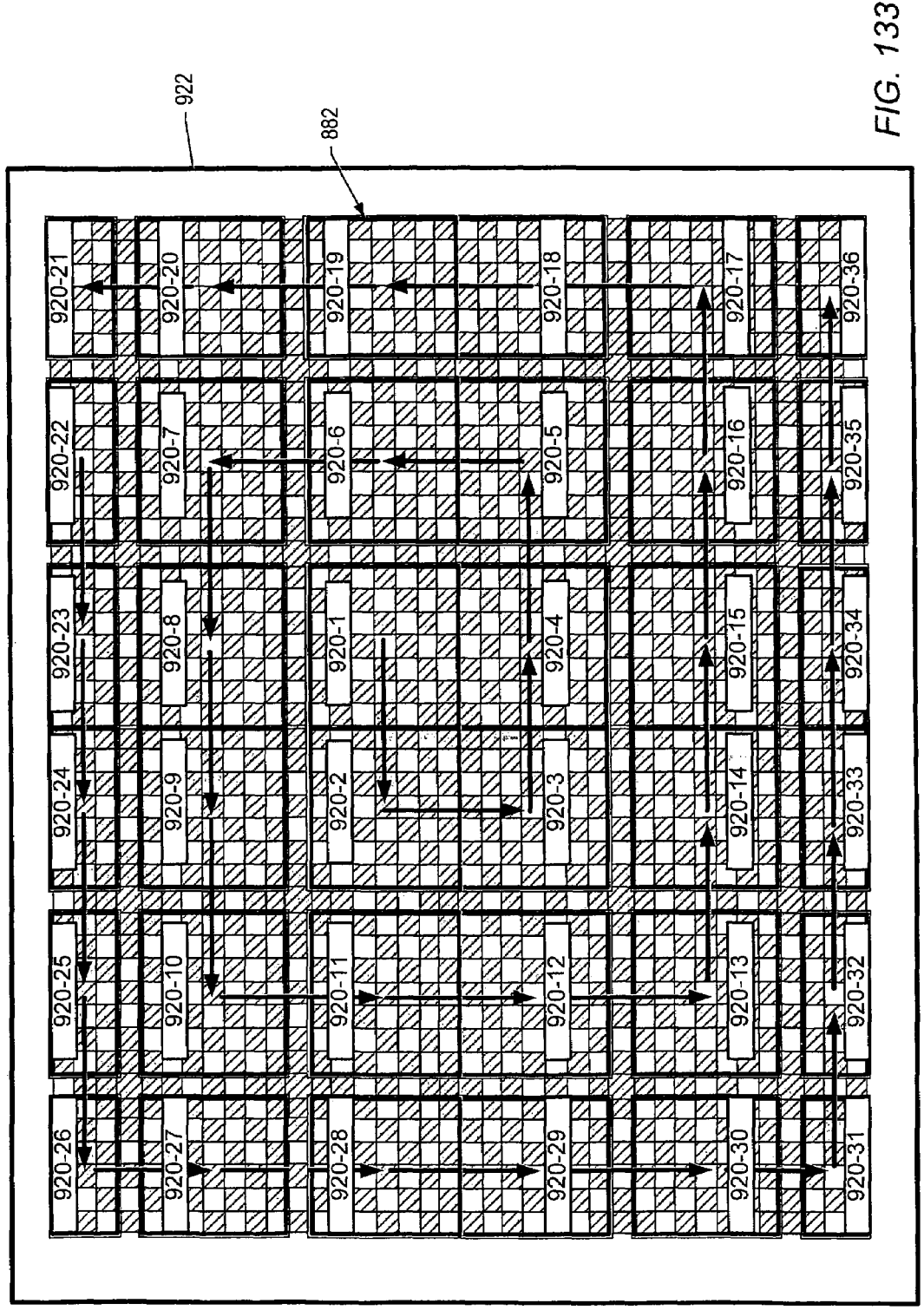

In certain embodiments, several rectangular checkerboard patterns (for example, rectangular checkerboard pattern 920 depicted in FIG. 130) are used to treat a treatment area of the formation. FIG. 133 depicts a top view of a plurality of rectangular checkerboard patterns 920(1-36) in treatment area 882 for the staged in situ heating and production process. Treatment area 882 may be enclosed by barrier 922. Each of rectangular checkerboard patterns 920(1-36) may individually be treated according to embodiments described above for the rectangular checkerboard patterns.

In certain embodiments, the startup of treatment of rectangular checkerboard patterns 920(1-36) proceeds in a sequential process. The sequential process may include starting the treatment of each of the rectangular checkerboard patterns one by one sequentially. For example, treatment of a second rectangular checkerboard pattern (for example, the onset of heating of the second rectangular checkerboard pattern) may be started after treatment of a first rectangular checkerboard pattern and so on. The startup of treatment of the second rectangular checkerboard pattern may be at any point in time after the treatment of the first rectangular checkerboard pattern has begun. The time selected for startup of treatment of the second rectangular checkerboard pattern may be varied depending on factors such as, but not limited to, desired heating rate of the formation, desired production rate, subsurface geomechanical properties, subsurface composition, and/or other formation properties. In some embodiments, the startup of treatment of the second rectangular checkerboard pattern begins after a selected amount of fluids have been produced from the first rectangular checkerboard pattern area or after the production rate from the first rectangular checkerboard pattern increases above a selected value or falls below a selected value.

In some embodiments, the startup sequence for rectangular checkerboard patterns 920(1-36) is arranged to minimize or inhibit expansion stresses in the formation. In an embodiment, the startup sequence of the rectangular checkerboard patterns proceeds in an outward spiral sequence, as shown by the arrows in FIG. 133. The outward spiral sequence proceeds sequentially beginning with treatment of rectangular checkerboard pattern 920-1, followed by treatment of rectangular checkerboard pattern 920-2, rectangular checkerboard pattern 920-3, rectangular checkerboard pattern 920-4, and continuing the sequence up to rectangular checkerboard pattern 920-36. Sequentially starting the rectangular checkerboard patterns in the outwards spiral sequence may minimize or inhibit expansion stresses in the formation.

Starting treatment in rectangular checkerboard patterns at or near the center of treatment area 882 and moving outwards maximizes the starting distance from barrier 922. Barrier 922 may be most likely to fail when heat is provided at or near the barrier. Starting treatment/heating at or near the center of treatment area 882 delays heating of rectangular checkerboard patterns near barrier 922 until later times of heating in treatment area 882 or at or near the end of production from the treatment area. Thus, if barrier 922 does fail, the failure of the barrier occurs after a significant portion of treatment area 882 has been treated.

Starting treatment in rectangular checkerboard patterns at or near the center of treatment area 882 and moving outwards also creates open pore space in the inner portions of the outward moving startup pattern. The open pore space allows portions of the formation being started at later times to expand inwards into the open pore space and, for example, minimize shearing in the formation.

In some embodiments, support sections are left between one or more of rectangular checkerboard patterns 920(1-36). The support sections may be unheated sections that provide support against geomechanical shifting, shearing, and/or expansion stress in the formation. In some embodiments, some heat may be provided in the support sections. The heat provided in the support sections may be less than heat provided inside rectangular checkerboard patterns 920(1-36). In some embodiments, each of the support sections may include alternating heated and unheated sections. In some embodiments, fluids are produced from one or more of the unheated support sections.

In some embodiments, one or more of rectangular checkerboard patterns 920(1-36) have varying sizes. For example, the outer rectangular checkerboard patterns (such as rectangular checkerboard patterns 920(21-26) and rectangular checkerboard patterns 920(31-36)) may have smaller areas and/or numbers of checkerboards. Reducing the area and/or the number of checkerboards in the outer rectangular checkerboard patterns may reduce expansion stresses and/or geomechanical shifting in the outer portions of treatment area 882. Reducing the expansion stresses and/or geomechanical shifting in the outer portions of treatment area 882 may minimize or inhibit expansion stress and/or shifting stress on barrier 922.

During an in situ heat treatment process, some formation fluid may migrate outwards from the treatment area. The formation fluid may include benzene and other contaminants. Some portions of the formation that contaminants migrate to will be subsequently treated when a new treatment area is defined and processed using the in situ heat treatment process. Such contaminants may be removed or destroyed by the subsequent in situ heat treatment process. Some areas of the formation to which contaminants migrate may not be become part of a new treatment area subjected to in situ heat treatment. Migration inhibition systems may be implemented to inhibit contaminants from migrating to areas in the formation that are not to be subjected to in situ heat treatment.

In some embodiments, a barrier (for example, a low temperature zone or freeze barrier) surrounds at least a portion of the perimeter of a treatment area. The barrier may be 20 m to 100 m from the closest heaters in the treatment area used in the in situ heat treatment process to heat the formation. Some contaminants may migrate outwards toward the barrier through fractures or highly permeable zones and condense in the formation.

Figure 134:
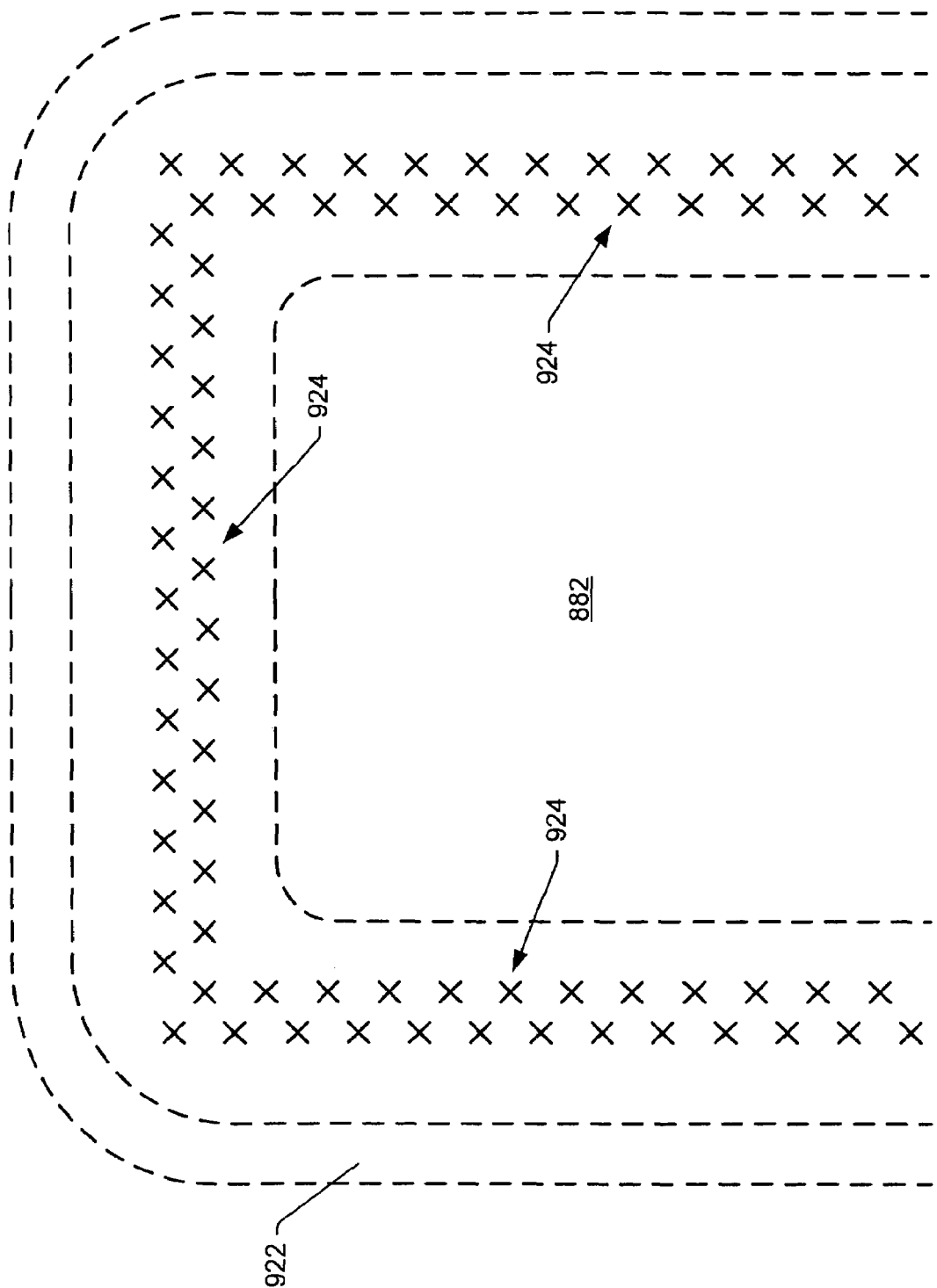

In some in situ heat treatment embodiments, a migration inhibition system may be used to minimize or eliminate migration of formation fluid from the treatment area of the in situ heat treatment process. FIG. 134 depicts a representation of a fluid migration inhibition system. Barrier 922 may surround treatment area 882. Migration inhibition wells 924 may be placed in the formation between barrier 922 and treatment area 882. Migration inhibition wells 924 may be offset from wells used to heat the formation and/or from production wells used to produce fluid from the formation. Migration inhibition wells 924 may be placed in formation that is below pyrolysis and/or dissociation temperatures of minerals in the formation.

In some embodiments, one or more of the migration inhibition wells 924 include heaters. The heaters may be used to heat portions of the formation adjacent to the wells to a relatively low temperature. The relatively low temperature may be a temperature below a dissociation temperature of minerals in the formation adjacent to the well or below a pyrolysis temperature of hydrocarbons in the formation. The temperature that the low temperature heater wells raise the formation to may be less than 260° C., less than 230° C., or less than 200° C. In some embodiments, heating elements in low temperature wells 924 may be tailored so that the heating elements only heat portions of the formation that have permeability sufficient to allow for the migration of fluid (for example, fracture systems).

Some or all migration inhibition wells 924 may be injector wells that allow for the introduction of a sweep fluid into the formation. The injector wells may include smart well technology. Sweep fluid may be introduced into the formation through critical orifices, perforations or other types of openings in the injector wells. In some embodiments, the sweep fluid is carbon dioxide. The carbon dioxide may be carbon dioxide produced from an in situ heat treatment process. The sweep fluid may be or include other fluids, such as nitrogen, methane or other non-condensable hydrocarbons, exhaust gases, air, and/or steam. The sweep fluid may provide positive pressure in the formation outside of treatment area 882. The positive pressure may inhibit migration of formation fluid from treatment area 882 towards barrier 922. The sweep fluid may move through fractures in the formation toward or into treatment area 882. The sweep fluid may carry fluids that have migrated away from treatment area 882 back to the treatment area. The pressure of the fluid introduced through migration inhibition wells 924 may be maintained below the fracture pressure of the formation.

Alternative energy sources may be used to supply electricity for subsurface electric heaters. Alternative energy sources include, but are not limited to, wind, off-peak power, hydroelectric power, geothermal, solar, and tidal wave action. Some of these alternative energy sources provide intermittent, time-variable power, or power-variable power. To provide power for subsurface electric heaters, power provided by these alternative energy sources may be conditioned to produce power with appropriate operating parameters (for example, voltage, frequency, and/or current) for the subsurface heaters.

Figure 135:
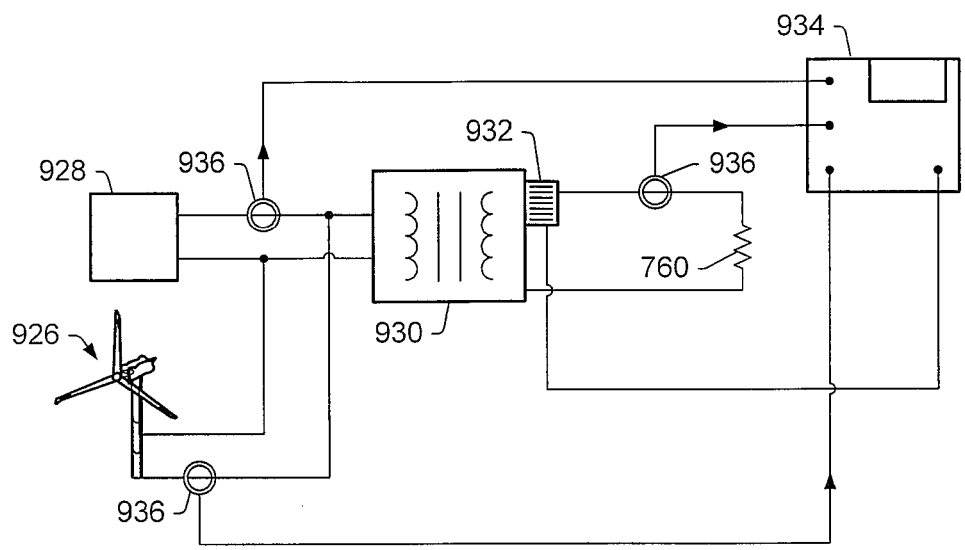

FIG. 135 illustrates a schematic of an embodiment using wind to generate electricity for subsurface heaters. The generated electrical power may be used to power other equipment used to treat a subsurface formation such as, but not limited to, pumps, computers, or other electrical equipment. In certain embodiments, windmill 926 is used to generate electricity to power heaters 760. Windmill 926 may represent one or more windmills in a wind farm. The windmills convert wind to a usable mechanical form of motion. In some embodiments, the wind farm may include advanced windmills as suggested by the National Renewable Energy Laboratory (Golden, Colo., U.S.A.). In some embodiments, windmill 926 includes other intermittent, time-variable, or power-variable power sources.

In some embodiments, gas turbine 928 is used to generate electricity to power heaters 760. Windmill 926 and/or gas turbine 928 may be coupled to transformer 930. Transformer 930 may convert power from windmill 926 and/or gas turbine 928 into electrical power with appropriate operating parameters for heaters 760 (for example, AC or DC power with appropriate voltage, current, and/or frequency may be generated by the transformer).

In certain embodiments, tap controller 932 is coupled to transformer 930, control system 934 and heaters 760. Tap controller 932 may monitor and control transformer 930 to maintain a constant voltage to heaters 760, regardless of the load of the heaters. Tap controller 932 may control power output in a range from 5 MVA (megavolt amps) to 500 MVA, from 10 MVA to 400 MVA, or from 20 MVA to 300 MVA. As an example, during operation, an overload of voltage may be sent from transformer 930. Tap controller 932 may distribute the excess load to other heaters and/or other equipment in need of power. In some embodiments, tap controller 932 may store the excess load for future use.

Control system 934 may control tap controller 932. Control system 934 may be, for example, a computer controller or an analog logic system. Control system 934 may use data supplied from power sensors 936 to generate predictive algorithms and/or control tap controller 932. For example, data may be an amount of power generated from windmill 926, gas turbine 928, and/or transformer 930. Data may also include an amount of resistive load of heaters 760.

Automatic voltage regulation for resistive load of a heater maintains the life of the heaters and/or allows constant heat output from the heaters to a subsurface formation. Adjusting the load demands instead of adjusting the power source allows enhanced control of power supplied to heaters and/or other equipment that requires electricity. Power supplied to heaters 760 may be controlled within selected limits (for example, a power supplied and/or controlled to a heater within 1%, 5%, 10%, or 20% of power required by the heater). Control of power supplied from alternative energy sources may allow output of prime power at its rating, allow energy produced (for example, from an intermittent source, a subsurface formation, or a hydroelectric source) to be stored and used later, and/or allow use of power generated by intermittent power sources to be used as a constant source of energy.

Some hydrocarbon containing formations, such as oil shale formations, may include nahcolite, trona, dawsonite, and/or other minerals within the formation. In some embodiments, nahcolite is contained in partially unleached or unleached portions of the formation. Unleached portions of the formation are parts of the formation where minerals have not been removed by groundwater in the formation. For example, in the Piceance basin in Colorado, U.S.A., unleached oil shale is found below a depth of about 500 m below grade. Deep unleached oil shale formations in the Piceance basin center tend to be relatively rich in hydrocarbons. For example, about 0.10 liters to about 0.15 liters of oil per kilogram (L/kg) of oil shale may be producible from an unleached oil shale formation.

Nahcolite is a mineral that includes sodium bicarbonate ($NaHCO_3$). Nahcolite may be found in formations in the Green River lakebeds in Colorado, U.S.A. In some embodiments, at least about 5 weight %, at least about 10 weight %, or at least about 20 weight % nahcolite may be present in the formation. Dawsonite is a mineral that includes sodium aluminum carbonate ($NaAl(CO_3)(OH)_2$). Dawsonite is typically present in the formation at weight percents greater than about 2 weight % or, in some embodiments, greater than about 5 weight %. Nahcolite and/or dawsonite may dissociate at temperatures used in an in situ heat treatment process. The dissociation is strongly endothermic and may produce large amounts of carbon dioxide.

Nahcolite and/or dawsonite may be solution mined prior to, during, and/or following treatment of the formation in situ to avoid dissociation reactions and/or to obtain desired chemical compounds. In certain embodiments, hot water or steam is used to dissolve nahcolite in situ to form an aqueous sodium bicarbonate solution before the in situ heat treatment process is used to process hydrocarbons in the formation. Nahcolite may form sodium ions ($Na^+$) and bicarbonate ions ($HCO_3^-$) in aqueous solution. The solution may be produced from the formation through production wells, thus avoiding dissociation reactions during the in situ heat treatment process. In some embodiments, dawsonite is thermally decomposed to alumina during the in situ heat treatment process for treating hydrocarbons in the formation. The alumina is solution mined after completion of the in situ heat treatment process.

Production wells and/or injection wells used for solution mining and/or for in situ heat treatment processes may include smart well technology. The smart well technology allows the first fluid to be introduced at a desired zone in the formation. The smart well technology allows the second fluid to be removed from a desired zone of the formation.

Formations that include nahcolite and/or dawsonite may be treated using the in situ heat treatment process. A perimeter barrier may be formed around the portion of the formation to be treated. The perimeter barrier may inhibit migration of water into the treatment area. During solution mining and/or the in situ heat treatment process, the perimeter barrier may inhibit migration of dissolved minerals and formation fluid from the treatment area. During initial heating, a portion of the formation to be treated may be raised to a temperature below the dissociation temperature of the nahcolite. The temperature may be at most about 90° C., or in some embodiments, at most about 80° C. The temperature may be any temperature that increases the solvation rate of nahcolite in water, but is also below a temperature at which nahcolite dissociates (above about 95° C. at atmospheric pressure).

A first fluid may be injected into the heated portion. The first fluid may include water, brine, steam, or other fluids that form a solution with nahcolite and/or dawsonite. The first fluid may be at an increased temperature, for example, about 90° C., about 95° C., or about 100° C. The increased temperature may be similar to the temperature of the portion of the formation.

In some embodiments, the first fluid is injected at an increased temperature into a portion of the formation that has not been heated by heat sources. The increased temperature may be a temperature below a boiling point of the first fluid, for example, about 90° C. for water. Providing the first fluid at an increased temperature increases a temperature of a portion of the formation. In certain embodiments, additional heat may be provided from one or more heat sources in the formation during and/or after injection of the first fluid.

In other embodiments, the first fluid is or includes steam. The steam may be produced by forming steam in a previously heated portion of the formation (for example, by passing water through u-shaped wellbores that have been used to heat the formation), by heat exchange with fluids produced from the formation, and/or by generating steam in standard steam production facilities. In some embodiments, the first fluid may be fluid introduced directly into a hot portion of the portion and produced from the hot portion of the formation. The first fluid may then be used as the first fluid for solution mining.

In some embodiments, heat from a hot previously treated portion of the formation is used to heat water, brine, and/or steam used for solution mining a new portion of the formation. Heat transfer fluid may be introduced into the hot previously treated portion of the formation. The heat transfer fluid may be water, steam, carbon dioxide, and/or other fluids. Heat may transfer from the hot formation to the heat transfer fluid. The heat transfer fluid is produced from the formation through production wells. The heat transfer fluid is sent to a heat exchanger. The heat exchanger may heat water, brine, and/or steam used as the first fluid to solution mine the new portion of the formation. The heat transfer fluid may be reintroduced into the heated portion of the formation to produce additional hot heat transfer fluid. In some embodiments, heat transfer fluid produced from the formation is treated to remove hydrocarbons or other materials before being reintroduced into the formation as part of a remediation process for the heated portion of the formation.

Steam injected for solution mining may have a temperature below the pyrolysis temperature of hydrocarbons in the formation. Injected steam may be at a temperature below 250° C., below 300° C., or below 400° C. The injected steam may be at a temperature of at least 150° C., at least 135° C., or at least 125° C. Injecting steam at pyrolysis temperatures may cause problems as hydrocarbons pyrolyze and hydrocarbon fines mix with the steam. The mixture of fines and steam may reduce permeability and/or cause plugging of production wells and the formation. Thus, the injected steam temperature is selected to inhibit plugging of the formation and/or wells in the formation.

The temperature of the first fluid may be varied during the solution mining process. As the solution mining progresses and the nahcolite being solution mined is farther away from the injection point, the first fluid temperature may be increased so that steam and/or water that reaches the nahcolite to be solution mined is at an elevated temperature below the dissociation temperature of the nahcolite. The steam and/or water that reaches the nahcolite is also at a temperature below a temperature that promotes plugging of the formation and/or wells in the formation (for example, the pyrolysis temperature of hydrocarbons in the formation).

A second fluid may be produced from the formation following injection of the first fluid into the formation. The second fluid may include material dissolved in the first fluid. For example, the second fluid may include carbonic acid or other hydrated carbonate compounds formed from the dissolution of nahcolite in the first fluid. The second fluid may also include minerals and/or metals. The minerals and/or metals may include sodium, aluminum, phosphorus, and other elements.

Solution mining the formation before the in situ heat treatment process allows initial heating of the formation to be provided by heat transfer from the first fluid used during solution mining. Solution mining nahcolite or other minerals that decompose or dissociate by means of endothermic reactions before the in situ heat treatment process avoids having energy supplied to heat the formation being used to support these endothermic reactions. Solution mining allows for production of minerals with commercial value. Removing nahcolite or other minerals before the in situ heat treatment process removes mass from the formation. Thus, less mass is present in the formation that needs to be heated to higher temperatures and heating the formation to higher temperatures may be achieved more quickly and/or more efficiently. Removing mass from the formation also may increase the permeability of the formation. Increasing the permeability may reduce the number of production wells needed for the in situ heat treatment process. In certain embodiments, solution mining before the in situ heat treatment process reduces the time delay between startup of heating of the formation and production of hydrocarbons by two years or more.

Figure 136:
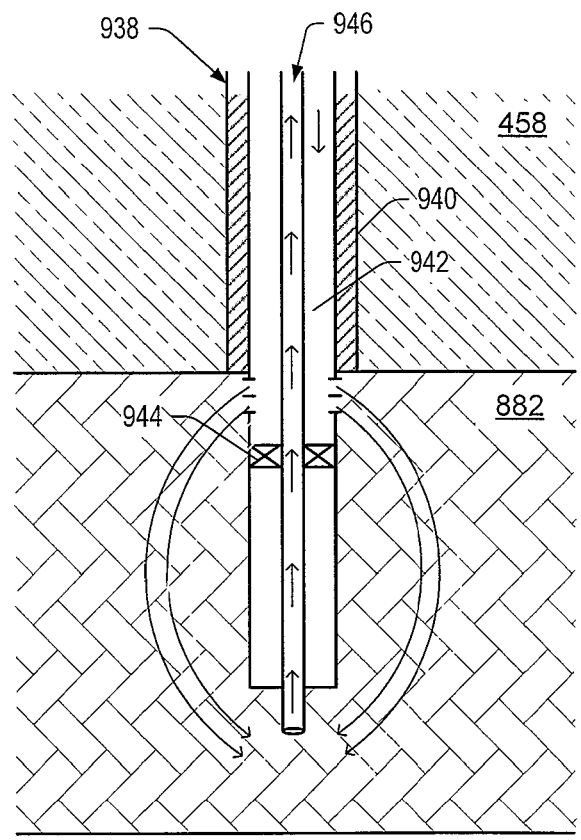

FIG. 136 depicts an embodiment of solution mining well 938. Solution mining well 938 may include insulated portion 940, input 942, packer 944, and return 946. Insulated portion 940 may be adjacent to overburden 458 of the formation. In some embodiments, insulated portion 940 is low conductivity cement. The cement may be low density, low conductivity vermiculite cement or foam cement. Input 942 may direct the first fluid to treatment area 882. Perforations or other types of openings in input 942 allow the first fluid to contact formation material in treatment area 882. Packer 944 may be a bottom seal for input 942. First fluid passes through input 942 into the formation. First fluid dissolves minerals and becomes second fluid. The second fluid may be denser than the first fluid. An entrance into return 946 is typically located below the perforations or openings that allow the first fluid to enter the formation. Second fluid flows to return 946. The second fluid is removed from the formation through return 946.

Figure 137:
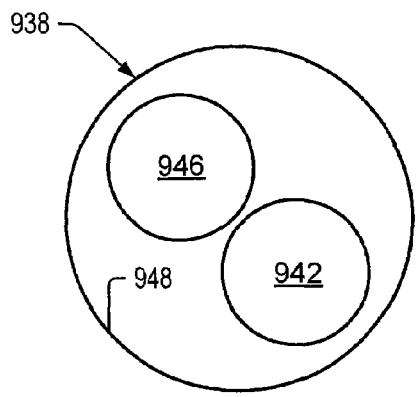

FIG. 137 depicts a representation of an embodiment of solution mining well 938. Solution mining well 938 may include input 942 and return 946 in casing 948. Inlet 942 and/or return 946 may be coiled tubing.

Figure 138:
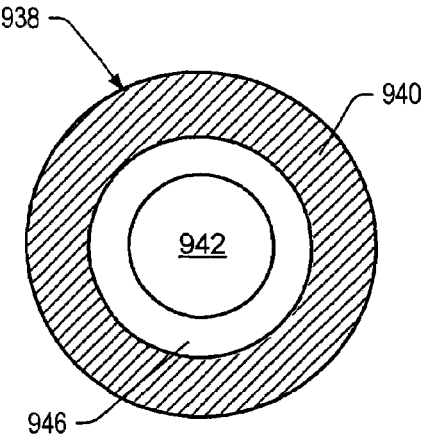

FIG. 138 depicts a representation of an embodiment of solution mining well 938. Insulating portions 940 may surround return 946. Input 942 may be positioned in return 946. In some embodiments, input 942 may introduce the first fluid into the treatment area below the entry point into return 946. In some embodiments, crossovers may be used to direct first fluid flow and second fluid flow so that first fluid is introduced into the formation from input 942 above the entry point of second fluid into return 946.

FIG. 139 depicts an elevational view of an embodiment of wells used for solution mining and/or for an in situ heat treatment process. Solution mining wells 938 may be placed in the formation in an equilateral triangle pattern. In some embodiments, the spacing between solution mining wells 938 may be about 36 m. Other spacings may be used. Heat sources 202 may also be placed in an equilateral triangle pattern. Solution mining wells 938 substitute for certain heat sources of the pattern. In the shown embodiment, the spacing between heat sources 202 is about 9 m. The ratio of solution mining well spacing to heat source spacing is 4. Other ratios may be used if desired. After solution mining is complete, solution mining wells 938 may be used as production wells for the in situ heat treatment process.

In some formations, a portion of the formation with unleached minerals may be below a leached portion of the formation. The unleached portion may be thick and substantially impermeable. A treatment area may be formed in the unleached portion. Unleached portion of the formation to the sides, above and/or below the treatment area may be used as barriers to fluid flow into and out of the treatment area. A first treatment area may be solution mined to remove minerals, increase permeability in the treatment area, and/or increase the richness of the hydrocarbons in the treatment area. After solution mining the first treatment area, in situ heat treatment may be used to treat a second treatment area. In some embodiments, the second treatment area is the same as the first treatment area. In some embodiments, the second treatment area has a smaller volume than the first treatment area so that heat provided by outermost heat sources to the formation do not raise the temperature of unleached portions of the formation to the dissociation temperature of the minerals in the unleached portions.

In some embodiments, a leached or partially leached portion of the formation above an unleached portion of the formation may include significant amounts of hydrocarbon materials. An in situ heating process may be used to produce hydrocarbon fluids from the unleached portions and the leached or partially leached portions of the formation. FIG. 140 depicts a representation of a formation with unleached zone 950 below leached zone 952. Unleached zone 950 may have an initial permeability before solution mining of less than 0.1 millidarcy. Solution mining wells 938 may be placed in the formation. Solution mining wells 938 may include smart well technology that allows the position of first fluid entrance into the formation and second flow entrance into the solution mining wells to be changed. Solution mining wells 938 may be used to form first treatment areas 882' in unleached zone 950. Unleached zone 950 may initially be substantially impermeable. Unleached portions of the formation may form a top barrier and side barriers around first treatment area 882'. After solution mining first treatment area 882', the portions of solution mining wells 938 adjacent to the first treatment area may be converted to production wells and/or heater wells.

Heat sources 202 in first treatment area 882' may be used to heat the first treatment area to pyrolysis temperatures. In some embodiments, one or more heat sources 202 are placed in the formation before first treatment area 882' is solution mined. The heat sources may be used to provide initial heating to the formation to raise the temperature of the formation and/or to test the functionality of the heat sources. In some embodiments, one or more heat sources are installed during solution mining of the first treatment area, or after solution mining is completed. After solution mining, heat sources 202 may be used to raise the temperature of at least a portion of first treatment area 882' above the pyrolysis and/or mobilization temperature of hydrocarbons in the formation to result in the generation of mobile hydrocarbons in the first treatment area.

Barrier wells 200 may be introduced into the formation. Ends of barrier wells 200 may extend into and terminate in unleached zone 950. Unleached zone 950 may be impermeable. In some embodiments, barrier wells 200 are freeze wells. Barrier wells 200 may be used to form a barrier to fluid flow into or out of unleached zone 952. Barrier wells 200, overburden 458, and the unleached material above first treatment area 882' may define second treatment area 882". In some embodiments, a first fluid may be introduced into second treatment area 882" through solution mining wells 938 to raise the initial temperature of the formation in second treatment area 882" and remove any residual soluble minerals from the second treatment area. In some embodiments, the top barrier above first treatment area 882' may be solution mined to remove minerals and combine first treatment area 882' and second treatment area 882" into one treatment area. After solution mining, heat sources may be activated to heat the treatment area to pyrolysis temperatures.

FIG. 141 depicts an embodiment for solution mining the formation. Barrier 922 (for example, a frozen barrier and/or a grout barrier) may be formed around a perimeter of treatment area 882 of the formation. The footprint defined by the barrier may have any desired shape such as circular, square, rectangular, polygonal, or irregular shape. Barrier 922 may be any barrier formed to inhibit the flow of fluid into or out of treatment area 882. For example, barrier 922 may include one or more freeze wells that inhibit water flow through the barrier. Barrier 922 may be formed using one or more barrier wells 200. Formation of barrier 922 may be monitored using monitor wells 956 and/or by monitoring devices placed in barrier wells 200.

Water inside treatment area 882 may be pumped out of the treatment area through injection wells 748 and/or production wells 206. In certain embodiments, injection wells 748 are used as production wells 206 and vice versa (the wells are used as both injection wells and production wells). Water may be pumped out until a production rate of water is low or stops.

Heat may be provided to treatment area 882 from heat sources 202. Heat sources may be operated at temperatures that do not result in the pyrolysis of hydrocarbons in the formation adjacent to the heat sources. In some embodiments, treatment area 882 is heated to a temperature from about 90° C. to about 120° C. (for example, a temperature of about 90° C., 95° C., 100° C., 110° C., or 120° C.). In certain embodiments, heat is provided to treatment area 882 from the first fluid injected into the formation. The first fluid may be injected at a temperature from about 90° C. to about 120° C. (for example, a temperature of about 90° C., 95° C., 100° C., 110° C., or 120° C.). In some embodiments, heat sources 202 are installed in treatment area 882 after the treatment area is solution mined. In some embodiments, some heat is provided from heaters placed in injection wells 748 and/or production wells 206. A temperature of treatment area 882 may be monitored using temperature measurement devices placed in monitoring wells 956 and/or temperature measurement devices in injection wells 748, production wells 206, and/or heat sources 202.

The first fluid is injected through one or more injection wells 748. In some embodiments, the first fluid is hot water. The first fluid may mix and/or combine with non-hydrocarbon material that is soluble in the first fluid, such as nahcolite, to produce a second fluid. The second fluid may be removed from the treatment area through injection wells 748, production wells 206, and/or heat sources 202. Injection wells 748, production wells 206, and/or heat sources 202 may be heated during removal of the second fluid. Heating one or more wells during removal of the second fluid may maintain the temperature of the fluid during removal of the fluid from the treatment area above a desired value. After producing a desired amount of the soluble non-hydrocarbon material from treatment area 882, solution remaining within the treatment area may be removed from the treatment area through injection wells 748, production wells 206, and/or heat sources 202. The desired amount of the soluble non-hydrocarbon material may be less than half of the soluble non-hydrocarbon material, a majority of the soluble non-hydrocarbon material, substantially all of the soluble non-hydrocarbon material, or all of the soluble non-hydrocarbon material. Removing soluble non-hydrocarbon material may produce a relatively high permeability treatment area 882.

Hydrocarbons within treatment area 882 may be pyrolyzed and/or produced using the in situ heat treatment process following removal of soluble non-hydrocarbon materials. The relatively high permeability treatment area allows for easy movement of hydrocarbon fluids in the formation during in situ heat treatment processing. The relatively high permeability treatment area provides an enhanced collection area for pyrolyzed and mobilized fluids in the formation. During the in situ heat treatment process, heat may be provided to treatment area 882 from heat sources 202. A mixture of hydrocarbons may be produced from the formation through production wells 206 and/or heat sources 202. In certain embodiments, injection wells 748 are used as either production wells and/or heater wells during the in situ heat treatment process.

In some embodiments, a controlled amount of oxidant (for example, air and/or oxygen) is provided to treatment area 882 at or near heat sources 202 when a temperature in the formation is above a temperature sufficient to support oxidation of hydrocarbons. At such a temperature, the oxidant reacts with the hydrocarbons to provide heat in addition to heat provided by electrical heaters in heat sources 202. The controlled amount of oxidant may facilitate oxidation of hydrocarbons in the formation to provide additional heat for pyrolyzing hydrocarbons in the formation. The oxidant may more easily flow through treatment area 882 because of the increased permeability of the treatment area after removal of the non-hydrocarbon materials. The oxidant may be provided in a controlled manner to control the heating of the formation. The amount of oxidant provided is controlled so that uncontrolled heating of the formation is avoided. Excess oxidant and combustion products may flow to production wells in treatment area 882.

Following the in situ heat treatment process, treatment area 882 may be cooled by introducing water to produce steam from the hot portion of the formation. Introduction of water to produce steam may vaporize some hydrocarbons remaining in the formation. Water may be injected through injection wells 748. The injected water may cool the formation. The remaining hydrocarbons and generated steam may be produced through production wells 206 and/or heat sources 202. Treatment area 882 may be cooled to a temperature near the boiling point of water. The steam produced from the formation may be used to heat a first fluid used to solution mine another portion of the formation.

Treatment area 882 may be further cooled to a temperature at which water will condense in the formation. Water and/or solvent may be introduced into and be removed from the treatment area. Removing the condensed water and/or solvent from treatment area 882 may remove any additional soluble material remaining in the treatment area. The water and/or solvent may entrain non-soluble fluid present in the formation. Fluid may be pumped out of treatment area 882 through production well 206 and/or heat sources 202. The injection and removal of water and/or solvent may be repeated until a desired water quality within treatment area 882 is achieved.

Water quality may be measured at injection wells 748, heat sources 202, and/or production wells 206. The water quality may substantially match or exceed the water quality of treatment area 882 prior to treatment.

In some embodiments, treatment area 882 may include a leached zone located above an unleached zone. The leached zone may have been leached naturally and/or by a separate leaching process. In certain embodiments, the unleached zone may be at a depth of at least about 500 m. A thickness of the unleached zone may be between about 100 m and about 500 m. However, the depth and thickness of the unleached zone may vary depending on, for example, a location of treatment area 882 and/or the type of formation. In certain embodiments, the first fluid is injected into the unleached zone below the leached zone. Heat may also be provided into the unleached zone.

In certain embodiments, a section of a formation may be left untreated by solution mining and/or unleached. The unleached section may be proximate a selected section of the formation that has been leached and/or solution mined by providing the first fluid as described above. The unleached section may inhibit the flow of water into the selected section. In some embodiments, more than one unleached section may be proximate a selected section.

Nahcolite may be present in the formation in layers or beds. Prior to solution mining, such layers may have little or no permeability. In certain embodiments, solution mining layered or bedded nahcolite from the formation causes vertical shifting in the formation. FIG. 142 depicts an embodiment of a formation with nahcolite layers in the formation below overburden 458 and before solution mining nahcolite from the formation. Hydrocarbon layers 460A have substantially no nahcolite and hydrocarbon layers 460B have nahcolite. FIG. 143 depicts the formation of FIG. 142 after the nahcolite has been solution mined. Layers 460B have collapsed due to the removal of the nahcolite from the layers. The collapsing of layers 460B causes compaction of the layers and vertical shifting of the formation. The hydrocarbon richness of layers 460B is increased after compaction of the layers. In addition, the permeability of layers 460B may remain relatively high after compaction due to removal of the nahcolite. The permeability may be more than 5 darcy, more than 1 darcy, or more than 0.5 darcy after vertical shifting. The permeability may provide fluid flow paths to production wells when the formation is treated using an in situ heat treatment process. The increased permeability may allow for a large spacing between production wells. Distances between production wells for the in situ heat treatment system after solution mining may be greater than 10 m, greater than 20 m, or greater than 30 meters. Heater wells may be placed in the formation after removal of nahcolite and the subsequent vertical shifting. Forming heater wellbores and/or installing heaters in the formation after the vertical shifting protects the heaters from being damaged due to the vertical shifting.

In certain embodiments, removing nahcolite from the formation interconnects two or more wells in the formation. Removing nahcolite from zones in the formation may increase the permeability in the zones. Some zones may have more nahcolite than others and become more permeable as the nahcolite is removed. At a certain time, zones with the increased permeability may interconnect two or more wells (for example, injection wells or production wells) in the formation.

FIG. 144 depicts an embodiment of two injection wells interconnected by a zone that has been solution mined to remove nahcolite from the zone. Solution mining wells 938 are used to solution mine hydrocarbon layer 460, which contains nahcolite. During the initial portion of the solution mining process, solution mining wells 938 are used to inject water and/or other fluids, and to produce dissolved nahcolite fluids from the formation. Each solution mining well 938 is used to inject water and produce fluid from a near wellbore region as the permeability of hydrocarbon layer is not sufficient to allow fluid to flow between the injection wells. In certain embodiments, zone 958 has more nahcolite than other portions of hydrocarbon layer 460. With increased nahcolite removal from zone 958, the permeability of the zone may increase. The permeability increases from the wellbores outwards as nahcolite is removed from zone 958. At some point during solution mining of the formation, the permeability of zone 958 increases to allow solution mining wells 938 to become interconnected such that fluid will flow between the wells. At this time, one solution mining well 938' may be used to inject water while the other solution mining well 938" is used to produce fluids from the formation in a continuous process. Injecting in one well and producing from a second well may be more economical and more efficient in removing nahcolite, as compared to injecting and producing through the same well. In some embodiments, additional wells may be drilled into zone 958 and/or hydrocarbon layer 460 in addition to injection wells 748. The additional wells may be used to circulate additional water and/or to produce fluids from the formation. The wells may later be used as heater wells and/or production wells for the in situ heat treatment process treatment of hydrocarbon layer 460.

In some embodiments, the second fluid produced from the formation during solution mining is used to produce sodium bicarbonate. Sodium bicarbonate may be used in the food and pharmaceutical industries, in leather tanning, in fire retardation, in wastewater treatment, and in flue gas treatment (flue gas desulphurization and hydrogen chloride reduction). The second fluid may be kept pressurized and at an elevated temperature when removed from the formation. The second fluid may be cooled in a crystallizer to precipitate sodium bicarbonate.

In some embodiments, the second fluid produced from the formation during solution mining is used to produce sodium carbonate, which is also referred to as soda ash. Sodium carbonate may be used in the manufacture of glass, in the manufacture of detergents, in water purification, polymer production, tanning, paper manufacturing, effluent neutralization, metal refining, sugar extraction, and/or cement manufacturing. The second fluid removed from the formation may be heated in a treatment facility to form sodium carbonate (soda ash) and/or sodium carbonate brine. Heating sodium bicarbonate will form sodium carbonate according to the equation:

$$2NaHCO_3 \rightarrow Na_2CO_3 + CO_2 + H_2O. \qquad (7)$$

In certain embodiments, the heat for heating the sodium bicarbonate is provided using heat from the formation. For example, a heat exchanger that uses steam produced from the water introduced into the hot formation may be used to heat the second fluid to dissociation temperatures of the sodium bicarbonate. In some embodiments, the second fluid is circulated through the formation to utilize heat in the formation for further reaction. Steam and/or hot water may also be added to facilitate circulation. The second fluid may be circulated through a heated portion of the formation that has been subjected to the in situ heat treatment process to produce hydrocarbons from the formation. At least a portion of the carbon dioxide generated during sodium carbonate dissociation may be adsorbed on carbon that remains in the formation after the in situ heat treatment process. In some embodiments, the second fluid is circulated through conduits previously used to heat the formation.

In some embodiments, higher temperatures are used in the formation (for example, above about 120° C., above about 130° C., above about 150° C., or below about 250° C.) during solution mining of nahcolite. The first fluid is introduced into the formation under pressure sufficient to inhibit sodium bicarbonate from dissociating to produce carbon dioxide. The pressure in the formation may be maintained at sufficiently high pressures to inhibit such nahcolite dissociation but below pressures that would result in fracturing the formation. In addition, the pressure in the formation may be maintained high enough to inhibit steam formation if hot water is being introduced in the formation. In some embodiments, a portion of the nahcolite may begin to decompose in situ. In such cases, nahcolite is removed from the formation as soda ash. If soda ash is produced from solution mining of nahcolite, the soda ash may be transported to a separate facility for treatment. The soda ash may be transported through a pipeline to the separate facility.

As described above, in certain embodiments, following removal of nahcolite from the formation, the formation is treated using the in situ heat treatment process to produce formation fluids from the formation. If dawsonite is present in the formation, dawsonite within the heated portion of the formation decomposes during heating of the formation to pyrolysis temperature. Dawsonite typically decomposes at temperatures above 270° C. according to the reaction:

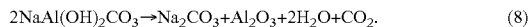

$$2NaAl(OH)_2CO_3 \rightarrow Na_2CO_3 + Al_2O_3 + 2H_2O + CO_2. \quad (8)$$

Sodium carbonate may be removed from the formation by solution mining the formation with water or other fluid into which sodium carbonate is soluble. In certain embodiments, alumina formed by dawsonite decomposition is solution mined using a chelating agent. The chelating agent may be injected through injection wells, production wells, and/or heater wells used for solution mining nahcolite and/or the in situ heat treatment process (for example, injection wells 748, production wells 206, and/or heat sources 202 depicted in FIG. 141). The chelating agent may be an aqueous acid. In certain embodiments, the chelating agent is EDTA (ethylenediaminetetraacetic acid). Other examples of possible chelating agents include, but are not limited to, ethylenediamine, porphyrins, dimercaprol, nitrilotriacetic acid, diethylenetriaminepentaacetic acid, phosphoric acids, acetic acid, acetoxy benzoic acids, nicotinic acid, pyruvic acid, citric acid, tartaric acid, malonic acid, imidizole, ascorbic acid, phenols, hydroxy ketones, sebacic acid, and boric acid. The mixture of chelating agent and alumina may be produced through production wells or other wells used for solution mining and/or the in situ heat treatment process (for example, injection wells 748, production wells 206, and/or heat sources 202, which are depicted in FIG. 141). The alumina may be separated from the chelating agent in a treatment facility. The recovered chelating agent may be recirculated back to the formation to solution mine more alumina.

In some embodiments, alumina within the formation may be solution mined using a basic fluid after the in situ heat treatment process. Basic fluids include, but are not limited to, sodium hydroxide, ammonia, magnesium hydroxide, magnesium carbonate, sodium carbonate, potassium carbonate, pyridine, and amines. In an embodiment, sodium carbonate brine, such as 0.5 Normal $Na_2CO_3$, is used to solution mine alumina. Sodium carbonate brine may be obtained from solution mining nahcolite from the formation. Obtaining the basic fluid by solution mining the nahcolite may significantly reduce costs associated with obtaining the basic fluid. The basic fluid may be injected into the formation through a heater well and/or an injection well. The basic fluid may combine with alumina to form an alumina solution that is removed from the formation. The alumina solution may be removed through a heater well, injection well, or production well.

Alumina may be extracted from the alumina solution in a treatment facility. In an embodiment, carbon dioxide is bubbled through the alumina solution to precipitate the alumina from the basic fluid. Carbon dioxide may be obtained from dissociation of nahcolite, from the in situ heat treatment process, or from decomposition of the dawsonite during the in situ heat treatment process.

In certain embodiments, a formation may include portions that are significantly rich in either nahcolite or dawsonite only. For example, a formation may contain significant amounts of nahcolite (for example, at least about 20 weight %, at least about 30 weight %, or at least about 40 weight %) in a depocenter of the formation. The depocenter may contain only about 5 weight % or less dawsonite on average. However, in bottom layers of the formation, a weight percent of dawsonite may be about 10 weight % or even as high as about 25 weight %. In such formations, it may be advantageous to solution mine for nahcolite only in nahcolite-rich areas, such as the depocenter, and solution mine for dawsonite only in the dawsonite-rich areas, such as the bottom layers. This selective solution mining may significantly reduce fluid costs, heating costs, and/or equipment costs associated with operating the solution mining process.

In certain formations, dawsonite composition varies between layers in the formation. For example, some layers of the formation may have dawsonite and some layers may not. In certain embodiments, more heat is provided to layers with more dawsonite than to layers with less dawsonite. Tailoring heat input to provide more heat to certain dawsonite layers more uniformly heats the formation as the reaction to decompose dawsonite absorbs some of the heat intended for pyrolyzing hydrocarbons. FIG. 145 depicts an embodiment for heating a formation with dawsonite in the formation. Hydrocarbon layer 460 may be cored to assess the dawsonite composition of the hydrocarbon layer. The mineral composition may be assessed using, for example, FTIR (Fourier transform infrared spectroscopy) or x-ray diffraction. Assessing the core composition may also assess the nahcolite composition of the core. After assessing the dawsonite composition, heater 716 may be placed in wellbore 452. Heater 716 includes sections to provide more heat to hydrocarbon layers with more dawsonite in the layers (hydrocarbon layers 460D). Hydrocarbon layers with less dawsonite (hydrocarbon layers 460C) are provided with less heat by heater 716. Heat output of heater 716 may be tailored by, for example, adjusting the resistance of the heater along the length of the heater. In one embodiment, heater 716 is a temperature limited heater, described herein, that has a higher temperature limit (for example, higher Curie temperature) in sections proximate layers 460D as compared to the temperature limit (Curie temperature) of sections proximate layers 460C. The resistance of heater 716 may also be adjusted by altering the resistive conducting materials along the length of the heater to supply a higher energy input (watts per meter) adjacent to dawsonite rich layers.

Solution mining dawsonite and nahcolite may be relatively simple processes that produce alumina and soda ash from the formation. In some embodiments, hydrocarbons produced from the formation using the in situ heat treatment process may be fuel for a power plant that produces direct current (DC) electricity at or near the site of the in situ heat treatment process. The produced DC electricity may be used on the site to produce aluminum metal from the alumina using the Hall process. Aluminum metal may be produced from the alumina by melting the alumina in a treatment facility on the site. Generating the DC electricity at the site may save on costs associated with using hydrotreaters, pipelines, or other treatment facilities associated with transporting and/or treating hydrocarbons produced from the formation using the in situ heat treatment process.

In some embodiments, acid may be introduced into the formation through selected wells to increase the porosity adjacent to the wells. For example, acid may be injected if the formation comprises limestone or dolomite. The acid used to treat the selected wells may be acid produced during in situ heat treatment of a section of the formation (for example, hydrochloric acid), or acid produced from byproducts of the in situ heat treatment process (for example, sulfuric acid produced from hydrogen sulfide or sulfur).

In some embodiments, a perimeter barrier may be formed around the portion of the formation to be treated. The perimeter barrier may inhibit migration of formation fluid into or out of the treatment area. The perimeter barrier may be a frozen barrier and/or a grout barrier. After formation of the perimeter barrier, the treatment area may be processed to produce desired products.

Formations that include non-hydrocarbon materials may be treated to remove and/or dissolve a portion of the non-hydrocarbon materials from a section of the formation before hydrocarbons are produced from the section. In some embodiments, the non-hydrocarbon materials are removed by solution mining. Removing a portion of the non-hydrocarbon materials may reduce the carbon dioxide generation sources present in the formation. Removing a portion of the non-hydrocarbon materials may increase the porosity and/or permeability of the section of the formation. Removing a portion of the non-hydrocarbon materials may result in a raised temperature in the section of the formation.

After solution mining, some of the wells in the treatment may be converted to heater wells, injection wells, and/or production wells. In some embodiments, additional wells are formed in the treatment area. The wells may be heater wells, injection wells, and/or production wells. Logging techniques may be employed to assess the physical characteristics, including any vertical shifting resulting from the solution mining, and/or the composition of material in the formation. Packing, baffles or other techniques may be used to inhibit formation fluid from entering the heater wells. The heater wells may be activated to heat the formation to a temperature sufficient to support combustion.

One or more production wells may be positioned in permeable sections of the treatment area. Production wells may be horizontally and/or vertically oriented. For example, production wells may be positioned in areas of the formation that have a permeability of greater than 5 darcy or 10 darcy. In some embodiments, production wells may be positioned near a perimeter barrier. A production well may allow water and production fluids to be removed from the formation. Positioning the production well near a perimeter barrier enhances the flow of fluids from the warmer zones of the formation to the cooler zones.

FIG. 146 depicts an embodiment of a process for treating a hydrocarbon containing formation with a combustion front. Barrier 922 (for example, a frozen barrier or a grout barrier) may be formed around a perimeter of treatment area 882 of the formation. The footprint defined by the barrier may have any desired shape such as circular, square, rectangular, polygonal, or irregular shape. Barrier 922 may be formed using one or more barrier wells 200. The barrier may be any barrier formed to inhibit the flow of fluid into or out of treatment area 882. In some embodiments, barrier 922 may be a double barrier.

Heat may be provided to treatment area 882 through heaters positioned in injection wells 748. In some embodiments, the heaters in injection wells 748 heat formation adjacent to the injections wells to temperatures sufficient to support combustion. Heaters in injection wells 748 may raise the formation near the injection wells to temperatures from about 90° C. to about 120° C. or higher (for example, a temperature of about 90° C., 95° C., 100° C., 110° C., or 120° C.).

Injection wells 748 may be used to introduce a combustion fuel, an oxidant, steam and/or a heat transfer fluid into treatment area 882, either before, during, or after heat is provided to the treatment area 882 from heaters. In some embodiments, injection wells 748 are in communication with each other to allow the introduced fluid to flow from one well to another. Injection wells 748 may be located at positions that are relatively far away from perimeter barrier 922. Introduced fluid may cause combustion of hydrocarbons in treatment area 882. Heat from the combustion may heat treatment area 882 and mobilize fluids toward production wells 206.

A temperature of treatment area 882 may be monitored using temperature measurement devices placed in monitoring wells and/or temperature measurement devices in injection wells 748, production wells 206, and/or heater wells.

In some embodiments, a controlled amount of oxidant (for example, air and/or oxygen) is provided in injection wells 748 to advance a heat front towards production wells 206. In some embodiments, the controlled amount of oxidant is introduced into the formation after solution mining has established permeable interconnectivity between at least two injection wells. The amount of oxidant is controlled to limit the advancement rate of the heat front and to limit the temperature of the heat front. The advancing heat front may pyrolyze hydrocarbons. The high permeability in the formation allows the pyrolyzed hydrocarbons to spread in the formation towards production wells without being overtaken by the advancing heat front.

Vaporized formation fluid and/or gas formed during the combustion process may be removed through gas wells 960 and/or injection well 748. Venting of gases through the gas wells and/or the injection well may force the combustion front in a desired direction.

In some embodiments, the formation may be heated to a temperature sufficient temperature to cause pyrolysis of the formation fluid by the steam and/or heat transfer fluid. The steam and/or heat transfer fluid may be heated to temperatures of about 300° C., about 400° C., about 500° C., or about 600° C. In certain embodiments, the steam and/or heat transfer fluid may be co-injected with the fuel and/or oxidant.

FIG. 147 depicts a representation of a cross-sectional view of an embodiment for treating a hydrocarbon containing formation with a combustion front. As the combustion front is initiated and/or fueled through injection wells 748, formation fluid near periphery 962 of the combustion front becomes mobile and flow towards production wells 206 located proximate barrier 922. Injection wells may include smart well technology. Combustion products and noncondensable formation fluid may be removed from the formation through gas wells 960. In some embodiments, no gas wells are formed in the formation. In such embodiments, formation fluid, combustion products and noncondensable formation fluid are produced through production wells 206. In embodiments that include gas wells 960, condensable formation fluid may be produced through production well 206. In some embodiments, production well 206 is located below injection well 748. Production well 206 may be about, or above 1 m, 5 m, to 10 m or more below injection well 748. Production well may be a horizontal well. Periphery 962 of the combustion front may advance from the toe of production well 206 towards the heel of the production well. Production well 206 may include a perforated liner that allows hydrocarbons to flow into the production well. In some embodiments, a catalyst may be placed in production well 206. The catalyst may upgrade and/or stabilize formation fluid in the production well.

Carbon dioxide and/or hydrogen sulfide may be produced during in situ heat treatment processes and during many conventional production processes. Removal of hydrogen sulfide from produced formation fluid may reduce the toxicity and/or strong odor in the produced formation fluid, thus making the formation fluid more acceptable for transportation and/or processing. Removing carbon dioxide and/or hydrogen sulfide from produced formation fluids may reduce capital costs associated with removing the fluids and reduce or eliminate the need for certain surface facilities (for example, a Claus plant or Scot gas treater). Since carbon dioxide has a low heating value, removal of carbon dioxide from formation fluids may increase the heat capacity of a gas stream separated from the formation fluid.

Net release of carbon dioxide to the atmosphere and/or hydrogen sulfide conversion to sulfur from an in situ heat treatment process for hydrocarbons may be reduced by utilizing the produced carbon dioxide and/or by storing carbon dioxide and/or hydrogen sulfide within the formation or within another formation. Carbon dioxide and/or hydrogen sulfide may be introduced into a portion of the formation below treatment areas subjected to in situ heat treatment processes. In some embodiments, the carbon dioxide and/or hydrogen sulfide may be transported to another formation.

In certain embodiments, carbon dioxide and/or hydrogen sulfide may be stored in spent portions of formations that have previously been subjected to in situ heat treatment processes or other hydrocarbon recovery processes. Carbon dioxide may absorb on or into remaining carbon containing material in such formations.

In certain embodiments, carbon dioxide and/or hydrogen sulfide is stored in a porous, deep saline aquifer. The carbon dioxide and/or hydrogen sulfide may promote mineralization within the aquifer. For example, the introduction of carbon dioxide and hydrogen sulfide into a saline aquifer may result in the production of carbonates in the aquifer. In certain embodiments, carbon dioxide is stored at a depth in the formation such that the carbon dioxide is introduced in the formation in a supercritical state. Supercritical carbon dioxide injection may maximize the density of the fluid introduced into the formation. The depths of outlets of insertion wells used to introduce carbon dioxide and/or hydrogen sulfide in the formation may be 900 m or more below the surface. The injection wells may be vertical, slanted, or directionally steered wells with a significant horizontal or near horizontal portion. The carbon dioxide and/or hydrogen sulfide may be introduced into the formation near the bottom of the saline aquifer.

Injection of carbon dioxide and/or hydrogen sulfide into a non-producing formation or using the carbon dioxide and/or hydrogen sulfide as a flood fluid is described by Caroll in "Physical Properties Relevant to Acid Gas Injection," Presented at the 14th International Gas Convention Venezuelan Gas Processors Association on May 10-12, 2000 in Caracas, Venezuela; "Phase Equilibria Relevant to Acid Gas Injection: Part 1—Non-Aqueoues Phase Behaviour Journal of Canadian Petroleum Technology, 2002, Vol. 41 No. 6, pp. 1-6; and "Phase Equilibria Relevant to Acid Gas Injection: Part 2—Aqueoues Phase Behaviour Journal of Canadian Petroleum Technology, 2002, Vol. 41, No. 7, pp. 1-5, all of which are incorporated by reference as if fully set forth herein.

During production of formation fluids from a subsurface formation, carbonic acid may be produced from the reaction of carbon dioxide with water. Portions of wells made of certain materials, such as carbon steel, may start to deteriorate or corrode in the presence of the carbonic acid. To inhibit corrosion due to carbonic acid, basic solutions and/or solvents may be introduced in the wellbore to neutralize and/or dissolve the carbonic acid.

In some embodiments, hydrogen sulfide is introduced into one or more wellbores in a subsurface formation. Introduction of the hydrogen sulfide may be performed at pressures below the lithostatic pressure of the subsurface formation to inhibit fracturing the formation. The injected hydrogen sulfide may form a sulfide layer on metal surfaces of the well. Formation of a sulfide layer may inhibit corrosion of the metal surfaces of the well by carbonic acid.

In certain embodiments, an electrical insulator (for example, a centralizer, an insulating layer, the electrical insulator in an insulated conductor heater, or any other electrical insulator described herein) includes a material that is fired or cured when heated in the subsurface. The material may develop desired dielectric or other electrical properties and/or physical properties after the material is fired or cured in a wellbore in the formation. The material may be fired or cured when a heater is turned on in the wellbore and the heater heats the material to its firing or curing temperature.

An example of such a material is a ceramic tape available from Composite Development Technology, Inc. (Lafayette, Colo., U.S.A.). The ceramic tape is flexible before it is fired. The ceramic tape obtains its dielectric properties after firing. After firing, the ceramic tape is a hard-ceramic with good dielectric properties suitable for subsurface electrical heating.

In an embodiment, the ceramic tape is wrapped around an electrical conductor (for example, the conductor of a temperature limited heater). Electrical current may be applied to the electrical conductor to heat the heater and fire the ceramic tape. In some embodiments, the ceramic tape is pre-fired before installation of a heater. The ceramic tape may be pre-fired using, for example, a hot gas gun.

Before firing, the ceramic tape is flexible and easy to install in a variety of applications. In certain embodiments, the ceramic tape is used between centralizers in a conductor-in-conduit heater. The ceramic tape may inhibit shorting of the conductor and conduit if the centralizers fail (for example, if the centralizers buckle and fail). In certain embodiments, the ceramic tape is used as the centralizers in a conductor-in-conduit heater. In some embodiments, the ceramic tape is used as the electrical insulator in an insulated conductor heater. In some embodiments, the ceramic tape is used as the electrical insulator in splices between sections of heaters. In some embodiments, the ceramic tape is used to electrically insulate the legs of a three-phase heater. The three legs of the three-phase heater may be enclosed in one sheath with the ceramic tape separating the legs of the heater.

Non-restrictive examples are set forth below.

Temperature Limited Heater Experimental Data FIGS. 148-163 depict experimental data for temperature limited heaters. FIG. 148 depicts electrical resistance (Ω) versus temperature (° C.) at various applied electrical currents for a 446 stainless steel rod with a diameter of 2.5 cm and a 410 stainless steel rod with a diameter of 2.5 cm. Both rods had a length of 1.8 m. Curves 964-970 depict resistance profiles as a function of temperature for the 446 stainless steel rod at 440 amps AC (curve 964), 450 amps AC (curve 966), 500 amps AC (curve 968), and 10 amps DC (curve 970). Curves 972-978 depict resistance profiles as a function of temperature for the 410 stainless steel rod at 400 amps AC (curve 972), 450 amps AC (curve 974), 500 amps AC (curve 976), 10 amps DC (curve 978). For both rods, the resistance gradually increased with temperature until the Curie temperature was reached. At the Curie temperature, the resistance fell sharply. Above the Curie temperature, the resistance decreased slightly with increasing temperature. Both rods show a trend of decreasing resistance with increasing AC current. Accordingly, the turn-down ratio decreased with increasing current. Thus, the rods provide a reduced amount of heat near and above the Curie temperature of the rods. In contrast, the resistance gradually increased with temperature through the Curie temperature with the applied DC current.

FIG. 149 shows electrical resistance (Ω) profiles as a function of temperature (° C.) at various applied electrical currents for a copper rod contained in a conduit of Sumitomo HCM12A (a high strength 410 stainless steel). The Sumitomo conduit had a diameter of 5.1 cm, a length of 1.8 m, and a wall thickness of about 0.1 cm. Curves 980-990 show that at all applied currents (980: 300 amps AC; 982: 350 amps AC; 984: 400 amps AC; 986: 450 amps AC; 988: 500 amps AC; 990: 550 amps AC), resistance increased gradually with temperature until the Curie temperature was reached. At the Curie temperature, the resistance fell sharply. As the current increased, the resistance decreased, resulting in a smaller turndown ratio.

FIG. 150 depicts electrical resistance (Ω) versus temperature (° C.) at various applied electrical currents for a temperature limited heater. The temperature limited heater included a 4/0 MGT-1000 furnace cable inside an outer conductor of ¾" Schedule 80 Sandvik (Sweden) 4C54 (446 stainless steel) with a 0.30 cm thick copper sheath welded onto the outside of the Sandvik 4C54 and a length of 1.8 m. Curves 1000 through 1018 show resistance profiles as a function of temperature for AC applied currents ranging from 40 amps to 500 amps (1000: 40 amps; 1002: 80 amps; 1004: 120 amps; 1006: 160 amps; 1008: 250 amps; 1010: 300 amps; 1012: 350 amps; 1014: 400 amps; 1016: 450 amps; 1018: 500 amps). FIG. 151 depicts the raw data for curve 1014. FIG. 152 depicts the data for selected curves 1010, 1012, 1014, 1016, 1018, and 1020. At lower currents (below 250 amps), the resistance increased with increasing temperature up to the Curie temperature. At the Curie temperature, the resistance fell sharply. At higher currents (above 250 amps), the resistance decreased slightly with increasing temperature up to the Curie temperature. At the Curie temperature, the resistance fell sharply. Curve 1020 shows resistance for an applied DC electrical current of 10 amps. Curve 1020 shows a steady increase in resistance with increasing temperature, with little or no deviation at the Curie temperature.

FIG. 153 depicts power (watts per meter (W/m)) versus temperature (° C.) at various applied electrical currents for a temperature limited heater. The temperature limited heater included a 4/0 MGT-1000 furnace cable inside an outer conductor of ¾" Schedule 80 Sandvik (Sweden) 4C54 (446 stainless steel) with a 0.30 cm thick copper sheath welded onto the outside of the Sandvik 4C54 and a length of 1.8 m. Curves 1022-1030 depict power versus temperature for AC applied currents of 300 amps to 500 amps (1022: 300 amps; 1024: 350 amps; 1026: 400 amps; 1028: 450 amps; 1030: 500 amps). Increasing the temperature gradually decreased the power until the Curie temperature was reached. At the Curie temperature, the power decreased rapidly.

FIG. 154 depicts electrical resistance (mΩ) versus temperature (° C.) at various applied electrical currents for a temperature limited heater. The temperature limited heater included a copper rod with a diameter of 1.3 cm inside an outer conductor of 2.5 cm Schedule 80 410 stainless steel pipe with a 0.15 cm thick copper Everdur™ (DuPont Engineering, Wilmington, Del., U.S.A.) welded sheath over the 410 stainless steel pipe and a length of 1.8 m. Curves 1032-1042 show resistance profiles as a function of temperature for AC applied currents ranging from 300 amps to 550 amps (1032: 300 amps; 1034: 350 amps; 1036: 400 amps; 1038: 450 amps; 1040: 500 amps; 1042: 550 amps). For these AC applied currents, the resistance gradually increases with increasing temperature up to the Curie temperature. At the Curie temperature, the resistance falls sharply. In contrast, curve 1044 shows resistance for an applied DC electrical current of 10 amps. This resistance shows a steady increase with increasing temperature, and little or no deviation at the Curie temperature.

FIG. 155 depicts data of electrical resistance (mΩ) versus temperature (° C.) for a solid 2.54 cm diameter, 1.8 m long 410 stainless steel rod at various applied electrical currents. Curves 1046, 1048, 1050, 1052, and 1054 depict resistance profiles as a function of temperature for the 410 stainless steel rod at 40 amps AC (curve 1052), 70 amps AC (curve 1054), 140 amps AC (curve 1046), 230 amps AC (curve 1048), and 10 amps DC (curve 1050). For the applied AC currents of 140 amps and 230 amps, the resistance increased gradually with increasing temperature until the Curie temperature was reached. At the Curie temperature, the resistance fell sharply. In contrast, the resistance showed a gradual increase with temperature through the Curie temperature for the applied DC current.

FIG. 156 depicts data of electrical resistance (mΩ) versus temperature (° C.) for a composite 1.75 inch (1.9 cm) diameter, 6 foot (1.8 m) long Alloy 42-6 rod with a 0.375 inch diameter copper core (the rod has an outside diameter to copper diameter ratio of 2:1) at various applied electrical currents. Curves 1056, 1058, 1060, 1062, 1064, 1066, 1068, and 1070 depict resistance profiles as a function of temperature for the copper cored alloy 42-6 rod at 300 A AC (curve 1056), 350 A AC (curve 1058), 400 A AC (curve 1060), 450 A AC (curve 1062), 500 A AC (curve 1064), 550 A AC (curve 1066), 600 A AC (curve 1068), and 10 A DC (curve 1070). For the applied AC currents, the resistance decreased gradually with increasing temperature until the Curie temperature was reached. As the temperature approaches the Curie temperature, the resistance decreased more sharply. In contrast, the resistance showed a gradual increase with temperature for the applied DC current.

FIG. 157 depicts data of power output (watts per foot (W/ft)) versus temperature (° C.) for a composite 1.75 inch (1.9 cm) diameter, 6 foot (1.8 m) long Alloy 42-6 rod with a 0.375 inch diameter copper core (the rod has an outside diameter to copper diameter ratio of 2:1) at various applied electrical currents. Curves 1072, 1074, 1076, 1078, 1080, 1082, 1084, and 1086 depict power as a function of temperature for the copper cored alloy 42-6 rod at 300 A AC (curve 1072), 350 A AC (curve 1074), 400 A AC (curve 1076), 450 A AC (curve 1078), 500 A AC (curve 1080), 550 A AC (curve 1082), 600 A AC (curve 1084), and 10 A DC (curve 1086). For the applied AC currents, the power output decreased gradually with increasing temperature until the Curie temperature was reached. As the temperature approaches the Curie temperature, the power output decreased more sharply. In contrast, the power output showed a relatively flat profile with temperature for the applied DC current.

FIG. 158 depicts data for values of skin depth (cm) versus temperature (° C.) for a solid 2.54 cm diameter, 1.8 m long 410 stainless steel rod at various applied AC electrical currents. The skin depth was calculated using EQN. 9:

$$\delta = R_1 - R_1 \times (1 - (1/R_{AC}/R_{DC}))^{1/2}; \quad (9)$$

where $\delta$ is the skin depth, $R_1$ is the radius of the cylinder, $R_{AC}$ is the AC resistance, and $R_{DC}$ is the DC resistance. In FIG. 158, curves 1088-1106 show skin depth profiles as a function of temperature for applied AC electrical currents over a range of 50 amps to 500 amps (1088: 50 amps; 1090: 100 amps; 1092: 150 amps; 1094: 200 amps; 1096: 250 amps; 1098: 300 amps; 1100: 350 amps; 1102: 400 amps; 1104: 450 amps; 1106: 500 amps). For each applied AC electrical current, the skin depth gradually increased with increasing temperature up to the Curie temperature. At the Curie temperature, the skin depth increased sharply.

FIG. 159 depicts temperature (° C.) versus time (hrs) for a temperature limited heater. The temperature limited heater was a 1.83 m long heater that included a copper rod with a diameter of 1.3 cm inside a 2.5 cm Schedule XXH 410 stainless steel pipe and a 0.325 cm copper sheath. The heater was placed in an oven for heating. Alternating current was applied to the heater when the heater was in the oven. The current was increased over two hours and reached a relatively constant value of 400 amps for the remainder of the time. Temperature of the stainless steel pipe was measured at three points at 0.46 m intervals along the length of the heater. Curve 1108 depicts the temperature of the pipe at a point 0.46 m inside the oven and closest to the lead-in portion of the heater. Curve 1110 depicts the temperature of the pipe at a point 0.46 m from the end of the pipe and furthest from the lead-in portion of the heater. Curve 1112 depicts the temperature of the pipe at about a center point of the heater. The point at the center of the heater was further enclosed in a 0.3 m section of 2.5 cm thick Fiberfrax® (Unifrax Corp., Niagara Falls, N.Y., U.S.A.) insulation. The insulation was used to create a low thermal conductivity section on the heater (a section where heat transfer to the surroundings is slowed or inhibited (a "hot spot")). The temperature of the heater increased with time as shown by curves 1112, 1110, and 1108. Curves 1112, 1110, and 1108 show that the temperature of the heater increased to about the same value for all three points along the length of the heater. The resulting temperatures were substantially independent of the added Fiberfrax® insulation. Thus, the operating temperatures of the temperature limited heater were substantially the same despite the differences in thermal load (due to the insulation) at each of the three points along the length of the heater. Thus, the temperature limited heater did not exceed the selected temperature limit in the presence of a low thermal conductivity section.

FIG. 160 depicts temperature (° C.) versus log time (hrs) data for a 2.5 cm solid 410 stainless steel rod and a 2.5 cm solid 304 stainless steel rod. At a constant applied AC electrical current, the temperature of each rod increased with time. Curve 1114 shows data for a thermocouple placed on an outer surface of the 304 stainless steel rod and under a layer of insulation. Curve 1116 shows data for a thermocouple placed on an outer surface of the 304 stainless steel rod without a layer of insulation. Curve 1118 shows data for a thermocouple placed on an outer surface of the 410 stainless steel rod and under a layer of insulation. Curve 1120 shows data for a thermocouple placed on an outer surface of the 410 stainless steel rod without a layer of insulation. A comparison of the curves shows that the temperature of the 304 stainless steel rod (curves 1114 and 1116) increased more rapidly than the temperature of the 410 stainless steel rod (curves 1118 and 1120). The temperature of the 304 stainless steel rod (curves 1114 and 1116) also reached a higher value than the temperature of the 410 stainless steel rod (curves 1118 and 1120). The temperature difference between the non-insulated section of the 410 stainless steel rod (curve 1120) and the insulated section of the 410 stainless steel rod (curve 1118) was less than the temperature difference between the non-insulated section of the 304 stainless steel rod (curve 1116) and the insulated section of the 304 stainless steel rod (curve 1114). The temperature of the 304 stainless steel rod was increasing at the termination of the experiment (curves 1114 and 1116) while the temperature of the 410 stainless steel rod had leveled out (curves 1118 and 1120). Thus, the 410 stainless steel rod (the temperature limited heater) provided better temperature control than the 304 stainless steel rod (the non-temperature limited heater) in the presence of varying thermal loads (due to the insulation).

A 6 foot temperature limited heater element was placed in a 6 foot 347H stainless steel canister. The heater element was connected to the canister in a series configuration. The heater element and canister were placed in an oven. The oven was used to raise the temperature of the heater element and the canister. At varying temperatures, a series of electrical currents were passed through the heater element and returned through the canister. The resistance of the heater element and the power factor of the heater element were determined from measurements during passing of the electrical currents.

FIG. 161 depicts experimentally measured electrical resistance (mΩ) versus temperature (° C.) at several currents for a temperature limited heater with a copper core, a carbon steel ferromagnetic conductor, and a 347H stainless steel support member. The ferromagnetic conductor was a low-carbon steel with a Curie temperature of 770° C. The ferromagnetic conductor was sandwiched between the copper core and the 347H support member. The copper core had a diameter of 0.5". The ferromagnetic conductor had an outside diameter of 0.765". The support member had an outside diameter of 1.05". The canister was a 3" Schedule 160 347H stainless steel canister.

Data 1122 depicts electrical resistance versus temperature for 300 A at 60 Hz AC applied current. Data 1124 depicts resistance versus temperature for 400 A at 60 Hz AC applied current. Data 1126 depicts resistance versus temperature for 500 A at 60 Hz AC applied current. Curve 1128 depicts resistance versus temperature for 10 A DC applied current. The resistance versus temperature data indicates that the AC resistance of the temperature limited heater linearly increased up to a temperature near the Curie temperature of the ferromagnetic conductor. Near the Curie temperature, the AC resistance decreased rapidly until the AC resistance equaled the DC resistance above the Curie temperature. The linear dependence of the AC resistance below the Curie temperature at least partially reflects the linear dependence of the AC resistance of 347H at these temperatures. Thus, the linear dependence of the AC resistance below the Curie temperature indicates that the majority of the current is flowing through the 347H support member at these temperatures.

FIG. 162 depicts experimentally measured electrical resistance (mΩ) versus temperature (° C.) data at several currents for a temperature limited heater with a copper core, a iron-cobalt ferromagnetic conductor, and a 347H stainless steel support member. The iron-cobalt ferromagnetic conductor was an iron-cobalt conductor with 6% cobalt by weight and a Curie temperature of 834° C. The ferromagnetic conductor was sandwiched between the copper core and the 347H support member. The copper core had a diameter of 0.465". The ferromagnetic conductor had an outside diameter of 0.765". The support member had an outside diameter of 1.05". The canister was a 3" Schedule 160 347H stainless steel canister.

Data 1130 depicts resistance versus temperature for 100 A at 60 Hz AC applied current. Data 1132 depicts resistance versus temperature for 400 A at 60 Hz AC applied current. Curve 1134 depicts resistance versus temperature for 10 A DC. The AC resistance of this temperature limited heater turned down at a higher temperature than the previous temperature limited heater. This was due to the added cobalt increasing the Curie temperature of the ferromagnetic conductor. The AC resistance was substantially the same as the AC resistance of a tube of 347H steel having the dimensions of the support member. This indicates that the majority of the current is flowing through the 347H support member at these temperatures. The resistance curves in FIG. 162 are generally the same shape as the resistance curves in FIG. 161.

FIG. 163 depicts experimentally measured power factor (y-axis) versus temperature (° C.) at two AC currents for the temperature limited heater with the copper core, the iron-cobalt ferromagnetic conductor, and the 347H stainless steel support member. Curve 1136 depicts power factor versus temperature for 100 A at 60 Hz AC applied current. Curve 1138 depicts power factor versus temperature for 400 A at 60 Hz AC applied current. The power factor was close to unity (1) except for the region around the Curie temperature. In the region around the Curie temperature, the non-linear magnetic properties and a larger portion of the current flowing through the ferromagnetic conductor produce inductive effects and distortion in the heater that lowers the power factor. FIG. 163 shows that the minimum value of the power factor for this heater remained above 0.85 at all temperatures in the experiment. Because only portions of the temperature limited heater used to heat a subsurface formation may be at the Curie temperature at any given point in time and the power factor for these portions does not go below 0.85 during use, the power factor for the entire temperature limited heater would remain above 0.85 (for example, above 0.9 or above 0.95) during use.

From the data in the experiments for the temperature limited heater with the copper core, the iron-cobalt ferromagnetic conductor, and the 347H stainless steel support member, the turndown ratio (y-axis) was calculated as a function of the maximum power (W/m) delivered by the temperature limited heater. The results of these calculations are depicted in FIG. 164. The curve in FIG. 164 shows that the turndown ratio (y-axis) remains above 2 for heater powers up to approximately 2000 W/m. This curve is used to determine the ability of a heater to effectively provide heat output in a sustainable manner. A temperature limited heater with the curve similar to the curve in FIG. 164 would be able to provide sufficient heat output while maintaining temperature limiting properties that inhibit the heater from overheating or malfunctioning.

A theoretical model has been used to predict the experimental results. The theoretical model is based on an analytical solution for the AC resistance of a composite conductor. The composite conductor has a thin layer of ferromagnetic material, with a relative magnetic permeability $\mu_2/\mu_0 \gg 1$, sandwiched between two non-ferromagnetic materials, whose relative magnetic permeabilities, $\mu_1/\mu_0$ and $\mu_3/\mu_0$, are close to unity and within which skin effects are negligible. An assumption in the model is that the ferromagnetic material is treated as linear. In addition, the way in which the relative magnetic permeability, $\mu_2/\mu_0$, is extracted from magnetic data for use in the model is far from rigorous.

Magnetic data was obtained for carbon steel as a ferromagnetic material. B versus H curves, and hence relative permeabilities, were obtained from the magnetic data at various temperatures up to 1100° F. and magnetic fields up to 200 Oe (oersteds). A correlation was found that fitted the data well through the maximum permeability and beyond. FIG. 165 depicts examples of relative magnetic permeability (y-axis) versus magnetic field (Oe) for both the found correlations and raw data for carbon steel. Data 1140 is raw data for carbon steel at 400° F. Data 1142 is raw data for carbon steel at 1000° F. Curve 1144 is the found correlation for carbon steel at 400° F. Curve 1146 is the found correlation for carbon steel at 1000° F.

For the dimensions and materials of the copper/carbon steel/347H heater element in the experiments above, theoretical calculations were carried out to calculate magnetic field at the outer surface of the carbon steel as a function of skin depth. Results of the theoretical calculations were presented on the same plot as skin depth versus magnetic field from the correlations applied to the magnetic data from FIG. 165. The theoretical calculations and correlations were made for four temperatures (200° F., 500° F., 800° F., and 1100° F.) and five total root-mean-square (RMS) currents (100 A, 200 A, 300 A, 400 A, and 500 A).

FIG. 166 shows the resulting plots of skin depth (in) versus magnetic field (Oe) for all four temperatures and 400 A current. Curve 1148 is the correlation from magnetic data at 200° F. Curve 1150 is the correlation from magnetic data at 500° F. Curve 1152 is the correlation from magnetic data at 800° F. Curve 1154 is the correlation from magnetic data at 1100° F. Curve 1156 is the theoretical calculation at the outer surface of the carbon steel as a function of skin depth at 200° F. Curve 1158 is the theoretical calculation at the outer surface of the carbon steel as a function of skin depth at 500° F. Curve 1160 is the theoretical calculation at the outer surface of the carbon steel as a function of skin depth at 800° F. Curve 1162 is the theoretical calculation at the outer surface of the carbon steel as a function of skin depth at 1100° F.

The skin depths obtained from the intersections of the same temperature curves in FIG. 166 were input into equations based on theory and the AC resistance per unit length was calculated. The total AC resistance of the entire heater, including that of the canister, was subsequently calculated. A comparison between the experimental and numerical (calculated) results is shown in FIG. 167 for currents of 300 A (experimental data 1164 and numerical curve 1166), 400A (experimental data 1168 and numerical curve 1170), and 500 A (experimental data 1172 and numerical curve 1174). Though the numerical results exhibit a steeper trend than the experimental results, the theoretical model captures the close bunching of the experimental data, and the overall values are quite reasonable given the assumptions involved in the theoretical model. For example, one assumption involved the use of a permeability derived from a quasistatic B-H curve to treat a dynamic system.

One feature of the theoretical model describing the flow of alternating current in the three-part temperature limited heater is that the AC resistance does not fall off monotonically with increasing skin depth. FIG. 168 shows the AC resistance (mΩ) per foot of the heater element as a function of skin depth (in.) at 1100° F. calculated from the theoretical model. The AC resistance may be maximized by selecting the skin depth that is at the peak of the non-monotonical portion of the resistance versus skin depth profile (for example, at about 0.23 in. in FIG. 168).

FIG. 169 shows the power generated per unit length (W/ft) in each heater component (curve 1176 (copper core), curve 1178 (carbon steel), curve 1180 (347H outer layer), and curve 1182 (total)) versus skin depth (in.). As expected, the power dissipation in the 347H falls off while the power dissipation in the copper core increases as the skin depth increases. The maximum power dissipation in the carbon steel occurs at the skin depth of about 0.23 inches and is expected to correspond to the minimum in the power factor, as shown in FIG. 163. The current density in the carbon steel behaves like a damped wave of wavelength $\lambda=2\pi\delta$ and the effect of this wavelength on the boundary conditions at the copper/carbon steel and carbon steel/347H interface may be behind the structure in FIG. 168. For example, the local minimum in AC resistance is close to the value at which the thickness of the carbon steel layer corresponds to $\lambda/4$. Formulae may be developed that describe the shapes of the AC resistance versus temperature profiles of temperature limited heaters for use in simulating the performance of the heaters in a particular embodiment. The data in FIGS. 161 and 162 show that the resistances initially rise linearly, then drop off increasingly steeply towards the DC lines.

Figure 170A:
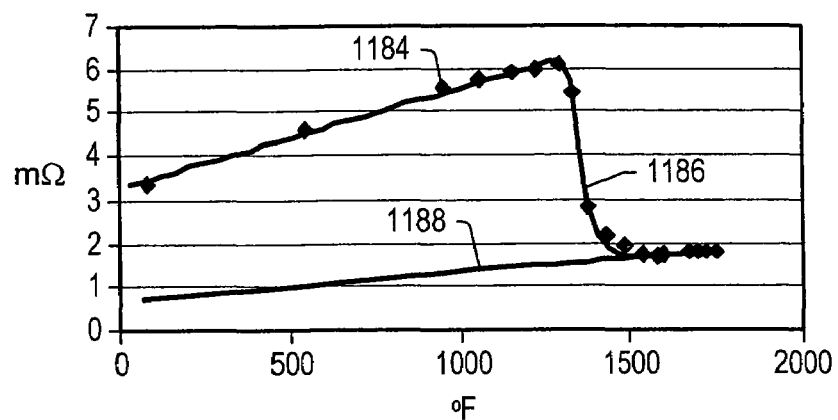
Figure 170B:
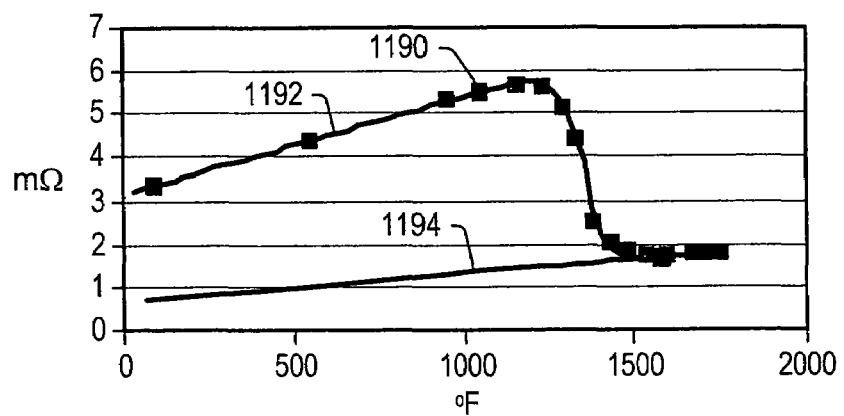
Figure 170C:
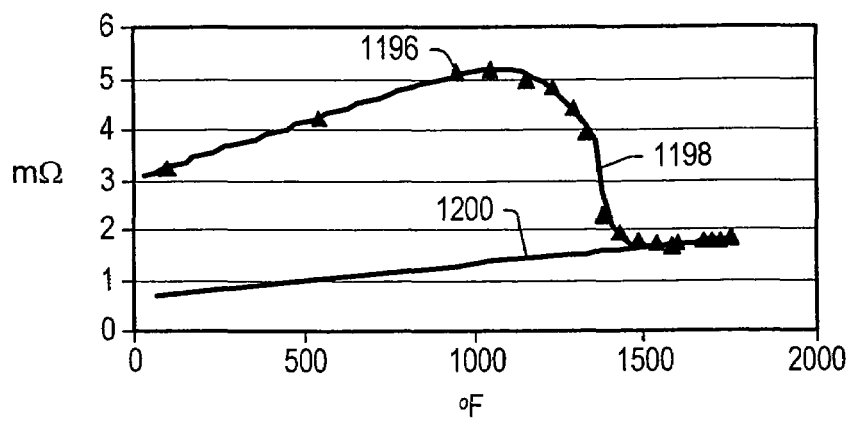

FIGS. 170 A-C compare the results of the theoretical calculations with experimental data at 300 A (FIG. 170A), 400 A (FIG. 170B) and 500 A (FIG. 170C). FIG. 170A depicts electrical resistance (m$\Omega$) versus temperature (° F.) at 300 A. Data 1184 is the experimental data at 300 A. Curve 1186 is the theoretical calculation at 300 A. Curve 1188 is a plot of resistance versus temperature at 10 A DC. FIG. 170B depicts electrical resistance (m$\Omega$) versus temperature (° F.) at 400 A. Data 1190 is the experimental data at 400 A. Curve 1192 is the theoretical calculation at 400 A. Curve 1194 is a plot of resistance versus temperature at 10 A DC. FIG. 170C depicts electrical resistance (m$\Omega$) versus temperature (° F.) at 500 A. Data 1196 is the experimental data at 500 A. Curve 1198 is the theoretical calculation at 500 A. Curve 1200 is a plot of resistance versus temperature at 10 A DC.

Temperature Limited Heater Simulations

A numerical simulation (FLUENT available from Fluent USA, Lebanon, N.H., U.S.A.) was used to compare operation of temperature limited heaters with three turndown ratios. The simulation was done for heaters in an oil shale formation (Green River oil shale). Simulation conditions were:

- 61 m length conductor-in-conduit temperature limited heaters (center conductor (2.54 cm diameter), conduit outer diameter 7.3 cm)
- downhole heater test field richness profile for an oil shale formation
- 16.5 cm (6.5 inch) diameter wellbores at 9.14 m spacing between wellbores on triangular spacing
- 200 hours power ramp-up time to 820 watts/m initial heat injection rate
- constant current operation after ramp up
- Curie temperature of 720.6° C. for heater
- formation will swell and touch the heater canisters for oil shale richnesses at least 0.14 L/kg (35 gals/ton)

FIG. 171 displays temperature (° C.) of a center conductor of a conductor-in-conduit heater as a function of formation depth (m) for a temperature limited heater with a turndown ratio of 2:1. Curves 1202-1224 depict temperature profiles in the formation at various times ranging from 8 days after the start of heating to 675 days after the start of heating (1202: 8 days, 1204: 50 days, 1206: 91 days, 1208: 133 days, 1210: 216 days, 1212: 300 days, 1214: 383 days, 1216: 466 days, 1218: 550 days, 1220: 591 days, 1222: 633 days, 1224: 675 days). At a turndown ratio of 2:1, the Curie temperature of 720.6° C. was exceeded after 466 days in the richest oil shale layers. FIG. 172 shows the corresponding heater heat flux (W/m) through the formation for a turndown ratio of 2:1 along with the oil shale rich ness (1/kg) profile (curve 1226). Curves 1228-1260 show the heat flux profiles at various times from 8 days after the start of heating to 633 days after the start of heating (1228: 8 days; 1230: 50 days; 1232: 91 days; 1234: 133 days; 1238: 175 days; 1240: 216 days; 1242: 258 days; 1244: 300 days; 1236: 341 days; 1246: 383 days; 1248: 425 days; 1250: 466 days; 1252: 508 days; 1254: 550 days; 1256: 591 days; 1258: 633 days; 1260: 675 days). At a turndown ratio of 2:1, the center conductor temperature exceeded the Curie temperature in the richest oil shale layers.

FIG. 173 displays heater temperature (° C.) as a function of formation depth (m) for a turndown ratio of 3:1. Curves 1262-1284 show temperature profiles through the formation at various times ranging from 12 days after the start of heating to 703 days after the start of heating (1262: 12 days; 1264: 33 days; 1266: 62 days; 1268: 102 days; 1270: 146 days; 1272: 205 days; 1274: 271 days; 1276: 354 days; 1278: 467 days; 1280: 605 days; 1282: 662 days; 1284: 703 days). At a turndown ratio of 3:1, the Curie temperature was approached after 703 days. FIG. 174 shows the corresponding heater heat flux (W/m) through the formation for a turndown ratio of 3:1 along with the oil shale richness (1/kg) profile (curve 1286). Curves 1288-1308 show the heat flux profiles at various times from 12 days after the start of heating to 605 days after the start of heating (1288: 12 days, 1290: 32 days, 1292: 62 days, 1294: 102 days, 1296: 146 days, 1298: 205 days, 1300: 271 days, 1302: 354 days, 1304: 467 days, 1306: 605 days, 1308: 749 days). The center conductor temperature never exceeded the Curie temperature for the turndown ratio of 3:1. The center conductor temperature also showed a relatively flat temperature profile for the 3:1 turndown ratio.

FIG. 175 shows heater temperature (° C.) as a function of formation depth (m) for a turndown ratio of 4:1. Curves 1310-1330 show temperature profiles through the formation at various times ranging from 12 days after the start of heating to 467 days after the start of heating (1310: 12 days; 1312: 33 days; 1314: 62 days; 1316: 102 days, 1318: 147 days; 1320: 205 days; 1322: 272 days; 1324: 354 days; 1326: 467 days; 1328: 606 days, 1330: 678 days). At a turndown ratio of 4:1, the Curie temperature was not exceeded even after 678 days. The center conductor temperature never exceeded the Curie temperature for the turndown ratio of 4:1. The center conductor showed a temperature profile for the 4:1 turndown ratio that was somewhat flatter than the temperature profile for the 3:1 turndown ratio. These simulations show that the heater temperature stays at or below the Curie temperature for a longer time at higher turndown ratios. For this oil shale richness profile, a turndown ratio of at least 3:1 may be desirable.

Simulations have been performed to compare the use of temperature limited heaters and non-temperature limited heaters in an oil shale formation. Simulation data was produced for conductor-in-conduit heaters placed in 16.5 cm (6.5 inch) diameter wellbores with 12.2 m (40 feet) spacing between heaters using a formation simulator (for example, STARS) and a near wellbore simulator (for example, ABAQUS from ABAQUS, Inc., Providence, R.I., U.S.A.). Standard conductor-in-conduit heaters included 304 stainless steel conductors and conduits. Temperature limited conductor-in-conduit heaters included a metal with a Curie temperature of 760° C. for conductors and conduits. Results from the simulations are depicted in FIGS. 176-178.

FIG. 176 depicts heater temperature (° C.) at the conductor of a conductor-in-conduit heater versus depth (m) of the heater in the formation for a simulation after 20,000 hours of operation. Heater power was set at 820 watts/meter until 760° C. was reached, and the power was reduced to inhibit overheating. Curve 1332 depicts the conductor temperature for standard conductor-in-conduit heaters. Curve 1332 shows that a large variance in conductor temperature and a significant number of hot spots developed along the length of the conductor. The temperature of the conductor had a minimum value of 490° C. Curve 1334 depicts conductor temperature for temperature limited conductor-in-conduit heaters. As shown in FIG. 176, temperature distribution along the length of the conductor was more controlled for the temperature limited heaters. In addition, the operating temperature of the conductor was 730° C. for the temperature limited heaters. Thus, more heat input would be provided to the formation for a similar heater power using temperature limited heaters.

FIG. 177 depicts heater heat flux (W/m) versus time (yrs) for the heaters used in the simulation for heating oil shale. Curve 1336 depicts heat flux for standard conductor-in-conduit heaters. Curve 1338 depicts heat flux for temperature limited conductor-in-conduit heaters. As shown in FIG. 177, heat flux for the temperature limited heaters was maintained at a higher value for a longer period of time than heat flux for standard heaters. The higher heat flux may provide more uniform and faster heating of the formation.

FIG. 178 depicts cumulative heat input (kJ/m)(kilojoules per meter) versus time (yrs) for the heaters used in the simulation for heating oil shale. Curve 1340 depicts cumulative heat input for standard conductor-in-conduit heaters. Curve 1342 depicts cumulative heat input for temperature limited conductor-in-conduit heaters. As shown in FIG. 178, cumulative heat input for the temperature limited heaters increased faster than cumulative heat input for standard heaters. The faster accumulation of heat in the formation using temperature limited heaters may decrease the time needed for retorting the formation. Onset of retorting of the oil shale formation may begin around an average cumulative heat input of $1.1 \times 10^8$ kJ/meter. This value of cumulative heat input is reached around 5 years for temperature limited heaters and between 9 and 10 years for standard heaters.

Triad Pattern Heater Simulation

FIG. 179 depicts cumulative gas production and cumulative oil production versus time (years) found from a STARS simulation (Computer Modelling Group, LTD., Calgary, Alberta, Canada) using the temperature limited heaters and heater pattern depicted in FIGS. 65 and 67. Curve 1344 depicts cumulative oil production (m³) for an initial water saturation of 15%. Curve 1346 depicts cumulative gas production (m³) for the initial water saturation of 15%. Curve 1348 depicts cumulative oil production (m³) for an initial water saturation of 85%. Curve 1350 depicts cumulative gas production (m³) for the initial water saturation of 85%. As shown by the small differences between curves 1344 and 1348 for cumulative oil production and curves 1346 and 1350 for cumulative gas production, the initial water saturation does not substantially alter heating of the formation. As a result, the overall production of hydrocarbons from the formation is also not substantially changed by the initial water saturation. Using the temperature limited heaters inhibits variances in heating of the formation that otherwise may be caused by the differences in the initial water saturation.

Phase Transformation and Curie Temperature Experimental Calculations

FIG. 180 depicts experimental calculations of weight percentages of ferrite and austenite phases versus temperature for iron alloy TC3 (0.1% by weight carbon, 5% by weight cobalt, 12% by weight chromium, 0.5% by weight manganese, 0.5% by weight silicon). Curve 1352 depicts weight percentage of the ferrite phase. Curve 1354 depicts weight percentage of the austenite phase. The arrow points to the Curie temperature of the alloy. As shown in FIG. 180, the phase transformation was close to the Curie temperature but did not overlap with the Curie temperature for this alloy.

FIG. 181 depicts experimental calculations of weight percentages of ferrite and austenite phases versus temperature for iron alloy FM-4 (0.1% by weight carbon, 5% by weight cobalt, 0.5% by weight manganese, 0.5% by weight silicon). Curve 1356 depicts weight percentage of the ferrite phase. Curve 1358 depicts weight percentage of the austenite phase. The arrow points to the Curie temperature of the alloy. As shown in FIG. 181, the phase transformation broadened without chromium in the alloy and the phase transformation overlapped with the Curie temperature for this alloy.

FIG. 181 depicts experimental calculations of weight percentages of ferrite and austenite phases versus temperature for iron alloy FM-4 (0.1% by weight carbon, 5% by weight cobalt, 0.5% by weight manganese, 0.5% by weight silicon). Curve 1356 depicts weight percentage of the ferrite phase. Curve 1358 depicts weight percentage of the austenite phase. The arrow points to the Curie temperature of the alloy. As shown in FIG. 181, the phase transformation broadened without chromium in the alloy and the phase transformation overlapped with the Curie temperature for this alloy.

Calculations for the Curie temperature ($T_c$) and the phase transformation behavior were done for various mixtures of cobalt, carbon, manganese, silicon, vanadium, and titanium using computational thermodynamic software (ThermoCalc and JMatPro obtained from Thermo-Calc Software, Inc., (McMurray, Pa., U.S.A)) to predict the effect of additional elements on Curie Temperature ($T_c$) for selected compositions, the temperature ($A_1$) at which ferrite transforms to paramagnetic austenite, and the phases present at those temperatures. An equilibrium calculation temperature of 700° C. was used in all calculations. As shown in TABLE 2, as the weight percentage of cobalt in the composition increased, $T_c$ and $A_1$ increased; however, $T_c$ remained above $A_1$. An increase in the $A_1$ temperature may be predicted upon sufficient addition of carbide formers vanadium, titanium, niobium, tantalum, and tungsten. For example, about 0.5% by weight of carbide formers may be used in an alloy that includes about 0.1% by weight of carbon. Addition of carbide formers allows replacement of the $Fe_3C$ carbide phase with a MC carbide phase. From the calculations, excess amounts of vanadium appeared to not have an impact on $T_c$, while excess amounts of other carbide formers reduced the $T_c$.

TABLE 2

| Composition (% by weight, balance being Fe) | | | | | | Calculation Results | | |
|---|---|---|---|---|---|---|---|---|
| Co | C | Mn | Si | V | Ti | $T_c$ (EC) | $A_1$ (EC) | Phases Present (~700EC) |
| 0 | 0.1 | 0.5 | 0.5 | 0 | 0 | 758 | 716 | ferrite + $Fe_3C$ (FM2) |
| 2 | 0.1 | 0.5 | 0.5 | 0 | 0 | 776 | 726 | ferrite + $Fe_3C$ (FM4) |
| 5 | 0.1 | 0.5 | 0.5 | 0 | 0 | 803 | 740 | ferrite + $Fe_3C$ (FM6) |
| 8 | 0.1 | 0.5 | 0.5 | 0 | 0 | 829 | 752 | ferrite + $Fe_3C$ (FM8) |
| 5 | 0.1 | 0.5 | 0.5 | 0.2 | 0 | 803 | 740 | ferrite + $Fe_3C$ + VC |
| 5 | 0.1 | 0.5 | 0.5 | 0.4 | 0 | 802 | 773 | ferrite + $Fe_3C$ + VC |
| 5 | 0.1 | 0.5 | 0.5 | 0.5 | 0 | 802 | 830 | ferrite + VC |
| 5 | 0.1 | 0.5 | 0.5 | 0.6 | 0 | 802 | 855 | ferrite + VC |
| 5 | 0.1 | 0.5 | 0.5 | 0.8 | 0 | 803 | 880 | ferrite + VC |
| 5 | 0.1 | 0.5 | 0.5 | 1.0 | 0 | 805 | 896 | ferrite + VC |
| 5 | 0.1 | 0.5 | 0.5 | 1.5 | 0 | 807 | 928 | ferrite + VC |
| 5 | 0.1 | 0.5 | 0.5 | 2.0 | 0 | 810 | 959 | ferrite + VC |
| 6 | 0.1 | 0.5 | 0.5 | 0.5 | 0 | 811 | 835 | ferrite + VC |
| 7 | 0.1 | 0.5 | 0.5 | 0.5 | 0 | 819 | 839 | ferrite + VC |
| 8 | 0.1 | 0.5 | 0.5 | 0.5 | 0 | 828 | 843 | ferrite + VC |
| 9 | 0.1 | 0.5 | 0.5 | 0.5 | 0 | 836 | 847 | ferrite + VC |
| 10 | 0.1 | 0.5 | 0.5 | 0.5 | 0 | 845 | 852 | ferrite + VC |
| 11 | 0.1 | 0.5 | 0.5 | 0.5 | 0 | 853 | 856 | ferrite + VC |

TABLE 2-continued

| Composition (% by weight, balance being Fe) | | | | | | Calculation Results | | |
|---|---|---|---|---|---|---|---|---|
| Co | C | Mn | Si | V | Ti | $T_c$ (EC) | $A_1$ (EC) | Phases Present (~700EC) |
| 12 | 0.1 | 0.5 | 0.5 | 0.5 | 0 | 861 | 859 | ferrite + VC |
| 10 | 0.1 | 0.5 | 0.5 | 1.0 | 0 | 847 | 907 | ferrite + VC |
| 11 | 0.1 | 0.5 | 0.5 | 1.0 | 0 | 855 | 909 | ferrite + VC |
| 12 | 0.1 | 0.5 | 0.5 | 1.0 | 0 | 863 | 911 | ferrite + VC |
| 13 | 0.1 | 0.5 | 0.5 | 1.0 | 0 | 871 | 913 | ferrite + VC |
| 14 | 0.1 | 0.5 | 0.5 | 1.0 | 0 | 879 | 915 | ferrite + VC |
| 15 | 0.1 | 0.5 | 0.5 | 1.0 | 0 | 886 | 917 | ferrite + VC |
| 17 | 0.1 | 0.5 | 0.5 | 1.0 | 0 | 902 | 920 | ferrite + VC |
| 20 | 0.1 | 0.5 | 0.5 | 1.0 | 0 | 924 | 926 | ferrite + VC |
| 5 | 0.1 | 0.5 | 0.5 | 0 | 0.2 | 802 | 738 | ferrite + $Fe_3C$ + TiC |
| 5 | 0.1 | 0.5 | 0.5 | 0 | 0.3 | 802 | 738 | ferrite + $Fe_3C$ + TiC |
| 5 | 0.1 | 0.5 | 0.5 | 0 | 0.4 | 802 | 867 | ferrite + TiC |
| 5 | 0.1 | 0.5 | 0.5 | 0 | 0.45 | 802 | 896 | ferrite + TiC |
| 5 | 0.1 | 0.5 | 0.5 | 0 | 0.5 | 801 | 902 | ferrite + TiC |
| 5 | 0.1 | 0.5 | 0.5 | 0 | 1.0 | 795 | 934 | ferrite + TiC |
| 8 | 0.1 | 0.5 | 0.5 | 0 | 0.5 | 827 | 905 | ferrite + TiC |
| 10 | 0.1 | 0.5 | 0.5 | 0 | 0.5 | 844 | 908 | ferrite + TiC |
| 11 | 0.1 | 0.5 | 0.5 | 0 | 0.5 | 852 | 909 | ferrite + TiC |
| 12 | 0.1 | 0.5 | 0.5 | 0 | 0.5 | 860 | 911 | ferrite + TiC |
| 13 | 0.1 | 0.5 | 0.5 | 0 | 0.5 | 868 | 912 | ferrite + TiC |
| 14 | 0.1 | 0.5 | 0.5 | 0 | 0.5 | 876 | 914 | ferrite + TiC |
| 15 | 0.1 | 0.5 | 0.5 | 0 | 0.5 | 884 | 915 | ferrite + TiC |
| 17 | 0.1 | 0.5 | 0.5 | 0 | 0.5 | 899 | 918 | ferrite + TiC |
| 18 | 0.1 | 0.5 | 0.5 | 0 | 0.5 | 907 | 920 | ferrite + TiC |
| 19 | 0.1 | 0.5 | 0.5 | 0 | 0.5 | 914 | 921 | ferrite + TiC |
| 20 | 0.1 | 0.5 | 0.5 | 0 | 0.5 | 922 | 923 | ferrite + TiC |
| 21 | 0.1 | 0.5 | 0.5 | 0 | 0.5 | 929 | 924 | ferrite + TiC |
| 21 | 0.1 | 0.5 | 0.5 | 0 | 0.6 | 928 | 926 | ferrite + TiC |
| 21 | 0.1 | 0.5 | 0.5 | 0 | 0.7 | 926 | 928 | ferrite + TiC |
| 21 | 0.1 | 0.5 | 0.5 | 0 | 0.8 | 925 | 930 | ferrite + TiC |
| 21 | 0.1 | 0.5 | 0.5 | 0 | 1.0 | 922 | 934 | ferrite + TiC |
| 22 | 0.1 | 0.5 | 0.5 | 0 | 1.0 | 930 | 935 | ferrite + TiC |
| 23 | 0.1 | 0.5 | 0.5 | 0 | 1.0 | 937 | 936 | ferrite + TiC |

Several iron-cobalt alloys were prepared and their compositions are given in TABLE 3. These cast alloys were processed into rod and wire, and the measured and calculated $T_c$ for the rods is listed. Averages of cooling and heating $T_c$ measurements were used since no irreversible hysteresis effect was observed during heating and cooling. As shown in TABLE 3, the agreement between calculated $T_c$ and the measured $T_c$ was acceptable.

The measured $T_c$ were performed by inserting rods into a furnace and the $T_c$ temperature was measured during heating. A thermocouple was attached midway along the length. The torus technique involves winding a torus with the sample material.

TABLE 3

| Alloy Designation | Nominal Composition (% by weight, balance being Fe) | | | | $T_c$ (EC) (torus technique) | $T_c$ (EC) (rod, uncorrected) | $T_c$ (EC) (calculated) |
|---|---|---|---|---|---|---|---|
| | Co | C | Mn | Si | | | |
| FM1 | 0 | 0 | 0 | 0 | 768 | — | 770 |
| FM2 | 0 | 0.1 | 0.5 | 0.5 | — | 751 | 758 |
| FM3 | 5 | 0 | 0 | 0 | — | — | 818 |
| FM4 | 5 | 0.1 | 0.5 | 0.5 | — | 821 | 803 |
| FM5 | 8 | 0 | 0 | 0 | — | — | 842 |
| FM6 | 8 | 0.1 | 0.5 | 0.5 | — | 858 | 826 |
| FM7 | 10 | 0 | 0 | 0 | 863 | 886 | 859 |
| FM8 | 10 | 0.1 | 0.5 | 0.5 | — | 874 | 846 |

FIG. 182 depicts the Curie temperature (solid horizontal bars) and phase transformation temperature range (slashed vertical bars) for several iron alloys. Column 1360 is for FM-2 iron-cobalt alloy. Column 1362 is for FM-4 iron-cobalt alloy. Column 1364 is for FM-6 iron-cobalt alloy. Column 1366 is for FM-8 iron-cobalt alloy. Column 1368 is for TC1 410 stainless steel alloy with cobalt. Column 1370 is for TC2 410 stainless steel alloy with cobalt. Column 1372 is for TC3 410 stainless steel alloy with cobalt. Column 1374 is for TC4 410 stainless steel alloy with cobalt. Column 1376 is for TC5 410 stainless steel alloy with cobalt. As shown in FIG. 182, the iron-cobalt alloys (FM-2, FM-4, FM-6, FM-8) had large phase transformation temperature ranges that overlap with the Curie temperature. The 410 stainless steel alloys with cobalt (TC1, TC2, TC3, TC4, TC5) had small phase transformation temperature ranges. The phase transformation temperature ranges for TC1, TC2, and TC3 were above the Curie temperature. The phase transformation temperature range for TC4 was below the Curie temperature. Thus, a temperature limited heater using TC4 may self-limit at a temperature below the Curie temperature of the TC4.

FIGS. 183-186 depict the effects of alloy addition to iron-cobalt alloys. FIGS. 183 and 184 depict the effects of carbon addition to an iron-cobalt alloy. FIGS. 185 and 186 depict the effects of titanium addition to an iron-cobalt alloy.

FIG. 183 depicts experimental calculations of weight percentages of ferrite and austenite phases versus temperature for an iron-cobalt alloy with 5.63% by weight cobalt and 0.4% by weight manganese. Curve 1378 depicts weight percentage of the ferrite phase. Curve 1380 depicts weight percentage of the austenite phase. The arrow points to the Curie temperature of the alloy. As shown in FIG. 183, the phase transformation was close to the Curie temperature but did not overlap with the Curie temperature for this alloy.

FIG. 184 depicts experimental calculations of weight percentages of ferrite and austenite phases versus temperature for an iron-cobalt alloy with 5.63% by weight cobalt, 0.4% by weight manganese, and 0.01% carbon. Curve 1382 depicts weight percentage of the ferrite phase. Curve 1384 depicts weight percentage of the austenite phase. The arrow points to the Curie temperature of the alloy. As shown in FIGS. 183 and 184, the phase transformation broadened with the addition of carbon to the alloy with the onset of the phase transformation shifting to a lower temperature. Thus, carbon may be added to an iron alloy to lower the onset temperature and broaden the temperature range of the phase transformation.

FIG. 185 depicts experimental calculations of weight percentages of ferrite and austenite phases versus temperature for an iron-cobalt alloy with 5.63% by weight cobalt, 0.4% by weight manganese, and 0.085% carbon. Curve 1386 depicts weight percentage of the ferrite phase. Curve 1388 depicts weight percentage of the austenite phase. The arrow points to the Curie temperature of the alloy. As shown in FIG. 185, the phase transformation overlapped with the Curie temperature.

FIG. 186 depicts experimental calculations of weight percentages of ferrite and austenite phases versus temperature for an iron-cobalt alloy with 5.63% by weight cobalt, 0.4% by weight manganese, 0.085% carbon, and 0.4% titanium. Curve 1390 depicts weight percentage of the ferrite phase. Curve 1392 depicts weight percentage of the austenite phase. The arrow points to the Curie temperature of the alloy. As shown in FIGS. 185 and 186, the phase transformation narrowed with the addition of titanium to the alloy with the onset of the phase transformation shifting to a higher temperature. Thus, titanium may be added to an iron alloy to raise the onset temperature and narrow the temperature range of the phase transformation.

FIG. 187 depicts experimental calculations of weight percentages of ferrite and austenite phases versus temperature for 410 stainless steel type alloy (12% by weight chromium, 0.1% by weight carbon, 0.5% by weight manganese, 0.5% by weight silicon, with the balance being iron). Curve 1394 depicts weight percentage of the ferrite phase. Curve 1396 depicts weight percentage of the austenite phase. The arrow points to the Curie temperature of the alloy. As shown in FIG. 187, the phase transformation broadened without chromium in the alloy and the phase transformation overlaps with the Curie temperature for this alloy.

Calculations for the Curie temperature and the phase transformation behavior were done for various mixtures of cobalt, carbon, manganese, silicon, vanadium, and titanium using the computational thermodynamic software (ThermoCalc and JmatPro) to predict the effect of additional elements on Curie Temperature ($T_c$) for selected compositions and the temperature ($A_1$) at which ferrite transforms to paramagnetic austenite. An equilibrium calculation temperature of 700° C. was used in all calculations. As shown in TABLE 4, as the weight percentage of cobalt in the composition increased, $T_c$ and $A_1$ decreased. As shown in TABLE 4, addition of vanadium and/or titanium increased $A_1$. The addition of vanadium may allow increased amounts of chromium to be used in Curie heaters.

TABLE 4

| Composition (% by weight, balance being Fe) | | | | | | | Calculation Results | |
|---|---|---|---|---|---|---|---|---|
| Co | Cr | C | Mn | Si | V | Ti | $T_c$ (EC) | $A_1$ (EC) |
| 0 | 12 | 0.1 | 0.5 | 0.5 | 0 | 0 | 723 | 814 |
| 2 | 12 | 0.1 | 0.5 | 0.5 | 0 | 0 | 739 | 800 |
| 4 | 12 | 0.1 | 0.5 | 0.5 | 0 | 0 | 754 | 788 |
| 6 | 12 | 0.1 | 0.5 | 0.5 | 0 | 0 | 769 | 780 |
| 8 | 12 | 0.1 | 0.5 | 0.5 | 0 | 0 | 783 | 773 |
| 10 | 12 | 0.1 | 0.5 | 0.5 | 0 | 0 | 797 | 766 |
| 0 | 12 | 0.1 | 0.5 | 0.5 | 1 | 0 | 726 | |
| 2 | 12 | 0.1 | 0.5 | 0.5 | 1 | 0 | 741 | |
| 4 | 12 | 0.1 | 0.5 | 0.5 | 1 | 0 | 756 | |
| 6 | 12 | 0.1 | 0.5 | 0.5 | 1 | 0 | 770 | |
| 8 | 12 | 0.1 | 0.5 | 0.5 | 1 | 0 | 784 | 794 |
| 10 | 12 | 0.1 | 0.5 | 0.5 | 1 | 0 | 797 | |
| 0 | 12 | 0.1 | 0.5 | 0.5 | 2 | 0 | 726 | |
| 2 | 12 | 0.1 | 0.5 | 0.5 | 2 | 0 | 742 | |
| 6 | 12 | 0.1 | 0.5 | 0.5 | 2 | 0 | 772 | |
| 8 | 12 | 0.1 | 0.5 | 0.5 | 2 | 0 | 785 | 817 |
| 10 | 12 | 0.1 | 0.5 | 0.5 | 2 | 0 | 797 | |
| 0 | 12 | 0.1 | 0.5 | 0.5 | 0 | 0.5 | 718 | 863 |
| 2 | 12 | 0.1 | 0.5 | 0.5 | 0 | 0.5 | 733 | 825 |
| 4 | 12 | 0.1 | 0.5 | 0.5 | 0 | 0.5 | 747 | 803 |
| 6 | 12 | 0.1 | 0.5 | 0.5 | 0 | 0.5 | 761 | 787 |
| 8 | 12 | 0.1 | 0.5 | 0.5 | 0 | 0.5 | 775 | 775 |
| 10 | 12 | 0.1 | 0.5 | 0.5 | 0 | 0.5 | 788 | 767 |
| 0 | 12 | 0.1 | 0.5 | 0.5 | 1 | 0.5 | 721 | |
| 2 | 12 | 0.1 | 0.5 | 0.5 | 1 | 0.5 | 736 | |
| 4 | 12 | 0.1 | 0.5 | 0.5 | 1 | 0.5 | 750 | |
| 6 | 12 | 0.1 | 0.5 | 0.5 | 1 | 0.5 | 763 | |
| 8 | 12 | 0.1 | 0.5 | 0.5 | 1 | 0.5 | 776 | |
| 10 | 12 | 0.1 | 0.5 | 0.5 | 1 | 0.5 | 788 | |
| 0 | 12 | 0.1 | 0.5 | 0.5 | 2 | 0.5 | 725 | |
| 2 | 12 | 0.1 | 0.5 | 0.5 | 2 | 0.5 | 738 | |
| 4 | 12 | 0.1 | 0.5 | 0.5 | 2 | 0.5 | 752 | |
| 6 | 12 | 0.1 | 0.5 | 0.5 | 2 | 0.5 | 764 | |
| 8 | 12 | 0.1 | 0.5 | 0.5 | 2 | 0.5 | 777 | |
| 10 | 12 | 0.1 | 0.5 | 0.5 | 2 | 0.5 | 788 | |
| 0 | 12 | 0.1 | 0.5 | 0.5 | 0 | 1 | 712 | >1000 |
| 2 | 12 | 0.1 | 0.5 | 0.5 | 0 | 1 | 727 | 877 |
| 4 | 12 | 0.1 | 0.5 | 0.5 | 0 | 1 | 741 | 836 |
| 6 | 12 | 0.1 | 0.5 | 0.5 | 0 | 1 | 755 | 810 |
| 8 | 12 | 0.1 | 0.5 | 0.5 | 0 | 1 | 768 | 794 |
| 10 | 12 | 0.1 | 0.5 | 0.5 | 0 | 1 | 781 | 780 |
| 0 | 12 | 0.1 | 0.5 | 0.5 | 1 | 1 | 715 | |
| 2 | 12 | 0.1 | 0.5 | 0.5 | 1 | 1 | 730 | |
| 4 | 12 | 0.1 | 0.5 | 0.5 | 1 | 1 | 743 | |
| 6 | 12 | 0.1 | 0.5 | 0.5 | 1 | 1 | 757 | |
| 8 | 12 | 0.1 | 0.5 | 0.5 | 1 | 1 | 770 | 821 |
| 10 | 12 | 0.1 | 0.5 | 0.5 | 1 | 1 | 782 | |
| 0 | 12 | 0.1 | 0.5 | 0.5 | 2 | 1 | 718 | |
| 2 | 12 | 0.1 | 0.5 | 0.5 | 2 | 1 | 732 | |
| 4 | 12 | 0.1 | 0.5 | 0.5 | 2 | 1 | 745 | |
| 6 | 12 | 0.1 | 0.5 | 0.5 | 2 | 1 | 758 | |
| 8 | 12 | 0.1 | 0.5 | 0.5 | 2 | 1 | 770 | 873 |
| 10 | 12 | 0.1 | 0.5 | 0.5 | 2 | 1 | 782 | |
| 0 | 12 | 0.1 | 0.3 | 0.5 | 0 | 0 | 727 | 826 |
| 2 | 12 | 0.1 | 0.3 | 0.5 | 0 | 0 | 742 | 810 |
| 4 | 12 | 0.1 | 0.3 | 0.5 | 0 | 0 | 758 | 800 |
| 6 | 12 | 0.1 | 0.3 | 0.5 | 0 | 0 | 772 | 791 |
| 8 | 12 | 0.1 | 0.3 | 0.5 | 0 | 0 | 786 | 784 |
| 10 | 12 | 0.1 | 0.3 | 0.5 | 0 | 0 | 800 | 777 |
| 0 | 12 | 0.1 | 0.3 | 0.5 | 1 | 0 | 730 | |
| 2 | 12 | 0.1 | 0.3 | 0.5 | 1 | 0 | 745 | |
| 4 | 12 | 0.1 | 0.3 | 0.5 | 1 | 0 | 760 | |
| 6 | 12 | 0.1 | 0.3 | 0.5 | 1 | 0 | 774 | |
| 8 | 12 | 0.1 | 0.3 | 0.5 | 1 | 0 | 787 | |
| 10 | 12 | 0.1 | 0.3 | 0.5 | 1 | 0 | 801 | |
| 0 | 12 | 0.1 | 0.3 | 0.5 | 2 | 0 | 730 | |
| 2 | 12 | 0.1 | 0.3 | 0.5 | 2 | 0 | 746 | |
| 4 | 12 | 0.1 | 0.3 | 0.5 | 2 | 0 | 762 | |
| 6 | 12 | 0.1 | 0.3 | 0.5 | 2 | 0 | 775 | |
| 8 | 12 | 0.1 | 0.3 | 0.5 | 2 | 0 | 788 | |
| 10 | 12 | 0.1 | 0.3 | 0.5 | 2 | 0 | 801 | |
| 0 | 12 | 0.1 | 0.3 | 0.5 | 0 | 0.5 | 722 | |
| 2 | 12 | 0.1 | 0.3 | 0.5 | 0 | 0.5 | 737 | |
| 4 | 12 | 0.1 | 0.3 | 0.5 | 0 | 0.5 | 751 | |
| 6 | 12 | 0.1 | 0.3 | 0.5 | 0 | 0.5 | 765 | |
| 8 | 12 | 0.1 | 0.3 | 0.5 | 0 | 0.5 | 779 | |
| 10 | 12 | 0.1 | 0.3 | 0.5 | 0 | 0.5 | 792 | |
| 0 | 12 | 0.1 | 0.3 | 0.5 | 1 | 0.5 | 725 | |
| 2 | 12 | 0.1 | 0.3 | 0.5 | 1 | 0.5 | 740 | |
| 4 | 12 | 0.1 | 0.3 | 0.5 | 1 | 0.5 | 753 | |
| 6 | 12 | 0.1 | 0.3 | 0.5 | 1 | 0.5 | 767 | |
| 8 | 12 | 0.1 | 0.3 | 0.5 | 1 | 0.5 | 780 | |
| 10 | 12 | 0.1 | 0.3 | 0.5 | 1 | 0.5 | 792 | |
| 0 | 12 | 0.1 | 0.3 | 0.5 | 2 | 0.5 | 728 | |
| 2 | 12 | 0.1 | 0.3 | 0.5 | 2 | 0.5 | 742 | |
| 4 | 12 | 0.1 | 0.3 | 0.5 | 2 | 0.5 | 755 | |
| 6 | 12 | 0.1 | 0.3 | 0.5 | 2 | 0.5 | 768 | |
| 8 | 12 | 0.1 | 0.3 | 0.5 | 2 | 0.5 | 780 | |
| 10 | 12 | 0.1 | 0.3 | 0.5 | 2 | 0.5 | 792 | |
| 0 | 12 | 0.1 | 0.3 | 0.5 | 0 | 1 | 715 | |
| 2 | 12 | 0.1 | 0.3 | 0.5 | 0 | 1 | 730 | |
| 4 | 12 | 0.1 | 0.3 | 0.5 | 0 | 1 | 745 | |
| 6 | 12 | 0.1 | 0.3 | 0.5 | 0 | 1 | 759 | |
| 8 | 12 | 0.1 | 0.3 | 0.5 | 0 | 1 | 772 | |
| 10 | 12 | 0.1 | 0.3 | 0.5 | 0 | 1 | 785 | |
| 0 | 12 | 0.1 | 0.3 | 0.5 | 1 | 1 | 719 | |
| 2 | 12 | 0.1 | 0.3 | 0.5 | 1 | 1 | 733 | |
| 4 | 12 | 0.1 | 0.3 | 0.5 | 1 | 1 | 747 | |
| 6 | 12 | 0.1 | 0.3 | 0.5 | 1 | 1 | 760 | |
| 8 | 12 | 0.1 | 0.3 | 0.5 | 1 | 1 | 773 | 834 |
| 10 | 12 | 0.1 | 0.3 | 0.5 | 1 | 1 | 786 | |
| 0 | 12 | 0.1 | 0.3 | 0.5 | 2 | 1 | 722 | |
| 2 | 12 | 0.1 | 0.3 | 0.5 | 2 | 1 | 736 | |
| 4 | 12 | 0.1 | 0.3 | 0.5 | 2 | 1 | 749 | |
| 6 | 12 | 0.1 | 0.3 | 0.5 | 2 | 1 | 762 | |
| 8 | 12 | 0.1 | 0.3 | 0.5 | 2 | 1 | 774 | 886 |
| 10 | 12 | 0.1 | 0.3 | 0.5 | 2 | 1 | 786 | |
| 7.5 | 12.25 | 0.1 | 0.3 | 0.5 | 0 | 0 | 781 | 785 |
| 8.0 | 12.25 | 0.1 | 0.3 | 0.5 | 0 | 0 | 785 | 783 |
| 8.5 | 12.25 | 0.1 | 0.3 | 0.5 | 0 | 0 | 788 | 781 |
| 9.0 | 12.25 | 0.1 | 0.3 | 0.5 | 0 | 0 | 792 | 779 |
| 9.5 | 12.25 | 0.1 | 0.3 | 0.5 | 0 | 0 | 795 | 778 |
| 10.0 | 12.25 | 0.1 | 0.3 | 0.5 | 0 | 0 | 798 | 776 |
| 6.0 | 12.25 | 0.1 | 0.5 | 0.5 | 0 | 0 | 767 | 780 |
| 6.5 | 12.25 | 0.1 | 0.5 | 0.5 | 0 | 0 | 771 | 778 |
| 7.0 | 12.25 | 0.1 | 0.5 | 0.5 | 0 | 0 | 774 | 776 |
| 7.5 | 12.25 | 0.1 | 0.5 | 0.5 | 0 | 0 | 778 | 774 |
| 7.5 | 12.25 | 0.1 | 0.3 | 0.5 | 1 | 0 | 782 | 812 |

TABLE 4-continued

| Composition (% by weight, balance being Fe) | | | | | | | Calculation Results | |
|---|---|---|---|---|---|---|---|---|
| Co | Cr | C | Mn | Si | V | Ti | $T_c$ (EC) | $A_1$ (EC) |
| 8.0 | 12.25 | 0.1 | 0.3 | 0.5 | 1 | 0 | 786 | 809 |
| 8.5 | 12.25 | 0.1 | 0.3 | 0.5 | 1 | 0 | 789 | 806 |
| 9.0 | 12.25 | 0.1 | 0.3 | 0.5 | 1 | 0 | 792 | 804 |
| 9.5 | 12.25 | 0.1 | 0.3 | 0.5 | 1 | 0 | 795 | 801 |
| 10.0 | 12.25 | 0.1 | 0.3 | 0.5 | 1 | 0 | 799 | 799 |
| 7.5 | 12.25 | 0.1 | 0.5 | 0.5 | 1 | 0 | 779 | 801 |
| 8.0 | 12.25 | 0.1 | 0.5 | 0.5 | 1 | 0 | 782 | 799 |
| 8.5 | 12.25 | 0.1 | 0.5 | 0.5 | 1 | 0 | 785 | 796 |
| 9.0 | 12.25 | 0.1 | 0.5 | 0.5 | 1 | 0 | 788 | 793 |
| 9.5 | 12.25 | 0.1 | 0.5 | 0.5 | 1 | 0 | 792 | 791 |
| 10.0 | 12.25 | 0.1 | 0.5 | 0.5 | 1 | 0 | 795 | 788 |
| 7.5 | 12.25 | 0.1 | 0.3 | 0.5 | 0 | 0.5 | 774 | 788 |
| 8.0 | 12.25 | 0.1 | 0.3 | 0.5 | 0 | 0.5 | 777 | 785 |
| 8.5 | 12.25 | 0.1 | 0.3 | 0.5 | 0 | 0.5 | 781 | 782 |
| 9.0 | 12.25 | 0.1 | 0.3 | 0.5 | 0 | 0.5 | 784 | 780 |
| 7.5 | 12.25 | 0.1 | 0.5 | 0.5 | 0 | 0.5 | 770 | 777 |
| 8.0 | 12.25 | 0.1 | 0.5 | 0.5 | 0 | 0.5 | 774 | 774 |
| 8.5 | 12.25 | 0.1 | 0.5 | 0.5 | 0 | 0.5 | 777 | 771 |
| 7.5 | 12.25 | 0.1 | 0.3 | 0.5 | 1 | 0.5 | 775 | 823 |
| 8.0 | 12.25 | 0.1 | 0.3 | 0.5 | 1 | 0.5 | 778 | 819 |
| 8.5 | 12.25 | 0.1 | 0.3 | 0.5 | 1 | 0.5 | 782 | 814 |
| 9.0 | 12.25 | 0.1 | 0.3 | 0.5 | 1 | 0.5 | 785 | 810 |
| 9.5 | 12.25 | 0.1 | 0.3 | 0.5 | 1 | 0.5 | 788 | 807 |
| 10.0 | 12.25 | 0.1 | 0.3 | 0.5 | 1 | 0.5 | 791 | 803 |
| 10.5 | 12.25 | 0.1 | 0.3 | 0.5 | 1 | 0.5 | 794 | 800 |
| 11.0 | 12.25 | 0.1 | 0.3 | 0.5 | 1 | 0.5 | 797 | 797 |
| 7.5 | 12.25 | 0.1 | 0.5 | 0.5 | 1 | 0.5 | 771 | 811 |
| 8.0 | 12.25 | 0.1 | 0.5 | 0.5 | 1 | 0.5 | 775 | 807 |
| 8.5 | 12.25 | 0.1 | 0.5 | 0.5 | 1 | 0.5 | 778 | 803 |
| 9.0 | 12.25 | 0.1 | 0.5 | 0.5 | 1 | 0.5 | 781 | 799 |
| 9.5 | 12.25 | 0.1 | 0.5 | 0.5 | 1 | 0.5 | 784 | 796 |
| 10.0 | 12.25 | 0.1 | 0.5 | 0.5 | 1 | 0.5 | 787 | 792 |
| 10.5 | 12.25 | 0.1 | 0.5 | 0.5 | 1 | 0.5 | 790 | 789 |

Several iron-chromium alloys were prepared and their compositions are given in TABLE 5. These cast alloys were processed into rod and torus, and the calculated and measured $T_c$ for the torus and rods is listed.

TABLE 5

| Alloy Designation | Actual Composition (% by weight, balance Fe) | | | | | | | $T_C$ (EC) (torus) | $T_C$ (EC) (rod, uncorrected) | $T_C$ (EC) (calorimetry) | $T_C$ (EC) (calculated) | $A_1$ (EC) (calculated) |
|---|---|---|---|---|---|---|---|---|---|---|---|---|
| | Co | Cr | C | Mn | Si | V | Ti | | | | | |
| TC1b | 0.02 | 13.2 | 0.08 | 0.45 | 0.69 | 0 | 0.01 | 692 | — | — | 717 | 819 |
| TC2 | 2.44 | 12.3 | 0.10 | 0.48 | 0.47 | 0 | 0.01 | — | 745 | — | 742 | 793 |
| TC3 | 4.81 | 12.3 | 0.10 | 0.48 | 0.46 | 0 | 0.01 | — | 758 | — | 761 | 783 |
| TC4 | 9.75 | 12.2 | 0.07 | 0.49 | 0.47 | 0 | 0.01 | 759/ 682* | 770/ 684* | — | 793 | 765 |
| TC5 | 9.80 | 12.2 | 0.10 | 0.48 | 0.46 | 1.02 | 0.01 | — | 784/ 690* | — | 795 | 790 |
| TC6 | 7.32 | 12.3 | 0.12 | 0.29 | 0.46 | 0.89 | 0.46 | 754 | — | 752 | 775 | 813 |
| TC7 | 7.46 | 12.1 | 0.11 | 0.27 | 0.46 | 0.92 | 0 | 747 | — | 757 | 785 | 811 |
| TC8 | 7.49 | 12.1 | 0.11 | 0.28 | 0.45 | 0 | 0 | 761 | — | 774 | 784 | 786 |

*Two values represent $T_C$ during heating and $T_C$ during subsequent cooling.

nickel and chromium are typically included in the alloys to impart corrosion resistance. When two components may be included to accomplish the same result, then the less expensive component may be beneficially included. For example, to the extent manganese may be substituted for nickel without sacrificing performance, such a substitution may reduce the cost of the alloy at current component prices.

The effect of total phase content of the alloys similar to those described above has been found to be approximated by the equation:

$$\sigma_r = 1.0235(TPC) + 5.5603 \qquad (10)$$

Where $\sigma_r$ is the creep rupture strength for one thousand hours at 800° C. in (kilo-pound per square inch (ksi) and TPC is the total phase content calculated for the composition. This estimate was further improved by only including in the TPC term the amount of Cu phase, Z phase, M(C,N) phase, $M_2$(C,N) phase, and $M_{23}C_6$ phase (the "desirable phases"), and calculating the constants on this basis. Another improvement to this estimate may be to use only the difference between the desirable phases present at the annealing temperature and at 800° C. Thus, the components that do not go into solution in the annealing process were not considered because they do not add significantly to the strength of the alloys at elevated temperatures. For example, the difference between the amount of Cu phase, Z phase, M(C,N) phase, $M_2$(C,N) phase, and $M_{23}C_6$ phase present based on equilibrium calculations at annealing temperatures less the amount calculated to be present at 800° C. may be about 1% by weight of the alloy, or it could be about 1.5% by weight of the alloy or about 2% by weight of the alloy, to result in an alloy with good high temperature strength. Further, the annealing temperature may be about 1200° C., or it may be about 1250° C., or it may be about 1300° C.

The improved alloys of the present invention may be further understood by modeling the addition, or reduction, of different metals to determine the effect of changing amounts of that metal on the phase content of the alloy. For example, Modeling of Alloy Phase Behavior Modeling of phase behavior for different improved alloy compositions to determine compositions that contain increased amounts of phases that contribute positively to physical properties was performed. Compositions such as Cu, Z, M(C,N), $M_2$(C,N), and $M_{23}C_6$, and may minimize the amount of phases that are embritting phases such as G, sigma, laves, and chi. There may be other reasons to include certain components. For example, silicon, is typically included in stainless steel alloys to improve processing properties, and with a starting composition by weight of: 20% Cr, 3% Cu, 4% Mn, 0.3% Mo, 0.8% Nb, 12.5% Ni, 0.5% Si, 1% W, 0.1% C and 0.25% N, modeling with varying amounts of Cr results in included phases of $M_{23}C_6$, M(C,N), $M_2$(C,N), Z, Cu, chi, laves, G, and sigma at 800° C., according to FIG. 188. The amount of these phases plotted in each of FIGS. 188-198 is the calculated amount of these phases at 800° C. In FIGS. 188-198, curve 1398 refers to $M_{23}C_6$, curve 1400 refers to $M_2$(C,N) phase, curve 1402 refers to Z phase, curve 1404 refers to Cu phase, curve 1406 refers to sigma phase, curve 1408 refers to chi phase, curve 1410 refers to G phase, curve 1412 refers to laves phase, and curve 1414 refers to M(C,N) phase.

FIG. 188 depicts the weight percentages of phases versus weigh percentage of chromium (Cr) in the alloy. As shown, the weight percentages of phases 1398, 1400, 1402, and 1404 remained relatively constant from about 20% by weight to about 30% by weight of chromium, while sigma phase 1406 increased linearly above a chromium content of about 20.5% by weight. Thus, from the modeling, a chromium content between about 20% by weight and about 20.5% by weight of the alloy may be favorable.

FIG. 189 depicts weight percentages of phases versus the weight percentage of silicon (Si) in the alloy. As shown in FIG. 189, varying the silicon content of the alloy resulted in sigma phase 1406 appearing at levels above about 1.2% by weight silicon and chi phase 1408 appearing above a content of about 1.4% by weight silicon. G phase 1410 appeared above about 1.6% by weight silicon and increased as the weight percent of silicon increased. With increasing weight percentages of silicon, phases 1398, 1400, and 1402, remained relatively constant and a slight increase in Cu phase 1404 was predicted. The appearance of sigma phase 1406, chi phase 1408 and G phase 1410 indicates that a silicon content below about 1.2% by weight in this alloy may be favorable.

FIG. 190 depicts weight percentage of phases formed versus weight percentage of tungsten (W) in the alloy. As shown in FIG. 190, varying the weight percentage of tungsten (W) in the alloy resulted in sigma phase 1406 appearing at about 1.4% by weight tungsten. Laves phase 1412 appeared at about 1.5% by weight tungsten and increased with increasing weight percentage of tungsten. Thus, the model predicts a tungsten content in this alloy of below about 1.3% by weight may be favorable.

FIG. 191 depicts weight percentage of phases formed versus the weight percentage of niobium (Nb) in the alloy. As shown in FIG. 191, modeling predicted that weight percentage of Z phase 1402 increased in a linear fashion as the weight percentage of niobium (Nb) increased in the alloy until the niobium content of the alloy reached about 1.55% by weight. As the niobium content increased from about 0.1% by weight to about 1.4% by weight, $M_2(C,N)$ phase 1400 decreased fairly linearly. The decrease in $M_2(C,N)$ phase 1400 was compensated for by the increase in Z phase 1402, and Cu phase 1404 and $M_{23}C_6$ phase 1398. Above about 1.5% by weight niobium in the alloy, sigma phase 1406 increased rapidly, Z phase 1402 decreased, $M_{23}C_6$ phase 1398 decreased, and M(C,N) phase 1414 appeared. Thus, the niobium content in the alloy of at most 1.5% by weight may maximize the weight percent of phases 1398, 1400, 1402, and 1404 and avoid minimizing the weight percent of sigma phase 1406 formed in the alloy. In order to make the alloy hot-workable, it was found that at least about 0.5% by weight of niobium was desirable. Thus, in some embodiments, the alloy contains from about 0.5% by weight to about 1.5% by weight, or from about 0.8% by weight to about 1% by weight niobium.

FIG. 192 depicts weight percentages of phases formed versus weight percentage of carbon (C). As shown in FIG. 192, weight percentage of sigma phase 1406 was predicted to decrease as the weight percentage of carbon in the alloy increased from about 0 to about 0.06. The weight percentage of $M_{23}C_6$ phase 1398 was predicted to increase linearly as the weight percentage of carbon in the alloy increased to at most 0.5. $M_2(C,N)$ phase 1400, Z phase 1402, and Cu phase 1404 was predicted to remain relatively constant as the weight percentage of carbon increased in the alloy. Since, sigma phase 1406 decreased after about 0.06% by weight carbon, a carbon content of about 0.06% by weight to about 0.2% weight in the alloy may be beneficial.

FIG. 193 depicts weight percentage of phases formed versus weight percentage of nitrogen (N). As shown in FIG. 193, the content of nitrogen in the alloy increased from about 0% by weight to about 0.15% by weight, a content of sigma phase 1406 decreased from about 7% by weight to about 0% by weight, a content of M(C,N) phase 1414 decreased from about 1% by weight to about 0% by weight, a content of $M_{23}C_6$ phase 1398 increased from about 0% by weight to about 1.9% by weight, and a content of Z phase 1402 increased from about 0% by weight to about 1.4% by weight. Above a nitrogen content of 0.15% by weight in the alloy, $M_2(C,N)$ phase 1400 appeared and increased with as the content of nitrogen in the alloy increases. Thus, a nitrogen content in a range of about 0.15% to about 0.5% by weight in the alloy may be beneficial.

FIG. 194 depicts weight percentage of phases formed versus weight percentage of titanium (Ti). As shown in FIG. 194, varying the weight percentage of titanium from 0.19 to about 1 may contribute to an increase in a weight percentage of sigma phase 1406 from about 0 to about 7.5 in the alloy. Thus, a titanium content of below about 0.2% by weight in the alloy may be desirable. As shown, as the content of Ti increased from about 0% by weight to about 0.2% by weight, an increase in the weight percentage of M(C,N) phase 1414 occurred, a decrease in the weight percentage of $M_2(C,N)$ phase 1400 occurred, and a decrease in the weight percentage Z phase 1402 occurred. The decreases in the amount of $M_2(C,N)$ phase 1400 and Z phase 1402 appear to offset the increase in the weight percent of M(C,N) phase 1414. Thus, inclusion of Ti in the alloy may be for purposes other than for increasing the amount of phases that improve properties of the alloy.

FIG. 195 depicts weight percentage of phases formed versus weight percentage of copper (Cu). As shown in FIG. 195, weight percentages of $M_{23}C_6$ phase 1398, $M_2(C,N)$ phase 1400, and Z phase 1402 did not vary significantly as the weight percent of copper in the alloy increased. When the content of copper in the alloy increases above about 2.5% by weight, Cu phase 1404 increased significantly. Thus, in some embodiments, it is desirable to have more than about 3% by weight copper in the alloy. In some embodiments, about 10% by weight of copper in the alloy is beneficial.

FIG. 196 depicts weight percentage of phases formed versus weight percentage of manganese (Mn). As shown in FIG. 196, varying the content of manganese in the alloy did not greatly affect the weight percentage of beneficial phases $M_{23}C_6$ phase 1398, $M_2(C,N)$ phase 1400, Z phase 1402, and Cu phase 1404 in the alloy. The amount of manganese may therefore be varied in order to reduce cost, or for other reasons, without significantly effecting the high temperature properties of the alloy, with an acceptable range of manganese content of the alloy being from about 2% by weight to about 10% by weight.

FIG. 197 depicts weight percentage of phases formed versus weight percentage of nickel (Ni). As shown in FIG. 197, as the nickel content of the alloy increased above about 8.4% by weight, a decrease in sigma phase 1406 was observed. As the Ni content of the alloy was increased from about 8% by weight to about 17% by weight, Cu phase 1404 decreased almost linearly until it disappeared at about 17% by weight and a small increase in the weight percentage of $M_2(C,N)$ phase 1400 was predicted. From the model, a content of nickel of about 10% by weight to about 15% by weight in the alloy, or in other embodiments, a nickel content of about 12% by weight to about 13% by weight in the alloy may avoid the formation of sigma phase 1406, while improvements in corrosion properties offset any detrimental effect of less Cu phase 1404.

FIG. 198 depicts weight percentage of phases formed versus weight percentage of molybdenum (Mo). As shown in FIG. 198, the weight percentage of beneficial phases $M_{23}C_6$ phase 1398, $M_2(C,N)$ phase 1400, Z phase 1402, and Cu phase 1404 remained relatively constant as the weight percentage of molybdenum in the alloy was varied. As Mo content of the alloy exceeded about 0.65% by weight, the weight percentages of sigma phase 1406 and chi phase 1408 in the alloy increased significantly with no significant changes in the other phases. The content of molybdenum in the alloy, in some embodiments, may therefore be limited to at most about 0.5% by weight. PS Alloy Examples Alloys A through N were prepared according to TABLE 6. Measured compositions are included in the table when such measurements are available. The total phase content of the alloys are calculated for the composition listed.

about 12.7 millimeter (0.5 inch) at 1200° C. with intermediate heat. The samples were then cold rolled to a 6.34 millimeter (0.25 inch) thick plate and vacuum annealed at 1200° C. for one hour. The compositions of the samples are included in TABLE 7 below, with the balance of the compositions being iron.

When alloy D was hot rolled, it cracked and the rolling to 12.7 millimeter (0.5 inch) thickness could not be accomplished. Alloy L could be hot-rolled, but developed cracks from the edge of the samples progressing toward the center of the sample, and would not be a useful material after such hot rolling. The other samples were processed using the above described procedure without any problems, resulting in 6.35 millimeter (0.25 inch) plates that were free of cracks. It has been found that even 0.07% by weight niobium in the alloy composition may significantly reduce the tendency of the alloy to develop cracks during hot working, and about 0.5%

TABLE 6

| | | % by weight | | | | | | | | | | |
|---|---|---|---|---|---|---|---|---|---|---|---|---|
| Alloy | | Cr | Cu | Mn | Mo | Nb | Ni | Si | W | C | $N_2$ | Ti | 800° C. Total Phase |
| A | Target | 20 | — | 4 | 0.3 | 0.8 | 12.5 | 0.5 | — | 0.09 | 0.25 | — | |
| | Actual[b] | 19 | — | 4.2 | 0.3 | 0.8 | 12.5 | 0.5 | — | 0.09 | 0.24 | — | 3.35[a] |
| B | Target | 20 | 3 | 4 | 0.3 | 0.8 | 13 | 0.5 | 1 | 0.09 | 0.25 | — | |
| | Actual-1[b] | 20 | 3 | 4 | 0.3 | 0.77 | 13 | 0.5 | 1 | 0.09 | 0.26 | — | 4.40[a] |
| | Actual-2[b] | 20.35 | 2.94 | 4.09 | 0.28 | 0.76 | 12.52 | 0.44 | 1.03 | 0.09 | 0.23 | — | |
| | Actual-3[b,c] | 18.78 | 2.94 | 2.85 | 0.29 | 0.65 | 12.75 | 0.39 | 1.03 | 0.10 | 0.23 | 0.004 | |
| C | Target | 20 | 4.5 | 4 | 0.3 | 0.8 | 12.5 | 0.5 | 1 | 0.15 | 0.25 | — | 7.15 |
| | Actual-1[b] | 18.74 | 4.37 | 3.68 | 0.29 | 0.77 | 13.00 | 0.43 | 1.18 | 0.11 | 0.17 | 0.002 | 5.45 |
| | Actual-2[c,b] | 20.48 | 4.75 | 4.13 | 0.30 | 0.07 | 12.81 | 0.52 | 1.18 | 0.17 | 0.14 | 0.01 | 6.23 |
| D | Target | 20 | 4.5 | 4 | 0.3 | 0 | 12.5 | 0.5 | 1 | 0.2 | 0.5 | 0 | 10 |
| E | Target | 20 | 4 | 4 | 0.5 | 0.8 | 12.5 | 0.5 | 1 | 0.1 | 0.3 | — | 6.2 |
| | Actual | 18.84 | 4.34 | 3.65 | 0.29 | 0.75 | 12.93 | 0.43 | 1.21 | 0.09 | 0.2 | 0.002 | 5.3 |
| F | Target | 20 | 3 | 1 | 0.3 | 0.77 | 13 | 0.5 | 1 | 0.09 | 0.26 | — | 4.7 |
| | Actual[b] | 18.97 | 2.88 | 0.92 | 0.29 | 0.74 | 13.25 | 0.43 | 1.17 | 0.05 | 0.12 | <0.001 | 2.45 |
| G | Target | 20 | 4.5 | 4 | 0.3 | 0.8 | 7 | 0.5 | 1 | 0.2 | 0.5 | — | |
| | Actual[e] | 20.08 | 4.36 | 4 | 0.3 | 0.81 | 7.01 | 0.5 | 1.04 | 0.24 | 0.31 | 0.008 | 9.6[a] |
| H | Target | 21 | 3 | 3 | 0.3 | 0.80 | 7 | 1 | 2 | 0.1 | 0.4 | — | |
| | Actual[e] | 21.1 | 2.95 | 3.01 | 0.31 | 0.82 | 6.98 | 0.51 | 2.06 | 0.13 | 0.32 | <0.001 | 13.46[f] |
| I | Target | 21 | 3 | 8 | 0.3 | 0.80 | 7 | 0.5 | 1 | 0.1 | 0.5 | — | 7.1 |
| | Actual[e] | 21.31 | 2.94 | 7.95 | 0.31 | 0.83 | 7.02 | 0.52 | 1.05 | 0.13 | 0.37 | 0.003 | 9.45 |
| J | Target | 20 | 4 | 2 | 0.5 | 1.00 | 12.5 | 1 | 1 | 0.20 | 0.50 | — | 9.8 |
| | Actual[e] | 19.93 | 3.85 | 2.13 | 0.5 | 0.99 | 12.11 | 1.08 | 1.01 | 0.23 | 0.29 | 0.022 | 8.95 |
| K | Target | 20 | 3 | 4 | 0.3 | 0.77 | 13 | 0.5 | 1 | 0.09 | 0.26 | — | |
| | Actual[e] | 18.94 | 2.96 | 4.01 | 0.31 | 0.81 | 13.05 | 0.52 | 1.03 | 0.12 | 0.35 | 0.018 | 5.62 |
| L | Target | 20 | 3 | 4 | 0.3 | 0.10 | 13 | 0.5 | 1 | 0.09 | 0.26 | — | |
| | Actual[b] | 20.06 | 2.96 | 3.95 | 0.3 | 0.12 | 12.93 | 0.59 | 1.03 | 0.11 | 0.25 | 0.005 | 4.28 |
| M | Target | 20 | 3 | 4 | 0.3 | 0.50 | 13 | 0.5 | 1 | 0.09 | 0.26 | — | |
| | Actual[b] | 20.11 | 2.93 | 3.98 | 0.3 | 0.51 | 12.94 | 0.5 | 1.03 | 0.12 | 0.13 | <0.001 | 2.76 |
| N | Target | 20 | 3.4 | 4 | 1 | 0.80 | 12.5 | 0.5 | 2 | 0.1 | 0.3 | — | 8.85[g] |

[a]Calculated using actual composition;
[b]Nonconsumable-arc melted;
[c]Remelted by element compensation;
[d]Contains 1.7% sigma phase and 1.55% laves phase;
[e]Induction melted;
[f]Contains 3.9% sigma phase and 1.7% chi phase;
[g]Includes 1.7% sigma and 1.55% laves phases.

Hot Working with Niobium Example

To determine the capability for alloys to be hot worked, samples of alloys C, D, E, F, K and L in TABLE 6 were prepared by arc-melting one pound samples into ingots of about 25.4 millimeter×24.4 millimeter×101.6 millimeter (1 inch×1 inch×4 inch). After cutting hot-tops and removing some shrinkage underneath, each sample was homogenized at 1200° C. for one hour, and then hot-rolled to a thickness of by weight to about 1.2% by weight niobium can be incorporated in wrought alloys to improve properties such as hot workability.

High Temperature Heat Treating Example

Samples of alloys A and B from TABLE 6 were processed by two different methods. Process A included a heat treating and an annealing step which were at 1200° C. Process B included a heat treating and an annealing step which were at 1250° C. With the higher heat treating and annealing temperatures, measurable improvements in yield strength and ultimate tensile strength were observed for the two alloys when processed at the higher temperature.

The process with 1200° C. processing was accomplished as follows: sections of six inch ID by 1.5 inches thick centrifugally cast pipe were homogenized at 1200° C. for one and a half hours; a section was then hot-rolled at 1200° C. to a one inch thickness for alloy A and a three-quarter inch thickness for alloy B; after cooling to room temperature, the plates were given a fifteen minute anneal at 1200° C.; the plates were then cold-rolled to a thickness of 13.97 millimeter (0.55 inches); the cold-rolled plates were given an anneal for one hour at 1200° C. in air with an argon blanket; and the plates were then given a final anneal for one hour at 1250° C. in air with an argon blanket. This process is referred to herein as process A.

The process with higher heat treating and annealing temperatures varied from the above procedure by homogenization of the cast plates at 1250° C. for three hours instead of one and a half hours; hot rolling was carried out at 1200° C. from a one and a 12.7 millimeter (0.5 inch) thickness to a 19.05 millimeter (0.75 inch) thickness; and the resulting plate was annealed for fifteen minute at 1200° C. followed by cold-rolling to 13.97 millimeter (0.55 inch) thickness. This process is referred to herein as process B.

FIG. 199 depicts yield strengths and ultimate tensile strengths for different metals. Data 1416 shows yield strength and data 1418 shows ultimate tensile strength for alloy A treated by process A. Data 1420 shows yield strength and data 1422 shows ultimate tensile strength for alloy B treated by process B. Data 1424 shows yield strength and data 1426 shows ultimate tensile strength for 347H stainless steel. Both ultimate tensile strength and yield strength were greater for the alloys treated at higher temperatures as compared to 347H stainless steel. A considerable improvement over 347H can be seen for alloys A and B. For example, alloy A and alloy B retained tensile properties to test temperatures of about 1000° C. For an application where yield strength of about 20 ksi was needed, alloy A and alloy B provide the needed yield strength for at least an additional about 250° C. For a 5 ksi difference between yield and ultimate tensile strength at test temperatures, alloy A and alloy B may be used at temperatures of about 950° C. and about 1000° C. as opposed to only about 870° C. for 347H.

Samples of Alloy B, treated by process A and by process B were subjected to stress-rupture tests and the results are tabulated in TABLE 7. It can be seen from Table 7 that process B, with a higher annealing temperature, resulted in about 47% to about 474% improvement in time to rupture.

TABLE 7

| Temperature (C.) | Stress (MPa) | Process A life (hours) | Process B life (hours) | Improvement by Process B |
|---|---|---|---|---|
| 800 | 100 | 164.2 | 241.6 | 47% |
| 850 | 70 | 32 | 151.7 | 474% |
| 850 | 55 | 264.1 | 500.7 | 90% |
| 900 | 42 | 90.1 | 140.1 | 55% |

High Temperature Yield After Cold Work and Aging Example

A sample of alloy B, processed by process B, was aged at 750° C. for 1000 hours after being cold worked by 2.5%, 5%, and 10%, and without cold working. After aging, each was tested for tensile strength and yield strength at about 750° C. Results are tabulated in TABLE 8. It can be seen from TABLE 8, that the yield strength increased significantly as a result of cold work and high temperature aging. The ultimate tensile strength at about 750° C. decreased only slightly as a result of the high temperature aging and cold working. The annealed only sample and the aged only sample were also tested at room temperature for yield strength and ultimate tensile strength. The yield strength at room temperature increased from 307 MPa to 318 MPa as a result of the aging. The ultimate tensile strength decreased from 720 MPa to 710 MPa as a result of the high temperature aging.

TABLE 8

|  | Annealed | Aged | 2.5% Cold Worked and aged | 5% Cold Worked and aged | 10% Cold Worked and aged |
|---|---|---|---|---|---|
| Yield Strength, MPa | 170 | 212 | 235 | 290 | 325 |
| Ultimate Tensile Strength, MPa | 372 | 358 | 350 | 360 | 358 |

These characteristics may be compared to competing alloys such as 347H, which significantly lose high temperature properties as a result of only, for example, 10% cold work. Because fabrication of tubulars and heaters useful in an in situ heat treatment process often require cold work for their fabrication, improvement of some high temperature properties, or at least lack of significant loss of high temperature properties may be a significant advantage for alloys having these characteristics. It may be particularly advantageous when these properties are improved, or at least not significantly decreased, by high temperature aging.

Creep Example

Samples of alloys were subjected to 100 MPa stress at 800° C. in a nitrogen with about 0.1% oxygen test environment. Each of the samples were first annealed for one hour at 1200° C. TABLE 9 shows the time to rupture, elongation at rupture, and total phase content, where the total phase content is known.

TABLE 9

| Alloy | Rupture time (hr) | Elongation (%) | Total Phase Content % at 800° C. | comments |
|---|---|---|---|---|
| B | 283 | 7.6 | 4.4 |  |
| B | 116 | 5.6 | 4.4 |  |
| B | 127 | 3.9 | 4.4 | 10% cold work |
| B | 228 | 3.1 | 4.4 | 10% cold work |
| B | 185 | 2.3 | 4.4 | Laser weld |
| C | 60 | 5.3 | 5.45 |  |
| C | 137 | 3.6 | 5.45 | Repeated test |
| E | 165 | 5.1 | 5.3 |  |
| F | 24 | 6.6 | 2.45 |  |
| G | 178 | 11.3 | 9.6 |  |
| H | 183 | 9.8 | 13.46 total 7.86 good phases |  |
| I | 228 | 12.6 | 9.45 |  |
| J | 240 | 19.7 | 8.95 |  |
| K | 123 | 14.2 | 5.62 |  |
| N | 147 | 7.4 | 8.85 |  |
| 347H | 1.87 | 92 | 0.75 | As received |
| 347H | 2.1 | 61 | 0.75 | As received |
| NF709 | 56 | 32 |  | Annealed |
| NF709 | 30 | 29.4 |  |  |
| NF709 | 36 | 26 |  | Cold Strain 10% |
| NF709 | 82 | 30.6 |  | Cold Strain 10% |
| NF709 | 700 | 16.2 |  | Cold Strain 15% |
| NF709 | 643 | 11.4 |  | Cold Strain 20% |
| NF709 | 1084 | 6 |  | Cold Strain 20% |
| NF709 | 754 | 37.6 |  | As received |

A sample of the improved alloy B was rolled processed and rolled into a tube, and the seam welded, to form a 31.75 millimeter (1.25 inch) OD pipe. The pipe was then cut and welded back together in order to test the strength of the weld. The filler metal was ERNiCrMo-3, and the weld was completed with argon shielding gas and three passes with a preheat minimum temperature of about 50° C. and an interpass maximum temperature of about 350° C. Creep failure was tested for the segment of welded pipe at 44.8 MPa and 900° C. A rupture time of 41 hours was measured with failure at a strain of 5.5%. This demonstrated that the weld, including the heat affected zone around the weld, was not significantly weaker than the base alloy.

Metal Sulfidation Example

FIG. 200 depicts projected corrosion rates (metal loss per year) over a one-year period for several metals in a sulfidation atmosphere. The metals were exposed to a gaseous mixture containing about 1% by volume carbon monoxide sulfide (COS), about 32% by volume carbon monoxide (CO) and about 67% volume $CO_2$ at 538° C. (1000° F.), at 649° C. (1200° C.), at 760° C. (1400° F.), and at 871° C. (about 1600° F.) for 384 hours. The resulting data was extrapolated to a one-year time period. The experimental conditions simulates in-situ sub-surface formation sulfidation conditions of 10% $H_2$ by volume, 10% $H_2S$ by volume and 25% $H_2O$ by volume at 870° C. Curve 1428 depicts 625 stainless steel. Curve 1430 depicts CF8C+ stainless steel. Curve 1432 depicts data for 410 stainless steel. Curve 1434 depicts 20 25 Nb stainless steel. Curve 1436 depicts 253 MA stainless steel. Curve 1438 depicts 347H stainless steel. Curve 1440 depicts 446 stainless steel. 410 stainless steel exhibits a decrease in corrosion at temperatures between about 500° C. and about 650° C.

In some embodiments, cobalt is added to 410 stainless steel to decrease the rate of corrosion at elevated temperatures (for example, temperatures greater than 1200° F.) relative to untreated 410 stainless steel. Addition of cobalt to 410 stainless steel may enhance the strength of the stainless steel at high temperatures (for example, temperatures greater than 1200° F., greater than 1400° F., greater than 1500° F., or greater than 1600° F.) and/or change the magnetic characteristics of the metal. FIG. 201 depicts projected corrosion rates (metal loss per year) for 410 stainless steel and 410 stainless steel containing various amounts of cobalt in a sulfidation atmosphere. The metals were exposed to the same conditions as the metals in FIG. 201. Bars 1442 depicts data for 410 stainless steel. Bar 1444 depicts data for 410 stainless steel with 2.5% cobalt by weight. Bar 1446 depicts data for 410 stainless steel with 5% cobalt by weight. Bar 1448 depicts data for 410 stainless steel with 10% cobalt by weight. As shown in FIG. 201, as the amount of cobalt in the 410 stainless steel increases, the corrosion rate in a sulfidation atmosphere decreases relative to non-cobalt containing 410 stainless steel in a temperature range of about 800° C. to about 880° C.

Varying Heater Output Simulation

A STARS simulation determined heating properties using temperature limited heaters with varying power outputs. FIG. 202 depicts an example of richness of an oil shale formation (gal/ton) versus depth (ft). Upper portions of the formation (above about 1210 feet) tend to have a leaner richness, lower water-filled porosity, and/or less dawsonite than deeper portions of the formation. For the simulation, a heater similar to the heater depicted in FIG. 45 was used. Portion 550 had a length of 368 feet above the dashed line shown in FIG. 202 and portion 548 had a length of 587 feet below the dashed line.

In the first example, the temperature limited heater had constant thermal properties along the entire length of the heater. The heater included a 14.34 millimeter (0.565 inch) diameter copper core with a carbon steel conductor (Curie temperature of 1418° F., pure iron with outside diameter of 20.955 millimeter (0.825 inch)) surrounding the copper core. The outer conductor was 347H stainless steel surrounding the carbon steel conductor with an outside diameter of 31.75 millimeter (1.2 inch). The resistance per foot (mΩ/ft) versus temperature (° F.) profile of the heater is shown in FIG. 203. FIG. 204 depicts average temperature in the formation (° F.) versus time (days) as determined by the simulation for the first example. Curve 1450 depicts average temperature versus time for the top portion of the formation. Curve 1452 depicts average temperature versus time for the entire formation. Curve 1454 depicts average temperature versus time for the bottom portion of the formation. As shown, the average temperature in the bottom portion of the formation lagged behind the average temperature in the top portion of the formation and the entire formation. The top portion of the formation reached an average temperature of 340° C. (644° F.) in 1584 days. The bottom portion of the formation reached an average temperature of 340° C. (644° F.) in 1922 days. Thus, the bottom portion lagged behind the top portion by almost a year to reach an average temperature near a pyrolysis temperature.

In the second example, portion 550 of the temperature limited heater had the same properties used in the first example. Portion 548 of the heater was altered to have a Curie temperature of 843° C. (1550° F.) by the addition of cobalt to the iron conductor. FIG. 205 depicts resistance per foot (mΩ/ft) versus temperature (° F.) for the second heater example. Curve 1456 depicts the resistance profile for the top portion (portion 550). Curve 1458 depicts the resistance profile for the bottom portion (portion 548). FIG. 206 depicts average temperature in the formation (° F.) versus time (days) as determined by the simulation for the second example. Curve 1460 depicts average temperature versus time for the top portion of the formation. Curve 1462 depicts average temperature versus time for the entire formation. Curve 1464 depicts average temperature versus time for the bottom portion of the formation. As shown, the average temperature in the bottom portion of the formation lagged behind the average temperature in the top portion of the formation and the entire formation. The top portion of the formation reached an average temperature of 340° C. (644° F.) in 1574 days. The bottom portion of the formation reached an average temperature of 340° C. (644° F.) in 1701 days. Thus, the bottom portion still lagged behind the top portion to reach an average temperature near a pyrolysis temperature but the time lag was less than the time lag in the first example.

FIG. 207 depicts net heater energy input (Btu) versus time (days) for the second example. Curve 1466 depicts net heater energy input for the bottom portion. Curve 1468 depicts net heater input for the top portion. The net heater energy input to reach a temperature of 340° C. (644° F.) for the bottom portion was $2.35 \times 10^{10}$ Btu. The net heater energy input to reach a temperature of 340° C. (644° F.) for the top portion was $1.32 \times 10^{10}$ Btu. Thus, it took 12% more power to reach the desired temperature in the bottom portion.

FIG. 208 depicts power injection per foot (W/ft) versus time (days) for the second example. Curve 1470 depicts power injection rate for the bottom portion. Curve 1472 depicts power injection rate for the top portion. The power injection rate for the bottom portion was about 6% more than the power injection rate for the top portion. Thus, either reducing the power output of the top portion and/or increasing the power output of the bottom portion to a total of about 6% should provide approximately similar heating rates in the top and bottom portions.

In the third example, dimensions of the top portion (portion 550) were altered to provide less power output. Portion 550 was adjusted to have a copper core with an outside diameter of 13.84 millimeter (0.545 inch), a carbon steel conductor with an outside diameter of 17.78 millimeter (0.700 inch) surrounding the copper core, and an outer conductor of 347H stainless steel with an outside diameter of 30.48 millimeter (1.2 inch) surrounding the carbon steel conductor. The bottom portion (portion 548) had the same properties as the heater in the second example. FIG. 209 depicts resistance per foot (mΩ/ft) versus temperature (° F.) for the third heater example. Curve 1474 depicts the resistance profile for the top portion (portion 550). Curve 1476 depicts the resistance profile of the top portion in the second example. Curve 1478 depicts the resistance profile for the bottom portion (portion 548). FIG. 210 depicts average temperature in the formation (° F.) versus time (days) as determined by the simulation for the third example. Curve 1480 depicts average temperature versus time for the top portion of the formation. Curve 1482 depicts average temperature versus time for the bottom portion of the formation. As shown, the average temperature in the bottom portion of the formation was approximately the same as the average temperature in the top portion of the formation, especially after a time of about 1000 days. The top portion of the formation reached an average temperature of 340° C. (644° F.) in 1642 days. The bottom portion of the formation reached an average temperature of 340° C. (644° F.) in 1649 days. Thus, the bottom portion reached an average temperature near a pyrolysis temperature only 5 days later than the top portion.

FIG. 211 depicts cumulative energy injection (Btu) versus time (days) for each of the three heater examples. Curve 1484 depicts cumulative energy injection for the first heater example. Curve 1486 depicts cumulative energy injection for the second heater example. Curve 1488 depicts cumulative energy injection for the third heater example. The second and third heater examples have nearly identical cumulative energy injections. The first heater example had a cumulative energy injection about 7% higher to reach an average temperature of 340° C. (644° F.) in the bottom portion.

FIGS. 202-211 depict results for heaters with a 40 foot spacing between heaters in a triangular heating pattern. FIG. 212 depicts average temperature (° F.) versus time (days) for the third heater example with a 30 foot spacing between heaters in the formation as determined by the simulation. Curve 1490 depicts average temperature versus time for the top portion of the formation. Curve 1492 depicts average temperature versus time for the bottom portion of the formation. The curves in FIG. 212 still tracked with approximately equal heating rates in the top and bottom portions. The time to reach an average temperature in the portions was reduced. The top portion of the formation reached an average temperature of 340° C. (644° F.) in 903 days. The bottom portion of the formation reached an average temperature of 340° C. (644° F.) in 884 days. Thus, the reduced heater spacing decreases the time needed to reach an average selected temperature in the formation.

As a fourth example, the STARS simulation was used to determine heating properties of temperature limited heaters with varying power outputs when using the temperature limited heaters in the heater configuration and pattern depicted in FIGS. 65 and 67. The heater pattern had a 30 foot heater spacing. Portion 550 had a length of 368 feet and portion 548 had a length of 587 feet as in the previous examples. Portion 550 included a solid 410 stainless steel conductor with an outside diameter of 31.75 millimeter (1.25 inch). Portion 548 included a solid 410 stainless steel conductor with 9% by weight cobalt added. The Curie temperature of portion 548 is 110° C. (230° F.) higher than the Curie temperature of portion 550.

FIG. 213 depicts average temperature (° F.) versus time (days) for the fourth heater example using the heater configuration and pattern depicted in FIGS. 65 and 67 as determined by the simulation. Curve 1494 depicts average temperature versus time for the top portion of the formation. Curve 1496 depicts average temperature versus time for the bottom portion of the formation. The curves in FIG. 213 show approximately equal heating rates in the top and bottom portions. The top portion of the formation reached a temperature of 340° C. (644° F.) in 859 days. The bottom portion of the formation reached a temperature of 340° C. (644° F.) in 880 days. In this heater configuration and heater pattern, the top portion of the formation reached a selected temperature at about the same time as a bottom portion of the formation.

Tar Sands Simulation

A STARS simulation was used to simulate heating of a tar sands formation using the heater well pattern depicted in FIG. 98. The heaters had a horizontal length in the tar sands formation of 600 m. The heating rate of the heaters was about 750 W/m. Production well 206B, depicted in FIG. 98, was used at the production well in the simulation. The bottom hole pressure in the horizontal production well was maintained at about 690 kPa. The tar sands formation properties were based on Athabasca tar sands. Input properties for the tar sands formation simulation included: initial porosity equals 0.28; initial oil saturation equals 0.8; initial water saturation equals 0.2; initial fee gas saturation equals 0.0; initial vertical permeability equals 250 millidarcy; initial horizontal permeability equals 500 millidarcy; initial $K_v/K_h$ equals 0.5; hydrocarbon layer thickness equals 28 m; depth of hydrocarbon layer equals 587 m; initial reservoir pressure equals 3771 kPa; distance between production well and lower boundary of hydrocarbon layer equals 2.5 meter; distance of topmost heaters and overburden equals 9 meter; spacing between heaters equals 9.5 meter; initial hydrocarbon layer temperature equals 18.6° C.; viscosity at initial temperature equals 53 Pa·s (53000 cp); and gas to oil ratio (GOR) in the tar equals 50 standard cubic feet/standard barrel. The heaters were constant wattage heaters with a highest temperature of 538° C. at the sand face and a heater power of 755 W/m. The heater wells had a diameter of 15.2 cm.

FIG. 214 depicts a temperature profile in the formation after 360 days using the STARS simulation. The hottest spots are at or near heaters 716. The temperature profile shows that portions of the formation between the heaters are warmer than other portions of the formation. These warmer portions create more mobility between the heaters and create a flow path for fluids in the formation to drain downwards towards the production wells.

FIG. 215 depicts an oil saturation profile in the formation after 360 days using the STARS simulation. Oil saturation is shown on a scale of 0.00 to 1.00 with 1.00 being 100% oil saturation. The oil saturation scale is shown in the sidebar. Oil saturation, at 360 days, is somewhat lower at heaters 716 and production well 206B. FIG. 216 depicts the oil saturation profile in the formation after 1095 days using the STARS simulation. Oil saturation decreased overall in the formation with a greater decrease in oil saturation near the heaters and in between the heaters after 1095 days. FIG. 217 depicts the oil saturation profile in the formation after 1470 days using the STARS simulation. The oil saturation profile in FIG. 217 shows that the oil is mobilized and flowing towards the lower portions of the formation. FIG. 218 depicts the oil saturation profile in the formation after 1826 days using the STARS simulation. The oil saturation is low in a majority of the formation with some higher oil saturation remaining at or near the bottom of the formation in portions below production well 206B. This oil saturation profile shows that a majority of oil in the formation has been produced from the formation after 1826 days.

FIG. 219 depicts the temperature profile in the formation after 1826 days using the STARS simulation. The temperature profile shows a relatively uniform temperature profile in the formation except at heaters 716 and in the extreme (corner) portions of the formation. The temperature profile shows that a flow path has been created between the heaters and to production well 206B.

FIG. 220 depicts oil production rate 1498 (bbl/day)(left axis) and gas production rate 1500 (ft³/day)(right axis) versus time (years). The oil production and gas production plots show that oil is produced at early stages (0-1.5 years) of production with little gas production. The oil produced during this time was most likely heavier mobilized oil that is unpyrolyzed. After about 1.5 years, gas production increased sharply as oil production decreased sharply. The gas production rate quickly decreased at about 2 years. Oil production then slowly increased up to a maximum production around about 3.75 years. Oil production then slowly decreased as oil in the formation was depleted.

From the STARS simulation, the ratio of energy out (produced oil and gas energy content) versus energy in (heater input into the formation) was calculated to be about 12 to 1 after about 5 years. The total recovery percentage of oil in place was calculated to be about 60% after about 5 years. Thus, producing oil from a tar sands formation using an embodiment of the heater and production well pattern depicted in FIG. 98 may produce high oil recoveries and high energy out to energy in ratios.

Nanofiltration Example

A liquid sample (500 mL, 398.68 grams) was obtained from an in situ heat treatment process. The liquid sample contained 0.0069 grams of sulfur and 0.0118 grams of nitrogen per gram of liquid sample. The final boiling point of the liquid sample was 481° C. and the liquid sample had a density of 0.8474. The membrane separation unit used to filter the sample was a laboratory flat sheet membrane installation type P28 as obtained from CM Celfa Membrantechnik A.G. (Switzerland). A single 2-micron thick poly di-methyl siloxane membrane (GKSS Forschungszentrum GmbH, Geesthact, Germany) was used as the filtration medium. The filtration system was operated at 50° C. and a pressure difference over the membrane was 10 bar. The pressure at the permeate side was nearly atmospheric. The permeate was collected and recycled through the filtration system to simulate a continuous process. The permeate was blanketed with nitrogen to prevent contact with ambient air. The retentate was also collected for analysis. During filtration the average flux of 2 kg/m²/bar/hr did not measurably decline from an initial flux during the filtration. The filtered liquid (298.15 grams, 74.7% recovery) contained 0.007 grams of sulfur and 0.0124 grams of nitrogen per gram of filtered liquid; and the filtered liquid had a density of 0.8459 and a final boiling point of 486° C. The retentate (56.46 grams, 14.16% recovery) contained 0.0076 grams of sulfur and 0.0158 grams of nitrogen per gram of retentate; and the retentate had a density of 0.8714 and a final boiling point of 543° C.

Fouling Testing Example

The unfiltered and filtered liquid samples from previous Example were tested for fouling behavior. Fouling behavior was determined using an Alcor thermal fouling tester. The Alcor thermal fouling tester is a miniature shell and tube heat exchanger made of 1018 steel which was grated with Norton R222 sandpaper before use. During the test the sample outlet temperature, ($T_{out}$) was monitored while the heat-exchanger temperature ($T_c$) was kept at a constant value. If fouling occurs and material is deposited on the tube surface, the heat resistance of the sample increases and consequently the outlet temperature decreases. Hence the decrease in outlet temperature after a given period of time is a measure of fouling severity. The temperature decrease after two hours of operation is used as fouling severity indicator. $\Delta T = T_{out(o)} - T_{out(2h)}$. $T_{out(o)}$ is defined as the maximum (stable) outlet temperature obtained at the start of the test, $T_{out(2h)}$ is recorded 2 hours after the first noted decrease of the outlet temperature or when the outlet temperature has been stable for at least 2 hours.

During each test, the liquid sample was continuously circulated through the heat exchanger at approximately 3 mL/min. The residence time in the heat exchanger was about 10 seconds. The operating conditions were as follows: 40 bar of pressure, $T_{sample}$ was about 50° C., $T_c$ was 350° C., test time was 4.41 hours. The $\Delta T$ for the unfiltered liquid stream sample was 15° C. The $\Delta T$ for the filtered sample was zero.

This example demonstrates that nanofiltration of a liquid stream produced from an in situ heat treatment process removes at least a portion of clogging compositions.

Olefin Production Example

An experimental pilot system was used to conduct the experiments. The pilot system included a feed supply system, a catalyst loading and transfer system, a fast fluidized riser reactor, a stripper, a product separation and collecting system, and a regenerator. The riser reactor was an adiabatic riser having an inner diameter of from 11 mm to 19 mm and a length of about 3.2 m. The riser reactor outlet was in fluid communication with the stripper that was operated at the same temperature as the riser reactor outlet flow and in a manner to provide essentially 100 percent stripping efficiency. The regenerator was a multi-stage continuous regenerator used for regenerating the spent catalyst. The spent catalyst was fed to the regenerator at a controlled rate and the regenerated catalyst was collected in a vessel. Material balances were obtained during each of the experimental runs at 30-minute intervals. Composite gas samples were analyzed by use of an on-line gas chromatograph and the liquid product samples were collected and analyzed overnight. The coke yield was measured by measuring the catalyst flow and by measuring the delta coke on the catalyst as determined by measuring the coke on the spent and regenerated catalyst samples taken for each run when the unit was operating at steady state.

A liquid stream produced from an in situ heat treatment process was fractioned to obtain a vacuum gas oil (VGO) stream having a boiling range distribution from 310° C. to 640° C. The VGO stream was contacted with a fluidized catalytic cracker E-Cat containing 10% ZSM-5 additive in the catalytic system described above. The riser reactor temperature was maintained at 593° C. (1100° F.). The product produced contained, per gram of product, 0.1402 grams of $C_3$ olefins, 0.137 grams of $C_4$ olefins, 0.0897 grams of $C_5$ olefins, 0.0152 grams of iso-$C_5$ olefins, 0.0505 grams isobutylene, 0.0159 grams of ethane, 0.0249 grams of isobutane, 0.0089 grams of n-butane, 0.0043 grams pentane, 0.0209 grams isopentane, 0.2728 grams of a mixture of $C_6$ hydrocarbons and hydrocarbons having a boiling point of at most 232° C. (450° F.), 0.0881 grams of hydrocarbons having a boiling range distribution between 232° C. and 343° C. (between 450° F. and 650° F.), 0.0769 grams of hydrocarbons having a boiling range distribution between 343° C. and 399° C. (650° F. and 750° F.) and 0.0386 grams of hydrocarbons having a boiling range distribution of at least 399° C. (750° F.) and 0.0323 grams of coke.

This example demonstrates a method of producing crude product by fractionating liquid stream produced from separation of the liquid stream from the formation fluid to produce a crude product having a boiling point above 343° C.; and catalytically cracking the crude product having the boiling point above 343° C. to produce one or more additional crude products, wherein least one of the additional crude products is a second gas stream.

Production of Olefins From A Liquid Stream Example

A thermally cracked naphtha was used to simulate a liquid stream produced from an in situ heat treatment process having a boiling range distribution from 30° C. to 182° C. The naphtha contained, per gram of naphtha, 0.186 grams of naphthenes, 0.238 grams of isoparaffins, 0.328 grams of n-paraffins, 0.029 grams cyclo-olefins, 0.046 grams of iso-olefins, 0.064 grams of n-olefins and 0.109 grams of aromatics. The naphtha stream was contacted with a FCC E-Cat with 10% ZSM-5 additive in the catalytically cracking system described above to produce a crude product. The riser reactor temperature was maintained at 593° C. (1100° F.). The crude product included, per gram of crude product, 0.1308 grams ethylene, 0.0139 grams of ethane, 0.0966 grams C4-olefins, 0.0343 grams C4 iso-olefins, 0.0175 grams butane, 0.0299 grams isobutane, 0.0525 grams C5 olefins, 0.0309 grams C5 iso-olefins, 0.0442 grams pentane, 0.0384 grams iso-pentane, 0.4943 grams of a mixture of $C_6$ hydrocarbons and hydrocarbons having a boiling point of at most 232° C. (450° F.), 0.0201 grams of hydrocarbons having a boiling range distribution between 232° C. and 343° C. (between 450° F. and 650° F.), 0.0029 grams of hydrocarbons having a boiling range distribution between 343° C. and 399° C. (650° F. and 750° F.) and 0.00128 grams of hydrocarbons having a boiling range distribution of at least 399° C. (750° F.) and 0.00128 grams of coke. The total amount of $C_3$-$C_5$ olefins was 0.2799 grams per gram of naphtha.

This example demonstrates a method of producing crude product by fractionating liquid stream produced from separation of the liquid stream from the formation fluid to produce a crude product having a boiling point above 343° C.; and catalytically cracking the crude product having the boiling point above 343° C. to produce one or more additional crude products, wherein least one of the additional crude products is a second gas stream.

In this patent, certain U.S. patents, U.S. patent applications, and other materials (for example, articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims. In addition, it is to be understood that features described herein independently may, in certain embodiments, be combined.

What is claimed is:

1. A system for treating a tar sands formation, comprising: a plurality of heaters located in the formation, wherein the heaters include at least partially horizontal heating sections at least partially in a hydrocarbon layer of the formation, the heating sections being at least partially arranged in a pattern in the hydrocarbon layer, and the heaters being configured to provide heat to the hydrocarbon layer, the provided heat creating a plurality of drainage paths for mobilized fluids, at least two of the drainage paths converging proximate at least one, at least partially horizontal production well that is located to collect and produce mobilized fluids from at least one of the converged drainage paths in the hydrocarbon layer, and wherein at least one horizontal heating section that is creating one of the drainage paths is at least partially vertically displaced from the at least partially horizontal production well and is at least partially above the at least partially horizontal production well.

2. The system of claim 1, wherein heat from the heaters is configured to at least partially superimpose over the at least partially horizontal production well.

3. The system of claim 1, wherein the production well includes a heater to provide heat to the production well and at least a portion of the formation surrounding the production well.

4. The system of claim 1, wherein the production well is configured to produce at least some pyrolyzed fluids from the formation.

5. The system of claim 1, wherein the system further comprises a pump in the production well to remove fluids from the formation.

6. The system of claim 1, wherein the heaters are elongated heaters.

7. The system of claim 1, wherein the pattern includes heating sections with substantially equidistant spacing between the heating sections in the pattern.

8. The system of claim 1, wherein the pattern is a triangular pattern of heating sections.

9. The system of claim 1, wherein the system further comprises a steam source configured to provide steam to the formation.

10. The system of claim 1, wherein the pattern of heating sections includes a vertex oriented towards the bottom of the hydrocarbon layer.

11. The system of claim 10, wherein the production well is located near or below the vertex that is oriented towards the bottom of the hydrocarbon layer.

12. The system of claim 1, wherein the production well is located such that heat from at least one of the heaters heats at least a portion of the hydrocarbon layer proximate the production well.

13. The system of claim 1, wherein the production well is located a distance from the nearest heater that is no more than the average spacing between heaters in the pattern.

14. The system of claim 1, wherein the heaters are configured to provide heat such that drainage paths are created by creating more permeable zones in the formation.

15. The system of claim 1, wherein the production well is located between 2 m and 10 m from the nearest heater.

16. The system of claim 1, wherein at least one additional horizontal heating section is vertically displaced and at least partially above the at least one horizontal heating section that is at least partially vertically displaced from the at least partially horizontal production well and is at least partially above the at least partially horizontal production well.

17. The system of claim 1, wherein at least one of the drainage paths is created with at least two horizontal heating sections that create an angled path toward the at least partially horizontal production well.

18. A method for treating a tar sands formation, comprising:
providing heat to at least part of a hydrocarbon layer in the formation from a plurality of heaters located in the formation, wherein the heaters include at least partially horizontal heating sections at least partially in a hydrocarbon layer of the formation, the heating sections being at least partially arranged in a pattern in the hydrocarbon layer, and the heaters being configured to provide heat to the hydrocarbon layer;
wherein the provided heat creates a plurality of drainage paths for mobilized fluids, at least two of the drainage paths converging proximate at least one, at least partially horizontal production well;
allowing at least some of the mobilized fluids from the formation to flow to the at least partially horizontal production well along at least one of the converged drainage paths;
creating at least one of the drainage paths with at least one horizontal heating section that is at least partially vertically displaced and at least partially above the at least partially horizontal production well; and
producing at least some of the mobilized fluids through the at least partially horizontal production well.

19. The method of claim 18, further comprising providing heat to the hydrocarbon layer from the heaters such that the heat at least partially superimposes over the at least partially horizontal production well.

20. The method of claim 18, further comprising allowing fluids in the hydrocarbon layer to drain to the production well along the drainage paths and/or the converged drainage paths.

21. The method of claim 18, further comprising providing heat in the production well with a heater to provide heat to the production well and at least a portion of the formation surrounding the production well.

22. The method of claim 18, further comprising producing at least some pyrolyzed fluids from the formation.

23. The method of claim 18, further comprising pumping fluids to the surface of the formation.

24. The method of claim 18, further comprising providing the fluids to one or more processing units, processing the fluids to produce one or more crude products; and making transportation fuel from one or more of the crude products.

25. The method of claim 18, further comprising providing steam to the formation.

26. The method of claim 18, further comprising providing heat such that the drainage paths are created by creating more permeable zones in the formation.

27. The method of claim 18, wherein at least one additional horizontal heating section is vertically displaced and at least partially above the at least one horizontal heating section that is at least partially vertically displaced from the at least partially horizontal production well and is at least partially above the at least partially horizontal production well.

28. The method of claim 18, wherein at least one of the drainage paths is created with at least two horizontal heating sections that create an angled path toward the at least partially horizontal production well.

* * * * *